Jan. 6, 1970 L. E. KING ET AL 3,488,633

AUTOMATIC CHANNEL APPARATUS

Filed April 6, 1964 870 Sheets-Sheet 1

INSTRUCTION

CHANNEL ADDRESS WORD (CAW)

CHANNEL COMMAND WORD (CCW)

INVENTORS
LEWIS E. KING
WILLIAM C. HOSKINSON
EUGENE J. ANNUNZIATA
FRANCIS W. WISE
EDWIN B. PIERCE

BY Joseph C. Redmond, Jr.
ATTORNEY

Jan. 6, 1970 — L. E. KING ET AL — 3,488,633

AUTOMATIC CHANNEL APPARATUS

Filed April 6, 1964 — 270 Sheets-Sheet 2

CSW FORMAT

CPU INTERFACE

STORAGE INTERFACE

BUS CONTROL INTERFACE

Jan. 6, 1970 L. E. KING ET AL 3,488,633

AUTOMATIC CHANNEL APPARATUS

Filed April 6, 1964 270 Sheets-Sheet 8

Jan. 6, 1970 L. E. KING ET AL 3,488,633

AUTOMATIC CHANNEL APPARATUS

Filed April 6, 1964 270 Sheets-Sheet 15

FIG.16A1
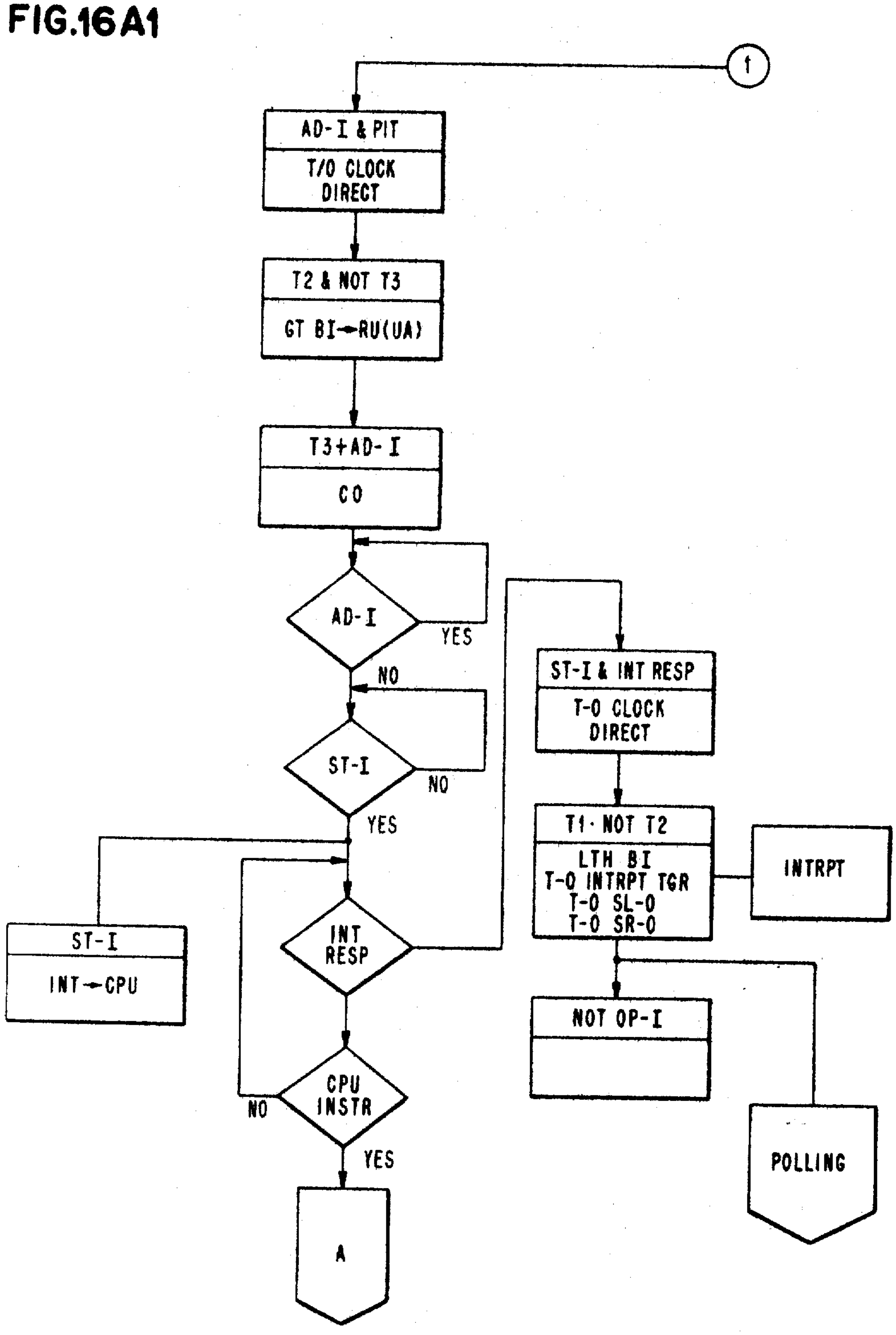

FIG.16D1
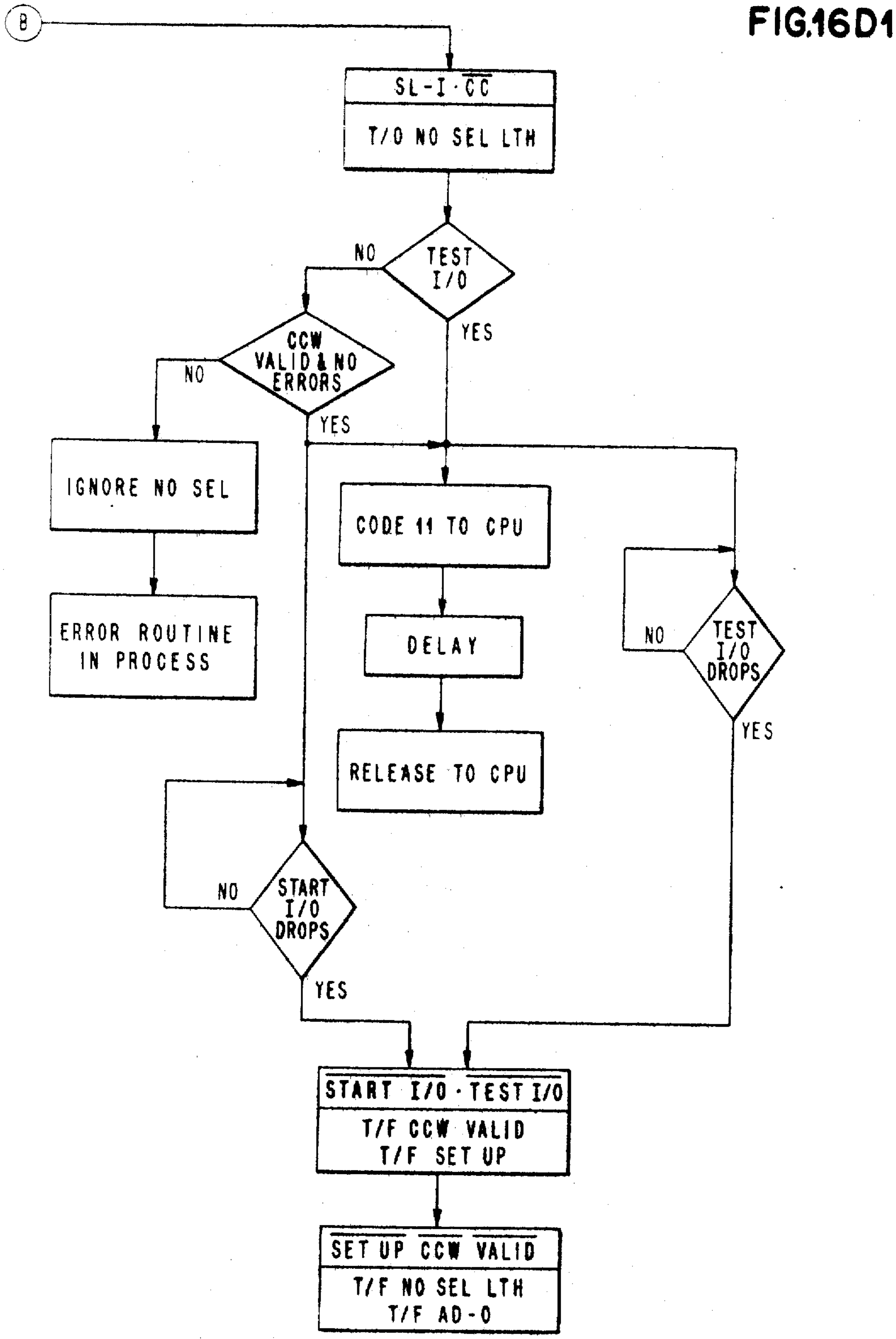

Jan. 6, 1970 L. E. KING ET AL 3,488,633

AUTOMATIC CHANNEL APPARATUS

Filed April 6, 1964 270 Sheets-Sheet 23

FIG.16E1
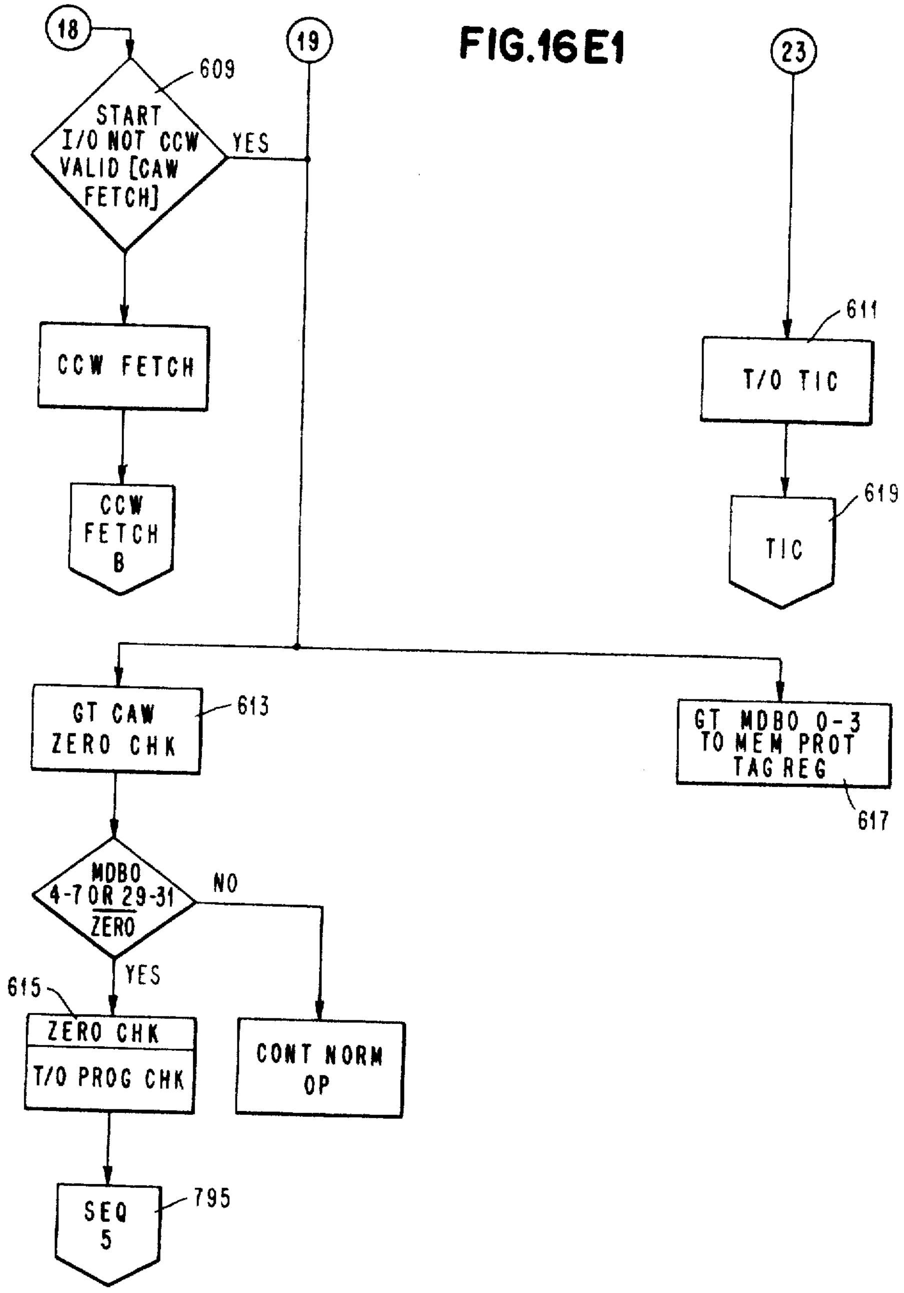

FIG.16E2
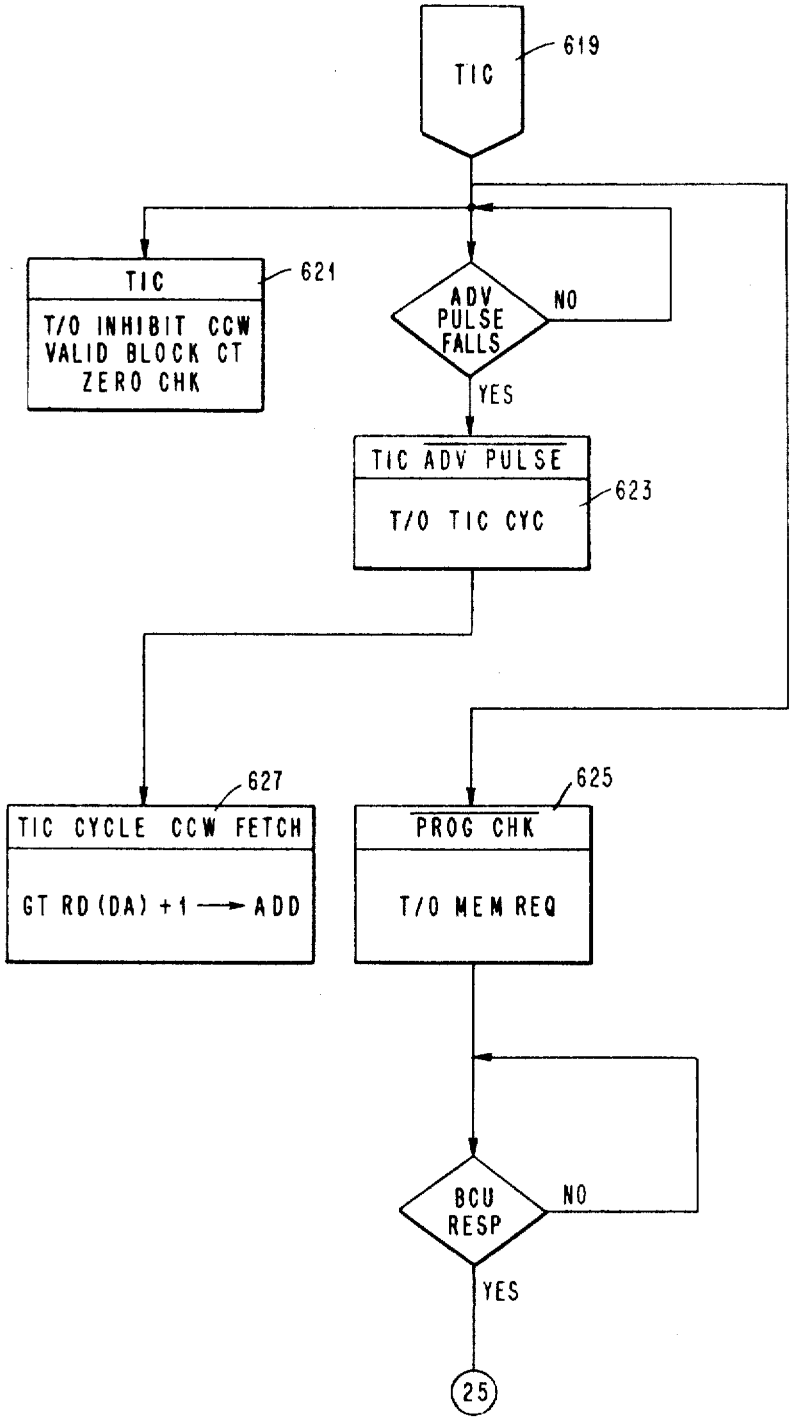

Jan. 6, 1970 L. E. KING ET AL 3,488,633
AUTOMATIC CHANNEL APPARATUS
Filed April 6, 1964 270 Sheets-Sheet 26
FIG.16E3
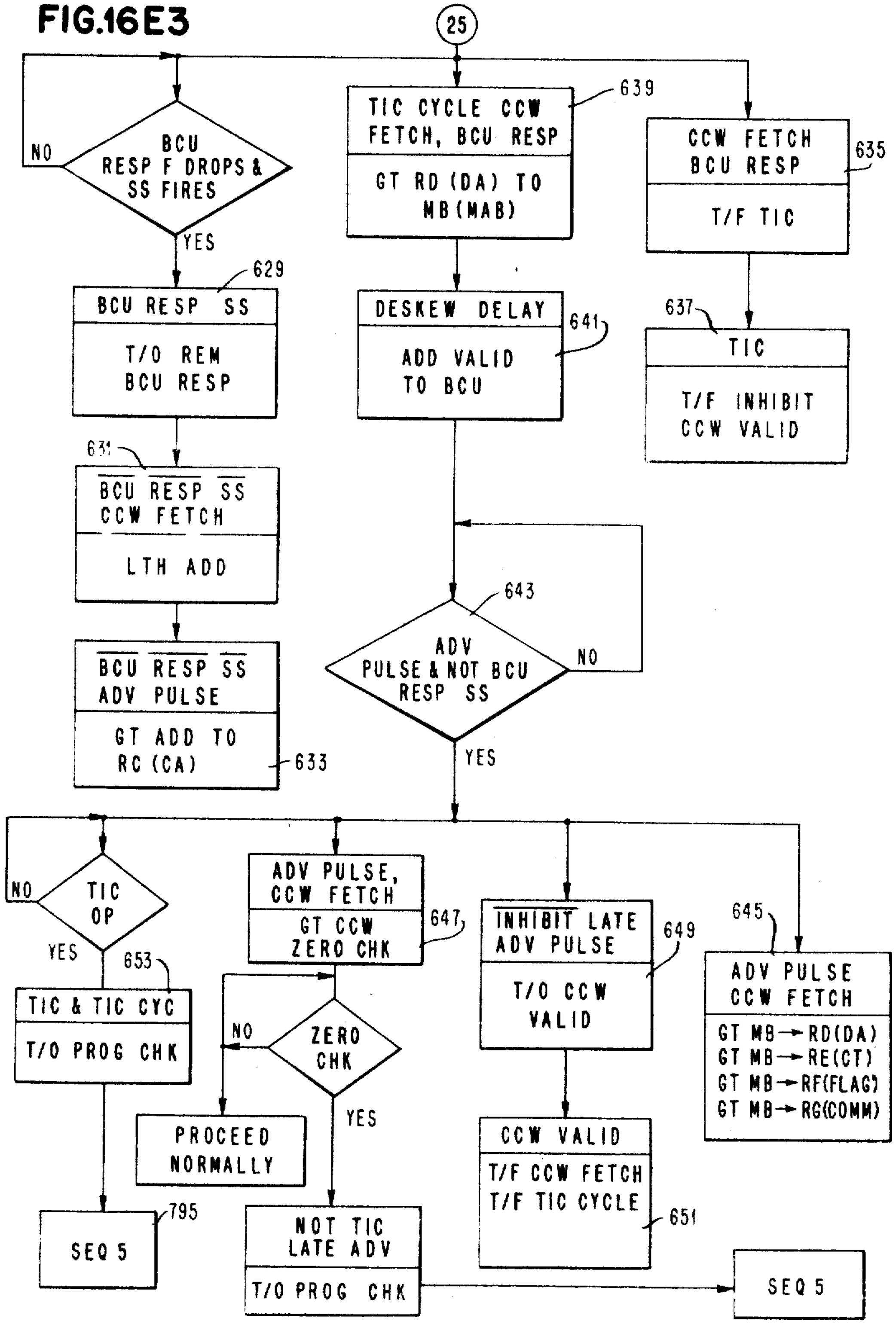

FIG. 16 J1
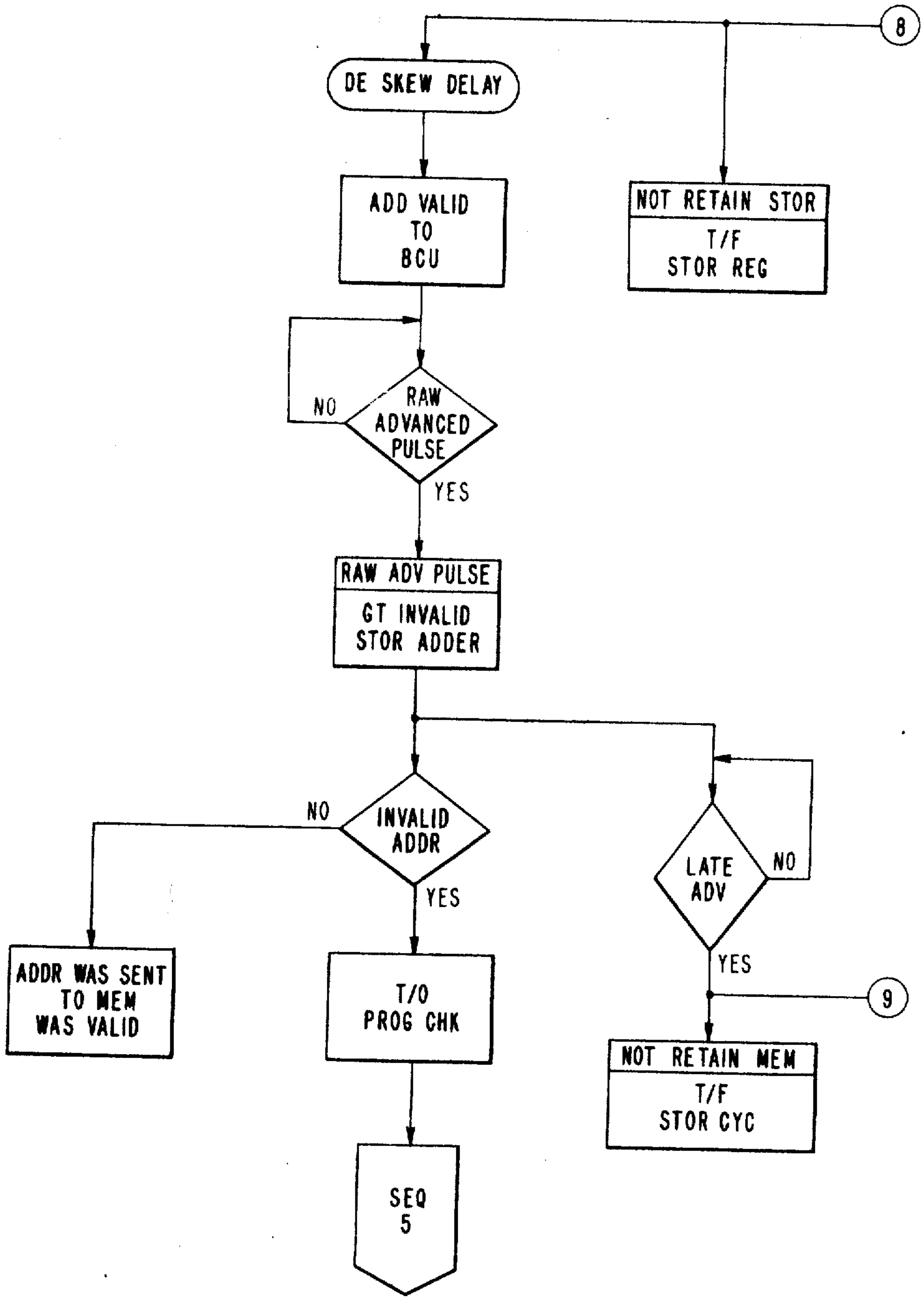

Jan. 6, 1970 L. E. KING ET AL 3,488,633

AUTOMATIC CHANNEL APPARATUS

Filed April 6, 1964 270 Sheets-Sheet 34

FIG.16L1
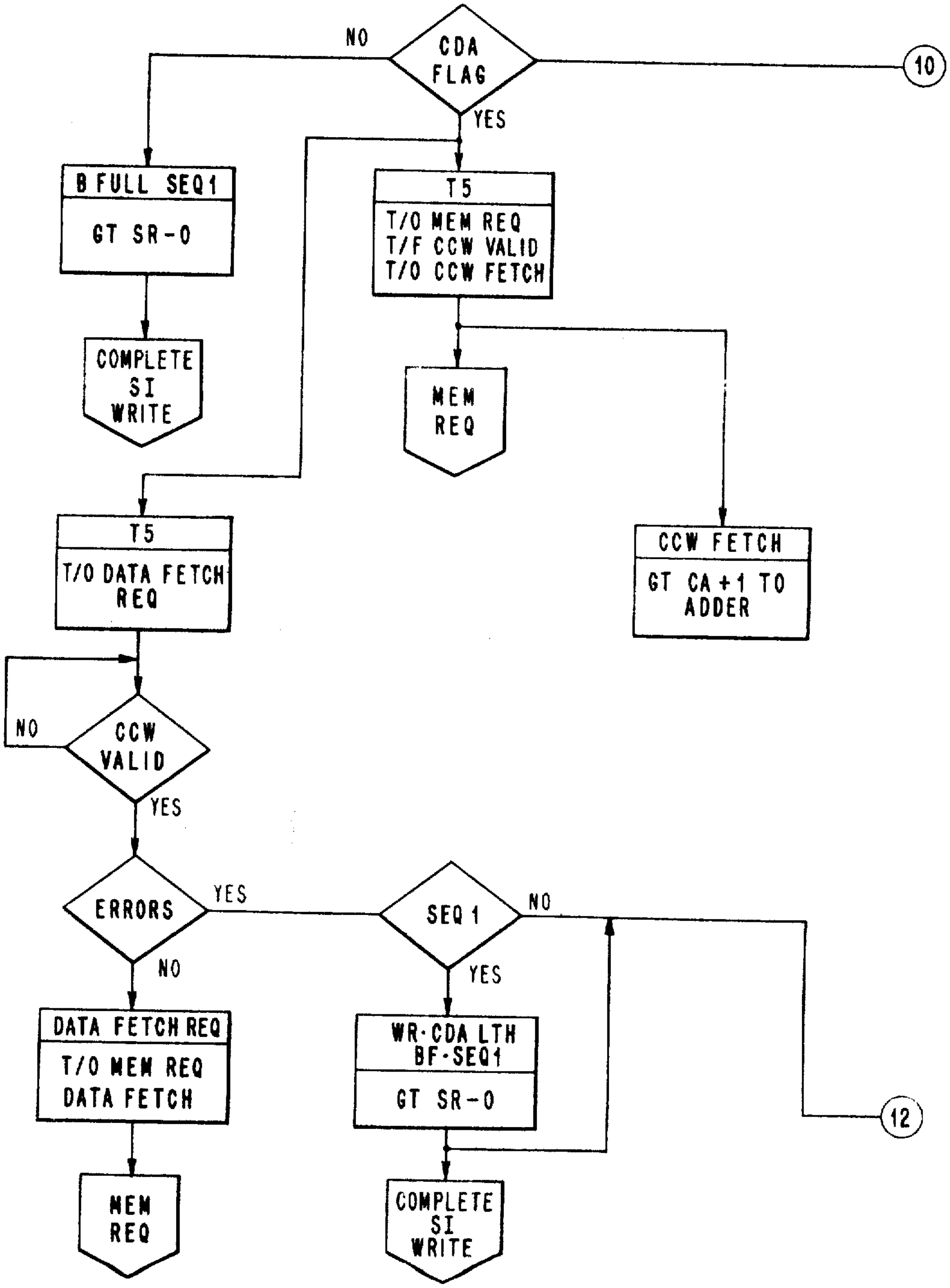

Jan. 6, 1970 L. E. KING ET AL 3,488,633

AUTOMATIC CHANNEL APPARATUS

Filed April 6, 1964

270 Sheets-Sheet 38

Jan. 6, 1970 L. E. KING ET AL 3,488,633

AUTOMATIC CHANNEL APPARATUS

Filed April 6, 1964 270 Sheets-Sheet 39

Jan. 6, 1970 L. E. KING ET AL 3,488,633

AUTOMATIC CHANNEL APPARATUS

Filed April 6, 1964 270 Sheets-Sheet 40

Jan. 6, 1970 L. E. KING ET AL 3,488,633

AUTOMATIC CHANNEL APPARATUS

Filed April 6, 1964 270 Sheets-Sheet 43

Jan. 6, 1970 L. E. KING ET AL 3,488,633

AUTOMATIC CHANNEL APPARATUS

Filed April 6, 1964 270 Sheets-Sheet 44

Jan. 6, 1970 L. E. KING ET AL 3,488,633

AUTOMATIC CHANNEL APPARATUS

Filed April 6, 1964 270 Sheets-Sheet 50

Jan. 6, 1970 L. E. KING ET AL 3,488,633

AUTOMATIC CHANNEL APPARATUS

Filed April 6, 1964 270 Sheets-Sheet 52

Jan. 6, 1970 L. E. KING ET AL 3,488,633

AUTOMATIC CHANNEL APPARATUS

Filed April 6, 1964 270 Sheets-Sheet 53

Jan. 6, 1970 L. E. KING ET AL 3,488,633

AUTOMATIC CHANNEL APPARATUS

Filed April 6, 1964 270 Sheets-Sheet 57

FIG.19A

CHANNEL LATCHES AND TRIGGERS

| REF NO. | TITLE | FUNCTION | FIG |
|---|---|---|---|
| | LATCHES | | |
| 301 | ATTENTION STATUS | BUSS IN STATUS | 222A |
| 303 | STATUS MODIFIER | BUSS IN STATUS | 222A |
| 305 | CONTROL UNIT END | BUSS IN STATUS | 222A |
| 307 | BUSY | BUSS IN STATUS | 223A |
| 309 | CHANNEL END | BUSS IN STATUS | 223A |
| 311 | DEVICE END | BUSS IN STATUS | 223A |
| 313 | UNIT CHECK | BUSS IN STATUS | 224A |
| 315 | UNIT EXCEPTION | BUSS IN STATUS | 224A |
| 317 | STATUS BYTE PARITY | BUSS IN STATUS | 224A |
| 319 | PROGRAM CONTROLLED INTERRUPT | CHANNEL STATUS | 72A |
| 321 | WRONG LENGTH RECORD | CHANNEL STATUS | 42 |
| 323 | PROGRAM CHECK | CHANNEL STATUS | 43 |
| 325 | STORAGE PROTECT CHECK | CHANNEL STATUS | 43 |
| 327 | CHANNEL DATA CHECK | CHANNEL STATUS | 44A |
| 329 | CHANNEL CONTROL CHECK | CHANNEL STATUS | 44A |
| 331 | INTERFACE CONTROL CHECK | CHANNEL STATUS | 44A |
| 333 | CHAIN CHECK | CHANNEL STATUS | 44B |
| 335 | CHAIN COMMAND LATCH | INITIALIZES NEW OP WHEN CHAINING | 82A |
| 337 | CCW VALID | CCW IS IN THE CHANNEL | 83A |
| 339 | SETUP | COMMAND INITIALIZATION | 59A |
| 341 | TIC | TIC COMMAND INITIATED | 68A |
| 343 | TIC CYCLE | TIC BEING EXECUTED | 68A |
| 345 | BC LTH = 0 | INITIALIZES DATA STORAGE SEQUENCE | 86 |
| 347 | BC REG = 0 | INDICATES STATE OF BYTE COUNTER | 85 |
| 349 | BYTE COUNTER (A,B,C),(D) | CONTROLS A REG GATING | 216A, 217A |
| 351 | CLOCK (7 LATCHES)(T1-T7) | INTERNAL TIMING IN CHANNEL | 48B, 49, 50, 51 |
| 353 | ADDRESS OUT | INTERFACE TAG | 81A |
| 355 | SELECT OUT | INTERFACE INTERLOCK | 81A |
| 357 | SERVICE OUT | INTERFACE TAG | 29 |
| 359 | COMMAND OUT | INTERFACE TAG | 29 |
| 361 | START I/O LTH | INITIALIZES START I/O OPERATION | 58B |
| 363 | HALT I/O LTH | INITIALIZES HALT I/O OPERATION | 76 |
| 365 | NO SELECTION LTH | UNIT WAS NOT AVAILABLE FOR SELECTION | 32 |
| 367 | TEST I/O LTH | INITIALIZES TEST I/O OPERATION | 63 |
| 369 | INTERRUPT LTH | INTERRUPT WAITING IN CHANNEL | 72A |
| 371 | STORAGE CYCLE | STORAGE CYCLE IN PROCESS | 89B |
| 373 | RETAIN STORAGE | RETAIN STORAGE PRIORITY | 83A |
| 375 | INITIAL PROGRAM LOAD | IPL OPERATION | 78B |

FIG. 19 B

CHANNEL LATCHES AND TRIGGERS

| REF NO. | TITLE | FUNCTION | FIG |
|---|---|---|---|
| 377 | FLT PROGRAM LOAD | FLT OPERATION | 79 |
| 379 | COUNT REG (BIT 17) | OVERFLOW OF COUNT FIELD | 164 |
| 381 | DATA BUS OUT (8 DATA, 1 PAR) | DATA OR CONTROL INFORMATION TO I/O UNITS | 226B, 227B, 228B, 229B, 230B, 231B, 232B, 233B, 234B |
| 383 | FETCH CAW | INITIATES CAW FETCH | 58A |
| 385 | ACCEPT TO CPU | INITIATES CPU DISCONNECT | 62B |
| 387 | SERVICE OUT (RD) | CONTROLS INTERFACE TAG | 53 |
| 389 | SERVICE OUT (WR) | CONTROLS INTERFACE TAG | 65A |
| 391 | DATA FETCH REQUIRED | WRITE CDA DATA FETCH 1 WD OP | 67A |
| 393 | UPDATE COUNT | CONTROLS UPDATING OF COUNT | 70A |
| 395 | STATUS-IN END | CONTROLS ENDING SEQUENCE | 71A |
| 397 | PCI COND | SYNC'S PROGRAM CONTROLLED INTERRUPT | 72A |
| 399 | PC INTERRUPT | PROGRAM CONTROLLED INTERRUPT WAITING | 72A |
| 401 | REM INTERRUPT STATUS | CONTROLS GATING OF CSW | 72B |
| 403 | REM BCU RESPONSE | CONTROLS GATING OF ADVANCE PULSE | 88A |
| 405 | IPL SYNC | USED TO SYNC IN INITIAL PROGRAM LOAD | 78A |
| 407 | IPL CTRL | CONTROLS IPL OPERATION | 78A |
| 409 | SEQ 5 TEST I/O | CONTROLS ENDING OF TEST I/O OP | 63 |
| 411 | PSEUDO ACCEPT INTERRUPT | INITIATES CSW STORAGE CYCLE | 64 |
| 413 | CLOCK CONTROL | CONTROLS TURN ON & TURN OFF OF CLOCK | 52 |
| 415 | SUPPRESS OUT | INTERFACE TAG | 81A |
| 417 | CHECK COND | BLOCKS STORAGE BUSS IN GATING | 83B |
| 419 | STORAGE REQ | REQUEST FOR STORAGE CYCLE | 89A |
| 421 | INTERRUPT STORAGE REQ | REQUEST FOR STORAGE CYCLE | 89B |
| 423 | BLOCK Z ADDR | DELAYS PROG CONTR INTERRUPT | 89A |
| 425 | LTH Z ADDR | USED TO SYNC TURN ON OF Z ADDR LTH | 89A |
| 427 | Z-ADDR LTH | CONTROLS GATING OF CSW | 89B |
| 429 | ADDRESS VALID TO BCU | ADDRESS ON STORAGE ADDRESS BUS IS VALID | 28B |
| 431 | LCM LTH | INDICATES LCM CYCLE | 28A |
| 433 | ACCEPT LTH | INDICATES GRANTED LCM CYCLE | 28A |
| 435 | DELAY SR-1 | CONTROLS INTERFACE TAG | 30A |
| 437 | REM PROGRAM CHECK | DETECTS ERROR CONDITION | 43 |
| 439 | TURN IF CTRL CHECK | DETECTS ERROR CONDITION | 44A |
| 441 | LOG 1, 2, 3 | CONTROL GATING OF LOG WORD TO STORAGE | 77A |
| 443 | LOG STOP | FREEZES THE CHANNEL | 77B |
| 445 | START SCAN | CONTROLS FLT OPERATION | 79 |
| 447 | STOP SCAN | CONTROLS FLT OPERATION | 79 |
| 449 | RELEASE FLT LOAD | DISCONNECTS CPU AFTER IPL PORTION | 80A |

FIG.19C

CHANNEL LATCHES AND TRIGGERS

| REF NO. | TITLE | FUNCTION | FIG |
|---|---|---|---|
| | TRIGGERS | | |
| 451 | A REG FULL TGR | INDICATES CONDITION OF A REG | 85 |
| 453 | B REG FULL TGR | INDICATES CONDITION OF B REG | 85 |
| 455 | SEQUENCE 1 TGR | INITIAL SELECTION SEQ | 73A |
| 457 | SEQUENCE 2 TGR | DATA TRANSFER | 73A |
| 459 | SEQUENCE 3 TGR | UPDATE THE COUNT | 73A |
| 461 | SEQUENCE 4 TGR | UPDATE THE DATA ADDRESS | 74A |
| 463 | SEQUENCE 5 TGR | ENDING SEQUENCE | 74A |
| 465 | GATE COMMAND TGR | DATA TRANSFER CONTROL | 82A |
| 467 | POLLING INTERRUPT TGR | INITIALIZES INTERRUPT SEQUENCE | 24 |
| 469 | CHAIN DATA ADDRESS TGR | INITIALIZES NEW OP WHEN CHAINING | 81A |
| 471 | LAST WORD TGR | INDICATES ONE WORD OR LESS | 82A |
| 473 | BYTE COUNT = COUNT TGR | INITIALIZES ENDING SEQUENCE | 86 |
| 475 | CCW FETCH TGR | REQUEST FOR CCW FROM STORAGE | 83A |
| 477 | LTH STATUS BYTE TGR | LATCHES STATUS INFORMATION ON BUS IN | 53 |

BYTE COUNTER

BYTE COUNTER

FIG.23A

| | COMMAND ADDRESS REGISTER | DATA ADDRESS REGISTER | COUNT REGISTER | STORAGE ADDRESS |
|---|---|---|---|---|
| 1 | | | | CAW (72) 1001000 |
| 2 | | | | CCW (512) 10 00000000 |
| 3 | CAW (72) 1001000 | | | |
| 4 | UPDATED CAW (80) 1010000 | CCW (512) 10 00000000 | | |
| 5 | UPDATED CCW (520) 1000001000 | INITIAL DATA ADDRESS (1024) 100 00000000 | INITIAL COUNT (40) 101000 | |
| 6 | UPDATED CCW (520) 1000001000 | INITIAL DATA ADDRESS (1024) 100 00000000 | UPDATED COUNT (32) 100000 | INITIAL DATA ADDRESS (1024) 100 00000000 |
| 7 | UPDATED CCW (520) 1000001000 | UPDATED DATA ADDRESS (1032) 100 00001000 | UPDATED COUNT (32) 100000 | |
| 8 | UPDATED CCW (520) 1000001000 | UPDATED DATA ADDRESS (1032) 100 00001000 | UPDATED COUNT (24) 11000 | UPDATED DATA ADDRESS (1032) 100 00001000 |
| 9 | UPDATED CCW (520) 1000001000 | UPDATED DATA ADDRESS (1040) 100 00010000 | UPDATED COUNT (24) 11000 | |
| 10 | UPDATED CCW (520) 1000001000 | UPDATED DATA ADDRESS (1040) 100 00010000 | UPDATED COUNT (16) 10000 | UPDATED DATA ADDRESS (1040) 100 00010000 |
| 11 | UPDATED CCW (520) 1000001000 | UPDATED DATA ADDRESS (1048) 100 00011000 | UPDATED COUNT (16) 10000 | |
| 12 | UPDATED CCW (520) 1000001000 | UPDATED DATA ADDRESS (1048) 100 00011000 | UPDATED COUNT (8) 1000 | UPDATED DATA ADDRESS (1048) 100 00011000 |
| 13 | UPDATED CCW (520) 1000001000 | UPDATED DATA ADDRESS (1056) 100 00100000 | UPDATED COUNT (8) 1000 | |
| 14 | UPDATED CCW (520) 1000001000 | UPDATED DATA ADDRESS (1056) 100 00100000 | RESET OF COUNT REGISTER 000 | UPDATED DATA ADDRESS (1056) 100000 100000 |
| 15 | UPDATED CCW (520) 1000001000 | UPDATED DATA ADDRESS (1064) 100 00101000 | RESET OF COUNT REGISTER 000 | UPDATED DATA ADDRESS (1056) 100000 100000 |
| 16 | UPDATED CCW (520) 1000001000 | UPDATED DATA ADDRESS (1064) 100 00101000 | RESET OF COUNT REGISTER 000 | CSW (64) 1000000 |

Jan. 6, 1970 L. E. KING ET AL 3,488,633

AUTOMATIC CHANNEL APPARATUS

Filed April 6, 1964 270 Sheets-Sheet 71

Jan. 6, 1970 L. E. KING ET AL 3,488,633

AUTOMATIC CHANNEL APPARATUS

Filed April 6, 1964 270 Sheets-Sheet 80

Jan. 6, 1970 L. E. KING ET AL 3,488,633

AUTOMATIC CHANNEL APPARATUS

Filed April 6, 1964 270 Sheets-Sheet 92

Jan. 6, 1970 L. E. KING ET AL 3,488,633

AUTOMATIC CHANNEL APPARATUS

Filed April 6, 1964 270 Sheets-Sheet 117

Jan. 6, 1970 L. E. KING ET AL 3,488,633

AUTOMATIC CHANNEL APPARATUS

Filed April 6, 1964 270 Sheets-Sheet 128

Jan. 6, 1970 L. E. KING ET AL 3,488,633

AUTOMATIC CHANNEL APPARATUS

Filed April 6, 1964 270 Sheets-Sheet 131

Jan. 6, 1970 L. E. KING ET AL 3,488,633

AUTOMATIC CHANNEL APPARATUS

Filed April 6, 1964 270 Sheets-Sheet 132

Jan. 6, 1970 L. E. KING ET AL 3,488,633

AUTOMATIC CHANNEL APPARATUS

Filed April 6, 1964 270 Sheets-Sheet 138

Jan. 6, 1970 L. E. KING ET AL 3,488,633

AUTOMATIC CHANNEL APPARATUS

Filed April 6, 1964 270 Sheets-Sheet 146

Jan. 6, 1970 L. E. KING ET AL 3,488,633

AUTOMATIC CHANNEL APPARATUS

Filed April 6, 1964 270 Sheets-Sheet 150

Jan. 6, 1970 L. E. KING ET AL 3,488,633

AUTOMATIC CHANNEL APPARATUS

Filed April 6, 1964 270 Sheets-Sheet 156

Jan. 6, 1970 L. E. KING ET AL 3,488,633

AUTOMATIC CHANNEL APPARATUS

Filed April 6, 1964 270 Sheets-Sheet 157

Jan. 6, 1970 L. E. KING ET AL 3,488,633

AUTOMATIC CHANNEL APPARATUS

Filed April 6, 1964

270 Sheets-Sheet 164

Jan. 6, 1970 L. E. KING ET AL 3,488,633

AUTOMATIC CHANNEL APPARATUS

Filed April 6, 1964 270 Sheets-Sheet 167

Jan. 6, 1970 L. E. KING ET AL 3,488,633

AUTOMATIC CHANNEL APPARATUS

Filed April 6, 1964 270 Sheets-Sheet 168

Jan. 6, 1970 L. E. KING ET AL 3,488,633

AUTOMATIC CHANNEL APPARATUS

Filed April 6, 1964 270 Sheets-Sheet 170

Jan. 6, 1970 L. E. KING ET AL 3,488,633

AUTOMATIC CHANNEL APPARATUS

Filed April 6, 1964

270 Sheets-Sheet 171

Jan. 6, 1970 L. E. KING ET AL 3,488,633

AUTOMATIC CHANNEL APPARATUS

Filed April 6, 1964 270 Sheets-Sheet 174

Jan. 6, 1970 L. E. KING ET AL 3,488,633

AUTOMATIC CHANNEL APPARATUS

Filed April 6, 1964 270 Sheets-Sheet 177

Jan. 6, 1970 L. E. KING ET AL 3,488,633

AUTOMATIC CHANNEL APPARATUS

Filed April 6, 1964 270 Sheets-Sheet 191

Jan. 6, 1970 L. E. KING ET AL 3,488,633

AUTOMATIC CHANNEL APPARATUS

Filed April 6, 1964 270 Sheets-Sheet 195

Jan. 6, 1970 L. E. KING ET AL 3,488,633

AUTOMATIC CHANNEL APPARATUS

Filed April 6, 1964 270 Sheets-Sheet 198

Jan. 6, 1970 L. E. KING ET AL 3,488,633

AUTOMATIC CHANNEL APPARATUS

Filed April 6, 1964 270 Sheets-Sheet 201

Jan. 6, 1970 L. E. KING ET AL 3,488,633

AUTOMATIC CHANNEL APPARATUS

Filed April 6, 1964 270 Sheets-Sheet 203

Jan. 6, 1970 L. E. KING ET AL 3,488,633

AUTOMATIC CHANNEL APPARATUS

Filed April 6, 1964 270 Sheets-Sheet 204

Jan. 6, 1970 L. E. KING ET AL 3,488,633

AUTOMATIC CHANNEL APPARATUS

Filed April 6, 1964 270 Sheets-Sheet 209

Jan. 6, 1970 L. E. KING ET AL 3,488,633

AUTOMATIC CHANNEL APPARATUS

Filed April 6, 1964 270 Sheets-Sheet 210

Jan. 6, 1970 L. E. KING ET AL 3,488,633

AUTOMATIC CHANNEL APPARATUS

Filed April 6, 1964 270 Sheets-Sheet 212

Jan. 6, 1970 L. E. KING ET AL 3,488,633

AUTOMATIC CHANNEL APPARATUS

Filed April 6, 1964 270 Sheets-Sheet 229

Jan. 6, 1970 L. E. KING ET AL 3,488,633

AUTOMATIC CHANNEL APPARATUS

Filed April 6, 1964 270 Sheets-Sheet 231

Jan. 6, 1970 L. E. KING ET AL 3,488,633

AUTOMATIC CHANNEL APPARATUS

Filed April 6, 1964 270 Sheets-Sheet 234

Jan. 6, 1970 L. E. KING ET AL 3,488,633

AUTOMATIC CHANNEL APPARATUS

Filed April 6, 1964 270 Sheets-Sheet 238

Jan. 6, 1970 L. E. KING ET AL 3,488,633

AUTOMATIC CHANNEL APPARATUS

Filed April 6, 1964 270 Sheets-Sheet 249

Jan. 6, 1970 L. E. KING ET AL 3,488,633

AUTOMATIC CHANNEL APPARATUS

Filed April 6, 1964 270 Sheets-Sheet 250

Jan. 6, 1970 L. E. KING ET AL 3,488,633

AUTOMATIC CHANNEL APPARATUS

Filed April 6, 1964 270 Sheets-Sheet 254

Jan. 6, 1970 L. E. KING ET AL 3,488,633

AUTOMATIC CHANNEL APPARATUS

Filed April 6, 1964 270 Sheets-Sheet 256

Jan. 6, 1970 L. E. KING ET AL 3,488,633

AUTOMATIC CHANNEL APPARATUS

Filed April 6, 1964 270 Sheets-Sheet 259

Jan. 6, 1970 L. E. KING ET AL 3,488,633

AUTOMATIC CHANNEL APPARATUS

Filed April 6, 1964 270 Sheets-Sheet 262

Jan. 6, 1970 L. E. KING ET AL 3,488,633

AUTOMATIC CHANNEL APPARATUS

Filed April 6, 1964 270 Sheets-Sheet 263

Jan. 6, 1970 L. E. KING ET AL 3,488,633

AUTOMATIC CHANNEL APPARATUS

Filed April 6, 1964 270 Sheets-Sheet 265

Jan. 6, 1970 L. E. KING ET AL 3,488,633

AUTOMATIC CHANNEL APPARATUS

Filed April 6, 1964

270 Sheets-Sheet 268

United States Patent Office 3,488,633
Patented Jan. 6, 1970

3,488,633

AUTOMATIC CHANNEL APPARATUS

Lewis E. King, William C. Hoskinson, Eugene J. Annunziata, and Francis W. Wise, Poughkeepsie, and Edwin B. Pierce, Wappinger Falls, N.Y., assignors to International Business Machines Corporation, New York, N.Y., a corporation of New York Filed Apr. 6, 1964, Ser. No. 357,369
Int. Cl. G11b *13/00;* G06f *1/00, 7/00*
U.S. Cl. 340—172.5 11 Claims

ABSTRACT OF THE DISCLOSURE

An input/output channel apparatus for a data processing system in which logical information is handled as fixed or variable length data. Logical circuitry is provided in the channel to provide for the assembly of bytes into words and to transfer the words to and from a storage in the data processing system. The data processing system may specify variable length fields which start and end on any byte position within a word.

A byte counter specifies the byte position, within a particular data word, of the byte which is to be transferred to or from an input/output device. A count register is provided with a count of the total number of bytes to be transferred. The number of the position within a word of the first byte in the series is added to the contents of the count register and the number is also placed in the byte counter. Bytes are transferred into an assembly area in the channel until a word boundary is reached at which time a word is transferred to the memory. The count register is decremented by an amount equal to the total number of bytes in a full word, each time a word boundary is reached. When the number stored in the count register equals the current setting of the byte counter, then the total number or bytes have been transferred and the operation is terminated.

Further means are provided to transmit a coded signal to the controls of the data processing system indicating whether or not a selected input/output device can perform a function specified by an instruction sent to the channel. If the function cannot be performed, the code will indicate the reason.

INDEX

| Paragraph Number | Title | Column |
|---|---|---|
| 1.0 | General | 9 |
| 2.0 | Instruction, Command and Channel Order Formats | 10 |
| 3.0 | Command Codes | 13 |
| 4.0 | Channel Status Word Format | 13 |
| | 4.1 CSW Device Status Field | 13 |
| | 4.2 CSW Channel Status Field | 14 |
| 5.0 | Interfaces | 15 |
| | 5.1 CPU Interface | 16 |
| | 5.11 Operational Lines | 16 |
| | 5.12 Diagnostic Lines | 17 |
| | 5.13 Fault Locating Test Controls | 17 |
| | 5.14 CPU Interface Operation | 19 |
| | 5.15 Condition Codes | 20 |
| | 5.2 Storage Interface | 20 |
| | 5.21 Bus Control Interface | 21 |
| | 5.22 Storage and BCU Interface Operation | 21 |
| | 5.3 I/O Interface | 23 |
| | 5.31 I/O Interface Operations | 23 |
| | 5.311 Data Interleaved Operation | 23 |
| | 5.312 Burst Mode Operation | 25 |

INDEX—Continued

| Paragraph Number | Title | Column |
|---|---|---|
| 6.0 | Channel Units | 26 |
| | 6.1 Programming Registers | 26 |
| | 6.2 Data Transfer Registers | 29 |
| | 6.3 Channel Controls | 31 |
| | 6.31 I/O Interface Controls | 32 |
| | 6.32 Storage Interface Controls | 33 |
| | 6.33 CPU Interface Controls | 33 |
| | 6.34 Command Controls | 35 |
| | 6.35 Data Transfer Controls | 36 |
| | 6.36 Ending Sequence Controls | 37 |
| | 6.37 Clock and Clock Controls | 37 |
| | 6.371 Clock Control | 37 |
| | 6.372 Clock | 38 |
| | 6.38 Channel Latches and Triggers | 39 |
| 7.0 | Flow Chart Operation | 39 |
| | 7.1 Start I/O (Write Command) | 39 |
| | 7.101 Initial Selection | 40 |
| | 7.102 Sequence 4 | 43 |
| | 7.103 Data Fetch | 44 |
| | 7.104 Sequence 2 | 45 |
| | 7.105 Sequence 3 | 46 |
| | 7.106 Sequence 5 | 47 |
| | 7.2 Start I/O (Read Command) | 48 |
| | 7.201 Read Backward | 49 |
| | 7.3 Chaining | 49 |
| | 7.301 Chaining Command Address | 50 |
| | 7.302 Chaining Data Address | 51 |
| | 7.4 Skip Operation | 52 |
| | 7.5 Other Commands | 53 |
| | 7.501 Transfer In Channel | 53 |
| | 7.502 Sense | 54 |
| | 7.503 Control | 54 |
| | 7.6 Test I/O | 55 |
| | 7.7 Halt I/O | 57 |
| | 7.8 Test Channel | 57 |
| | 7.9 Initial Program Load (IPL) | 58 |
| 8.0 | Byte Counter | 58 |
| 9.0 | Byte Addressing Word Size Storage | 60 |
| | 9.1 Boundary Section | 61 |
| 10.0 | Adder, Count Regiser and Data Address Register Operation | 61 |
| 11.0 | Read Operation, General | 62 |
| 12.0 | Detailed Read Operation | 63 |
| | 12.01 Channel Selection | 63 |
| | 12.02 Fetching of CAW | 63 |
| | 12.03 Storage Sequence | 64 |
| | 12.04 Setup | 64 |
| | 12.05 Fetching of CCW | 66 |
| | 12.06 I/O Select | 68 |
| | 12.07 Device Status | 70 |
| | 12.08 Transmission of Data | 71 |
| | 12.09 Storing of Data and Updating of Count | 72 |
| | 12.10 Updating of Data Address | 73 |
| | 12.11 Ending Sequence | 74 |
| | 12.12 Storing of CSW | 75 |

This invention relates to electronic apparatus. More particularly, this invention relates to apparatus for permitting portions of an electronic data processing system to communicate with each other.

A data processing system includes a central processing unit, a memory, external input/output devices and one or more channel apparatuses for controlling communication between the external devices and the central processing unit and memory. The central processing unit usually includes arithmetic and logic devices and controls for performing operations upon data with the arithmetic and logic devices. The memory, which has its own controls, typically stores accessible data utilized by the central processing unit and also stores instructions for controlling the utilization of this data by the central processing unit and by the external devices. Though the external input/output devices may operate more slowly than the central processing unit and memory, they provide large amounts of extra space for storing data and instructions. Each channel apparatus is the main control apparatus for overseeing communication between its connected external input/output devices and the rest of the data processing system. A representative data processing system is disclosed in U.S. Patent No. 3,036,773, "Indirect Addressing in an Electronic Data Processing Machine" of J. L. Brown et al., assigned to the International Business Machines Corporation, which patent is incorporated herein by this reference.

The central processing unit of a data processing system includes an arithmetic circuit for performing operations upon data comprising "bits" (binary integers) represented by signals manifesting either a 0-bit or a 1-bit value. For example, the presence of a positive signal represents a 1-bit, while the absence of a positive signal represents a 0-bit. Additional meaning is given to bits by grouping them into binary-coded sets and subsets. For example, one flexible scheme groups 64 bits into a "word" made up of eight 8-bit "bytes." Within each byte, the bits have values in the order: 128, 64, 32, 16, 8, 4, 2 and 1. The decimal meaning of a byte (such as 129 for 10000001) is obtained by adding together the values for each position having a 1-bit. By extending this "weighting" technique to 64 positions, a very large number may be represented by each data word. Alternatively each one of the eight 8-bit bytes in a word can represent either two decimal numbers, or mixed numbers and characters.

In the embodiment to be disclosed herein, each data word has 64 bits grouped into eight 8-bit bytes including a parity bit *p* weighted as follows: *p*, 128, 64, 32, 16, 8, 4, 2 and 1 (binary mode); *p*, 8, 4, 2, 1, 8, 4, 2, and 1 (binary-coded decimal packed numeric mode); and an alphabetic-numeric mode.

The central processing unit also includes controls for overseeing the operation of its arithmetic and logic circuits as well as other operations in which the central processing unit becomes involved. The controls are operated in response to instruction words received from memory and interpreted in the central processing unit.

The memory stores data words, instruction words, and channel command words (or "control words") and status words for the channel apparatus. Typically, the memory is a three-dimensional magnetic core matrix holding words in addressable locations from which they may be obtained, and into which they may be placed, by specifying location addresses. In the embodiment to be disclosed herein, entire eight byte words are accessed at once; associated circuitry masks out undesired bytes of the accessed word. The memory makes no distinction among data words, insruction words and channel command words, the central processing unit distinguishing one type of word from another. All instruction words and channel command words, and many of the data words, are obtained from an external input/output device and placed into the memory, prior to their use, in locations carefully planned by a programmer to achieve the desired operations. Any group of instructions (normally in sequential locations) is called a program, there normally being several related program routines planned for substantially simultaneous execution. For example, an external device sequence of instructions and command words may, if automatic channel apparatus is used, be executed at the same time as a sequence of central processing unit arithmetic instructions. While there are many instruction word formats, a typical instruction word comprises: (1) an operation part, specifying an operation to be performed upon data identified by the instruction, (2) an address part, specifying a memory location at which is found a data word, and (3) additional control information.

By external input/output devices are meant well-known magnetic tape units, printers, card readers, card punches, typewriters and telegraph units as well as magnetic drums, magnetic disk storages, extra core storage memories, etc. Though each of these devices communicates with either the central processing unit or the memory, many input/output devices operate much slower than the central processing unit or memory. For example, without a speed changing device, the slow operation of a card reader would interfere with the fast operation of the central processing unit and memory either making the fast central processing unit wait for the slow card reader or forcing the card reader to run too quickly for accuracy.

There are many prior art methods for adapting slow external devices to the operation of a fast electronic data processing system. Some early computers overcame this asynchronism by suspending all arithmetic and logic operations in the central processing unit during each use of an input/output device. Since the central processing unit waited for the relatively slow input/output device, there was a tremendous waste of computing time.

In one novel prior art approach, the programmer regularly interrogated each input/output device for its service needs by properly spacing special interrogation instructions throughout each program. While this approach could efficiently utilize all parts of the data processing system, it placed a very difficult burden on the programmer and was exceedingly wasteful of memory space.

A more advanced prior art solution is a form of channel apparatus (called a "data synchronizer") linking multiple input/output devices with a central processing unit and memory. Such a data synchronizer is disclosed in U.S. patent application Ser. No. 705,447, filed Dec. 6, 1957, entitled "Data Synchronizer," of C. L. Christiansen et al., and assigned to the International Business Machines Corporation, which application is incorporated herein by this reference. In this referenced data synchronizer, input/output devices are kept in essentially simultaneous operation with a central processing unit which, together with the input/output devices, shares a single memory. Since only one memory accessing operation at a time is possible, priority circuits determine which external device receives priority, and whether the central processing unit, or the external devices as a group, receives priority. When apparatus needing service has priority, it is given sole access to the memory for a limited period of time. If the central processing unit is given access to memory it will either transfer a data word to or from memory or it will receive an instruction from memory. If an input/output device is given priority, it will either transfer a data word between itself and memory, or a channel command word will be transferred from memory to the data synchronizer to control subsequent transfers between input/output devices and the memory.

Still referring to the referenced prior art data synchronizer, the channel command words permit the transfer of large blocks of data between specified input/output devices and predetermined memory areas, without interference either among the input/output devices or between the input/output devices and the central processing unit. Each input/output device is provided with apparatus in the data synchronizer which associates the device with one current channel command word from memory specifying: (1) a current location address, of a "block" of locations, in memory available for use by that input/output device, (2) the number (word count) of successive locations in the block following the initial location, (3) the location of another channel command word for use once the specified block is used, and (4) control information. Each time that an input/output device desires service and has priority, it is connected to the memory for a data word transfer between the currently specified memory location and the input/output device. After each such transfer the current location designation is changed to indicate the next successive location while the word count designation is changed to indicate that one less location is available in the block. When the word count designation indicates that no more locations are available in the memory, a new channel command word may, or may not, (depending upon the control information) be obtained.

In the referenced prior art data synchronizer, a word counter, address counter and location counter permit the input/output devices to communicate with blocks of locations in memory. The address counter indicates the current address at which data is to be stored while the word counter indicates the number of free locations remaining in the memory block assigned. The location counter indicates the next location of another channel command word containing information to be placed into the word counter and into the address counter when the word counter indicates that the end of the current memory block has been reached. This approach requires three separate counters, which are very difficult to check for errors and which are inefficient because each counter sits idle for long periods of time.

Also in the proir art, the memory is addressed by specifying locations at which will be found complete data words. In modern memories using sophisticated masking circuits, it is possible to specify addresses which do not necessarily indicate the beginning of a data word, but rather select the beginning of any 8-bit byte in any data word. Thus, the address, word and location counters are inadequate for byte addressing because they specify the addresses for full word locations only.

Further, in the referenced prior art data synchronizer, if the input/output device is a magnetic tape unit, the 6-bit characters read from the tape must be assembled into 36-bit binary words used by the particular data processing system associated with the referenced data synchronizer. As disclosed in the Christiansen et al. application, an extra counter indicates whenever 6-bit tape characters (a full data word) have entered the data sychronizer. This counter always starts at the first character position in each word and ends at the sixth position, after which it recycles, and is thus inadequate for addressing blocks of bytes (equivalent to characters) if the first (or last) byte in the block is not the first (or last) byte in a word. Also the prior art word counter will not adequately indicate the end of a block if the last byte in the block is not the last byte of the last word in the block.

Prior art counters which are designed to always start at the first byte position of a word, cannot be used if, due to sophisticated memory masking apparatus, it is possible to start with any position, and not necessarily the first position.

Due to the prior art emphasis on adressing complete words, there is no provision for indicating to the central processing unit and memory which portions of a byte-addressable data word are utilized by an input/output device. Failure to provide such an indication, where any byte in any word can be separately specified, can cause unintentional interference between bytes.

In the prior art, it was difficult to connect a wide variety of input/output devices to a single channel apparatus. Since it has been common to provide different numbers of connections for different types of input/output devices, a large number of different contacts are necessary on a single channel in order to accommodate the great variety of input/output devices that may be connected to that channel .

In the prior art, a single memory is shared by a central processing unit and multiplicity of input/output devices connected to a data synchronizer. Since the circuit configurations assume that a particular memory is connected, the use of any memory in place or, or in addition to, the memory for which the synchronizer was designed is difficult.

Another problem was presented in the prior art by conflicts between the central processing unit and the input/output devices, as a group, for access to memory; the external devices might have to wait so long for the central processing unit to free memory that information is lost.

Sequential memory accessing requests, in the prior art, required successive complete memory cycles, tieing up the memory for long periods though the need for multiple accesses was initially known.

Though in the prior art it is customary to indicate a limited amount of control information in each channel control word, this information is not sufficient to specify courses of action for all the significant conditions that might occur in an input/output device. Thus, since these conditions are not planned for, it is necessary to take time away from other operations when these special conditions occur.

It was also necessary in the prior art to completely disrupt the central processing unit operation to merely interpret or test the conditions occurring in an input/output device, additional interruption being required for correcting the condition if the interpretation indicates that such correction is required.

The prior art data synchronizer performs a number of simultaneous asynchronous operations. For example, each input/output device may operate independently, as may the central processing unit and memory. Since during independent operation, each apparatus responds to its own controls, provisions of signals from a central source for supervising each step in the operation of each independent operation is complicated, expensive and, since synchronism among the various devices and units is normally required only at times that information is transferred from one apparatus to another, inefficient. The complex timing operations of prior art apparatus, such as the data synchronizer, require separate circuits for each timing operation.

It is therefore an object of this invention to provide improved synchronization apparatus for permitting intercommunication of input/output devices and memory locations.

Another object of this invention is to provide simple efficient circuitry for defining memory location blocks available to input/output devices.

Still another object of this invention is to efficiently provide multiple functions for single circuits used in allotting memory locations for communication of data with input/output devices.

An additional object is to provide independently operating multiple function circuits capable of continuing operations to completion during overlapping operation of other relatively fast circuits.

A further object of this invention is to provide means for checking the accuracy of information used to control the intercommunication of data words between input/output devices and memory areas.

It is an object of this invention to provide efficient checking means for a plurality of counters.

Another object of this invention is to provide apparatus for checking a plurality of devices in time-division multiplex.

A further object of this invention is to provide checking apparatus in association with an adder for checking the accuracy of information supplied to a plurality of inputs to the adder.

It is an object of this invention to associate bit-groups communicated to and from input/output devices with the proper corresponding bit-group positions within multiple-bit words.

It is an object of this invention to provide improved control information to supervise the transfer of data words between input/output devices and a memory without the intervention of additional control information.

It is a further object of this invention to provide an improved source of initial control information for supervising communication between input/output devices and a memory.

It is a still further object of this invention to provide sufficient information to control communication between input/output devices and preassigned memory locations so that additional information will not be required prior to completion of all desired operations.

A still further object of this invention is to provide for the communication of control information from input/output devices to indicate problems encountered during operation.

It is an object of this invention to provide apparatus for permitting a central processing unit to interpret conditions occurring in input/output devices without interrupting operation of the central processing unit.

Another object of this invention is to provide apparatus for identifying conditions occurring in input/output devices during operation of a central processing unit.

A further object of this invention is to permit identification of conditions occurring in input/output devices prior to a communication of data words between such devices and a memory.

It is an object of this invention to provide a single circuit in a channel apparatus for efficiently providing all necessary control signals.

The foregoing and other objects, features and advantages of the invention will be apparent from the following more particular description of the preferred embodiment of the invention, as illustrated in the accompanying drawings.

These objects are achieved by improved channel apparatus including a count register, data address register, byte counter, command address register, A and B (assembly/distribution) registers and adder, and the necessary interconnections and controls.

The adder increments the count register, the data address register and the command address register; the only true counter (requiring special circuitry) is the byte counter. Thus one central adder performs three separate counting operations and permits the use of a simple inexpensive checking scheme. The adder may complete the operations subsequent to the start of an independent channel apparatus operation not immediately requiring the adder output; an efficient overlapping of functions.

If a standard adder checking circuit is associated with the adder, the three incrementable registers are automatically checked during each incrementation operation.

The byte counter specifies the byte number (from zero to seven) within a particular data word in memory (specified by the data address register) to which the current byte is to be sent from an input/output device. The byte counter controls the assembly of bytes in the A and B registers, sections of which registers correspond to the byte counter contents. Thus, if each register is divided into eight 8-bit sections, the byte counter will control entry into the register section corresponding to the byte counter setting. The byte counter is stepped after each byte transfer, while the register is sent as a full data word to memory whenever its eighth byte section is filled. One of the A and B registers may communicate a full word to memory while the other register is concurrently assembling the next word. The same circuits may be used for distribution of bytes from the A and B registers to an input/output device.

The end of a block of locations in memory communicating with an input/output device is indicated, though the block may end (byte counter equals seven) or start (byte counter equals zero) at other than the beginning of a word. The contents of the byte counter are initially added to the contents of the count register (which keeps track of the number of locations remaining in the block). The count register is then decremented by eight (one data word) for each transfer of data between the A and B registers and the memory; while the byte counter is incremented by one for each transfer of a byte between the input/output device and the A and B registers. During handling of the last word in the block, the end of the assigned memory block is reached when the value in the byte counter equals the value in the count register.

The dual function byte counter, which controls the A and B registers and also indicates the end of a block of data words, is necessarily specially designed to achieve its efficient operation. A set of latches at the output of the byte provides a look-ahead feature to eliminate the carry ripple time normally associated with counters. This look-ahead feature also permits determination of a count one higher than that which is in the counter itself. Once the counter has been stepped, there is no delay between the time of the stepping and the time that the incremented contents can be used since the output latches can be sensed immediately. The byte counter achieves bi-directional counting as a result of circuits which sense its true and the complement outputs. Thus by stepping the byte counter in one direction it is possible to simulate stepping in the opposite direction by utilizing only its complement output.

A "mark register" keeps track of filled register sections and coordinates memory accessing with the A and B registers contents. After each byte transfer into, or from, the A and B registers, the byte counter sets the one bit, of eight bits, in the mark register which corresponds to the A and B registers byte section utilized.

A set of interface lines to the channel apparatus are time-shared to transfer all information necessary for the operation of connected input/output devices. The lines, among their functions, supply input/output device addresses, control signals and data bytes. The interface includes operation lines for normal operation, diagnostic lines used during diagnostic checking and special control lines for fault locating tests. There is also provided as an integral part of the interface mechanism a line used for controlling the priority of multiple input/output devices connected to the same channel apparatus.

There is provided a flexible mechanical and electrical interconnection between each channel apparatus and memory to provide a uniform interface between the channel apparatus and diverse memories.

A priority circuit resolves conflicts in memory accessing demands in favor of the input/output devices at the expense of the central processing unit.

Memory accessing circuitry recognizes sequential service requests, eliminating unnecessary repetitious portions of a single memory cycle to perform two accesses in less than two memory cycles.

The channel control word (or command) provides room for specifying actions to be taken in response to many conditions in the input/output devices. In the initial loading of a program, an instruction resets the central processing unit and selects a desired channel apparatus. When the desired channel apparatus is ready, it in turn is reset and is loaded with information from a channel control word (or command) specified in the initiating instruction. This control word specifies a desired input/output device connected to the selected channel for operation, several input/output devices being connected to the same channel. The input/output device then communicates data to and from the memory under supervision of the control word. Since the control word itself provides for conditions occurring during operation of the selected input/output device, there are provided means for recognizing these conditions and taking the proper action without interfering with the central processing unit operation.

Condition codes indicate whether or not a selected input/output device has performed a function specified by an instruction directed to the channel apparatus to which the input/output device is attached and, if the function has not been performed, the condition code will indicate the reason for its failure to perform this function. The channel apparatus itself immediately interprets each condition code sent to it to determine whether or not a corrective action is required. The condition code is interpreted differently for each type of instruction directed to a channel apparatus.

A novel clock, which controls timing in the channel apparatus, comprises a number of output lines equal to the number of different types of control times required. A delay-line pulse generator, connected to each output, determines the pulse width on the connected output, though output latches may be used if output levels, instead of pulses, are desired. A direct turn-on input allows the clock to run as long as a signal is present on this line; as soon as it falls, the clock will turn off. A latched turn-on input is similar except that the clock will keep on running, even if the activating signal is removed. The clock runs as long as the direct turn-on signal is supplied; when it is removed all lines are simultaneously reset regardless of their current position or, if desired, the clock is reset by placing a signal on a turn-off line.

Figure 6:
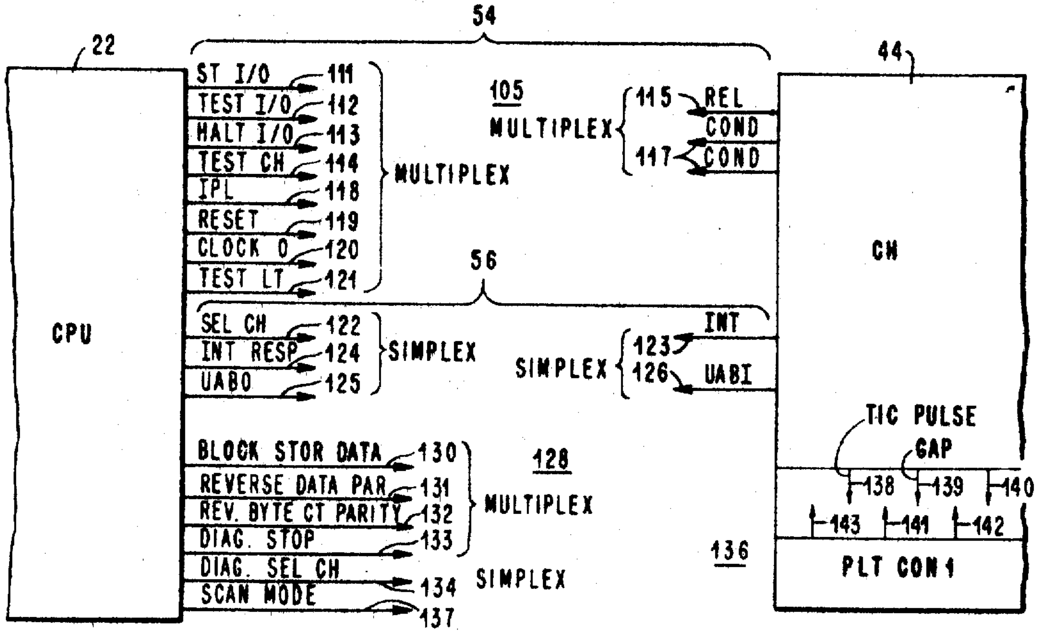
FIG. 6 is an electrical schematic of CPU interface lines.
Figure 7:
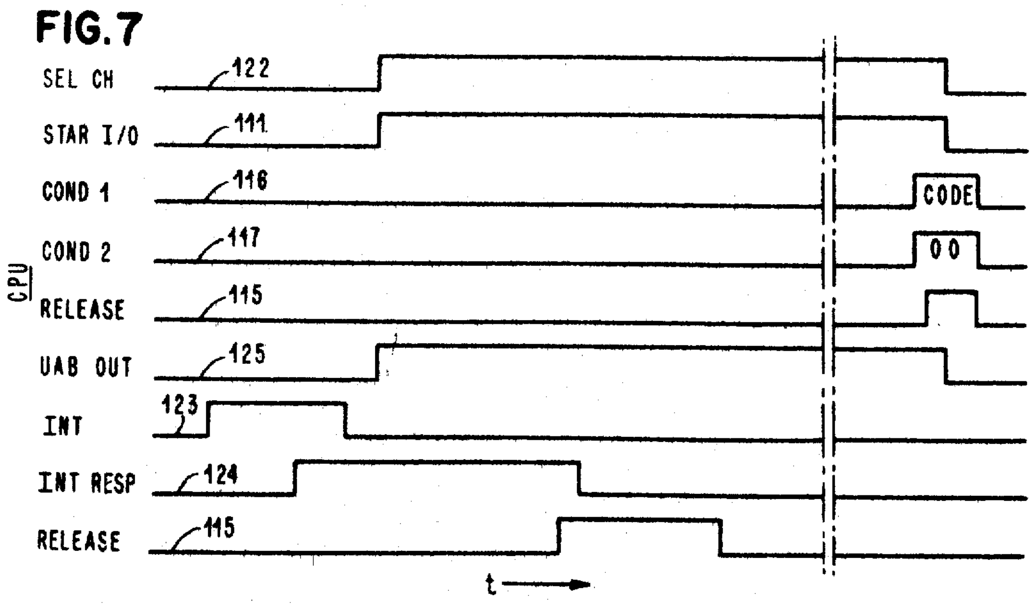

FIG. 7 indicates signal levels on FIG. 6 lines while operating.

Figure 8:
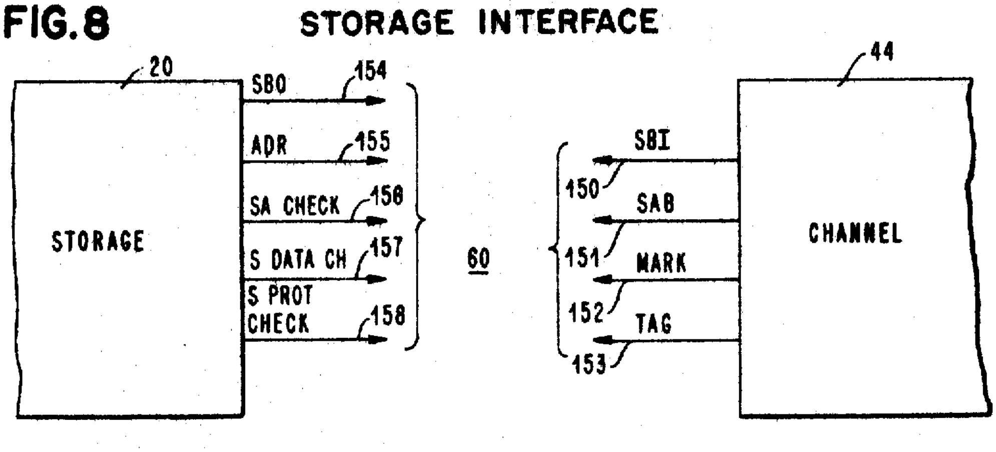

FIG. 8 is an electrical schematic of storage interface lines.

Figure 9:
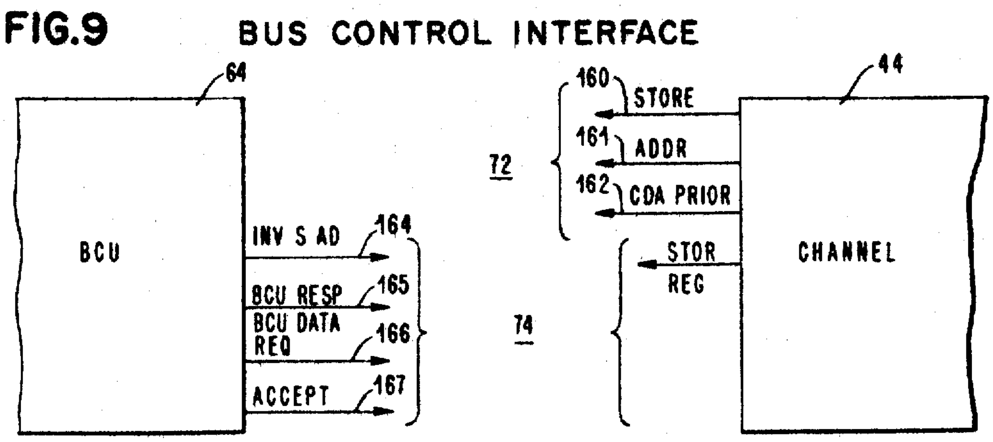

FIG. 9 is an electrical schematic of bus control interface lines.

Figure 10:
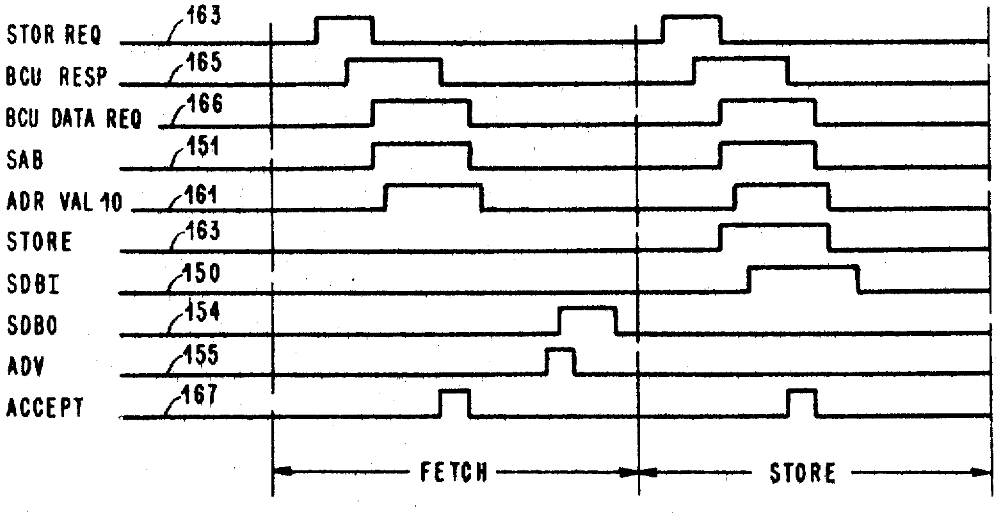

FIG. 10 indicates signal levels on FIGS. 8 and 9 lines while operating.

Figure 11:
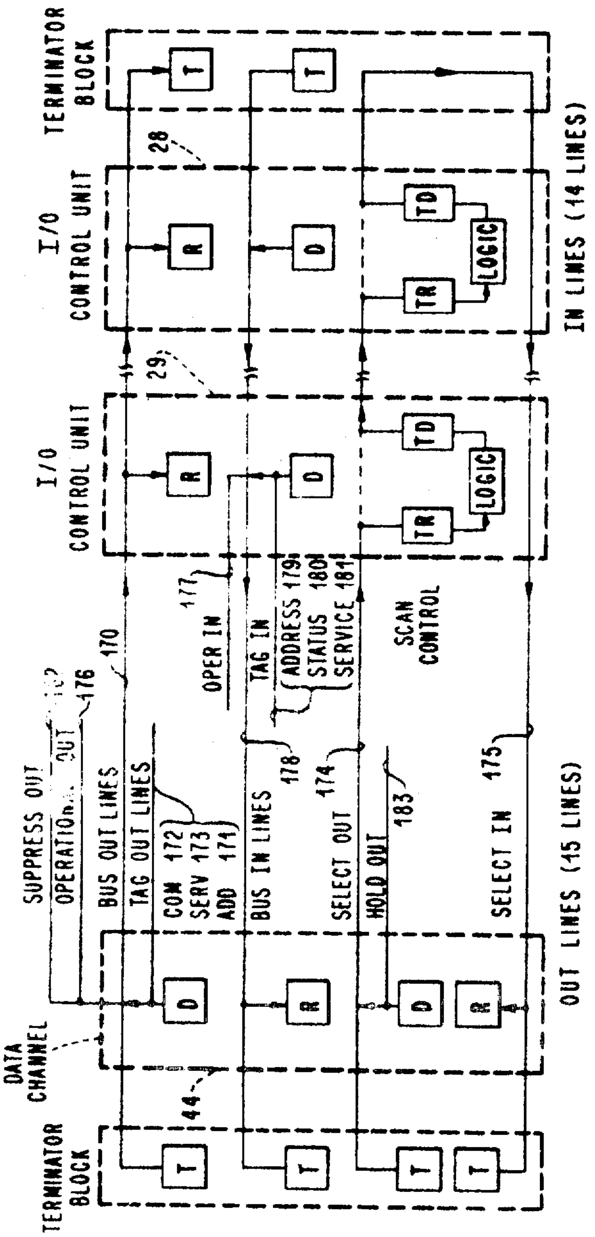

FIG. 11 is an electrical schematic of I/O interface lines.

Figure 12:
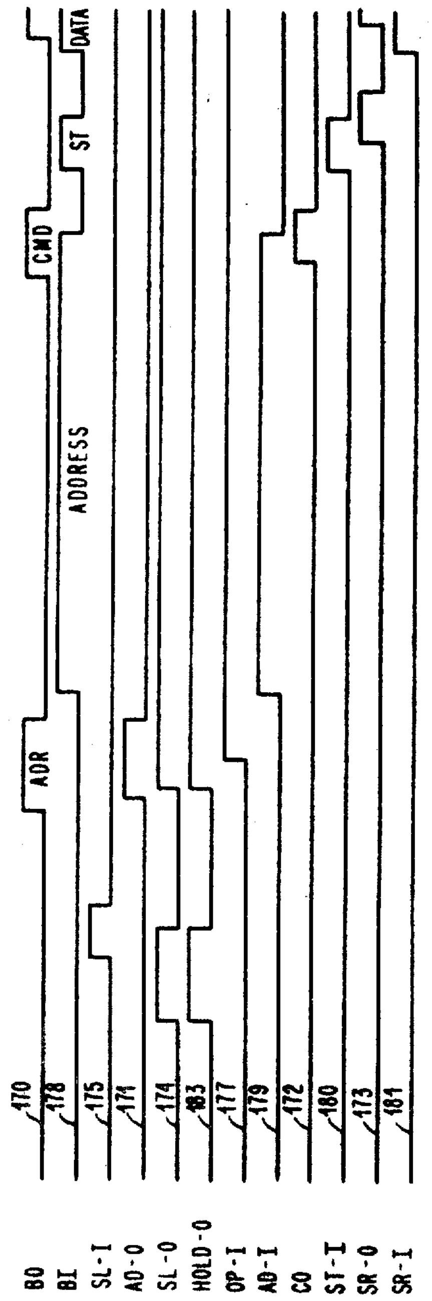

FIG. 12 indicates signal levels on FIG. 11 lines operating in response to a CPU instruction.

Figure 12A:
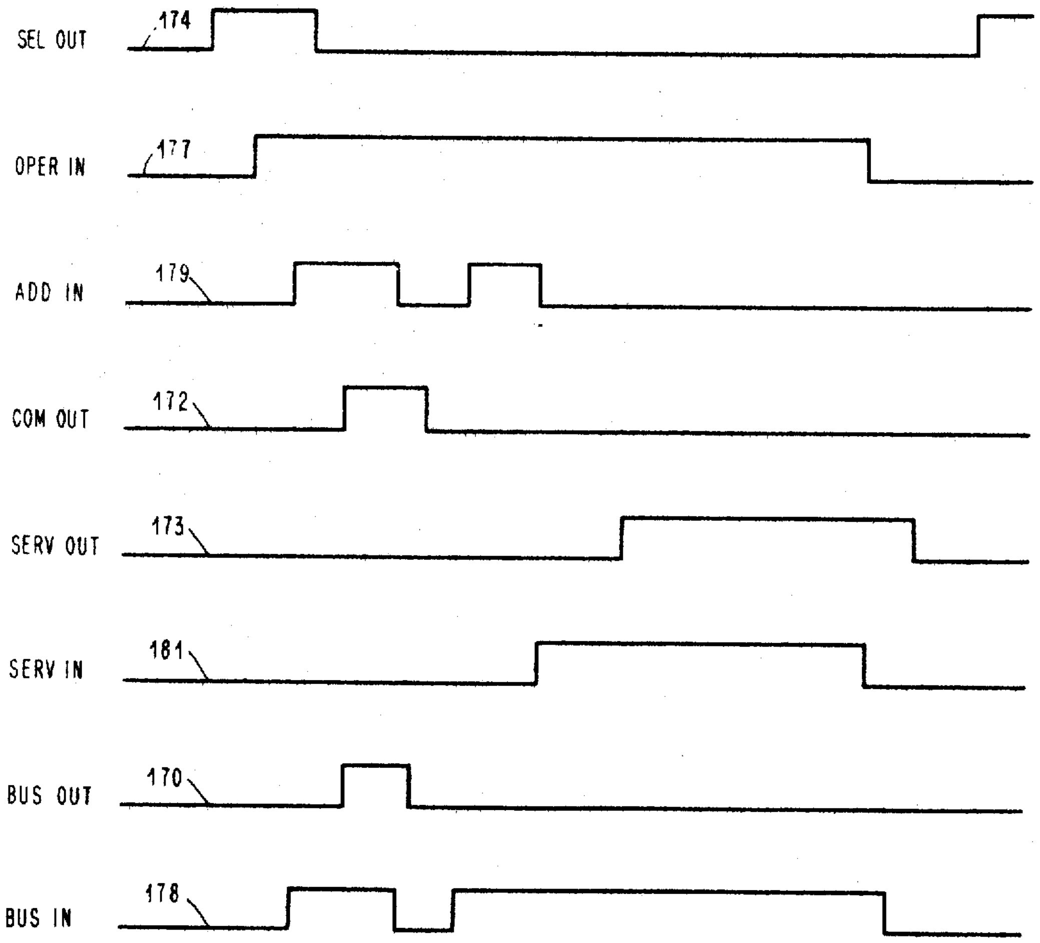

FIG. 12A indicates signal levels on FIG. 11 lines when an I/O device initiates a data transfer.

Figure 13A:
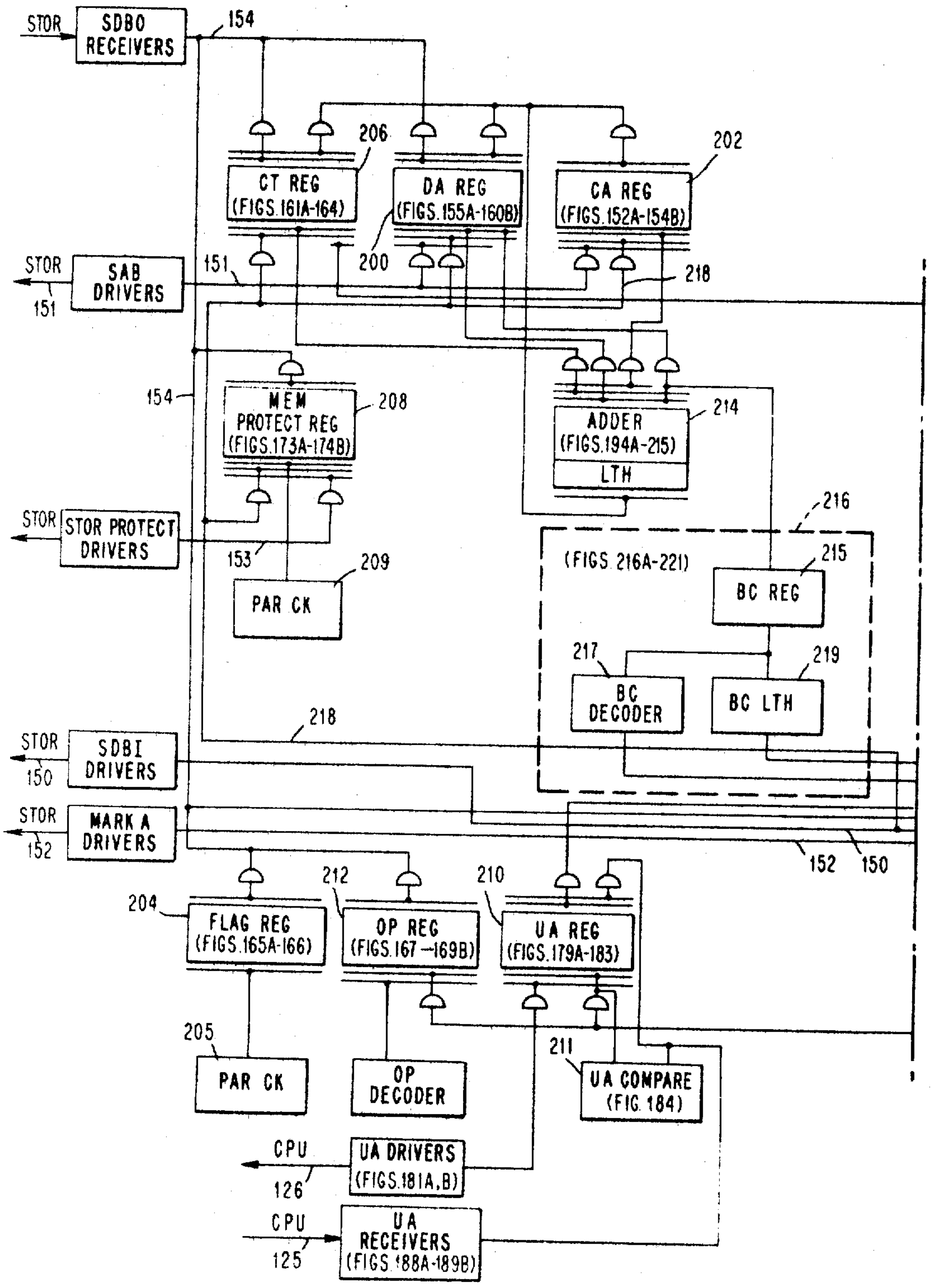
Figure 13B:
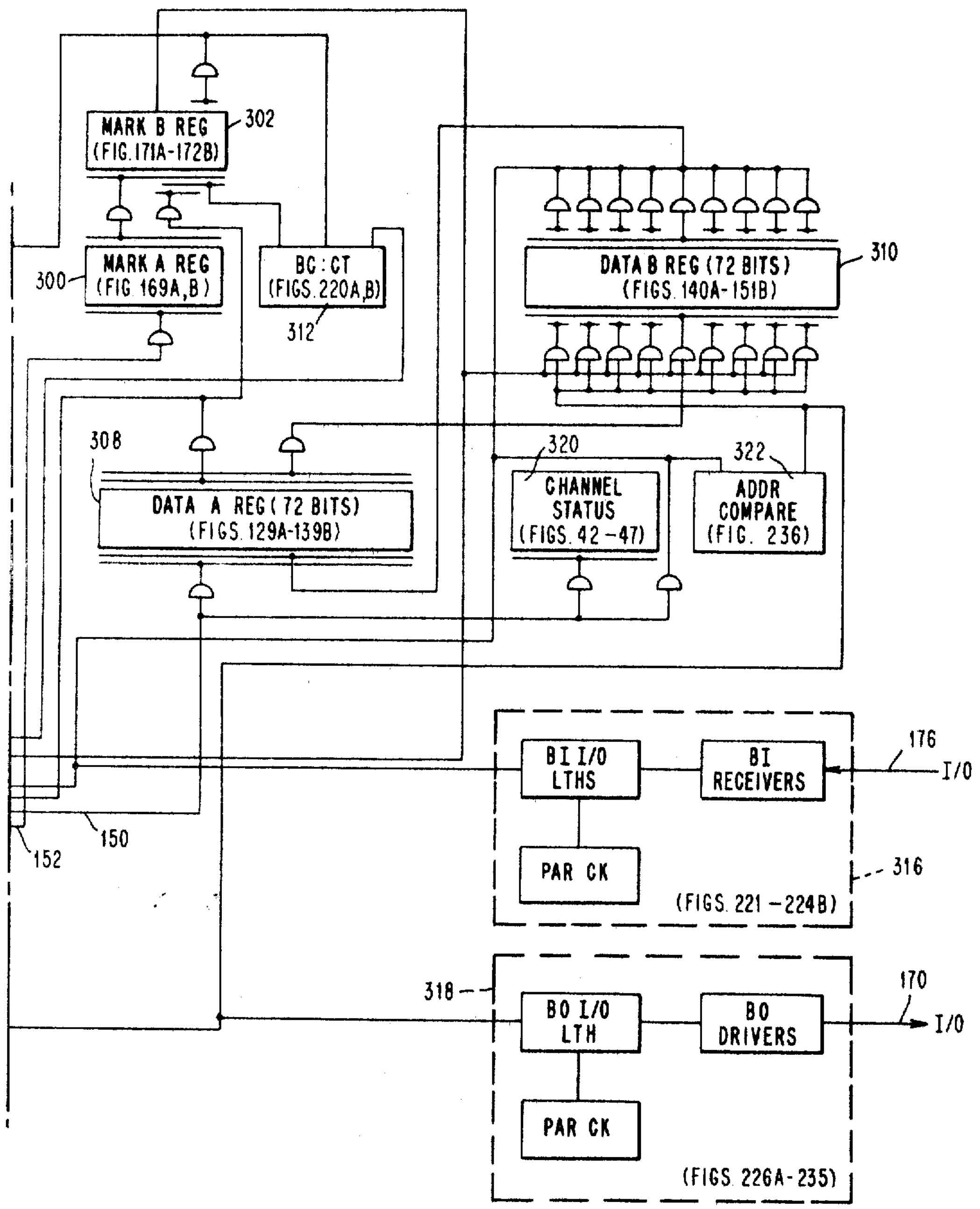

FIGS. 13A and 13B are an electrical schematic of data flow in the present invention.

FIGS. 14A through 14G are block diagrams of various control circuits for interface operation, command execution, data transfer and terminating.

Figure 15:
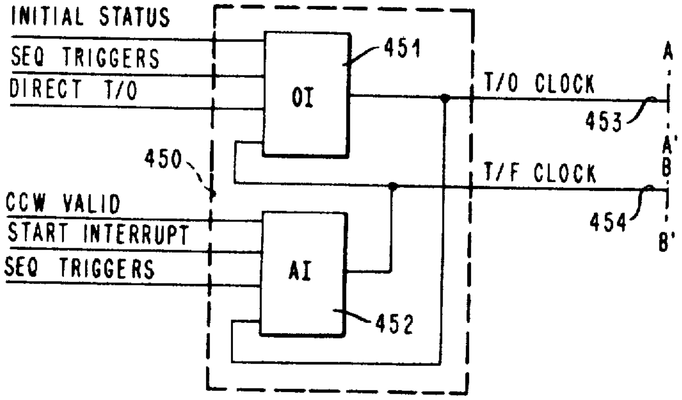

FIG. 15 is an electrical schematic of a latch employed in the present invention.

Figure 15B:
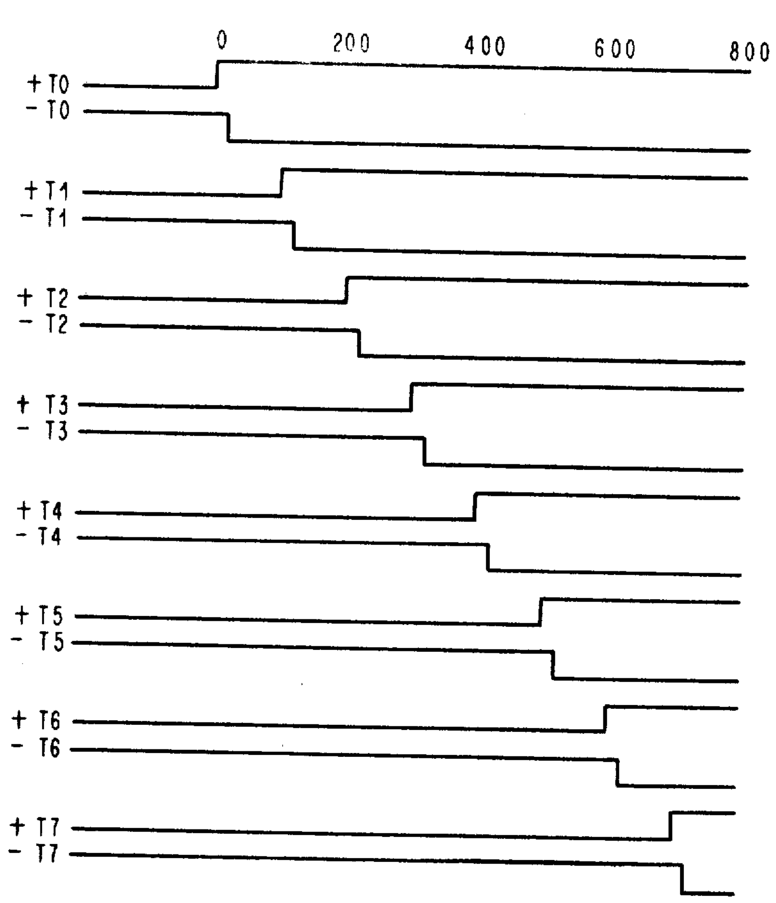
Figure 15C:
Figure 15A:
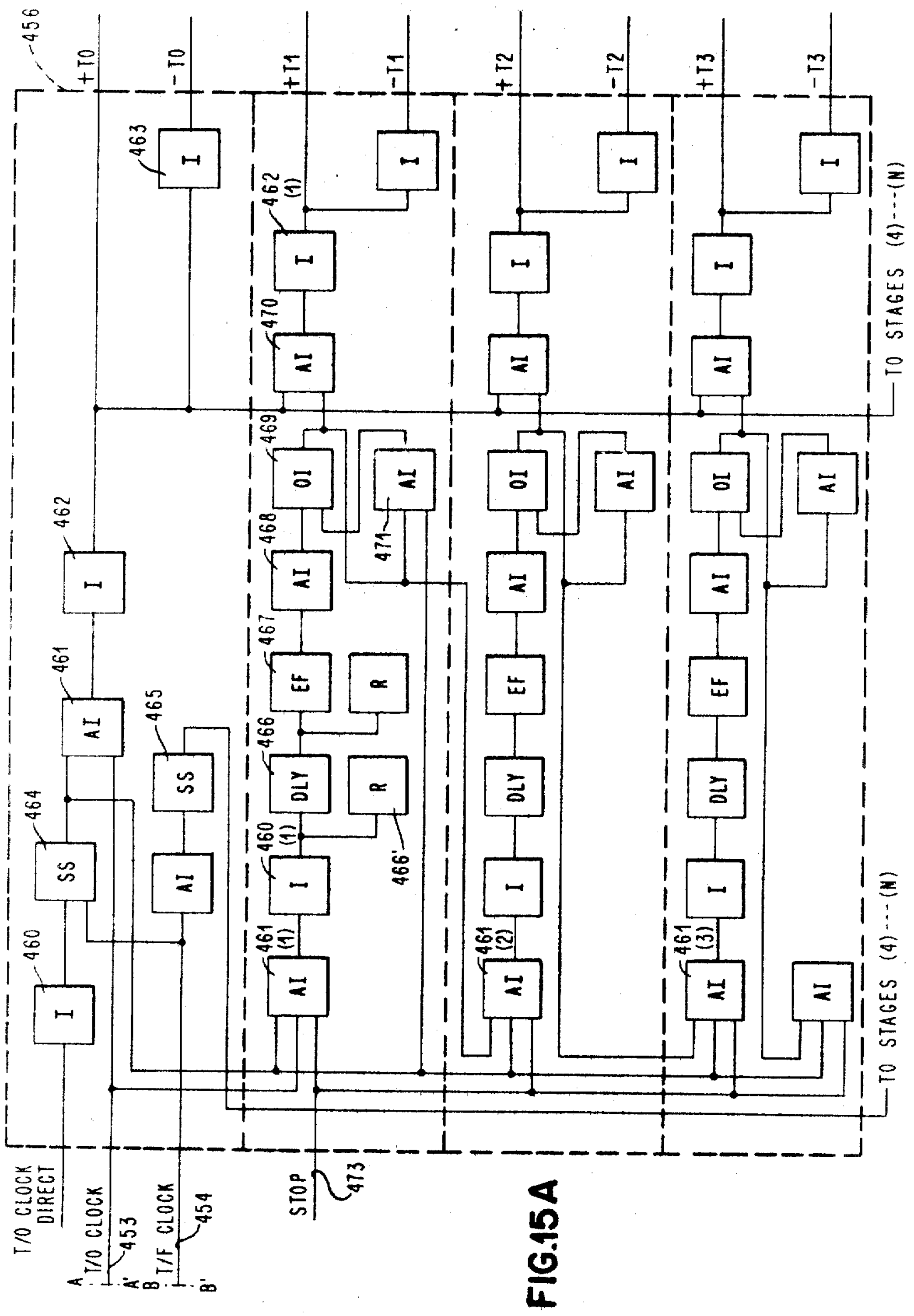

FIG. 15A is an electrical schematic of a clock employed in the present invention.

FIG. 15B is a signal level representation generated by FIG. 15A.

FIG. 15C is an output signal generated by FIG. 15A.

Figure 16:
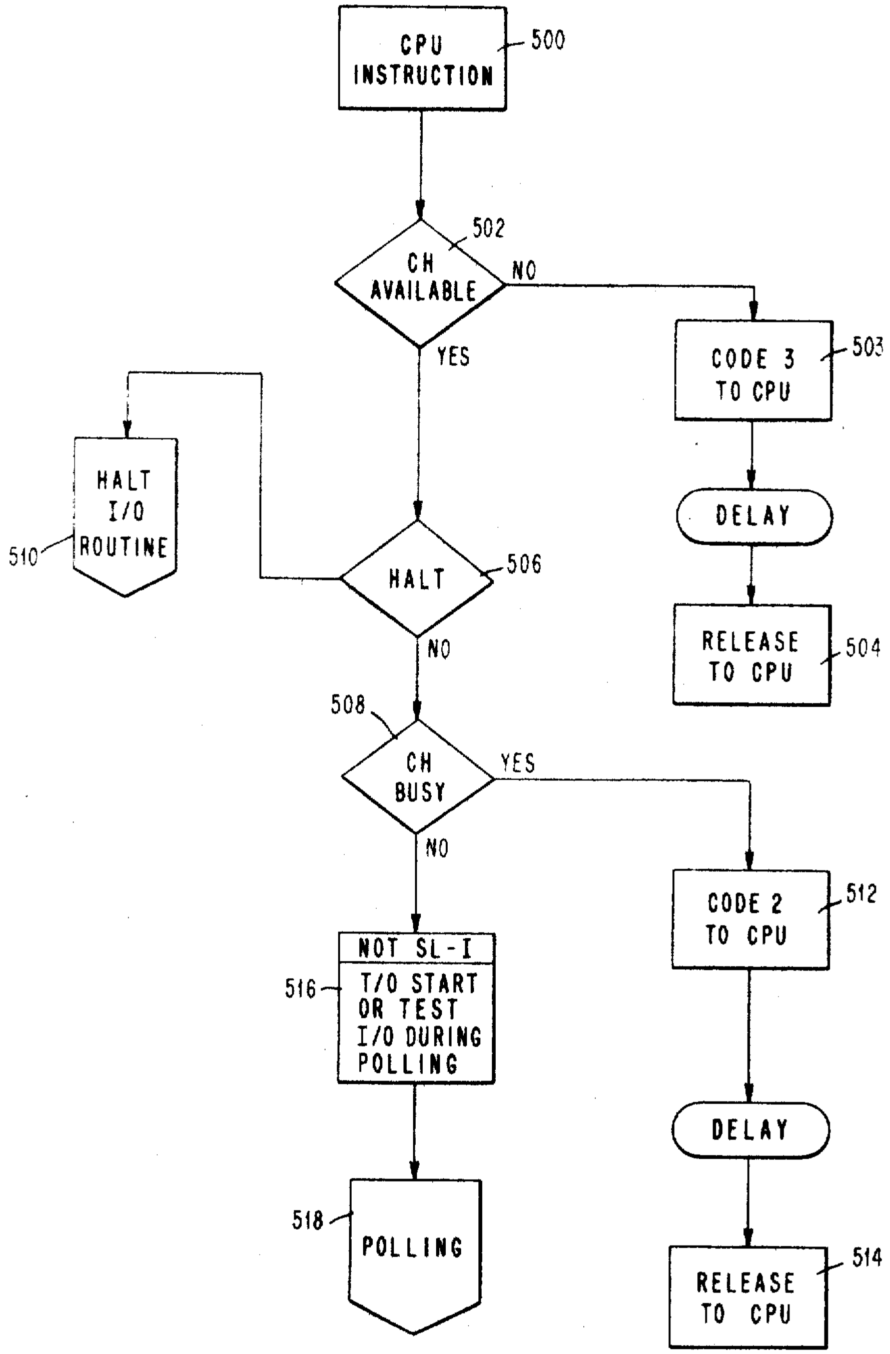
Figure 16A:
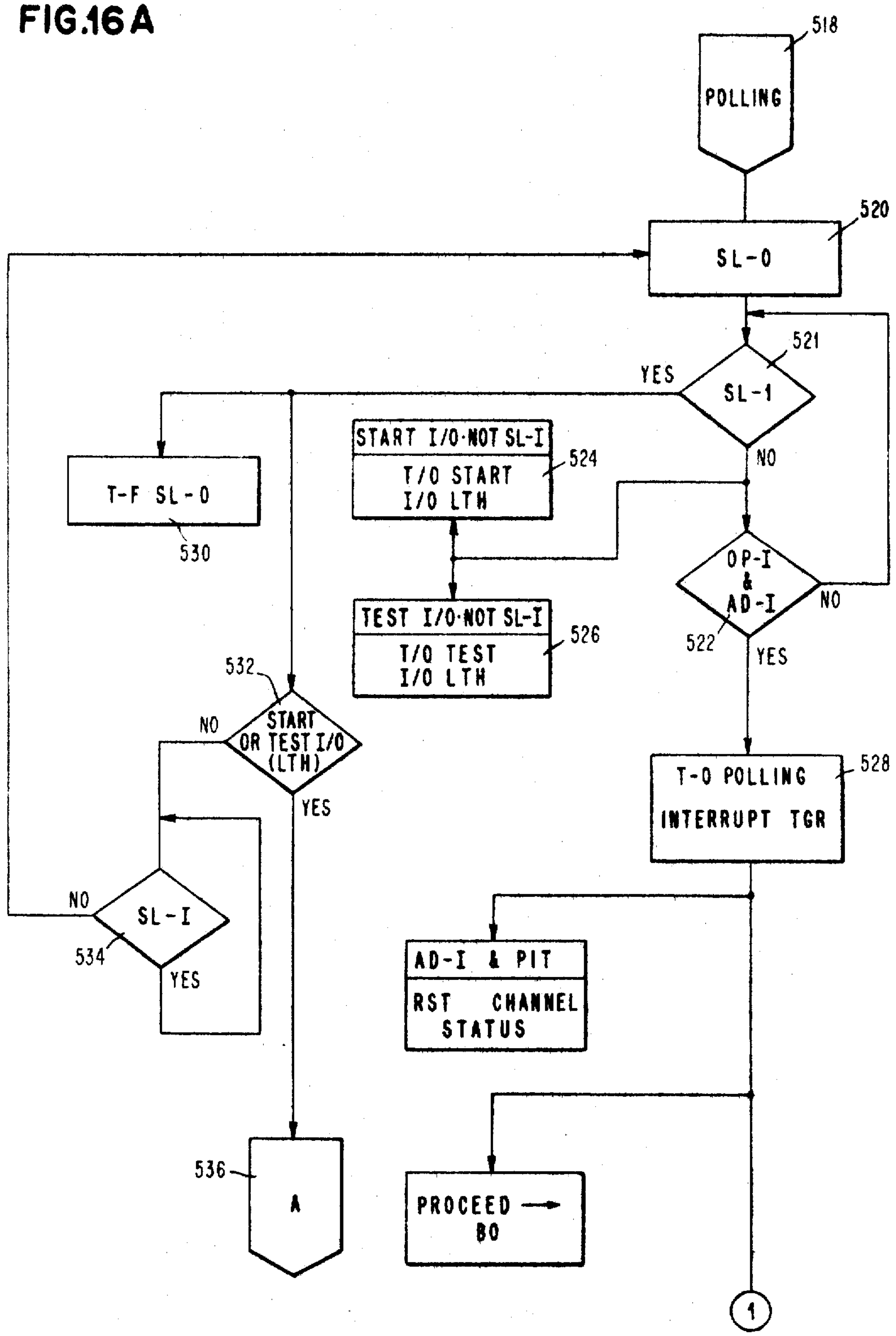
Figure 16B:
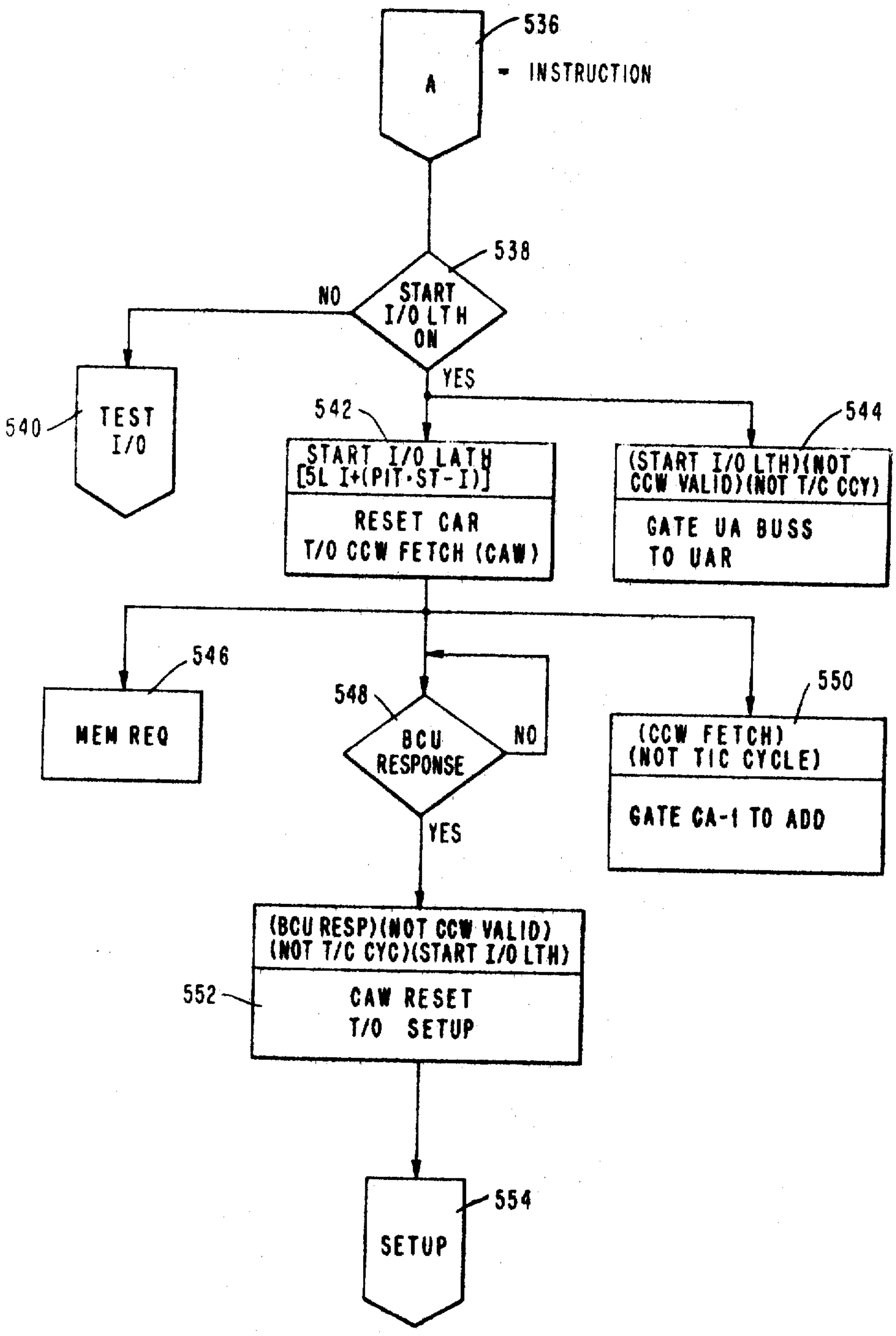
Figure 16C:
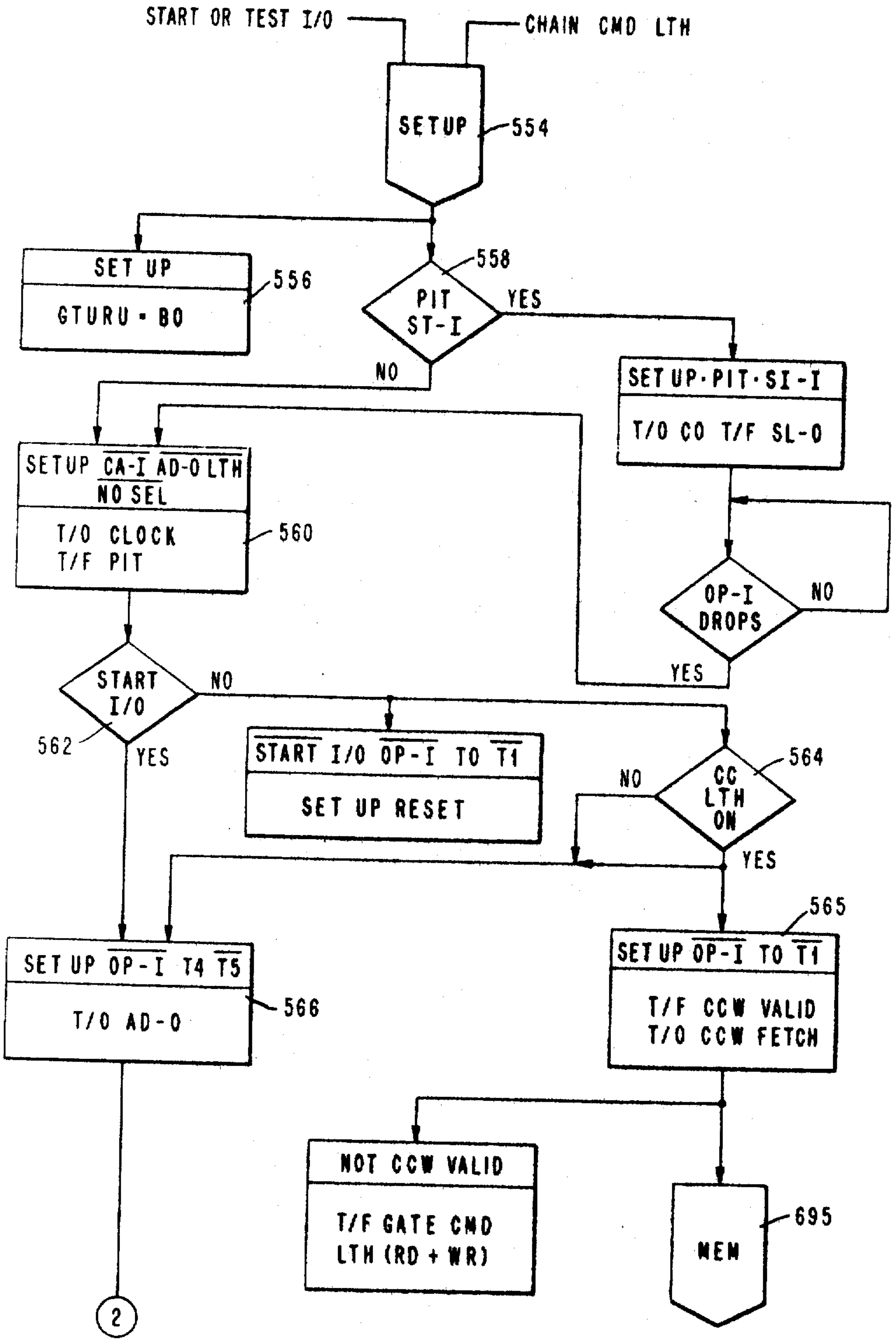
Figure 16D:
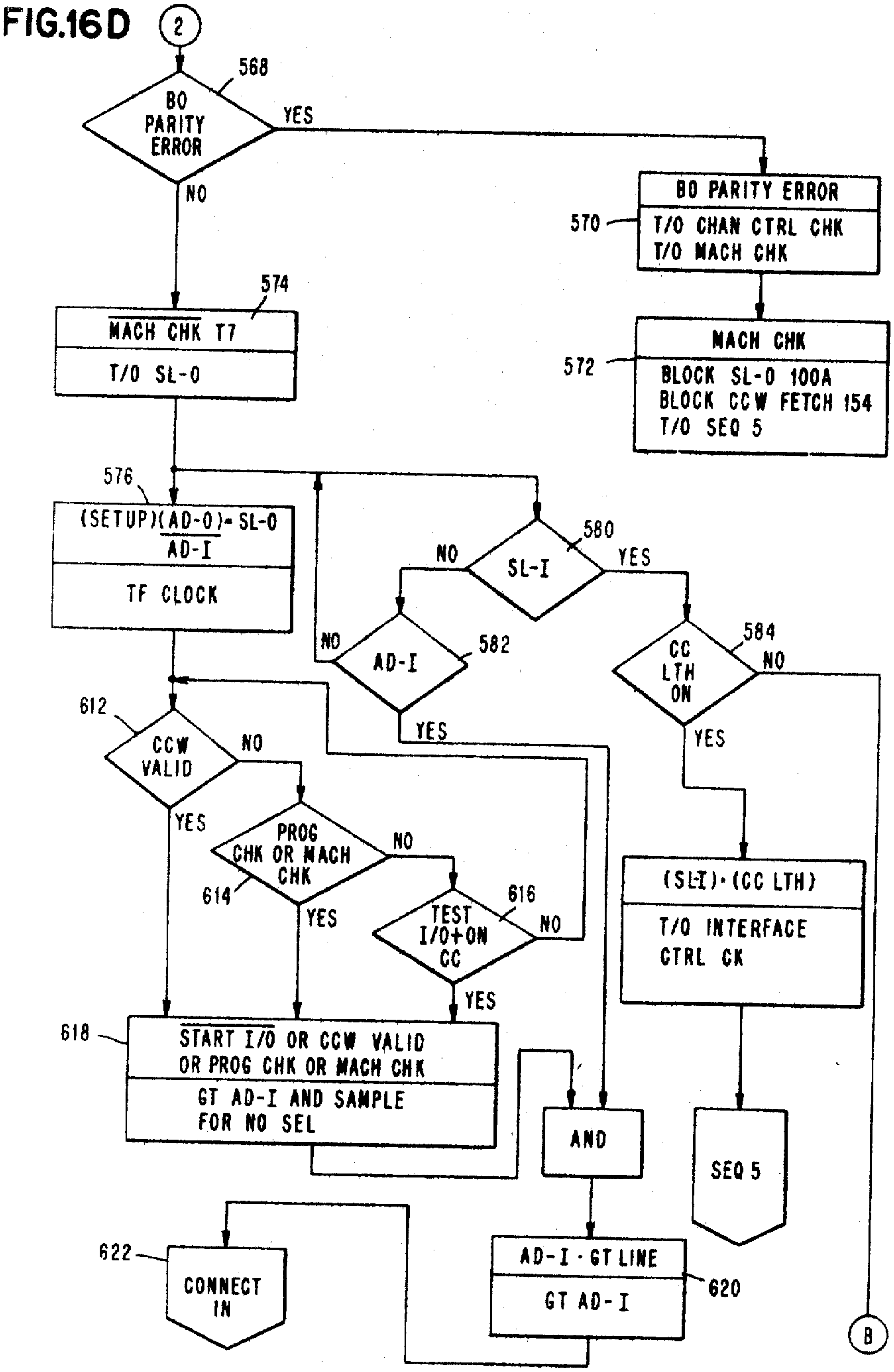
Figure 16E:
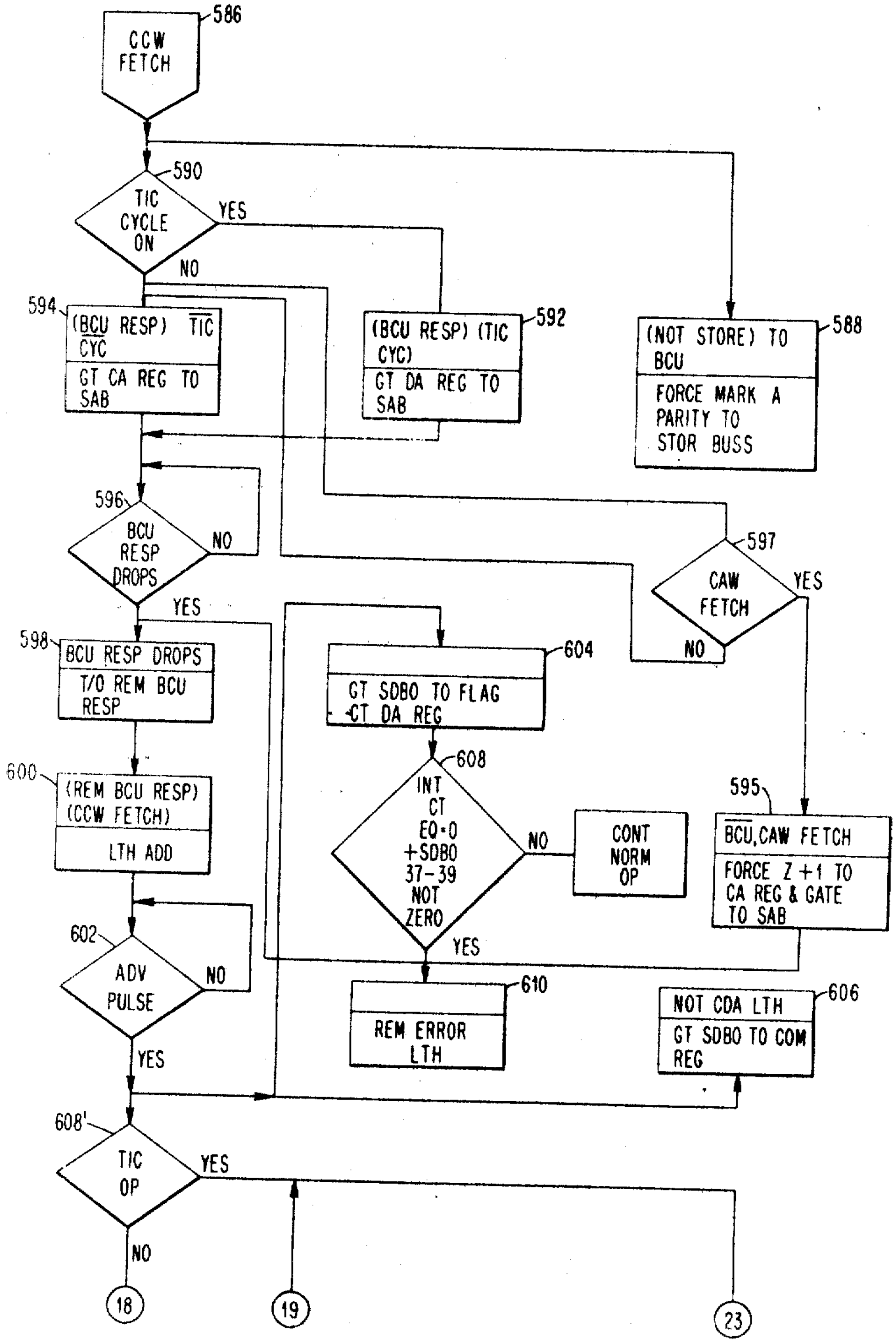
Figure 16F:
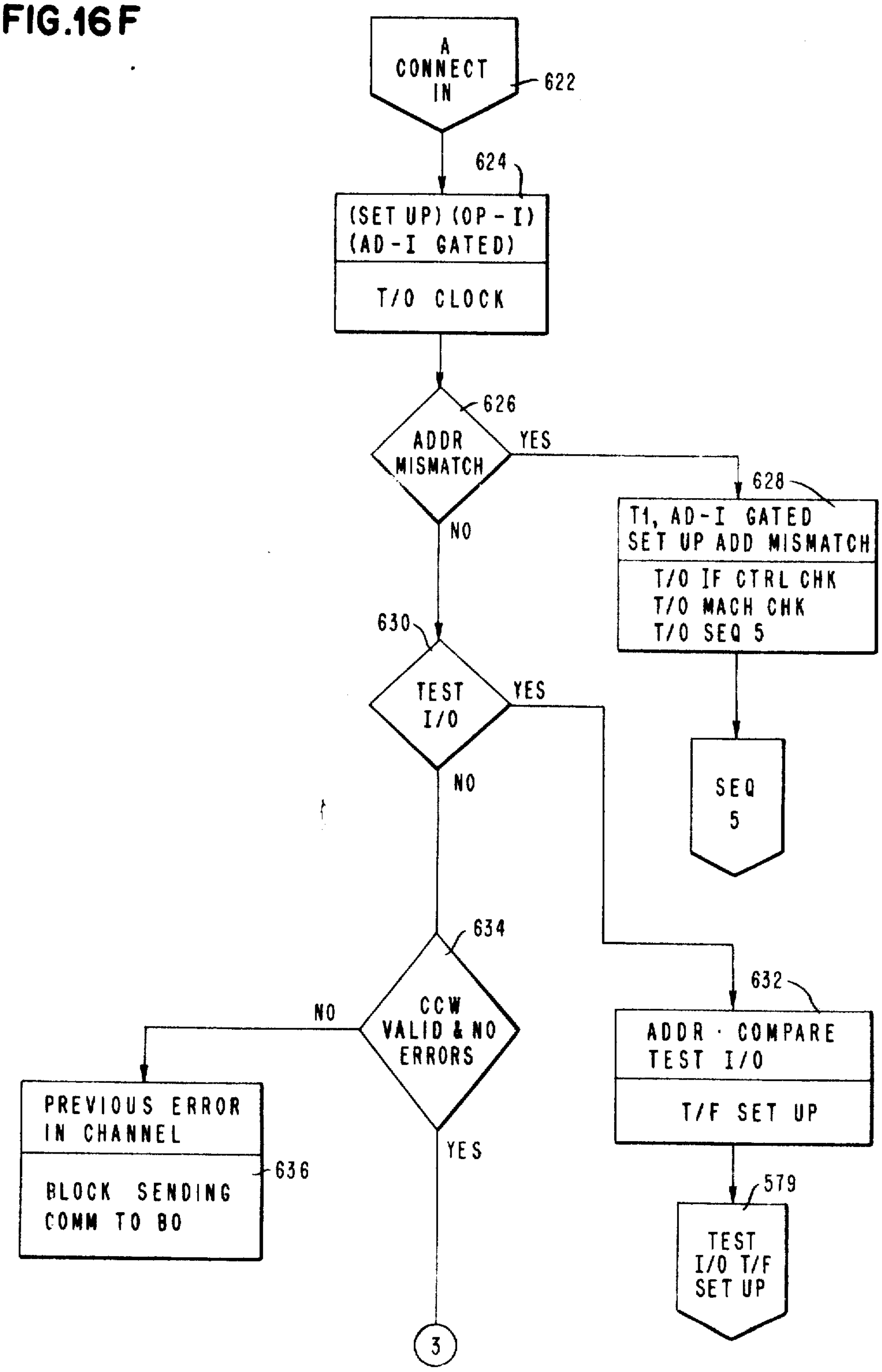
Figure 16G:
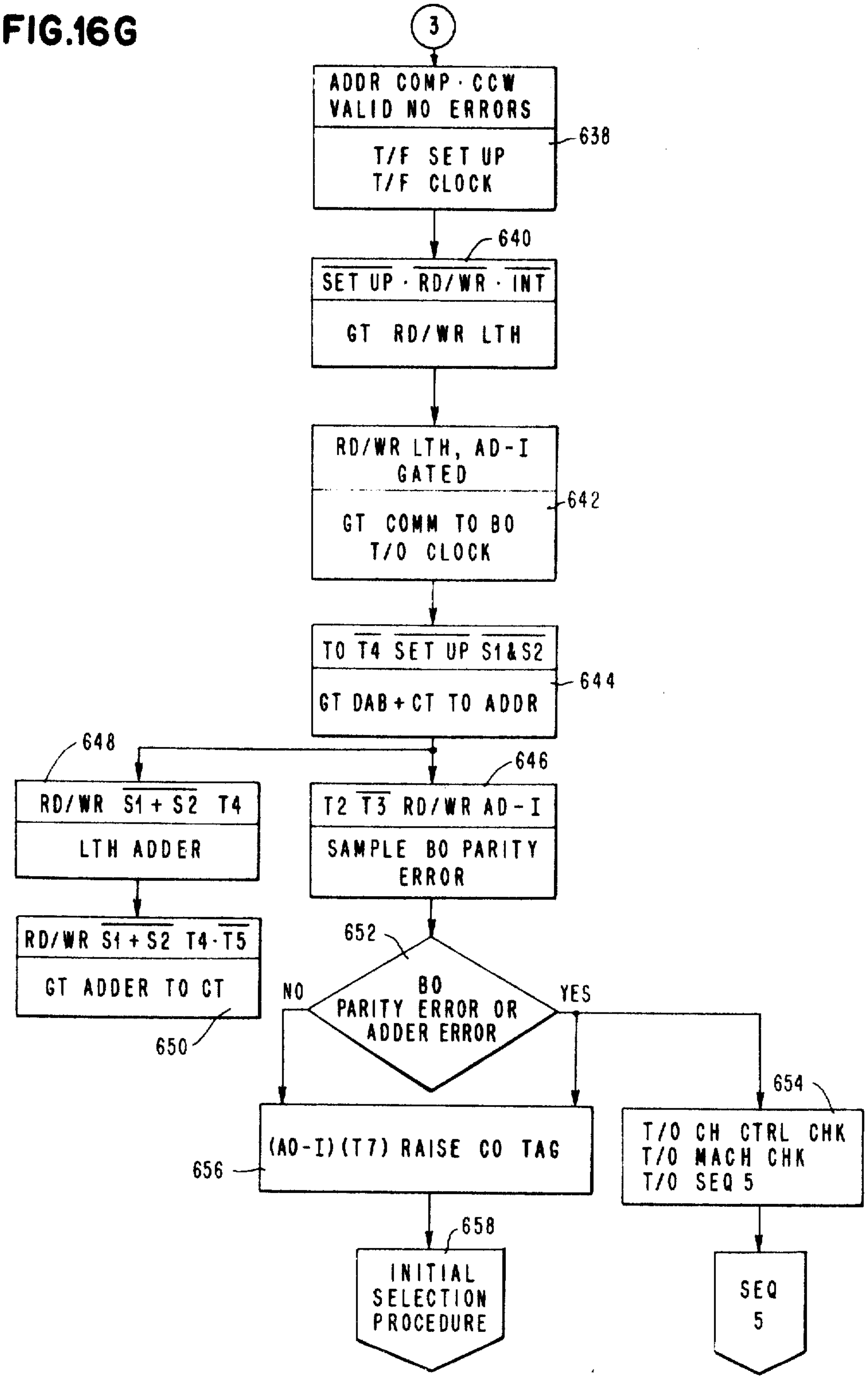
Figure 16H:
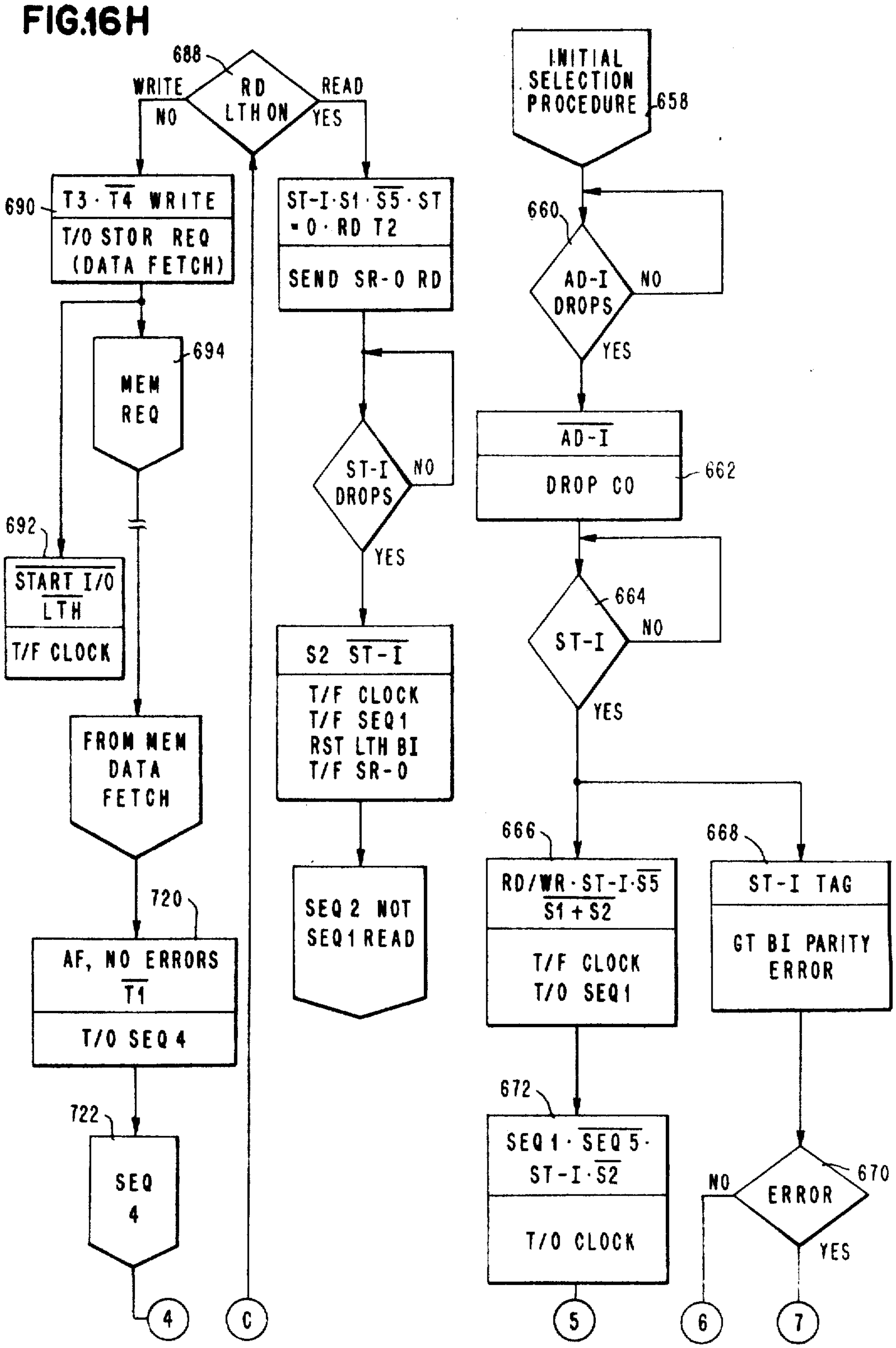
Figure 16I:
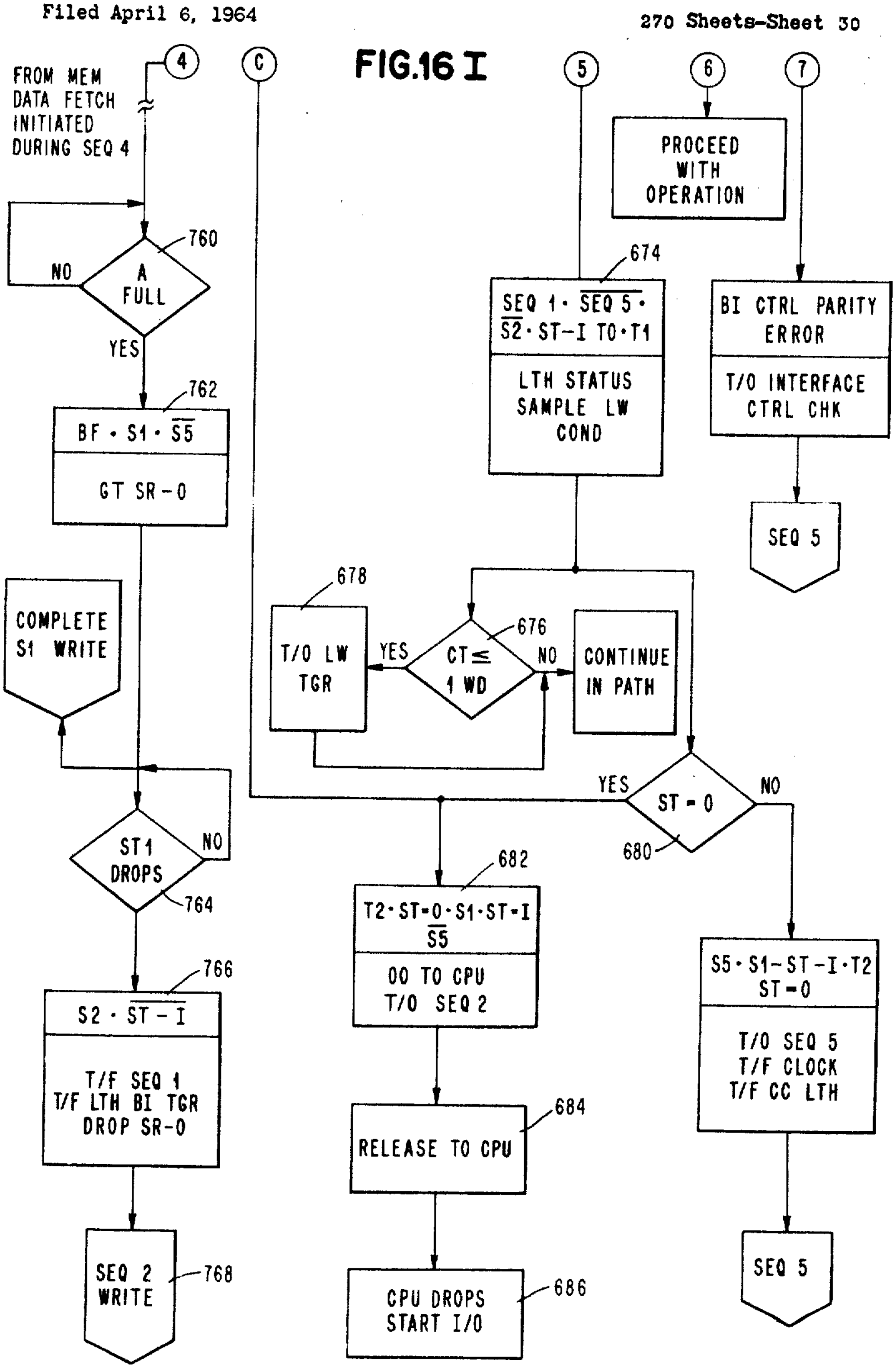
Figure 16J:
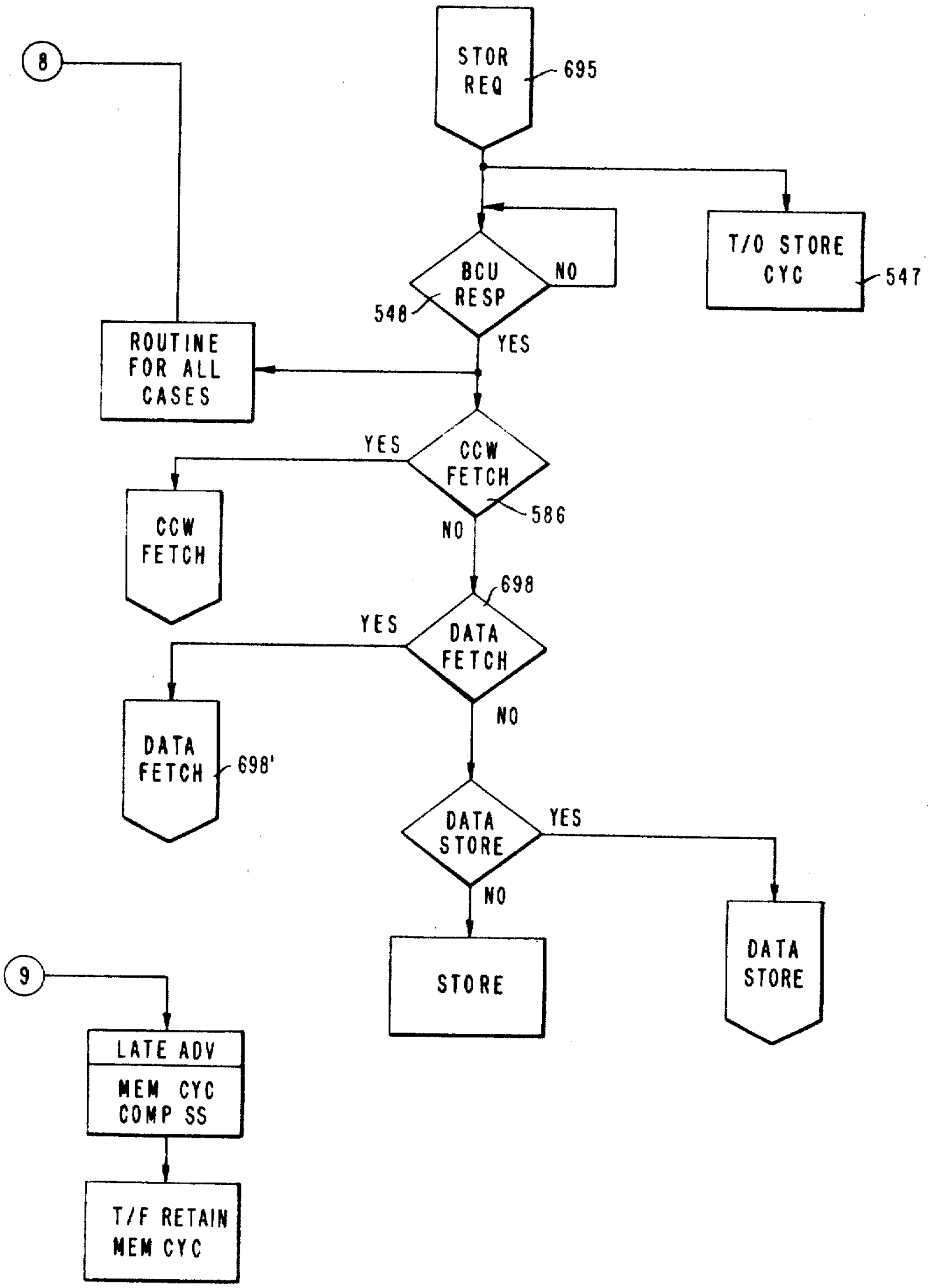
Figure 16K:
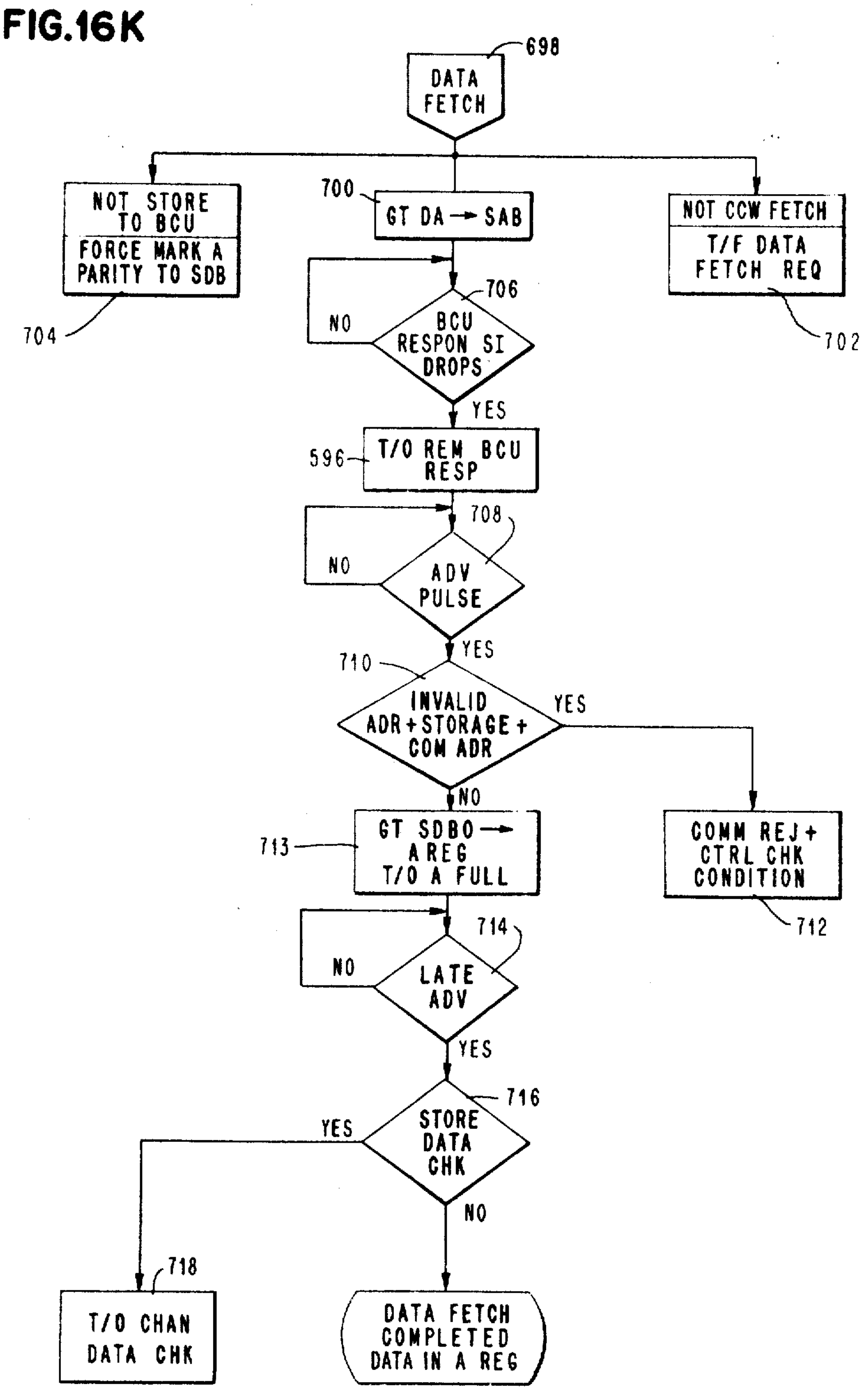
Figure 16L:
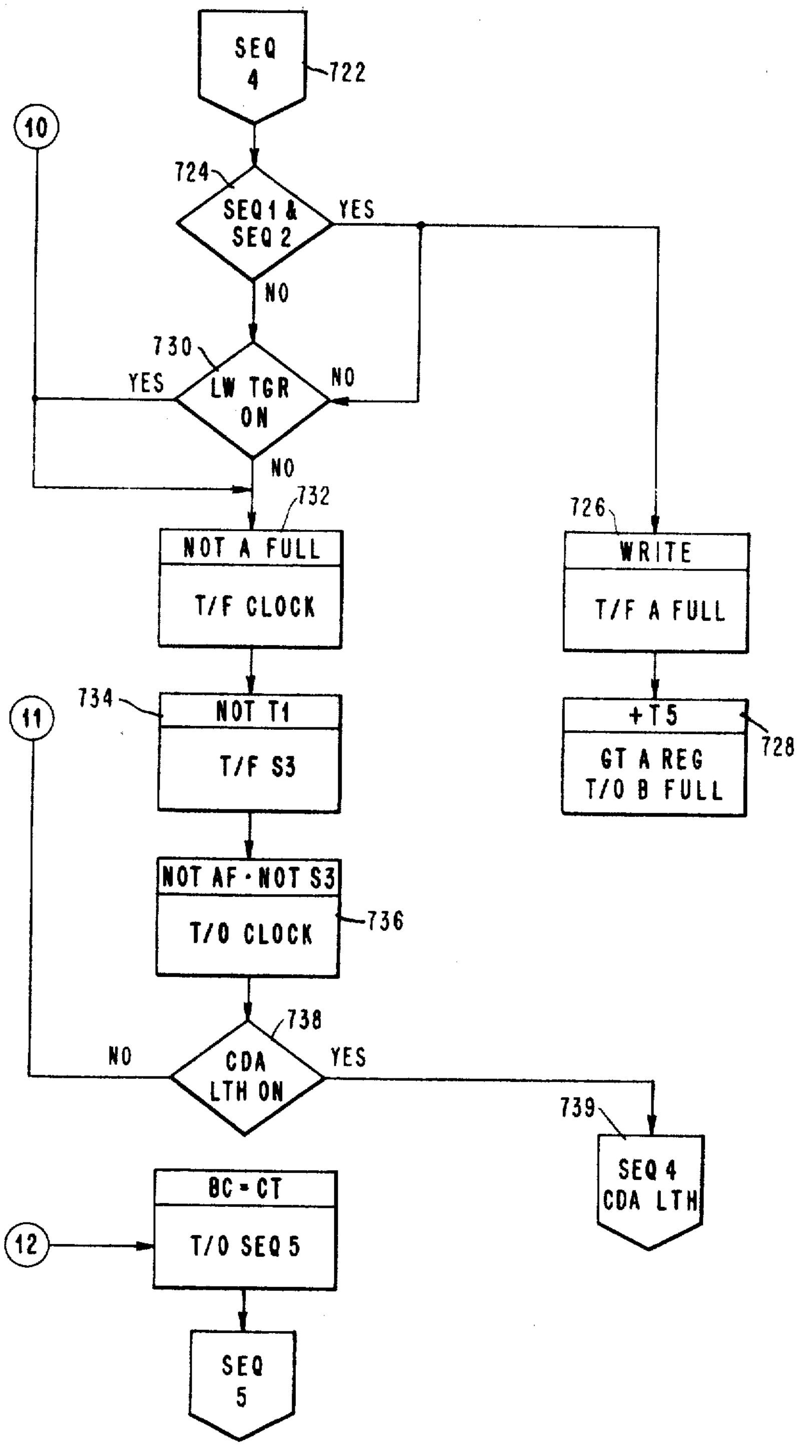
Figure 16M:
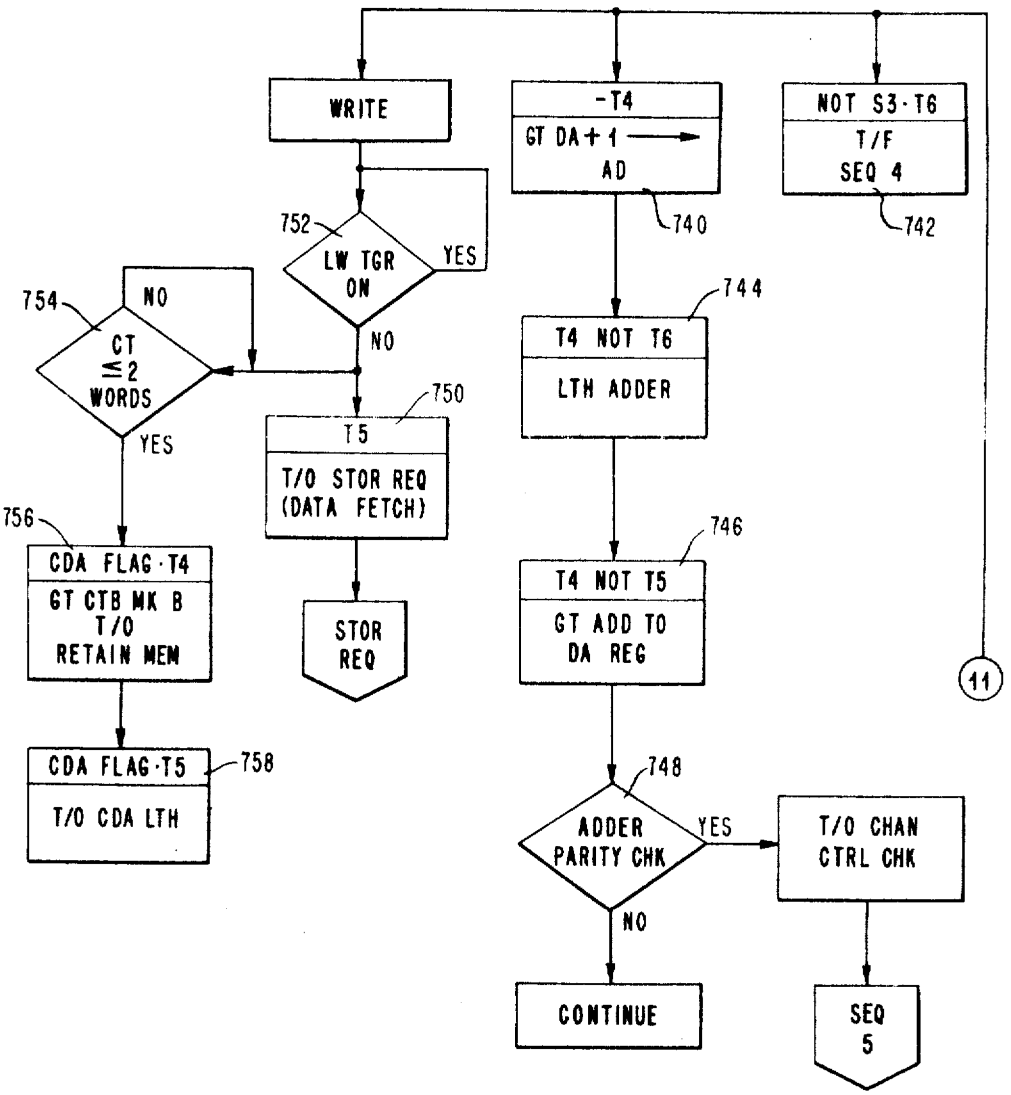
Figure 16N:
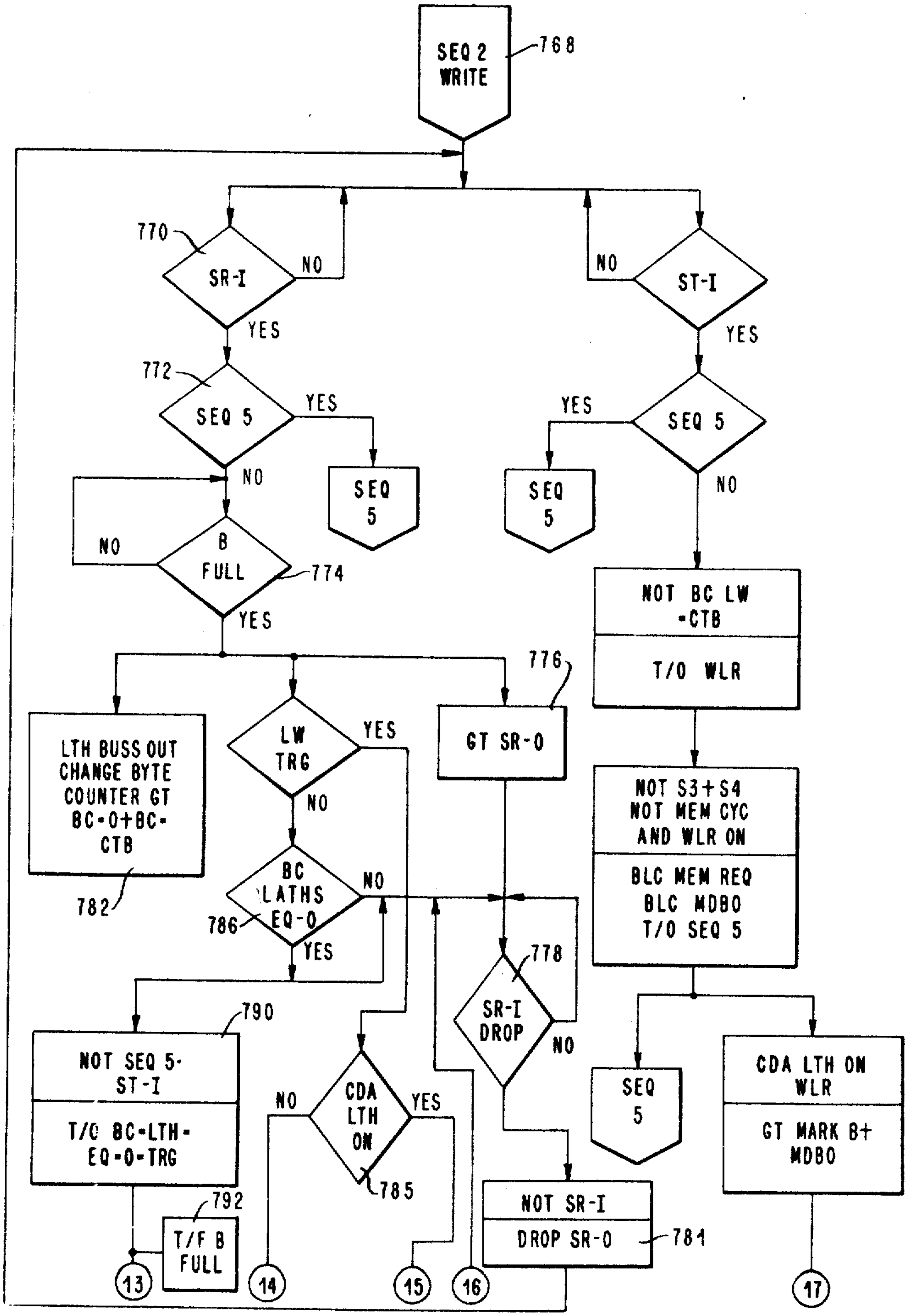
Figure 16O:
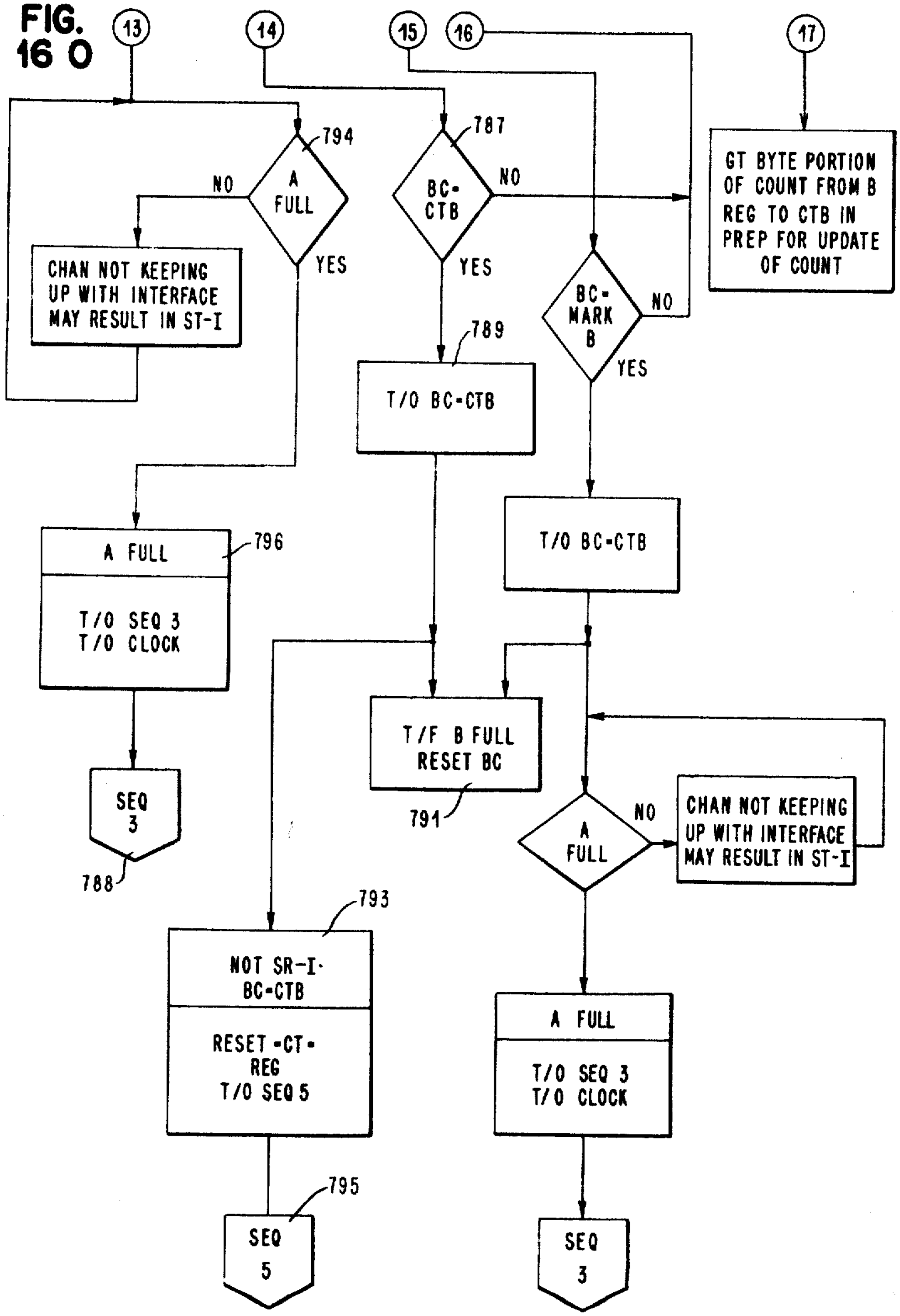
Figure 16P:
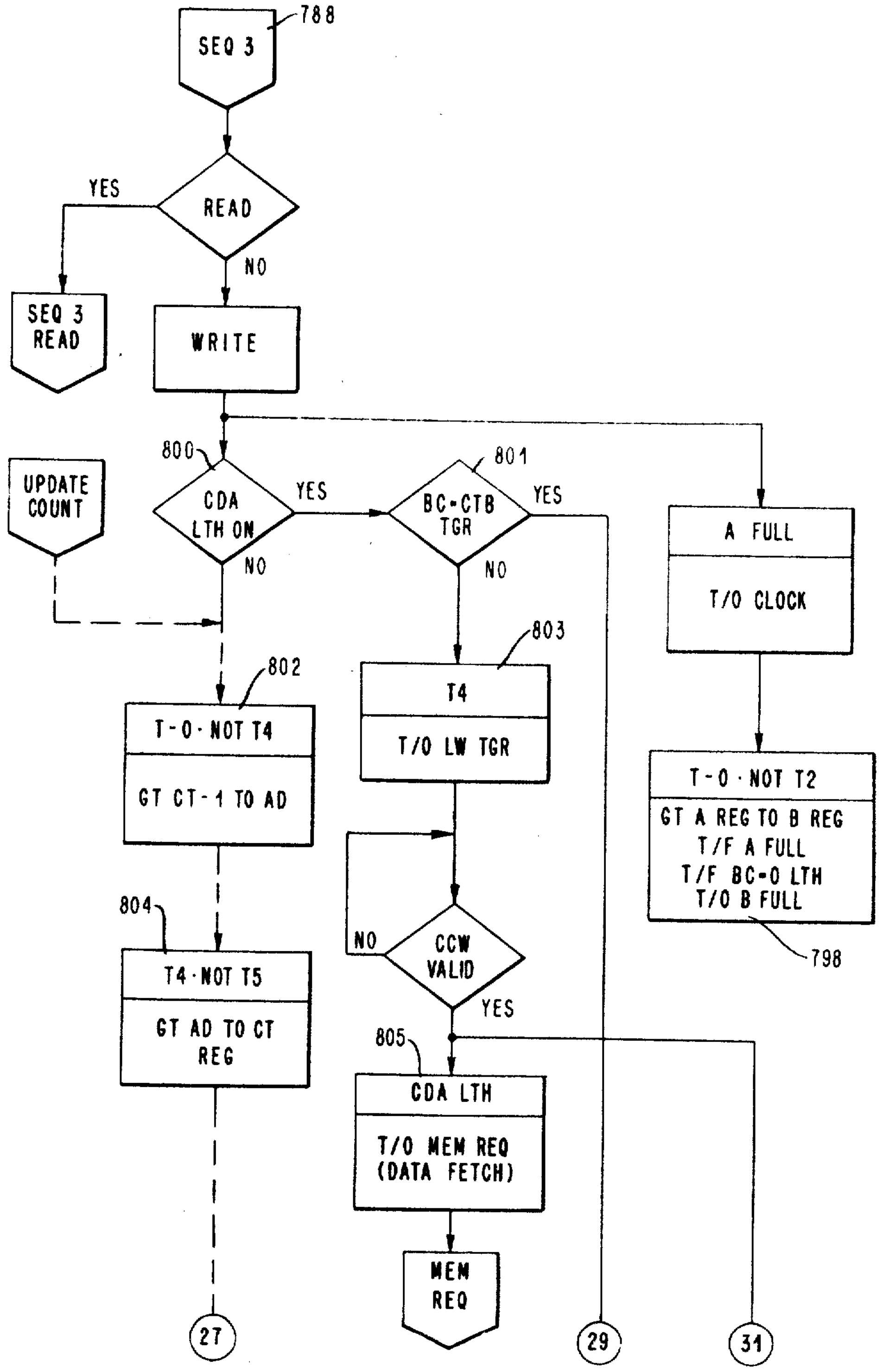
Figure 16Q:
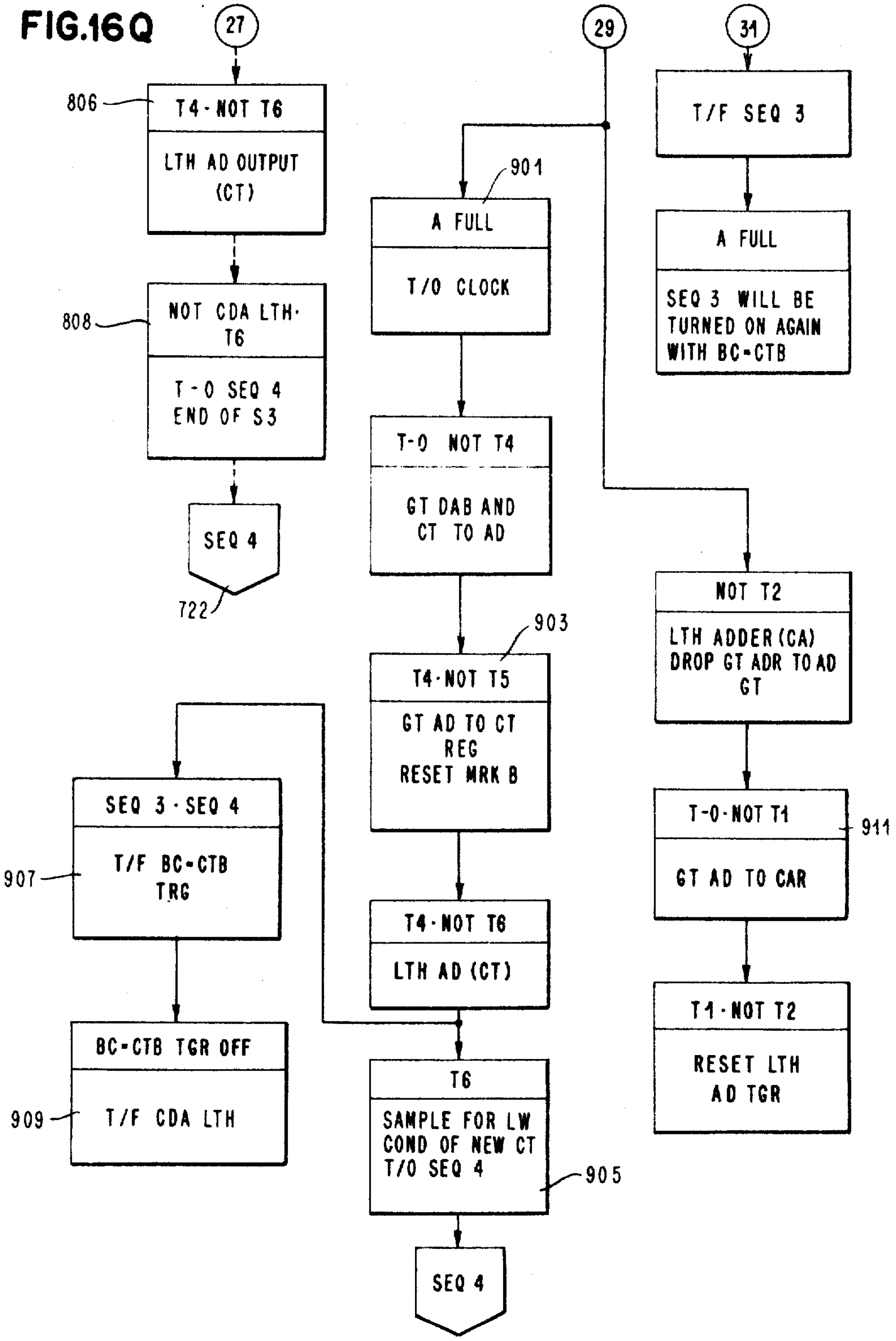
Figure 16R:
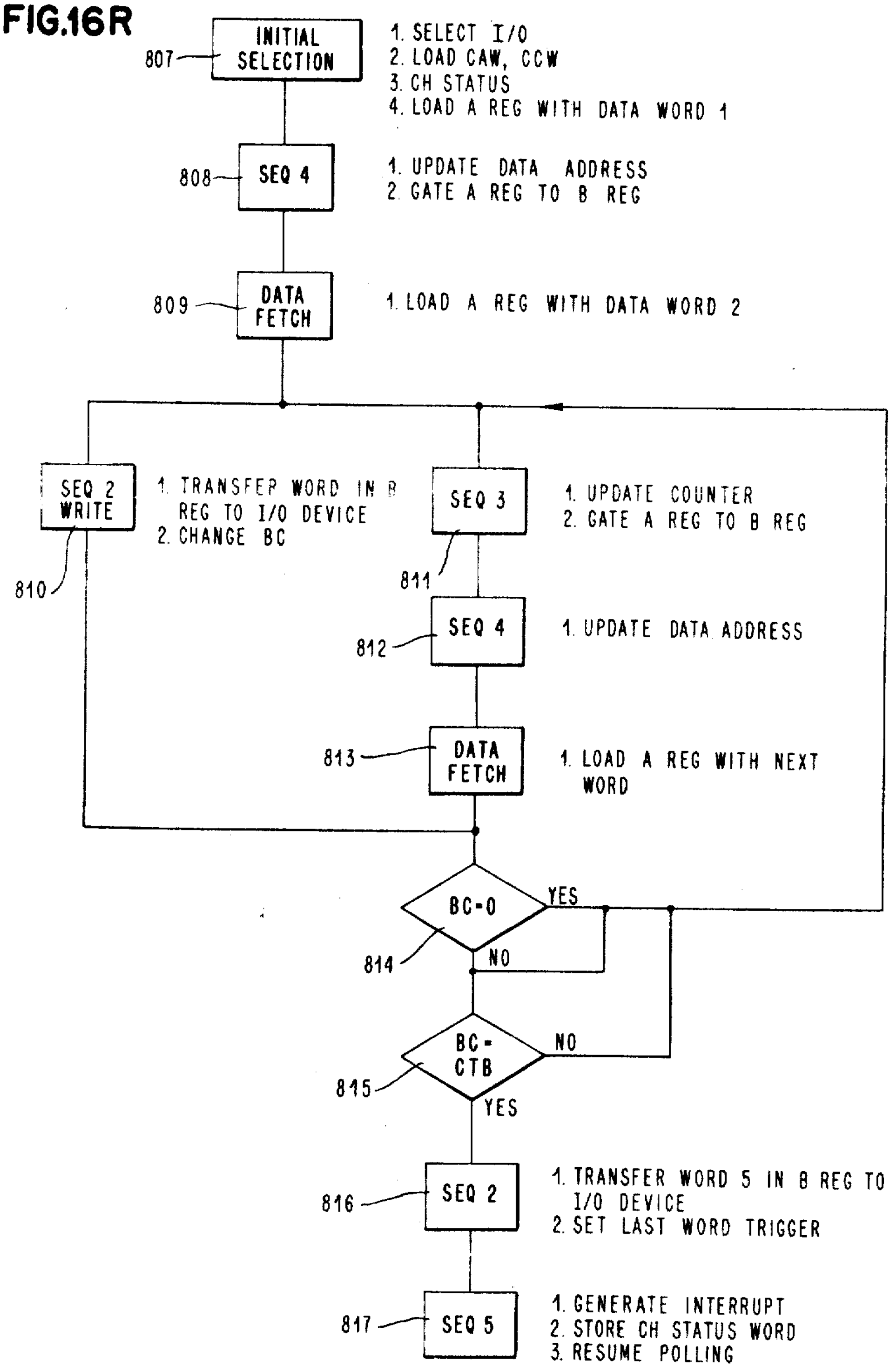
Figure 16S:
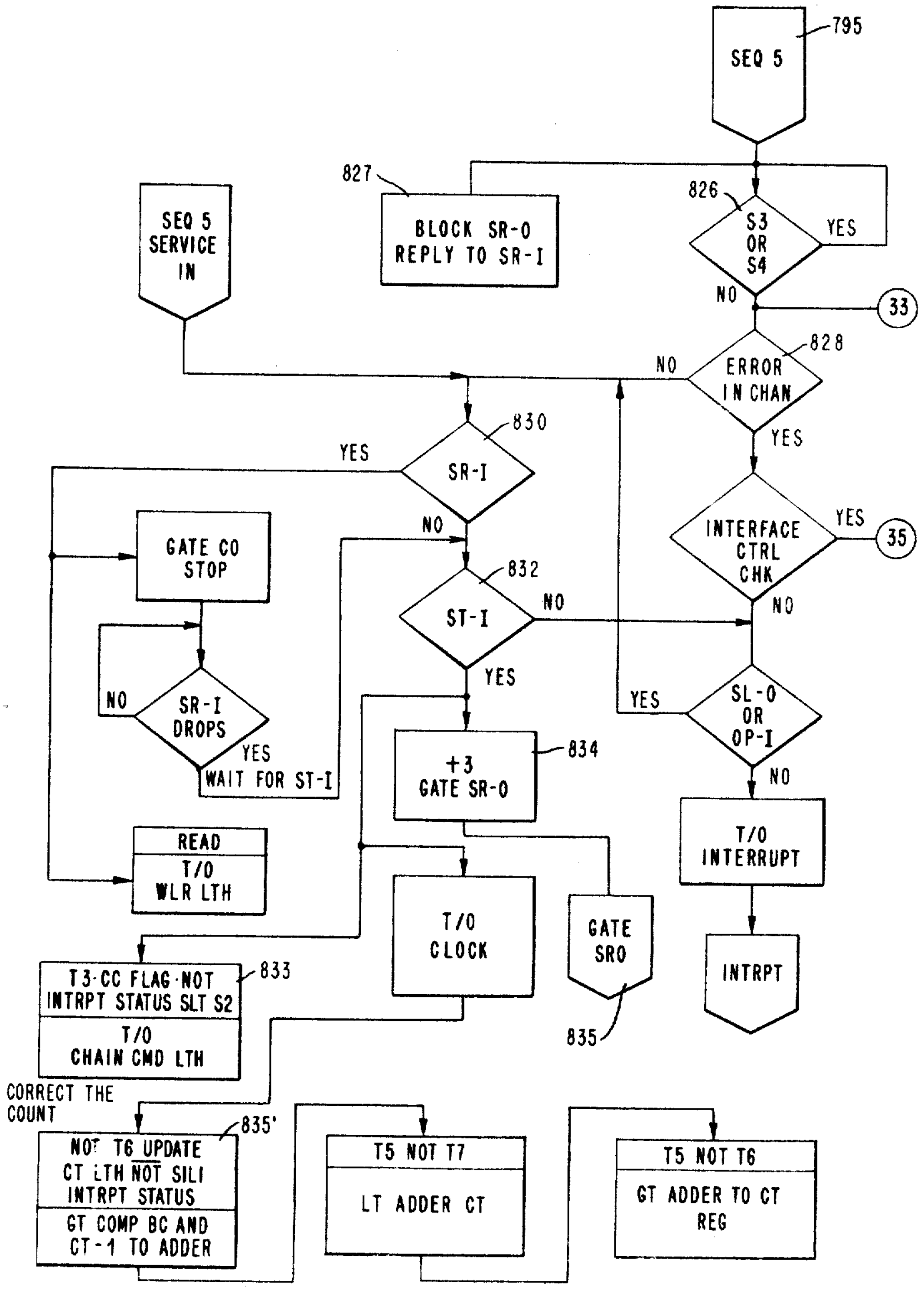
Figure 16T:
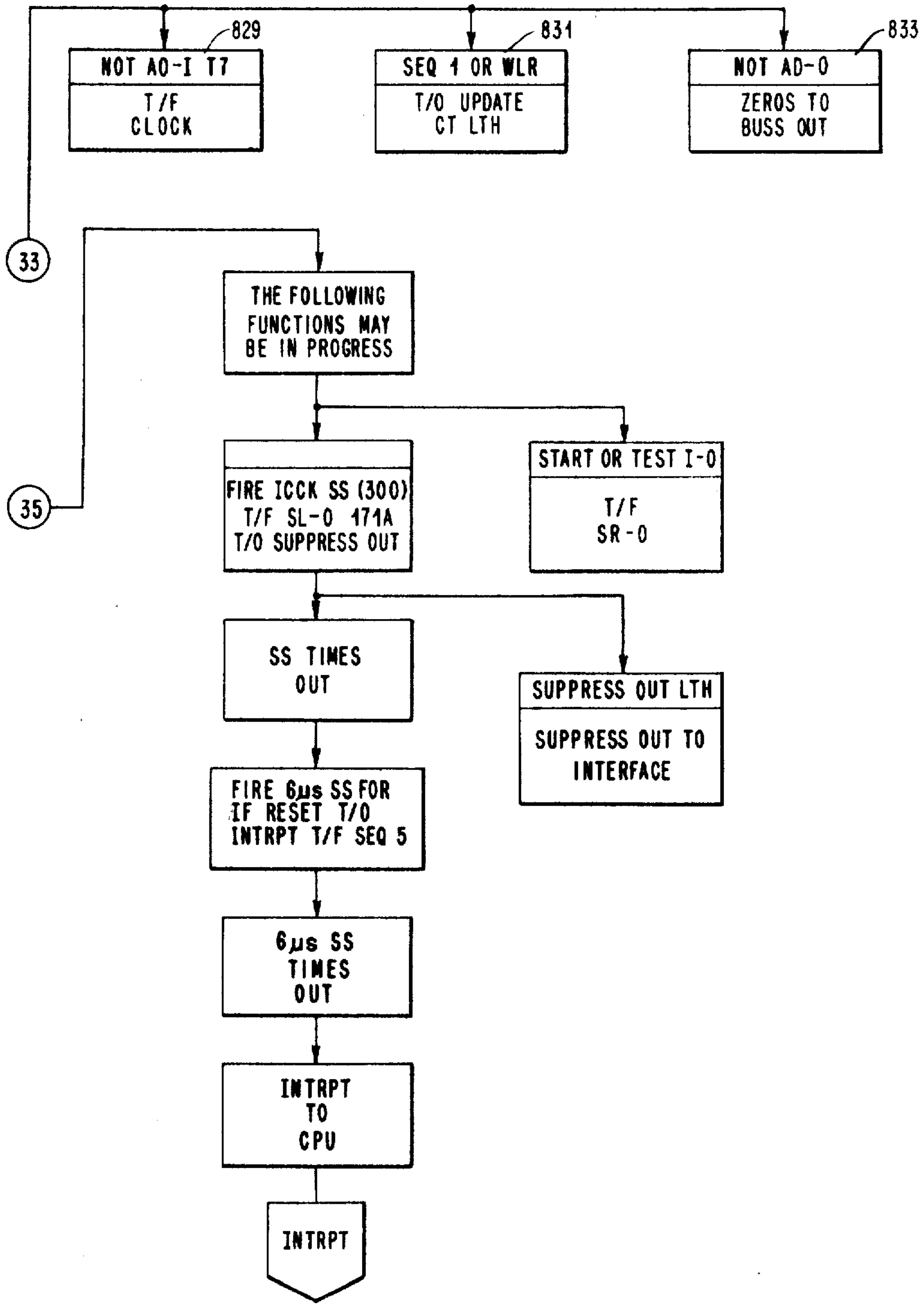
Figure 16U:
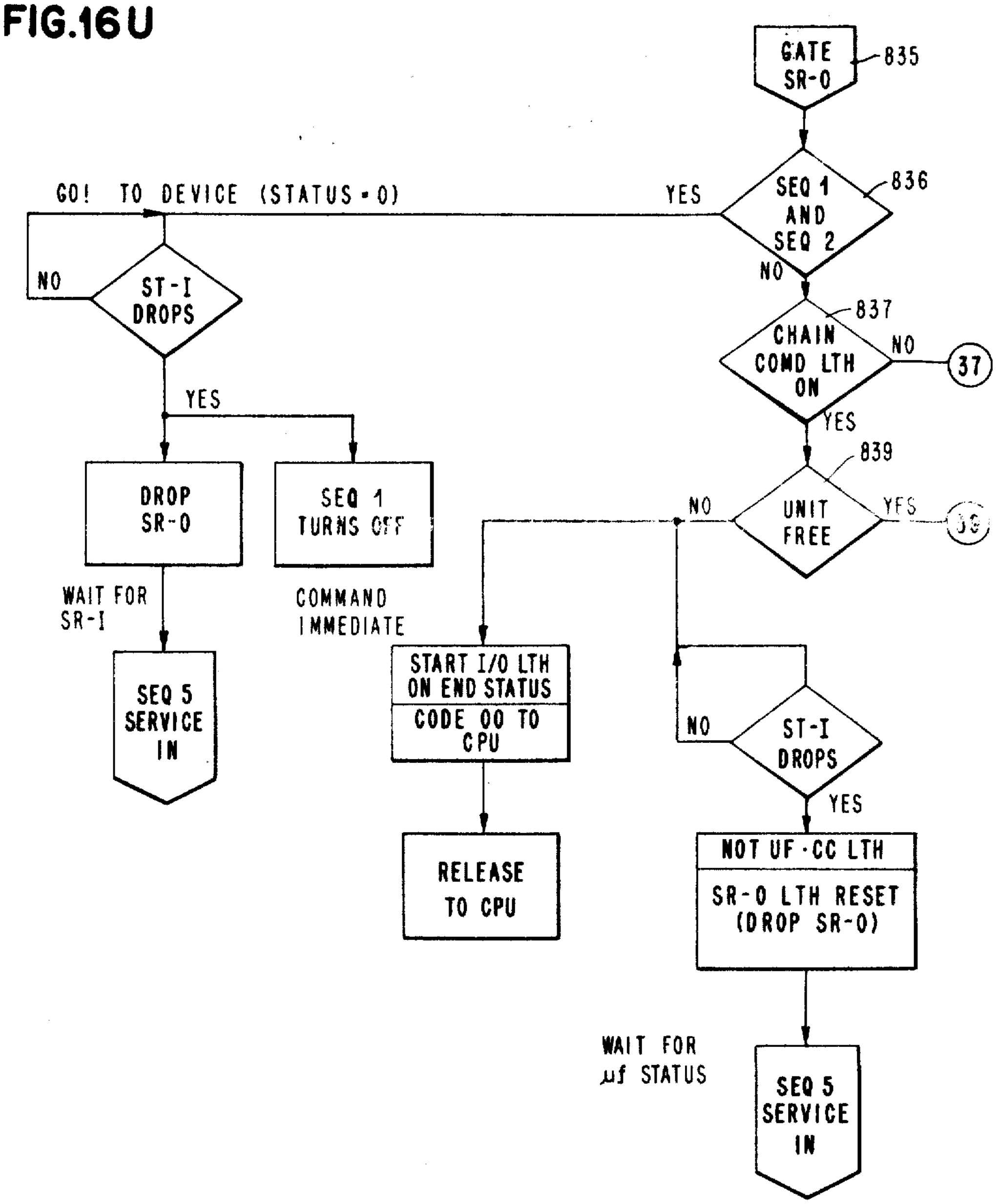
Figure 16V:
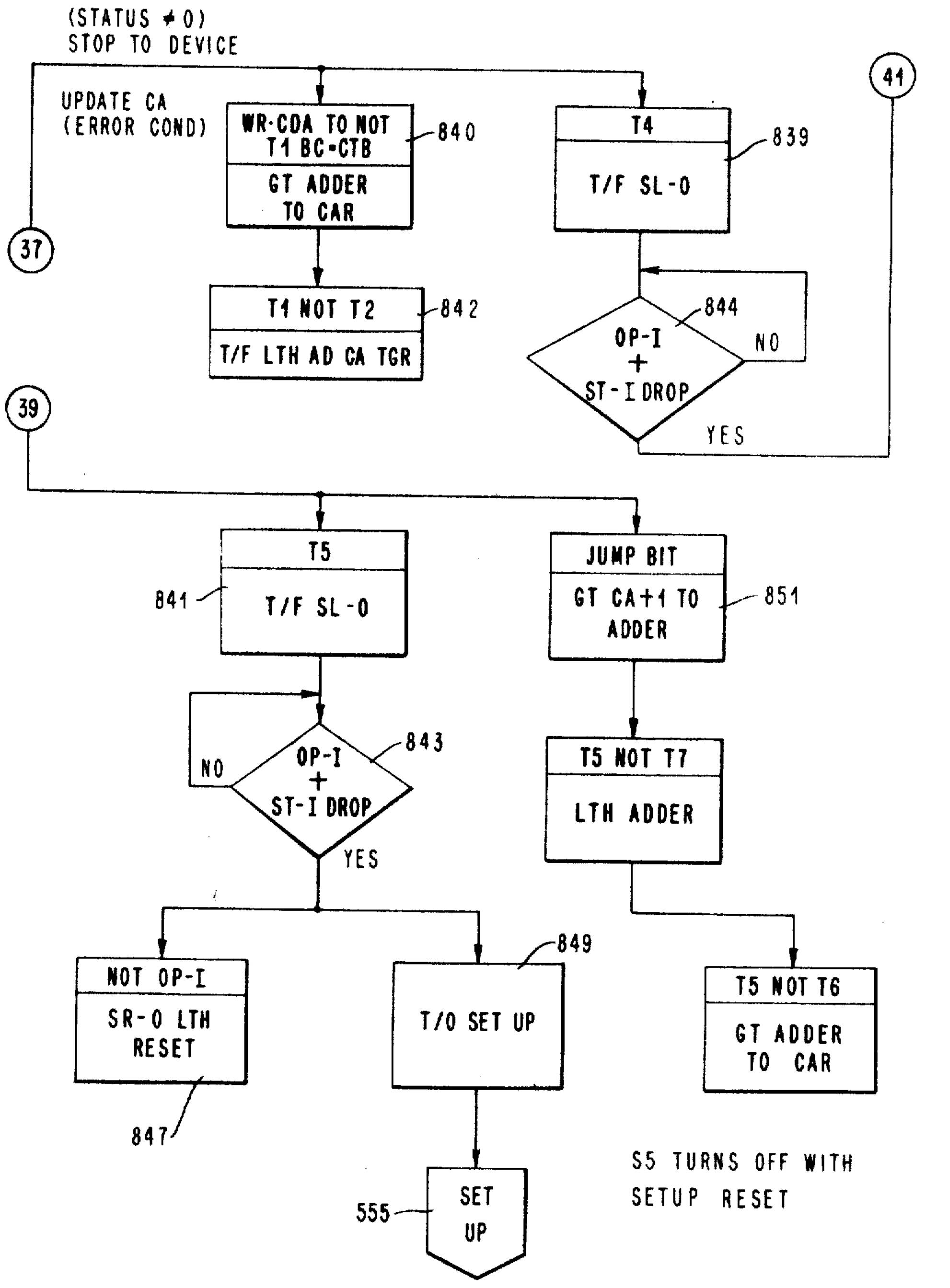
Figure 16W:
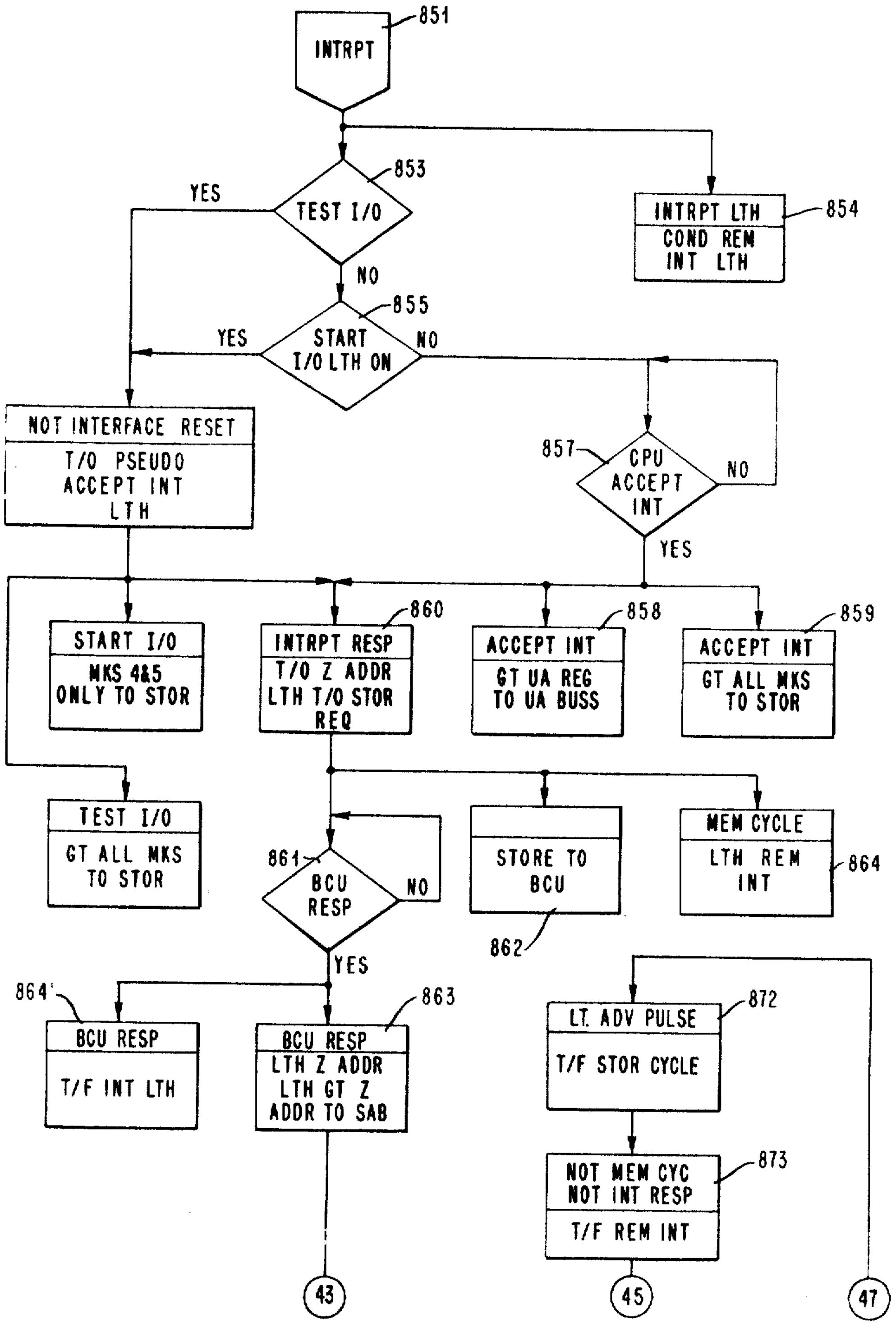
Figure 16X:
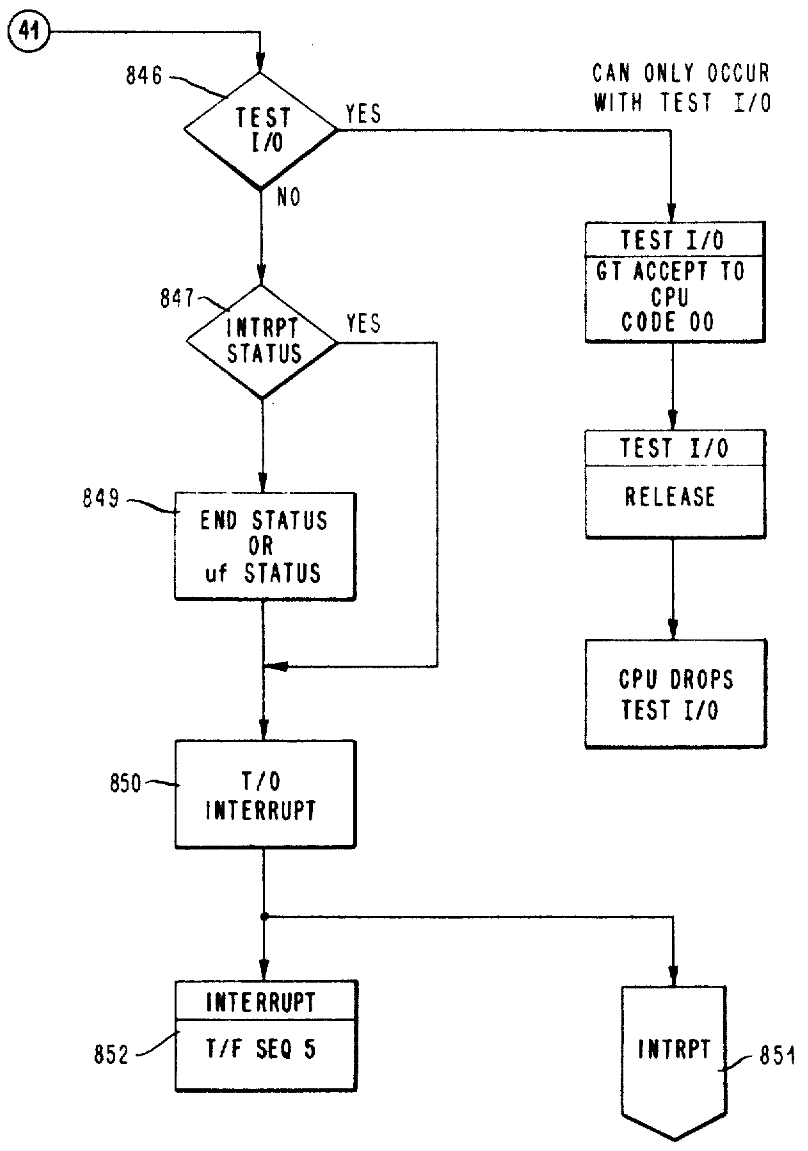
Figure 16Y:
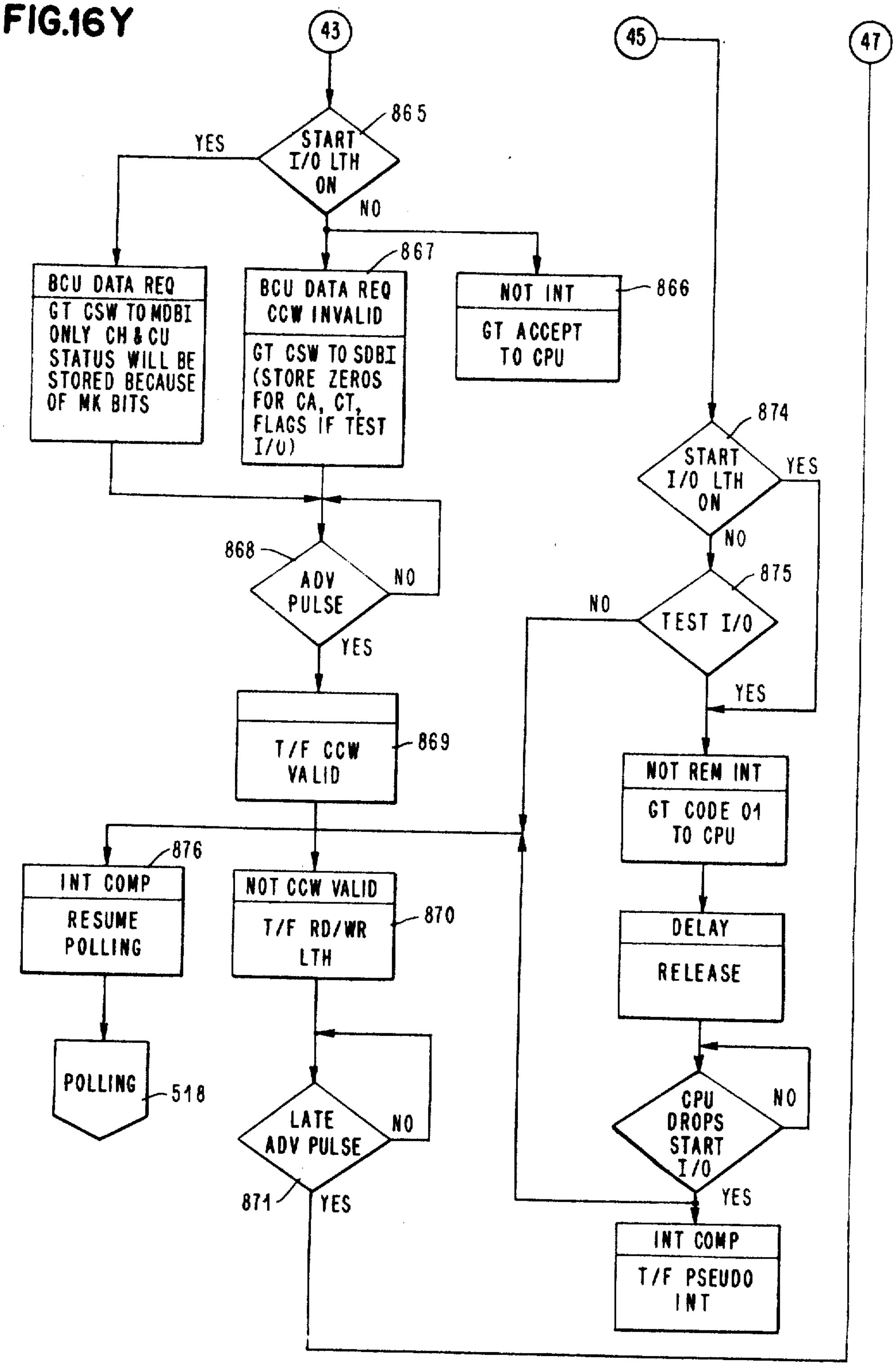

FIGS. 16 and 16A through 16Y are flow diagrams of a write operation performed by the present invention.

FIGS. 17, 17A through 17F are a flow diagram for a read operation performed by the present invention.

Figure 17:
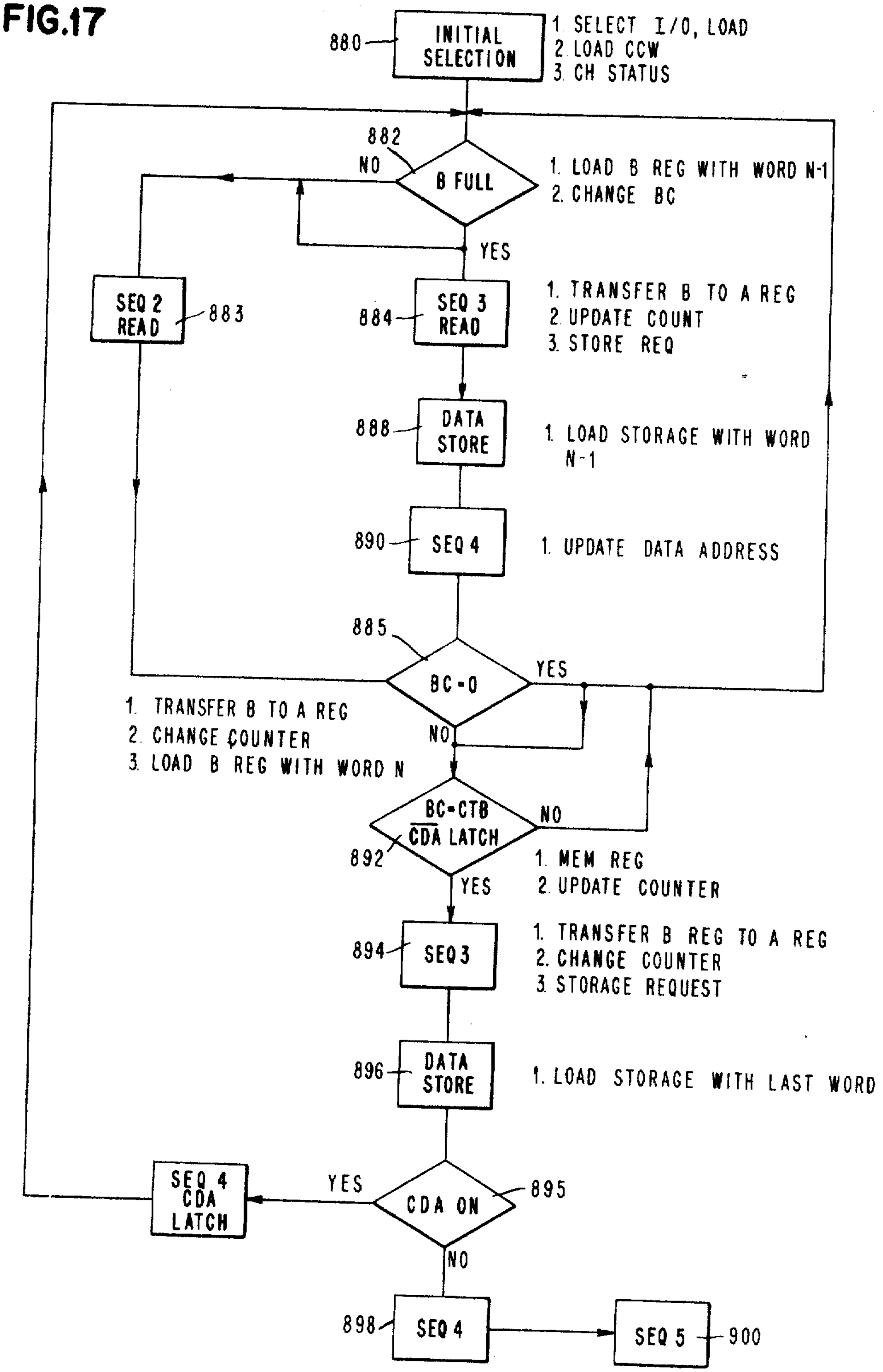
Figure 17A:
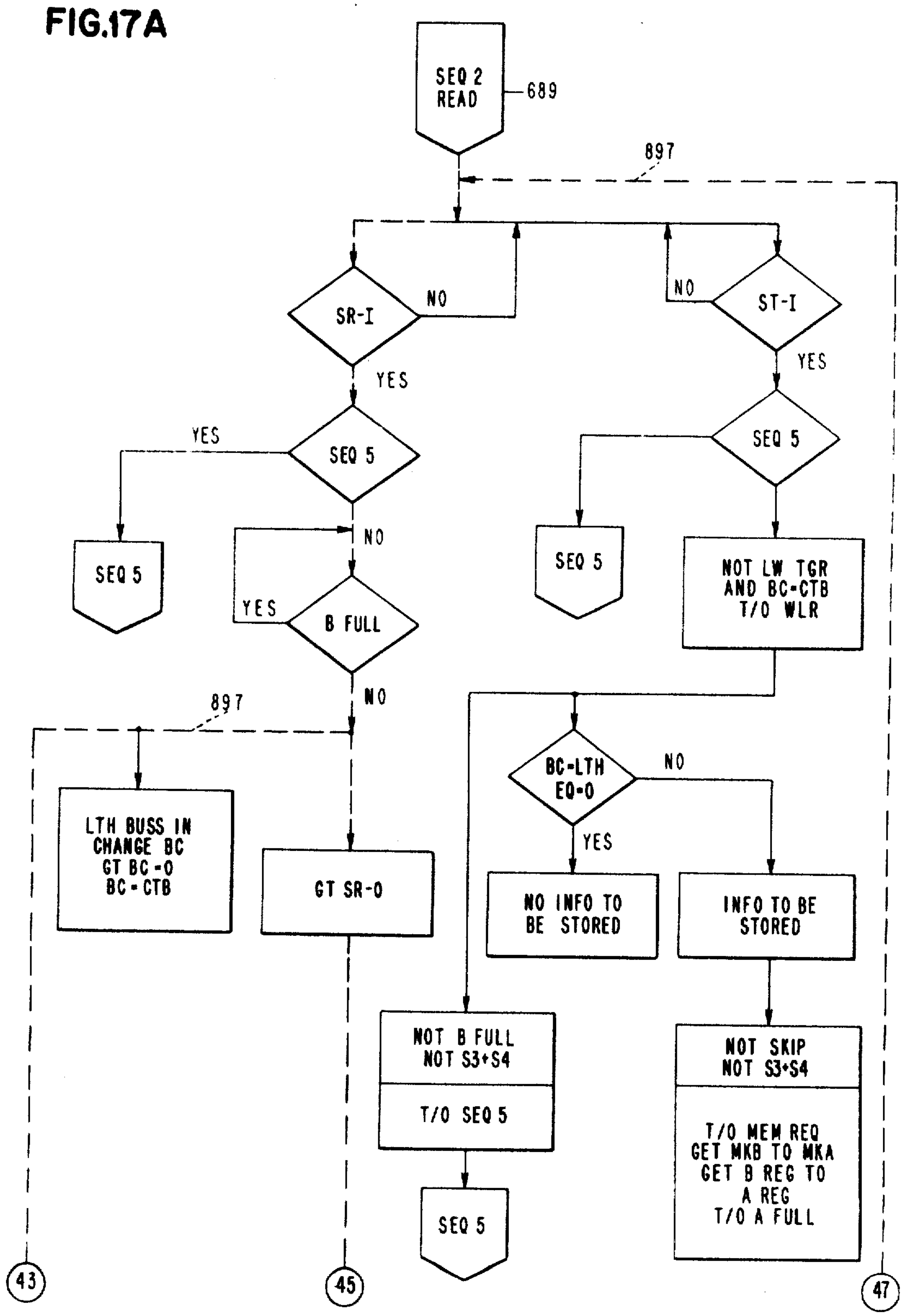
Figure 17B:
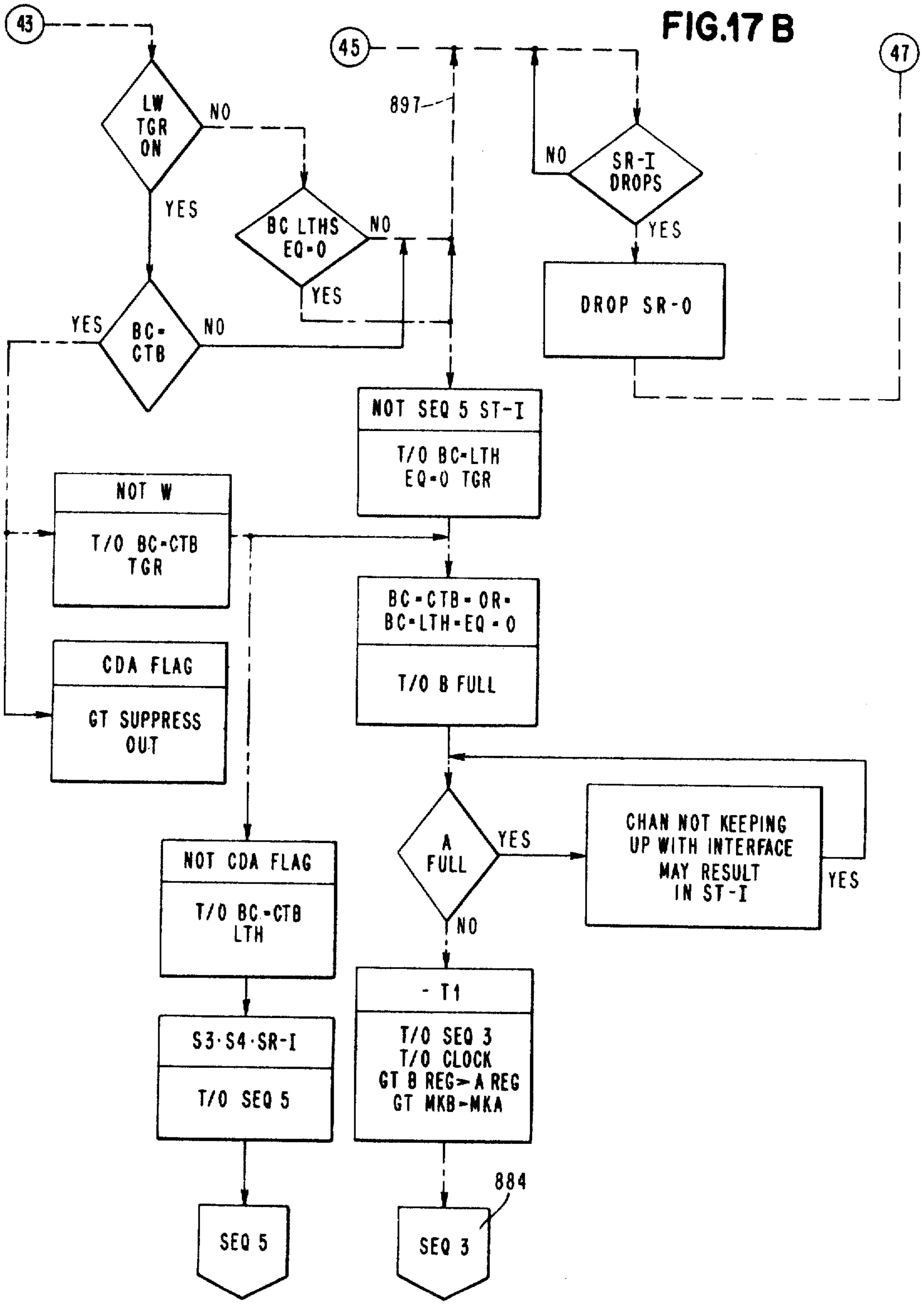
Figure 17C:
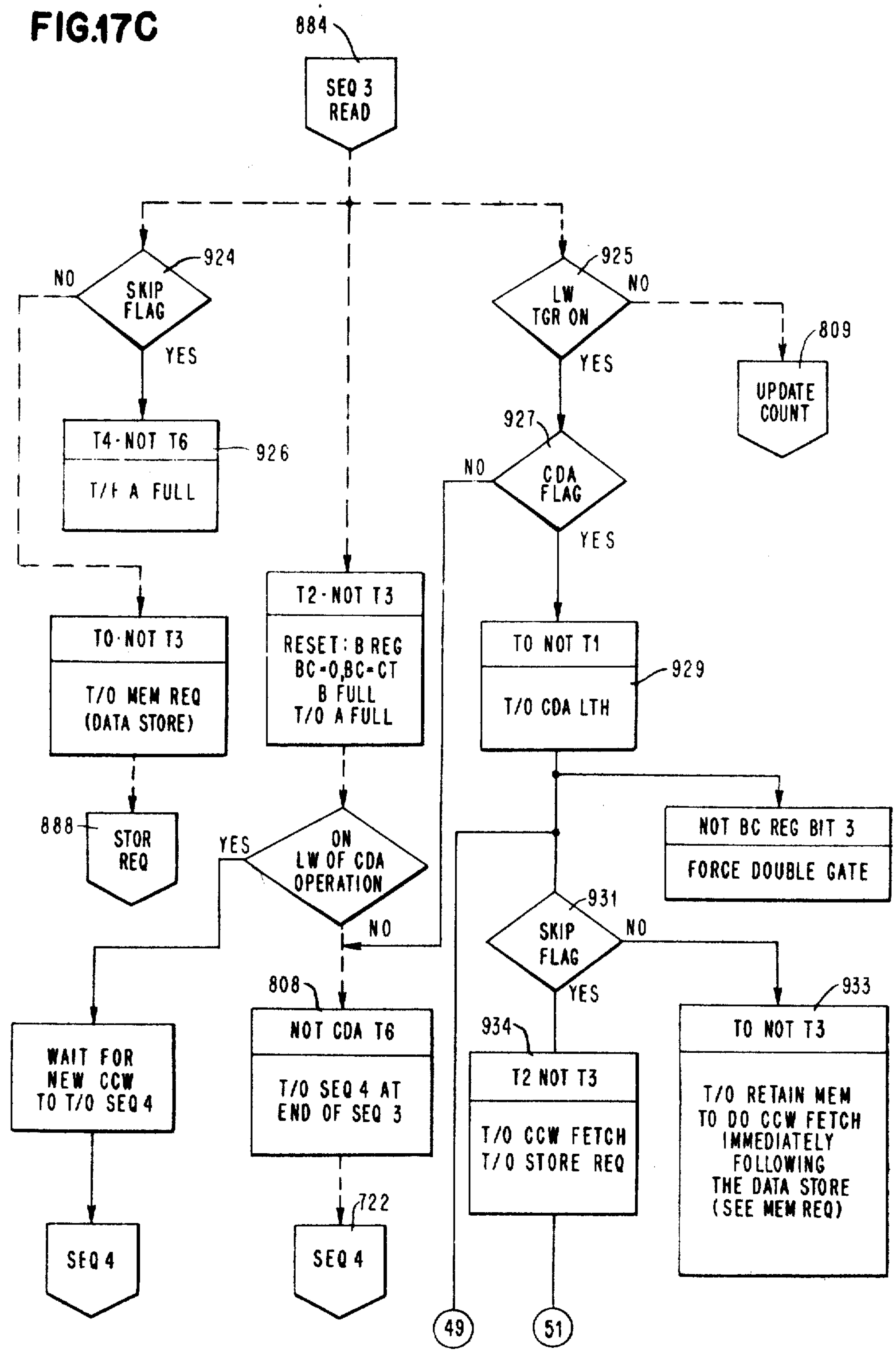
Figure 17D:
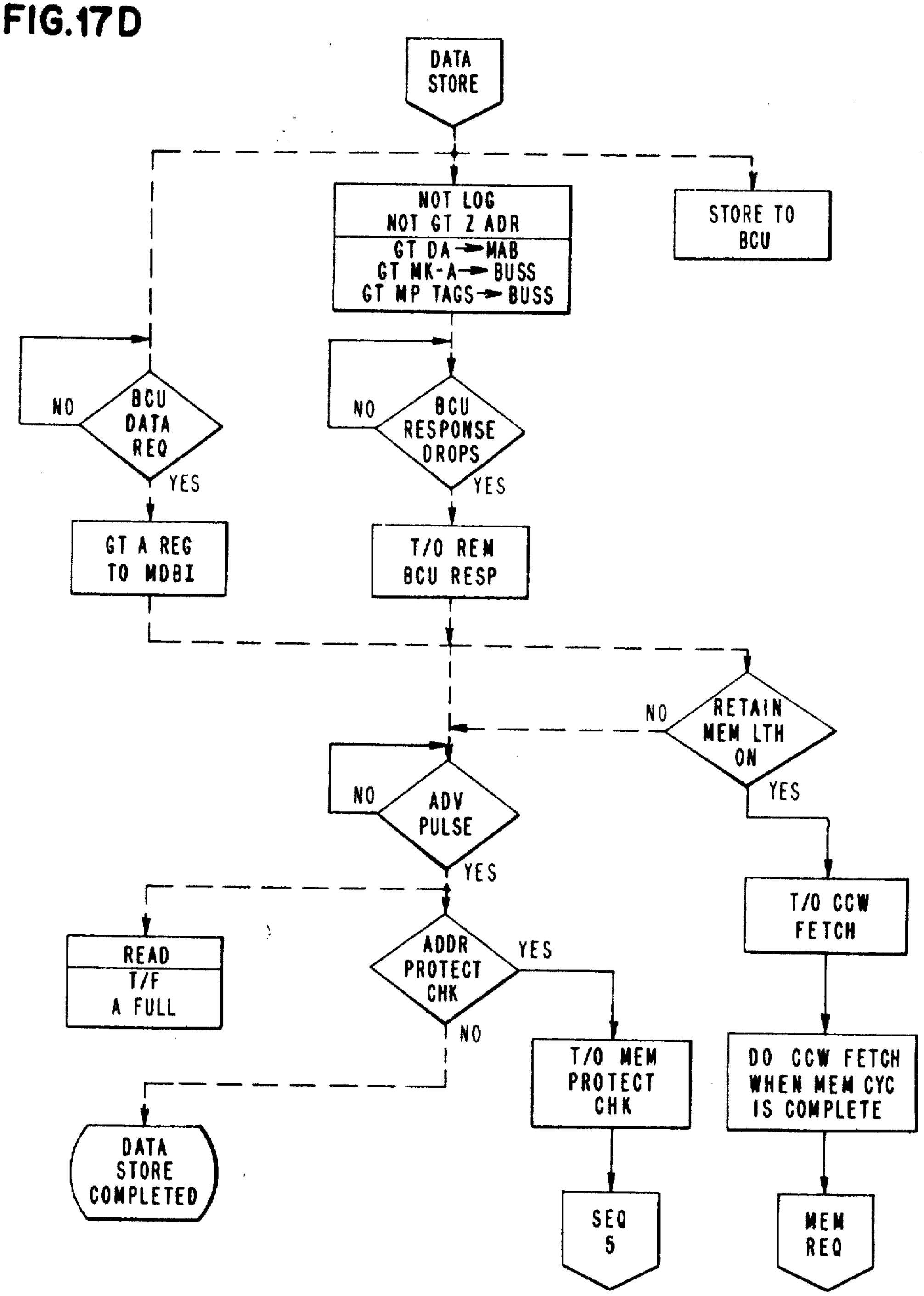
Figure 17E:
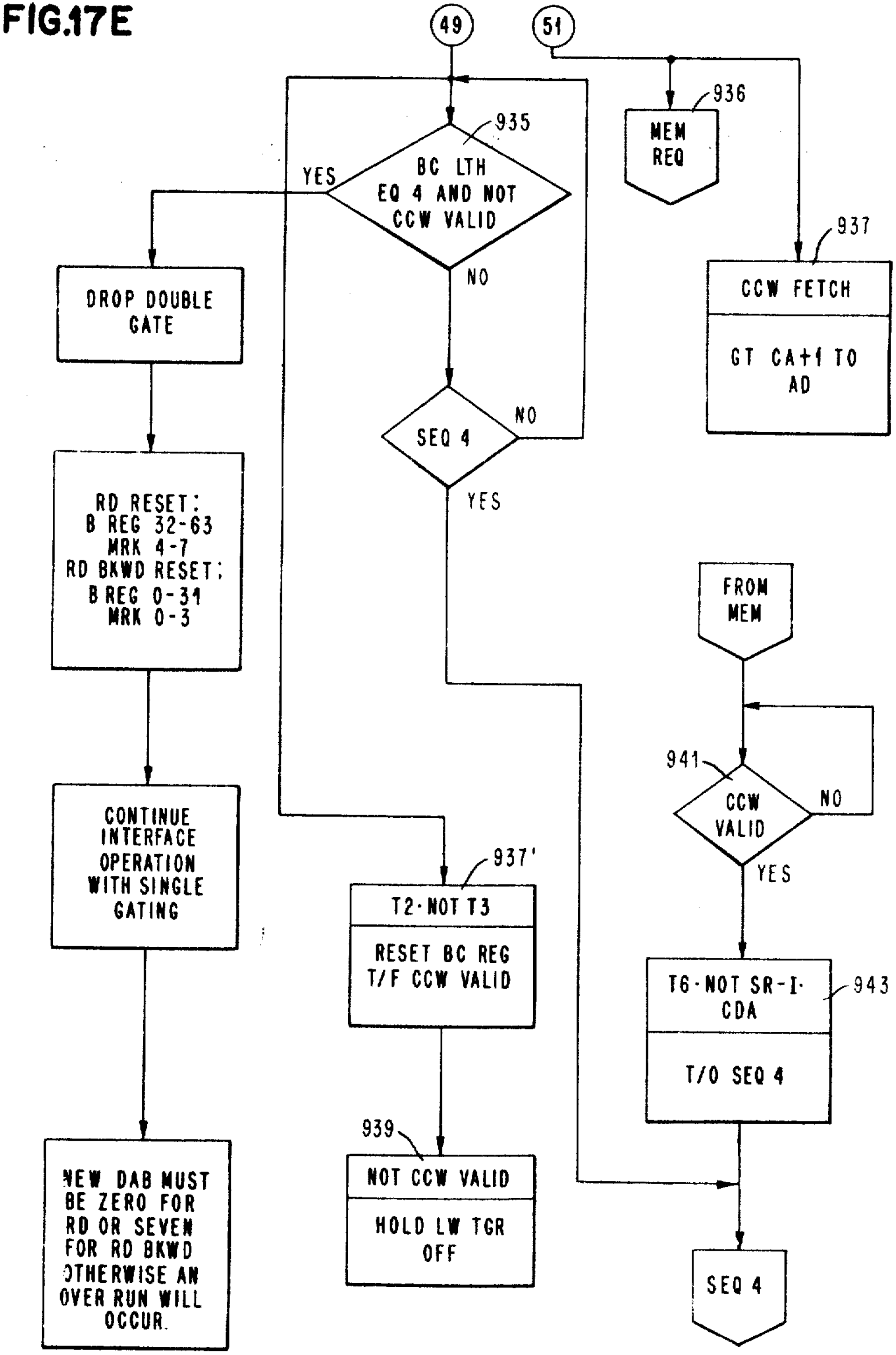
Figure 17F:
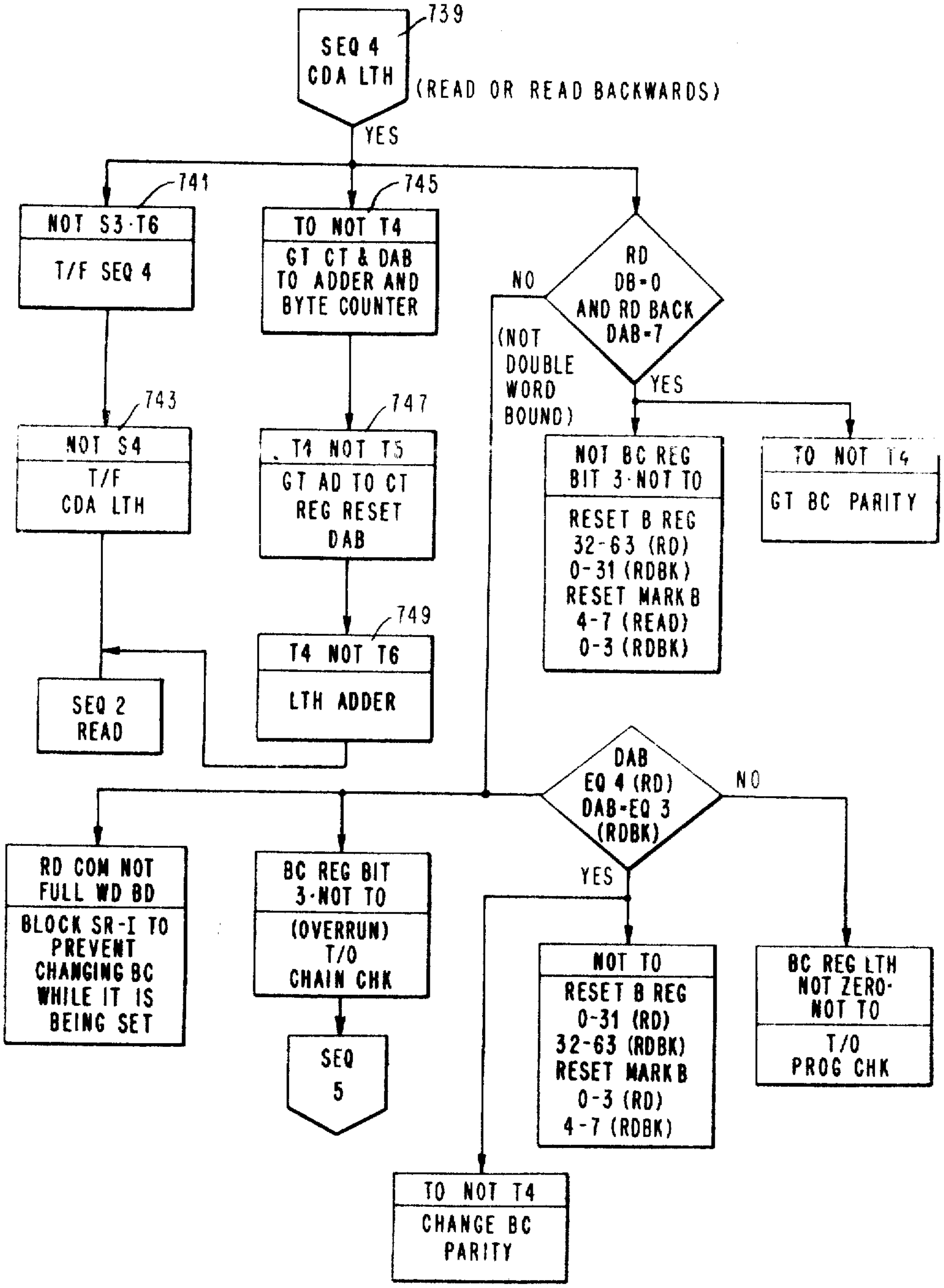
Figure 17G:
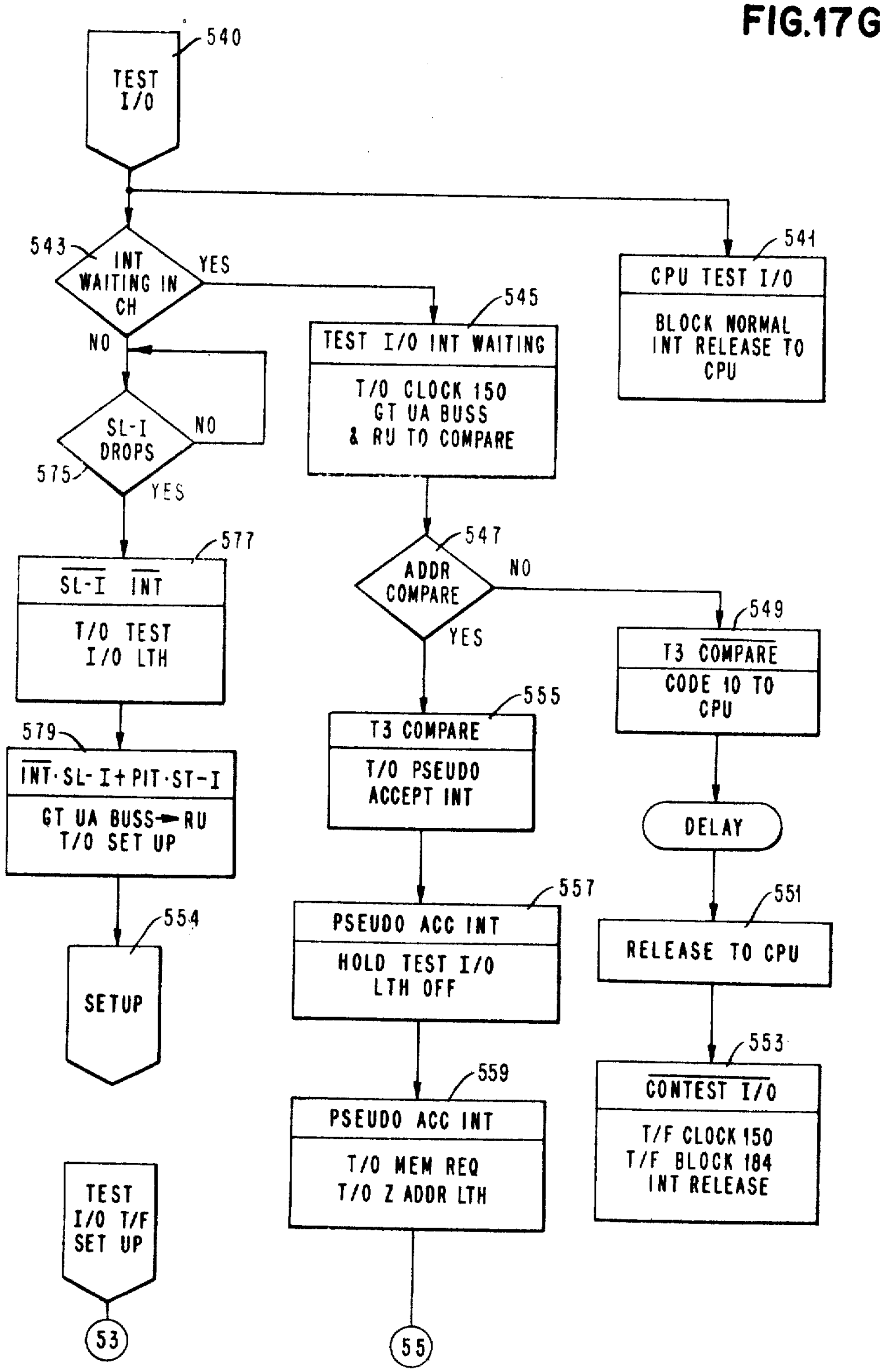
Figure 17H:
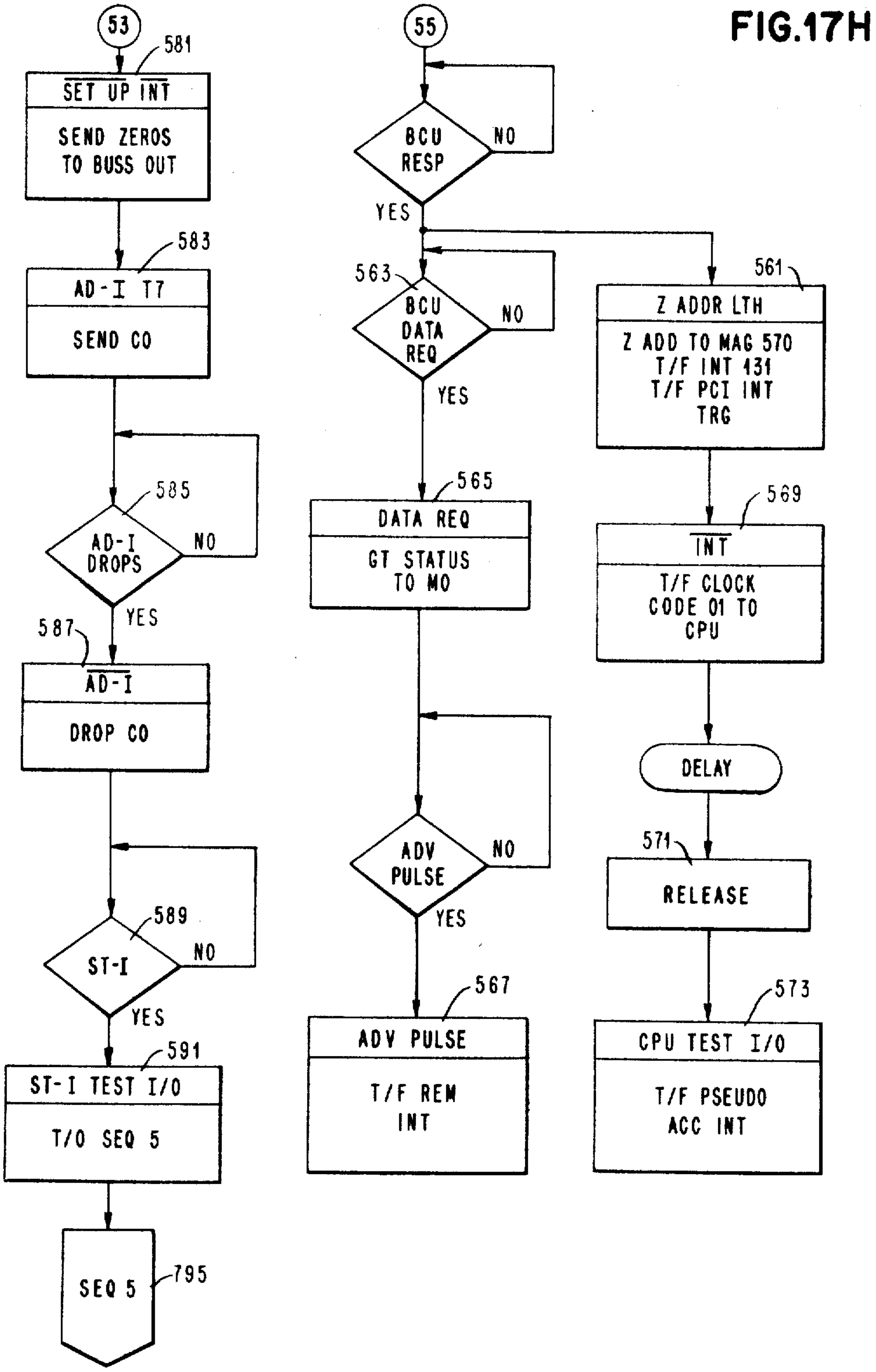

FIGS. 17G and 17H are a flow diagram for a test I/O instruction performed by the present invention.

Figure 17I:
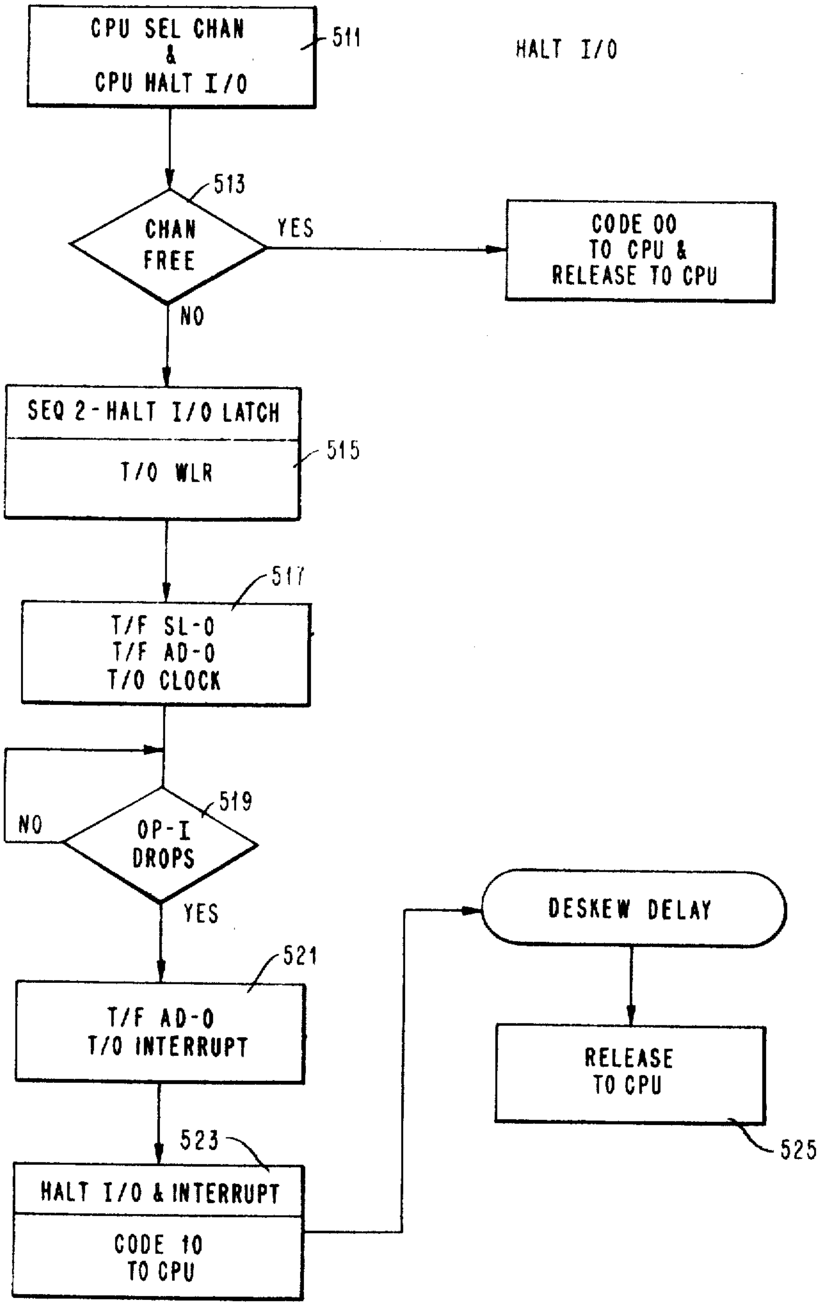

FIG. 17I is a flow diagram for a halt I/O instruction performed by the present invention.

Figure 17J:
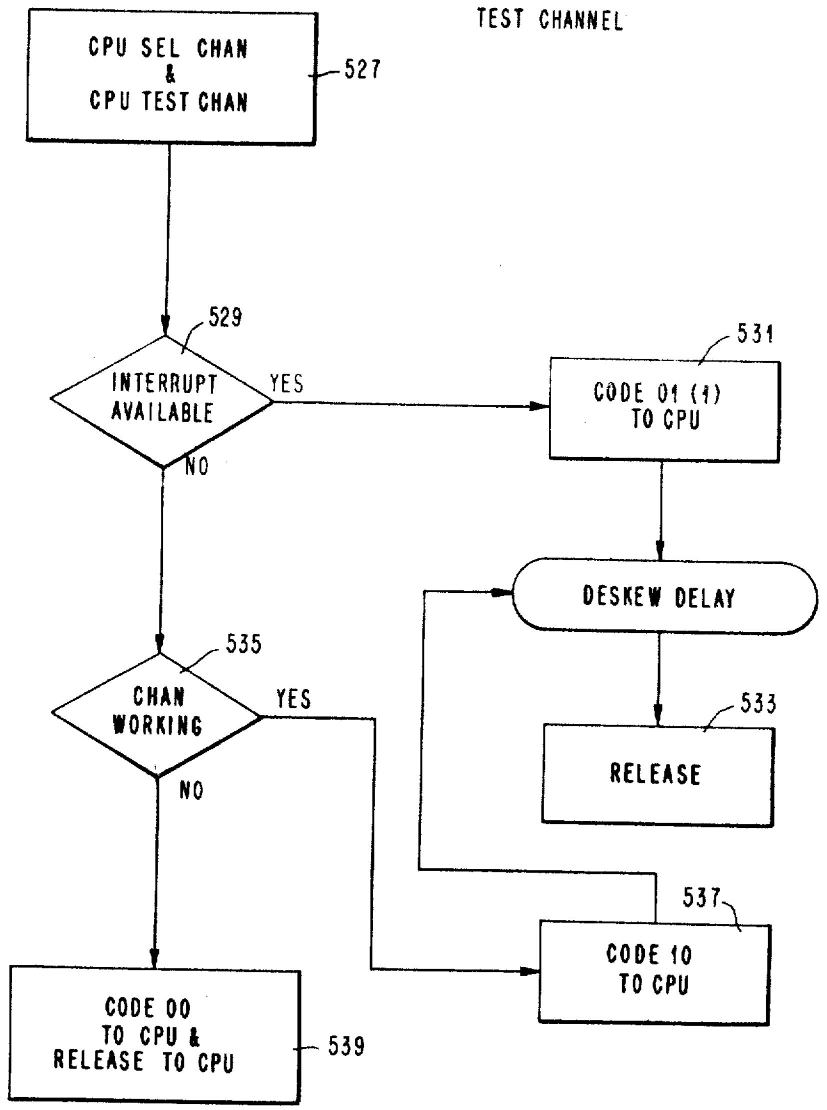

FIG. 17J is a flow diagram of a test channel instruction performed by the present invention.

Figure 18:
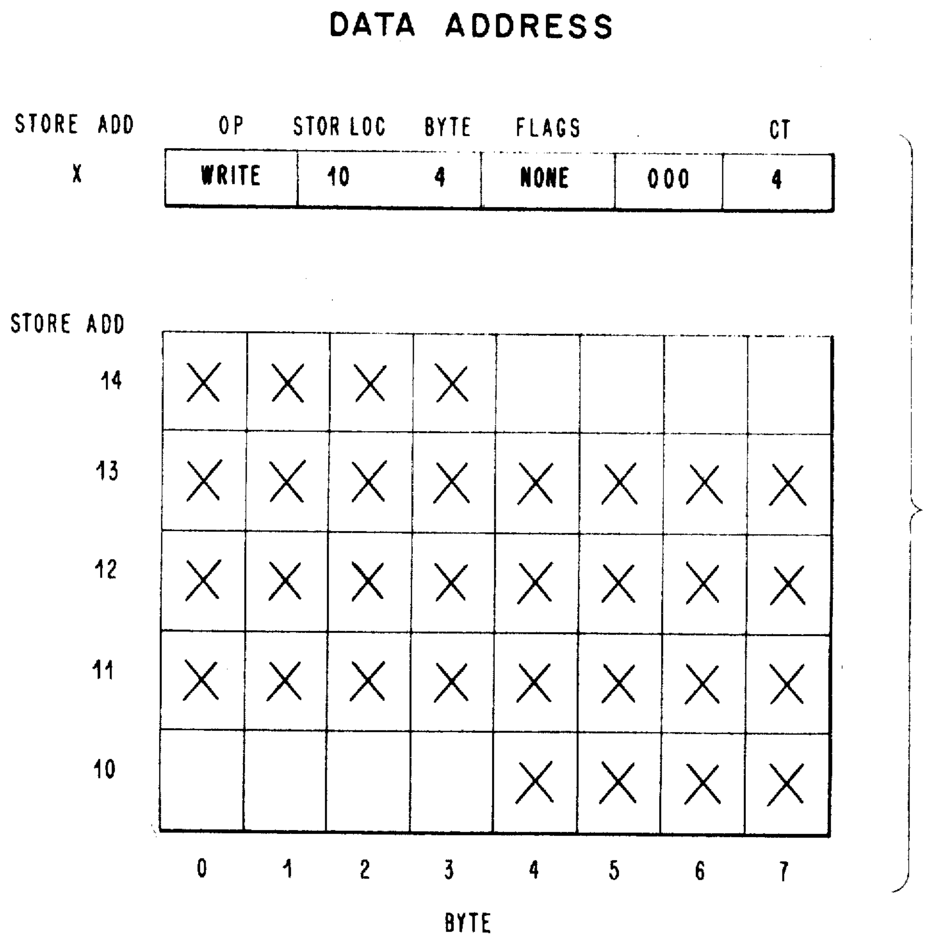

FIG. 18 is a channel command word and storage representation for a typical write operation performed by the present invention.

FIGS. 19A through C are a tabulation of the various latches and triggers employed in the present invention.

Figure 20A:
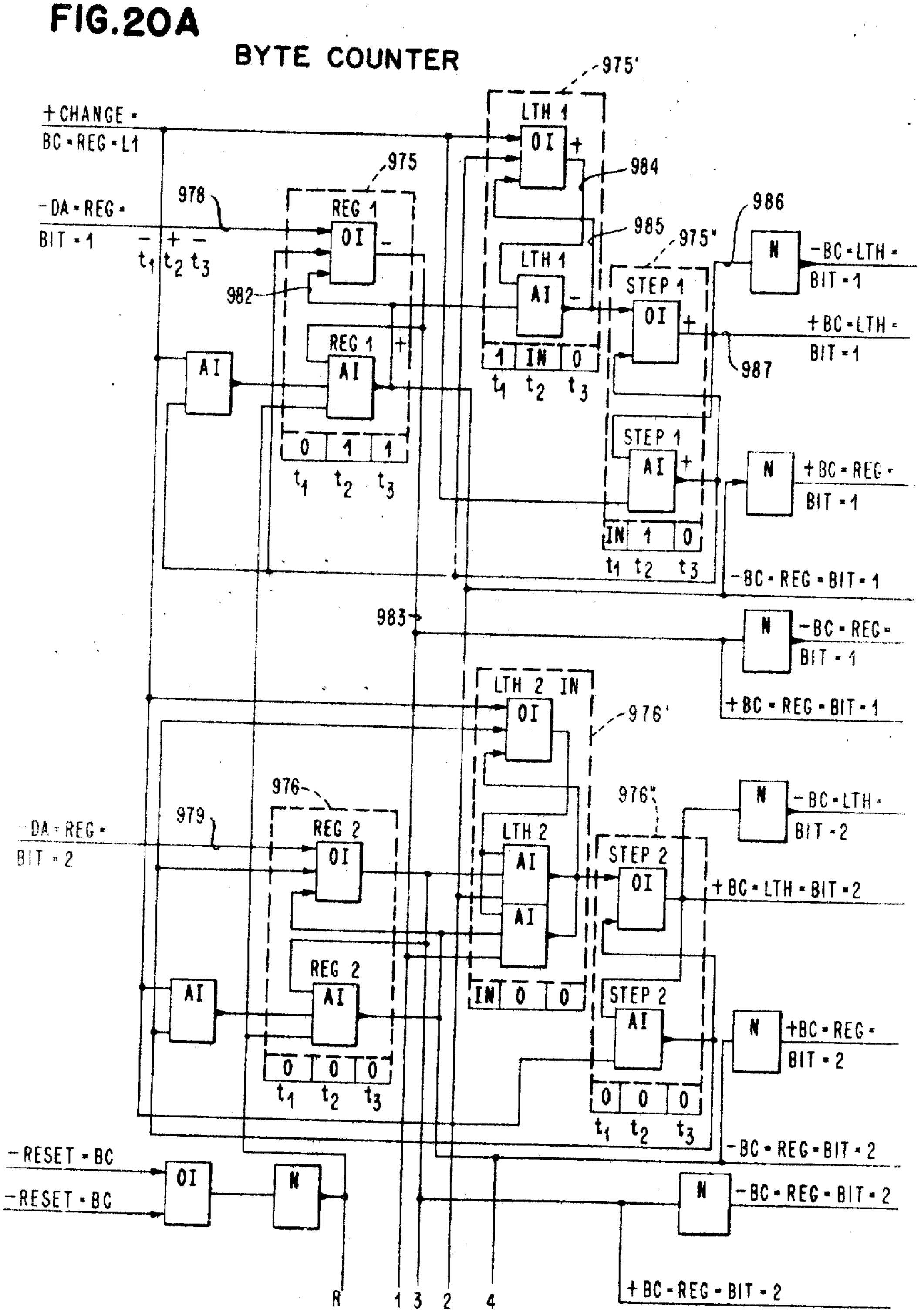
Figure 20B:
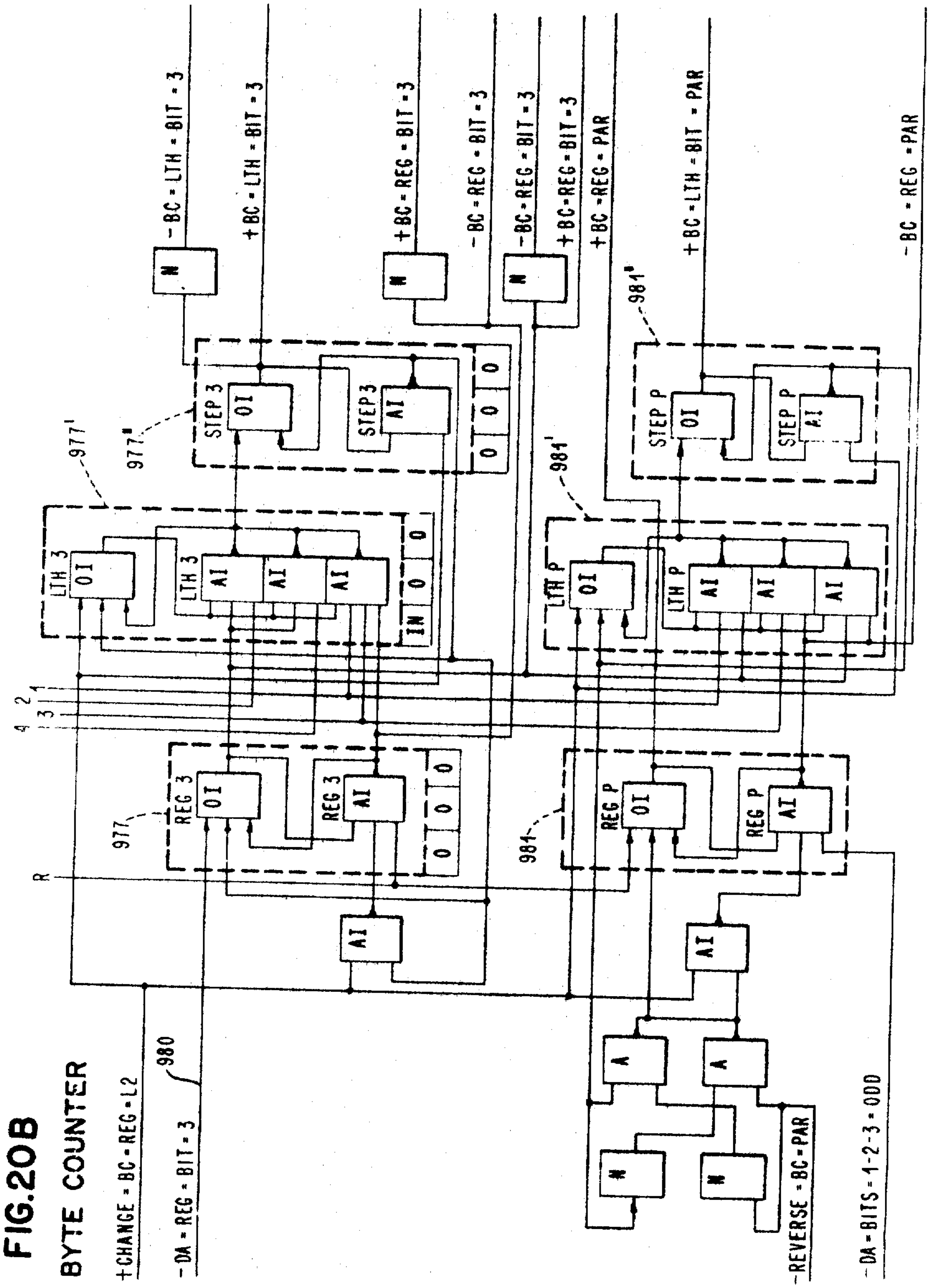

FIGS. 20A and 20B are an electrical schematic of a byte counter employed in the present invention.

Figure 21A:
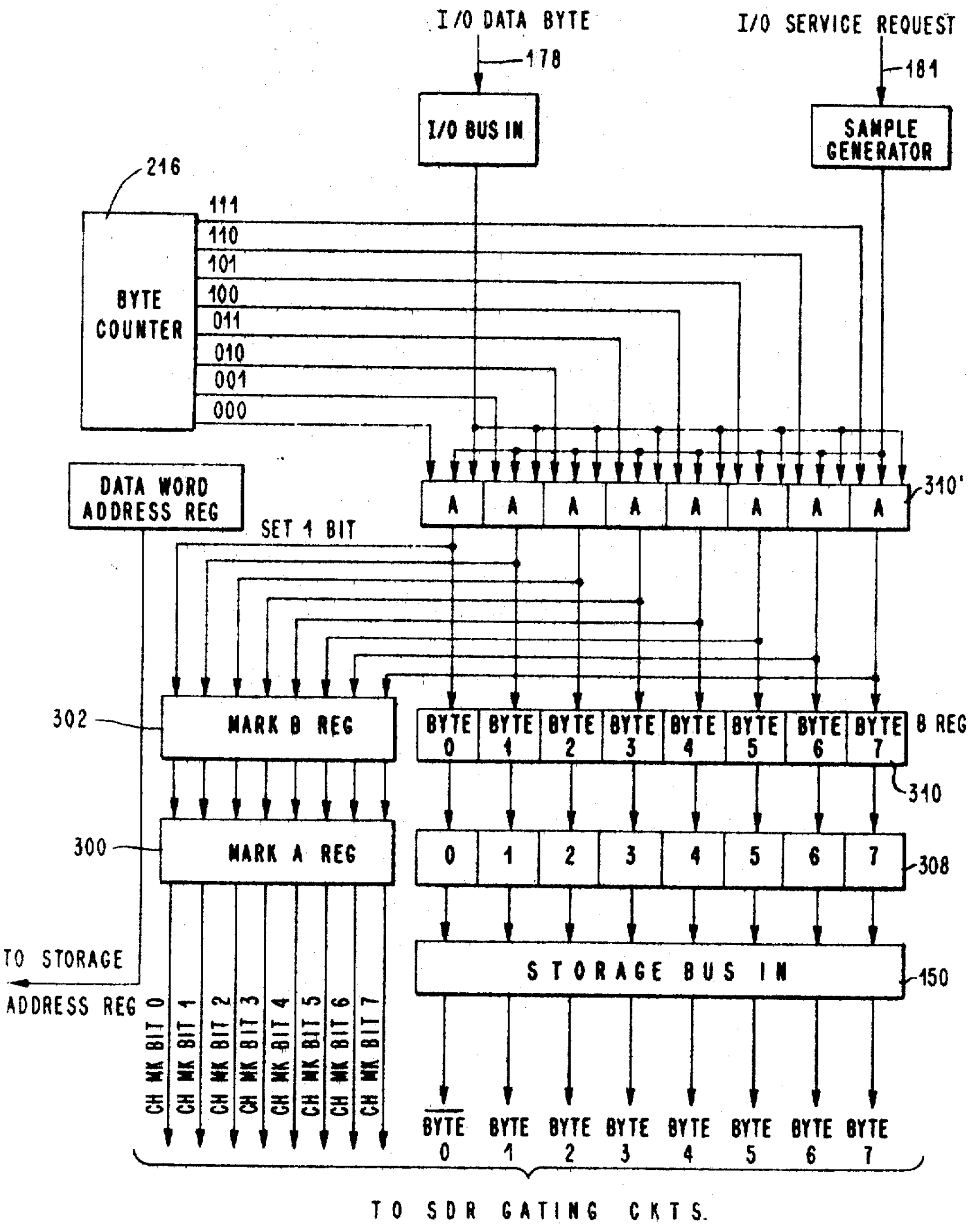
Figure 21B:
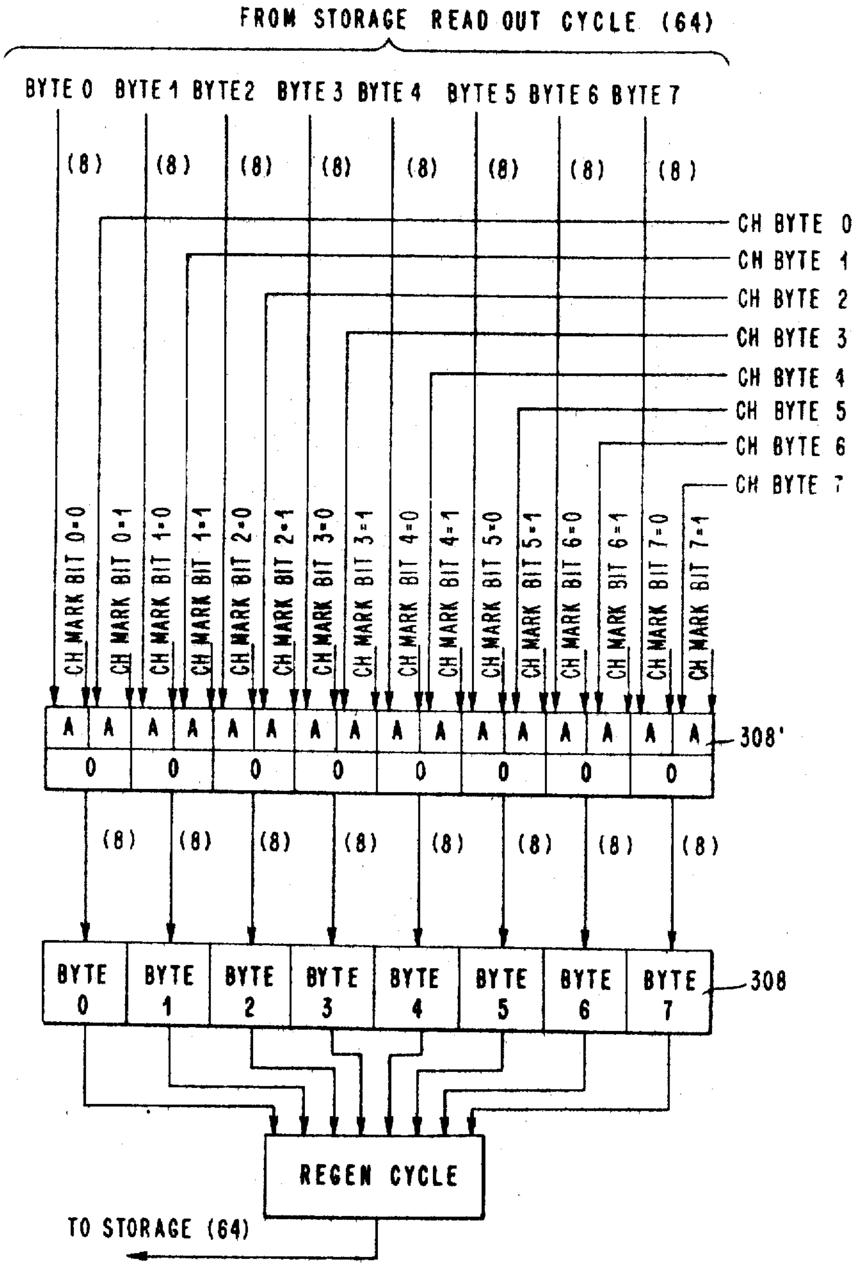

FIGS. 21A and 21B are an electrical schematic of channel registers for variable boundary selection.

Figure 22:
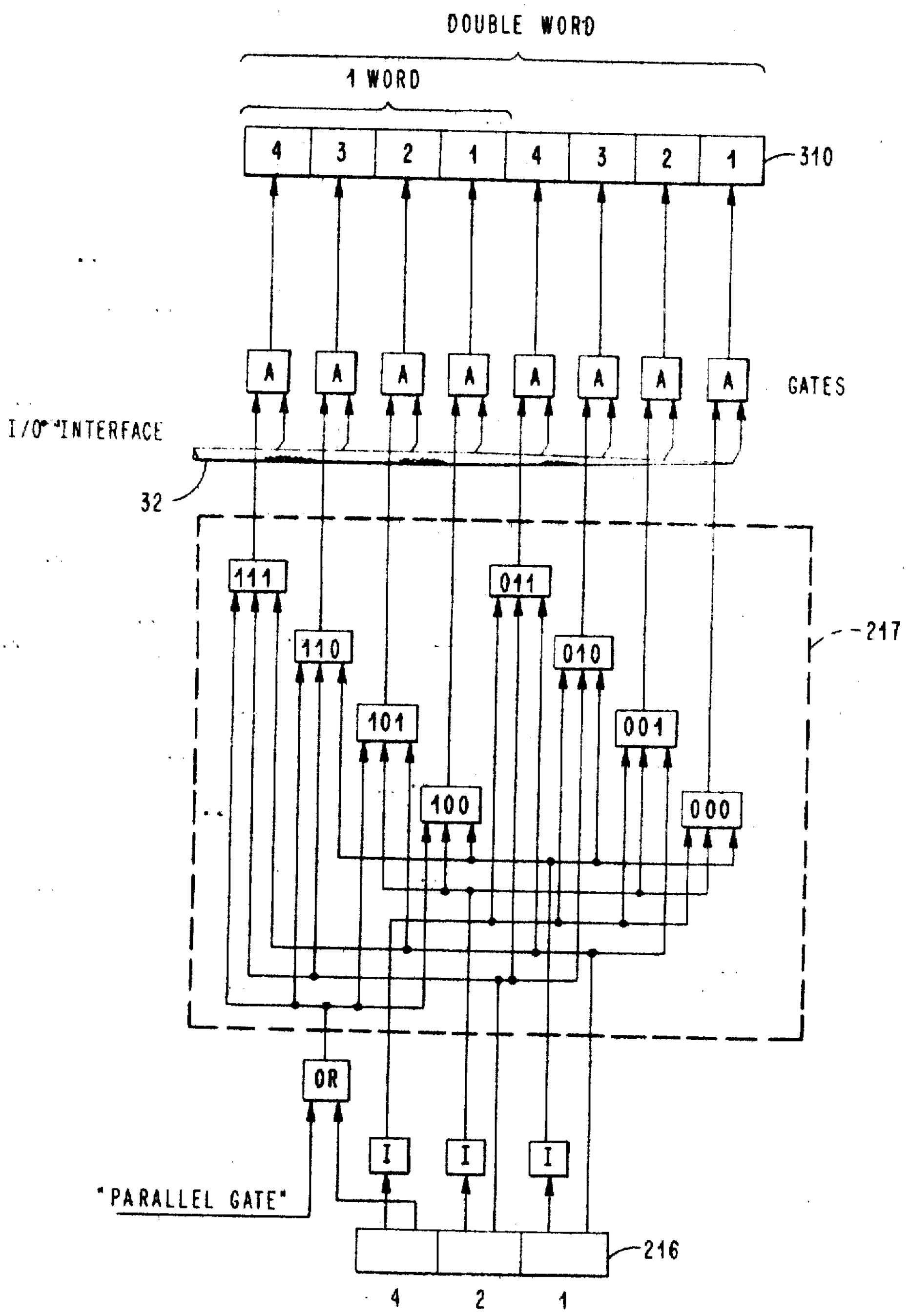

FIG. 22 is an electrical schematic of channel registers for double word and single word loading.

Figure 23B:
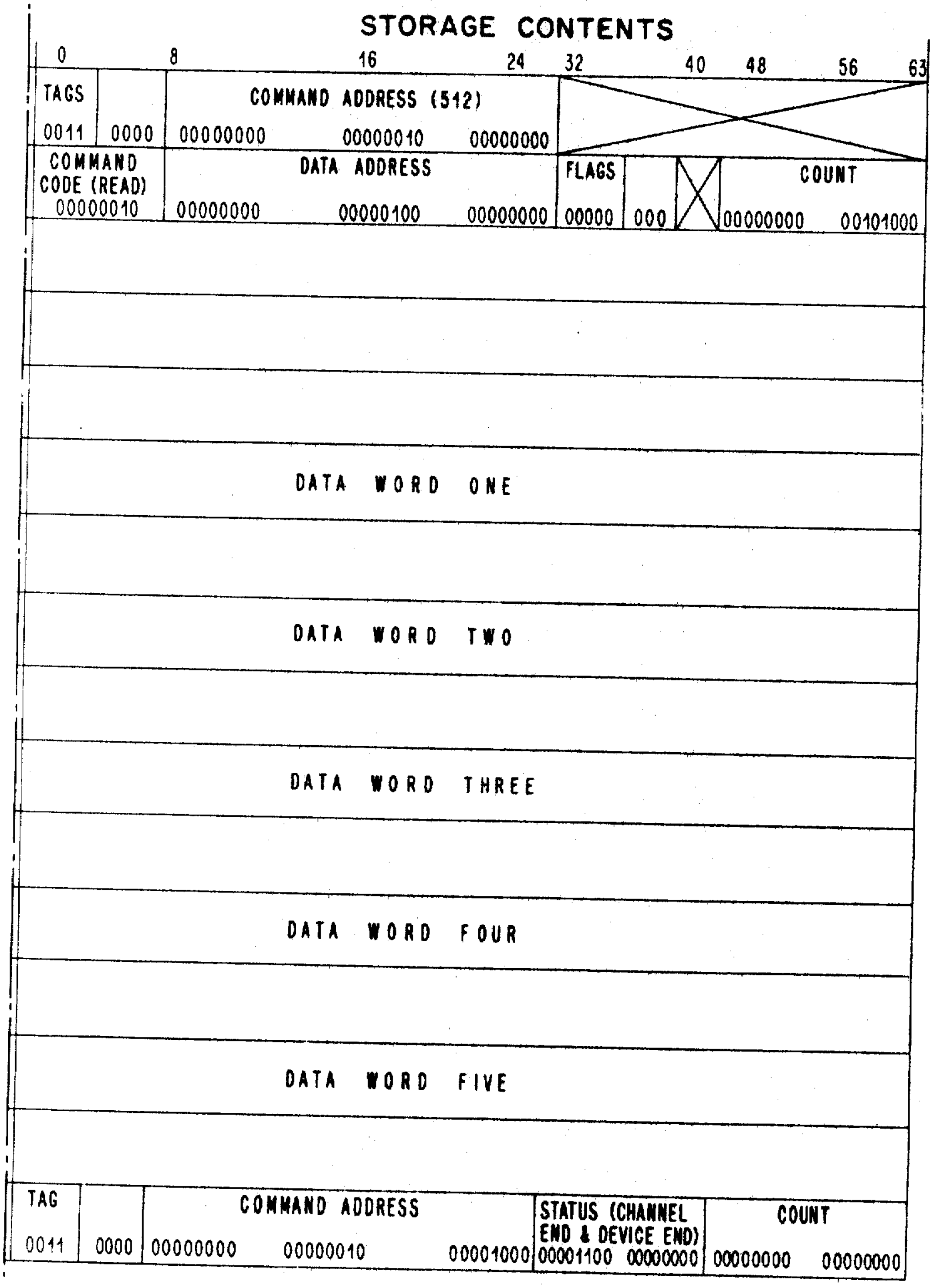

FIGS. 23A and 23B are various register settings and storage content while executing a read operation.

Figure 24:
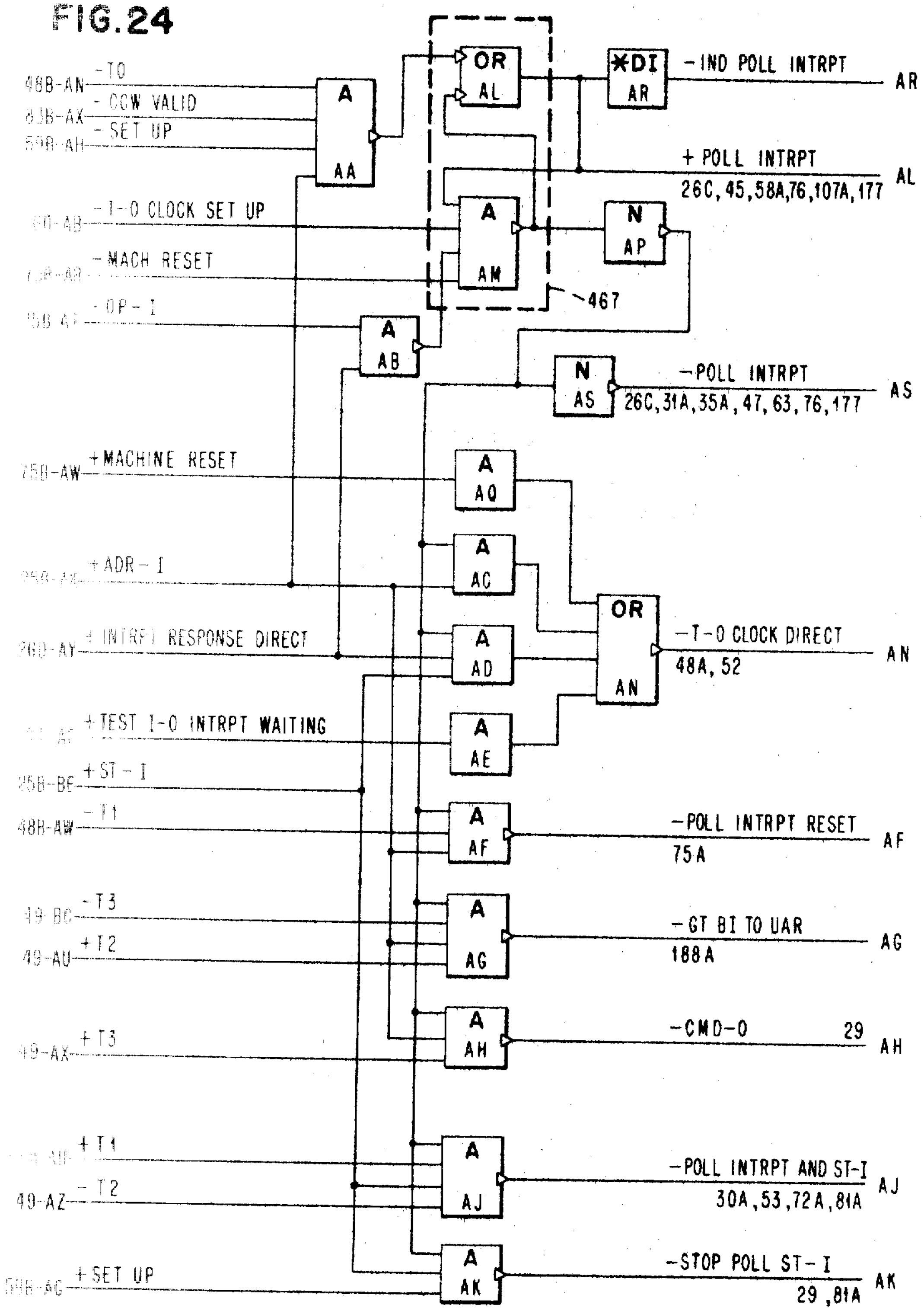

FIGS. 24 through 236 are electrical schematics of all registers, control sections, adders, counters, triggers and latches included in the present invention.

1.0 GENERAL

Figure 1:
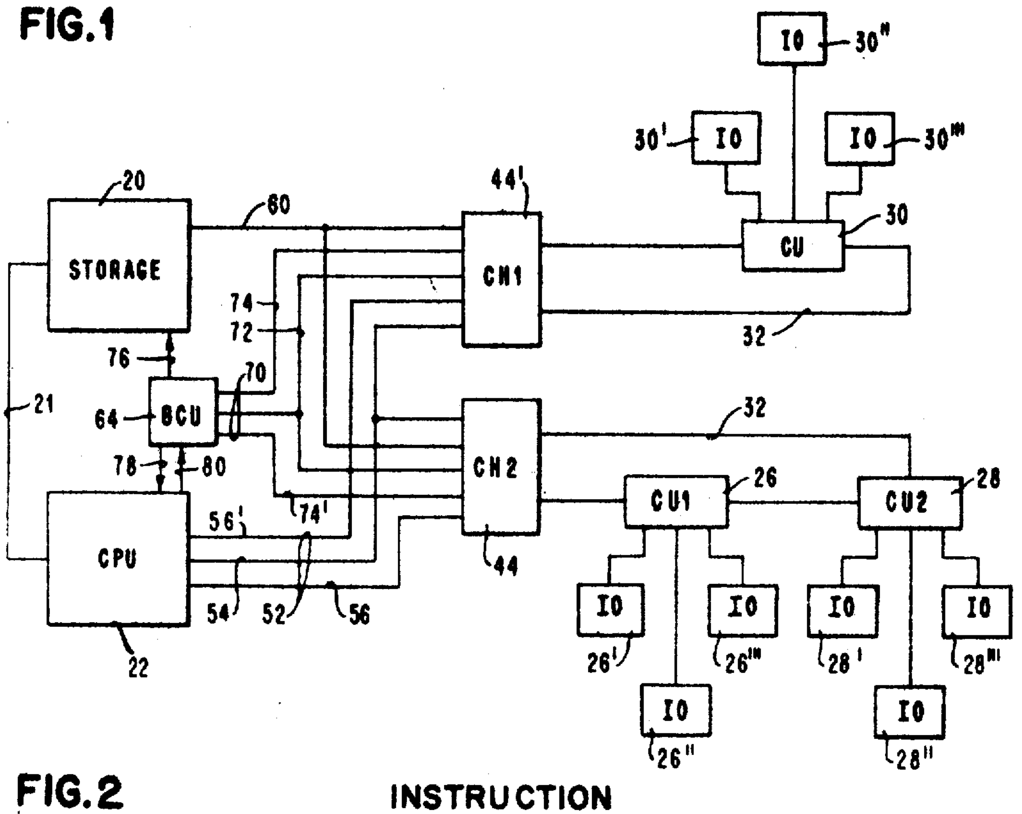
FIG. 1 is an electrical schematic of the present invention.

Referring to FIGURE 1, an information processing system of the form contemplated by the present invention includes a main storage unit 20 of the type described in a copending application, IBM Docket 14,102, Ser. No. 375,683, filed Apr. 6, 1964, assigned to the same assignee as that of the present invention. The storage is connected through a suitable bus 21 to a central processing unit CPU 22 of the type described in application, Ser. No. 357,372, filed Apr. 6, 1964, now U.S. Patent 3,400,371, G. M. Amdahl et al. assigned to the same assignee as that of the present invention. A plurality of control units 26, 28 and 30 individually govern a plurality of connected input/output devices 26′, 26″ . . . 26‴; 28′, 28″ . . . 28‴ and 30′ . . . 30‴. A typical control unit and governed input/output devices are described in a copending application, IBM Docket 7780, Ser. No. 357,370, filed Apr. 6, 1964, assigned to the same assignee as that of the present invention. The control units are connected through an I/O interface bus 32 of 28 lines to be described hereinafter. The bus 32 also includes a priority selection bus (not shown) since all control units time share the bus 32.

Each I/O interface bus connects to a data channel 44. Each data channel 44 is connected to the CPU through a CPU interface 52 including a multiplex bus 54 and a plurality of simplex or single direction line 56, 56′ both of which will be described hereinafter. All data channel units share the multiplex bus 54. The same number of simplex lines are connected between each channel unit and the CPU.

Each channel unit is connected to the storage unit 20 by way of a storage interface 60 which is operated as a multiplexed bus by a bus control unit 64, described, for example, in IBM Customer Engineering Instruction—Reference—7090 Data Processing System, published 1961 by International Business Machines Corporation, pages 38 through 44. A bus control interface 70 comprising a multiplex bus 72 and indivdual simplex lines 74 interconnects the channel units and bus control unit 70. Completing the bus control unit is storage bus in 76 and a CPU bus in 78 and bus out 80.

2.0 INSTRUCTION, COMMAND AND CONTROL ORDER FORMATS

Before describing the general detailed construction and operation of the channel, it is believed in order to describe the format of binary code combinations which serve as instructions, commands and control orders to initiate the operation of the channel in directing the flow of information between I/O devices and main storage. An instruction is prepared by the CPU and, after decoding, executed by the channel. The instruction may be a start I/O, halt I/O, test I/O, or a test channel. Commands are fetched from memory by the channel when a start I/O instructon is received. Commands, after decoding, initiate I/O operation. The channel is capable of executing write, read, read backwards, control, sense and transfer in channel commands. A control command indicates an operation at an I/O device that does not involve transmission of data, e.g., backspacing or rewinding magnetic tape.

Figure 2:
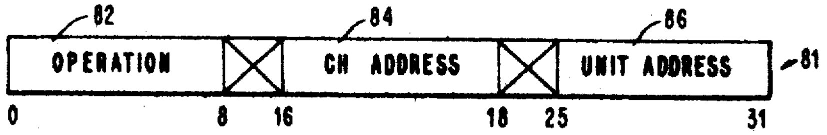
FIG. 2 is an instruction format for use in the present invention.

Referring to FIGURE 2, an instruction format 81 is indicated as comprising 32 binary bit positions. The instruction format comprises an operation code field 82, a channel address field 84 and a device or unit address field 86. The operational code is eight binary bits and may describe a START I/O, TEST I/O, HALT I/O and TEST CHANNEL operation. Eight through fifteen and eighteen through twenty-five of the instructions are ignored. The channel address field comprises three binary bits and the device address comprises eight binary bits. The particulars of a START I/O operation, that is, whether it is a write, read, read backward, control or sense operation, are determined by the CPU program stationing in a prefixed storage address the location of the command desired to be executed.

A HALT I/O instruction does not require and eight bit unit address. When the HALT I/O instruction is issued to a working channel, the channel is disconnected from the I/O device. The HALT I/O instruction will cause no action when issued to a nonworking channel or to one that has finished an operation and is waiting to interrupt.

The TEST I/O instruction is used to clear interruption conditions that exist in an addressed channel or an associated I/O device. The instruction will cause a channel status word (CSW) to be placed in a designated storage location and the interruption condition to be cleared. The CSW, as will appear hereinafter, includes channel and device status bits which identify the error condition.

A test channel instruction does not require an eight bit unit address. The instruction causes the channel to send a condition code describing the channel's present state at which time the CPU is released.

Figure 3:
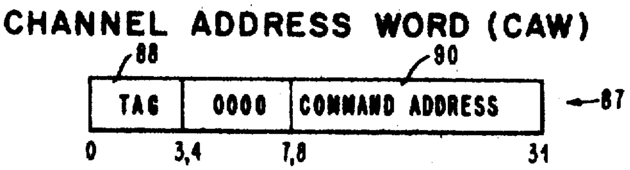
FIG. 3 is a format for a channel address word.

A START I/O operation directs the channel to enter storage at a designated location and obtain a channel address word (CAW), the format of which is in FIGURE 3.

Essentially, the CAW 87 is an indirect address providing the location of the desired command. The CAW, as indicated in FIGURE 3, has 32 binary bit positions including a tag field 88 and a command field 90. The tag field 88 has three bits which describe the memory area in which the I/O operation, i.e., read, write, read backward, etc., will be performed. The command address field 90 specifies the location of a command control word (CCW) which describes the particular I/O operation to be performed. The bit positions 4 through 7 must be binary zeroes for CAW validity purposes.

Figure 4:
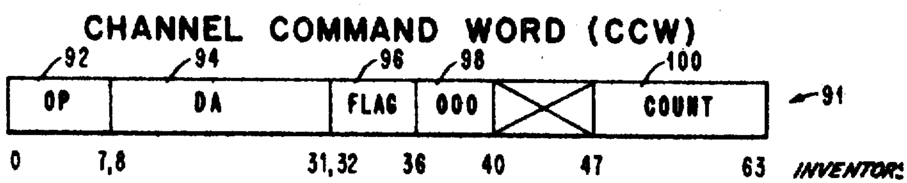
FIG. 4 is a format for a channel command word.

Referring to FIGURE 4, a channel command word (CCW) 91 format of 64 bit positions plus 8 parity bits (not shown) includes an operation code field 92 of eight bits; a data address field 94 of 24 bits; a flag field 96 of six bits; a buffer field 98 of five bits, and a count field 100 of 24 bits. The bit positions 40 through 47 are ignored. The command field 92 specifies the operation, i.e., read, write, etc., to be performed. The data address field 94 specifies an eight byte storage location in the main storage where the data is to be stored or read. The count 100 specifies the number of data bytes to be processed. Bit positions 37–39 indicate the validity of the CCW. The flag field 96 comprises a chain data address flag bit, a chain command flag bit, a suppress incorrect length indication flag bit, a skip flag bit, and a program control interruption flag bit, all of which will be described hereinafter.

A write command, appearing in the operation field 92, initiates the execution of a write operation at the I/O device. The command causes data to be transferred from main storage to the I/O device. Data in the storage are fetched in ascending order of addresses starting with the data address specified in the CCW. A CCW used in the write operation is inspected for various flags which indicate error and other conditions encountered in the operation. The write operation may be modified through the appearance of selected bits in the operation field.

A read command initiates the execution of a read operation at the I/O device. The command causes data to be transferred from the I/O device to the main storage. Data are placed in the main storage in ascending order of addresses starting with the address specified in the CCW. All flag bits are inspected during a read operation. The read operation may also be modified by the appearance of selected bits in the operation field.

A read backward command initiates the execution of a read backward operation at the I/O device. This command is applicable to only certain magnetic tape devices, and causes a read operation to be performed with the tape moving backward. The bytes of data within a record are sent to the channel in a sequence that is reverse with respect to that on writing. The data are placed in storage in descending order of addresses starting with the address specified in the CCW. All flags in the CCW are inspected during a read backward operation. Modifier bits may be placed in the operation field to alter the operation.

A control command is used to initiate an operation at the I/O device. The command is fetched from storage and decoded by the I/O device. Back spacing, rewinding magnetic tape or positioning a disk access mechanism are performed by the I/O device. The command specifies the entire control function. The data address designates such additional information as is required for the operation.

Chain command (CC) flag which appears in bit position 33 gives the programmer the option of initiating multiple I/O operations with a single CPU START I/O instruction. When the count of a particular CCW is exhausted and the CC flag is on, the channel will fetch the next sequential command address. This command address will specify a transfer in channel or a new I/O operation to be performed. Command chaining makes it possible for a programmer to initiate the transmission of multiple blocks of data with a single START I/O instruction. It also permits a single instruction to specify certain auxiliary functions such as rewinding tape at the end of a data transmission. Command chaining, in conjunction with status modifier bits, permits the channel to modify the normal sequence of operation in response to signal provided by the I/O device. Since command chaining always involves an initiation of new I/O operations, there are no restrictions on its use.

The suppress in correct length indication flag (SILI), which appears in bit position 34, controls whether or not an incorrect length condition is indicated to the program. An incorrect length condition exists where the count field of the CCW and the record length do not correspond. When this flag bit is present and the CDA flag is off, the incorrect length indication is suppressed. If the CCW has the CC flag on, command chaining will take place. Absence of the SILI flag or the presence of both the SILI and the CDA flags terminates the operation and causes the program to be interrupted.

The chaining data address flags which appear in bit position 32 specify the action that is to be taken by the channel upon the exhaustion of a CCW or the appearance of various error conditions. When the CCW is exhausted either from a count standpoint or from a command standpoint, a new CCW is acquired without the CPU being required to continue the operation at the next address or beginning a new command. The chain data address (CDA) flag permits different parts of the same record to be stored or fetched from non-contiguous areas in the memory. The channel simply interprets the CDA flag as a signal for it to fetch a new count and chain data address flag. The operation code field in the newly fetched CCW is ignored.

The skip flag which appears in bit position 35 permits the suppression of main storage references during an I/O operation. The skip flag is applicable to read, read backward and sense operation. In all other instances the skip flag is ignored. Skipping affects only the handling of information by the channel. The operation at the I/O device proceeds normally and information is transmitted to the channel. The channel, however, keeps updated the count but does not place the information in the main storage. The skipping feature, when combined with CDA chaining, permits the program to place in main storage selective portions of a record in an I/O device.

The program control interruption flag which appears in bit position 36 permits the programmer to cause an I/O interruption during execution of an I/O operation. Whenever the PCI flag and CCW are on, the channel will attempt to interrupt the program as soon after start of the transmission as possible. The setting of the PCI flag is inspected in every CCW except those specifying a transfer in channel. Modifier bits may be included in the operation field.

The sense command initiates the execution of a sense operation at the I/O device. This command causes sense status information to be transferred from the I/O device to main storage. The information is placed in the storage in ascending order of addresses starting with the address specified in the CCW. The sense status provides more detailed information than that provided in the CSW. The sense command thus provides detailed information concerning the status of the I/O device. Flags are inspected and modifier bits may be included.

The transfer in channel command causes the channel to fetch the next CCW from the location specified in the data address field of the transfer and channel command. Thereafter, the data address is then incremented and placed in a command address register. The command initiates no operation at channel or at the I/O device. The purpose of the transfer in channel command is to provide chaining between non-adjacent CCW's. The transfer in channel can occur both in data address and command chaining. Some flags and modifier bits are not recognized.

3.0 COMMAND CODE

The two low order or least significant bits of the eight bit command code 92 or if these bits are binary zeros, then the four low order bits identify the command or the operation to the channel. The channel distinguishes between four operations; output forward (write and control); input forward (read and sense); input backward (read backward) and branching (transferring channel). The remaining four bits of the eight bit command code specify the details of the operation to the I/O device. The command codes for the various operations are as follows:

TABLE I

| | |
|---|---|
| * * * */0000 | Invalid Code. |
| MMMM/0100 | Sense. |
| XXXX/1000 | Transfer in Channel. |
| MMMM/1100 | Read Back Wind. |
| MMMM/MM01 | Write. |
| MMMM/MM10 | Read. |
| MMMM/MM11 | Control. |

The M in the code indicates modifier bits.

4.0 CHANNEL STATUS WORD FORMAT

Figure 5:
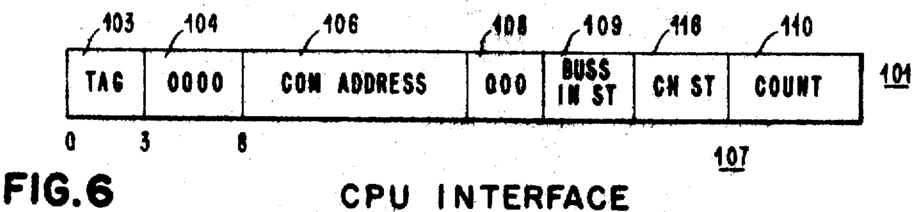
FIG. 5 is a format for a channel status word.

Referring to FIG. 5, a channel status word (CSW) 101 format comprises a memory tag field 103, a buffer field 104, a command address field 106, a buffer field 108 and count field 110, a status field 107 comprising a device field 109 and a channel field 116. The CSW provides to the program the status of an I/O device or the conditions under which an I/C operation has been terminated. The tag field 103 contains the memory area location in which the operation was being performed. The command address field 106 specifies an address that is eight bytes higher than the last command address used in the operation being performed. The eight bit device status field 107 describes the status of the I/O device presently connected to the channel. The conditions indicated by the field 109 are attention, control unit end, busy, channel end, device end, unit check and unit exception. Each condition may be modified by the presence of modifier bits.

4.1 CSW DEVICE STATUS FIELD

The attention status bit is generated at or by the I/O device. The bit is interpreted by the channel as an attempt by the device to interrupt the program. An I/O device that is waiting to present the attention condition to the channel appears busy to a command initiated by a start I/O instruction, but does not appear busy to a command sent to the device by a chaining process. The bit is stored in bit position 32 of the CSW.

A busy bit indicates that an I/O device cannot accept a new command either because it is executing a previously initiated operation or because it contains an interruption condition. The busy indication can appear in the CSW only when the status modifier bits are stored by the start I/O instruction. The bit is stored in bit position 35 of the CSW.

A device end bit is the signal from an I/O device that it has completed its portion of an I/O operation. This bit allows the channel to chain commands when the CC flag is on. The bit is stored in bit position 37 of the CSW.

A status modifier bit when received with a busy bit is interpreted by the channel as a control unit busy, described hereinafter, and is treated accordingly. The status modifier bit when received with a device ending bit during a chain command operation signals the channel to skip the next sequential CCW and to use the one following it to continue chaining. If chaining is not called for at the time the status modifier is received with the device end, then the status modifier is simply stored in bit position 33 of the CSW.

A control unit end bit indicates that a control unit is free to be used by the program. This bit should come from the device only if the device has sent a control unit busy in response to a previous command. The bit is stored in bit position 34 of the CSW.

The channel end bit indicates the completion of the portion of an I/O operation that involves transmission of data or control information between the I/O device in the channel. When this bit appears, it indicates that the channel is free to accept another operation. The bit is stored in bit position 36 of the CSW.

A unit check bit is sent by the device when it discovers any unusual condition. When this bit accompanies a channel end or a device end bit, the operation is terminated even though a chain flag might be on. The bit is stored in bit position 38 of the CSW.

A unit exception bit is provided when the I/O device detects a condition which usually does not occur. The bit causes the termination of an operation. The bit is stored in bit position 39 of the CSW.

4.2 CSW CHANNEL STATUS FIELD

The channel status field 116 describes a program control interruption; an incorrect length indication; a program check; a protection check, a channel data check; a channel control check, an interface control check and a chaining check.

A program controlled interruption (PCI) bit indicates that a PCI flag was present when a CCW was fetched. The interruption, due to the PCI flag, takes place as soon as possible after fetching of the CCW but may be delayed an unpredictable amount of time due to the CPU masking of the channel or other activity in the system. The appearance of a PCI channel status bit causes the channel to request an interrupt but in no way interferes with the progress of an I/O operation. The bit is stored in bit position 40 of the CSW.

An incorrect length indication bit appears at any time when the apparent record length on the device and the count received in the CCW do not agree and the SILI flag is off. The presence of the incorrect length bit suppresses command chaining and causes an interrupt condition with the incorrect length indication being stored in bit position 41 of the CSW.

A program check bit indicates the following errors due to programming: invalid CCW address specification; invalid CCW address; invalid command code; invalid count; invalid data address; invalid CAW format; invalid CCW format; invalid sequence. Detection of any program check condition during the initiation of a command causes the operation to be suppressed. When the condition is detected after the I/O device has been started, the device is signaled to terminate the operation. The bit is stored in bit position 42 of the CSW.

A protection check bit appears when the channel attempts to store data in an improper portion of main storage. Normally, the protection tag associated with the I/O operation does not match the tag of the address main storage location or neither of the tags is zero. Detection of this condition causes the channel to signal the device to terminate the operation. The bit is stored in bit position 43 of the CSW.

A channel data check bit appears when any parity errors occur in the channel or main storage. On input operations, the channel forces correct parity on all data placed in main storage. On output operation, the parity of data sent to the channel is not changed. Data errors suppress command chaining but do not terminate the present operation. The bit is stored in bit position 44 of the CSW.

A channel control bit appears when any machine malfunctions occur which will affect channel controls. The channel control check bit appears when parity errors occur on a CCW fetch, on data addresses and on the contents of CCW. The detection of any condition responsible for a channel control check status causes the current operation to be immediately terminated. The bit is stored in bit position 45 of the CSW.

An interface control check bit appears when an invalid signal occurs on the I/O interface. The status bit is detected by the channel and usually indicates a malfunctioning of an I/O device. The malfunction can be due to a received address having invalid parity; the status byte from I/O device having invalid parity; an improper received address; nonresponse from an addressed I/O device; an I/O signal of invalid duration and an I/O occurring at an improper time. Detection of the bit terminates the operation. The bit is stored in bit position 46 of the CSW.

A chaining check bit occurs only when the new data address does not fall on a double word boundary or an I/O data address is such that a byte boundary cannot be determined. Detection of a chaining check condition cause the I/O device to be signaled to terminate the operation. The bit is stored in bit position 47 of the CSW.

5.0 INTERFACES

The instructions, commands and control orders as presented in the word format, shown in FIGS. 3, 4, and 5, enable the channel to direct the flow of information between I/O devices and main storage. The instructions are decoded and executed by the CPU and art part of the CPU program. Commands are generated by the channel in response to the instruction. Each command is fetched from storage. The control orders are part of the commands and are also fetched from memory. When an instruction, command or order is initiated, the channel performs certain tests before initiation of an operation. In response to an instruction, the channel will send a condition code for the various instructions indicating the status of the channel as operational; not accepted or completed; the channel is actively engaged or that the channel control unit or device is not available to receive the issued instructions. When a channel has accepted an instruction, the address is transmitted to the I/O device and the return address is delivered to the channel. A proper compare of the sent and received addresses without errors will permit the operation to proceed. In the event an I/O device is unavailable, a signal is transmitted by the I/O device to the channel which in turn returns a condition code to the CPU indicating that the instruction cannot be performed. The CPU thereupon interrogates the storage to determine the condition preventing the I/O device from executing the command.

Having described the general features of the instructions, commands, orders and formats, therefore, for operating the present invention, it is believed in order to describe the various interfaces before a description of the channel structure and operational modes. An interface is a standard connection between the channel and another unit. The channel interfaces include a CPU interface, Storage interface, Bus Control interface, and I/O interface.

5.1 CPU INTERFACE

Referring to FIG. 6, the CPU interface may be divided into three parts. The first part is operation lines 105 required for normal program operation. The second part is diagnostic lines 128 employed by the CPU to assume diagnostic control of the channel. The third part is fault locating test lines 136 required to control the channel when the CPU is performing fault locating tests. Each part comprises multiplex and simplex lines.

5.11 OPERATIONAL LINES

The operational lines provide the only control necessary during normal program operation but are used in all modes to initiate required operation of channel. Included in the operational lines 105 are the following multiplex lines and simplex lines:

| Title | Number of Lines | Purpose |
|---|---|---|
| Start I/O (111) | 1 multiplex | This line, driven by the CPU, indicates the start I/O instruction to be performed by a channel selected by the CPU. |
| Test I/O (112) | do | This line, driven by the CPU indicates the test I/O instruction to be performed by a channel selected by the CPU. |
| Halt I/O (113) | do | This line, driven by the CPU, indicates the instruction to be performed by a channel selected by the CPU. |
| Test Channel (114) | do | Do. |
| Release (115) | do | This line terminates the communication between the CPU ane the channel. The line is driven by the channel. |
| Condition Lines (117) | 2 multiplex | These lines indicate the condition of the channel when the CPU receives a release. These lines are driven by the channel. |
| Initial Program Load (IPL) (118) | 1 multiplex | This line initiates each channel to do a complete reset and the selected channel to do an initial program load from a specified unit. This line is driven by the CPU. |
| Master Reset (119) | do | This line, driven by the CPU, carries a minimum 200 nano-second pulse that initiates a complete channel control unit and device reset. |

OPERATIONAL LINES—Continued

| Title | Number of Lines | Purpose |
|---|---|---|
| Clock Out (120) | do | This line, driven by the CPU, carries a signal indicating when a CPU is not in a halt or wait state. |
| Test Light (121) | do | A line, driven by the CPU, that is active any time a channel is not set to do a stop on control check and a log on stop. |
| Select Channel (122) | 1 simplex | This is brought up by the CPU to initiate an IPL or an I/O instruction at a specified channel. |
| Interrupt (123) | do | This line is activated by the channel and comes up when an interrupt condition appears. |
| Interrupt Response (124) | do | This line is activated by the CPU and comes up on a priority basis to allow a channel to store the CSW at a predetermined storage location. |
| Unit Address (125) Bus Out (UABO) | 8 data, 1 parity (simplex) | These lines supply the address of the I/O device selected to be operated. The lines are driven by the CPU. |
| Unit Address Bus In (UAB 1) | 8 data, 1 parity (simplex) | These lines supply the address of the selected I/O device initiated. The lines are driven by the channel and received by the CPU. |

5.12 DIAGNOSTIC LINES

The diagnostic lines 128 may be used by the CPU to determine the validity of the channel checking functions. Multiplex and simplex lines are employed for these purposes. The diagnostic lines shown in FIG. 6 are given below:

| Title | Number of Lines | Purpose |
|---|---|---|
| Block Storage Data Check (130) | 1 multiplex | This line, driven by the CPU, causes a selected channel to block setting of a storage data check. This function allows CCW's to be brought into the channel to test out sections of the channel check circuitry. |
| Reverse Data Parity (131) | do | This line, driven by the CPU, permits an invalid byte to be stored in memory. During a write operation the line may be used to correct bad parity when in a diagnostic mode. |
| Reverse Byte Counter Parity (132) | do | This line, driven by the CPU, causes the byte counter parity to be wrong when the byte count is updated in a selected channel. This function provides a means of testing the byte counter check circuits. |
| Diagnostic Stop Signal (133) | do | This line, driven by the CPU, causes a select channel to do a false error stop. |
| Diagnostic Select Channel | 1 simplex | This line, driven by the CPU, requests a specific channel to respond to any one of the preceding diagnostic lines. |

5.13 FAULT LOCATING TEST (FLT) CONTROLS

The FLT controls 136 are incorporated in the channel to make possible a CPU maintenance program. The maintenance program requires a considerable volume of data that is broken up into short tests. The data is on tape and must be brought into the memory without benefit of CPU instructions or interruptions. The FLT controls operate the channel to supply the data, monitor the progress, retry the data when errors are discovered and start and stop transmission. The FLT control includes multiplex and simplex lines which are connected between channel and a FLT control unit. The following multiplex and simplex lines as shown in FIG. 6 are connected between the channel and the FLT controls:

| Title | Number of Lines | Purpose |
|---|---|---|
| Scan Mode (137) | 1 multiplex | This line is connected to all channels and indicates when the FLT controls are operative. |
| Transfer-In-Channel (TIC) Pulse (138) | do | This line is connected between the channels and FLT control. The line carries a 300 nano-second pulse when a TIC command is encountered in a storage area has been filled. |
| Gap Pulse (139) | do | This line carries a 5 microsecond pulse from the channels to the FLT controls to signal an end of record. The pulse does not occur if an error was detected in the record. |
| FLT Data Error (140) | do | This line from the channels to the FLT controls signals a data error from the time of discovery until backspacing is complete. |

FAULT LOCATING TEST (FLT) CONTROLS—Continued

| Title | Number of Lines | Purpose |
|---|---|---|
| FLT Control Error (142) | do | This line from the channel to the FLT controls signals that the channel is unable to proceed. |
| Stop FLT (142) | do | This line from the FLT control to the channel signals the operating channel to stop transmission to storage and wait. |
| Start FLT (143) | do | This line from the FLT controls to the channel signals the selected channel to restart the transmission of data to storage. |

5.14 CPU INTERFACE OPERATIONS

The interface operations include (1) starting a channel in a selected mode of operation, i.e., operational diagnostic, or fault locating test; (2) interrupting a CPU or channel in operation and (3) terminating channel operation.

To start a channel, the CPU supplies an instruction which has the format indicated in FIG. 2. The CPU details for generating the format are supplied in the application Ser. No. 357,372 filed Apr. 6, 1964, now U.S. Patent 3,400,371, G. M. Amdahl et al., previously mentioned. The CPU operates selected multiplex and simplex lines to supply the instruction to the channel. The combination of the simplex and multiplex lines causes the channel and the device to perform certain tests and reply with one of four condition codes 00, 01, 11, and 10 relative to the status of the channel. The conditions code is set at the time the execution of the instruction is completed, i.e., the time the CPU is released to proceed with independent operation. The condition code indicates whether or not the channel has performed the function specified by the instruction, and if not, the reason for the rejection. The condition code can be used by the CPU for decision-making by subsequent branch-on conditions.

To supply the required instruction to the channel, the CPU raises the select channel line 122, 134 or 137 for operational, diagnostic or FLT mode operation. For operational the instruction lines start I/O 111, halt 112 or the like may be raised. For diagnostic the block storage data 130, reverse data parity 131 or like may be raised. For FLT the scan mode line 137 is raised.

Referring to FIG. 7, the operation of the interface is described for an operational mode. The CPU raises the select channel line 122, start I/O 111 and places the unit address on the UABO line 124. These lines are held up by the CPU until a condition code is supplied on condition lines 117. The condition lines may indicate a code 00 (binary 0) for operational channel available; a code 01 (binary 1) for the channel status word (CSW) stored; a code 10 (binary 2) for the channel busy; and a code 11 (binary 3) for the channel unavailable. After the transmission of the condition code, the channel raises the release line 115 and proceeds to execute the instruction. The CPU is released during this period, i.e., the CPU is processing the main program. Before the condition code is generated, however, the channel performs storage and I/O interface operations which will be described in more detail hereinafter.

To terminate the operation, the channel raises the interrupt line 123 and the CPU raises the interrupt response line 124. The channel proceeds to store channel status information in the storage unit. The channel release line 115 is raised after storage of the channel status information at a preselected storage location. The CPU line 124 drops when the line 115 is raised. The CPU returns to processing the main program.

The available condition or code 00 is indicated only when no errors are detected during the execution of the I/O instruction. When a programming error occurs in the information placed in the CCW and the address channel is working, either condition code 01 or 10 may be set, depending on the model of the system. Similarly, either code 00 or 11 may be set when a programming error occurs and a part of the addressed I/O system is not operational. In general, the following three types of errors can occur in executing an I/O instruction: channel equipment errors, channel programming errors, and device errors.

Channel equipment errors may be (1) the device address that the channel receives on an interface during initial selection has a parity error or is not the same as the one the channel has sent out; (2) the unit status byte of the CSW, that a channel received on an interface during initial selection has a parity error; (3) a signal from an I/O device occurred during initial selection at an invalid time or had an invalid operation; and (4) the channel has detected an error in its control equipment.

Channel programming errors that can be detected following the execution of a start I/O are invalid addresses and command codes in the CCW and CAW.

Device errors that can be detected are (1) errors that cause a unit check indication, and (2) errors that cause a unit exception indication.

5.15 CONDITION CODES

The condition codes for the other operational modes are slightly different from that indicated for the start I/O instructions. These codes are as indicated below.

TABLE II

| | 00 | 01 | 10 | 11 |
|---|---|---|---|---|
| Instruction: | | | | |
| Start I/O | Available | CSW stored | Busy | Unavailable. |
| Test I/O | do | do | Working | Do. |
| Halt I/O | Not working | | Halted | Do. |
| Test channel | Not working | CSW ready | Working | Do. |

The operation of the diagnostic and FLT modes are substantially the same as that indicated for the operational mode. Accordingly, the description of these modes will be omitted for reasons of brevity.

5.2 STORAGE INTERFACE

The storage interface 60 (see FIG. 1) carries the data and control information necessary for the channel to operate independently of the CPU. As has been previously noted, the channel is instructed by the CPU to commence an operation. Once instructed, the channel independently obtains the selected command and transmits data to or from storage until the command is executed. The storage bus only includes multiplex lines as indicated herein-below. The bus control interface 70 selects the channels which will compete with the CPU for specific priority to storage. Referring to FIG. 8, multiplex lines included in the storage interface are:

| Title | Number of Lines | Purpose |
|---|---|---|
| Storage Bus in (SBI) (150) | 72 multiplex (64 data, 8 parity) | These lines interconnect all channels to storage. The lines are activated when the channel sees a bus control unit data request. The lines will stay up until the data request falls. |
| Storage Address Bus (SAB)(151) | 24 multiplex (21 data, 3 parity) | These lines are connected from the channel to the storage for the bus control unit. The lines will rise when the channel sees a bus control unit response. The lines will remain activated until the response signal falls. |
| Mark Line (142) | 9 multiplex (8 data, 1 parity) | These lines connect a channel to the storage drivers and indicate which bytes are to be stored when the channel performs a store operation. |
| Tag Lines (153) | 5 multiplex (4 data, 1 parity) | These lines connect a channel to storage and carry storage protect information. The lines are activated as long as the SAB lines are activated. |
| Storage Bus Out (SBO)(154) | 72 multiplex (64 data, 8 parity) | These lines connect storage with each channel. The lines are activated after a BCU response has fallen, and an advance pulse of 200 nanosecond duration has been transmitted on a separate line. |
| Advance Pulse (155) | 1 multiplex | This line connects storage to the channel and carries a minimum 125 nanosecond pulse that lead data to the proper channel by approximately 200 nanoseconds. The channel divides the advance pulse into four portions: a raw advance, advance, data advance and storage cycle complete. |
| Storage Address Check (156) | do | This line connects both the BCU and storage. When activated the line indicates that a parity error has occurred on a received address bus. The error pulse sent to the channels brackets the advance pulse sent from storage. |
| Storage Data Check (157) | do | This line connects storage to the channel and indicates a data parity error has been found in information sent to storage on a store, or on information coming from storage in a search. A pulse on the line should be 200 nanoseconds and lies within 200 nanoseconds after the data normally rises on the SBO. |
| Storage Protection Check | do | This line connects storage to channel and indicates that channel has tried to store information into a protected area. A pulse on this line has the same width and timing as a storage data check pulse. |

A discussion of the storage bus interface operation will be deferred until after a description of the bus control interface is provided.

5.21 BUS CONTROL INTERFACE

The bus control unit interface regulates the operation of the storage bus interface. The bus control interface shown in FIG. 9 comprises multiplex and simplex lines. These lines are as follows:

| Title | Number of Lines | Purpose |
|---|---|---|
| Store (160) | 1 multiplex | This line connects the channel to the BCU and is activated when an address is placed on the SAB. When activated the line indicates the channel is doing a store operation. |
| Address Valid (161) | do | This line connects the channel to the BCU and indicates that an address on the SAB is valid. A signal on the line falls after a BCU response. |
| CDA Priority (162) | do | This line connects the channel to the BCU and when activated suppresses the CPU competition. The line is included where a system does not assign a top priority to the channels. |
| Storage Request (163) | 1 simplex | This line connects each channel to the BCU and requests priority for a storage cycle. The line will drop when a channel sees a BCU response activated. |
| Invalid Storage Address (164) | 1 multiplex | This line connects the BCU to the channels. When activated the BCU has detected a non-existent address on the SAB lines from the channel. An error pulse must bracket the advance pulse sent from storage. |
| BCU Response (165) | 1 simplex | This line is connected from the BCU to each channel. The line comes up and the BCU grants priority to a particular channel which is requesting an address on the SAB. The line will stay up as long as an address is requested on the SAB. |
| BCU Data Request (166) | do | This line connects the BCU to each channel. The line is activated as long as the BCU wants data on the SBI. |
| BCU Accept Line (167) | do | This line connects the BCU to each channel. The line is activated when the BCU accepts the address valid line. |

5.22 STORAGE AND BCU INTERFACE OPERATION

Referring to FIG. 10, a channel storage or fetch request is initiated by raising the storage request line 163. The storage request line is activated for any number of conditions, e.g., CCW fetch, write, read, data fetch, etc. For a read operation, the memory request sets a trigger which holds up the storage request line until the bus control unit responds. The BCU raises the BCU response line 165 as a result of the storage request. When the storage request line falls, the bus control unit raises the BCU data request line 166 and the channel supplies the address placed on the SAB line 151. The channel raises the address valid line 161. With address valid, the BCU raises the accept line 167 and the address valid line 161 drops. The storage unit 20 places a pulse on the advance line 155 and this is followed by the data being placed on SDBO line.

When the channel desires to store information in storage or in a read operation, the store line 163 is brought up at the time the SAB line 151 is raised. The BCU response line 165 will drop when the BCU data request line 166 is raised. The data on the storage bus in 150 will be supplied to the storage unit. The BCU will raise the storage address check 156 in the event a parity error exists on the received address. Alternatively, the invalid storage address line 164 will be raised by the BCU when a non-existent address appears on the SAB line. The storage unit will raise the storage data check line 157 in the event a data parity error exists in the incoming information. Alternatively, the storage unit will raise the storage protection line 158 when the channel is attempting to store information in a protected area.

5.3 I/O INTERFACE

The I/O interface provides a uniform connection for attaching any I/O control unit to the channel. The interface comprises a set of lines which are time shared to transmit all information for the operation of I/O devices. The information transmitted includes device addresses, control signals, and data. The interface can accommodate up to eight control units and up to 256 directly addressable devices.

The multiplexing facilities of the interface permit the possibility of any number of the 256 devices to operate concurrently on a single interface, i.e., portions of various messages can be transmitted over the interface in an interleaved fashion to or from different I/O devices or the complete message can be transmitted in a single interface operation. The operation is determined by the particular channel and the I/O control unit.

The rise and fall of all signals transmitted over the interface are interlocked with corresponding responses. This removes the dependence of the interface on circuit speed, and makes it applicable to a wide variety of circuits and data rates. Furthermore, it permits the interconnection of a channel and control unit of different circuit speeds.

The signal lines for the I/O interface, as shown in FIG. 11, comprise the following:

| Title | No. of Lines | Purpose |
|---|---|---|
| Data Bus Out (170) | 9 (8 data, 1 parity) | These lines transmit address commands and data to the control units. The type of information transmitted is indicated by tag line. The period during which information is valid is also controlled by the tag lines. |
| Tag Lines Out (address 171, command 172 and service 173). | 3 | The tag lines are: address out 171, command out 172 and service out 173. Address out is used to initiate selection of an I/O device. The address appears on the bus out. Alternatively, address out is used to disconnect operations from the interface. The command out lines indicate to a selected I/O device that a command has been placed on the bus out. Service out indicates to a select I/O device that a channel has accepted the information on bus in, or has provided on bus out the data requested by service in. |
| Scan Controls (select out 174, select in 175). | 2 | These controls comprise a select out 174 and select in line 175. The select out line together with the select in line provide the loop for scanning attached control units. A control unit can respond only at the rise of an incoming select out signal. Once a control unit has propogated a select out signal it cannot be activated until the next select out signal. |
| Interlocks (operational out 176, operational in 177). | 2 | All lines from the channel are significant only when operational out 176 is up. A suppress out line, described hereinafter, is an exception to this. Whenever operation out drops, all in lines on the control unit must drop and a particular operation must be reset. Operational in 177 is a line used to signal a channel that an I/O device has been selected. The rise of the operational in line indicates response to address on bus out, request for data on bus out, offer of data on bus in, or offer of status. |
| Bus In (178) | 9 | These lines correspond to the function of bus out. |
| Tag Lines In (address 179, status 180 and service 181). | 3 | These lines comprise address in 179, status in 180, and service in 181. The address in and service in lines correspond to the address out and service out lines previously described. The status in line is used to signal a channel when the selected I/O device has placed status information on bus in. |
| Special Control (182) | 1 | One special control line is a suppress out line 182. This line is used alone and in conjunction with the tag out lines to provide the following special functions: (1) suppress status—when suppress out is up, attention or status information that has been stacked in the control unit is suppressed. No further attempt is made to prevent this status information as long as suppress out is up; (2) suppress data transfer—the service in line cannot rise if suppress out is up; (3) chained command control— chaining is indicated if suppress out is up when service out responds to status in; and (4) selective reset—the device in operation will be set when suppress out is up and operational out drops. |
| Hold Out (183) | 1 | This line is optional depending upon the I/O device. When dropped, the I/O operation is terminated immediately. There is no need to wait for the select out pulse to pass through all prior control units. |

5.31 I/O INTERFACE OPERATION

The interface operation may proceed in two different modes, i.e., data interleaved (multiplex) or burst (selector). Each mode may begin by a CPU instruction or the I/O device indicating that information is available for storage. Each of these modes and operations will now be considered.

5.311 DATA INTERLEAVED (CPU INSTRUCTION) OPERATION

As shown in FIG. 12, an I/O device is selected by raising the select out line 174 and the hold out line 183 when required. The control unit raises the select in line 175. The select in line is the other side of the select out line. Next, the channel places the selected address on the bus out 170 and raises the address out line 171. When the select out line 174 and hold out line 183 are raised, each control unit connected to the channel attempts to decode the given address.

The address must have correct parity to be recognized and only one control unit will recognize any given address on the same interface. When address out 171 is up and the incoming select out line to the I/O device rises, the selected control unit raises the operational in line 177. The channel will drop the select out line during the initial selection sequence at this point. After address out falls, the unit address is placed on bus in 178 accompanied by a signal on the address in line 180. The channel checks the address, and responds by placing the command on the bus out 170 and signaling on the command out line 172. The selected control unit then replaces the address with status information on bus in 178 and replaces the address line with the status in line 181. The operational in line remains up throughout this operation. The status information informs the channel that the command was accepted or rejected. In case the channel cannot handle this status, command out will respond to status in and the status is stacked as described hereinafter in connection with a sequence 5 ending procedure (see FIG. 16S). If the control unit sends an intervention required with its status into the channel, as for instance, after an invalid command, the channel if it accepts this status responds with service out line 173, and the control unit responds with the service in line 181. This ends the initial selection phase after having established the desired connection between the channel and a control unit and associated I/O devices. The I/O device now begins to send data on the bus in 178.

If the device path is busy operating, the control unit 28 responds with a busy bit alone in the status byte. If the control unit has outstanding status, it responds with a busy bit (indicating a busy reject to the new command) plus the outstanding status. If the command is test I/O and the device path is not busy, a busy bit is not included with the status since the test I/O command is not rejected. If the device path is free, the control unit presents zero status. If the command is a control command, which could be specified and executed with the information contained in the command byte and could immediately free up both channel and control unit, then the control unit can respond with end status at this time.

When the selected I/O device requires service, as indicated in FIG. 12A, the control unit places the device address on bus in 178 and signals on both the address in 179 and operational in lines 177 at the time the select out 174 rises at the control unit, and further provided that no I/O selection is being attempted by the channel. The select out line 174 from the channel will fall after address in rises. When the channel has recognized the address and is prepared to send or receive the data, a command out 172 signal is sent to the control unit which indicates proceed. The control unit then places the device address on bus in 178 with the input data required, if reading or sensing, and drops the address in line 179 and raises the service in line 181. If writing or controlling, the action is the same except nothing is on bus in. When the channel has accepted the input data or has input data available, it responds to the control unit with a service out signal 173. The control unit then drops the service in line 181 and the operational in line 177 if the select out line is down at the control unit. The service out signal drops after the signal after the service in or operational in drops at the channel. The channel then raises the select out line in search for another I/O control unit requiring service.

The above procedure is repeated for each new byte of data until the end of the operation is reached. A detailed description of these operations will be provided in connection with sequence 2 routine described in FIGS. 16N through 16O.

The ending procedure may be initiated by either the I/O device or the I/O channel. If the procedure is initiated by the I/O device, the end of operation is completed in one signal sequence. If the procedure is initiated by the I/O channel, the I/O device may still require time to reach a point where the proper status information is available, in which case a second signal sequence is necessary to complete the ending procedure. One of three situations may exist at the initiating of the ending procedure.

The first situation is where the I/O channel recognizes the end of an operation before the I/O device reaches its ending point. In this situation, whenever the I/O control unit next requires service, it obtains selection and raises its address in line to prepare for the data transfer. The I/O channel responds with command out which indicates proceed. The I/O control unit raises the service in line after command out falls. The I/O channel drops service in and proceeds to its normal ending point without requesting further service. When the I/O device reaches its normal ending point, the control unit obtains selection and raises the address in line. The I/O channel responds with command out. When the command out falls, the I/O control unit places the status (including end) on bus end and raises the status in line. The I/O channel responds with service out, unless it is necessary to store this status. This then terminates the data interleave operation, causing the channel to go on with periodic scanning.

The second situation is where the I/O device recognizes the end of an operation before the I/O channel or the I/O device and channel recognizes the end of operations simultaneously. The third situation is where the I/O device recognizes the end of an operation before the channel reaches the end. In both of these cases all status information is available at the I/O control unit. Accordingly, the signal sequence is the same as that previously described when the I/O device reaches its normal ending point.

When it is necessary to queue that status, the suppress out is raised. When the suppress out is down, the control unit sends status in at each opportunity, until it is accepted (service out).

5.312 BURST MODE OPERATION

The burst mode of I/O operation is substantially the same as that described for data interleave mode. The difference is that if the channel is designed to operate in burst mode, it will not lower select out if operational in rises. Select out remaining up keeps the control unit connected to the channel and no further addressing is required for data transmission as long as select out remains up. The selected control unit will hold up its operational in as long as select in is up. If the control unit is designed for burst mode, it will hold up operational in effecting the same result.

In burst mode no addresss is necessary for data transmission to or from the channel. When a byte of data is ready for transmission to or from the I/O channel, a service in signal is sent to the channel and the data are placed on bus in, if this is an input operation. When the channel has accepted the input data, or has data available for output, data are placed on bus out and the channels sends a response on the service out line. This procedure is repeated for each byte of data as long as the operation in line remains up.

The ending procedure is nearly the same as the described for the data end of the mode, except that no addressing is required to initiate the stop sequence control.

If select out is down, or dropped, after the receipt of the stop signal, the control unit can disconnect from the interface by dropping operational in. In this case, the end status is presented to the channel as described for data interleaved mode.

Otherwise, if operational in remains up at the control unit when the device reaches its ending point the control unit presents its in status to the channel and if the channel accepts the status, the latter responds with service out. Operational in drops if select out is down. This terminates the I/O operation, freeing the device for a new selection.

If any status information cannot be handled, the channel will respond with command out instead of service out, which causes a stack of the status in the control unit. If select out drops before command out drops, the control unit drops operational in, disconnecting from the interface. If on the other hand, select out remains up, the control unit repeats sending in its status.

The remainder of the channel description will proceed based upon burst mode operation of the I/O interface.

6.0 CHANNEL UNITS

Having described the interface circuitry and operation, it is now believed in order to describe the general details and operation of the channel per se. The channel, as shown in FIGS. 13A, B; 14A through F and 15A through C comprises programming registers, data transfer registers, controls and clock means. These units respond to an instruction from the CPU to transfer information to or from storage. When an I/O device provides any signal that should be brought to the attention of the CPU program, the channel converts the signal to a format compatible to that used by the CPU. The channel contains all the common facilities for the control of I/O operation. The I/O operations are completely overlapped with the activity in the CPU. Additionally, the channel operations are overlapped with one only. The only main storage cycles required during I/O operations are those needed to transfer the data to or from the final locations in main storage. These cycles do not interfere with the CPU program, except when both the CPU and the channel concurrently attempt to refer to the same storage. Each of the various sections of the channel will be considered in the following paragraphs:

6.1 PROGRAMMING REGISTERS

Referring to FIG 13A, a data flow diagram indicates a data address register 200, a command register 202, a flag register 204, a count register 206, a storage protection register 208, a unit address register 210, and an operation register 212. Cooperating with these registers are an adder 214 and a byte counter 216. The registers are connected together through the storage bus in 150 and out 154, storage address bus in 151, and other data paths described in connection with FIGS. 6, 8, 9 and 11. The horizontal lines across the top of a register indicate the number of bit positions receiving a particular input. The horizontal lines across the bottom of a register indicates the number of bit positions providing a particular output. The partial circles in the data paths indicate gating means. The figure references in a block indicate where the details of the unit may be ascertained.

Referring to FIG. 13A, the data address register 200 is a 24 position register. Additional positions are included for parity checking. Each storage position is a latch circuit which will be described hereinafter. Data entry for the register is from two sources, Each bit position is wired to a preselected line of the storage bus in 150 and storage bus out 154. All bit positions except the three low order positions are further wired to a corresponding bit position of the adder 214. The outputs of each bit position are to a corresponding bit position of the adder 214. All bit positions except the three low order positions are further connected to preselected lines of the storage address bus 151. The three low order bit positions of the register are connected as inputs to the byte counter 216 and the corresponding positions of the adder 214.

Basically, the register 200 (21 bits thereof) holds the address where data is to be stored in the storage unit. During a transfer-in-channel command, the register holds the address of the next CCW. This same address is updated and sent to register 202 as the next CAW. The register is updated according to a read, write or a read backward operation. The three low order positions indicate the byte position of a word where storage or transfer is to begin.

The command address register 202 is a 21 position register. Each position consists of a latch of the type indicated in the data register. Three additional positions are included for parity indication. Entry to the command address register is through corresponding bit positions of the adder 214. These inputs are ANDed together with suitable gating, as will appear hereinafter. One output from the command address register is supplied to corresponding adder positions. Another output is supplied to preselected lines of a channel status bus 218 which ultimately connects to the storage data bus in 150. The other output is to storage address bus 151.

The register 202 holds the CAW which provides the location of the desired CCW. While the CCW is fetched, the CAW is updated to provide the location of the next CCW, if desired. The contents of the register become part of the CSW when an interrupt condition is signaled by the channel.

The count register 206 is a 16 bit register. Each position consists of a latch. Additional positions are included for parity checking. The register also includes a last word trigger output, a count less than two, and a count less than one trigger which will be described hereinafter. Entry to the count register is through preselected lines of the storage data bus output 154 and corresponding bit positions of the adder 214. These inputs are suitably ANDed with gating signals to be described hereinafter.

The outputs available from the count register appear in true and complement form. The three low order bits are supplied to a byte-count-register comparator 312 and mark B register 302 (see FIG. 13B). All bit positions are supplied to the adder 214 and to the CSW bus 218. Suitable gating circuits operate the count register as will appear hereinafter.

The count register accepts the count field from the CCW supplied from storage. The count field is altered by the adder as data transfer occurs through the channel. Additionally, the count field and low order positions of the byte counter are algebraically related to determine the end of a data transfer operation.

The flag register 204 is a five bit position register. Each position consists of a latch. Entry to the flag register is through selected positions of the storage data bus out 150. These inputs are ANDed together with suitable gating signals as will appear hereinafter. The outputs are supplied to parity checking circuits 205. Other outputs (not shown) are supplied to various control circuits to be described hereinafter.

The flag register holds the five flags described in conjunction with FIG. 4. The flags, for example, indicate whether chaining is to be performed or a channel error condition exists.

The unit address register 210 is an eight bit position register for receiving the address field of the CPU instruction. The address field selects the I/O device to be operated. Entry to each bit position is supplied by the unit address bus out 125 and the data bus in 176. These input signals are suitably gating to develop output signals which are supplied to corresponding bit positions of a unit address compare register 211. The outputs are also supplied to the unit address bus in 126, and to the I/O bus out 170. Outputs (not shown) are also provided for storage data bus in 156 gating circuit.

The register holds the address which is employed to select an I/O device. Alternatively the register holds the address of a device supplying interrupt status. Parity checking circuits are also included in the register.

The unit address compare register 211 is an eight bit position register for comparing the address on the unit address but out 125 and the I/O bus in 170. Based on this comparison, a unit address compare signal is supplied to suitable control circuitry, described hereinafter, for operating the channel.

The storage protection register 208 is a 4 bit position register. Each position consists of a latch. Entry to the register is through preselected positions of the storage data bus out 154. These inputs are ANDed together with suitable gating signals. The outputs from the register are supplied to the storage protect bus 153 and selected bit positions of the channel status bus 218. Additionally, outputs are supplied to a parity checking circuit 209.

The register 208 holds the storage protection tags which locate the area in storage to which data operations will be confined. This data is supplied as part of the CSW when an interrupt or other channel terminating condition occurs.

The operations register 212 is an 8 position register. Additional positions are included for parity checking. Each position consists of a latch circuit. Entry to the operations register is through the storage data bus out 154. These inputs are ANDed together with suitable gating signals. The outputs from the register are supplied to the data out bus 170 of the I/O interface. Additionally, these outputs are also supplied to storage data bus in gating (not shown). One output (not shown) is supplied to the byte counter 216 to indicate a read backward operation.

The register 212 supplies the command code described in conjunction with FIG. 4 and Table I for operating the I/O devices 26' (see FIG. 1) in the particular modes, i.e., read, write, sense, and the like. Commands that initiate these operations cause all eight bits to be transmitted to the I/O device. The high order bits contain modifier bits. These bits specify to the I/O device the details of how the command is to be executed. They may cause the I/O device to compare data received during a write operation with data previously recorded and they may specify such conditions as recording density and parity. For the control command, the modifier bits may contain the order code specifying the control function to be performed.

Whenever the channel detects an invalid command, a program checks condition is generated. When the CCW contains an invalid code, the status portion of the CSW is stored during the execution of the start I/O instruction. When the invalid code is detected during command chaining, the new operation is not initiated and an interruption condition is generated. The command code is disregarded during data chaining.

The adder 214 is a 24 position unit including a full adder portion and an increment and decrement portion.

The full adder portion involves the four low order bit positions. The remainder of the adder is the increment and decrement portion. All bit positions have a latched output controlled by suitable gating circuitry.

Entry from the low order bit positions is from the data register 200. Additional inputs are supplied from the count register 206 which supplies inputs to all adder bit positions. Bit position 4 receives a carry signal (not shown) from the increment-decrement portion and the data address signal. Outputs are supplied to a parity checking circuit (not shown), the incrementer-decrementer position (not shown) and the count register 206.

Each bit position of the incrementer-decrementer receives inputs from the command address register 202 and the data address register 200. Additionally, these bit positions except the last byte or high order positions receive an input from the count register 206. Outputs are supplied to the data address register 200, command address register 202, and count register 206. An output is also supplied to a parity error checking circuit (not shown). Incrementing or decrementing is determined by an adder group carry and borrow circuits (not shown).

The adder, incrementer-decrementer, parity prediction circuits, group carries and borrow circuits cooperate to update the count field and increment or decrement the data address or command address fields. During these processes the command address registers and count register are verified from a parity error standpoint. Any parity error is reported to the appropriate controls for initiating the proper diagnostic routine for the channel. The adder decrements the count by eight and increments the data address by eight.

The byte counter 216 is a three position unit for variable word boundary selection of the data transmitted between the I/O device to storage. The counter includes a register 215, a decoder 217, and a latch 219. Each register bit position 218 comprises three like circuits suitably interconnected. Entry to each bit position is supplied by the three low order outputs of the data address register 200. Suitable gating signals (not shown) are provided in developing output signals supplied to the byte counter decoder 217 and latch circuits 219. Outputs are also supplied to a parity and zero check circuit to be described hereinafter.

The byte counter decoder 217 receives the three inputs from the register 215 and provides like outputs to mark B register 302 and the data B resistor 310 (see FIG. 13B). The encoder selects the appropriate triggers of the mark B register and data B register for operating the storage address bus in supplying the data stored in the A register 308 to storage. The latch 219 receives the same inputs as the register 215. These outputs are supplied to a byte count-count register comparator 312 described in FIG. 13B. The byte counter is a binary octal counter with a parity bit for self checking purposes. The latch and decoder sections form a look-ahead feature which eliminates ripple time associated with binary trigger counters. When the byte counter receives a change signal, the register 215 is set to the value in the look-ahead feature. The look-ahead value is arranged to be one number higher than that in the register positions. Once the register has changed, there is no delay required to decode the outputs as the look-ahead feature is latched while the counter is changing. The look-ahead circuitry advances immediately to the next number as soon as the change occurs. The counter may be set to any number by the data address input.

6.2 DATA TRANSFER REGISTERS

Having described the programming registers for the channel, it is believed now in order to describe the data transfer registers for transferring data between storage and the I/O devices. Referring to FIG. 13B, the data transfer registers include a mark A register 300, a mark B register 302, an A register 308, a B register 310, a byte counter-count register comparator 312, I/O bus in circuits 316, I/O bus out circuits 318, channel status circuits 320 and an address compare register 322. Each of these registers will be considered in the separate paragraphs hereinafter.

The mark A register 300 is an eight position register that includes an additional position for a parity error check. Each bit position is a conventional latch circuit. Entry to the mark A register is from corresponding bit position of the mark B register. These inputs are ANDed together with suitable gating signals.

The mark A register also receives as gating inputs channel memory controls and other signals. These control signals cooperate with the bit position inputs to provide outputs to the mark bus 153 of the storage. Outputs provided by the various bit positions of the mark A register set the storage triggers for storing data at selected storage locations.

The mark B register 302 is an eight bit position register. Each bit position is a conventional latch circuit. Entry to the mark B register is supplied by the output of the byte counter decoder 217. The count register 206 also supplies i's four low order bits to corresponding positions of the mark B register. These signals are ANDed together with suitable write control signals and a gating signal. The register also includes means for parity error checking. All bit positions are supplied to the corresponding bit positions of the mark A register. The three low order bit positions are supplied to the byte count register comparator 312 for word boundary determination. The three low order bits are also supplied to the storage data bus out 154. The mark B register sets the mark A register based upon received inputs.

The A register is a 64 bit register for transferring data or assembling data between the storage 20 and the I/O devices 26, 30 and the like (see FIG. 1). Each bit position is a conventional AND/OR/INVERT cooperating with a conventional inverter to form a latch circuit. Entry to each bit position is from preselected lines of the storage data bus out 154. Also, the corresponding bit positions of the B register 310 are connected to the A register bit positions. These inputs are ANDed together with suitable storage data bus gating signals. As outputs, each bit position is connected to corresponding bit position of the B register and to preselected lines of the storage data bus in 150. A parity bit is generated for each byte and supplied to the B register and the storage data bus in.

The B register 310 is like the A register, a 64 bit register. Each bit position has the same circuit configuration. Entry to each bit position is from the corresponding bit position of the A register. Each bit position is further connected to the I/O bus in 176. These inputs are ANDed together with A register gating signals and I/O gating signals. The I/O gating signals direct the various bytes of incoming data to the various byte positions. The number of bit positions in a group is selected as eight to handle the byte of information coming from the I/O device. Each group of bytes includes parity error checking means.

The output from each bit position is supplied to corresponding bit positions of the A register as previously indicated. Outputs are also provided to preselected lines of the I/O data bus out 170. Thus, the B register is adapted to transfer data into storage and out to the I/O devices.

The comparator 312 is a six position unit for receiving true and complement signals from the byte counter latch 219 and the count register 202 (see FIG. 13A). The true and complement signals from different registers are ANDed together to provide an output to suitable control circuitry. The comparator also receives as an input the three low order bits of the mark B register 202. These inputs are ANDed together with the byte counter latch 219 outputs to provide an output indicating that the byte counter equals the mark B register. This output is also supplied to suitable control circuitry to be described hereinafter.

During data transfer, the comparator 312 compares the outputs of the count register 206 and the byte counter 216 (see FIG. 13A) to determine the termination of data transfer. The details of this operation will be provided in conjunction with a description of the channel operation.

The bus in receiver and latch circuit 316 is an eight position unit with an additional position for parity indication. Each position is a conventional latch circut. Each position is connected to a particular line of the I/O bus in 176. Outputs are supplied to preselected lines of the B register. Other outputs are supplied to preselected bit positions of the unit address register 210 (see FIG. 13A). Additionally, outputs are supplied to the channel status circuit 320 to be described hereinafter. The unit 316 is operated by suitable gating signals supplied by control circuits to be described hereinafter. The unit receives the data transmitted on the data bus in and transmits the data to the appropriate unit as part of the I/O interface operation previously described in connection with FIG. 11.

The bus out receiver and latch circuit 318 is arranged in a configuration substantially the same as that described for the unit 316. The unit has eight positions plus an additional position for parity. Each position is a conventional latch circuit. Preselected positions are the B register 310 connected to selected unit positions 318. Additionally, the operation register 212 and the unit address register 210 are connected to selected unit positions 318. Outputs are supplied to the I/O bus out 170. Outputs on the line are determined by the tag lines 171 described in connection with FIG. 11. Outputs appear on the line according to gating signals supplied from suitable control circuitry to be described hereinafter.

The address compare register 322 is an eight position register and includes an additional position for parity check. Each position is a conventional AND/OR/INVERT circuit. Each position is connected to the I/O bus out 170 and to the input circuitry for the unit address register 210 (see FIG. 13A). An output signal is supplied to suitable control circuitry (not shown) in connection with the initial setup of the channel when responding to an instruction.

As part of the channel setup procedure, the address in from the I/O device and the address out to the I/O device must be compared for reasons indicated in connection with the description of FIG. 11. The compare register 322 fulfills this purpose in the channel.

The channel status circuits 320 comprise a plurality of latch circuits responsive to various inputs for indicating the various conditions of the CSW described in FIG. 5. Among the various channel status circuits are a wrong length record, a command address update, a program check, a memory protection, a data channel check, a channel control check, and a chaining check. Each latch circuit receives various flag, trigger, control, and gating signals to develop the desired status signal. The output from the various latch circuits are supplied to the channel status bus 218 for transmission to a storage unit over the storage bus in 150. Outputs (not shown) are supplied to other control circuits as will appear hereinafter.

The channel status and the device status are sent to storage as part of the CSW. The device status is provided on the bus in line 176 and gated to storage. The details of generating the device status are described in a copending application Ser. No. 357,370, previously mentioned.

6.3 CHANNEL CONTROLS

Having described the data registers, it is now believed in order to describe the channel controls. These controls interrelate and coordinate the operation of the channel units. Various control means are required to perform this function. The controls may be divided into seven principal categories. These categories are storage, I/O, CPU, BCU, command control, data transfer and ending sequence. Each of these categories have subcategories which will be enumerated when the particular category is described.

6.31 I/O INTERFACE CONTROLS

The I/O interface controls respond to the CPU instructions, channel commands and I/O device requests to transfer data between the channel and the I/O device. The controls also generate a polling signal for selecting a control unit requiring service. Included in the controls are a tag line in/out section, polling section, polling interrupt section, operational lines section, scan and special lines section. Each of these sections will be described in the following paragraphs in block form. The details of each control circuit are given in the figure numbers included in the block.

Figure 14A:
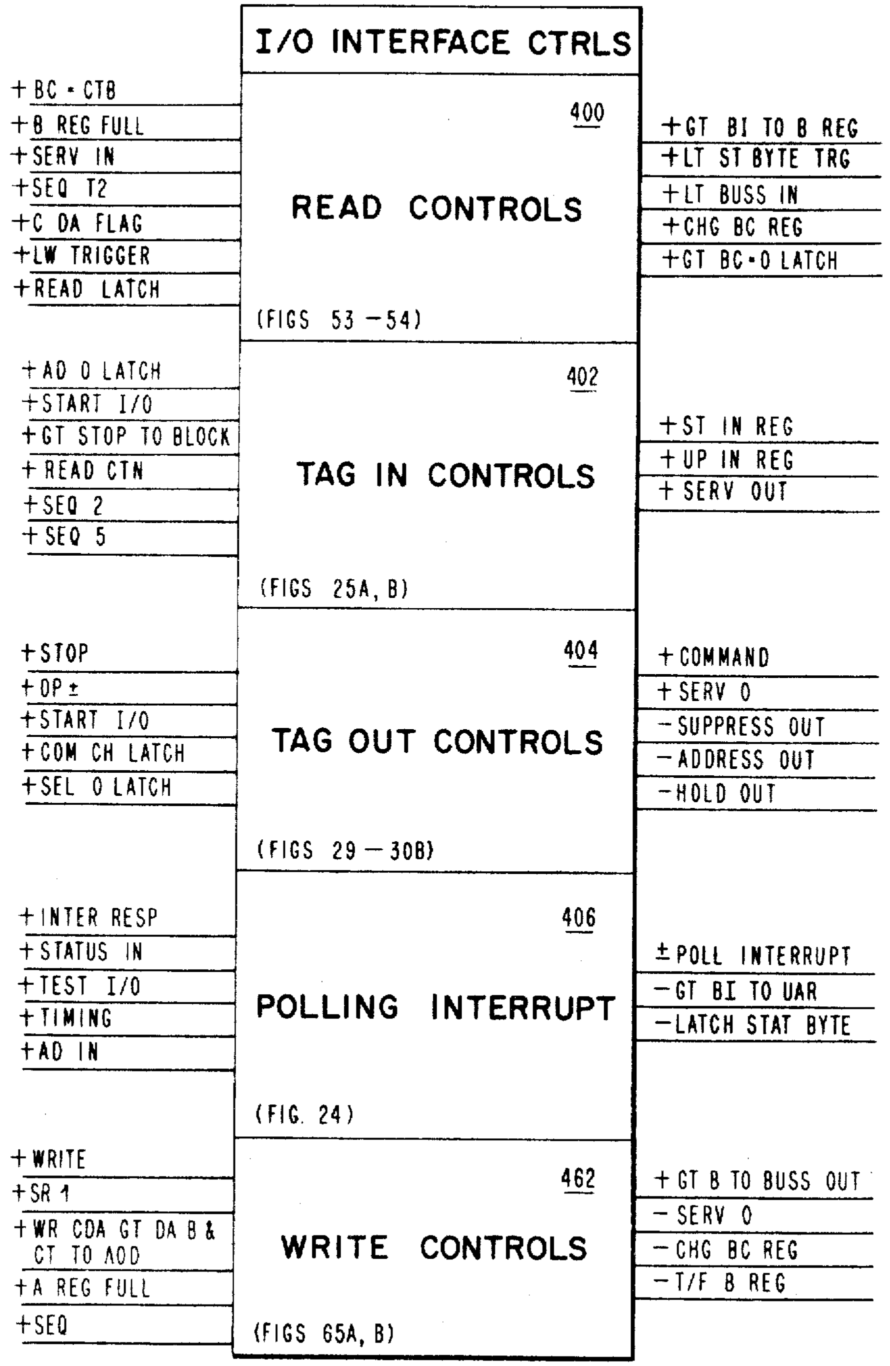
Figure 14B:
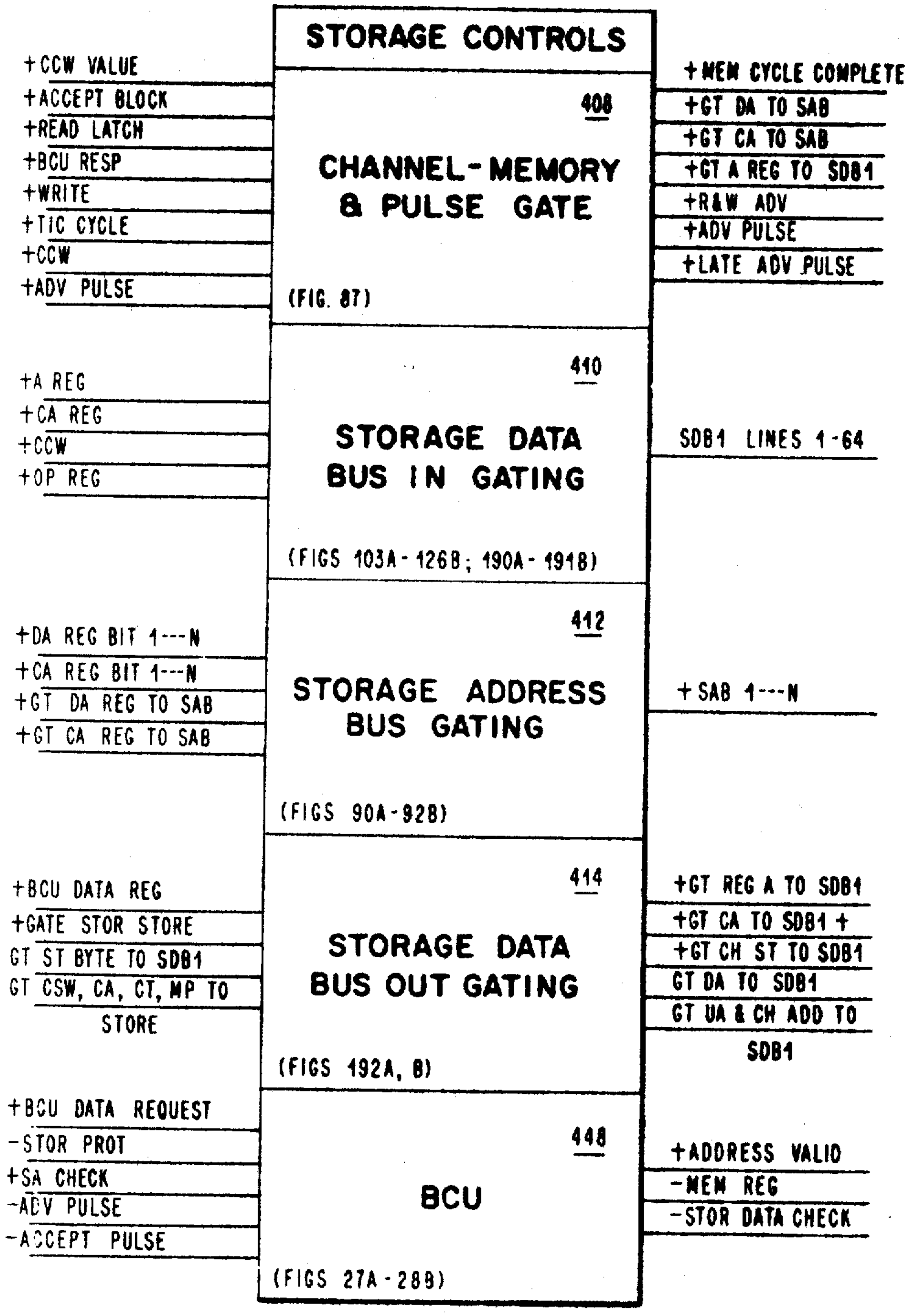
Figure 14C:
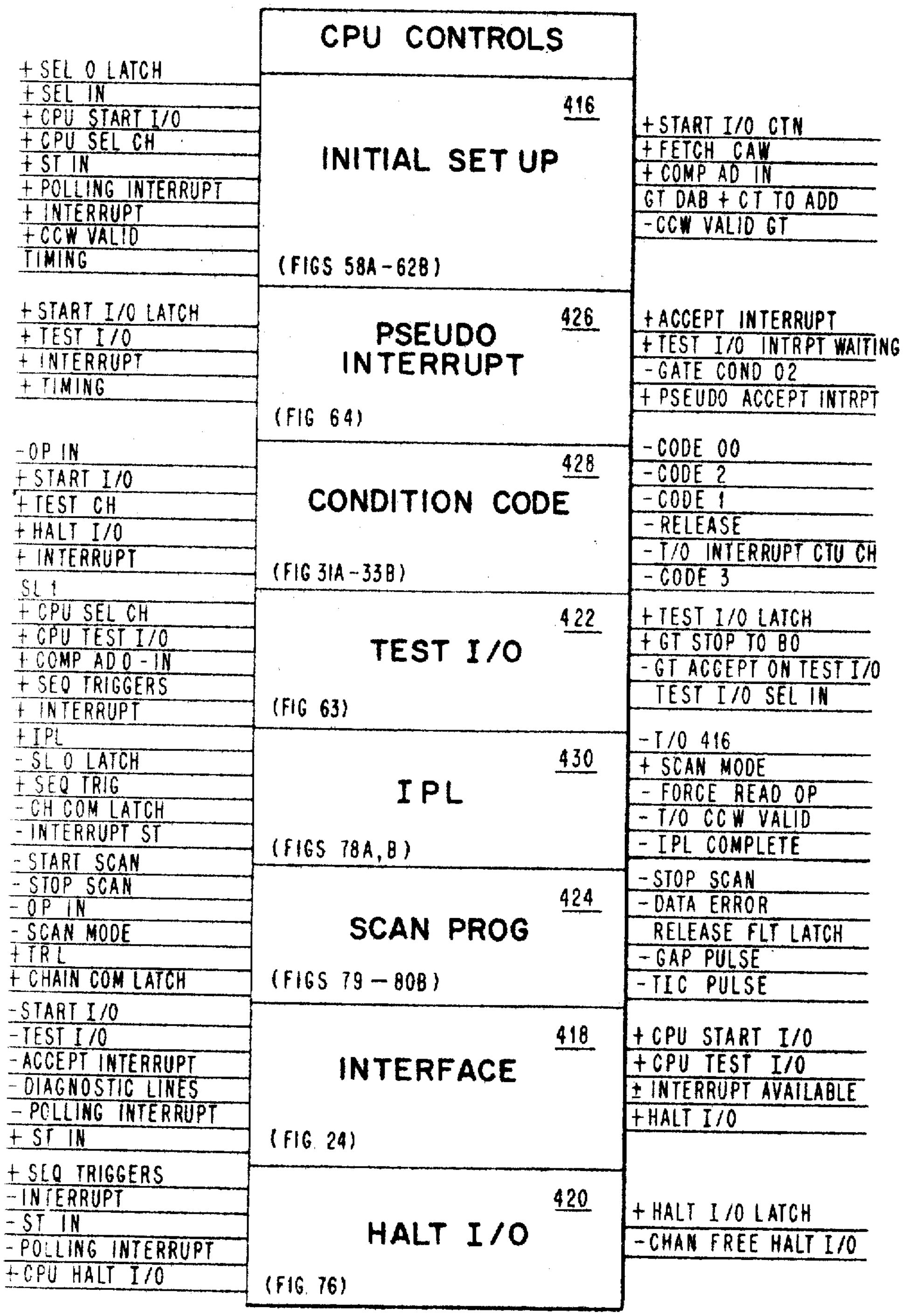

Referring to FIG. 14A, the I/O controls are shown in block form with various inputs and outputs. These inputs and outputs represent only the more important lines to or from the controls. The other lines to the controls are indicated in the figure numbers included in the block which appear hereinafter.

Figure 53:
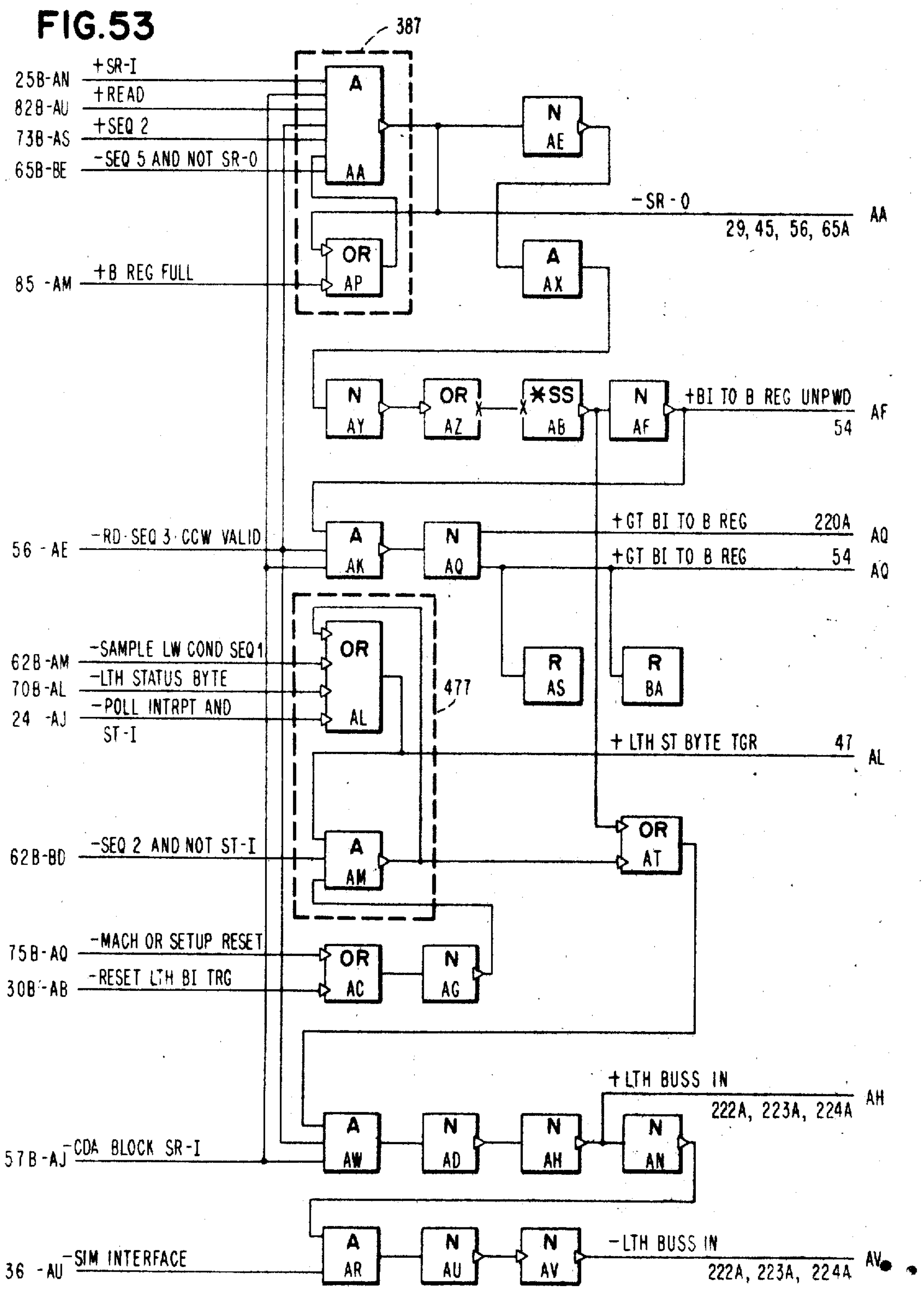
Figure 54:
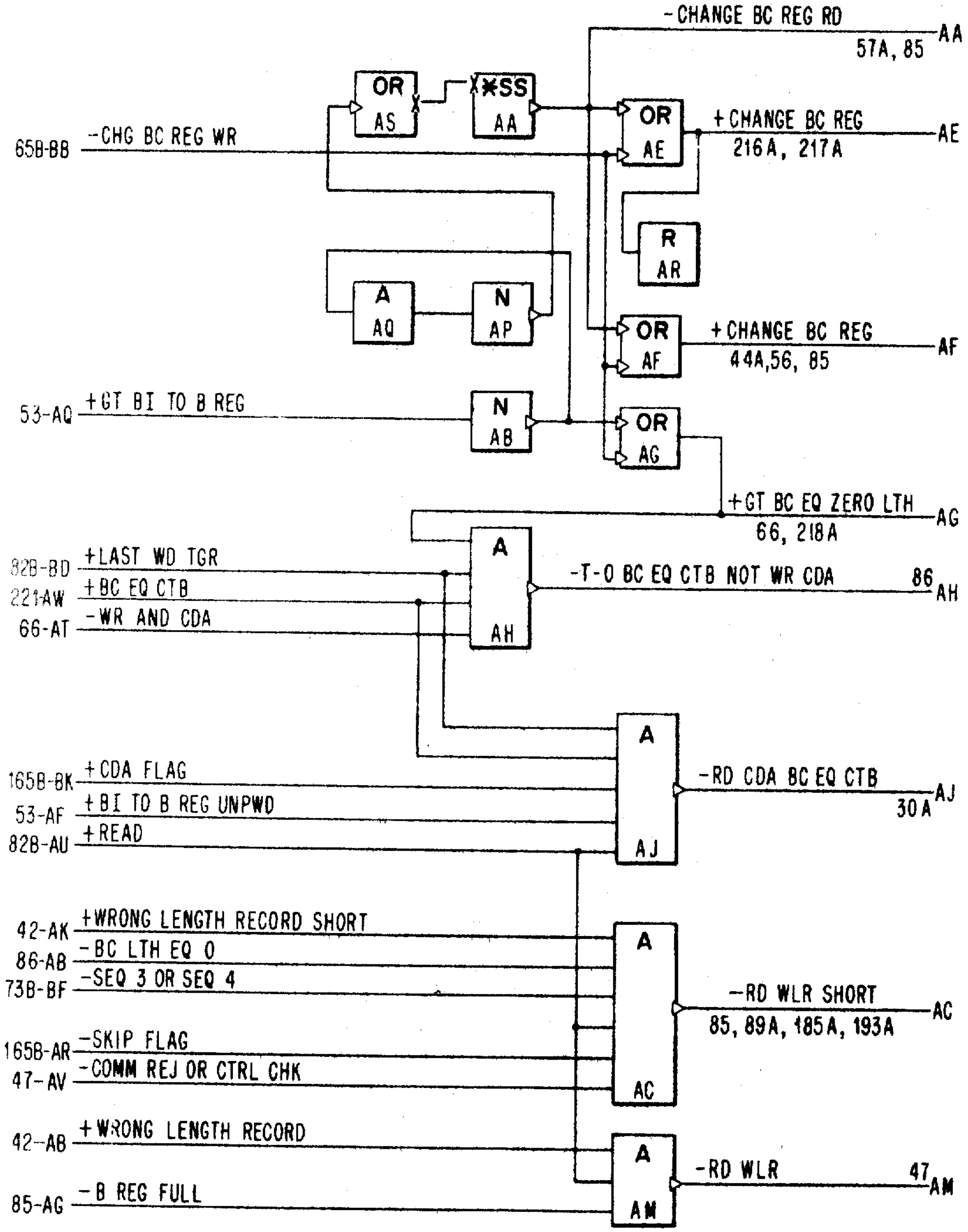

The read controls 400 are adapted to operate the I/O interface in receiving data from the I/O line. This section operates the service in and service out tie line and activates the controls for gating the data to the proper position in the B register. This section also provides signals to the byte counter for stepping as data bytes are received. The principal inputs to the section 400 are indicated at the left of the block and the principal outs are indicated at the right of the block. Each input and output line is designated by a short functional description and polarity indication. The figure numbers indicate the detailed circuit of the control. Referring to FIGS. 53 through 54 each line provides a short functional description, polarity indication and the figure from which the line originates or terminates. The figure number also includes two alphabetic sections and a numeric section. The leftmost alphabetic section designates the block and the rightmost alphabetic section designates the serial number of the drawing. The numeric characters designate the page number of the drawing. All control figures will be presented in this form.

Returning to FIG. 14A, the principal inputs to the I/O read controls are B register full, service in, sequence trigger 2, the CDA flag, the last word trigger the read latch and the byte counter equal the count register. The principal outputs are gate bus in to B register, latch status byte trigger, latch bus in, change byte counter register and gate byte counter equals zero latch.

The tag line terminator controls 402 receive the various tag lines from the I/O interface. The controls gate the inputs to the various registers in the channel for use in their operation. The principal inputs are the address, out, latch start I/O latch, gate stop to bus out, read controls, the sequence 2 trigger and the sequence 5 trigger. The principal outputs are to the status in register, the operation in and the service out line.

The tag out controls 404 operate the command out, service out, select out, and suppress out lines of the I/O interface. The principal inputs, the stop line, operation in, start I/O or test I/O, command 2 latch and the select out latch. The principal outputs are the command out, service out, suppress out, address out and hold out lines.

The polling interrupt controls 406 recognize a service call by an I/O device when a status condition exists at the device. The controls also deskew the data being sent by the I/O device. The principal inputs are the interrupt response, status in, test I/O, various timing signals and the address in line. The principal outputs are the polling interrupt, gate bus in to the unit address register and latch the status byte.

The write controls 462 are adapted to operate the I/O interface in sending data to the preselected I/O device. This section steps the byte counter and operates the bus in latches. The section also indicates when the B register is loaded and the moment to start the next data sequence. The principal inputs are the write signal, service in, write command data address and gate data address bus and count to the address. Other inputs are the A register full and various sequence and timing signals. The outputs include gate B register to bus out, change byte counter, service out, change byte counter register and turn off B register full latch.

6.32 STORAGE INTERFACE CONTROLS

The storage controls respond to channel and storage signals in fetching and storing information required to execute a CPU instruction. The storing controls include channel memory controls and pulse gates, storage data bus in gating, storage address bus gating and storage data bus out gating. Each of these sections will be now described in conjunction with FIG. 14B.

The channel storage controls and pulse gate section 408 place the data and command address on the SAB 151 (see FIG. 8) at the proper moment. The controls also receive the advance pulse to gate the data address, command address to the storage address bus. The advance pulse is combined with a CCW valid signal, a CCW fetch, a write, a transfer in channel signals to perform the described operation. The storage pulse gate circuits comprise a series of triggers for generating a memory cycle complete signal, a late advance pulse, an advance pulse and a remove BCU response signal. The triggers are operated from inputs supplied by the BCU advance pulse, accept latch and BCU response signals.

The storage data bus in gating 410 comprises 64 groups of coincident circuits (not shown) responsive to inputs supplied from preselected A register, mark B register and sequence circuits for providing outputs to preselected storage bit positions. The 64 groups of coincident circuits are subdivided into eight individual groups representing a byte. Each byte has a parity check circuit. The section 410 gates the data in the various registers to the proper SDBI line 150. Outputs are provided to preselected storage data bus in lines.

The storage address bus gating 412 comprises 20 coincident circuits and a parity check circuit (not shown). Each coincident circuit receives as an input preselected bits from the data address register, command address register which are ANDed together with various gating circuits. Outputs are provided to preselected storage address bus lines.

The storage data bus out 414 gating powering comprises a plurality of coincident circuits (not shown) responsive to various gating signals relative to programming and data transmission operations to provide gating outputs to register A, command address register, count register, memory protection register and channel status circuits in sending data over the SDBO to channel units.

The bus control section 448 receives the signals from the storage unit and provides corresponding response statements to the unit. The input signals to the section include the BCU data request, the storage protection check, the storage address check, the advance pulse, and the accept pulse. The section provides outputs to the BCU. These outputs include address valid, memory request, storage data check.

6.33 CPU INTERFACE CONTROLS

The CPU controls respond to CPU and channel signal to execute instruction, indicate interrupt condition and provide the status of the channel. The CPU controls include a CPU interface, halt I/O, test I/O, condition code, initial program load, scan program load and the initial setup sections. The latter section includes registers and lines which may be part of other controls, e.g., I/O and storage. Each section will be described in conjunction with FIGS. 14C and F.

The initial setup section 416 handles the CPU and I/O interface in responding to the start I/O instruction and selecting the desired I/O device. The section 416 also responds to CCA flags in fetching the next control word, and sends out the first service out of a data transfer. The section is responsive to the start I/O signal status in the transfer in channel signal, CCW fetch signal, select out signals and the like. The output signals from the section include the start I/O latch, accept to CPU fetch CAW, compare address in and gate data address bus to adder.

The CPU interface control 418 comprises various terminator and coincident circuits (not shown) for receiving the start I/O, test I/O accept interrupt diagnostic lines from the CPU. The interface also receives the status in, polling interrupt and other signals generated by the channel. The outputs are supplied to the condition code, halt I/O and other controls of the CPU section to initiate the operation of the channel.

The halt I/O section 420 terminates the operation of the designated I/O device specified in the CPU instruction. No I/O selection process is required to execute this instruction. The circuit is responsive to interrupt, path working, status in, polling interrupt, CPU halt, select channel and other inputs to set the halt I/O latch signal. This output signal is employed in several locations, for example, initiating the condition code response to the CPU.

The test I/O section 422 selects and tests a designated I/O for status and clears interrupt condition. This section also generates the proper condition code and initiates the storage of the CSW. The CPU select channel, test I/O, compare address in-out, interrupt and various sequence trigger signals are supplied as inputs. The output signals include set of the test I/O latch, gate stop to bus out, gate accept on to test I/O.

The scan program load section 422 controls the fault locating test instructions which initiate an IPL load, after which the scan mode program is executed. This program continues to read records off a preselected tape and indicate the status thereof. Inputs to the section 422 include start scan, stop scan, scan mode, operations in and set chain command latch. The scanning program load section provides outputs to the preselected registers in the channel to execute the program. The outputs include a stop scan signal, data error, gap pulse, TIC pulse and release FLT line.

The interrupt section 426 initiates the storing of channel status in storage. The section also generates code 2 in response to a test I/O instruction for a particular device which has an interrupt waiting. The inputs to section 426 include start I/O latch, test I/O, interrupt and unit address compare check. Parity outputs include accept interrupt, test I/O interrupt waiting, gate condition 2 and pseudo accept interrupt.

The condition can code section 428 provides responses to CPU instructions and generates release signals. The responses to the CPU are the four condition codes described in conjunction with FIG. 7. The section also includes a time out feature for code one responses. The inputs to section 426 include operation in, start I/O, test channel, halt I/O and interrupt. Outputs from the section include the various condition codes, release, and turn-off interface control check.

The initial program load section 430 loads the memory initially with the program. The section initiates the section sequence and forces a read operation. The section also forces the chain flag as required to load the information into storage. The inputs to section 430 include the IPL signal, select out latch, sequence triggers, chain command latch and interrupt start status. The outputs include turn-off the initial setup, start scan move, force read operation, turn off CCW valid latch and IPL complete.

Figure 14F:
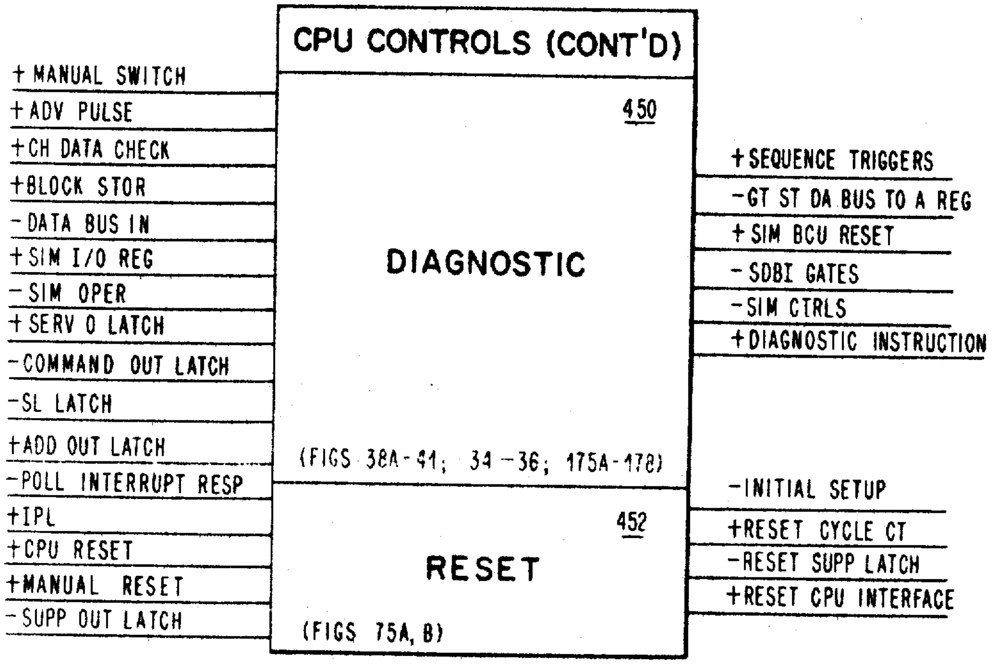
Figure 14D:
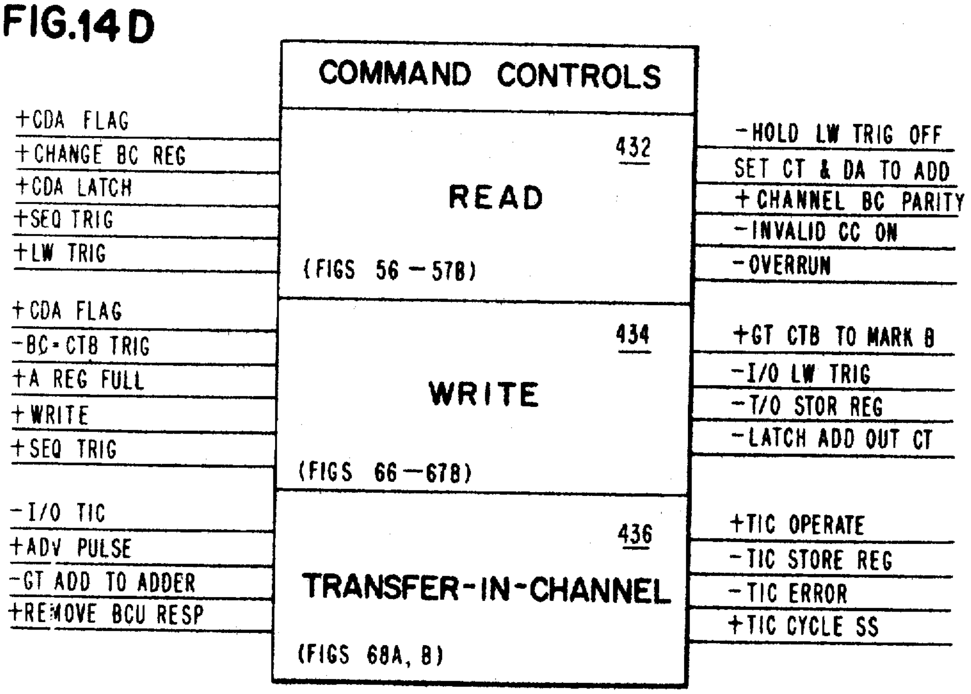
Figure 14E:
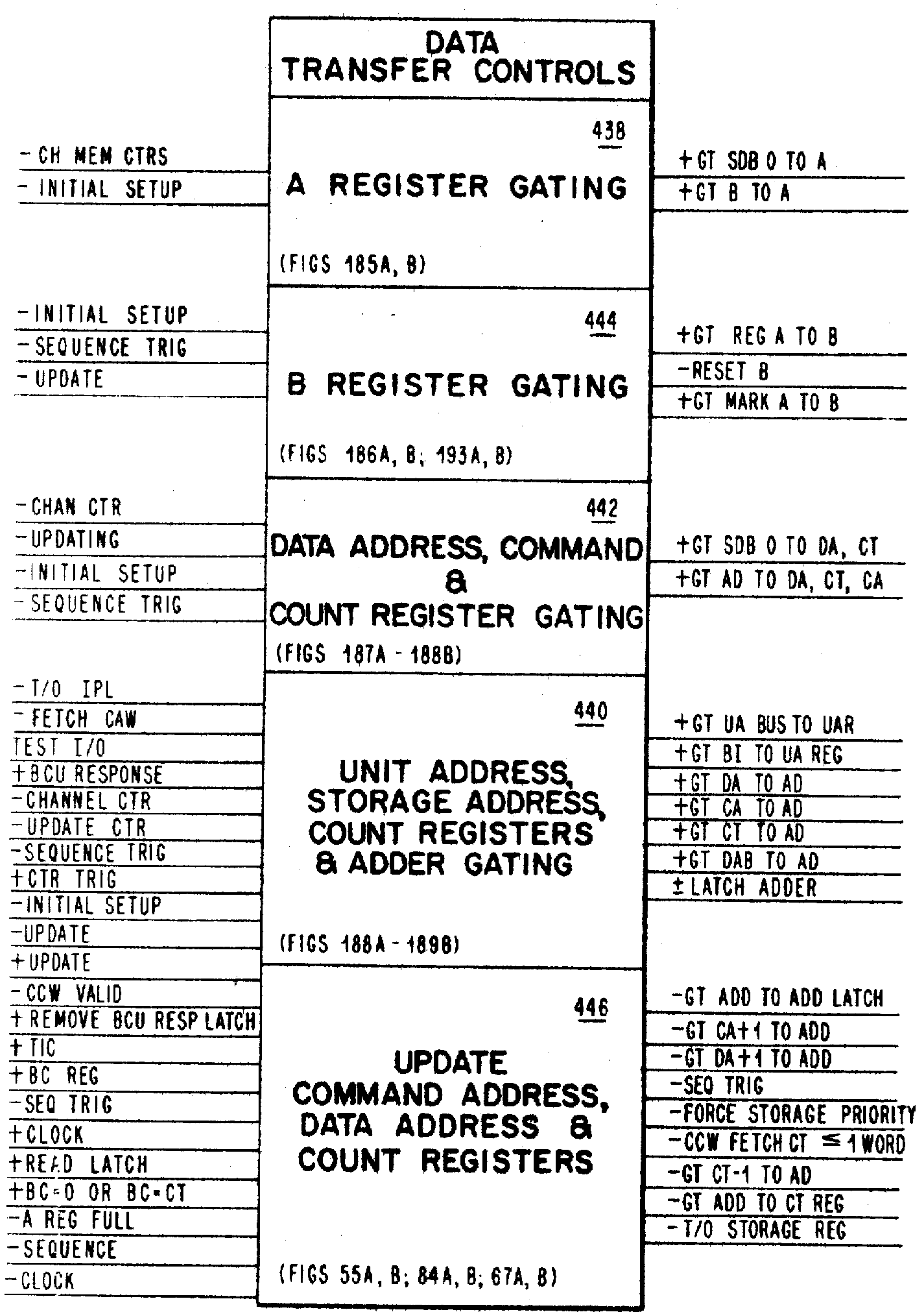
Figure 14G:
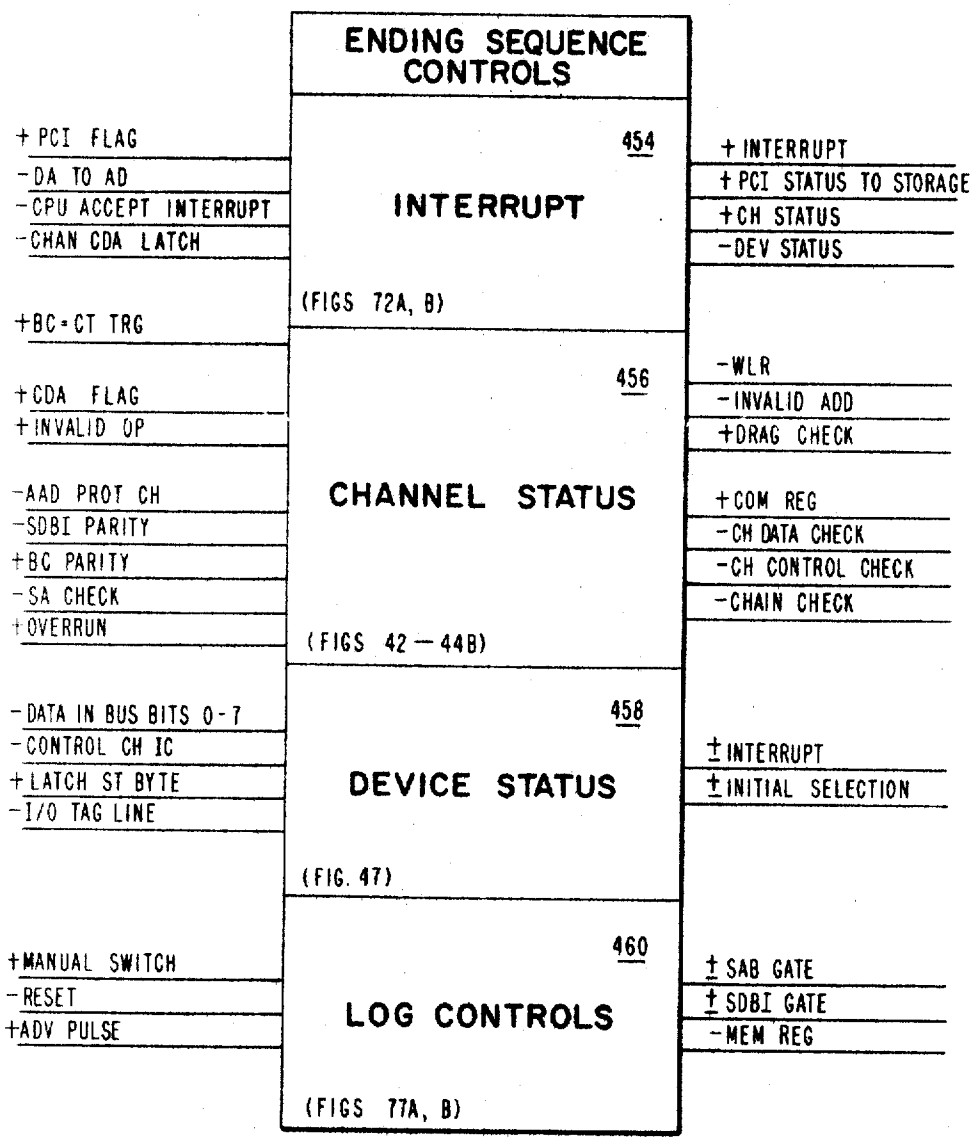

Referring to FIG. 14F, the diagnostic section 450 is adapted to operate a specific device connected to the channel or of simulating a control unit and device. Manual controls are provided to operate the channel in a test mode. This mode causes the CPU to be simulated and allows selective simulation of either the I/O interface, the storage, neither or both. The manual switches and latches are at a maintenance panel (not shown). Operating switches permit simulation of start I/O, test I/O, halt I/O, accept interrupt, manual fetch, and other channel operation. This section includes simulate memory and stop circuitry which receive the manual switch inputs together with the advance pulse, channel data check, block stop and provide outputs to sequence triggers, gate storage data bus out to the A register, simulate BCU response, and other operations required to transfer data between storage and the channel. This section also includes a simulate I/O interface register for receiving data bits from the data bus in to operate storage data bus in gates and simulate controls. The latter is responsive to the simulate I/O register outputs and various simulate operations, select out and service out latches, command out, and address out latch to execute diagnostic instructions supplied by the CPU interface.

The reset section 452 operates selected registers to ready the channel for an initial selection. This section receives as input a polling interrupt response, IPL, CPU machine reset, manual machine reset, suppress out latch, and provides outputs to the initial setup, reset the byte counter, reset the suppress out latch and reset the channel CPU interface.

6.34 COMMAND CONTROLS

The command control sections operate the channel in response to the various commands found in the operation code portion of the CCW (see FIG. 4). The command controls comprise three different sections. These sections are read, write and transfer in channel. Additional read, write controls are described in conjunction with the I/O controls (see FIG. 14). Each of these sections will be described in conjunction with FIGS. 140A and B.

The read control sections 432 operate the channel in chaining data addresses during a read operation. The section turns off the last word trigger, retains a memory request after a data word is stored, and gates to the B register on the proper boundary. Also, this section gates the count to the data address bus and sets up the byte counter and count register when the next CCW appears. Inputs to this section include the CDA flag, change byte counter register, sequence triggers and the last word trigger. Outputs are supplied to the various sequence circuits and to hold off the last word trigger. Other outputs are gating the count and data address bus to the address register; changing the byte counter parity; setting invalid CCW and indicating an overrun.

The write controls 434 initiate the chain data address steps in write operation. As part of this, a new CCW is fetched and storage is retained after the last word has been sent to storage. The section indicates when the count register is zero and when to obtain a new count. The section also gates the data address bus to the adder and terminates the CDA operation. The inputs to the section include the CDA flag, byte counter equal count register trigger, write signal and various sequence triggers. Outputs from the section include gating the count register to the mark B register; indicating invalid CCW; indicating an overrun and changing the byte counter parity.

The transfer in channel section 436 detects the TIC signal and handles the fetching of a new CCW. The section also detects unusual error conditions associated with the program. The section also detects illegal commands. The inputs to the section include turnoff TIC, the advance pulse to gate data address to the adder and remove BCU response. The outputs include TIC operation turn on; store request; TIC error and turn on TIC cycle single shot.

6.35 DATA TRANSFER CONTROLS

The data transfer controls update the count, command address, data address registers and gate the A, B and unit address registers in executing the various commands specified in a CCW. Five different control sections are included in the channel. These sections are A register gating, unit address register gating, count and command address register gating, updating the command address, data address, and count registers. Each of these sections will be discussed in conjunction with FIG. 14E.

The A register gating section 438 opens and closes the gates for transferring data into and from the A register 308 (see FIG. 13A). The data may be supplied from either the storage data bus out 154 or the B register 310 (see FIG. 13A). Inputs to the section are from the initial setup section or the channel storage controls section 408 (see FIG. 14B) which operate the various gates associated with the transfer of information from the B to the A register.

The unit address, storage address, count and adder gating section 440 controls the functions of these programming devices in executing a command or instruction. The unit address circuitry is responsive to the turn on IPL, fetch CAW, test I/O inputs which are ANDed together with (1) signals for gating the bus in to the unit address register and (2) the machine reset signal to provide signals for gating the unit address bus to the unit address register and the bus in to the unit address register. The storage address gating is responsive to the BCU response, channel control signals for gating the data address and the command address to the storage address bus. These controls are also responsive to the manual store or fetch signals to develop outputs for gating the data address to storage address and gating the command address to the storage address bus. The adder gating is adapted to gating the data address, command address, count register and the data address bus to the adder. This circuitry is responsive to the updating control section 446, described hereinafter and various sequence and control triggers to gate the data address, the command address, count register to the adder. The adder circuitry provides adder latching signals which are responsive to initial setup, updating read and write and various trigger input signals.

The count, data address and command address register gating section 442 is adapted to gate the adder and the storage bus out to these registers. The inputs to this section include channel control signals, updating signals, initial setup and various sequence triggers. The output are supplied to the register inputs.

The B register gating section 444 is similar to the section 436; initial setup, sequence, updating and read backward signals are received to gate register A to register B, gate mark B to mark A and reset register B.

The update command address, data address and count register section 446 records the status of these registers during the transfer of information between storage and the I/O devices. The command address circuitry receives as inputs the read, write updating signals, CCW valid trigger signal, remove BCU response latch, and the TIC signals. As outputs, the section gates the adder to the latch circuits, the command address plus one to the adder and the data address plus one to the adder. The updating data address circuitry receives as inputs the byte counter register signals, various sequence and clock signals. As outputs the section gates various sequence circuits, and forces storage priority for a write operation. The section also activates the CCW fetch trigger when the count is equal to and less than one word.. The count register circuitry updates the count register in response to a read latch signal; byte counter equals zero or byte counter equals count register; A register full; various sequence signals and clock signals. The circuitry provide outputs to gate the count minus one to the adder; gate the adder to the count register and turn on a storage request.

6.36 ENDING SEQUENCE CONTROLS

The ending sequence controls are adapted to interrupt the main program and store the status of the channel and I/O device when (1) the I/O operation is terminated, or (2) a command is rejected during the execution of an instruction. The controls include an interrupt, channel status, device status, and log controls. Each of these sections will be discussed in conjunction with FIGS. 146A and B.

The interrupt section 454 changes the state of the CPU in response to conditions which occur in I/O devices or within the channel. This section also provides the program control interrupt status and removes the interrupt status. The inputs to this section include the PCI flag, signals for gating the data address register to the adder, CPU accept interrupt and the chain data address latch. As output signals the section requests an interrupt; indicates PCI status. The section also provides outputs to channel status 456 and device status 458 sections described hereinafter.

The channel status section 456 is adapted to provide a wrong length record indication, an invalid address, a program check, a storage protection check, a channel data check, a channel control check, and a chaining check when these conditions arise. The inputs to this section include the byte counter equal word counter trigger, SILI flag, CDA flag, and other signals as indicated. As outputs, the section provides a wrong length record (WLR) indication, invalid address, program check, and other conditions as indicated.

The device status section 458 receives the status in byte from the I/O data bus in and provides an indication initiating an ending sequence operation. The section also indicates the status zero for an initial selection operation. The inputs to the section include each position of the data in bus, command reject or control check, latch status byte trigger and the I/O tag line. The inputs generate output signals to the interrupt section and to the initial selection system to indicate a status zero condition.

The long controls 460 initiate a storage request and place three log words at a preselected address. After the three words are stored, stop circuits are blocked and the channel is allowed to initiate a normal ending routine. The inputs to this section include various manual switches to initiate the operation; reset signals; and the advance pulse or portions thereof. The outputs operate the storage address gates and storage data bus in gates to supply the log words to the preselected storage location after a storage request has been recognized.

6.37 CLOCK AND CLOCK CONTROLS

The channel operates asynchronously, i.e., one operation is exceuted before a next operation commences. There are five sequences or operations which will be described hereinafter in connection with FIGS. 16, 16A through 16×, 17, and 17A through H. Briefly these sequences are as follows:

| Sequence: | Purpose |
|---|---|
| **1** | Initial selection of channel and I/O device. |
| **2** | Data transfer. |
| **3** | Update count. |
| **4** | Update data address. |
| **5** | Ending routine. |

During these sequences and especially data transfer sequences, clock signals provide the timing to effect proper transfer. The clock and clock controls described in FIGS. 15A and 15, respectively, develop the necessary timing signals at the required moment.

6.371 CLOCK CONTROL

Referring to FIG. 15, a clock control circuit 450 includes an OR invert 451 and an AND invert 452 cross coupled between the collector and base of transistors (not shown) included in the circuits. AND invert and OR invert circuits are of well known construction, being described for example in U.S. Patents 3,075,489; 3,040,-198; and 3,083,305; assigned to the same assignee as that of the present invention. The inputs to the circuit 451 may include initial setup sequence triggers, direct turn on and the like. When any one of these signals appears, the circuit 451 is operated to provide output 453 to turn on the clock. This output turns on the circuit 452 which latches the turn on clock input. Similarly, other inputs to the circuit 452 may turn on the clock. Among these inputs to circuit 452 are CCW valid, start I/O and interrupt and various sequence triggers. The presence of all these signals will operate the circuit 452 to turn off the circuit 451 which terminates the output 453. Simultaneously, an output appears on line 454 which turns off the clock.

6.372 CLOCK

Referring to FIG. 15A, a clock 456 is shown in logic block form. Essentially, the clock employs delay lines for generating light discrete timing levels which appear in true and complement form.

For reasons of brevity, only three stages of the eight stage clock are shown. Each stage generates a signal level at a discrete time. The stages are substantially identical. Each stage comprises an inverter 460, AND invert 461, second invert 462, and third invert 463. Corresponding circuits in each stage will have the same reference character but with parenthetical numerals indicating the particular stage. For example, in stage 2 the corresponding invert blocks are designated 460(1), 461(1) and the like. The invert blocks 460 are the same as the AND invert and OR invert blocks previously described except the AND and OR circuits have been omitted.

Single shots 464 and 465 have been included in stage one to receive the turn off signals supplied as inputs. Each device has been assigned to turn off four stages since they have limited drive capability. Manifestly, these devices may be omitted if the input signal is of sufficient magnitude. The single shots are of well known construction being described in any well known electrical engineering text.

The individual stages of the clock have delay lines 466 and resistor means 466' for establishing time intervals for the stage. The stages also include a conventional emitter follower 467 for presenting the proper impedance to the delay lines 466. The delay line may be any conventional form of device, for example piezoelectric crystals, capacitance-inductance networks and the like.

A turn on clock signal on line 453 will operate the AND invert 461 to provide a negative output signal to inverter 462. The output from the inverter is positive and represents T0. This output is also supplied to the inverter 463 to become the negative T0 signal. The clock signal also turns on AND invert 461(1) which provides a negative output to inverter 460(1). The inverter 460(1) sends a pulse to delay line 466 which introduces a delay in the turn on clock signal. The delay line output is positive, and presented to the emitter follower 467 which in turn supplies the same polarity signal as an input to the AND invert 468. The output from this circuit is negative and supplied to OR invert 469. The output from this circuit is positive and when combined with the output from inverter 462 operates AND invert 470 to provide a negative signal to inverter 462(1). The output from this signal is positive delayed approximately 100 nanoseconds with respect to the output of T0.

The output from OR invert 469 is supplied as an input to an AND invert 471 and also to an input to the AND invert 461(2) of the next stage. The OR invert 469 and AND invert 471 operate as a conventional latch as described in conjunction with FIG. 15. This latch holds up the output of stage 1.

An output from stage 2 is generated in a manner similar to that described for stage 1. The result is a timing chart as indicated in FIG. 15B. The chart indicates an eight stage clock, as in the case of the present channel. Each timing level is generated in the manner described in conjunction with 15A.

With eight discrete timing levels, the output from the various stages may be logically connected (not shown), for example, ANDed together to define pulse length of any desired width as indicated by pulse 472 in FIG. 15C. This pulse is obtained by combining the outputs of the timing level T2 and the not T3 level.

The clock is turned off by either the appearance of a signal on a stop line 473 or the pulse on the turn off clock line 454. The turn off signals operate the single shot 464 and 465 to drop the negative outputs from the AND invert circuit 461 (1 . . . 6). The single shot 465 is connected to stages 4, 5, and 6, while the single shot 464 is connected to stages 0, 1, 2, and 3 of an eight stage clock.

The time differential between each stage is adjustable by the delay lines. These lines can compensate for variations of logical delay in each path so that the maximum variation between paths due to circuit delay may be plus or minus 5 nanoseconds. Another advantage is that the latched turn on, described in FIG. 15, permits the starting condition to be removed as soon as the latch is set. A more important advantage of the clock, however, is that it does not have to complete a full cycle before being reset for the starting position. This feature results in a saving of time. For example, assume there are two timing signals which occur one after the other in the channel. Assume further, that the first sequence only requires a partial clock cycle and the second requires a full cycle. As soon as the first cycle has gone far enough to generate the required signal the clock may be turned off. After the turn off signal has gone away, the clock may be restarted. Therefore, the saving of time consists of the time difference between the time when the first cycle was turned off and the time it would have required to complete the full cycle. Finally, the centralized timing clock permits various clocks unique to a particular function to be omitted from the channel. The clock of FIG. 15A provides the necessary turning means for generating all required signals.

6.38 CHANNEL LATCHES AND TRIGGERS

Referring to FIGS. 19A through C, a tabulation is provided of all latches and triggers employed in the present invention. The function of each latch or trigger is indicated. The details of the latch or trigger are provided in the figures.

7.0 FLOW CHART OPERATION

The operation will be described for the four instructions supplied to the channel by the CPU. These instructions are start I/O, halt I/O, test I/O and test channel. Each of these instructions is described in conjunction with flow charts FIGS. 16, 16A through 16X and FIGS. 17, 17A through 17J. References will be made to the data flow diagram FIGS. 13A and 13B, and the control circuits described in FIGS. 14A through 14G. With respect to the flow charts, a diamond represents a decision point in the routine. The decision executed is indicated within the diamond. A box indicates a channel operation. Since the channel operation is asynchronous, the signals necessary to perform the operation (when required), appear across the top of a box. After completion of the flow chart operation, a detailed description will be provided of read operation. The detailed description will indicate all data and control lines in the operation.

7.1 START I/O INSTRUCTION (WRITE COMMAND)

Referring to FIG. 6, to initiate a start I/O instruction at the channel, the CPU 22 (see FIG. 1) brings up the start I/O multiplex line 111. The unit address included in the instruction is placed on the unit address bus 125. The select channel line 122 in the CPU interface is brought up by the CPU. The operation of these lines completes the various fields of the instruction (see FIG. 2).

Referring to FIG. 16, the CPU controls (see FIG. 14C) recognize the instruction 500 and perform a channel available decision 502. If the channel is busy or in a test mode, an operation 503 will be performed by condition control section 428 (see FIG. 14F). The section will generate a condition code 3 and raise the condition lines 117 (see FIG. 6) to the CPU. Shortly thereafter, a release operation 504 is executed which disconnects the channel from the CPU. The channel next performs a channel halt decision 506 and a channel busy 508 decision. The presence of a halt I/O initiates a halt I/O routine 510 which will be described hereinafter. In the absence of the halt I/O instruction, as in the present instance, the channel busy decision 508 is performed. A yes condition initiates an operation 512 by the condition control section 428 (see FIG. 14C). The section generates a condition code 2 operation 512 which is followed by a release operation 514.

7.101 INITIAL SELECTION

Briefly, this operation selects the I/O device; obtains CAW and CCW, receives device status, loads storage with channel and device status and returns condition code 00 or 01.

With the channel available and not busy, the instruction initiates a start I/O or test I/O operation 516 while the I/O controls, described in FIG. 14A, are conducting a polling operation 518. Referring to FIGS. 16A and 16A1, a polling operation 518 is described. The I/O control section 416 performs a select out operation 520. This operation, as described in conjunction with FIGS. 11, 12 and 12A executes a select in decision 521. The select-in line is the other end of the select-out line after passage through the control units. If select-in is present, none of the connected I/O devices require service. If select-in not present, a decision 522 determines if operational-in and address-in lines have been raised. The channel proceeds to store the data as indicated in FIG. 16A1 and send channel status to the CPU. This operation begins by an operation 528 which turns on the interrupt trigger.

Returning to FIG. 16A, the absence of the unit address and address-out lines causes the I/O device to pass the select-out pulse which appears as a select-in pulse to the tag-in control section 402. The yes condition initiates a turn-off select-out operation 530. Next, the channel executes a turn-on start I/O latch or turn-on test I/O latch operations 534, the start I/O latch being set as operation 516 in FIG. 16. The yes condition continues the initial selection. A no condition would initiate a decision 534 to determine when select-in dropped. A no condition would restart the polling operation.

Turning to FIG. 16B, the setup continues. The start or test I/O latches were set in operation 516. The CPU controls, described in conjunction with FIG. 14C, performs a start I/O latch decision 538. A no decision commences a test I/O routine 540 which will be described hereinafter. A yes decision initiates an operation 542 to turn on the CCW fetch trigger for a CAW fetch. Also an operation 544 is executed to gate the unit address bus to the unit address register. Momentarily directing out attention to FIGS. 13A and 13B, the unit address on the bus 125 is supplied to the unit address register 210. At this point, the channel commences to perform a storage request 546 for the CAW fetch which is followed by a CCW fetch. While the fetching operations are being performed, the setup operation continues. The next several paragraphs will describe the setup operation, after which the CAW and CCW fetching operation will be described. The setup operation continues after a BCU response decision 548 is acknowledged during the CAW fetch. This decision initiates a turn-on set operation 552 which is accompanied by a reset CAW.

Turning to FIG. 16C, the unit address register is gated to the bus out 556, as first operation 556. This operation is controlled by the initial setup control section 416. The channel next performs a polling interrupt trigger-the status-in decision 558. A yes condition is not executed since neither the status-in or polling interrupt signal is present. The no condition continues the setup.

After the decision 558, the channel performs an operation 560 which turns on the clock and turns off the polling interrupt trigger. This operation is performed provided the signals indicated in the upper portion in the block are present. After this operation the channel executes a start I/O decision 562. A no decision causes the channel to execute a command chain latch decision 564 which initiates a chaining operation. This operation will be described hereinafter. In the absence of command chaining, the channel performs a turn-on address-out operation 566, providing the signals indicated in the block are present. These signals are setup, not operational-in, time 4, and not time 5. The operation is supervised by the initial setup control section 416.

Continuing on FIG. 16D, the bus-out parity error decision 568 is performed. At this time, the bus-out contains the unit address supplied in the instruction. A yes decision initiates a bus-out parity error operation 570 and a machine check operation 572. These operations are controlled by the ending sequence controls described in FIG. 14G. The operation 572 also initiates a turn sequence 5 routine.

A no decision initiates a turn-on select-out operation 574, the operation being performed at time 7 and in the absence of machine check signal. A turn-off clock operation 576 next occurs at the same time a select-in decision 580 is being performed. With the address-out line, select-out, and unit address on the bus-out, the select-in decision is no, and further channel operation is suspended until an address-in decision 582 indicates yes. Returning to the select-in decision 580, yes condition would require a command chain latch decision 584 and the operations resulting from this decision will be described in connection with chaining. At this point, the setup operation is suspended because a CCW valid decision 612 cannot be performed. The CCW will be obtained after a CAW fetch and CCW fetch are executed.

Turning to FIG. 16J, a storage request routine 546 (see FIG. 16B) begins with a turn-on storage cycle operation 547. A BCU response decision 548 is performed following which a CCW fetch routine 586 begins. A standard routine indicated on FIG. 16J1 is performed to determine if an invalid address exists. A sequence 5 ending routine is commenced if an error exists.

Turning to FIG. 16E, the CCW routine 586 is shown. Initially, a TIC cycle on decision 590 is executed. Simultaneously, a force mark A parity operation 588 is executed. The mark A registers are presently blank and do not affect the storage request. The TIC cycle decision 590 is no since no previous command has been executed. A CAW fetch decision 593 is performed. A no condition gates the command address register operation 594. A yes condition results, however, since this is the CAW fetch operation. The yes condition initiates an operation 595 which forces a preselected storage address Z to the command address register 595 and gates the address Z to the storage address bus, after a BCU response drop decision 596. At storage location Z is the CAW which has the address of the CCW.

A remove BCU response operation 598 and latch address operation 600 are performed while waiting for an advance pulse decision 602. After the appearance of the advance pulse, an operation 606 is performed to gate the storage data bus-out to the command register. The storage data bus-out is also gated to the flag, count and data address register in an operation 604. Presently, however, the information is blank as it is not provided in the CAW. When the data address count registers are loaded, however, in the CCW, bit positions 37 through 39 are inspected for zero content as described in connection with FIG. 4.

Simultaneously, with the gating, a TIC decision 608 is executed. A yes condition results since a TIC command has not been specified. The yes condition initiates a start I/O-not CCW valid decision 609, shown in FIG. 16E. Since both of these signals are present, a yes condition results in a turn-on TIC cycle operation 611. A TIC routine 619 is initiated by the operation 611. Concurrently, a CAW zero check operation 613 is executed to inspect the CAW for zero content as described in connection with FIG. 3. A not zero condition initiates a turn-on program check 615 which is followed by an ending sequence 795, if required (described in connection with FIG. 16S). Also performed is an operation 617 gating the storage data bus to supply the storage protection bits to the tag register. These bits select the storage area from which he CCW will be fetched.

Turning to FIG. 16E2, the TIC routine 619 performs a CCW fetch. A first operation 621 turns on an inhibit CCW valid latch and block the count register. The advance pulse falls after the CAW has been supplied. The yes condition initiates a turn-on TIC cycle 623. This cycle performs a turn-on storage request 625 and gates the data address to the adder as an operation 627 to ready the next command address word. The storage request will obtain the CCW at the command address. When the BCU response appears, several events begin to happen simultaneously. These events will be described in conjunction with FIG. 16E3.

Referring to FIG. 16E3, when the BCU response drops and a single shot fires, a remove BCU response operation 629 is followed by a latch adder operation 631 and a gate adder to the command address operation 633. These operations generate the next command address for the channel. While this is occurring, an operation 635 is performed to turn off the TIC cycle. A turn-off inhibit CCW valid operation 637 is executed thereafter. The last operation after the BCU response is to gate the data address to the storage address as an operation 639 to obtain the CCW. An operation 641 verifies that the data address is valid. When the advance pulse appears, the decision 643 is executed to performan operation 645 which gates the storage data bus to the data address register, the count register, the flag register and the command or operation register. Simultaneously, an operation 647 is executed to check the CCW for zero content. With a no condition, the channel returns to the setup operation described in FIG. 16D. A yes condition, however, initiates a turn-on program check. Before returning to the setup operation, however, the channel performs an operation 649 to turn on the CCW valid latch when the late advance pulse appears. This operation is followed by an operation 651 which turns off the CCW fetch and TIC cycle. In the event a TIC operation was being performed, a turn-on program check operation 653 would have been executed followed by an ending sequence 795.

Returning to FIG. 16D, the setup operation continues with a CCW valid decision 612 which is performed in conjunction with a program check or machine check decision 614 and a test I/O or command chain decision on 616. The presence of any of these signals will initiate an I/O interface operation 618. The operation 618 gates the address-in and samples for no select. This operation is controlled by the tag in controls 402. The address-in decision 582 and the I/O operations are ANDed together to control a gate address-in operation 620. This operation controls connect-in routine 622 which will be described in conjunction with FIG. 16F.

Referring to FIG. 16F, a turn-on clock operation 624 is the first event in the routine 622. This event takes place provided the signals indicated in the block 624 are present. The clock controls described in conjunction with FIG. 15A supervise this event. An address mismatch decision 626 is next performed. The address-in is checked against the address-out in this decision. The yes condition initiates an ending operation 628 which will be described hereinafter. A no condition initiates a test I/O decision 630. The yes condition initiates a test I/O routine 632 which will be described hereinafter. Since this is a start I/O routine, the no condition initiates a CCW valid and no errors decision 634. A no condition causes a command block operation 636 provided a previous error exists in the channel. The CCW valid trigger was set as operation 649 in FIG. 16E3. Hence, the yes condition causes a turn-off clock and setup operation 638, which is shown on FIG. 16G.

Turning to FIG. 16G, a read/write set operation 640 is next performed. This operation selects a read or write operation depending upon the command. An operation 642 gates the command to the bus-out. At time T0 and not T4, a gating operation 644 is performed to gate the data address and count to the adder 214 (see FIG. 13A). At time T2 and not T3, a bus-out polarity inspection 646 is performed. At time T4, a latch adder operation 648 is performed, and this is followed at time T4 and not T5 by an operation 650 to gate the adder to count register 206. A bus-out parity decision 652 is next performed. A yes condition initiates an ending sequence routine beginning with a turn-on operation 654 of the channel control check, machine check and sequence 5 triggers. At time T7, an operation 656 raises a command-out tag line. This operation also occurs for the no condition based on the decision 652. The channel is now ready to complete the initial I/O selection procedure 658.

Referring to FIG. 16H, the selection procedure 658 is suspended until an address-in decision 660 is performed. A yes condition initiates a drop command-out operation 662. When the command-out tag line drops, the I/O device supplies the device status, as described in conjunction with FIG. 12. The selection procedure suspends until a status-in decision 654 is performed. The yes condition initiates a clock and sequence run operation 666, when the signals indicated in the block appear. A bus-in parity inspection 668 is performed when the status-in tag line is raised. A parity error decision 670 is performed as a result of the operation 668. A yes condition initiates an ending routine described hereinafter. A no condition continues the initial selection operation. Without any parity error, a turn-on clock operation 672 is performed when the signals indicated in the block appear. Continuing with the selection procedure on FIG. 16I, a latch status and sample last word trigger condition operation 674 is performed. A count equal to less than one word decision 676 is next performed, provided data transfer has taken place. Since the selection procedure has not reached this point, this decision is no and the selection procedure continues. A yes condition, however, would initiate a turn-on last word trigger operation 678. The last work trigger was described in FIG. 13A in connection with the count register 206.

The operation 674 also initiates a status equal zero decision 680. This decision is an examination of the status information supplied by the I/O device supplied by the bus-in. A no condition initiates an ending routine. A yes condition initiates a condition code operation 682. The condition code is supplied to the CPU on condition line 117 described in FIG. 6. Since no error conditions have been detected, a condition 1 or 00 code is supplied to the CPU. The operation also turns off sequence 2 trigger. After a delay, a CPU release operation 684 is performed and the CPU responds with a drop start I/O line 686. The channel is now ready to perform the command described in the CCW (see FIG. 4) which will be considered in FIG. 16H.

7.102 SEQUENCE 4

Assuming that an initial program load operation, to be described hereinafter, has taken place, and further assuming a CCW indicated in FIG. 18 has been placed in storage at location X, the channel will execute a write address which will transfer information from the storage addresses indicated at the I/O device designated by the unit address of the instruction. As indicated in FIG. 18, the information at storage address 10 beginning at byte position 4 is to be transferred to memory. 32 bits are to be transferred to the I/O device as indicated by the count field. The write operation is to be completed at storage address 14, byte position 3. Accordingly, now, the write operation will be described in conjunction with FIGS. 16H and 16J.

Referring to FIG. 16H, a read latch decision 688 is performed. Since this is a write operation, a no condition initiates a storage request for a data fetch operation 690. The read latch was set on operation 640 in FIG. 16G. This operation occurs at time T3 and not T4. The operation 690 is supervised by the BCU control section 415 and the channel memory section 408. The operation 690 also initiates a turn off clock operation 692 which is controlled by the initial setup section 416.

7.103 DATA FETCH

Turning to FIG. 16J, a storage request 694 for a data fetch initiates a BCU response decision 696. The yes condition initiates a CCW fetch 586 and a data fetch decision 698 in succession. Since the CCW fetch has been completed, a no condition initiates a data fetch decision 698 which selects the yes condition.

Referring to FIG. 16K, an operation 700 gates the data address to storage address operation. Also performed is a turn off data fetch request 702 provided a not CCW fetch signal is present. Also executed is an operation 704 which gates the mark A parity to storage data bus. This operation occurs provided a not stored to BCU signal is present.

The data address supplied to the storage address is indicated in FIG. 18. The byte portion is supplied to mark B and mark A registers 202 and 300, respectively. (See FIG. 13B.) The output of these registers is supplied to the mark A driver bus 152 (see FIG. 8) to control the drivers operating the storage unit 20 (see FIG. 1). The details of this operation are described in the above-mentioned application Ser. No. 375,683. The mark drivers will operate the drivers to provide a storage output at a word boundary beginning at byte position 4 of storage address 10.

With the storage address bus 151 (see FIG. 8) and mark bus 152 activated, the data fetch routine is suspended until a BCU response decision 706 is performed. A yes condition initiates a turn on remove BCU response operation 596. This operation is controlled by the section 408 described in conjunction with FIG. 14B. The data fetch routine is suspended again until an advance pulse decision 708 is executed. A yes condition initiates an invalid address decision 710. This decision indicates whether the storage address and command address are valid. A yes condition initiates a command reject or control check condition 712. A no condition initiates a gate storage bus out 154 (see FIG. 13A) to the A register 308 (see FIG. 13B). The gating operation is controlled by the section 408 previously described. After a gating, a load advance pulse decision 702 is performed. The advance pulse consists of four portions, raw advance, advance, a late advance, and a storage cycle complete portion. The data fetch operation is suspended until the late advance decision 714 is executed. A yes condition initiates a store data check condition 716. The store data check decision indicates the storage request has been completed. The yes condition initiates a turn on channel data check 718. A no condition indicates that the data fetch is completed and the channel will begin the next operation of initiating a storage request at the next data address. Simultaneously, the channel will transfer the data in the A register to the B register. Returning to FIG. 16H momentarily, a turn on sequence 4 operation 720 is initiated. The sequence 4 routine 722 will be described in connection with FIGS. 16L and M.

7.102 SEQUENCE 4 (CONTINUED)

Turning to FIG. 16L, a sequence 1 and sequence 2 decision 724 is performed. Sequence 1 is the initial selection routine. The sequence 2 is a data transfer routine. Since the channel is this state, a yes condition results in a turn off A4 operation 726 and a gate A register to B register operation 728, the latter being performed at time T5. Next a last word trigger on decision 730 is performed. Since this is the initial word transfer, a no condition results in a turn off clock operation 732 followed by a turn off sequence 3 operation 734 and a turn on clock operation 736. The sequence 3 operation updates the count register and will be performed immediately after the data address is updated. A chain data address latch decision 738 is executed. Since the CCW described in FIG. 18 indicates no flags, a no condition results in three different simultaneous operations.

Referring to FIG. 16M an operation 740 gates the data address to the adder at T4 time at the point the data address is updated to prepare for the data fetch at storage address 11 (see FIG. 18). A latch adder operation 744 is performed after the data address has been updated to the next storage location, namely 11 (see FIG. 18). At time T4 not T5 a gate adder to data address register operation 746 is performed. An adder parity check decision 748 is performed on the new data address. A yes condition initiates an ending sequence routine. A no condition readies the channel for the next storage fetching operation 750.

Concurrently with the foregoing operations an operation 752 is performed to determine if a last word trigger is set. The no condition initiates a decision 752 to determine if the count is equal to or less than two word decision 754. This decision is required when performing data address chaining. Since only one word of the five word count has been transferred from storage, a no condition initiates an operation 750 to turn on storage request. A yes, however, would have initiated a gate count register to mark B operation 756 and a turn on chain data address latch 758 provided a CDA flag signal and T405 signal were present at the appropriate time. The sequence 4 routine is turned off on operation 742 at time T6.

The storage request 695 is executed for a data fetch. The routine has already been described in conjunction with FIG. 16J and FIG. 16K.

Referring to FIGS. 16H and I, an A full decision 760 indicated on FIG. 16I is performed after the data fetch is completed. The yes condition results since the turn on A full latch was set in operation 713 described in FIG. 16K. The yes condition initiates a gate service out operation 762, provided the B full, sequence 1 and not sequence 5 signals are present. The B full signal was set as part of operation 728 described in FIG. 16L. The sequence 1 signal was set as operation 666 described in FIG. 16H. The not sequence 5 signal is present since an ending routine is not in process, a status in drop decision 754 is performed, the status in being raised by the connected I/O device as operation 664 described in FIG. 16H. When status in drops, an operation 766 initiates a drop service out. The operation 766 also turns off the sequence 1 trigger and the bus in trigger latches. The operation requires the sequence 2 trigger signals and not status in. The sequence 2 trigger signal was turned on as part of operation 682. The not status in signal was supplied as part of the decision 764. After operation 766, a sequence 2 or an update count routine 768 is performed.

7.104 SEQUENCE 2

Referring to FIG. 16N, a service in decision 770, a sequence 5 decision 772 and a B full decision 774 are performed successively. When status in drops, the I/O device raises the service in as a response to service out. This cooperation is described in conjunction with FIG. 12. The failure to drop service in and the continuance of a status in tag results in a sequence 5 routine. Status in would fail to drop in the event an error condition existed at the I/O device. The absence of a sequence 5 signal and the presence of a B full condition begins the transfer of data from the B register to the I/O device. The B full condition was indicated as operation 728 described in FIG. 16L.

The I/O interface will now begin to transfer, in sequence, the four bytes of data transferred as part of a storage address 10 (see FIG. 18). Data is transferred to the I/O device by performing a gate service out operation 776. The I/O device drops the service in which was raised as part of decision 770. When service in drops, a byte of data is transferred from the B register to the I/O device. When service in drops, a drop service out operation 780 is performed. The I/O device raises the service in line as indicated in the decision 770 and in the description of FIG. 12. This process is continued until the four bytes of data are transferred to the I/O device. As each byte of data is transferred, a change byte counter operation 782 is performed. A detailed description of this operation will appear hereinafter.

As data is being transferred a last word trigger decision 784 and a byte counter latch equal zero decision 786 are being performed. The last word trigger is set for the condition indicated. The byte counter latch equals zero when a word boundary is reached. Since this is the initial data transfer, both decisions are no until the last byte of the first word is transferred to the I/O device. At this time, the decision 786 is yes and a sequence 3 update count routine 788 is begun. An operation 790 turns on the $BC{=}Eq^0$ trigger.

Continuing on FIG. 16O, a turn off B register operation 792 is performed. Also, an A full decision 794 is executed. The A register full was turned on as operation 713 as described in FIG. 16K. A yes condition initiates the sequence 3, update count routine 788.

7.105 SEQUENCE 3

Referring to FIG. 16P, the update count routine 788 initiates an operation 798 which gates the A register to B register. This operation also turns off the latches indicating A full and byte counter equal zero. The B full latch, however, is turned on. A chain data address latch on decision 800 is performed and since no flags have been placed in the CCW (see FIG. 18) a no condition initiates an operation to gate the count register to the adder to decrement the count. The court register is decremented by 1 or 8 bytes in the adder, and gated back to the count register as operation 804. Continuing on FIG. 16Q, an adder latching operation 806 is performed followed by a turn on sequence 4 operation 722. This initiates the sequence 4 routine described in FIGS. 16L and M.

The channel now begins to recycle through these sequences to transfer the remaining words into the two I/O devices. Referring to FIG. 16R, a summary is provided of the channel operation for executing the write command. The first operation is an initial selection 807 which selects the I/O depice, obtains the CCW, provides the channel status, and loads the A register with data word 1. These operations were described in conjunction with FIGS. 16 through 16H. The next operation, a sequence 4 operation 808, updates the data address and gates the A register to the B register. A data fetch 809 is conducted during this sequence to load the A register with word 2. These operations were described in conjunction with FIGS. 16L, M, N, and O. A sequence 2 operation 810 then begins transfer of word 1 to the I/O device. The byte counter is changed during this operation.

Concurrently, a sequence 3 operation 811 updates the count register and gates word 2 to the B register. This operation is described in FIGS. 16P and Q. A sequence 4 operation 812 updates the data address and loads the A register with word 3 by a data fetch 813.

A byte count equal zero decision 814 and a byte count equal to the count register decision 815 are executed to recycle the data transfer operation. Normally the decisions 814 and 815 will be yes and no, respectively, which will start the recycling. When the fourth word is loaded into the I/O device the byte counter will equal the count register sum. The latter is compared with the look-ahead portion of the counter. The yes condition of the decision 815 will initiate a sequence 2 routine 816 which is followed by a sequence 5 routine 817 or ending routine.

Turning to the sequence 2 routine shown in FIGS. 16N and O, the last word trigger decision 784 is yes, which is followed by a chain data address latch on decision 785. Since no flags have been included in the CCW (see FIG. 18) a no condition initiates a byte counter equal counter register decision 787, which is indicated in FIG. 16O. A yes condition initiates a turn on byte counter equal count register operation 789. This operation is followed by a turn off B full latch 791, and an operation 793. The former operation resets the byte counter. The latter operation resets the count register to turn on the sequence 5 trigger which initiates a sequence 5 routine 795.

7.106 SEQUENCE 5

Turning to FIG. 16S, the sequence 5 routine 795 begins with a sequence 3 or sequence 4 decision 826. Both of these sequences were turned off, the former in operation 734 (see FIG. 16L) and the latter in operation 742 (see FIG. 16N). An operation 827 to block a service out-reply to service is performed simultaneously. An error in channel decision 828 is next performed but before this decision, as indicated in FIG. 16T, a turn off clock operation 829, an operation 831 to turn on the update count latch 831, and a zeros to bus out operation 833 are performed in overlapped relation. These operations ready the I/O device for status information.

Returning to FIG. 16S, and assuming no error condition for the decision 828, a service in decision 830 is executed. The service in decision is no, since the service out tag was blocked in operation 827. The status in decision 832 is yes, due to the zero command on the bus out, described in connection with operation 833 (see FIG. 16T). A gate service out operation 834 is next performed. Concurrently a turn on command chain latch operation 833 is not performed since an interrupt status signal is not present as required to execute the operation. Also, a correct the count rountine is not performed since an interrupt status signal is not present as required by operation 835 which gates the complement of the byte counter in the count register −1 to the adder.

Turning now to FIG. 16U, a gate service out routine 835 begins with a sequence 1 and a sequence 2 decision 836. This decision is no since the sequence 1 operation was turned off as operation 766 in FIG. 16I. Since one of the signals is not present, a no condition results. A command chain latch on decision 837 is performed. The decision is no since no flags are in the CCW.

Referring to FIG. 16V, the no condition of the decision 837 (see FIG. 16U) initiates an operation 840 which gates the adder to command address register and an operation 842 which turns off the latch adder command address trigger. The operations 840 and 842 are not performed since no error condition exists. A turn off select out operation 839 is also executed. Thereafter an operation in or status in drop decision 844 is executed.

Referring to FIG. 16X, a yes condition initiates a test I/O decision 846. The no condition results from this decision since a test I/O instruction is not being performed. The no condition initiates an interrupt status decision 847 followed by an end status or unit free status operation 849. A turn on interrupt operation 850 initiates an interrupt routine which will be described in conjunction with FIG. 16X and FIG. 16Y. Before the interrupt operation is begun, a turn off sequence 5 operation 852 is executed.

Turning to FIG. 16W, the interrupt operation 851 begins with a test I/O decision 853, which produces a no condition since a start I/O instruction (write command) is being executed. Before this decision is performed, an operation 854 is executed to remove the interrupt latch. After the test I/O decision, a start I/O latch on decision 855 is conducted. The latch was turned off at the end of the initial selection routine. The channel suspends operation at this point while a CPU accept decision 857 is executed. When the yes condition appears, an operation 858 gates the unit address register to the unit address bus. An operation 859 gates all marks to storage. An operation 860 initiates a turn on Z address latch which is the address to store the CSW. Before a BCU response decision 851 is performed, an operation 862 raises the store bus to the BCU. An operation 864 removes the interrupt latch. When the BCU response condition is yes, the Z address of the CSW is gated to the storage address bus as operation 863. The interrupt latch is turned off as operation 864.

Referring to FIG. 16Y, a start I/O latch on decision 865 is no and initiates an operation 866 which gates acceptance to the CPU. An operation 867 gates the channel status word to the storage data bus in. After an advance pulse decision 868 is executed, an operation 869 turns off the CCW and an operation turns off the read/write latch. When the late advance pulse portion appears, a decision 871 is executed to turn off a storage cycle 872 indicated in FIG. 16W. On completion of this operation, a turn off remove interrupt operation 873 is performed followed by a start I/O latch on decision 874 and a test I/O decision 875. Both of these decisions are no and the channel originates a resume polling operation 876 described in FIG. 16A.

This ends the write operation of the channel. The next operation to be described will be a Read Command. The operation will be discussed in block form only since a detailed description is given hereinafter in connection with FIGS. 24 through 236.

7.2 START I/O (READ COMMAND)

Referring to FIG. 17, a read operation comprises an initial selection routine 880 substantially the same as operation 807 described in FIG. 16R. In the present operation, however, the read command is supplied to the bus out in lieu of the write command. After the initial selection process, a test B full decision 882 is executed to initiate a sequence 2 routine 883. A sequence 3 routine 884 is initiated if the B register is full. The sequence 2 read operation 883 begins to load the B register with the first word from the I/O device. As each byte is loaded into the B register, the byte counter is corrected. When the byte counter equals zero, a decision 885 followed by the B full decision 882 initiates the sequence 3 read operation 884. This operation transfers the contents of the B register to the A register and updates the counter. A storage request is initiated to perform a data store operation 888 which loads the storage unit with the first word. After the first word has been stored, a sequence 4 operation 890 is executed to update the data address. A sequence 2 operation 882 is being performed concurrently with the operations 884, 888, and 890. The byte counter should indicate zero at this point. The byte counter decision 885 is yes and operations 884, 888, and 890 repeated to transfer the second word to the storage unit. This process is continued until the byte counter equals the count register whereupon a decision 892 initiates a sequence 3 operation 894 which transfers the contents of the B register to the A register, updates the counter and initiates a storage request. The storage request 896 loads the last data word into the storage. A sequence 4 operation 898 is begun to update the counter and initiate a sequence 5 routine 900 which terminates the channel operation as described in FIG. 16R. A chaining data address decision 895 is executed during these operations. A yes condition recycles the routine.

The initial selection routine 880 has the same flow charts as indicated for the write operation, except in FIG. 16H of the write routine, the decision 688 is yes which directs the channel to a sequence 2 routine 689. The sequence 2 routine is given in FIGS. 17A and B. The routine performs a data transfer operation, but in a read mode. For reasons of brevity, the flow charts will not be explained in detail. Instead, a normal sequence 2 routine can be observed on FIG. 17A, from the various broken lines connecting the decisions and operation. The solid lines are other actions that may occur during the operation. On FIG. 17B the preliminary operations for a sequence 3 operation on 884 are indicated by short dash and dot lines. The short dash and double dot lines indicate the operation for initiating the sequence 5 when the byte counter equals the count register.

The sequence 3 routine 884 is shown in FIG. 17C. The dash lines indicate the operation required to initiate a data store 888 and update counter routine 809. Turning to the data store operation 888, described in FIG. 17D, the dashed or broken lines indicate the various operations performed in executing the data store. The routine 809 is described in FIGS. 16P and 16Q. The dashed lines in these figures indicate the operation in the routine 809. When the data store routine 888, sequence 3 routine 884 and up date count routine 809 are completed. Routine 809, a sequence 4 routine 722 described in FIGS. 16L and 16M, is initiated.

Returning to FIG. 17, the sequence 5 operation 900 is completed after the sequence 4 routine. The sequence 5 routine is the same as that described in FIG. 16S through 16Y. This completes the read operation but as previously pointed out a detailed description will be given in conjunction with FIGS. 24 through236.

7.201 READ BACKWARD

A read backward operation is performed in an identical manner to that described for FIGS. 17A and 17B except the byte counter is adapted to provide complement outputs in lieu of true outputs. The operations register 212 (see FIG. 13A) as indicated in the FIG. 167, provides a read backward output. This output is received at the byte counter control section, FIGS. 219A through 221, to adapt the counter to provide complement outputs in lieu of the true outputs. The complement outputs will cause each data address to be reduced by one instead of being increased by one for the normal read operation. Additionally, the complement outputs will cause the B register to be loaded from byte position 7 and terminate at byte position 0 instead of loading from byte position 0 and terminating at byte position 7 as in the case of the normal read operation. This completes the principal operation of the channel and the remaining operation, i.e. TIC, sense and control, will be described after a description of chaining command addresses and chaining data addresses.

7.3 CHAINING

There are two types of chaining, chaining of data addresses and chaining of commands. It is controlled by the chain data address (CDA) and the chain command (CC) flags in the CCW. These flags specify the action that is to be taken by the channel upon the exhaustion of the current CCW. The setting of the CDA and CC flags is propogated through the Transfer In Channel command. This means that the Transfer In Channel command, when received by the channel, is treated as a free command and will simply cause the action specified in the last command to be handled at a different memory location, i.e., the memory location specified by the transfer command.

When the channel has performed the transfer of information specified by a CCW, it can continue the acivity initiated by the Start I/O instruction by fetching a new CCW. The fetching of a new CCW upon the exhaustion of the preceding one is referred to as chaining, and the CCW's belonging to such a sequence are said to be "chained." Chaining normally takes place only between CCW's located in successive double word locations in storage. It proceeds in an ascending order of addresses. Two chains of CCW's located in noncontiguous storage areas can be coupled for the purpose of chaining by means of the Transfer In Channel command. All CCW's in a chain apply to the I/O device specified in the original Start I/O instruction.

7.301 CHAINING COMMAND ADDRESSES

The command chaining flag gives the programmer the option of initiating multiple I/O operations with a single CPU Start I/O instruction. When the count of a particular CCW is exhausted and the CC flag is on, the channel will fetch the next sequential command. This new command will specify either a transfer in channel or a new I/O operation to be performed.

Command chaining takes place and the new operation is initiated only if no unusual conditions are detected in the present operation. If a condition such as data check, incorrect length, or exceptional condition has occurred, the sequence of CCW's is terminated and a condition for I/O interruption is generated. The new CCW is not fetched and the CC flag is ignored. The incorrect length condition does not suppress command chaining if the CCW had both the CC and the SILI flags on. An exception to sequential chaining of CCW's occurs when the I/O device presents the status modifier with the device end signal. The combination of status modifier and device end in the presence of CC flag causes the channel to fetch and chain to the CCW whose main storage address is 16 bytes higher than the present CCW. This means that properly handled, the status modifier condition can cause the channel to jump over one complete CCW when chaining.

Command chaining makes it possible for the programmer to initiate the transmission of multiple blocks of data with a single start I/O instruction. It also permits a single instruction to specify certain auxiliary functions such as rewinding tape at the end of a data transmission. Command chaining, in conjunction with the status modifier condition permits the channel to modify the normal sequence of operations in response to signals provided by the I/O device. Since command chaining always involves the initiation of a new I/O operation, there are no restrictions on its use.

A brief description of chaining will now be provided. The chaining command addresses begin with the chaining command latch being set in the CC flag in the CCW. The flag sets the chaining command latch. With the chaining command latch on, chaining command addresses will begin in the sequence 5 routine (see FIG. 16S) and during the gating of the service out operation 835 described in FIG. 16U. In this figure a chain command latch on decision 837 is executed. The yes condition results in a unit free decision 839. The I/O device provides a unit free signal after which the channel operates a turn off select out operation 841 as indicated in FIG. 16V. This operation occurs at time T5 and commences the operation 555 for initial selection of the I/O device. Before the selection begins, however, an operational in or a status in drop decision 843 is executed after the select out is turned off. This decision initiates a service out latch reset operation 847 and a turn on set up 849 which recommences the set up operation beginning in FIG. 16C. Before leaving FIG. 16V, it is believed in order to note that the operation 851 to gate the command address register to the adder is not executed since the jump bit or status modifier in the I/O status is not present. The jump bit is a status bit which is sent by the I/O device when performing a search and compare operation, described in a copending application, Ser. No. 357,370, previously mentioned.

Turning to FIG. 16C, the decision 558 is executed followed by the operation 560 and decision 562, all of these steps having been previously described. Since the start I/O is not present, a no condition results. This condition results in a command chain latch on decision 564 which initiates a memory operation described in FIG. 16J. This operation obtains the next CCW by a CAW fetch described in FIGS. 16E and E1, followed by a CCW fetch described in FIGS. 16E2 and E3. After these operations are completed, the channel finishes the initial selection process by executing the normal operation described in FIGS. 16F through 16H where the normal read or write operation is selected, depending upon the command included in the new CCW. This completes the command chaining operation, but it should be noted that the operation can also execute the sense control and transfer in channel routine as well as the read and write routine.

7.302 CHAINING DATA ADDRESSES

Data address chaining permits different parts of the same record to be stored or fetched from non-contiguous areas in memory. The channel simply interprets the CDA flag as a signal for it to fetch a new count, data address, and flags. The operation code field in the newly fetched CCW is ignored. Since this operation requires the channel to make extra CCW fetches during the time that the I/O device is still feeding data bytes into the channel, limitations may be necessary. One limitation is to require the device to be programmed for word boundary or double word boundary if its data rate exceeds a set figure. If the sequence of CCW's contains a transfer in channel, then the limitations become even more stringent. However, these limitations may be disregarded by the operation described in section 10.0.

This chaining operation is different for both the read and write commands. Both operations, however, permit the channel to continue processing data without interrupting the CPU for a next instruction. A brief description will be given of the chaining operation for a write command, after which a brief description will be given for a chaining operation for a read command.

The CDA flag set in the CCW sets the chain data address latch. The chain data address latch for a write operation begins in a sequence 4 routine shown in FIG. 16M. When the count is equal to less than two words, a decision 754 is followed by an operation 756 and 758, the latter turning on the CDA latch, while the former gates the count register and Mark B register to turn on retain storage.

After the turn on-data fetch operation 750 is performed, the channel commences to execute a sequence 3 operation 811 (see FIG. 16R) described in FIG. 16P.

Turning now to FIG. 16P, the decision 800 is yes followed by a byte counter equal count register test 801. A no condition results since the last word has not been transferred to storage. The decision 801 causes a turn on last word trigger operation 803 which is followed by a turn on storage request operation 805 to obtain the next CCW. The storage request obtains the new count and data address. Following the data fetch, the sequence 3 routine (see FIG. 16R) is re-executed, but this time the decision 801 is yes. The channel now commences the preliminary operation for a sequence 4 operation.

Turning to FIG. 16Q, a turn on clock operation 901 is followed by a resetting of the count register 903 and the sample for last word condition of the new count to turn on the sequence 4 as indicated in operation 905. Before sequence 4 begins, the byte counter equal count register trigger is turned off as operation 907 and the command data address latch is turned off as operation 909. Also performed is an operation 911 to gate the adder to the command address register to prepare the channel for the next CAW. With the new count and data address, the channel recommences to execute the sequence 4 followed by a data fetch and a simultaneous execution of sequence 2 and 3 as indicated in FIG. 16R. Channel operation continues as indicated in FIG. 16R until the byte counter equals the word counter whereupon a sequence 2 and sequence 5 operation terminates the channel operation.

Chaining data addresses during a read operation begins in sequence 3 as indicated in FIG. 17C. A last word trigger on decision 925 is followed by a chain data address flag decision 927. This decision is yes due to the CDA flag in the CCW. The yes condition causes an operation 929 to turn on the CDA latch. The operation 929 is followed by a skip flag decision 931, which is no since the skip flag is not in the CCW. This decision initiates a turn on storage request 933 for a CCW fetch described in FIGS. 16J, 16G, and 16E1 through 16E3.

Continuing on FIG. 17E, a decision 935 is no since byte counter latch is not 4. An operation 937 resets the byte counter register and turns off CCW valid. This is followed by an operation 939 which holds the last word trigger off. After the storage request, indicated in FIG. 17E, a CCW valid decision 941 is followed by a turn on sequence 4 operation 943.

The sequence 4 operation described in 16L executes a CDA latch on decision 788 which initiates a sequence 4 CDA latch routine 739, shown in FIG. 17F.

Turning to FIG. 17F, this sequence performs an operation 741 to turn off the sequence 4 routine. An operation 743 turns off the CDA latch. Contemporaneously, an operation 745 is executed to gate the count and data address to the adder and byte counter to select the correct byte position for data stored in the A and B register. The adder is gated to the count register as operation 747 following which the adder is latched in an operation 749. A sequence 2 read routine, the description of which begins at FIG. 17A is repeated after operation 743 and 749 have been completed. Also performed during the sequence 749 are several error routines which commence a sequence 5 routine if an error is found. None of these routines will be described again, however, for reasons of brevity.

7.4 SKIP OPERATION

Skipping is the suppression of main storage reference during a read, read backward and sense operations. Skipping is controlled by the skip flag which can be specified individually for each CCW. The setting of the skip flag is ignored in all except the read, read backward and sense operations. When the skip flag is a binary one, skipping occurs. Skipping affects only the handling of information by the channel. The operation at the I/O device proceeds normally and information is transmitted to the channel. The channel keeps updating the count but does not place the information in main storage. If the CC or the CDA flag is one, a new CCW is obtained when the count reaches zero. In the case of data address chaining, placing information into storage is resumed if the skip flag in the new CCW is zero.

No checking for invalid or protected data addresses takes place during the skipping operation. Normal checking for programming and equipment occurs. Any invalid or unusual condition generates the corresponding condition for an I/O interruption, or when discovered during the initiation of a first command causes the status bit portion of the CSW to be stored during the execution of the start I/O instruction.

The skipping feature, when combined with CDA chaining, permits the program to place in main storage selected portions of a record of information from an I/O device.

Turning to FIG. 17C, a brief description will be provided of the skip operation. A skip flag decision 924 causes an operation 926 which turns off the A full latch. The channel keeps cycling through the read operation (see FIG. 17) until the last word trigger decision 925 is yes, whereupon a chain data address flag decision 927 is executed. The no condition of the decision 927 has been described in connection with chaining data addresses, and no further comment will be made. The yes condition initiates a turn on data address latch operation 929 which is followed by a skip flag decision 931. The no condition of decision 931 has been described with the chaining data address and no further comment will be made regarding this operation. The yes condition of decision 931 initiates a turn on CCW fetch operation 934 which is followed by a storage request 936 indicated in FIG. 17E. This operation proceeds to obtain the next CCW for use in the channel. Prior to the storage request, an operation 938 is performed to gate the command address plus one to the adder. This completes the skipping operation.

7.5 OTHER COMMANDS

The remaining commands for a start I/O operation will now be described. These commands are transfer in channel, sense, and control. Basically, these commands are based on the read and write operations previously described.

7.501 TRANSFER IN CHANNEL

The Transfer In Channel (TIC) command causes the channel to fetch the next CCW from the location specified by the data address field of the TIC command. The data address is then incremented and placed in the command address register. The TIC initiates no operation in the channel or at the I/O device. The purpose of the TIC command is to provide chaining between nonadjacent CCW's. TIC can occur both in data address and command chaining.

The TIC command may not be the first command in a list, i.e., it may not be a command address during a start I/O instruction. Likewise, TIC may not be the command addressed by another TIC; i.e., there may not be two TIC commands in sequence. Either of these conditions will be detected by the channel and cause a program check condition and termination operation. In the first case, when the TIC is discovered during a start I/O instruction, a program check condition is set into the CSW and the CPU receives a code 01 release. In the second case, where there are two TIC's in sequence, the operation is terminated and an interrupt condition is signalled to the CPU.

In order to address a CCW on integral boundaries for double words, a CCW specifying TIC must contain zeros in bit positions 29, 30, and 31. When this restriction is violated or when an invalid address is specified, the program check condition is generated. Detection of these errors during data address chaining causes the operation of the I/O device to be terminated.

The contents of the second half of the CCW, bit positions 32 through 63, are ignored; similarly, the contents of bit positions 0–3 of the CCW containing the TIC commands are ignored.

Turning to FIGS. 16E2 and 16E3, the TIC operation will be briefly reviewed. This operation was described as part of a CCW fetch operation in connection with the initial setup. The TIC operation 619 begins during a chaining command address or a chaining data address operation. These operations initiate a storage request which a generate a TIC command. The command after the advance pulse falls initiates the turn on TIC cycle operation 623. The operation 623 initiates a turn on storage request and gates the data address to the adder on operations 625 and 627, respectively. After a BCU response, the data address is gated to the storage address bus as operation 639 and an address valid indication is performed as operation 641. The operation 645 is performed to gate the storage bus content to the data address count, flag, and command registers after the advance pulse has appeared. A zero check is performed as operation 647 and an inspection of the CCW for a second TIC operation is performed as operation 653. The operation 647 and the 653 generate the sequence 5 routine as previously described. The channel then proceeds to operate normally.

7.502 SENSE

The sense command initiates the execution of a sense operation at the I/O device. The command causes sense status information to be transferred from the I/O device to main storage. The information is placed in storage in ascending order of addresses specified in the CCW. The sense command thus provides detailed information concerning the status of an I/O device. The information may, for example, specify whether a tape in a magnetic drive is loaded or a stack in a card reader is full. The information may also indicate any unusual conditions that may have occurred in a preceding operation. The status information provided by the sense command is more detailed than that supplied by the I/O status byte in the CSW, and may describe reasons for some indications that appear in the CSW. The amount and meaning of the status information are peculiar to the type of I/O device. The CCW used in a sense command is inspected for all five flags. Bit positions 0–3 of the operation decoded in the CCW may contain modifier bits as previously indicated in connection with the description of the command code.

The sense command is executed as a write operation described in conjunction with FIGS. 16 and 16A through 16Y. After initial selection, the I/O device supplies the required data. Channel operation is terminated in the regular way, i.e., the byte counter equals the count register or the I/O device may send status in which will initiate a sequence 5 routine.

7.503 CONTROL

A control command is employed to initiate an operation at an I/O device that does not involve transmission of data. Such operations involve backspacing or rewinding magnetic tape, or positioning an access mechanism on a disk file. For most control functions, the order is encoded in the modifier bits and no control information is contained in the location specified by the data address of the CCW. Any further information which may be required for the operation, such as second level addressing for files, is provided by the control information transmitted under control of the CCW.

A CCW specifying a control command may not contain a count of zero even if the entire operation is specified by the command code. If the I/O device does not need any additional information for the execution of the operation and signals the end condition during a command initiation cycle, the control information specified by the CCW is not transferred to the I/O device and no incorrect length indication is generated. If the control function requires information other than that transmitted by means of the command code, then the information at the data address contains this additional information. A CCW used in a control operation is inspected for the CDA, CC, SILI and the PCI flags. The setting of the skip flag is ignored. The action of the flags for control immediate is variable depending upon the particular flag. The SILI flag setting is ignored and the flag is always assumed present. The presence of a CDA flag in the command will always cause termination of the operation whether the CC flag is present or not.

The control command is executed in exactly the same manner as described for the write command. After initial selection, the control command will indicate to the I/O device the particular operation that is desired to be performed. A rewind operation will cause the I/O device to reply with status in whereupon a program interrupt condition is initiated and the I/O device status stored. The I/O device commences the rewinding operation after a disconnect from the I/O interface. The channel resumes polling on disconnect. On completion of rewinding, the I/O device generates a status in condition which causes the channel to initiate a program interrupt. The device status is stirred and the I/O device disconnected from the interface. The channel again begins polling.

The control command may also cause the I/O device to perform a search and compare routine. This routine cause the I/O device to search the stored information for a byte corresponding to the control information. While the I/O device is searching the stored information, the channel executes a TIC routine which restransmits the data to be compared by the I/O device. On comparison, the I/O device may generate a jump bit in the status information which causes the channel to change from a TIC routine to another routine, for example, a read operation described in a new CCW. A more detailed description of the I/O device operation in response to a control command is provided in the above-mentioned copending application, Ser. No. 357,370, filed Apr. 6, 1964.

This completes the start I/O instruction description and the various modifications thereof. The next several paragraphs will describe the remaining CPU instructions, that is, Test I/O, Halt I/O, and Test Channel.

7.6 TEST I/O

The test I/O instruction is employed to clear interruption conditions that exist in an addressed channel or associated I/O devices. The instruction will cause a CSW to be placed in a preselected storage location and the interruption condition to be cleared. To initiate a test I/O at a channel, the CPU must bring up the test I/O multiplex line 112 (see FIG. 6) and place an eight bit unit address on the unit address bus out 125 (see FIG. 6). The instruction is completed by raising the select channel line 122 (see FIG. 6) of the desired channel. The channel, if not working, will compare the received unit address with the unit address held in the unit address register 210 (see FIG. 13A). If they compare, the interruption condition in the channel will be stored in a preselected location and the CPU released. If the channel appears available, the contents of the line 125 will be stored in the register 210 and the specified device selected as in a start I/O operation. The code, however, will be a test I/O code which requests only status from the device. If the status is received, a CSW is stored and the condition code is sent to the CPU prior to a release. If a zero status is returned when the test I/O command is issued, the condition code 00 is sent to the CPU and a release is accomplished. Thus, the test I/O instruction causes a CSW to be stored whenever a tested device has conditions for interruption either within the channel or stacked in the device. The CSW will also be stored when the channel or I/O device detects an error during the execution of the test I/O instruction. The status bits in the CSW identify the error condition. The CSW that is provided by the test I/O instruction has the same format as that provided by the I/O interruptions but is stored at a different storage location. The contents of the CSW always pertain to the device to which the instruction is addressed. The condition code for the test I/O instruction is the same as that described for the start I/O instruction except the condition code 10 or busy condition indicates that the channel is actively working on a previously initiated command or that the channel has an interrupt waiting from some other device.

Turning to FIG. 17G and H, a flow diagram description of the test I/O instruction will be provided. The test I/O routine 540 (see FIG. 16B) initiates an operation 541 which blocks the normal interrupt release to the CPU. A decision 543 is next performed to determine whether or not an interrupt condition is waiting in the channel. A yes condition proceeds to generate the channel status. A no condition proceeds to generate the I/O status.

Considering the channel status, an operation 545 is performed to turn on the clock and gate the unit address bus to the unit address register for comparison operation. This operation is executed when the test I/O interrupt waiting signal is present. A decision 547 compares the contents of the unit address register with the unit address of the test I/O instruction. A no compare condition indicates that the channel is busy and an operation 549 generates a code 10 to the CPU. After a delay, a release operation 551 is supplied to the CPU followed by an operation 553 to turn off the clock and block interrupt release latch.

A yes condition for the decision 547 initiates an operation 555 which turns on a pseudo-accept interrupt. This operation generates a false interrupt response since the CPU is already tied tö the channel. The interrupt response initiates an operation 557 which holds a test I/O latch off. This operation is followed by an operation 559 which turns on a storage request and the Z adder latch, the latter adapting the channel to force the channel storage word address to the storage unit.

Continuing on FIG. 17H, the Z address is gated to the storage address but, as an operation 561 after the BCU response. This operation also includes a turn-off of the interrupt and program controlled interrupt trigger. Simultaneously, a BCU data request decision is performed and when received the channel executes an operation 565 which gates the channel status to the storage output bus. When the storage unit supplies an advance pulse, an operation 567 is executed to turn off the remove interrupt. While the operations 565 and 567 are being performed, the channel performs a turn-off clock operation 569 and simultaneously it generates a code 01 to the CPU. The channel performs a release operation 571 when the CPU accepts the code. After the channel status information has been stored, this routine terminates by performing an operation 573 which turns off the pseudo-accept interrupt.

Returning to FIG. 17G, the channel operation will be described for an interrupt existing at the I/O device. A no condition for the decision 543 initiates a select-in drop decision 575. When the select-in drops, as it will since the interruption condition exists in the channel, an operation 577 is executed to turn on the test I/O latch. The unit address bus is gated to the unit address register as operation 579 and the setup routine described in FIGS. 16C, D and F is commenced.

Turning to FIG. 16C, the unit address register is gated to the bus out as an operation 556. A no condition for the decision 558 initiates operation 560 which turns on the clock and turns off the polling interrupt trigger. A start I/O decision 562 and the CC latch on decision 564 are both no which initiates the operation 566 to turn on the address out tag line.

Continuing on FIG. 16D, the bus out parity, decision 569 should be no. This decision is followed by the operation 574 to turn on select out line. With the address on the bus out and the select out up, the select in decision 580 is no and the address in decision is yes replying to the address out. The yes condition of the decision 582 is ANDed together with the CCW valid, decision 612; program check decision 614 and test I/O decision 616. The latter condition generates a yes condition while the former generates no conditions. The operation 618 is executed following which the address in is gated as operation 620.

Continuing on FIG. 16F, the I/O selection process continues with the operation 624 to turn on the clock. The address in and address out are compared as decision 626 following which the test I/O decision 630 is executed. The yes condition of the test I/O decision initiates the operation 632 which turns off the setup.

Continuing on FIG. 17H a status command typically all zeros is supplied for the bus out as operation 581. Next the command out line is raised as operation 583 and a decision 585 is performed to determine whether the address in line drops. The command-out line is dropped as operation 587. The I/O device next raises a status in line and a decision 589 initiates a turn on sequence 5 operation 591. The sequence 5 routine 795 is the same as that described in connection with FIGS. 16S through 16Y. Accordingly, no additional comment will be provided for this routine.

7.7 HALT I/O

The halt I/O instruction is initiated by the channel bringing up the hold I/O multiplex line 113 (see FIG. 6) and signalling the proper channel on the select channel line 122 (see FIG. 6). This instruction does not require the 8-bit unit address. The halt I/O instruction issued to a not working channel or one that has finished an operation and is waiting to interrupt will cause no action. The CPU will be released with a condition code 00.

When the halt I/O instruction is issued to a working channel, the channel will bring up address out and drop its select out line. The control unit that is operating on the I/O interface will respond by dropping in-tag lines; thus immediately disconnecting itself from the channel. The channel will turn on an interrupt request trigger, send condition code 01 and release the CPU. In this condition, the channel is inactive with an interrupt outstanding that must be cleared either by being enabled or by receiving a test I/O with the proper unit address.

The channel will generate a condition code 11 when the channel is not available to receive the issued instruction. The condition code 01 for storing the channel status word is not executed in response to the halt I/O instruction.

Turning to FIG. 17I, a flow diagram description of the halt I/O instruction is provided. The halt I/O operation 511 (see FIG. 16) initiates a channel free decision 513. The yes condition generates a condition code 00 to a CPU which is followed by a release. The no condition of the decision 513 initiates an operation 515 which turns on the wrong length record latch. The operation 515 turns off the select out, and turns on the address out and the clock as an operation 517.

The channel executes an operational-in-decision 519. For the yes condition, the channel turns off the address out and turns on the interrupt as operation 521. As part of the interrupt, the channel generates condition code 10 which is sent to the CPU as part of operation 523. After a deskew delay interval, the channel generates the release to the CPU as operation 25. This concludes the halt I/O instruction operation.

7.8 TEST CHANNEL

The test channel instruction is initiated by the CPU bringing up the test channel multiplex line 114 (see FIG. 6) and signalling the proper channel on the select channel line 122 (see FIG. 6). This instruction does not require the eight bit unit address. The only function of the instruction is to cause the channel to send a condition code describing the channel's present state at which time the CPU is released. The condition codes have a slightly different meaning for the test channel instruction than for the start I/O, test I/O, or halt I/O instructions. The condition code 00 indicates the channel is not working nor is it aware of any outstanding interruptions. The condition code 01 indicates the channel contains an interrupt condition that will be immediately transferred to storage if enabled by the CPU. The condition code 10 indicates the channel is actively pursuing an operation initiated by some previous instruction. The condition code 11 indicates the channel is not operational as in the case of the start I/O or test I/O instructions.

Turning to FIG. 17J, a test channel routine 527 is indicated. An interrupt available decision 529 is first performed by the channel is response to the CPU instruction. A yes condition initiates an operation 531 which generates a condition code 01 that is sent to the CPU. A release operation 533 follows after a necessary deskew delay interval.

A no condition for the decision 529 initiates a channel working decision 535. The yes condition generates a condition code 10 which is sent to the CPU as an operation 537. The release operation 533 is executed after the necessary deskew delay interval.

The no condition for the decision 535 initiates an operation 539 which generates a condition code 00 sent to the CPU. A release operation is executed after the necessary deskew delay interval.

7.9 INITIAL PROGRAM LOADING (IPL)

This instruction supplied by the CPU to the channel loads a preselected program from an I/O device into storage. A brief description will be provided to the CPU in initiating the instruction, after which a description of the channel operation will be supplied.

The IPL is initiated by operating the diagnostic control section 417 (see FIG. 14F) to set into the manual switches the address of the I/O device having the initial program. When an IPL switch is actuated, the CPU and BCU are set to initial conditions. The CPU raises the IPL multiplex line 118 (see FIG. 6) and the select channel line 122 (see FIG. 6).

The CPU then waits for a channel release before proceeding further. The channel does a complete reset, that is, all devices are reset to initial state; the control units are reset and the channels cleared and made ready. The selected channel, after completing a reset, proceeds to read in the initial program as will be described hereinafter. If the operation is concluded successfully, an accept is sent to the CPU and normal interruption conditions are suppressed. If the operation is not successful, the CPU does not receive a release signal. This latter situation requires an operator to intervene and retry the program. The CPU when it receives the release signal is then freed to obtain a program status word and proceed to process data.

In response to IPL instruction from the CPU, the channels initiate a complete reset. This means the channel clears and resets its own circuits and in addition, drops the operational out line to all connecting control units for a period of six microseconds. All control units and their I/O devices are caused to reset. On completion of reset, the command address register will indicate a binary zero condition. The data address register will also indicate a binary zero. The unit address register will contain the contents of the unit address bus. The unit address bus was loaded as part of the CPU setup. A read operation will be forced into the operation register and a count of 24 bytes will be forced into the count register. A command chain flag will be forced in the flag register.

Next, the channels will select the units specified and read 24 bytes of data into storage starting at address zero. The channel will read bytes two and three from the I/O device, but will suppress the bytes from being sent to storage. In their place, the channel will insert the channel number into byte 2 and the unit address into byte 3. This information will be stored in storage by a regular storage request, at the CSW location. The information is thereby made available to a program as an indication of the program status. Any incorrect length indications generated by this operation will be suppressed and the channel will proceed to act on the CC flag.

As part of the CC chaining operation, the channel will fetch a CCW from a preselected storage location. The CCW will be a read command and a list of commands will be executed by the conventional chain data address routine. At the completion of the list of commands, if there are no errors, the channel will suppress the normal ending interruption condition and release the CPU. At this time, the channel is ready to accept a new instruction from the CPU. If the channel detects an error during an IPL operation, it will not signal a release to the CPU.

8.0 BYTE COUNTER

The byte counter is a binary octal counter (zero through seven) with an odd parity bit for self-checking purposes. Each counter position is composed of 3 stages— register, latch, and step. The latch and step positions are the look-ahead features which eliminate ripple time associated with binary-trigger counters, so that when the change counter line is activated the register positions (P, 3, 2, 1) are immediately set to the value that had been sitting in the look-ahead feature. The look-ahead feature is always sitting at a number one higher than that which is in the register positions. Once the register has changed there is no delay required to decode its outputs as the look-ahead feature is latched up while the counter is changing and then the look-ahead circuitry advances immediately to the next one ahead count as soon as the change line drops. The register positions can be set to any initial value (000 through 111) by activation of the DA REG BIT lines. The counter will advance from its initial setting to zero and continue advancing (0 through 7) until set to a new value via reset and then DA REG BIT lines. Since eight bytes are associated with each full word to the channel by an I/O control unit or from the channel to the I/O control unit, this counter controls the gating of information to and from the I/O interface of the channel.

Referring to FIGS. 20A and 20B, a detailed description of the byte counter will be provided. The counter includes register latches 975, 976 and 977. Each latch is connected to a data address lines 978, 979 and 980, respectively. A parity register 981 (see FIG. 20B) is also included. The registers 975, 976, 977, 981 cooperate with a corresponding look-ahead latch which will be assigned primed reference characters identical to the register with which it cooperates. Thus, the look-ahead latch 975' cooperates with the register 975. The look-ahead latch has the next setting of the register positions. Step triggers, which change the status of the register position to the values that the look-ahead latches are set, are also included in the counter. Each step trigger will be assigned a double primed reference character corresponding to the register and latch circuits with which it is associated. Thus, the step trigger 975'' cooperates with the register 975 and latch 975' circuits. The registers 975, 976 and 977 are set by the data address lines connected therewith. The look-ahead latches 975', 976' and 977' are set to the next higher binary number. The step triggers 975'', 976'', 977'' are set to a condition which will change the registers to the latch setting when a change counter signal is received.

Table III indicates the various settings for the register, look-ahead and step triggers as change:

TABLE III

| | Register P321 | Look-Ahead P321 | Step Trigger |
|---|---|---|---|
| Value: | | | |
| 0 | 1000 | 0001 | 0001 |
| 1 | 0001 | 0010 | 0010 |
| 2 | 0010 | 1011 | 1011 |
| 3 | 1011 | 0100 | 0100 |
| 4 | 0100 | 1101 | 1101 |
| 5 | 1101 | 1110 | 1110 |
| 6 | 1110 | 0111 | 0111 |
| 7 | 0111 | 1000 | 1000 |

Table III may be demonstrated by a consideration of a single change for the byte counter, shown in FIGS. 20A and B. Assuming at time T1 that all data address inputs are binary zeros, for which a minus polarity designation is indicated, the output 982 and 983 are a plus polarity and minus polarity, respectively. These outputs indicate a binary zero setting for the register 975. The outputs 984 and 985 of the latch 975' are positive and negative, respectively. These outputs correspond to a binary one setting for the latch 975'. The outputs 986 and 987 for the step trigger 975'' are positive and positive, respectively. This setting of the step trigger 975 is indeterminate at this point but when a change counter signal is applied at terminal 988, the step trigger will change to a binary one setting which will be the next setting of the register circuit 975.

In a like manner, it can be shown that the registers 976, 977 and 981 are binary 0, 0, and parity off. Similarly, the latch circuits 976', 977' and 981' can be shown to positive indeterminate, positive indeterminate and positive indeterminate. The step triggers 976'', 977'' and 981'' can be shown to be 0, 0, and 0.

When change counter signal is applied at time T2 to terminal 988, the outputs 982, 983 are interchanged to indicate a binary one setting for the register circuit 975. The outputs 984 and 985 become positive and the outputs 986 and 987 become positive and negative or a binary one indication. Thus, register one now becomes a binary one and latch one is proceeding to a binary zero. The step trigger is a binary one corresponding to the register output. When the change signal is dropped at terminal 988, the register 975 retains the binary one. The latch 975' becomes a binary zero and the step trigger 975'' becomes a zero. It is believed apparent from the changes in the circuits 975, 975' and 975'' that the beginning of the settings indicated in Table III is being realized. Further description of the other register, latch and trigger circuits will verify Table III but such verification is believed to be readily obvious to a worker skilled in the art. Accordingly, further detailed description of the byte counter will be omitted for reasons of brevity.

In summary, the byte counter settings are supplied to the data B register 310 (see FIG. 13B) and the mark B register 302 (see FIG. 13B) to set the gates into which data will be loaded. The outputs from the byte counter register 215 (see FIG. 13B) are supplied to a byte counter decoder 217 (see FIG. 13B) which set the correct gate to permit data to be supplied to the register. The mark B register operates the storage address drivers to direct the stored information in the B register and A register to the proper storage positions.

9.0 BYTE ADDRESSING A WORD SIZE STORAGE

The channel in conjunction with the main storage unit provides for the storing of full or partial 64 bit double words beginning at any byte location in storage by using a mask type operation. The mask or mark bits in conjunction with the storage data word address effectively become a byte address. Control of this byte store operation can best be described by considering FIG. 21A. The channel read operation initially sets the starting word address in the data address register 200 (see FIG. 13A). The byte portion of the starting data address is supplied to the byte counter 216. A read command issued to the I/O unit causes a byte of data to be placed on the I/O bus in 178 which brings up the service request line 181. A sample pulse is supplied to a gate 310' at the entrance of B register 310. When the gate is opened, the character is gated into the proper byte position of the B register.

At the same time, the corresponding bit in the mask or mark B register 302 is set to a one. This operation will continue to load bytes into the B register and set the corresponding bit in the mark B register until the rightmost byte of the B register is loaded or until the read operation is complete. At this time the contents of the data B register are transferred to the data A register 308. The mark B register is transferred to the mark A register 300 and a storage cycle is initiated. When the storage replies, the addresses in data address register, mark A register and the data in the A register are gated to storage.

Turning to FIG. 21B, a description of a write storage cycle operation will be described. The word specified by the data word address is read out of storage. The information, sent from the mark A register, is used to condition the gating circuits at the input of the A register 308. Wherever the channel mark bit is zero, that particular byte from the storage array is gated into the register 308. Wherever the channel mark bit is one, that particular byte from the array is blocked and the corresponding byte in the channel is gated into the storage into the A register 308. When a regeneration cycle is initiated, the contents of register A are transferred to register B310 (see FIG. 21A) and the register 308 readied for the next word.

This system of byte addressing a word size storage can be applied to any byte size word relationship to store any byte or combination of bytes in a word.

9.1 BOUNDARY SELECTION VIA PARALLEL WORD GATED ASSEMBLY

I/O devices which transmit data are often incapable of waiting for a channel to decide where to fix the starting boundary address of a first data byte to be associated with a chained CCW. Ideally, prefetching a new CCW when the channel detects a running out of the previous word count can offset this limitation. Another alternative is for the channel to anticipate either one of two starting boundary addresses and assemble the incoming data accordingly. One could use shift cells or other devious means to correct this handicap. The present channel, however, has been designed to parallel gate into an assembly register with minimal hardware costs and thereby anticipate either of two starting address boundaries.

Turning to FIG. 22, a byte of data coming across the I/O interface 32 is gated into its own designated position by the byte counter decoder 217. Additionally, the byte is also gated into a subsequent word position. Thus, a first byte of data will be gated into position one of a single word and position one of a double word. This occurs whenever a read data address chaining operation is specified. Normally the channel will generate a new command by the time a four word count has been reached. When a new command is in the channel, a selection of either a single word or a double word can be made. If the new data address is on a double word boundary, then the second half of the assembly register will be reset of the duplicate words and the assembly of the entire double word will continue. If the new address is on a single word boundary, then the first half of the assembly register will be reset of its duplicate data and the contents of the second half of the register will be stored. This feature permits the present channel to execute data address chaining without relinquishing high speed data transmission rates. This feature also eliminates the necessity of the channel executing a chaining function on either a full byte or eight byte addressing boundaries.

10.0 ADDER, COUNT REGISTER AND DATA ADDRESS REGISTER OPERATION

Referring to FIGS. 13A and B, the adder 214 increments the data address register 200 by eight and decrements the count register 206 by eight. For a typical operation, assume that the CPU has commanded that 13 (binary 01101) bytes of data are to be transferred from storage to an I/O device starting at the sixth byte (binary 101) of a data address 30 (binary 11100) and ending at a second byte (binary 001) of data address 32 (binary 11110).

After the channel decodes the operation, and while the I/O device is being selected and readied, the data address register 200 is presently 30 (binary 11100). The data address is gated to storage and the first word to be transferred is placed into the data A register 308. This word is immediately transferred to the data B register 310 and the next word at data address 31 (binary 11101) will be loaded into the A register 308 as soon as the data address register 200 is updated.

As soon as the data address in register 200 is sent to the storage unit, it is also gated to the adder 214 but not including the byte portion. An increment signal is supplied to the adder to change the data address 30 (binary 11100) to data address 31 (binary 11101). The new data address 31 is returned to the data register 200. The next storage fetching operation begins for data address 31. While the word located at address 31 is being transferred to the data A register 308, the low order three bits of the data address or byte address (binary 10101) is gated into the adder with the count. At this time the count is 13 (binary 01101). The sum of the byte address and the count register is 18 (binary 10010). The sum is gated back into the count register. At the same time the byte address 101 is gated into the adder, it is also gated into the byte counter 216. The byte counter steps to the next or sixth byte position to condition the B register while receiving the data from the A register, assuming, of course, that this is a write operation. When the byte counter steps to position 000, a word boundary is encountered and the next data address must be obtained after the count register is decremented by eight bytes. After the A register is loaded with the next word and the address in the data address register is updated, the counter is decremented. The decrementing is done through the adder. A decrement signal is provided to the adder. The decrement signal subtracts eight from the count which now becomes 10 (binary 01010). The new count is sent back to the count register to replace the former count of 18 (binary 10010). After the next word transfer, the count register is again decremented after the A register is loaded and the data address updated. The count now becomes 2 (00010). The new count is supplied to the count register which generates a signal to turn on a last word trigger. At this point the low order three bits of the count register, i.e., binary 010, are gated into the byte counter-count comparator 312. The byte counter 216 also supplies an input to the comparator 312. This input is from the byte counter latch 219 which is one higher than the byte counter register 215. When the byte counter latch steps to binary 010, the comparator 312 will indicate a correspondence with the count register input. At this point, the comparator generates a signal that initiates an end of sequence operation.

Thus the adder is only required to update the count and change the data address registers after every word transfer. This permits the adder to operate at a slower rate than the data transfer occurring to the A and B registers. Also the adder includes a conventional parity checking circuit which inspects the count, data address, command address for parity error. The counter 216 also includes a parity checking circuit so that throughout the various arithmetic operations, a parity examination is being continually conducted. This feature improves the accuracy and reliability of the channel.

11.0 Read Operation—General

Having described the structure, cooperation and operation of the channel, a detailed description in conjunction with FIGS. 24 through 236, will now be provided for a read operation. No other routine, e.g., Halt I/O, Test I/O and operations, e.g., write, sense, transfer-in-channel, will be discussed for reasons of brevity. It is believed apparent that a worker skilled in the art can determine the details of any routine or operation from the description in section 12 and the corresponding flow chart.

The detailed description will indicate the interaction of the various control sections and other channel registers in realizing the flow chart operation described in FIGS. 16 through 17J. Before beginning the detailed description, it is believed in order to describe generally the FIGS. 24 through 236. These figures were generated by a computer process described in an article entitled "Solid Logic Design Automation (SLDA)" by P. Case et al. which is to be published in the "IBM Journal of Research and Development," April 1964. The article describes the steps required to produce the automatic logic diagrams (ALD's). The logic circuits specified in the ALD's are AND, OR's, INVERT's, single shots and the like which are all well known in the art. An article entitled "A Versatile High Performance Microelectronic Concept" by E. M. Davis, Jr. et al. which is to be published in the "IBM Journal of Research and Development," April 1964 describes the fabrication of the various logic circuits. The Davis et al. article was previously published at the Western Electronic Conference held in Los Angeles, Calif. in August 1963. All of the logic circuits fabricated in accordance with the Davis et al. article are well known in the art and a reference, therefore, is not believed necessary.

The circuit lines included in a figure are identified by abbreviations of their purpose. The description, however, will give the full designation of the line. The line designation in the description will be underscored.

Besides each circuit line on the figures is the origination or termination point, the lines entering on the left side of the figure having the original point by section and page number. The lines leaving on the right of the figures provide destination figure. Polarity indications are given on the lines.

The logic blocks in a figure are assigned designations in a row and columnar arrangement. The numeric in a logic block is the column designations. The letters adjacent to the numeric is the row designation.

The remaining designation in the logic blocks is the functional operation, i.e., A for AND; OR for OR; N for Invert.

12.0 DETAILED READ OPERATION

Figure 30A:
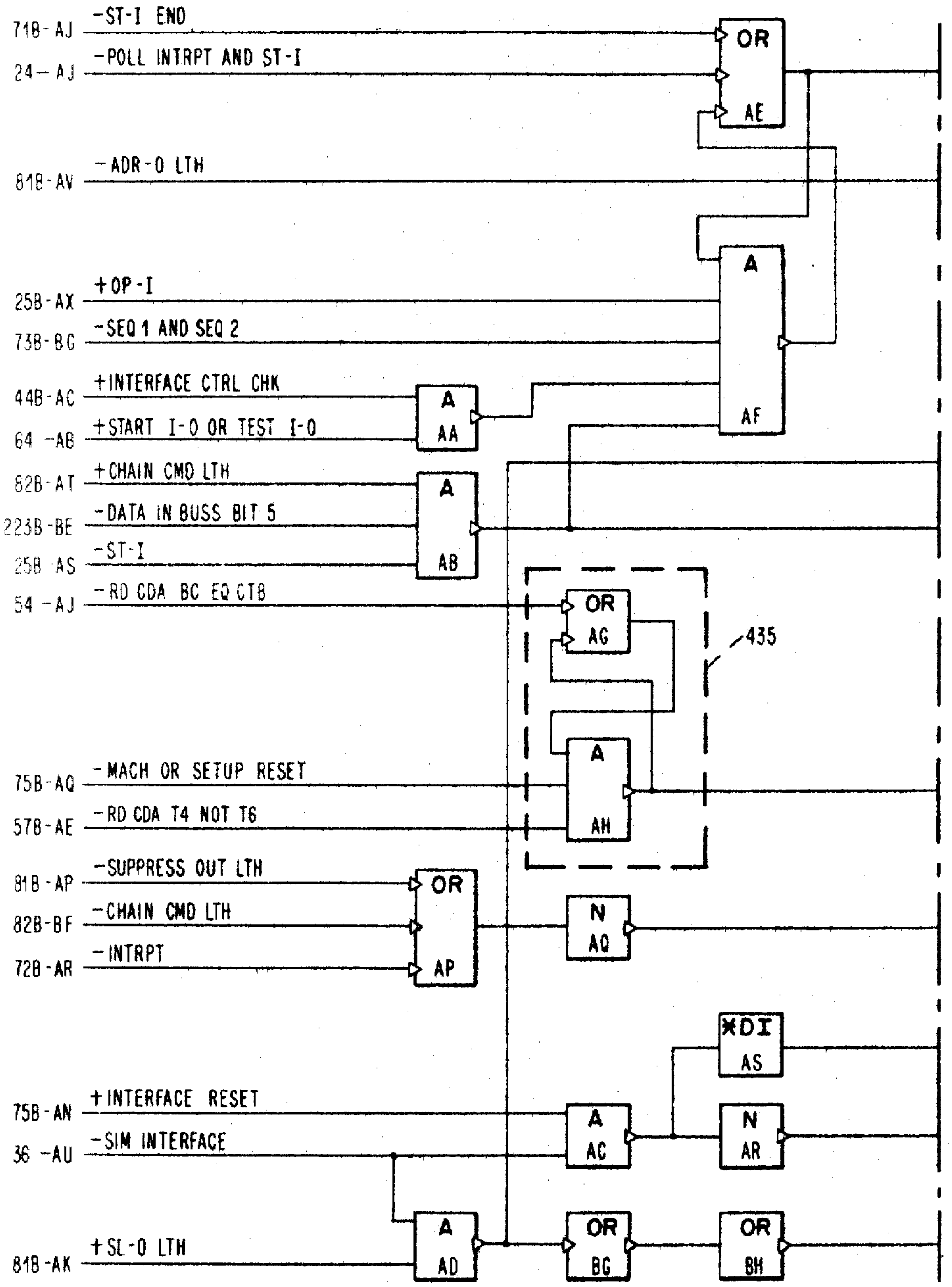
Figure 30B:
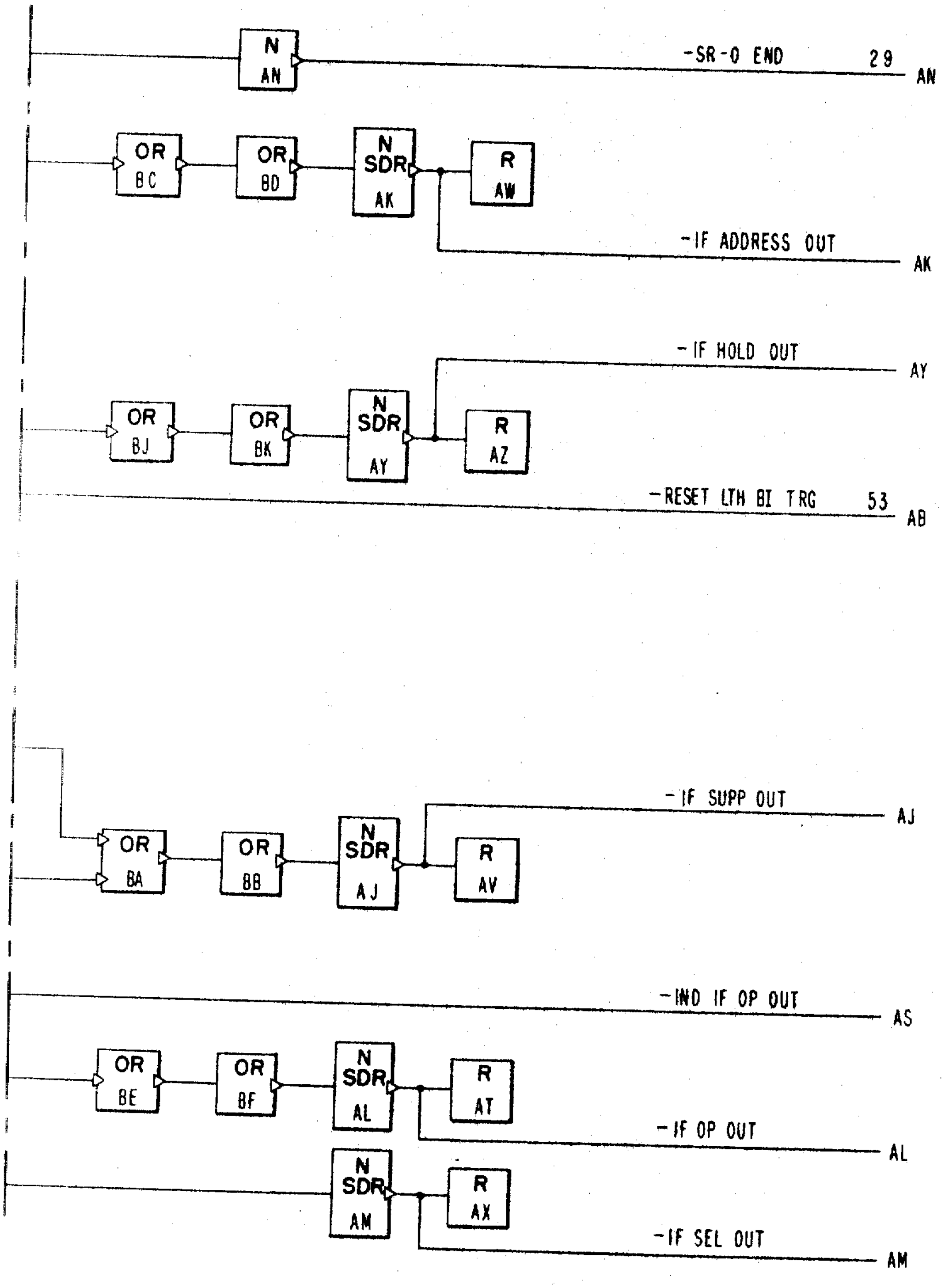

The following is an example of a start I/O read instruction issued by the CPU. With reference to FIGS. 23A and 23B, the command address word (CAW) is in storage at address 72. The command address word contains the memory protection tags and specifies the command address, which for this example is 512. The command control word (CCW at storage address 512) contains the read command, a data address of 1024, no flags, and a count of 40 bytes. The lines that are activated between the channel and control units are the *select out, select in,* and *operational out.* On FIGS. 30A and B if there is no interface reset and channel is not simulating the I/O interface, block AC is activated. The output of this block is inverted in blocks AR and BF. Block BF has an output to the simplex driver, block AL. The output of block AL, *—interface operational out,* must be active before any transfer of information between the channel and control unit can be considered valid.

12.01 CHANNEL SELECTION

Figures 26, 26A:
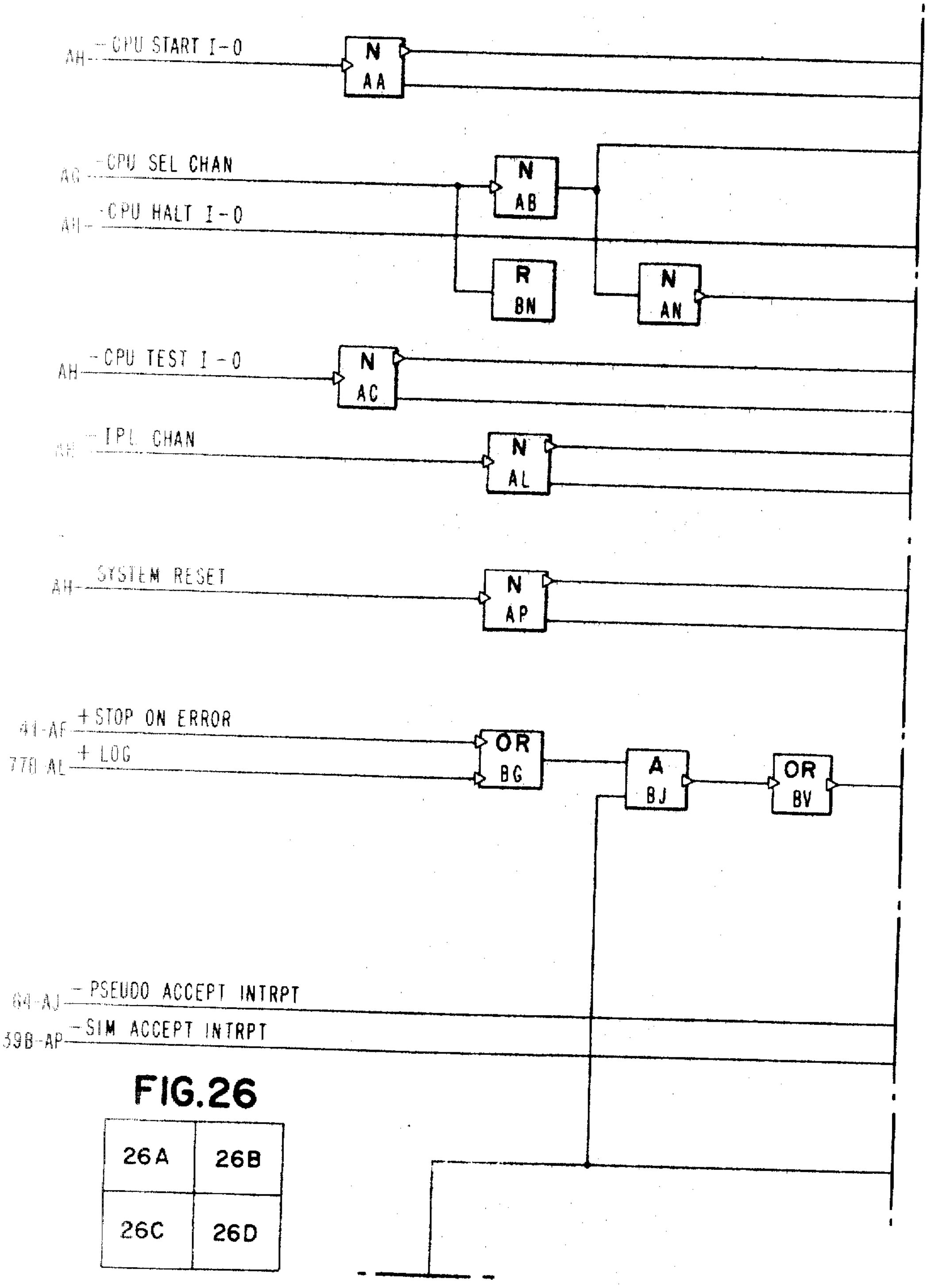
Figure 26B:
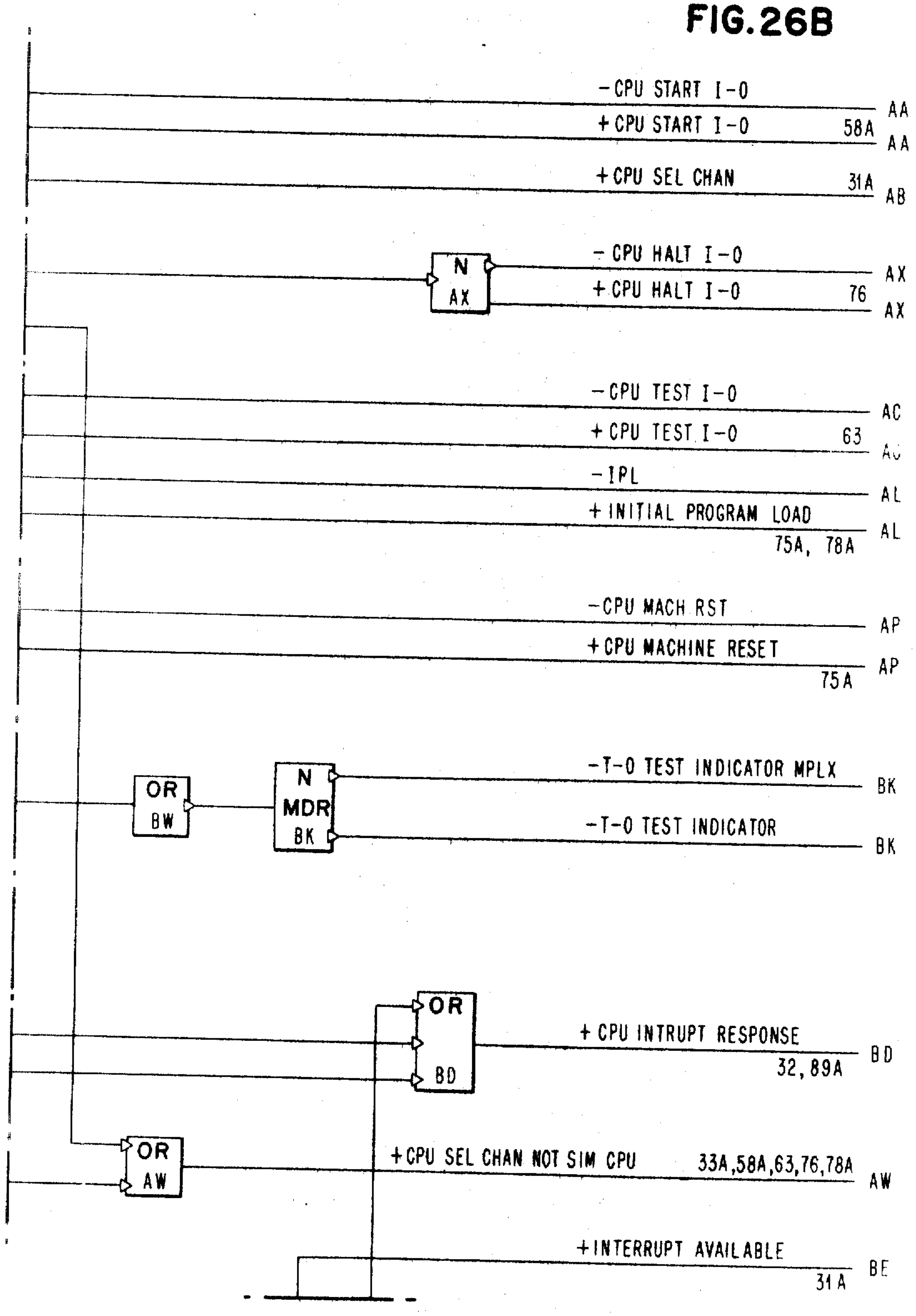
Figure 26C:
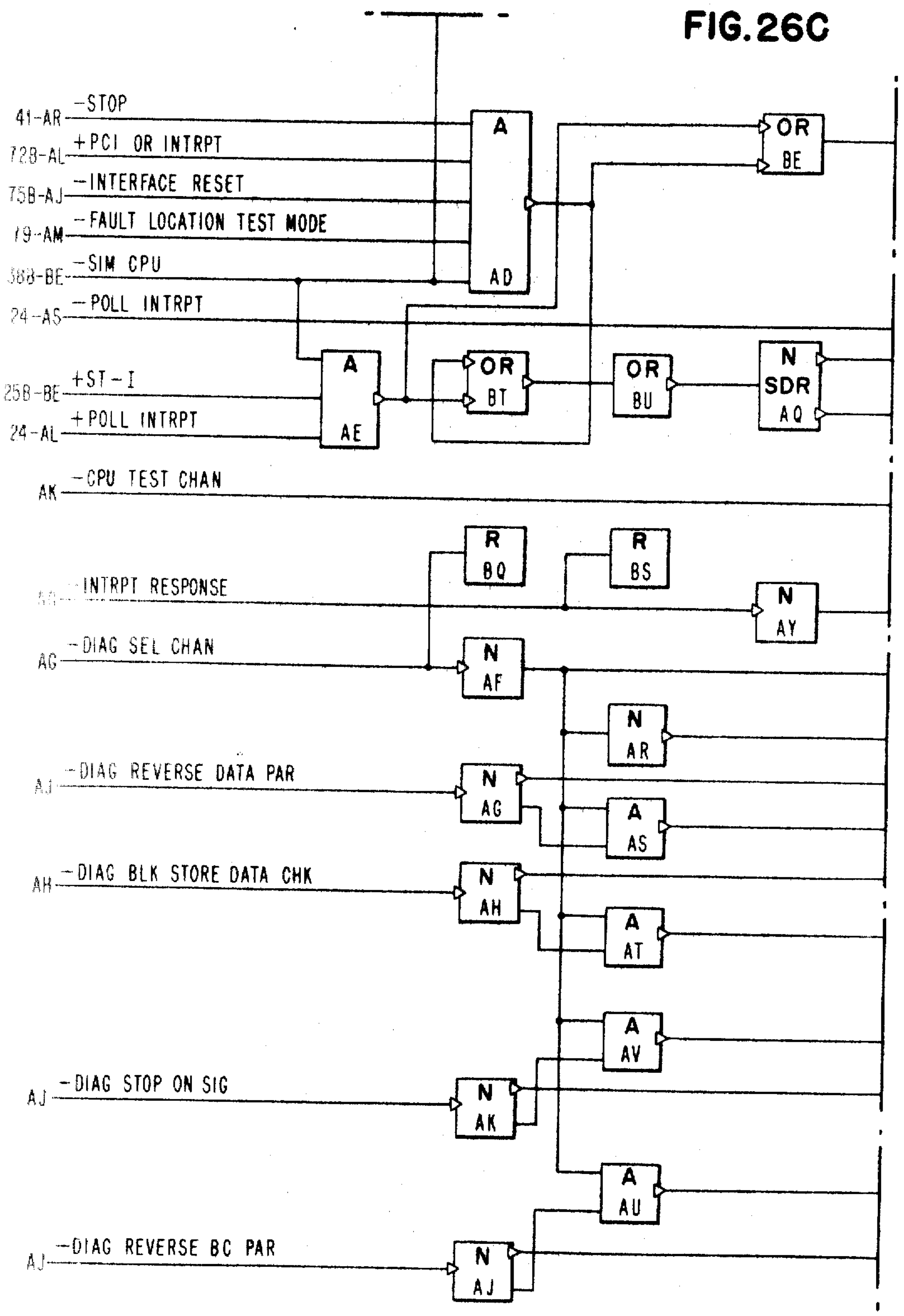
Figure 26D:
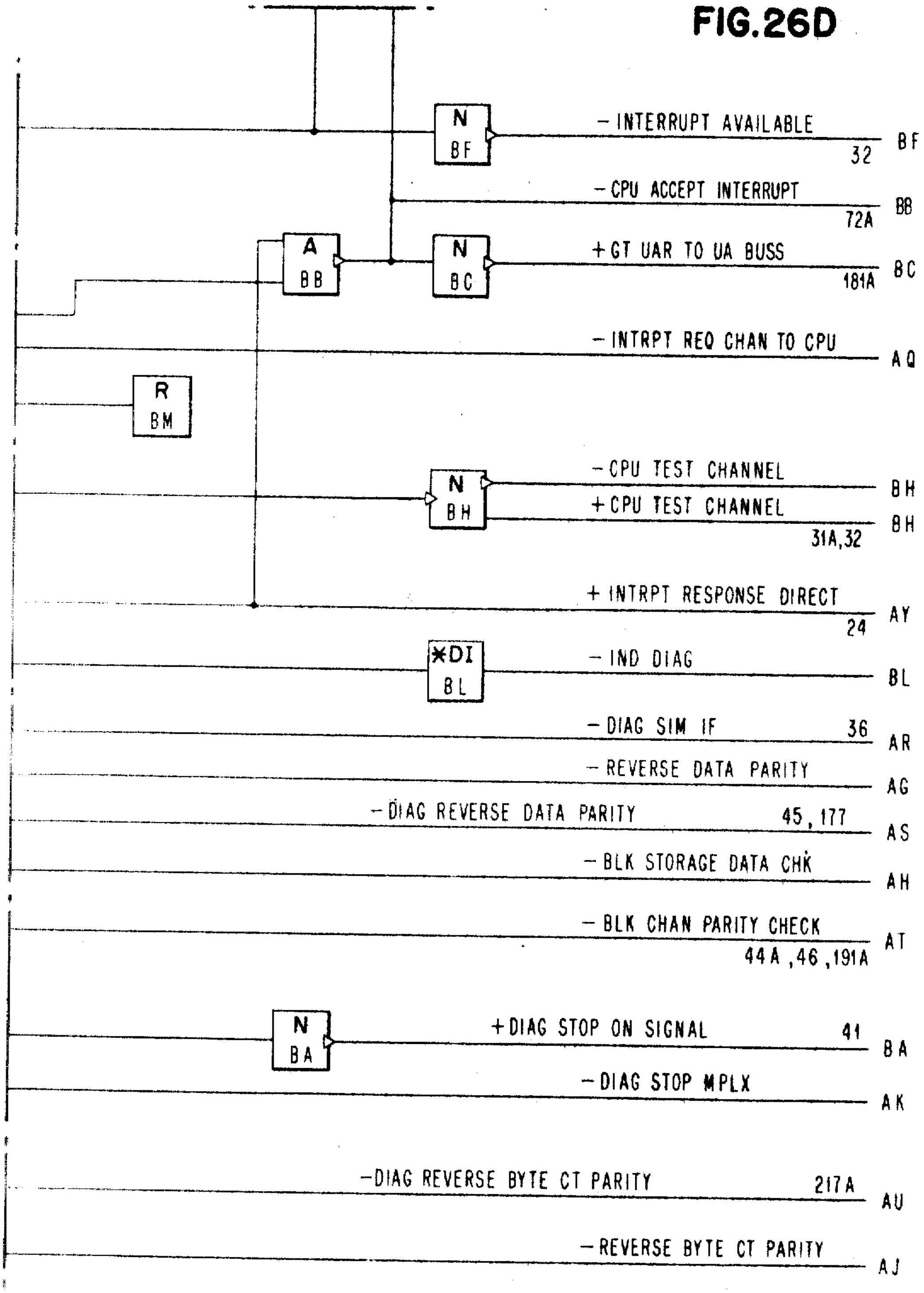
Figure 33A:
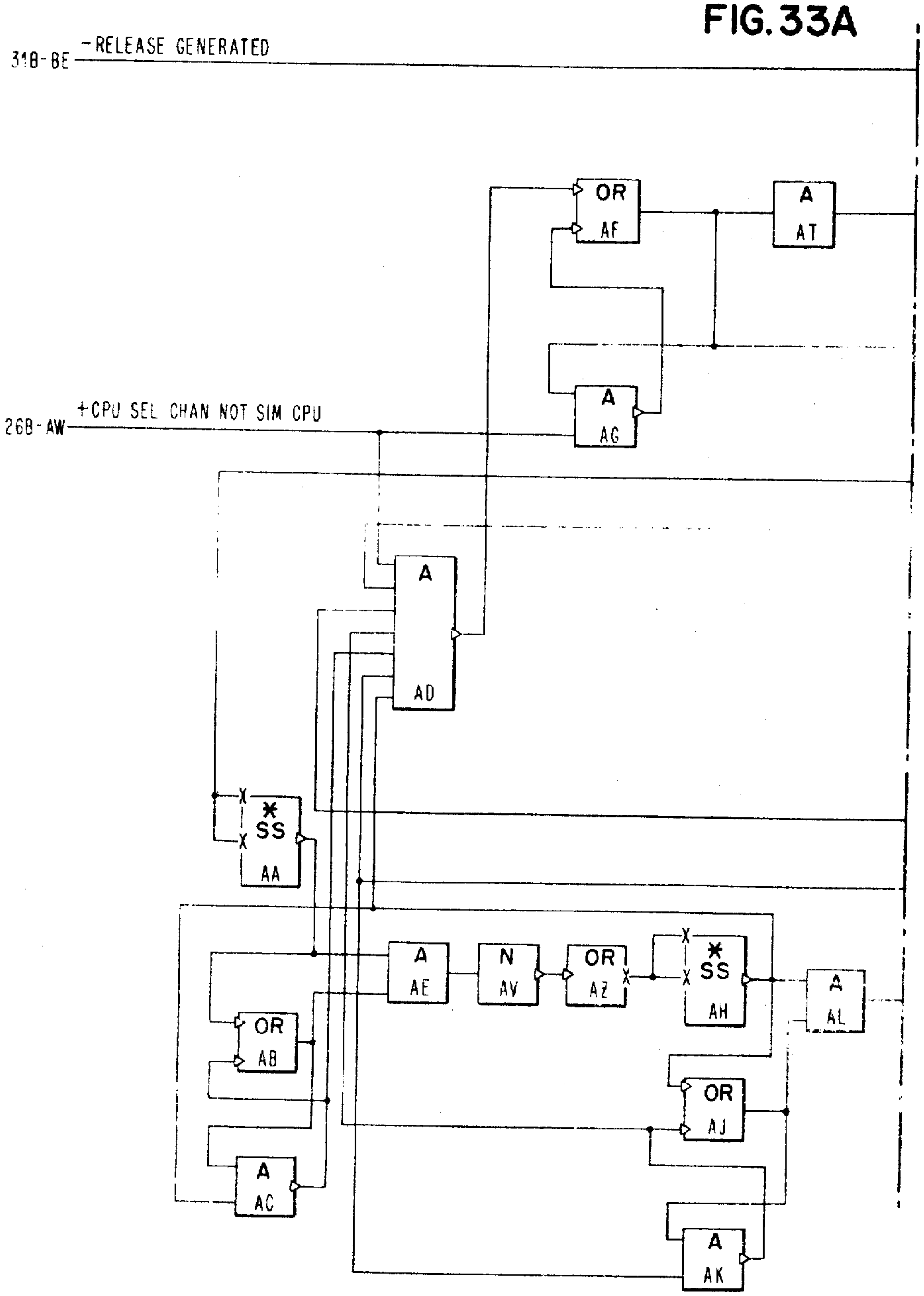
Figure 33B:
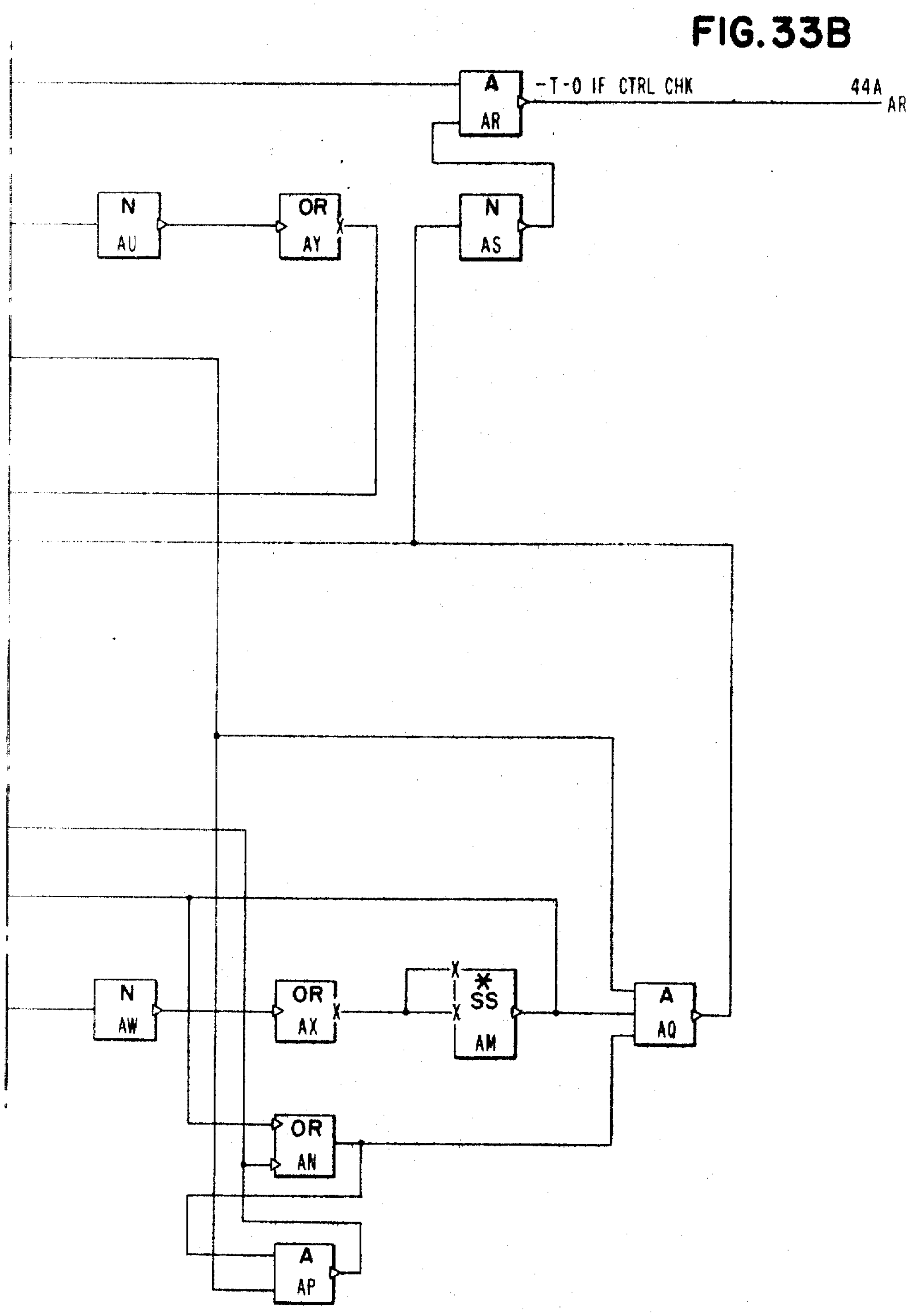
Figure 34:
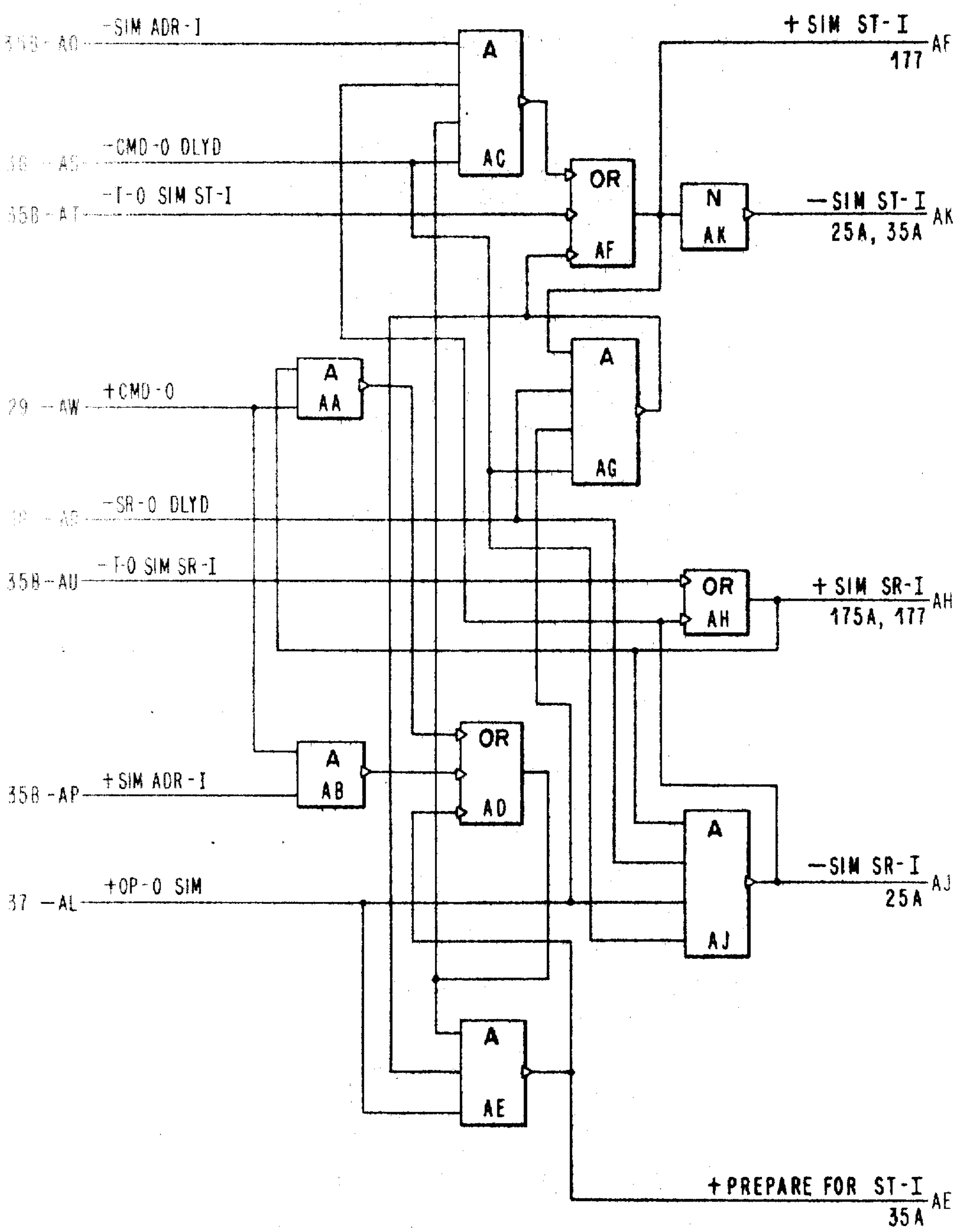
Figure 35A:
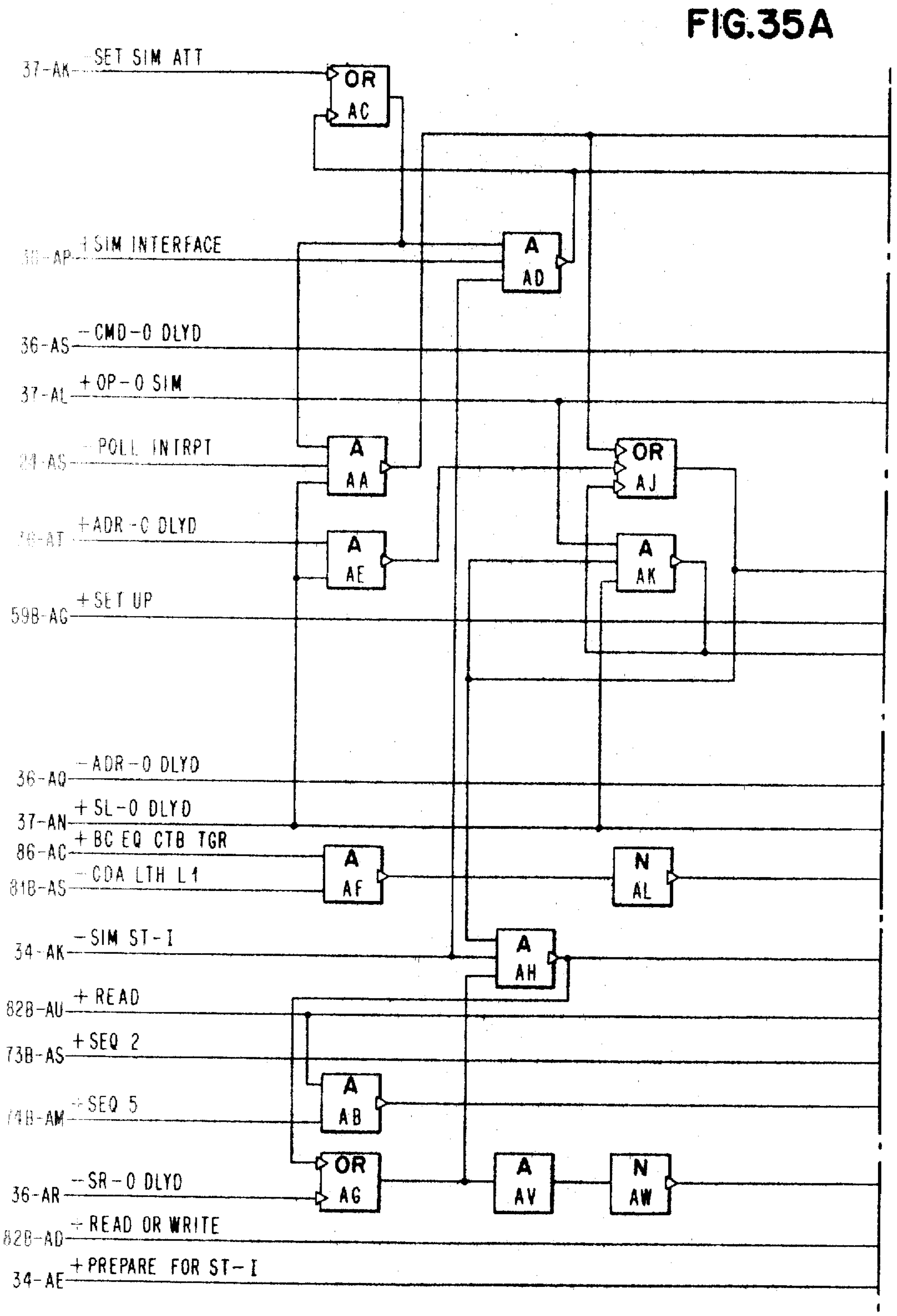
Figure 35B:
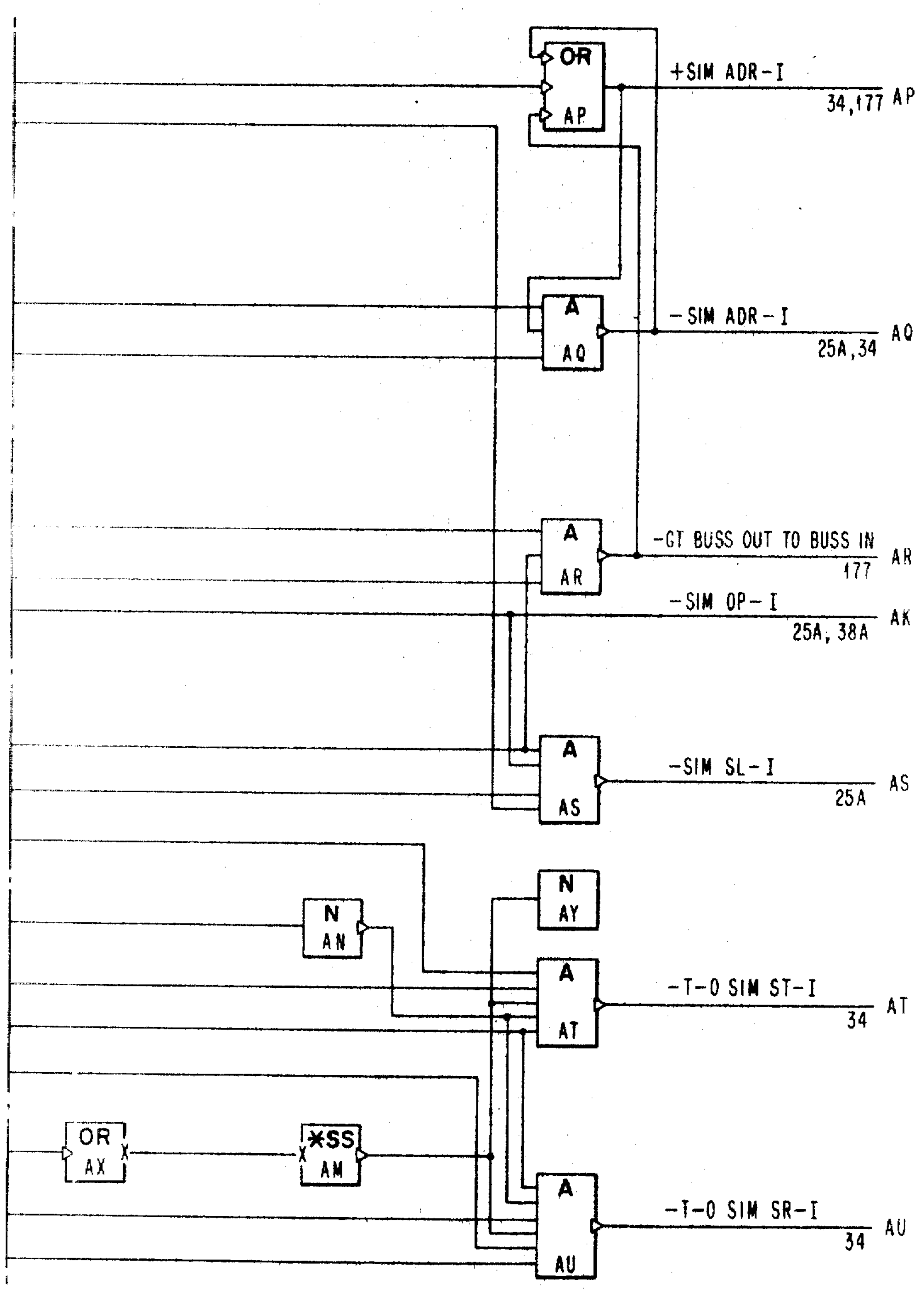
Figure 36:
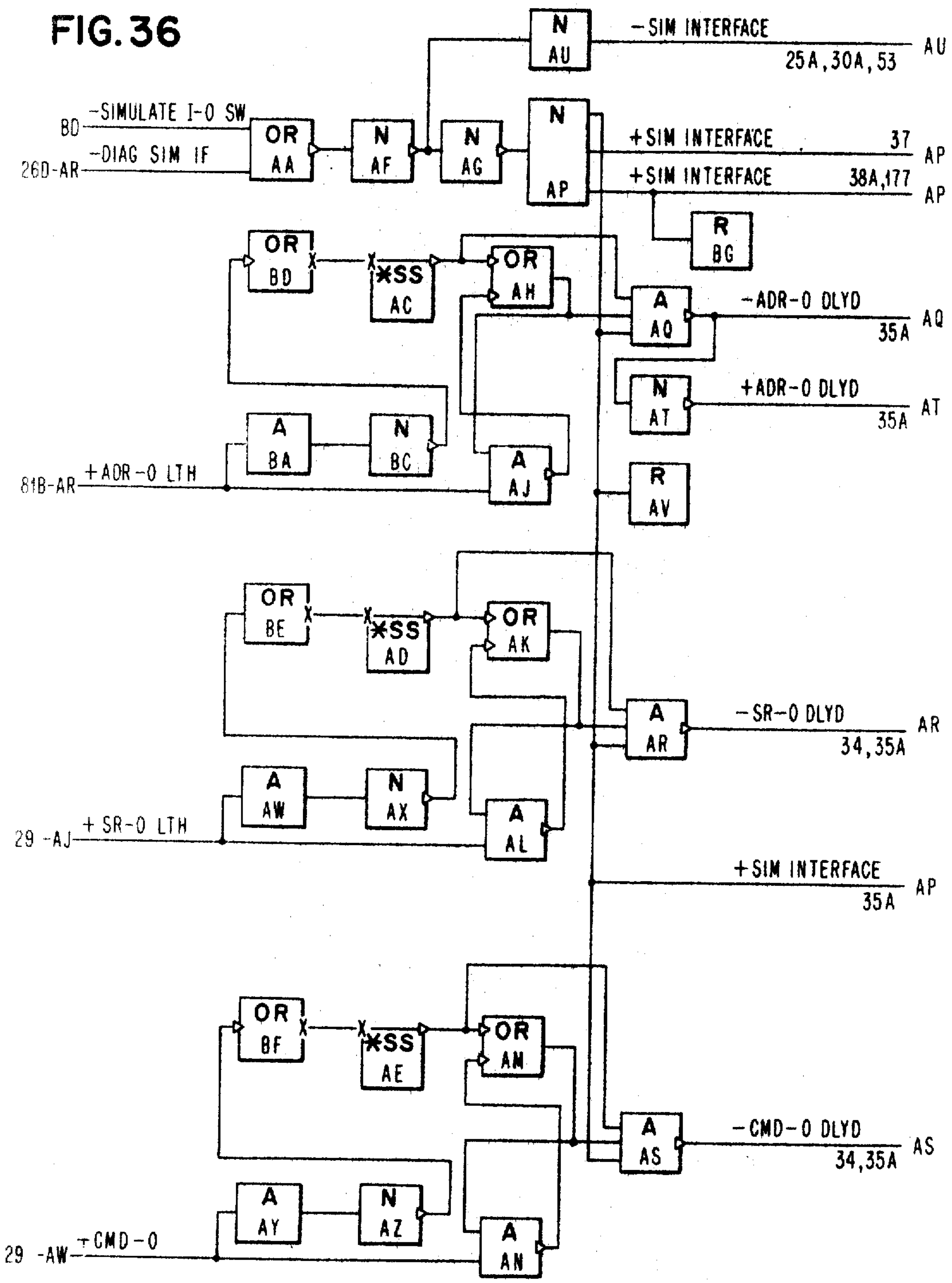
Figure 37:
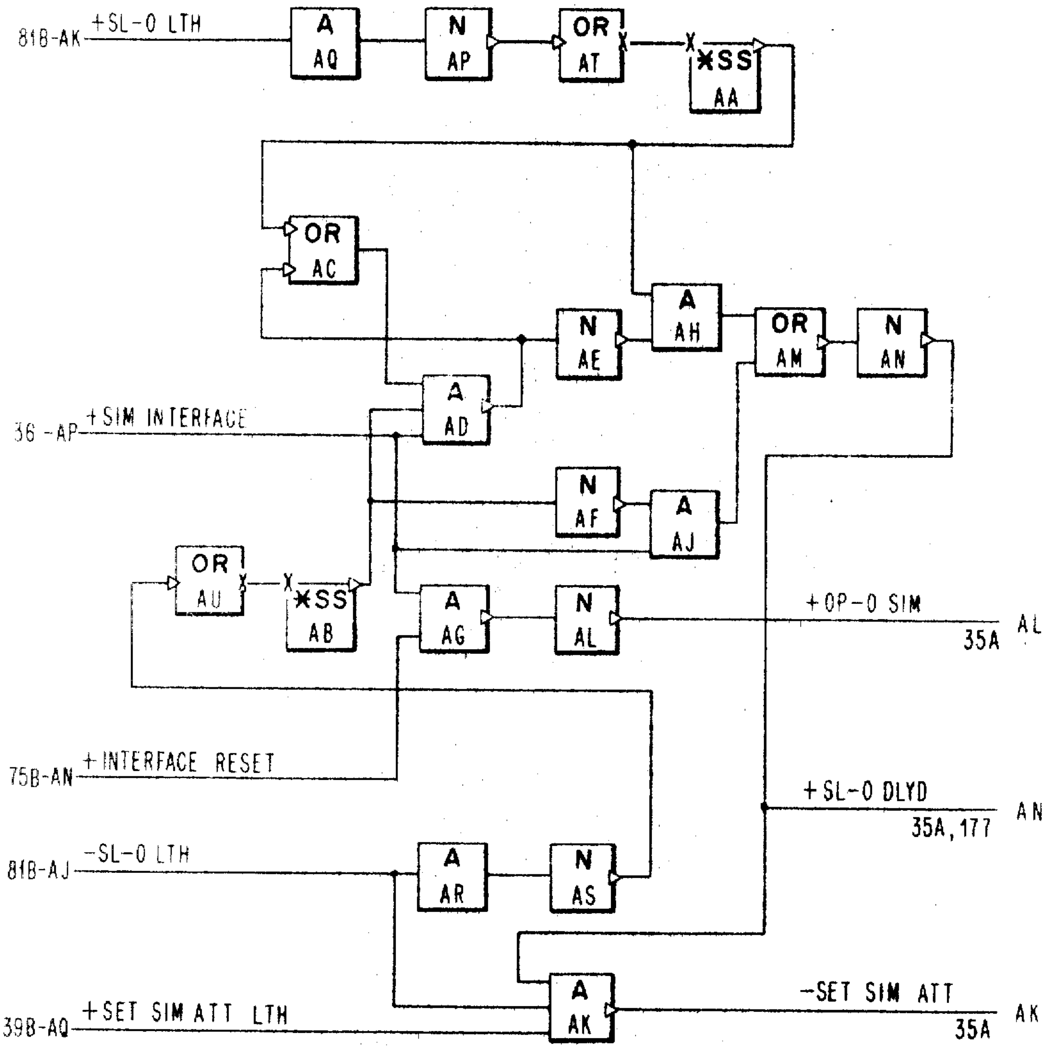
Figure 38A:
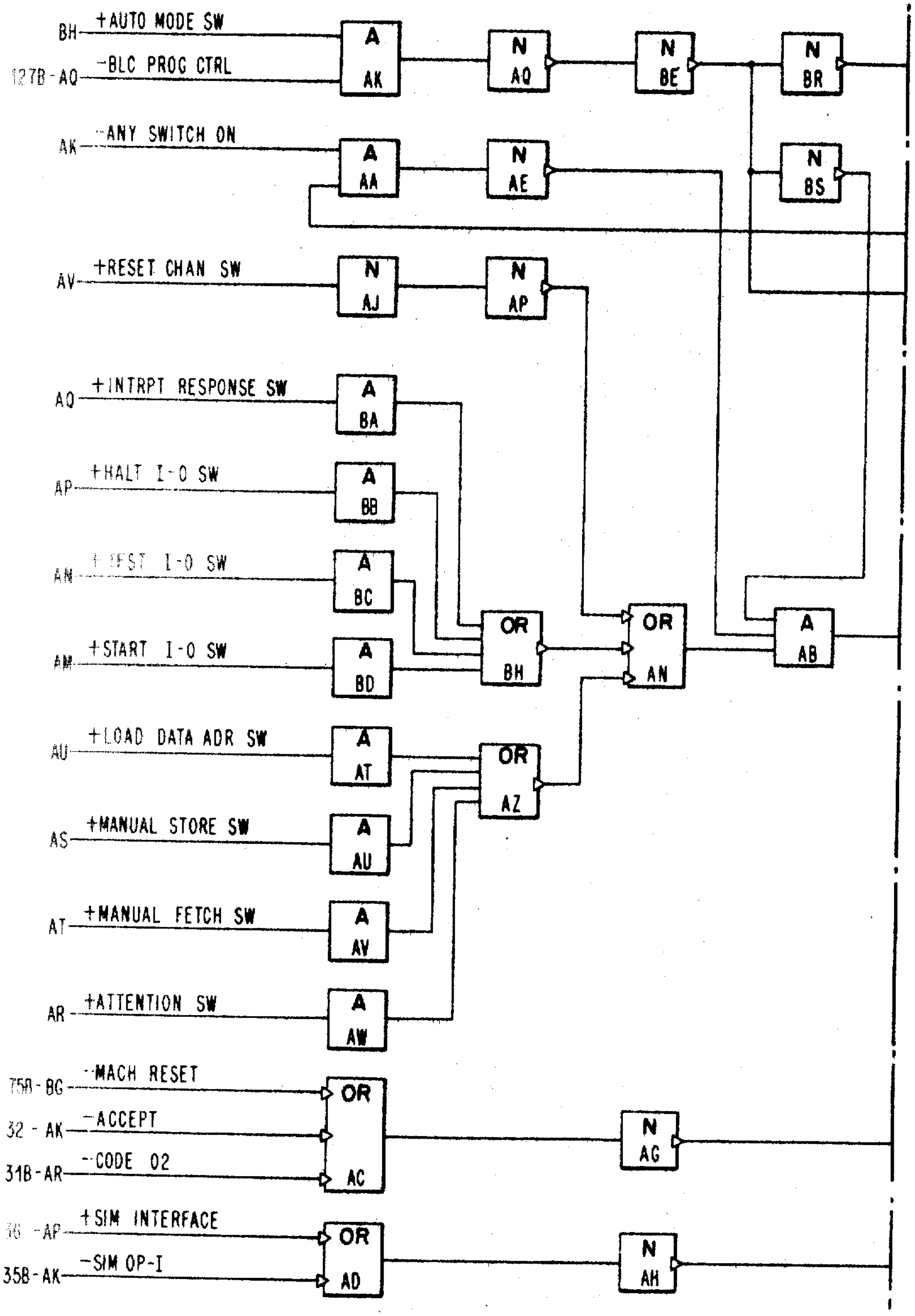
Figure 38B:
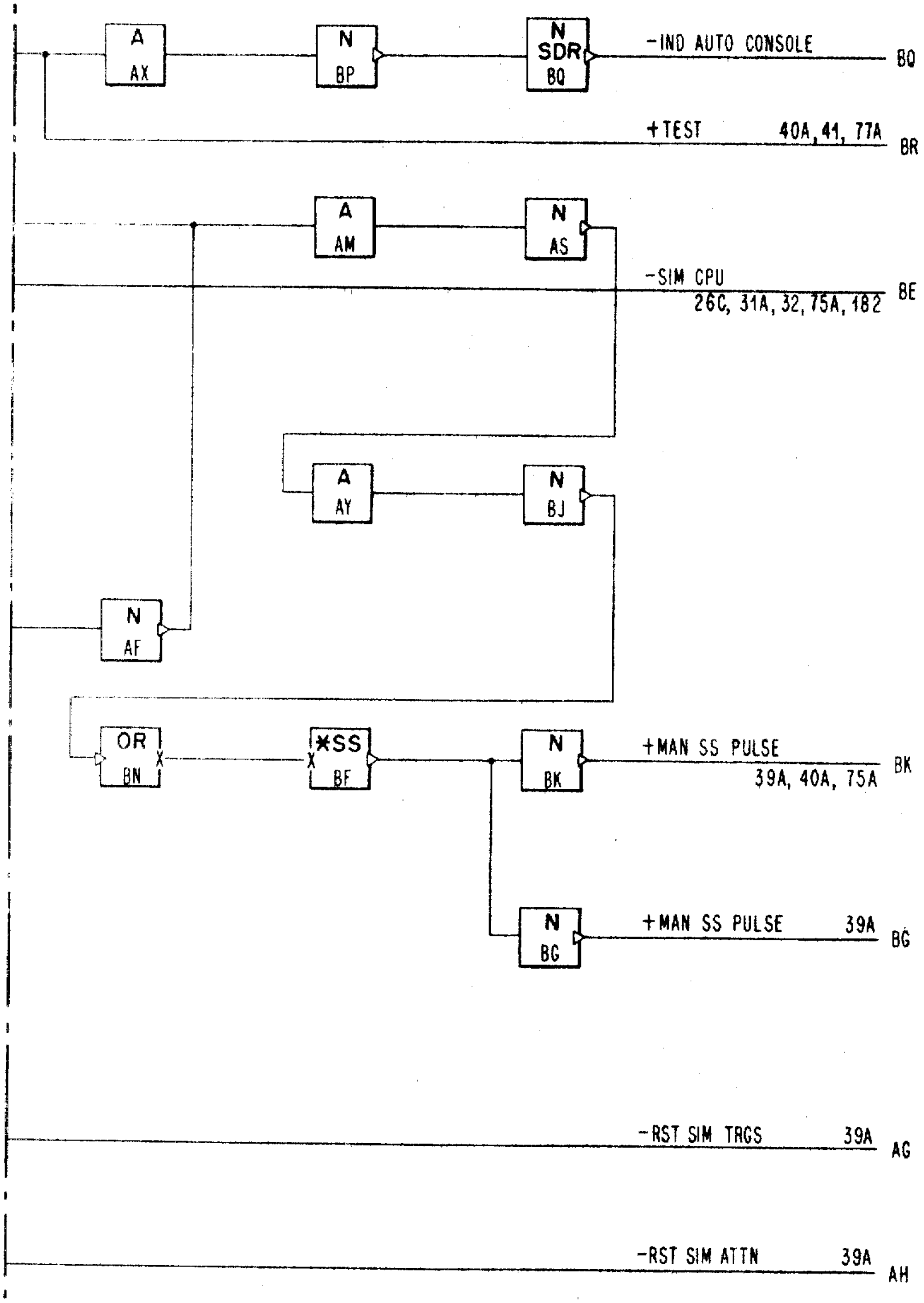
Figure 39A:
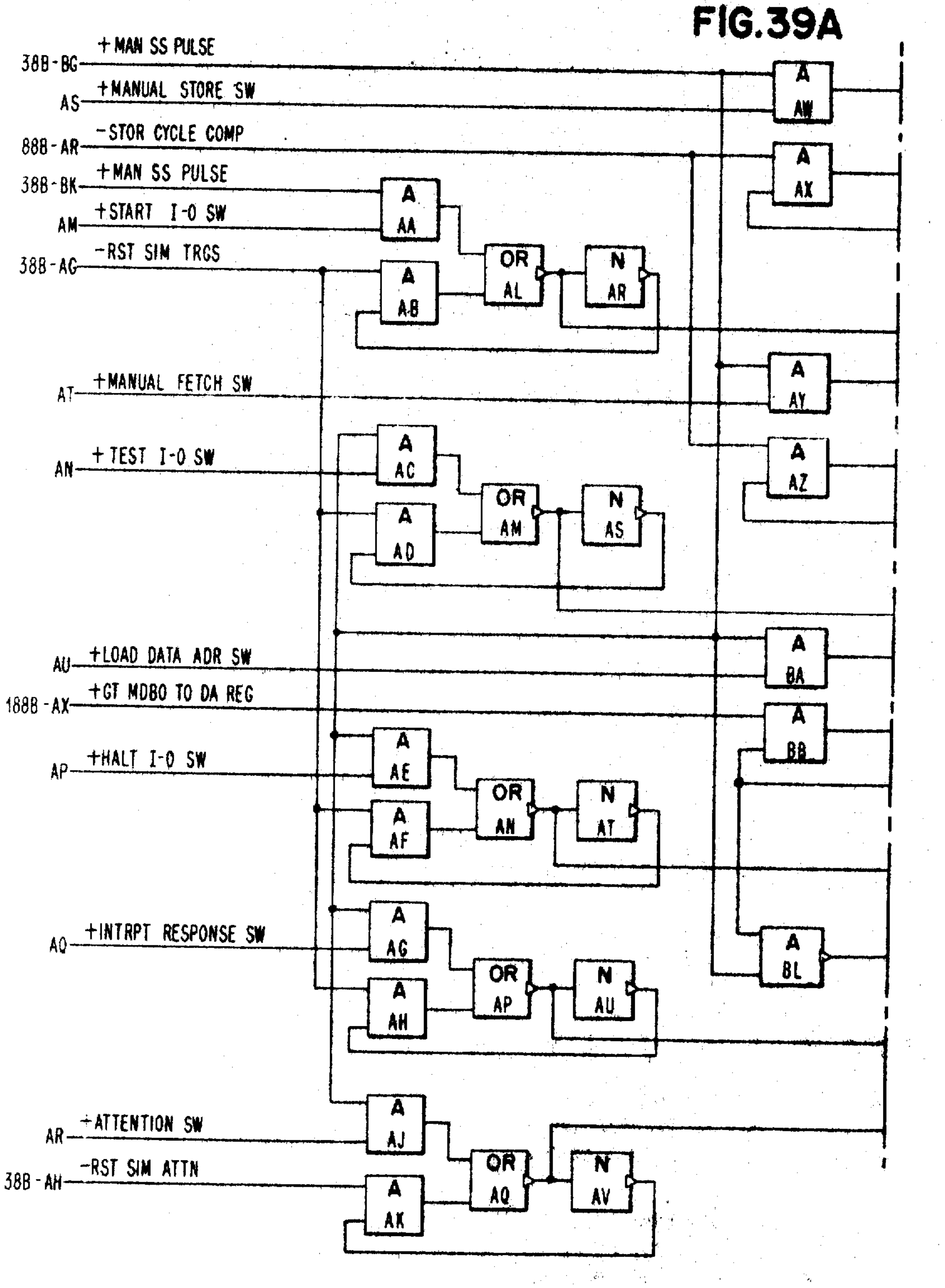
Figure 39B:
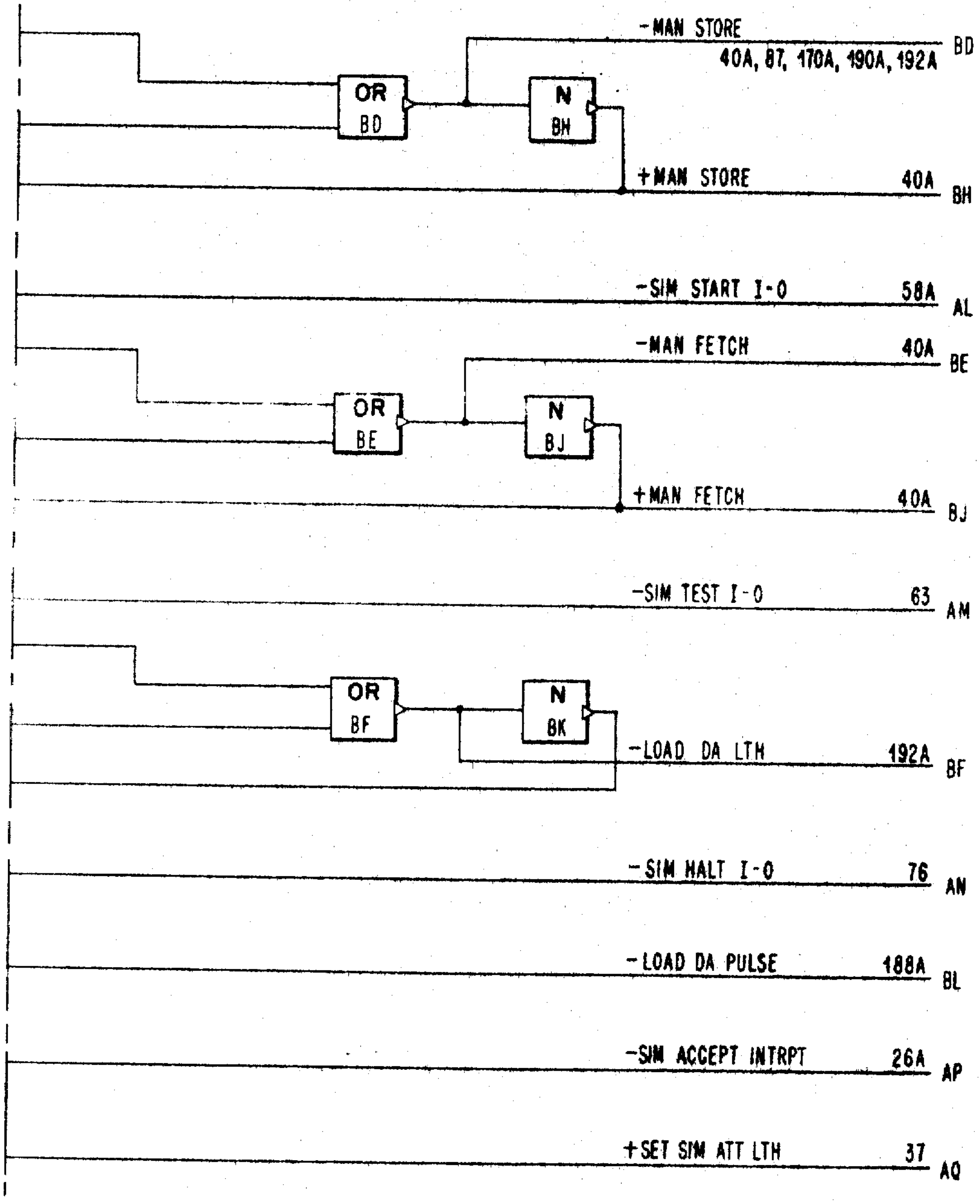
Figure 40A:
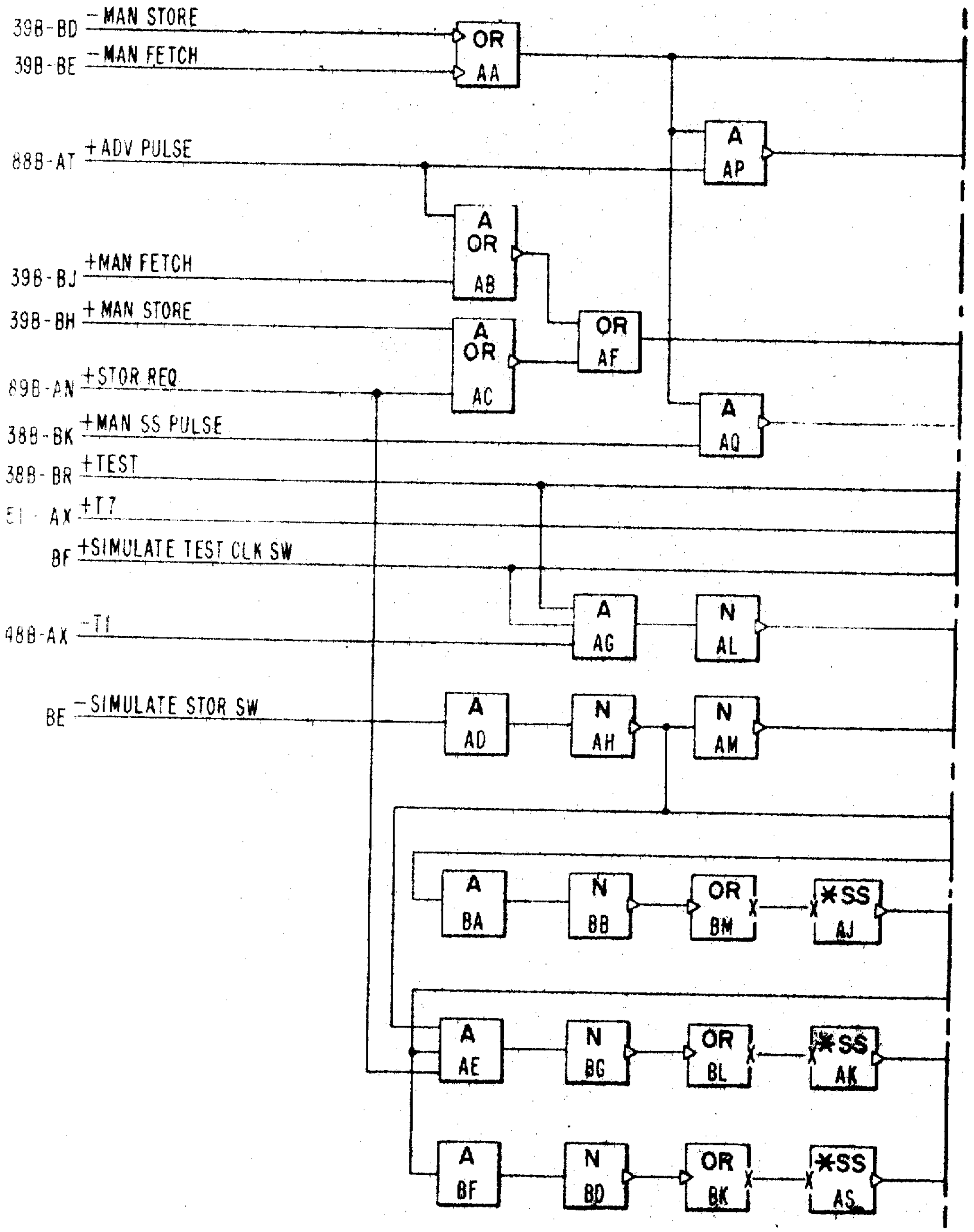
Figure 40B:
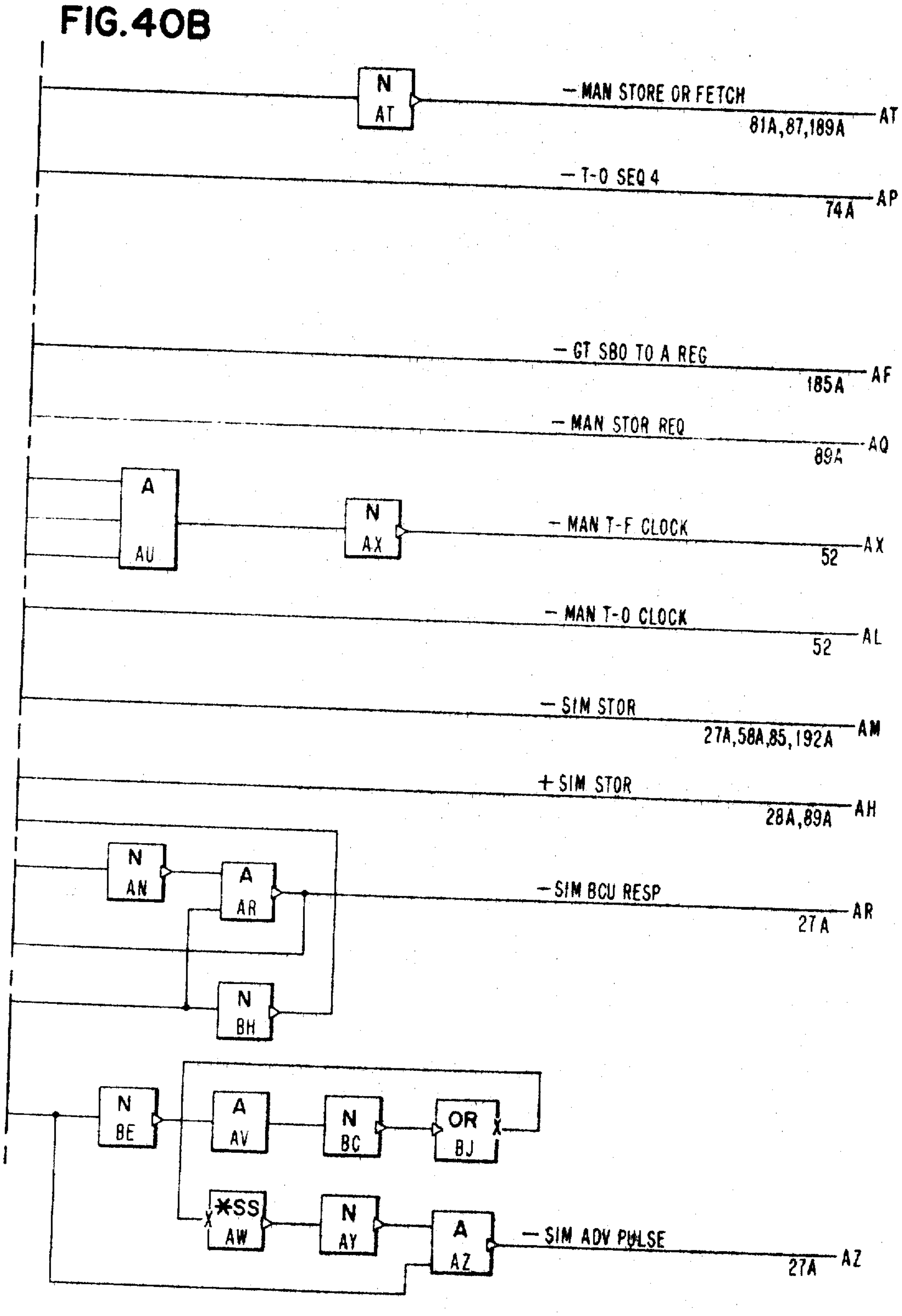
Figure 41:
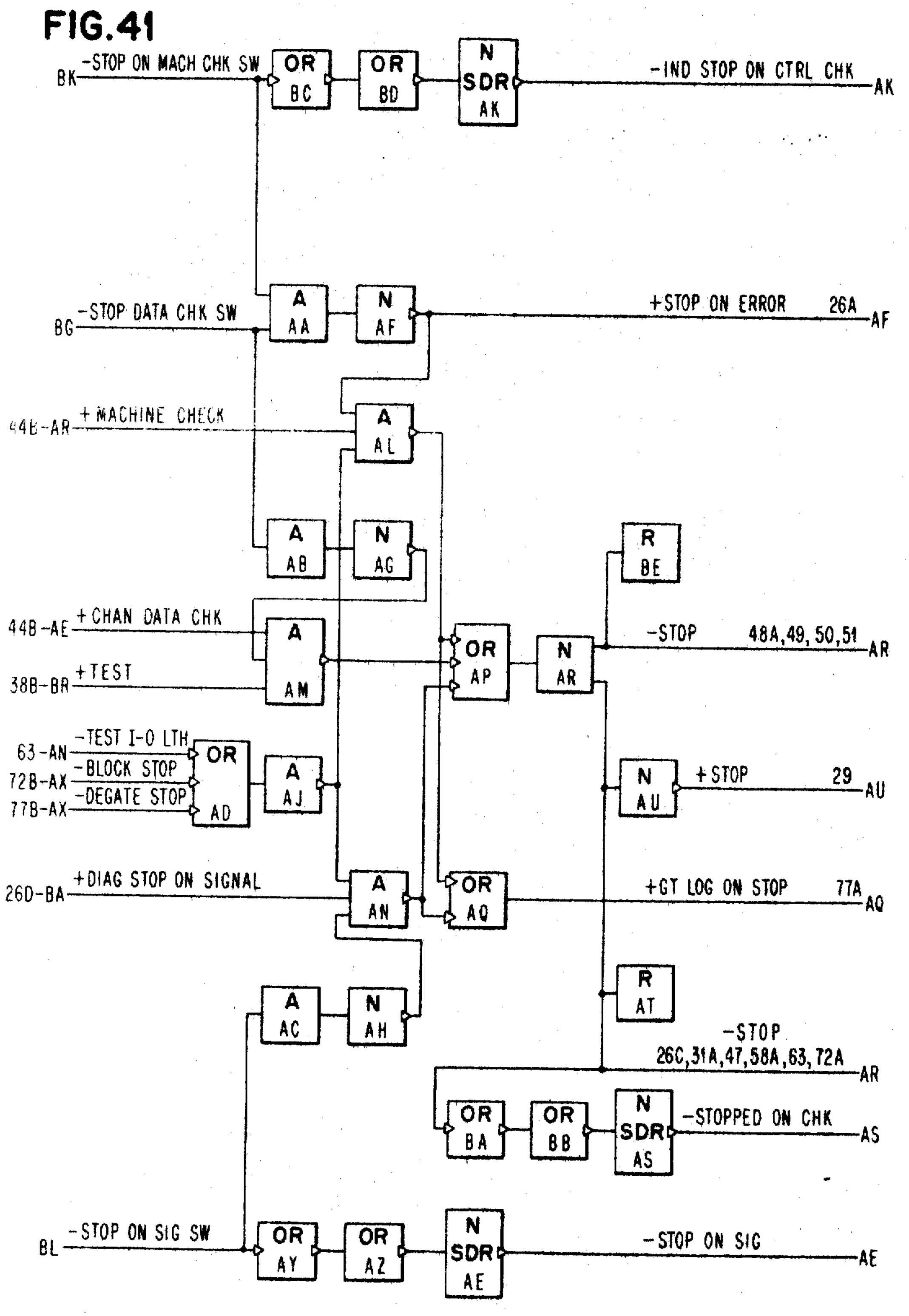
Figure 42:
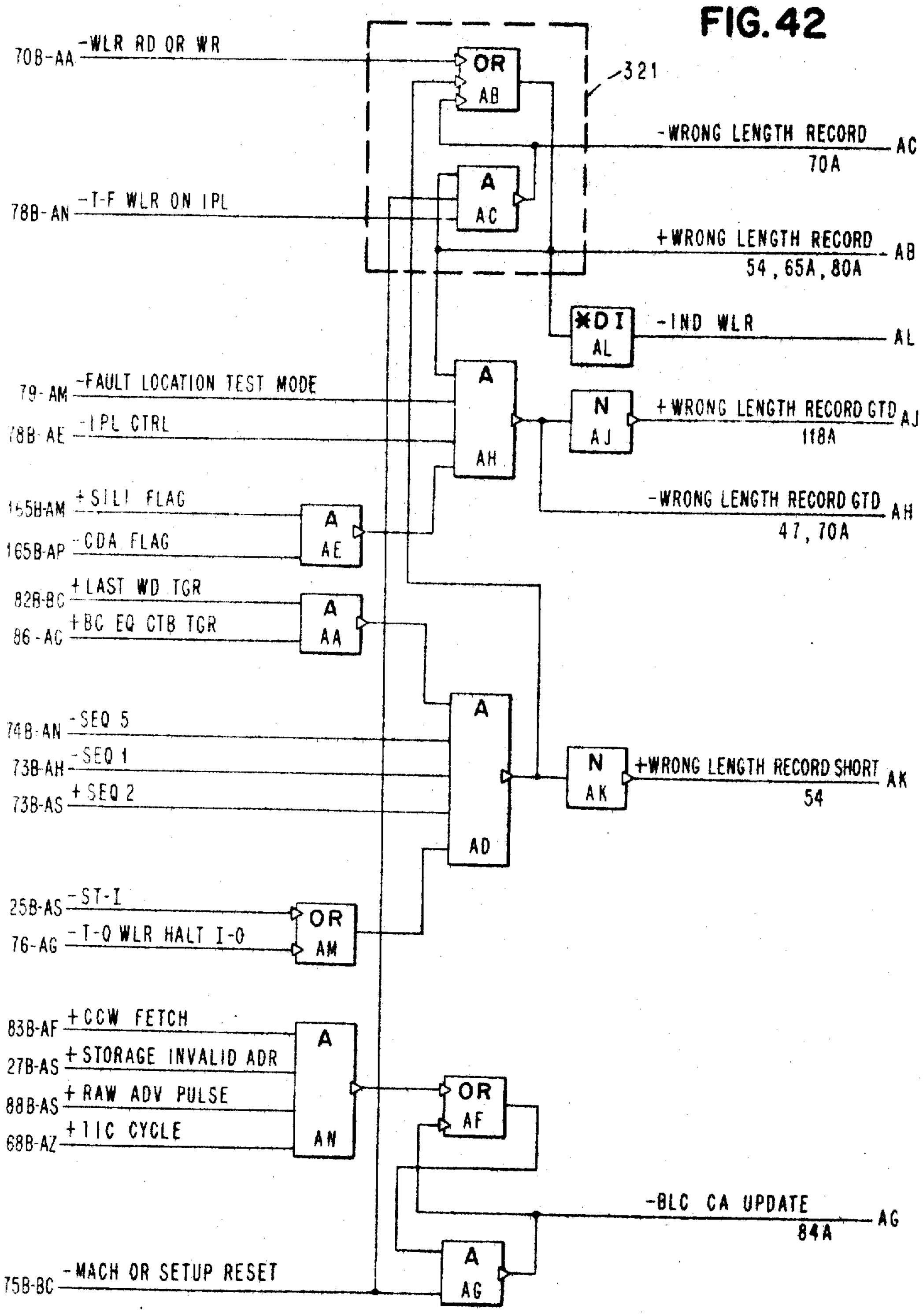

Referring to FIGS. 1 and 6, the CPU initiates the operation by raising the multiplex line, *start I/O,* and the simplex line *select channel.* It also places the device address and control unit address on the *unit address bus out.* The channel receivers for the CPU *start I/O* and CPU *select channel* lines are on FIGS. 26A, B, C and D. The CPU *select channel* line passes through the channel receiver block AB, is inverted in block AN, and is ORed with *—SIM CPU* in block AW. The output of this OR circuit, block AW, goes to FIGS. 33A and B as the line *CPU select channel not simulate CPU,* and starts the channels time out circuitry. The CPU will keep the select channel line up until it receives a release from the channel. However, if no release is given to the CPU, the channel will force a release in 111 microseconds in order to avoid any hanging up conditions. The channel will also turn on the interface control check trigger signalling an error. The CPU *start I/O* line goes thru the receiver block AA and along with the CPU *select channel* line goes to FIGS. 58A and B.

12.02 FETCHING OF CAW

Figure 58A:
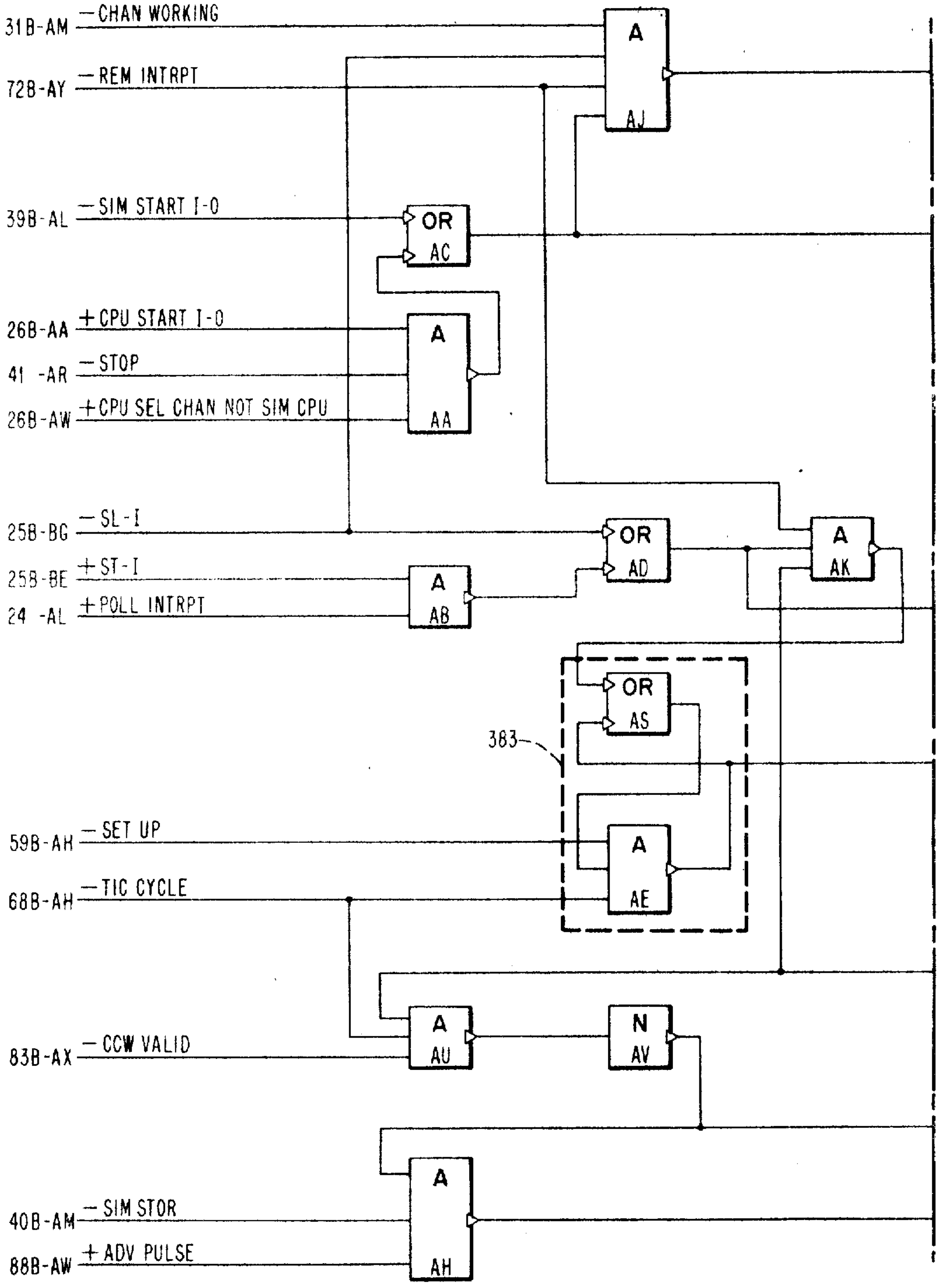
Figure 58B:
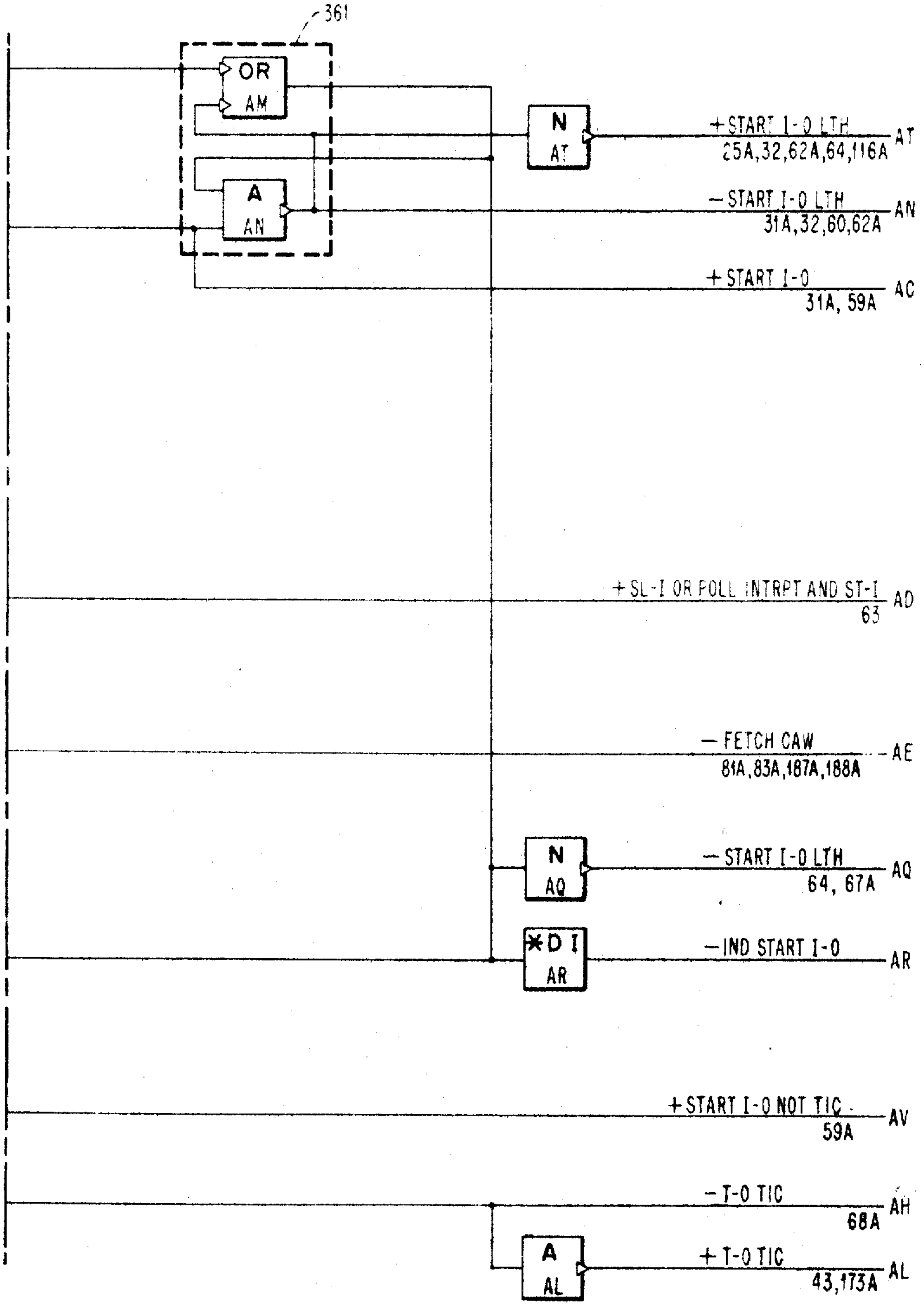

On FIGS. 58A and B, the CPU *start I/O* and *select channel* lines are ANDed in block AA and then ORed with the *—SIM start I/O* line in block AC. The output of this OR circuit is ANDed in block AJ with *select out* which is issued during the normal channel polling operation. The output of this AND circuit, block AJ, turns on the start I/O latch, consisting of blocks AN and AM. The start I/O latch turns on the fetch CAW trigger consisting of blocks AS and AE.

Figure 83A:
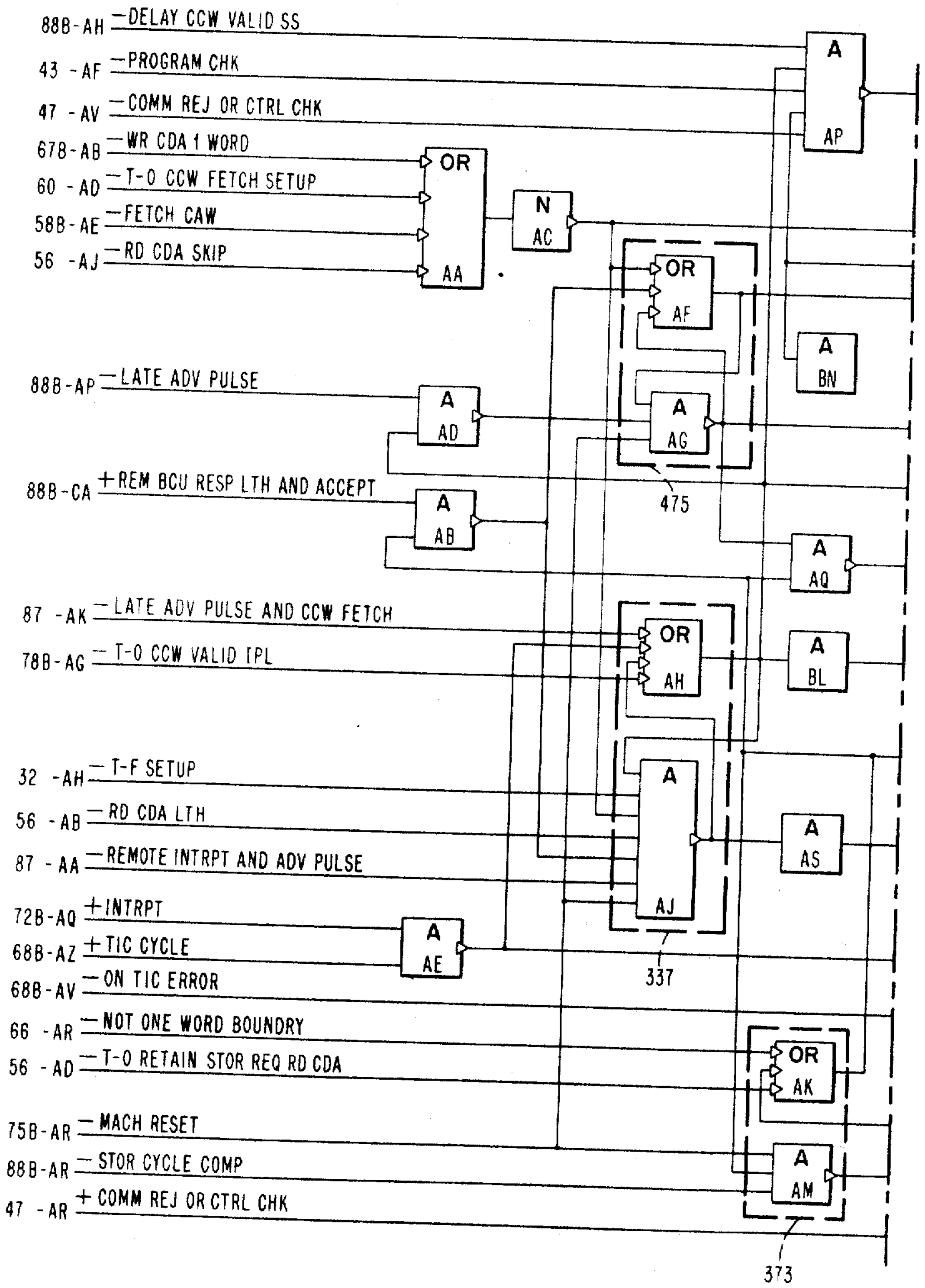
Figure 83B:
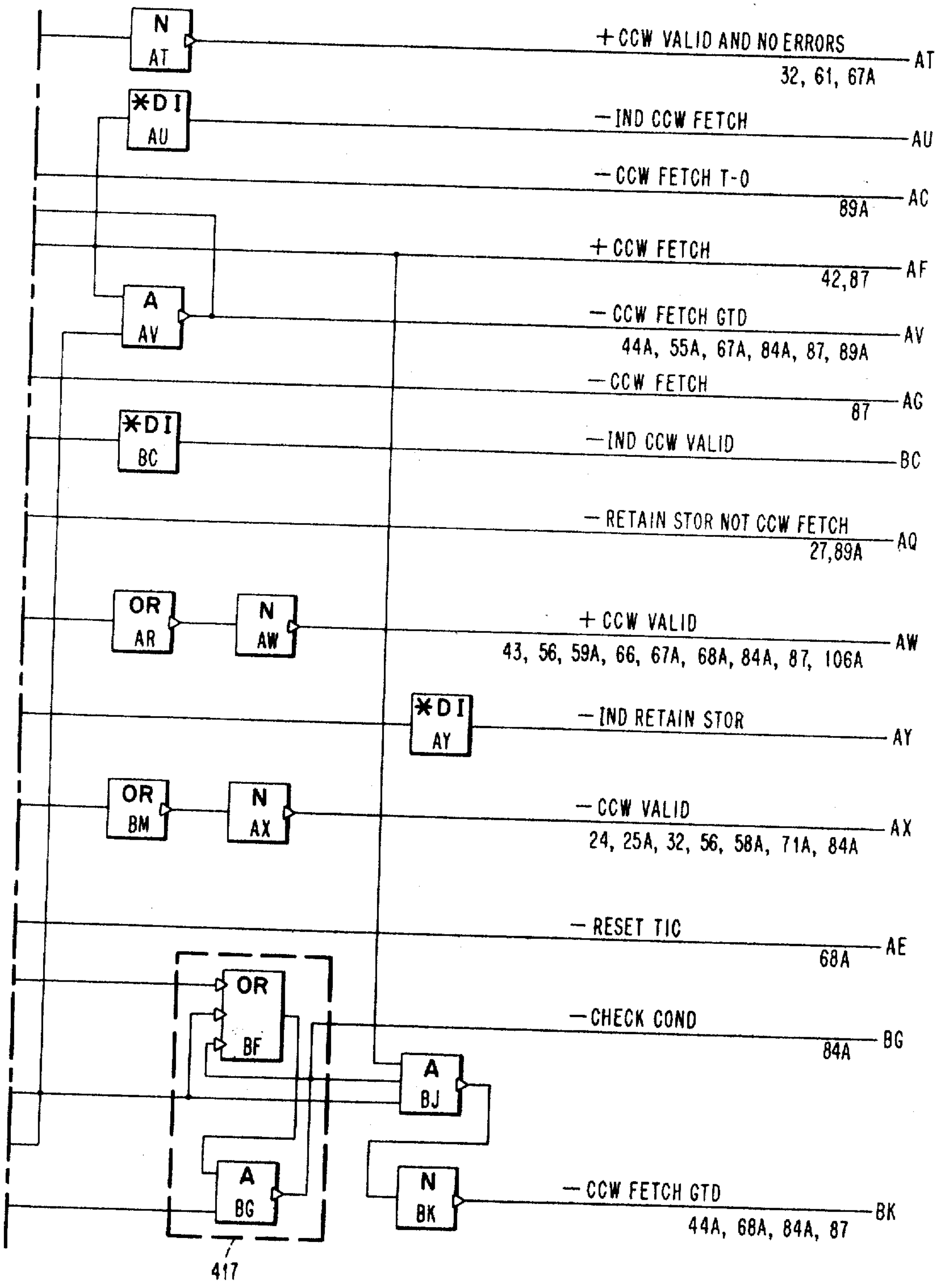

The negative output of the fetch CAW trigger has 4 functions. On FIGS. 81A and B, *—fetch CAW* blocks the turn on of the select out trigger by keeping AND circuit block AA inactivated. On FIGS. 181A and B, the *—fetch CAW* line is ORed in block AE, inverted in block AK, and then powered by blocks AW and BB. The output of block BB, *command address in gate reset,* resets the entire address register which is located on FIGS. 152A and B, 153A and B, and 154A and B. On FIGS. 188A and B, the *—fetch CAW* line enters block AF, which is the OR part of the unit address bus to register latch. The output of this block enters AND circuit AP whose output is inverted in block AU and powered up in blocks BA. The output of this block, BA, *gate unit address bus to unit address register,* gates the unit address bus out to the unit address register. This register is located on FIGS. 179A and B and 180A and B. All channel registers, with the exception of the B register and Mark B register, are of the reset-set configuration. That is, the gate pulse resets the register as it gates in the new data. The set condition is longer in time than the reset condition; therefore, old data is removed and new data set in. On FIGS. 83A and B *—fetch CAW* goes thru the OR circuit block AA, inverter block AC, and turns on the CCW fetch trigger consisting of blocks AF and AG. From FIGS. 83A and B, the CCW fetch trigger output goes to AND circuit AF located on FIG. 87 whose inverted output conditions block AG on FIGS. 189A and B.

Figure 89A:
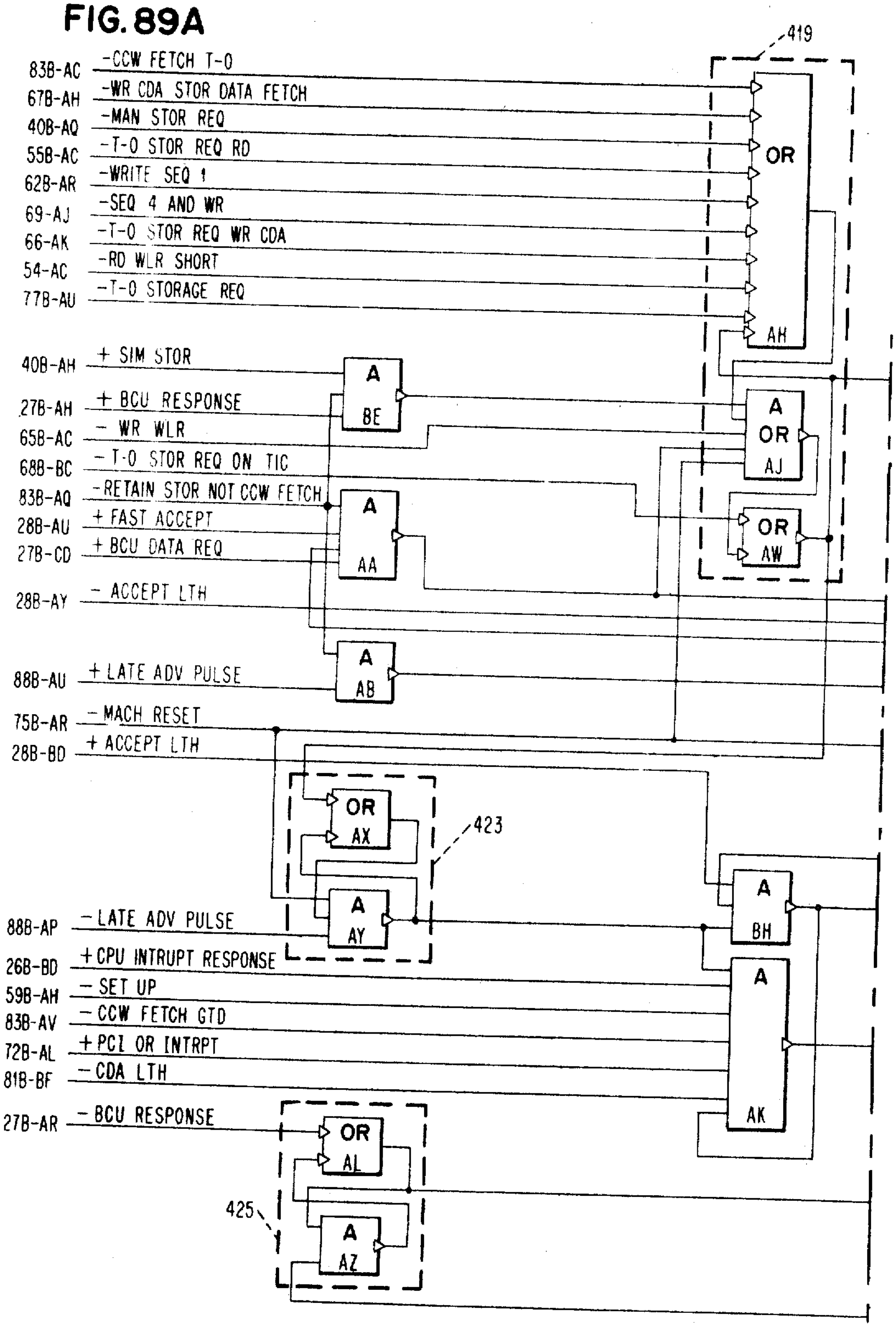
Figure 89B:
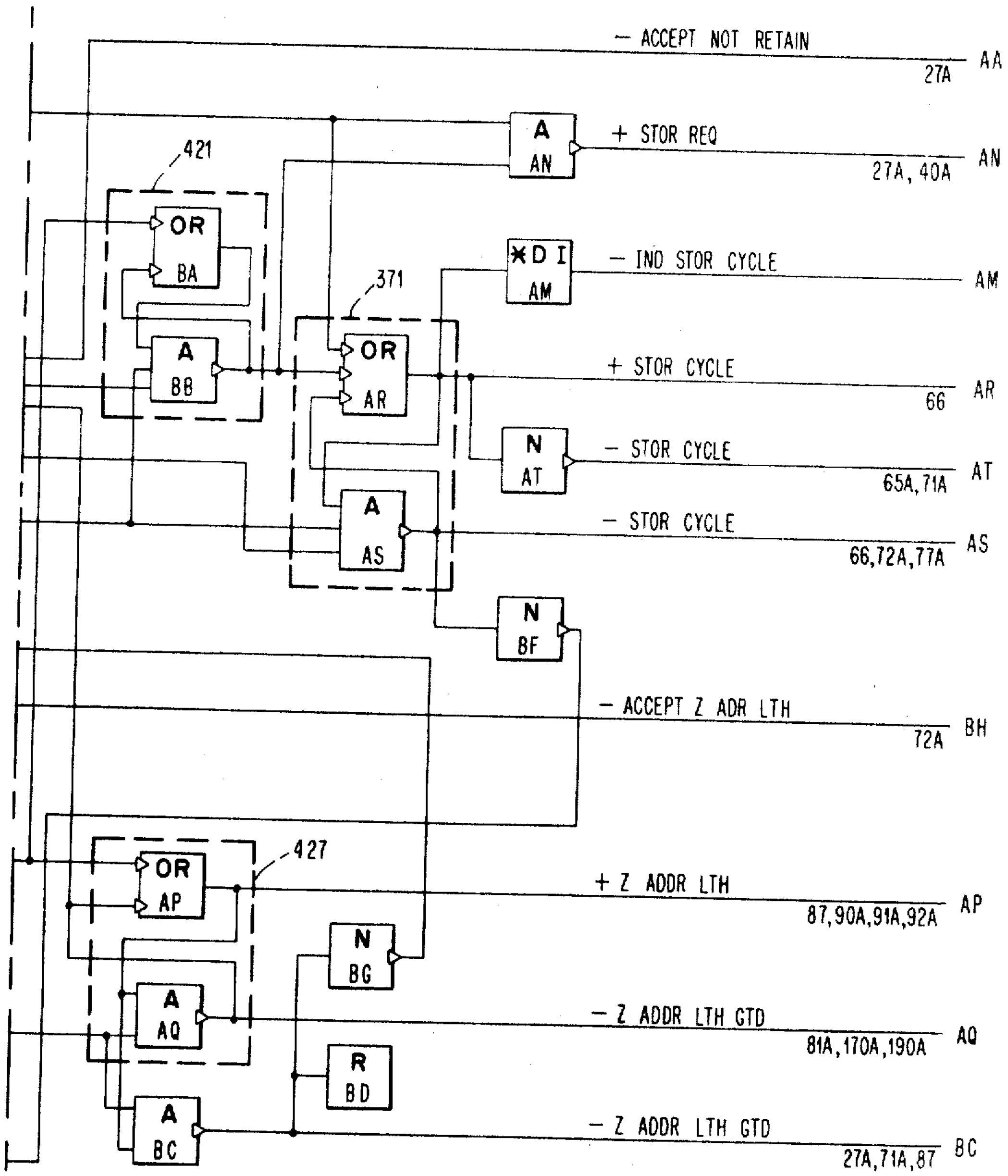

Returning to FIGS. 83A and B, the output of the inverter block AC also turns on the storage request trigger which is shown on FIGS. 89A and B and consists of blocks AH and AJ. The storage request trigger turns on the storage cycle trigger consisting of blocks AR and AS. The output of the storage request trigger block AJ, goes to the AND circuit block AN, whose output goes to FIGS. 27A and B as *+storage request* line. On FIGS. 27A and B, *+storage request* goes to the AND circuit block AL, the OR circuit blocks BQ and BR, and into the driver, block AY, whose output *—storage request* is sent to the BCU over a simplex line.

12.03 STORAGE SEQUENCE

Figure 27A:
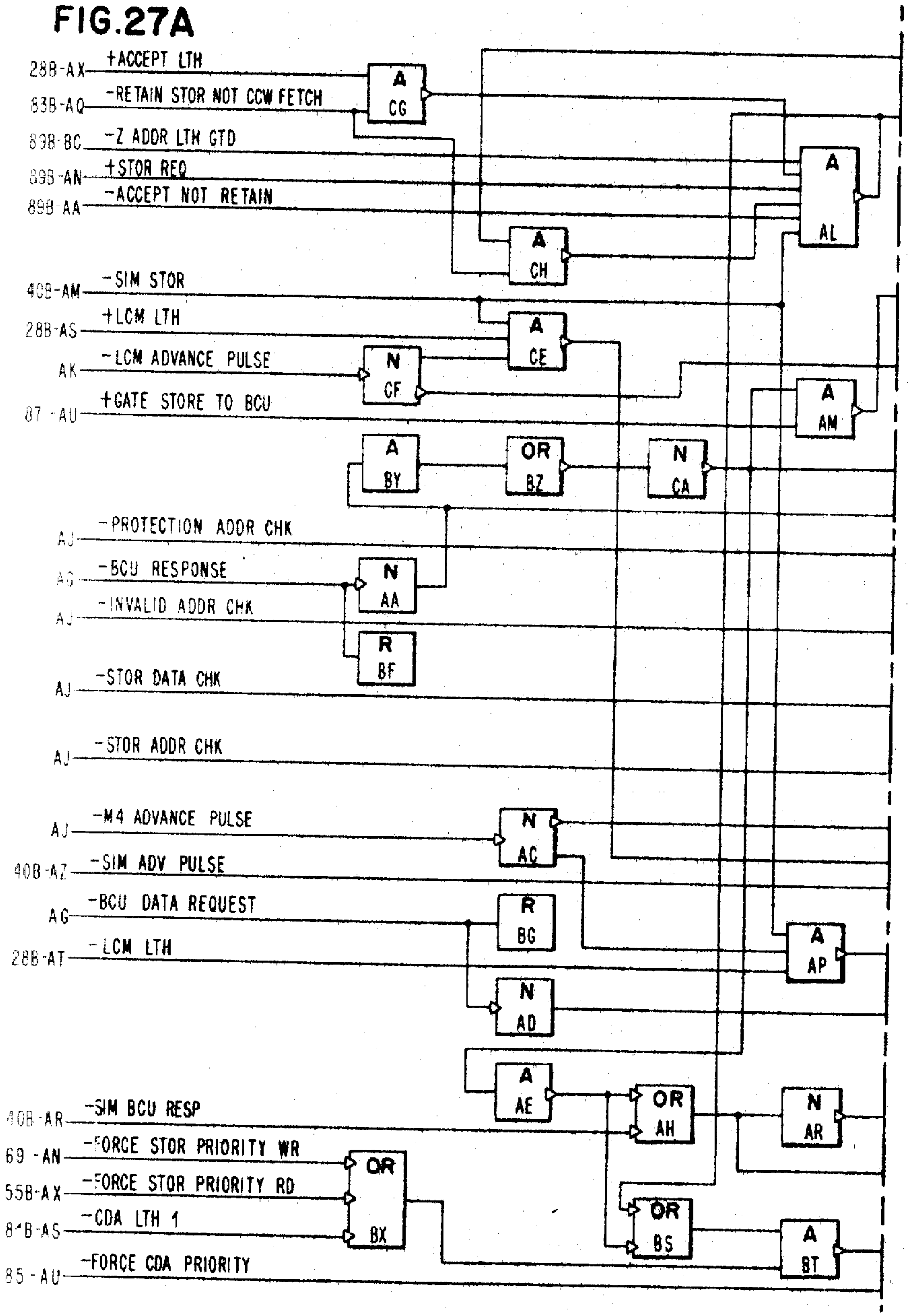
Figure 27B:
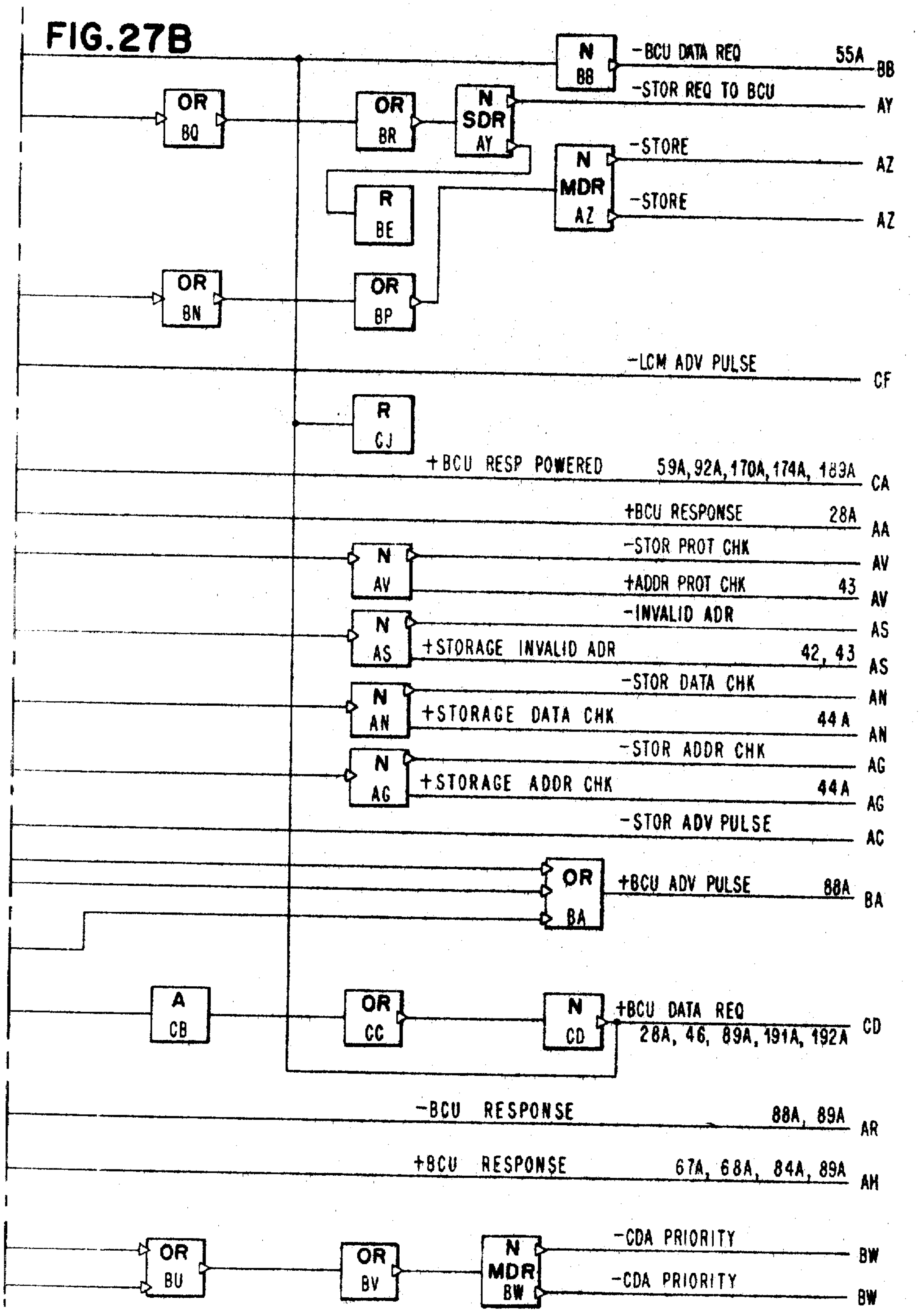
Figure 28A:
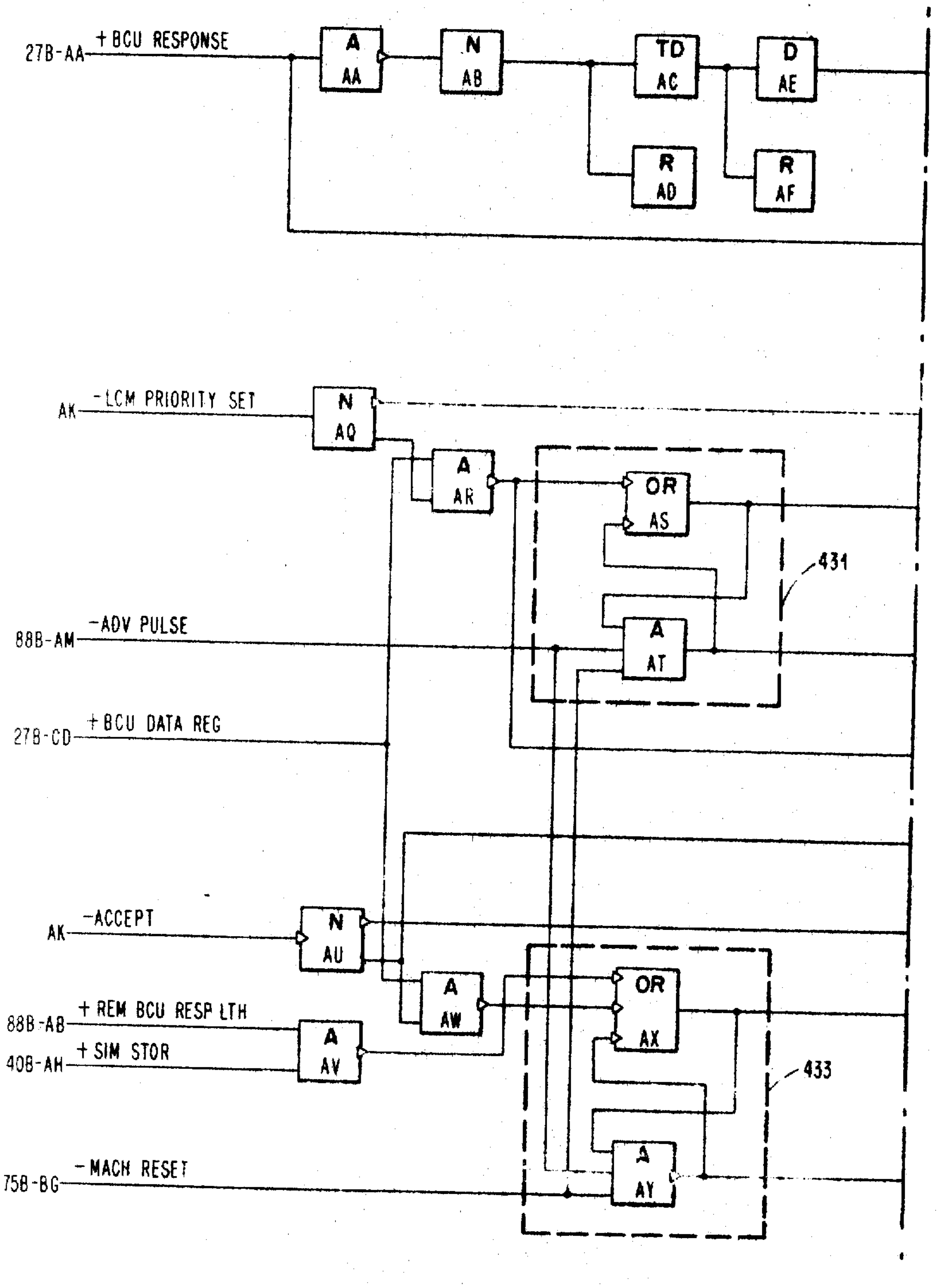
Figure 28B:
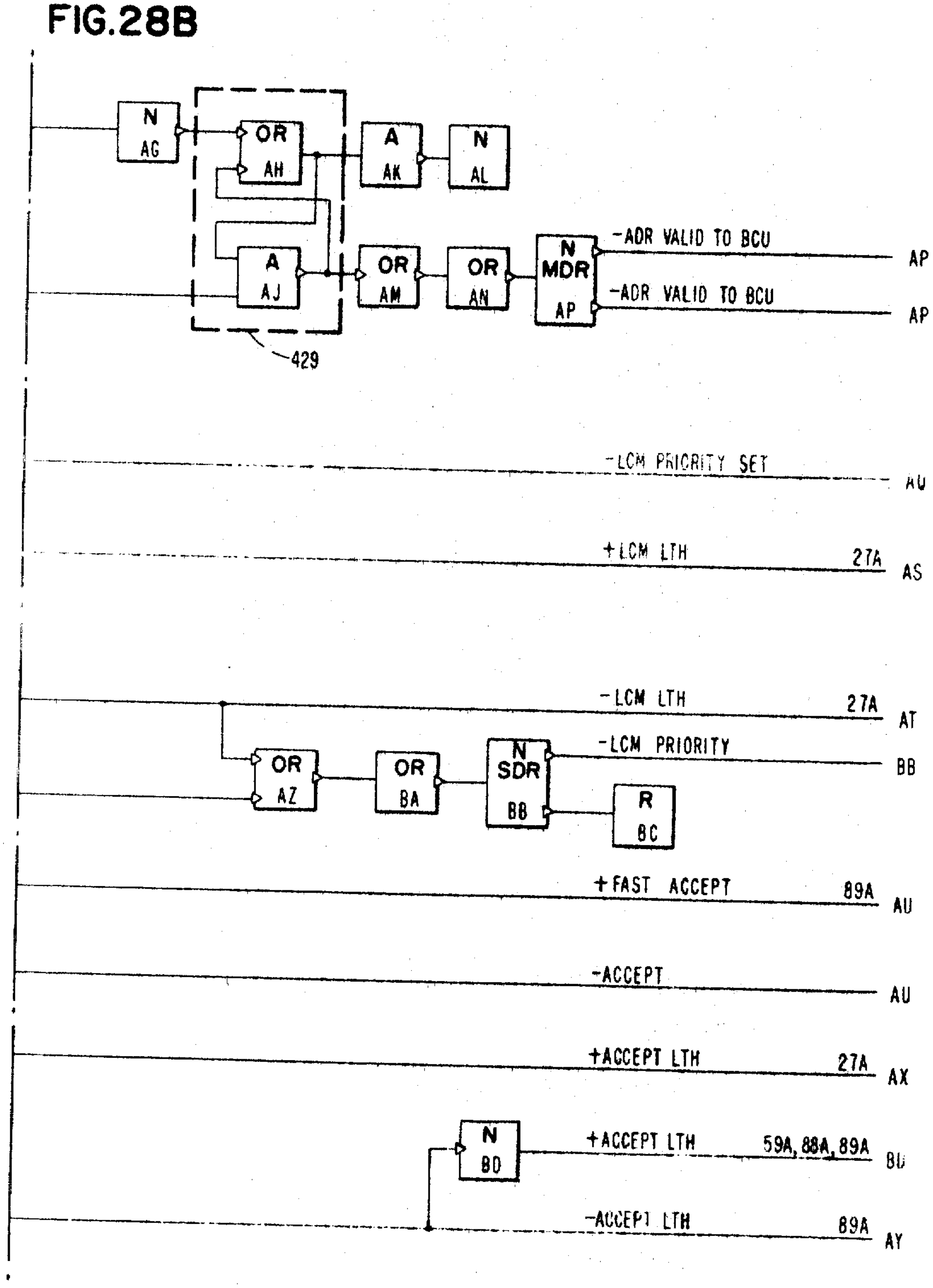

In answer to the *channel storage request* line the BCU raises the *BCU response line.* On FIGS. 27A and B, channel receiver block AA is activated by the BCU response line and one of its outputs, *+BCU response,* goes to FIGS. 28A and B. On FIGS. 28A and B, *+BC response* acts as a latch line for the address valid latch and also after going through the AND circuit block AA, the inverter block AB, the 30 nanosecond delay line block AC, the line sensing amplifier block AG, and the inverter block AG, it sets the address valid latch. The negative output of this latch goes through the OR circuit blocks AM and AN, and the multiplex driver block AP. The output of this driver is a *—address valid* line which goes to the BCU. On FIGS. 88A and B, *—BCU response* is inverted through the OR circuit, blocks AZ and AY. When the BCU response line falls, the output of block AY will go negative firing the single shot blocks BX and AA. The single shots turn on the Remember BCU Response Latch consisting of blocks AB and AC.

Returning to FIGS. 27A and B, the other output of the BCU response line receiver block AA goes through the OR circuit blocks BY and BZ and is powered by block CA. The output of this block is *+BCU response powered* and goes to FIGS. 59A and B and 189A and B.

12.04 SET UP

Figure 59A:
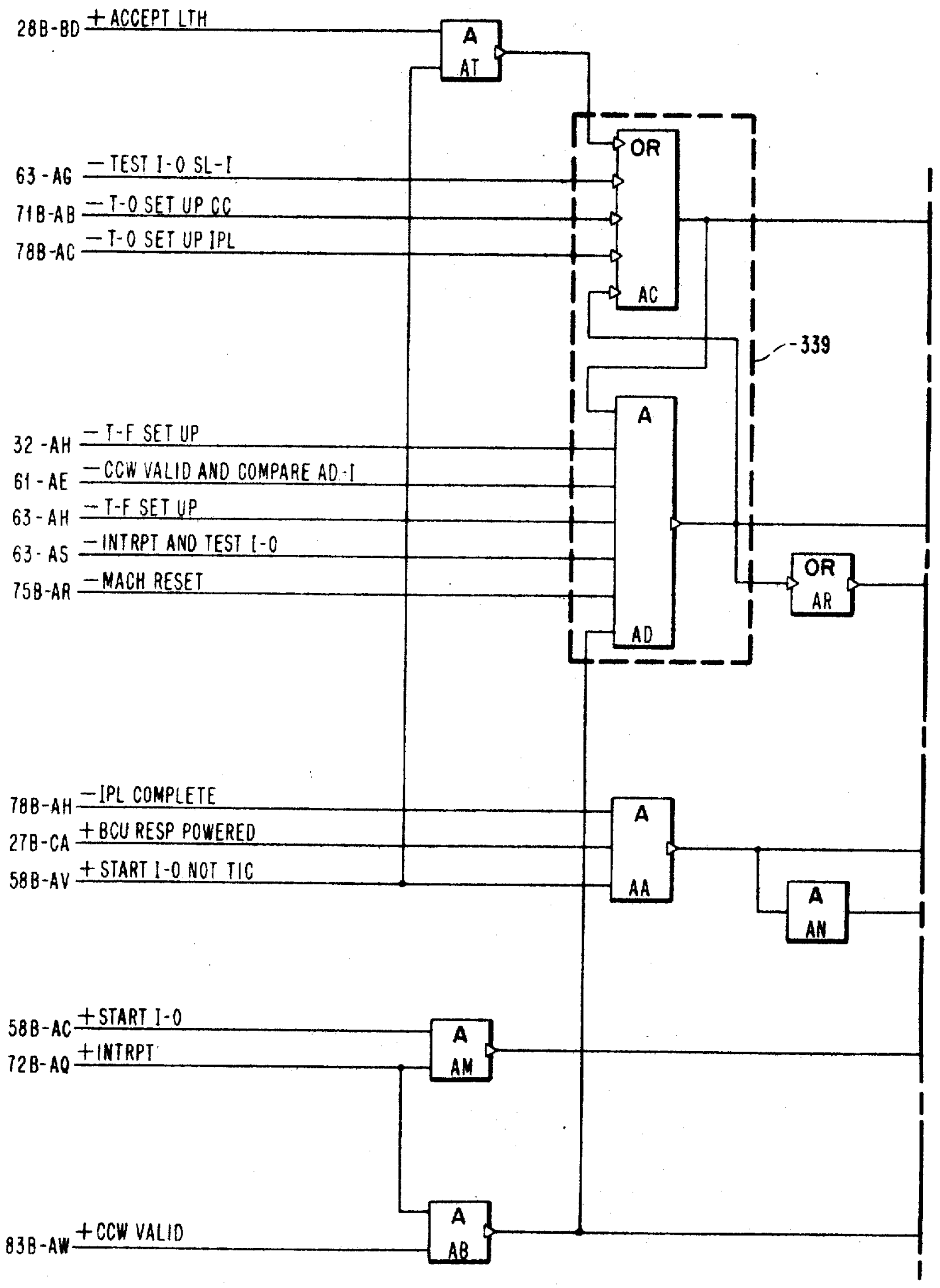
Figure 59B:
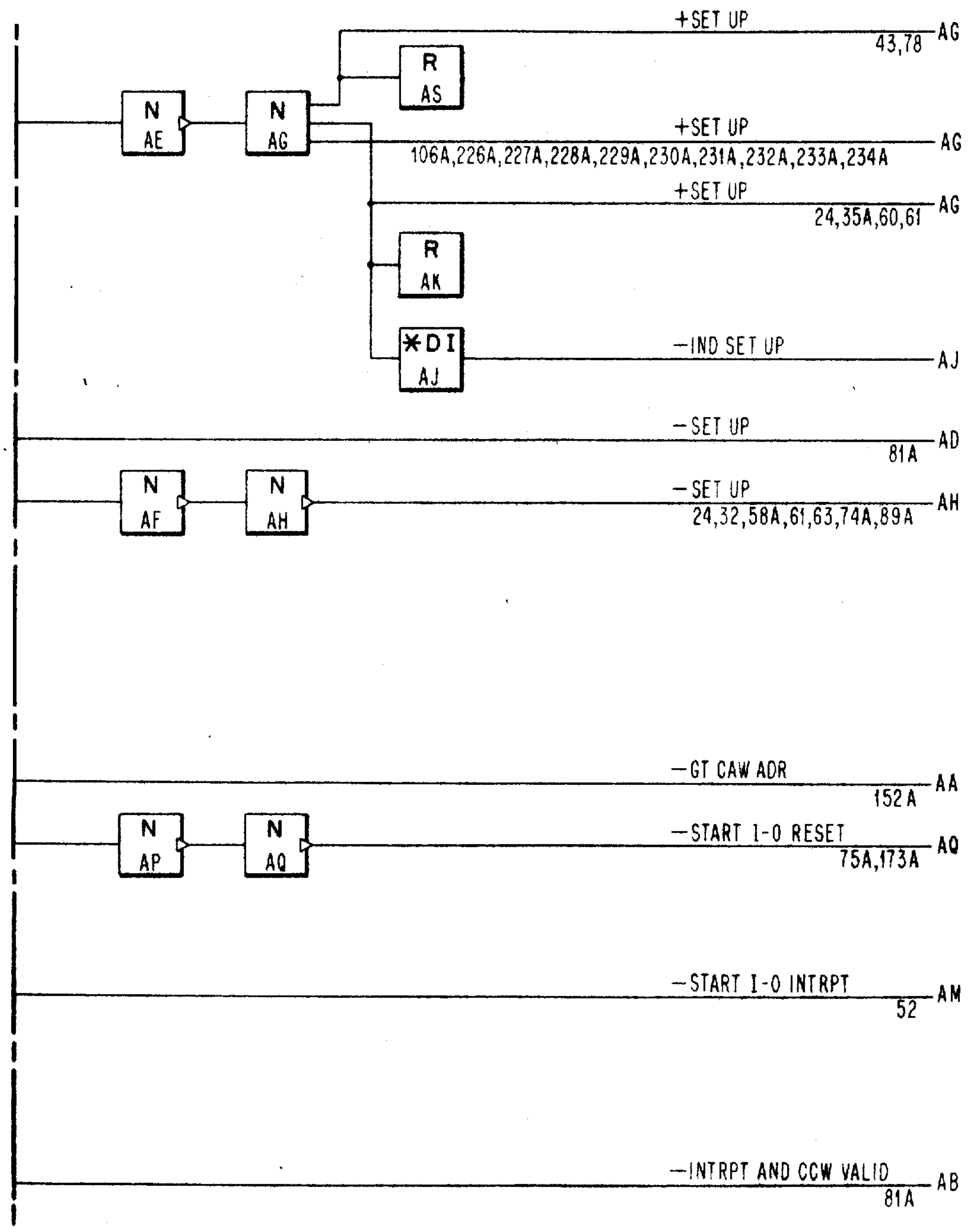

On FIGS. 59A and B, *+BCU response powered* goes to AND block AA with one of its outputs going to FIGS.

Figure 75A:
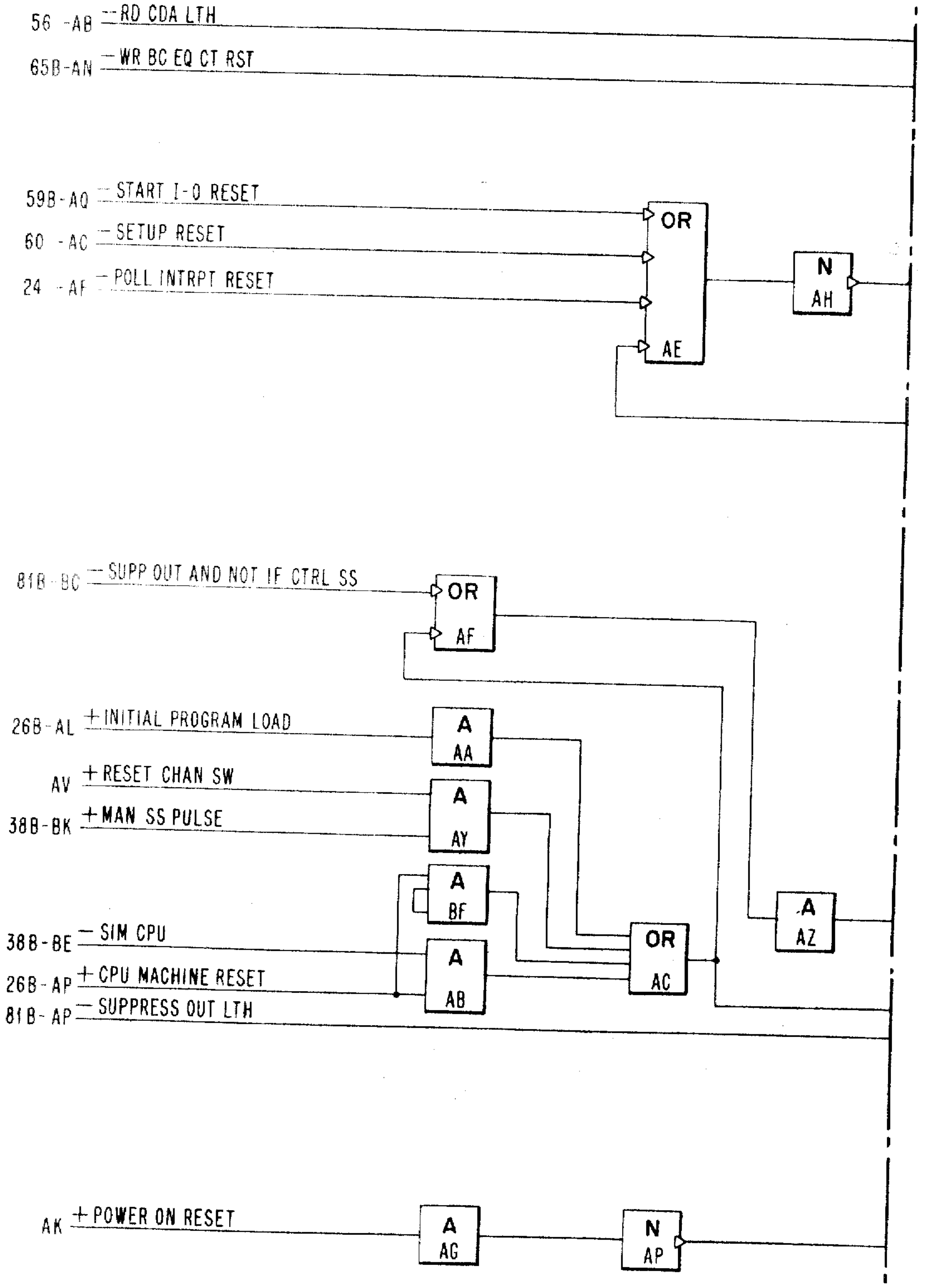
Figure 75B:
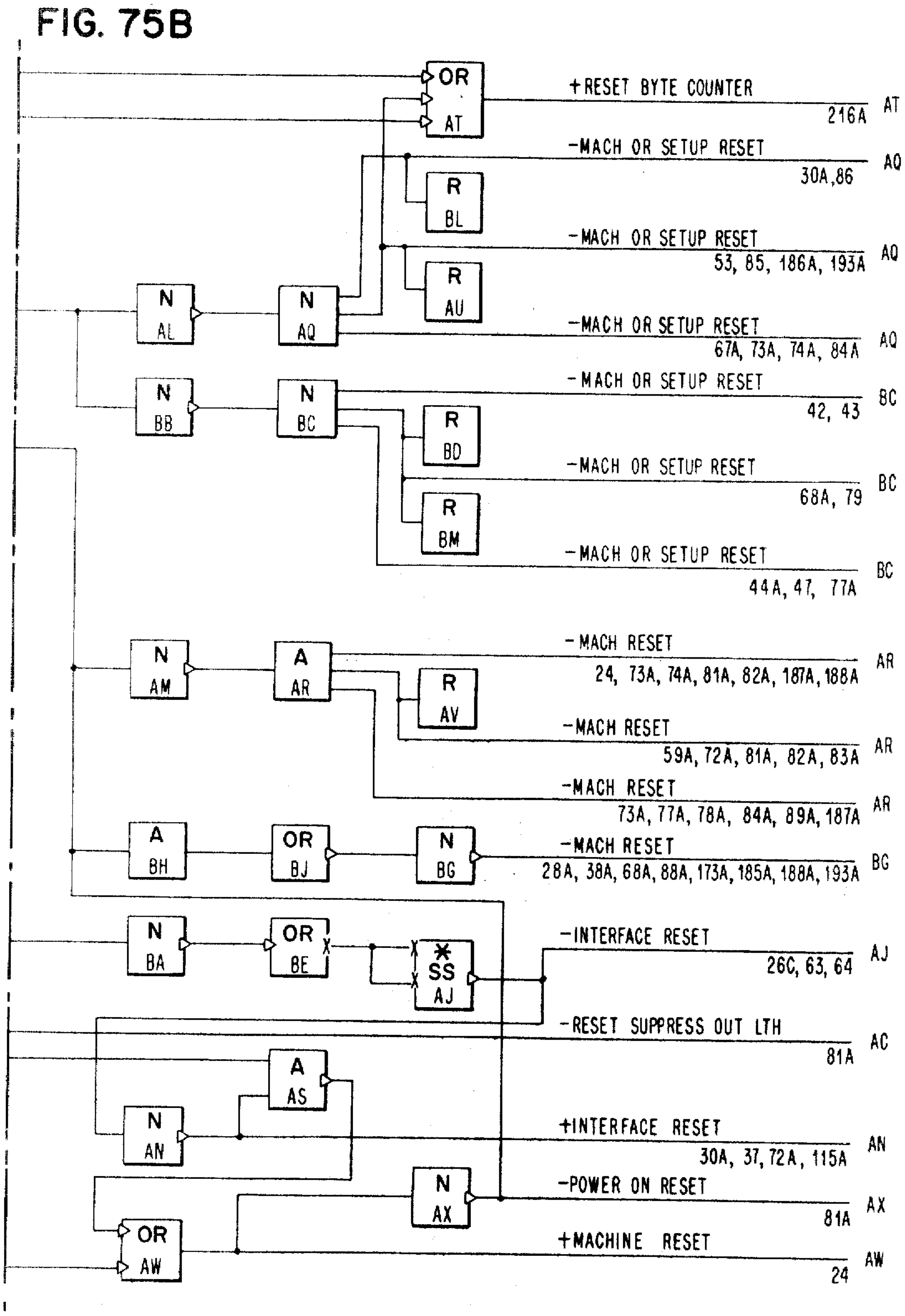
Figure 76:
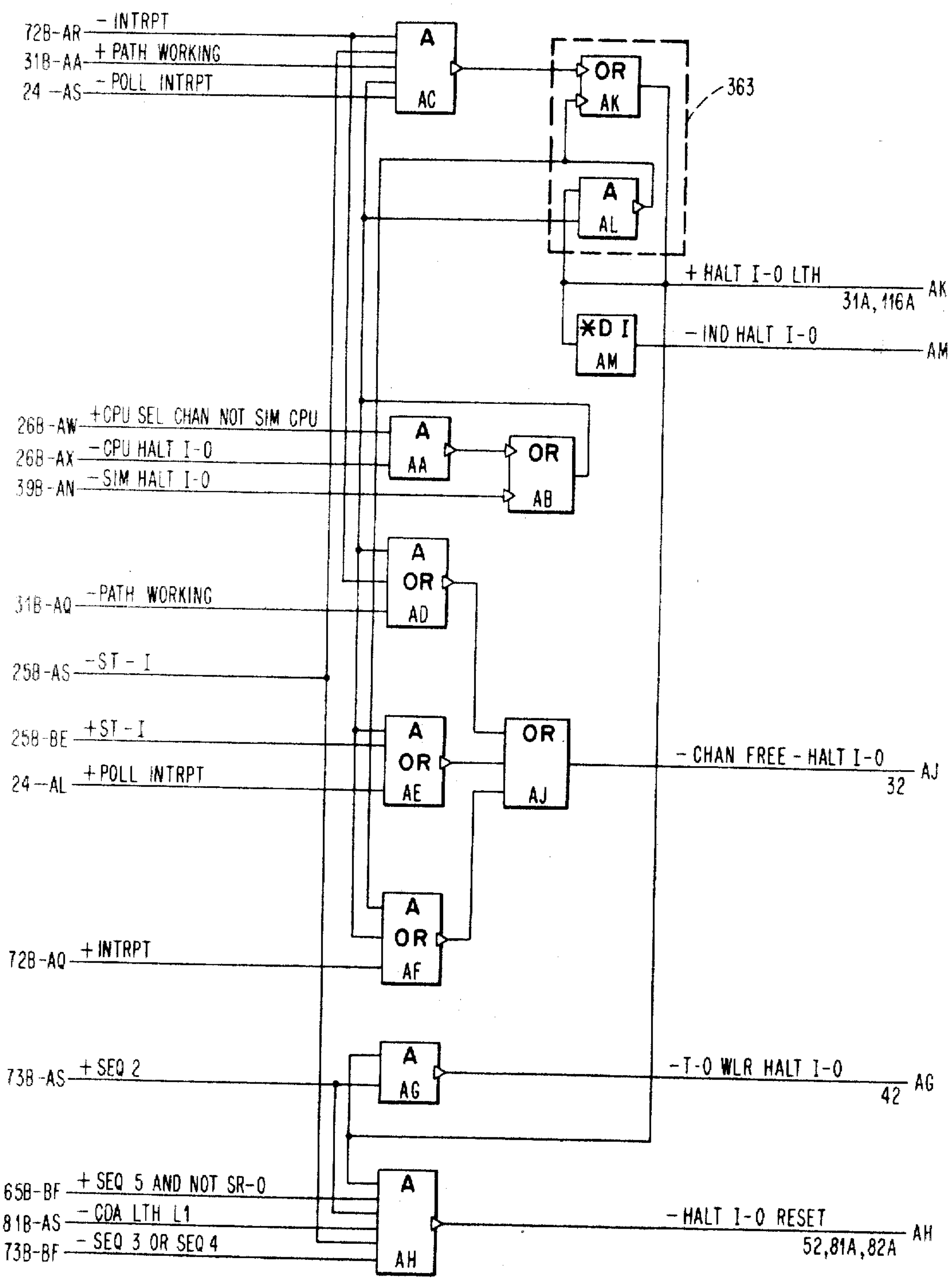
Figure 77A:
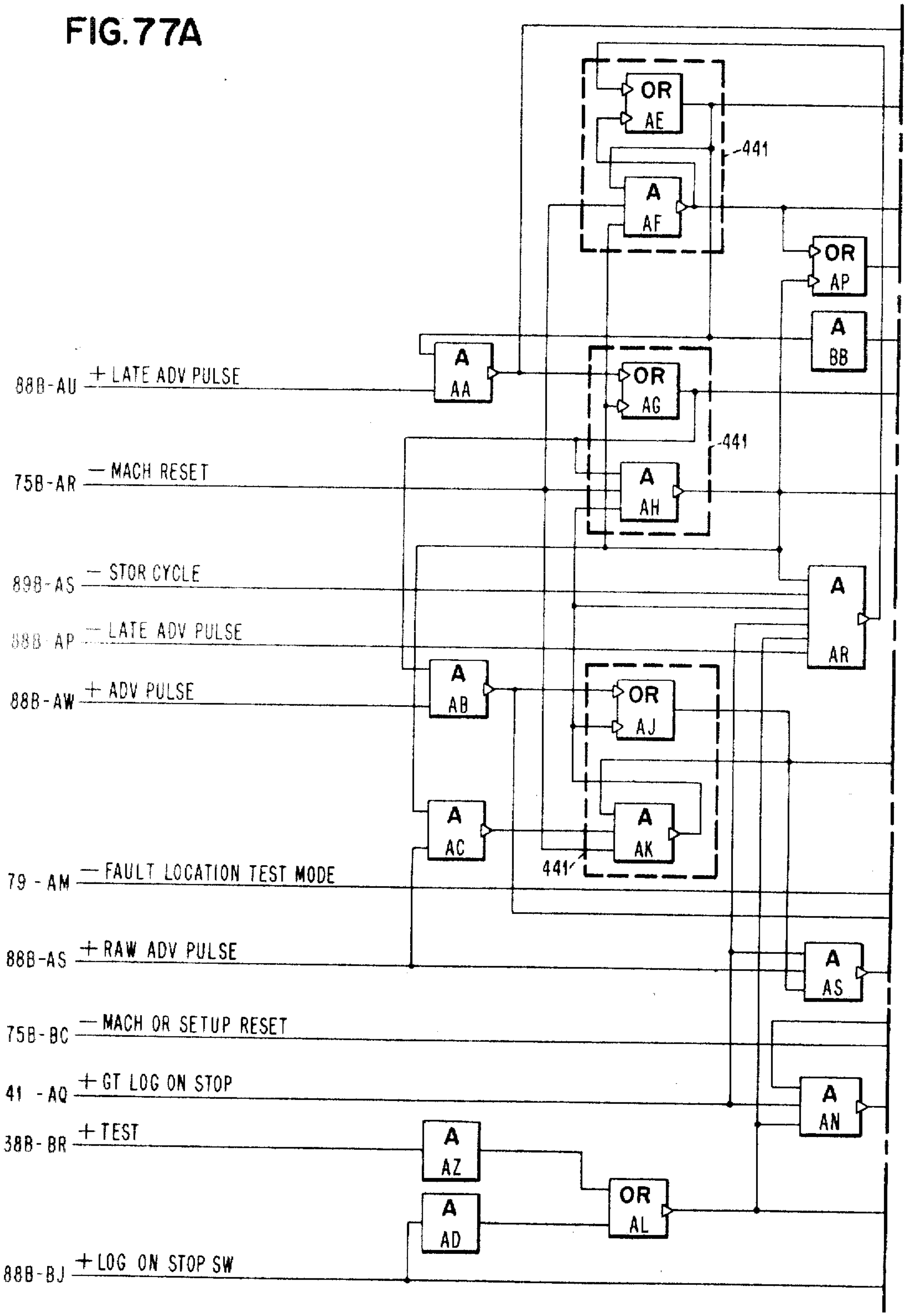
Figure 77B:
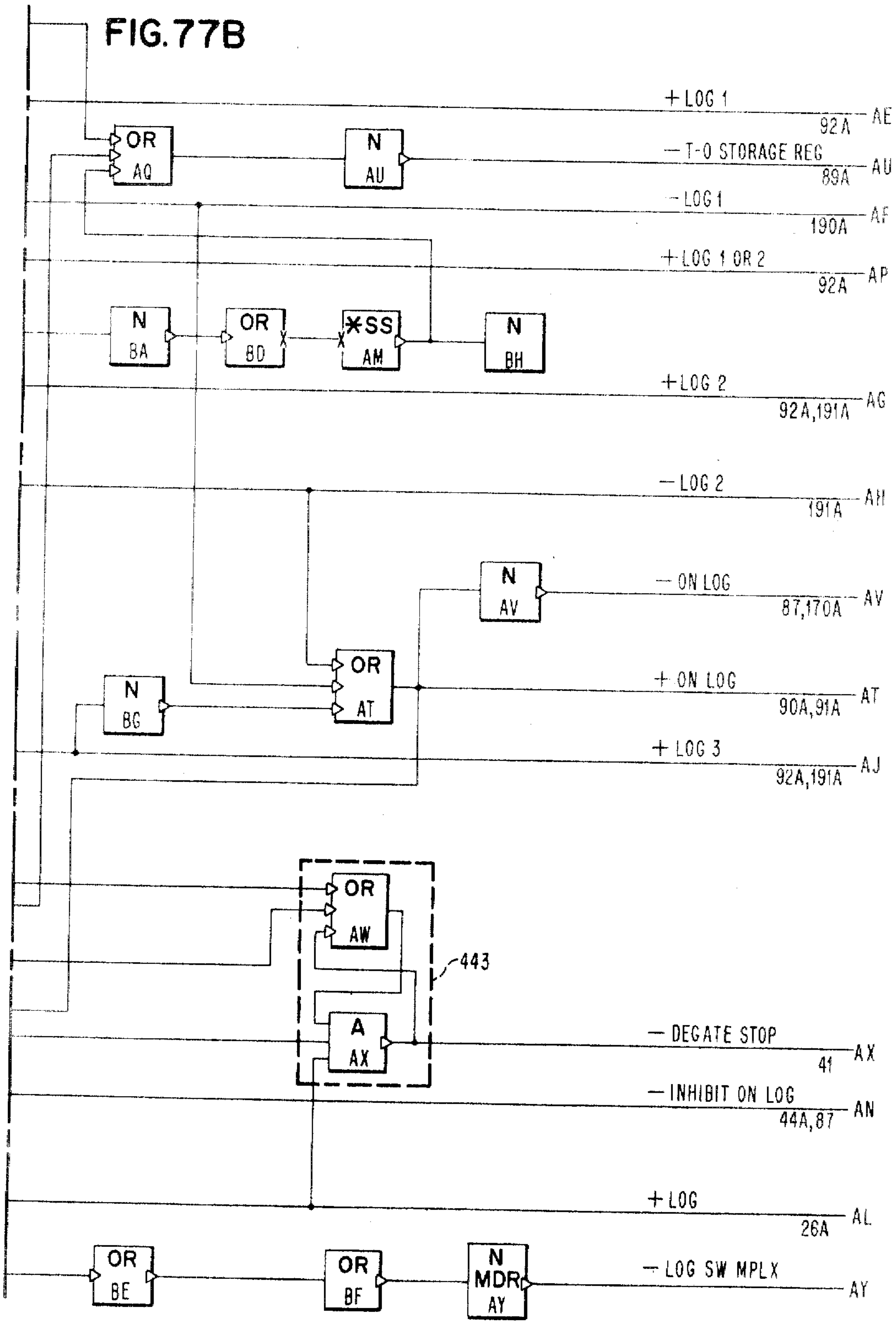
Figure 78A:
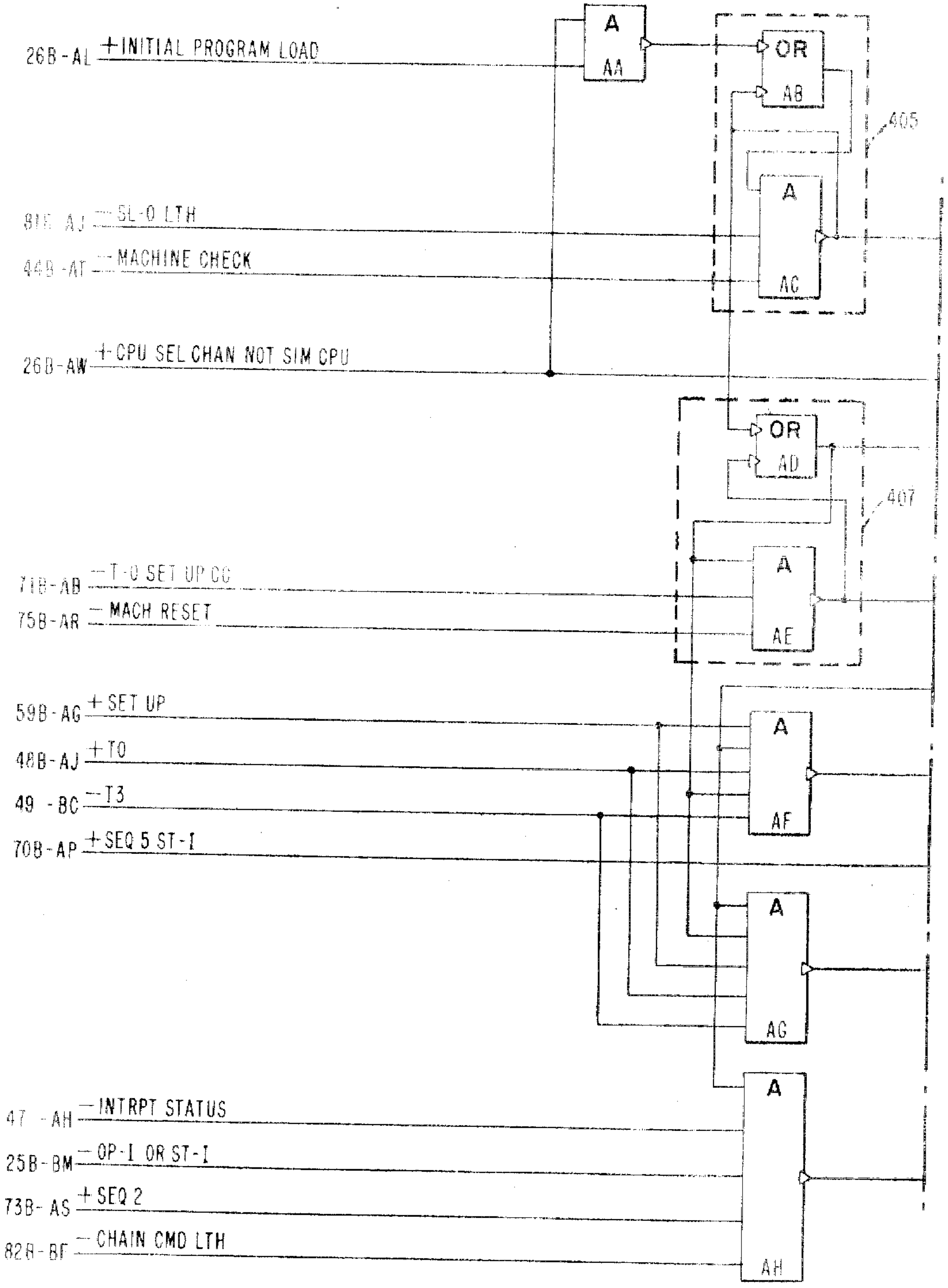
Figure 78B:
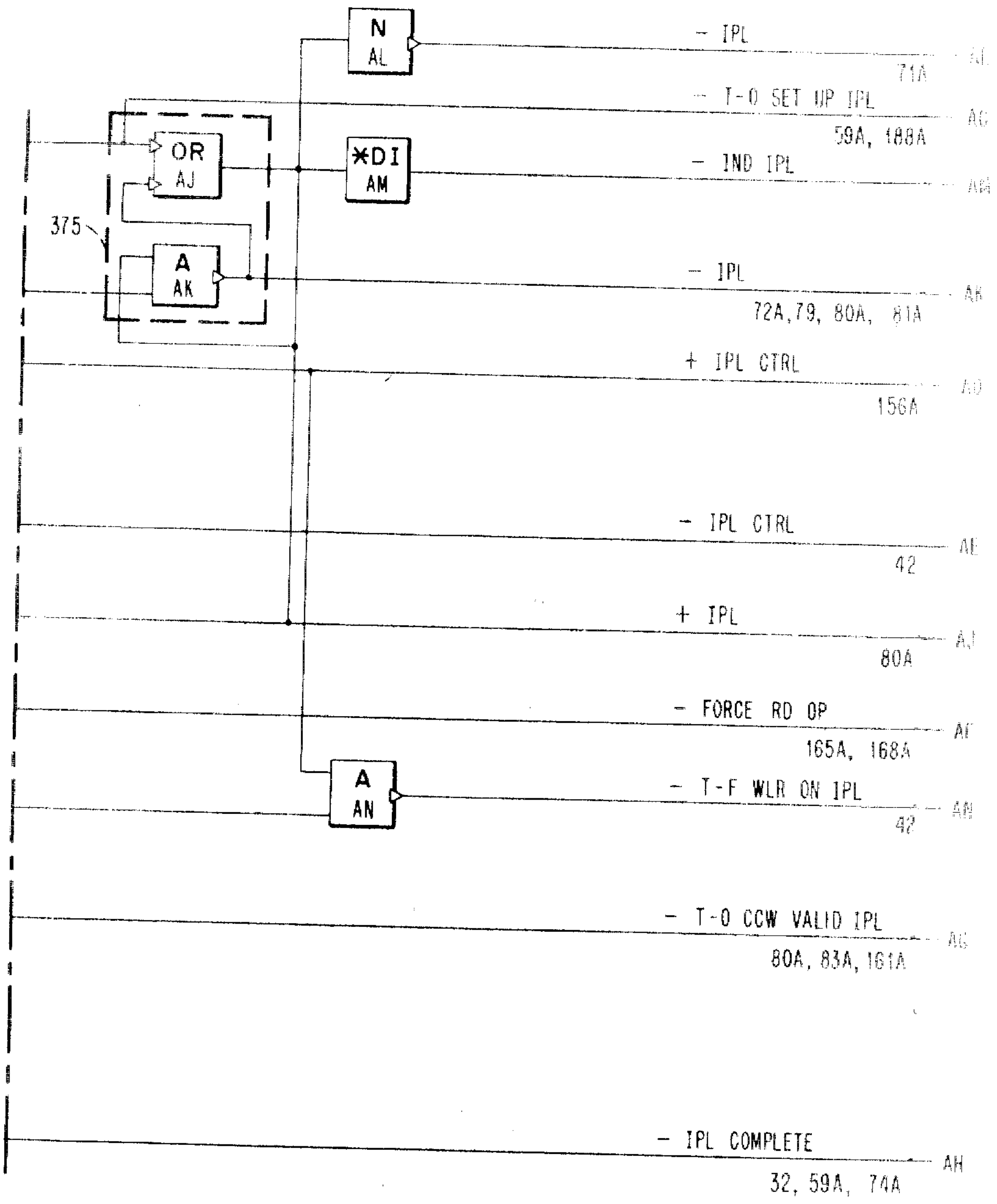
Figure 79:
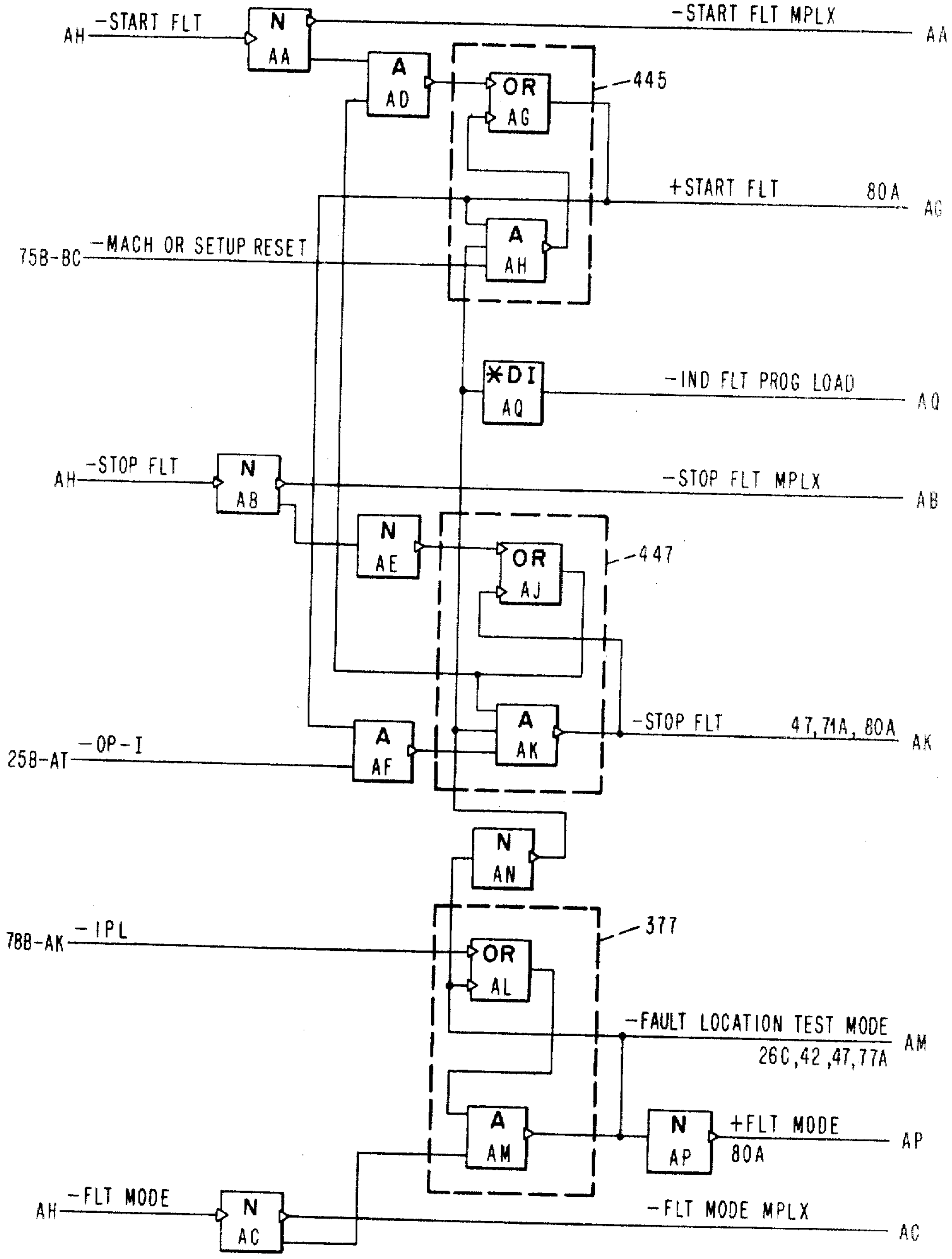
Figure 80A:
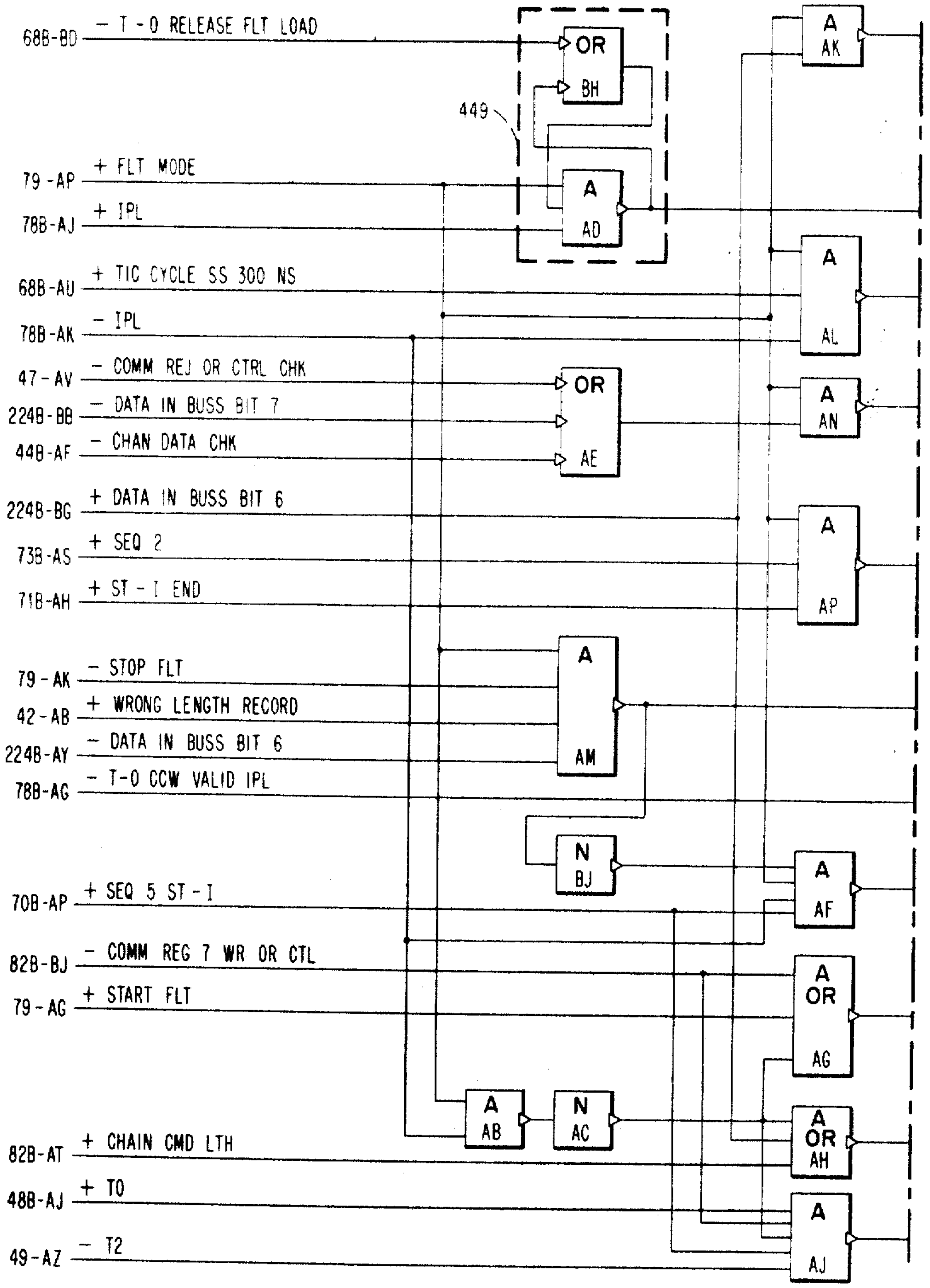
Figure 80B:
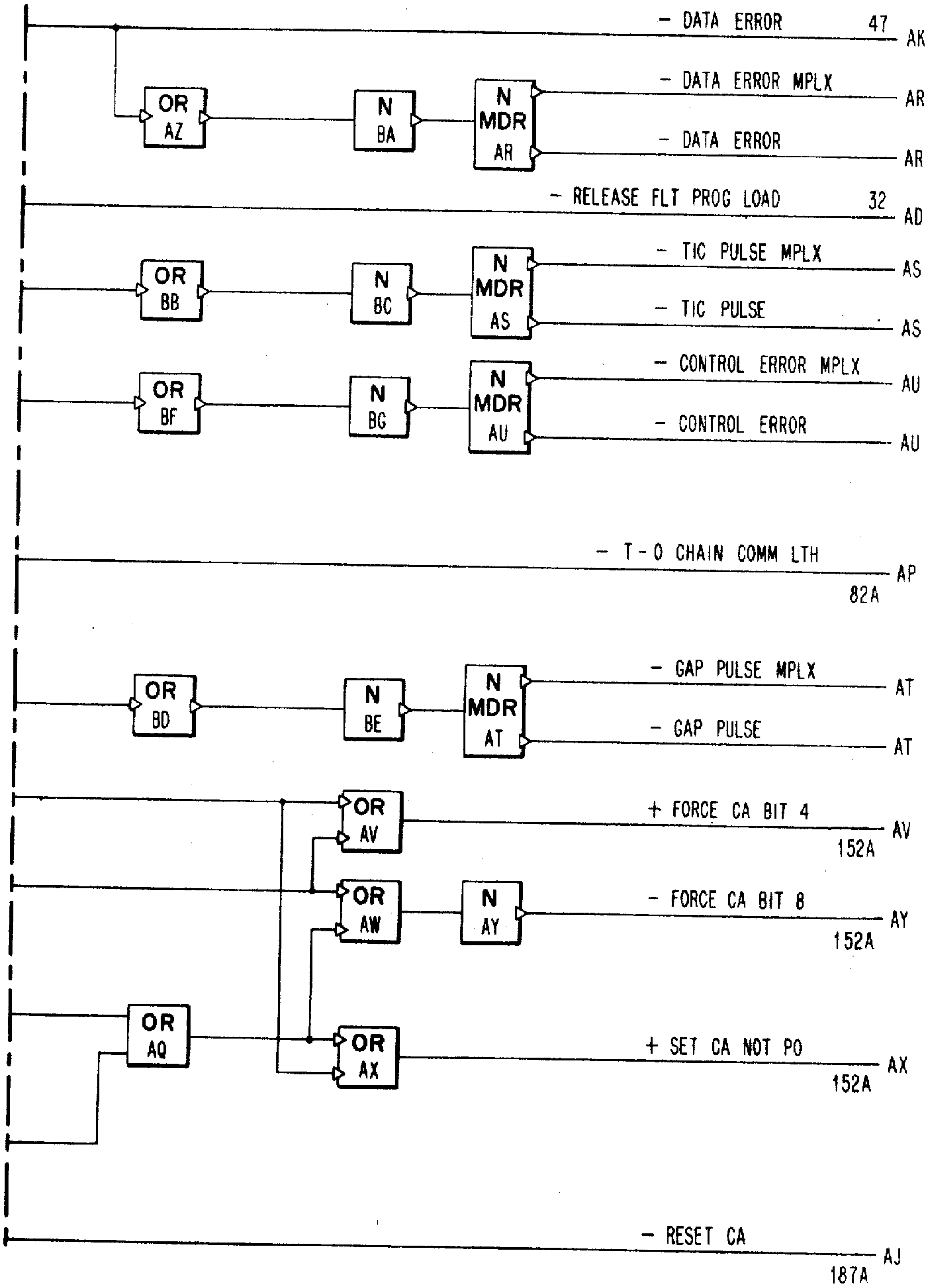
Figure 90A:
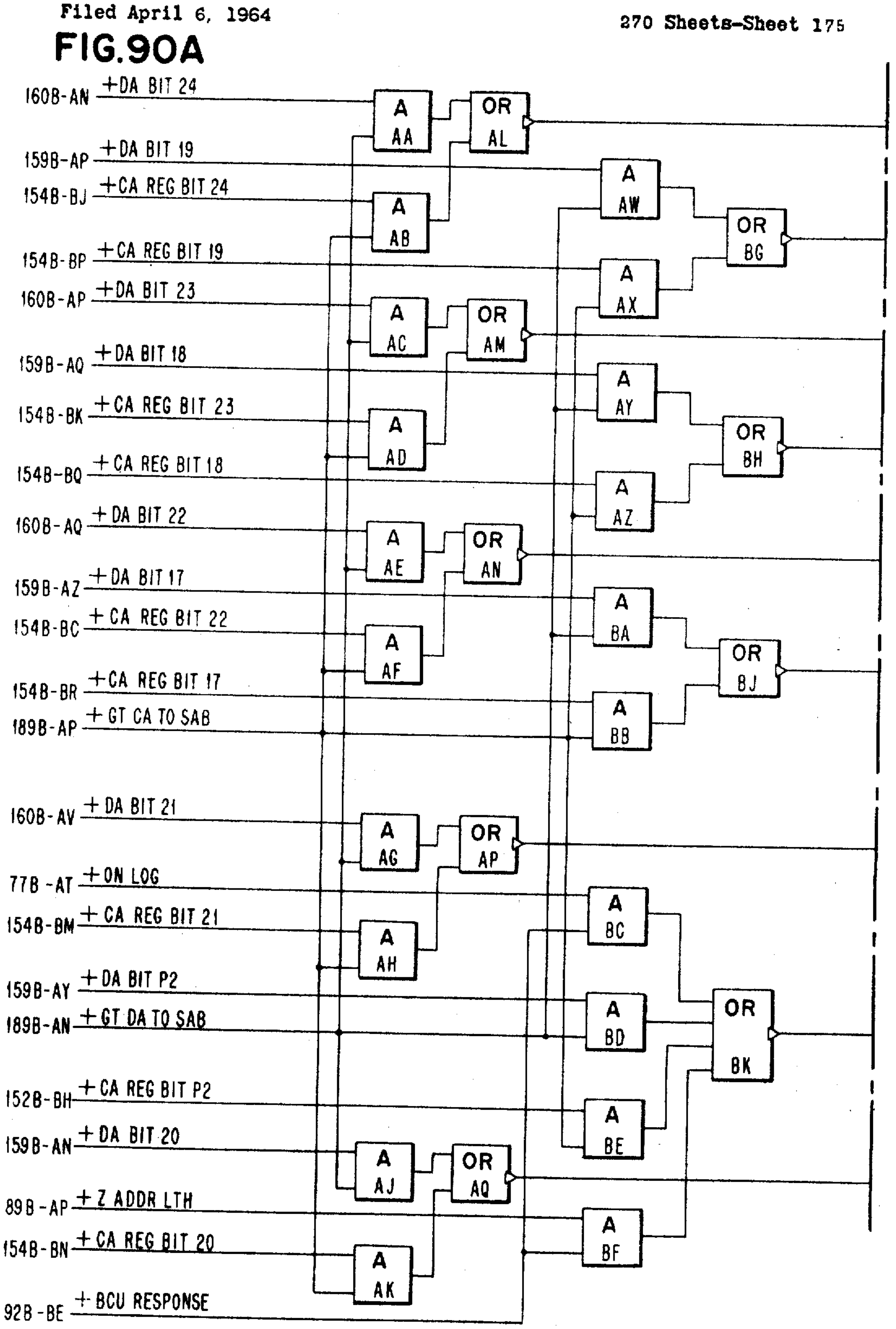
Figure 90B:
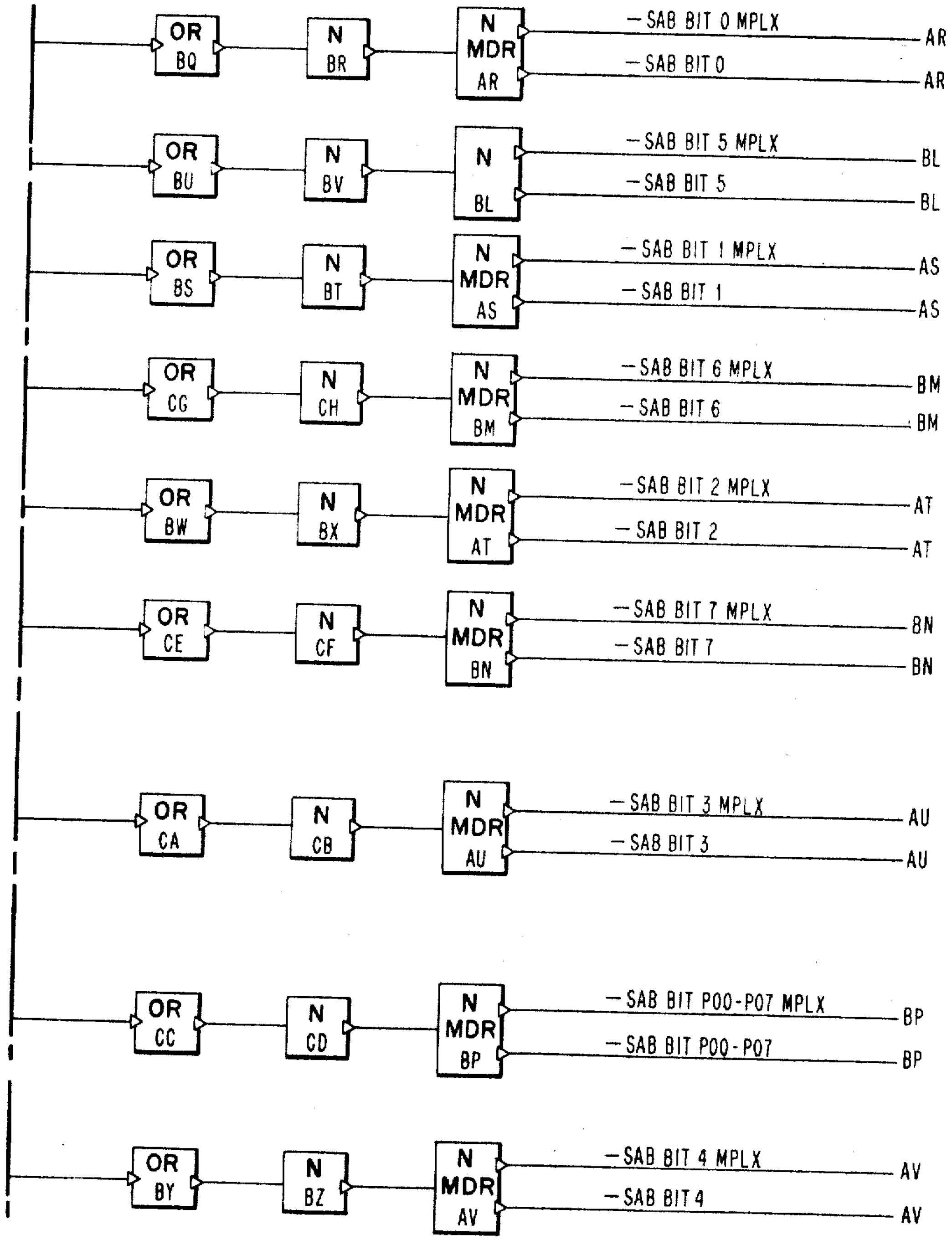
Figure 91A:
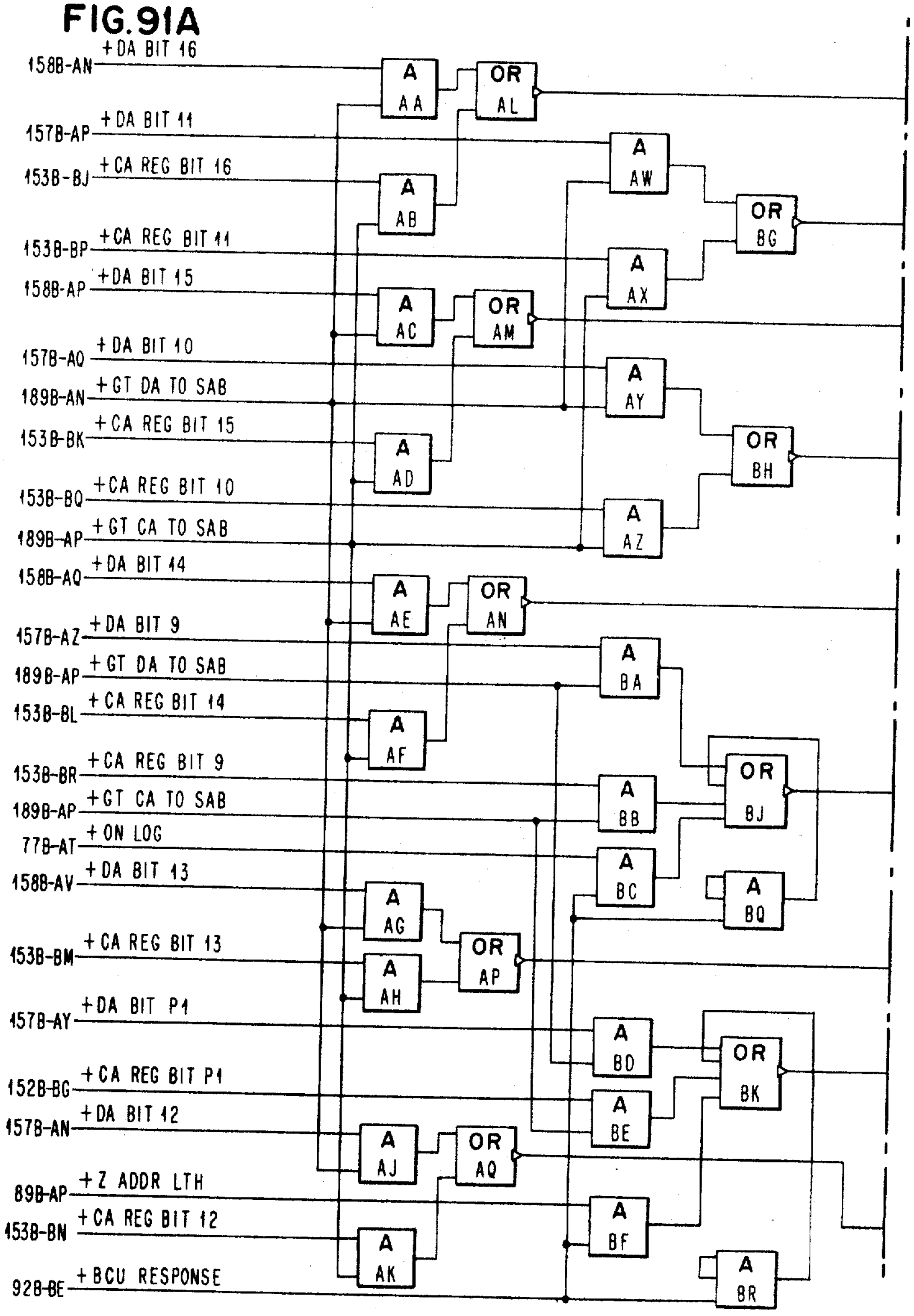
Figure 91B:
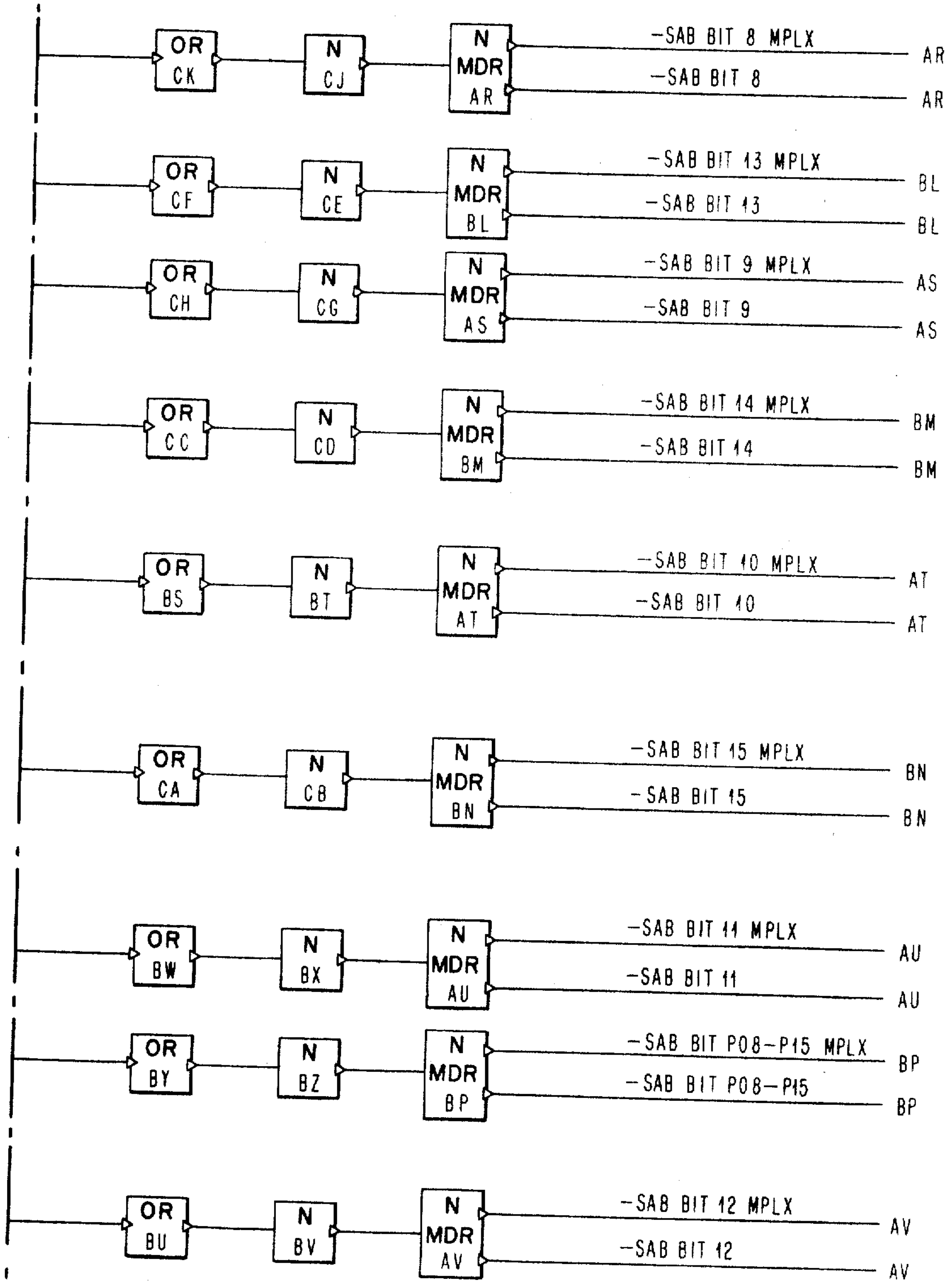
Figure 92A:
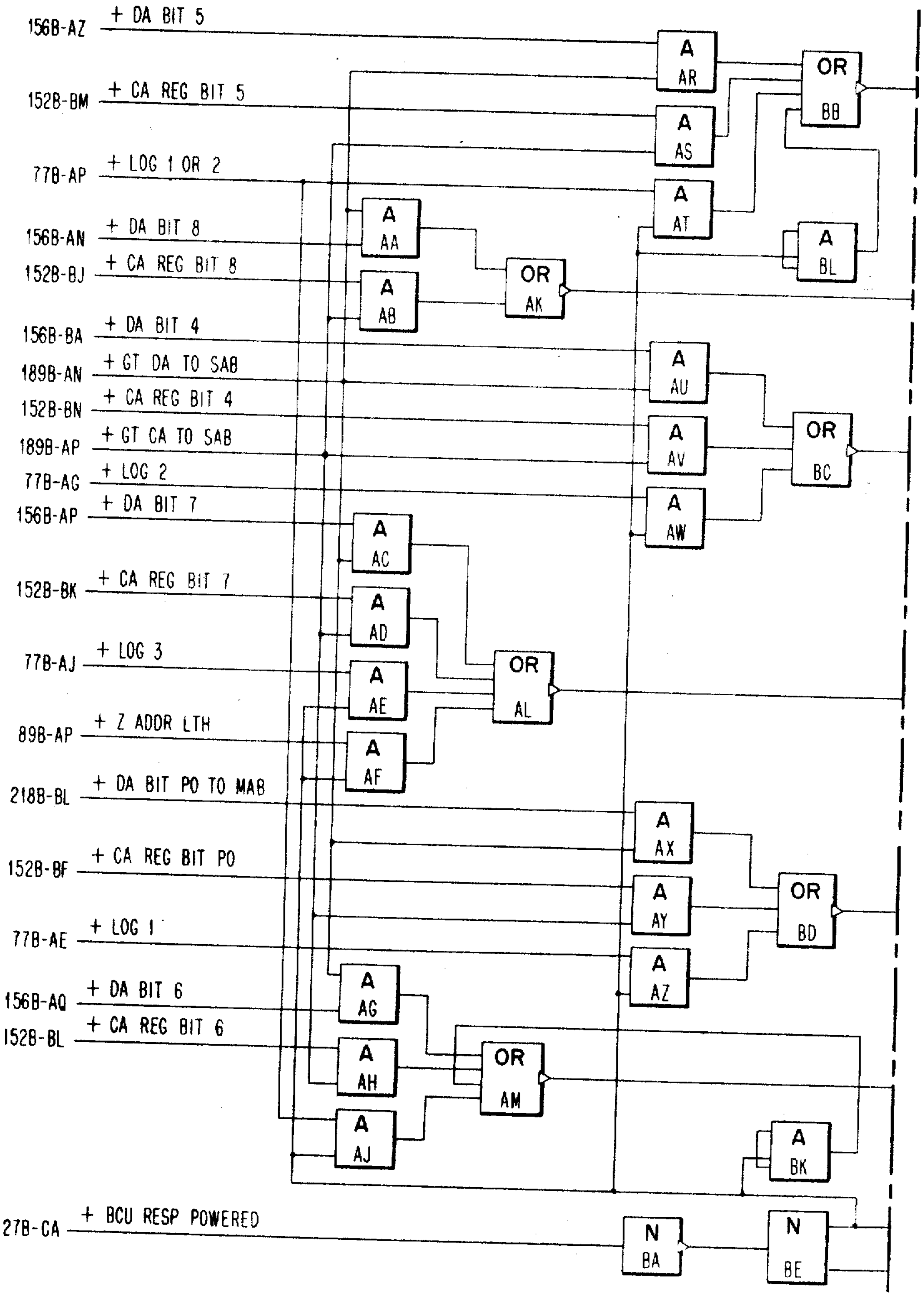
Figure 92B:
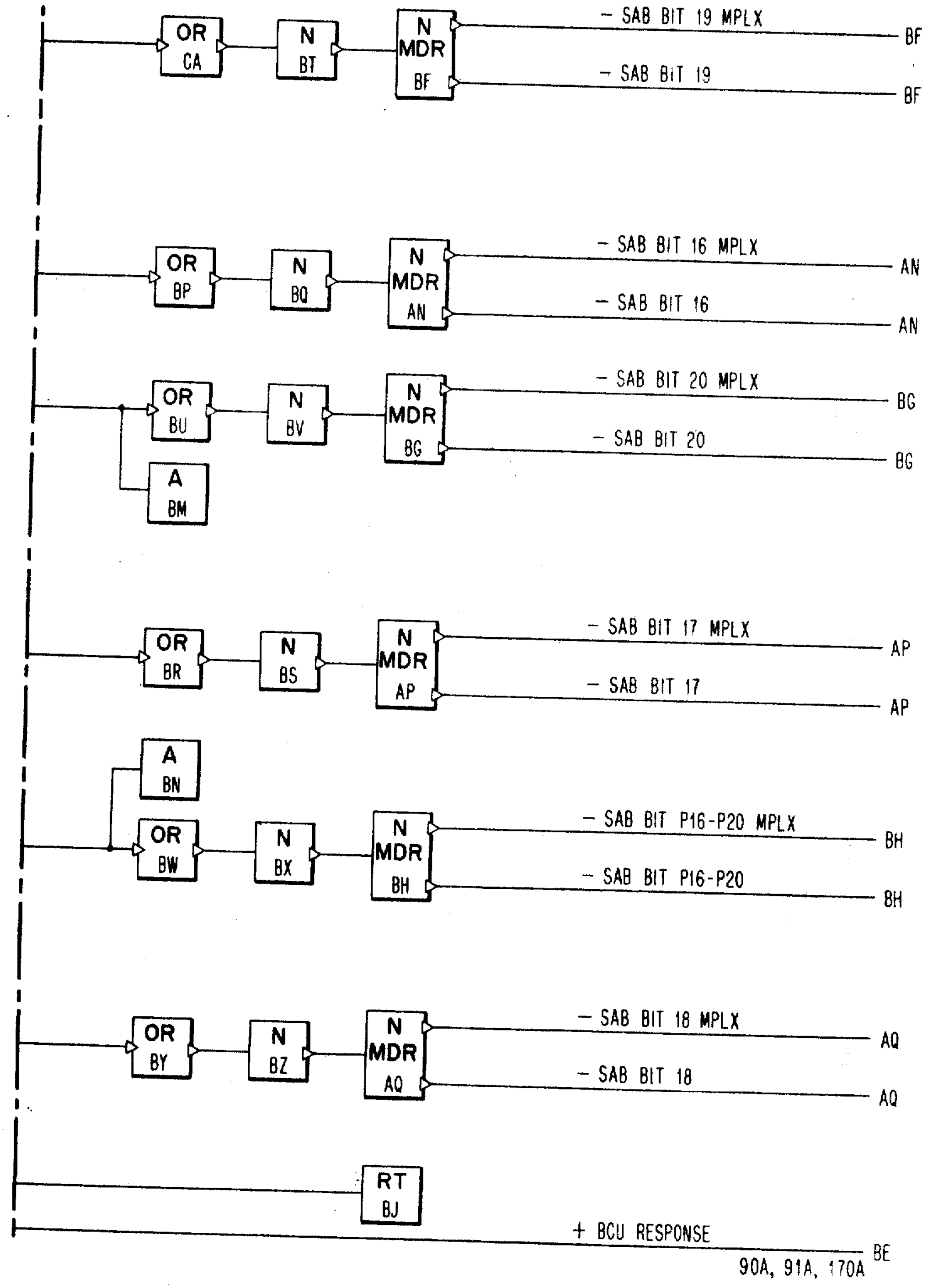
Figure 93A:
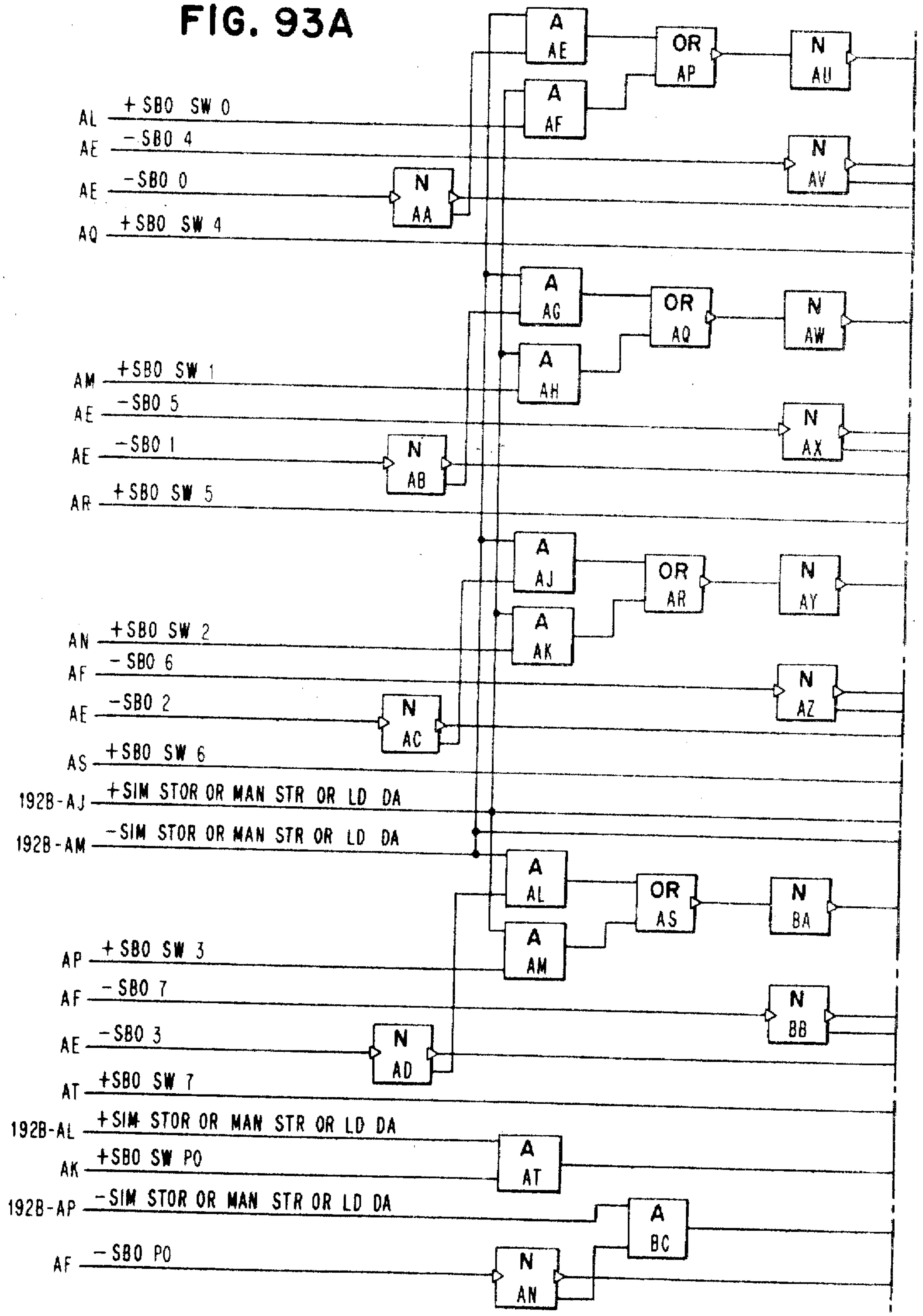
Figure 93B:
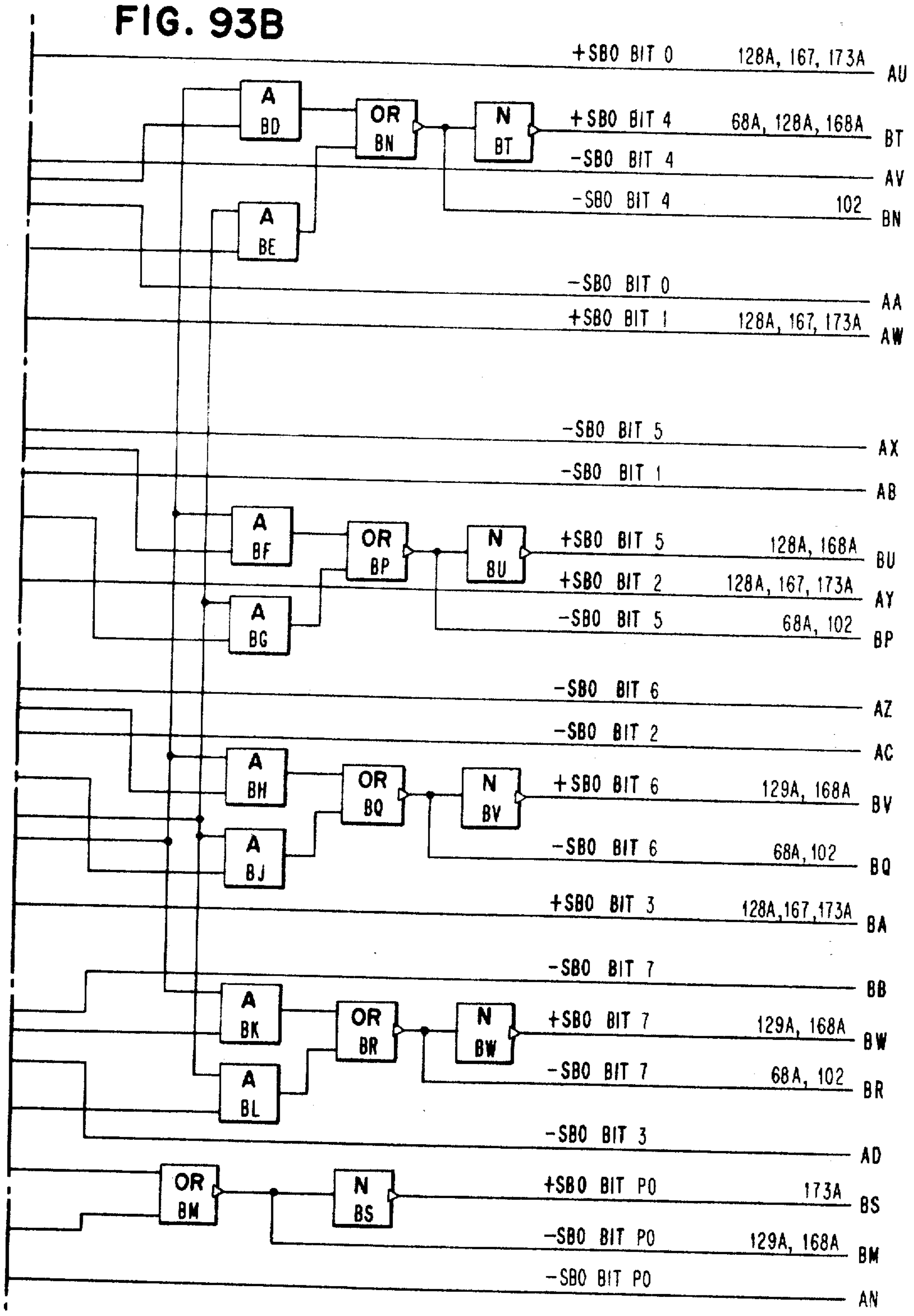
Figure 94A:
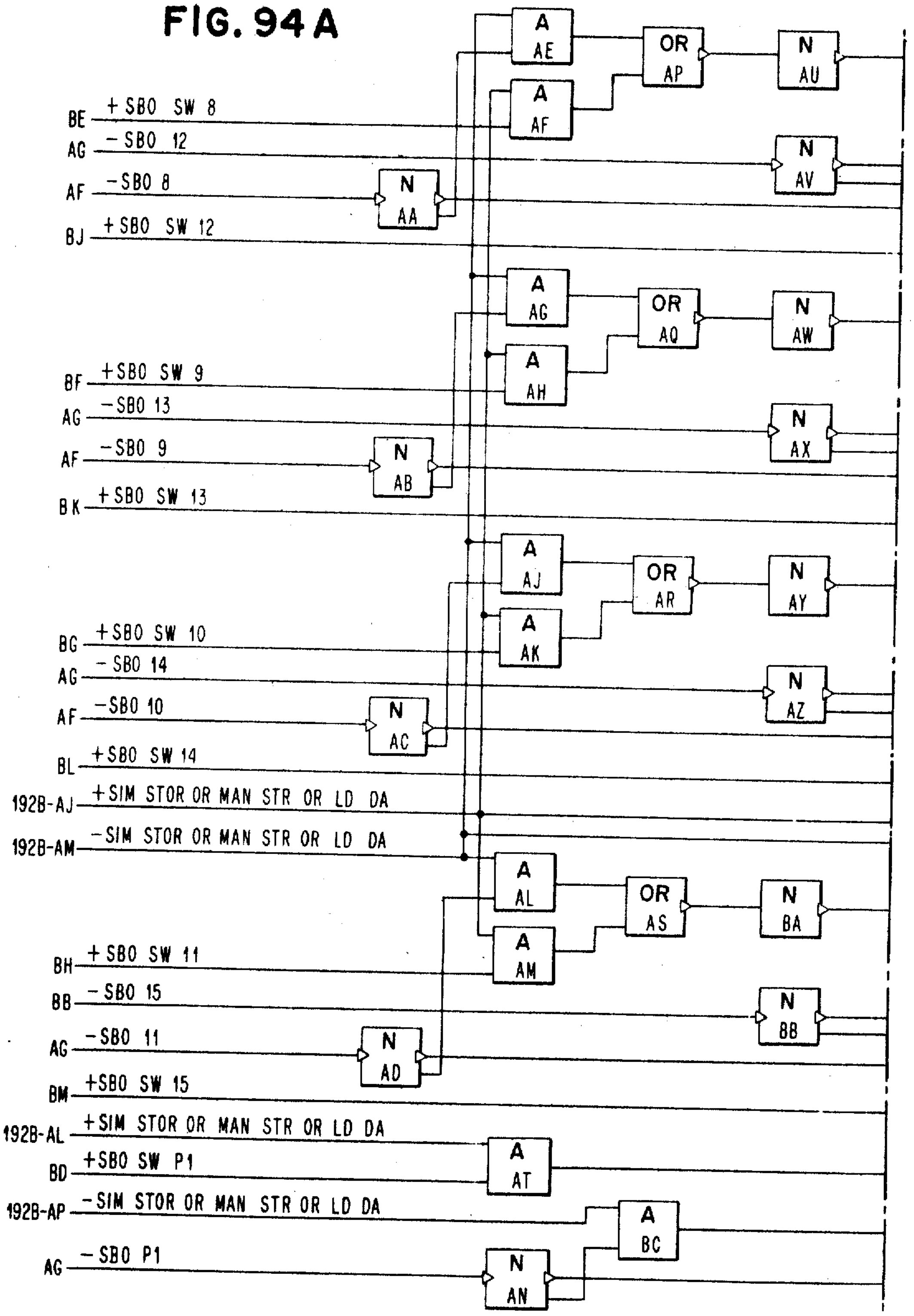
Figure 94B:
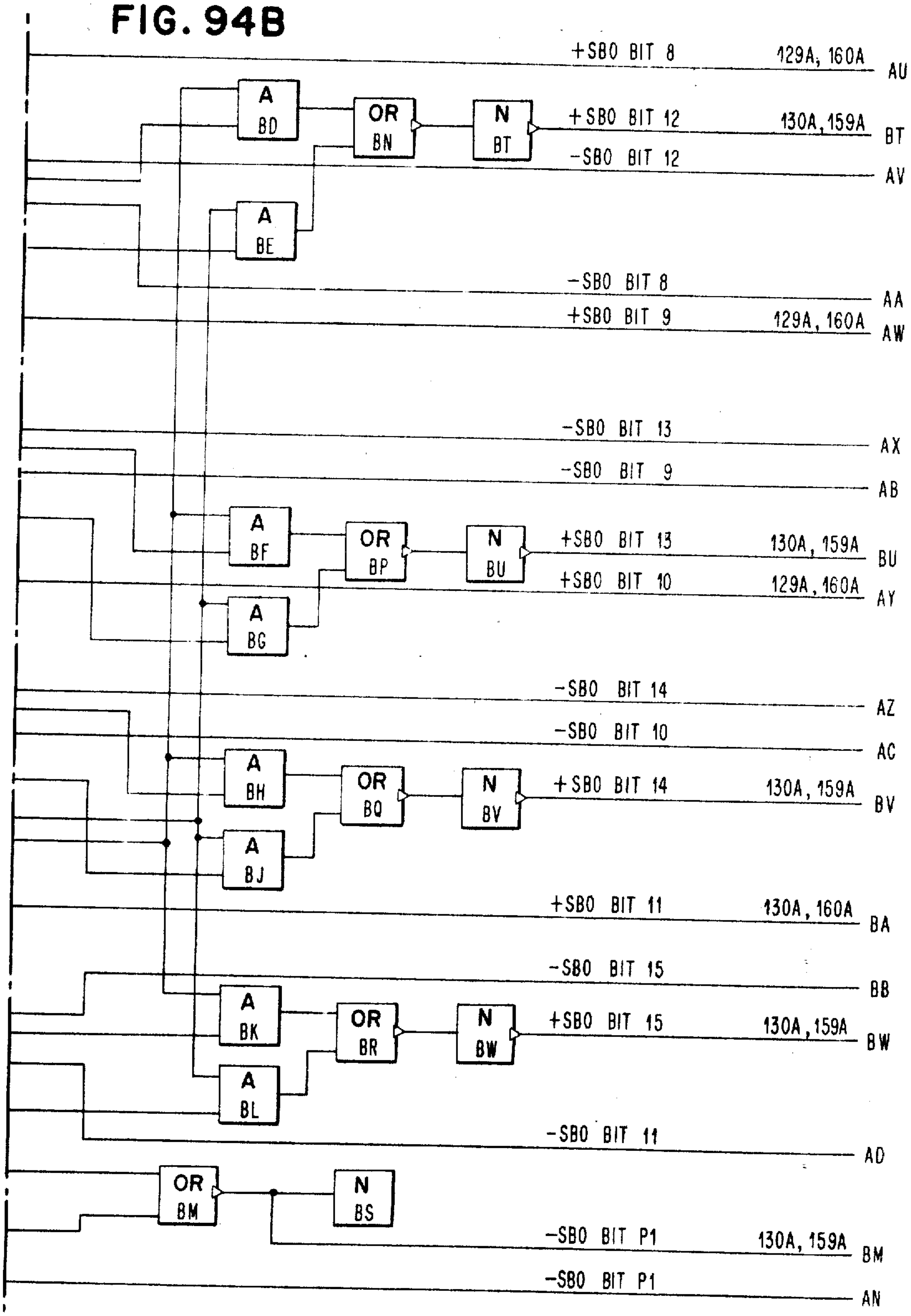
Figure 95A:
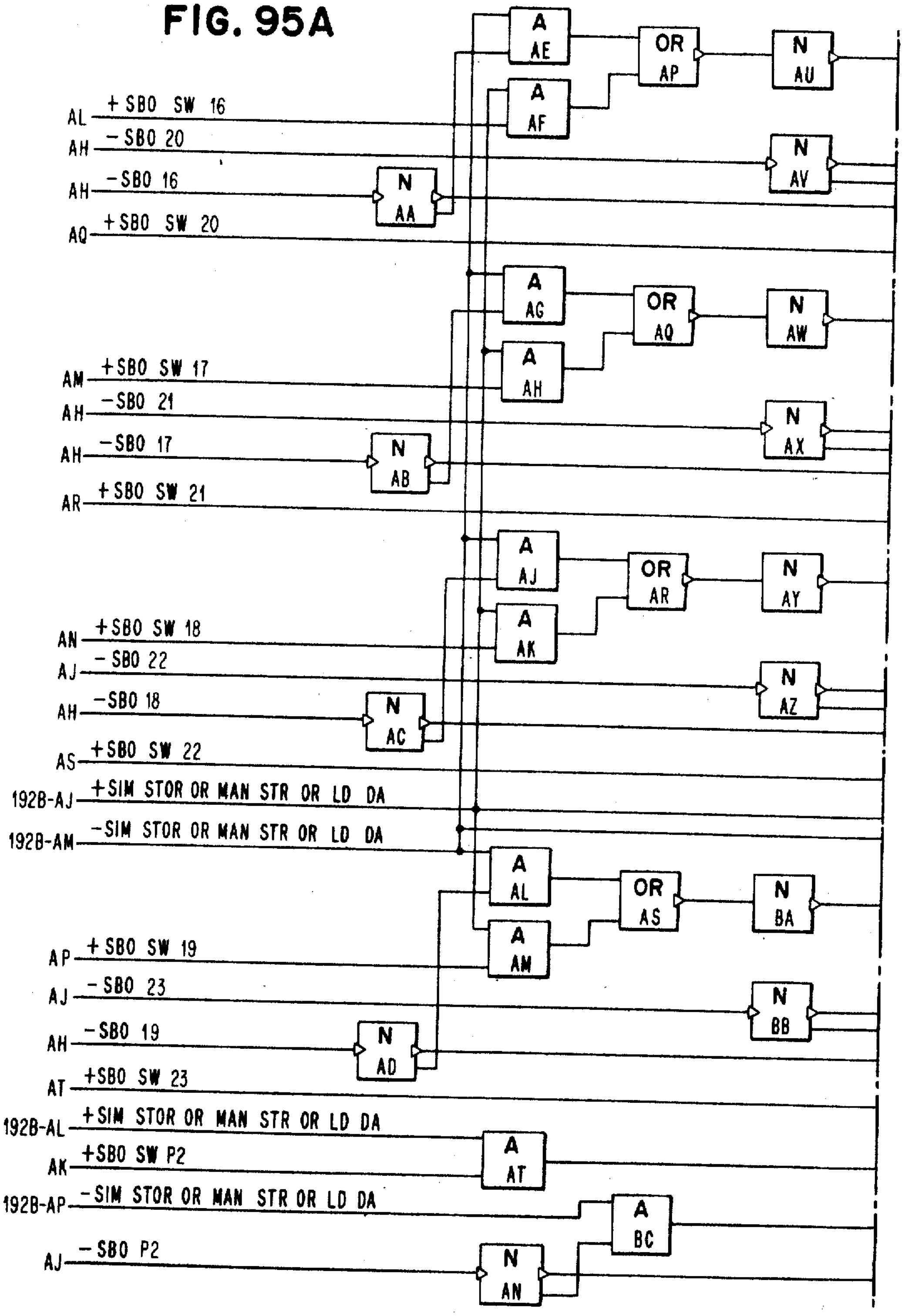
Figure 95B:
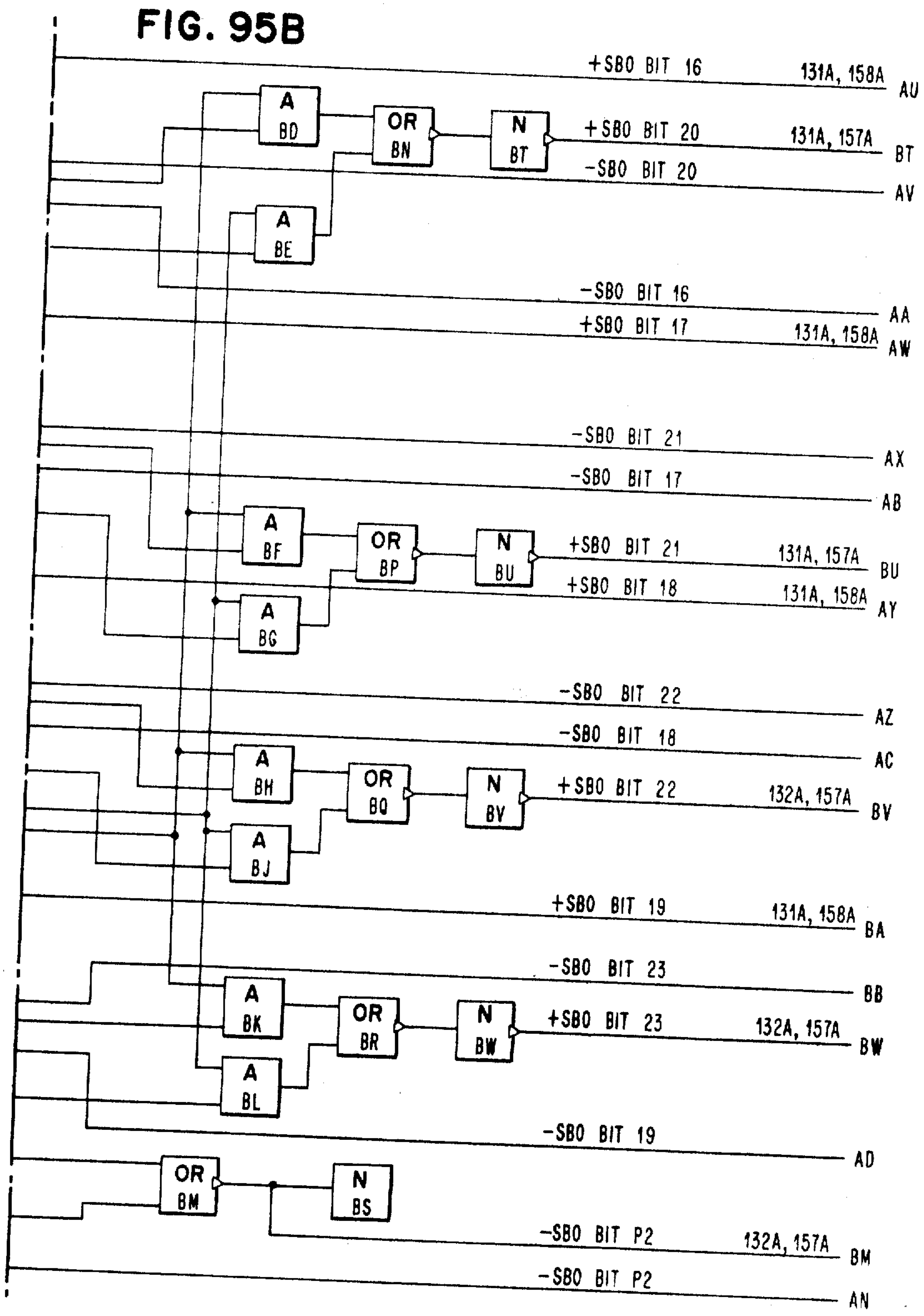
Figure 96A:
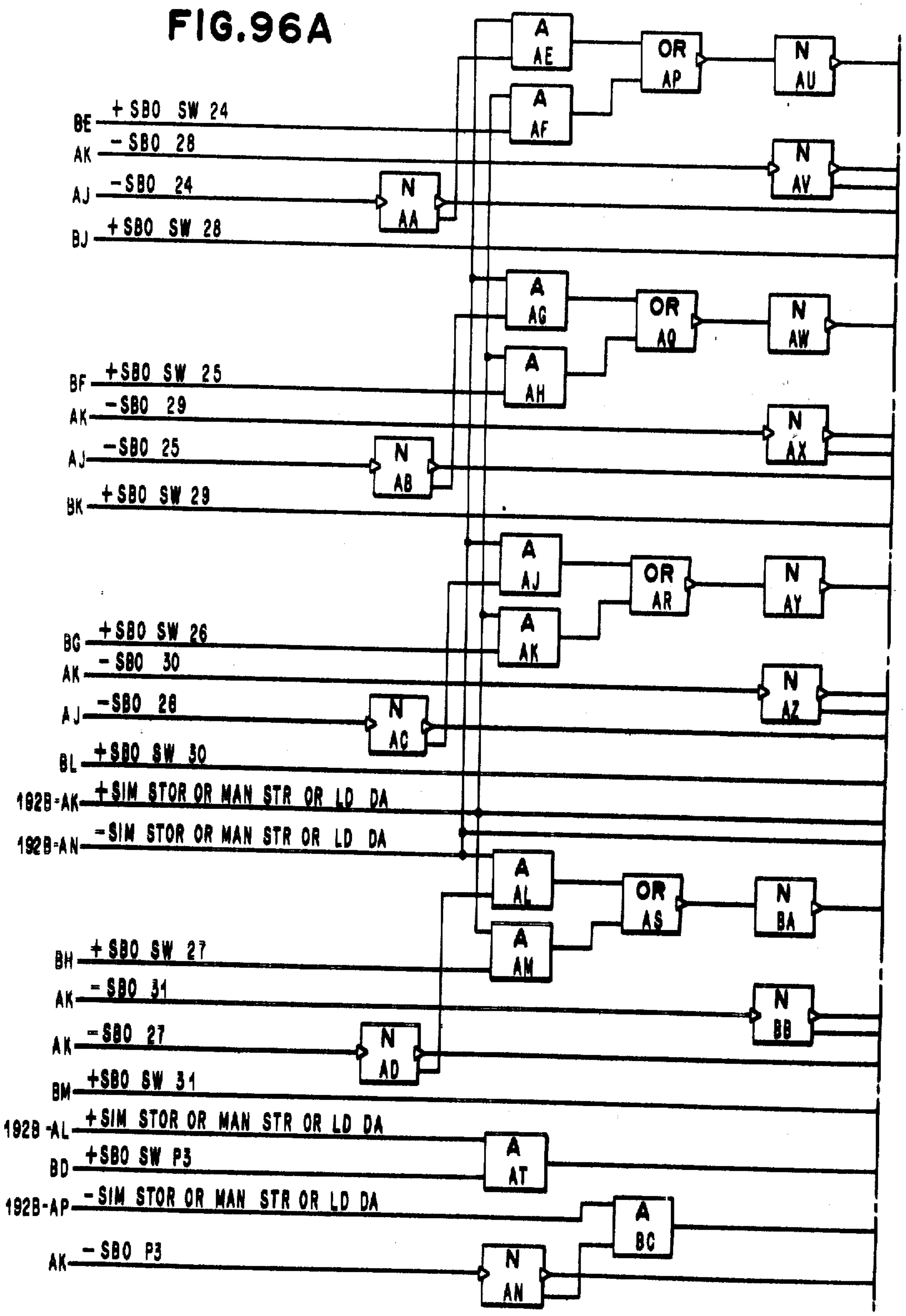
Figure 96B:
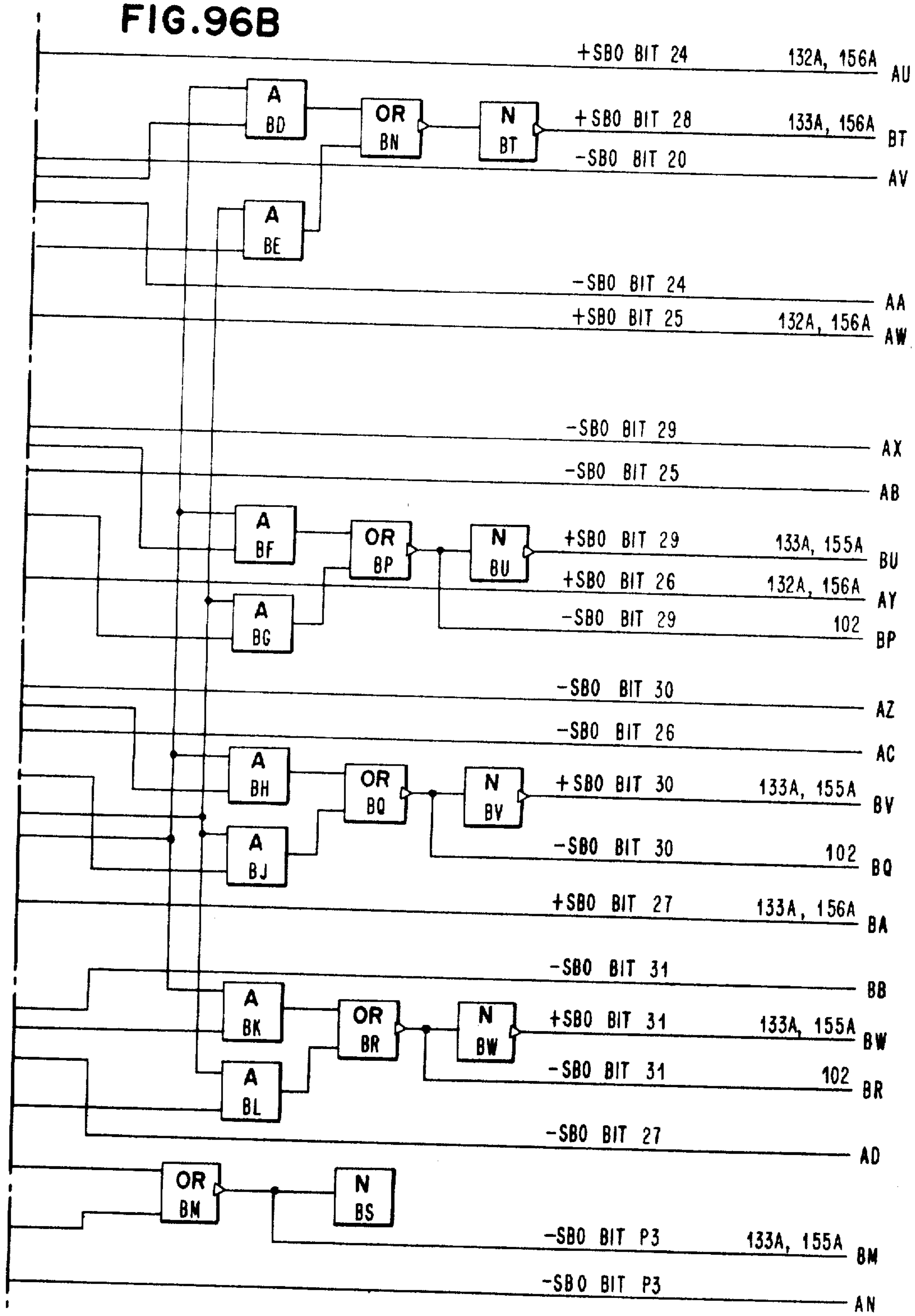
Figure 97A:
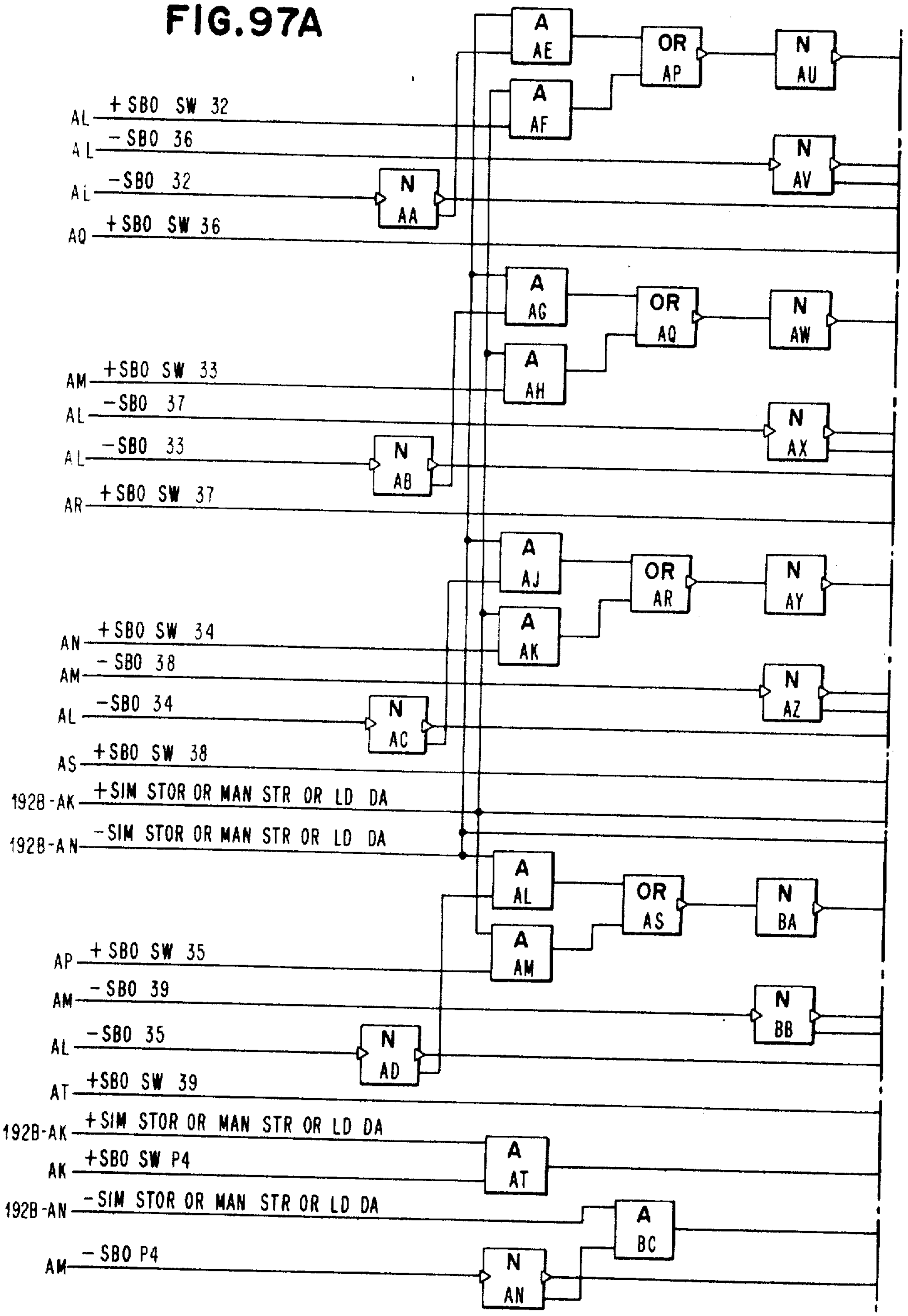
Figure 97B:
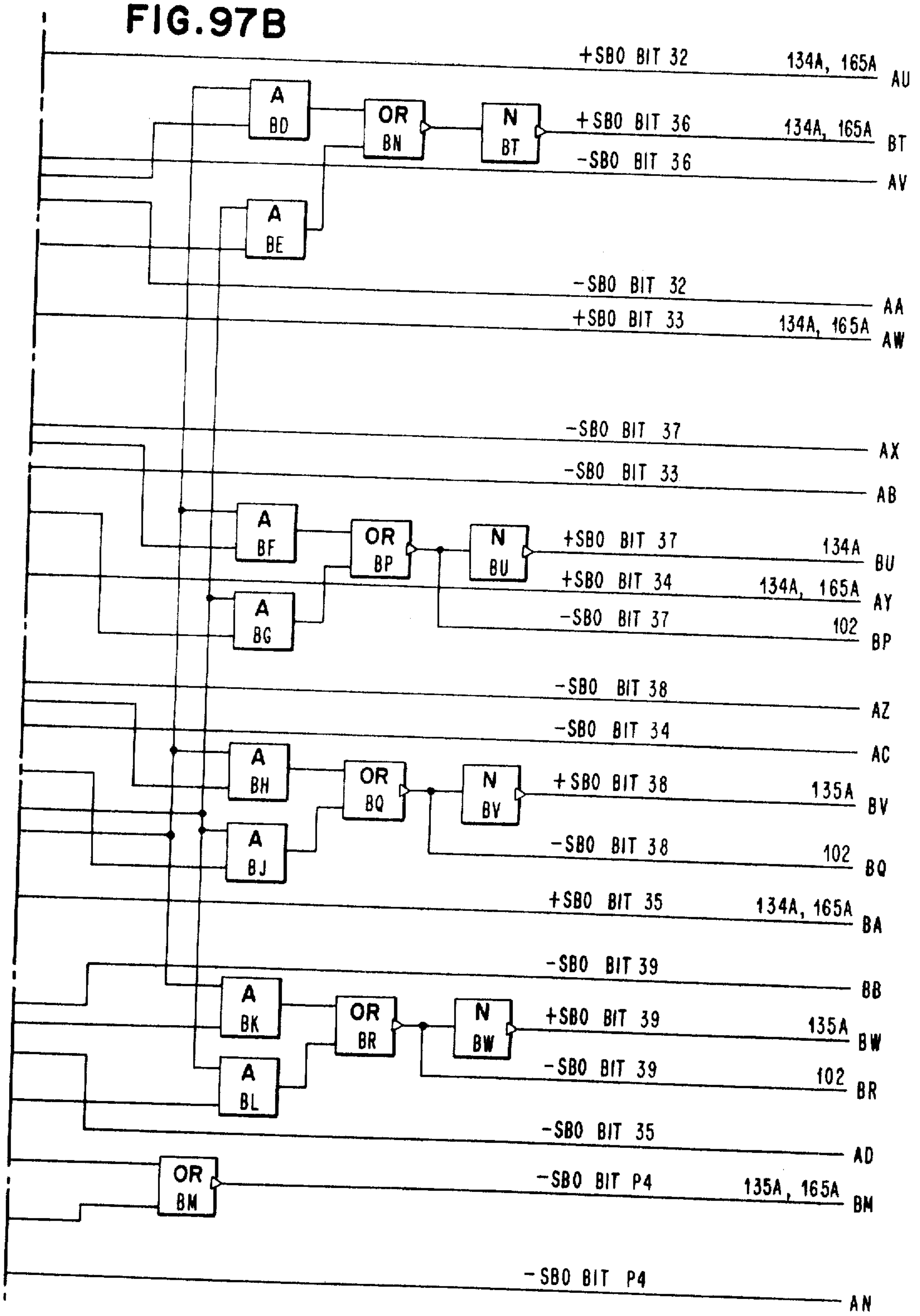
Figure 98A:
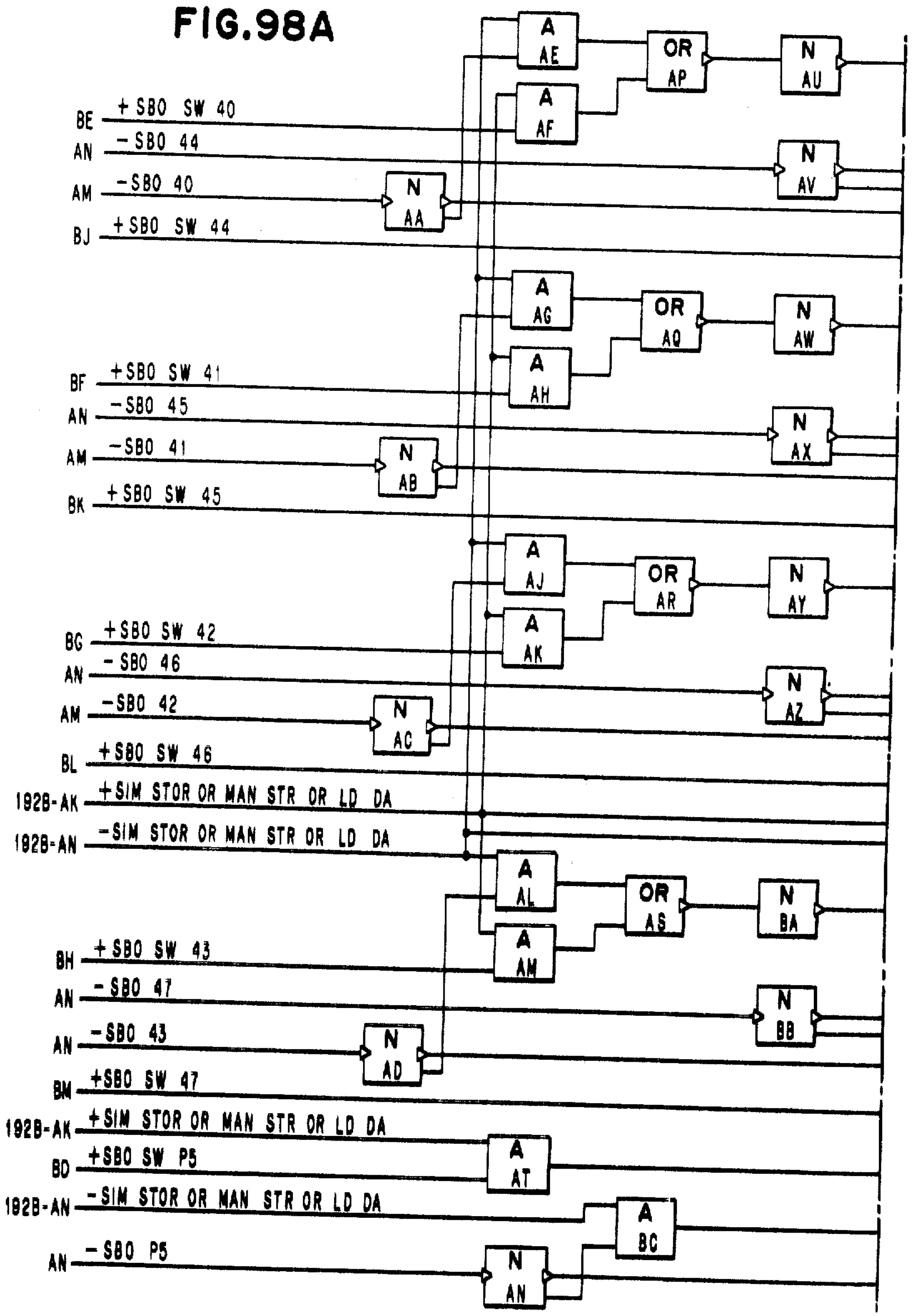
Figure 98B:
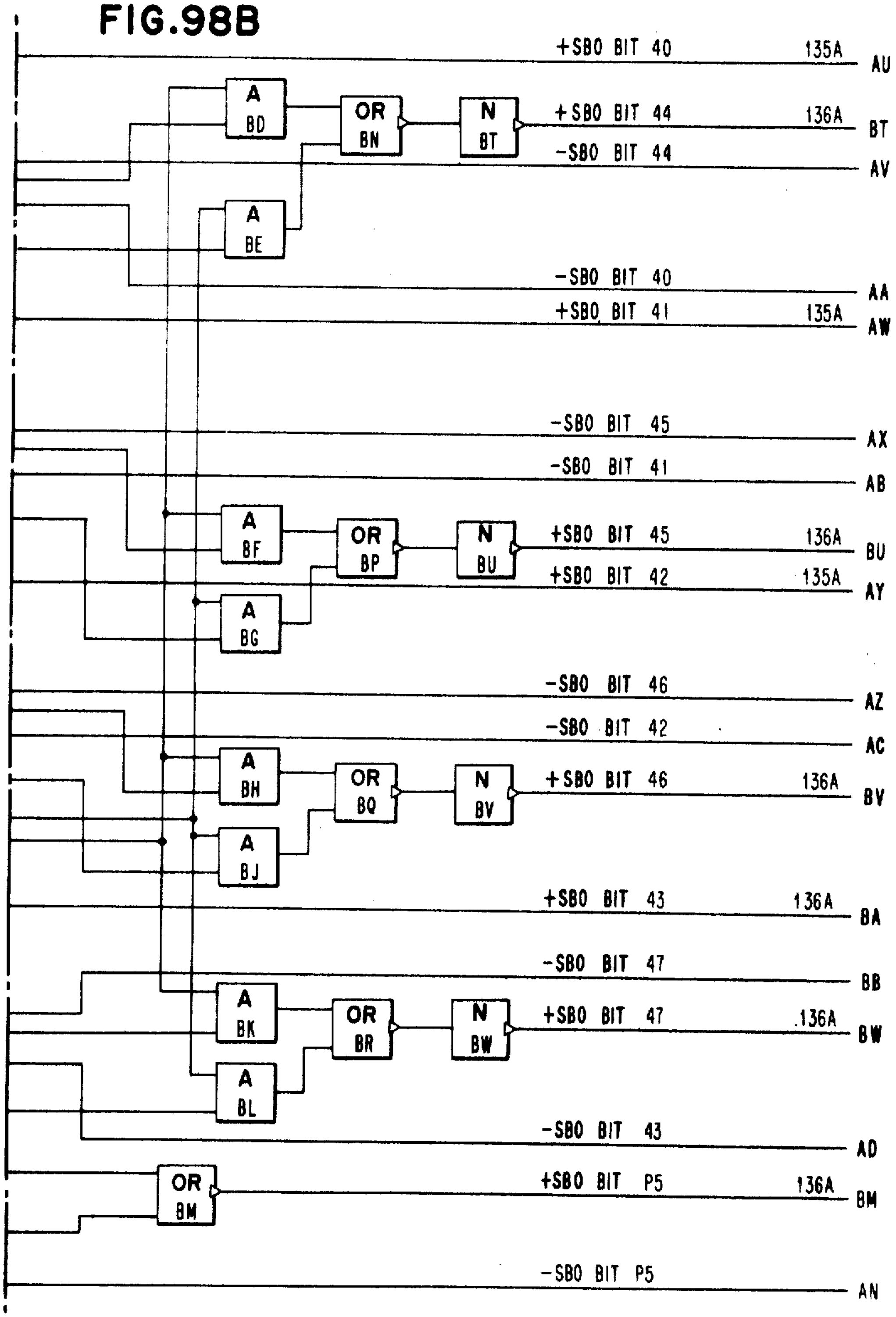
Figure 99A:
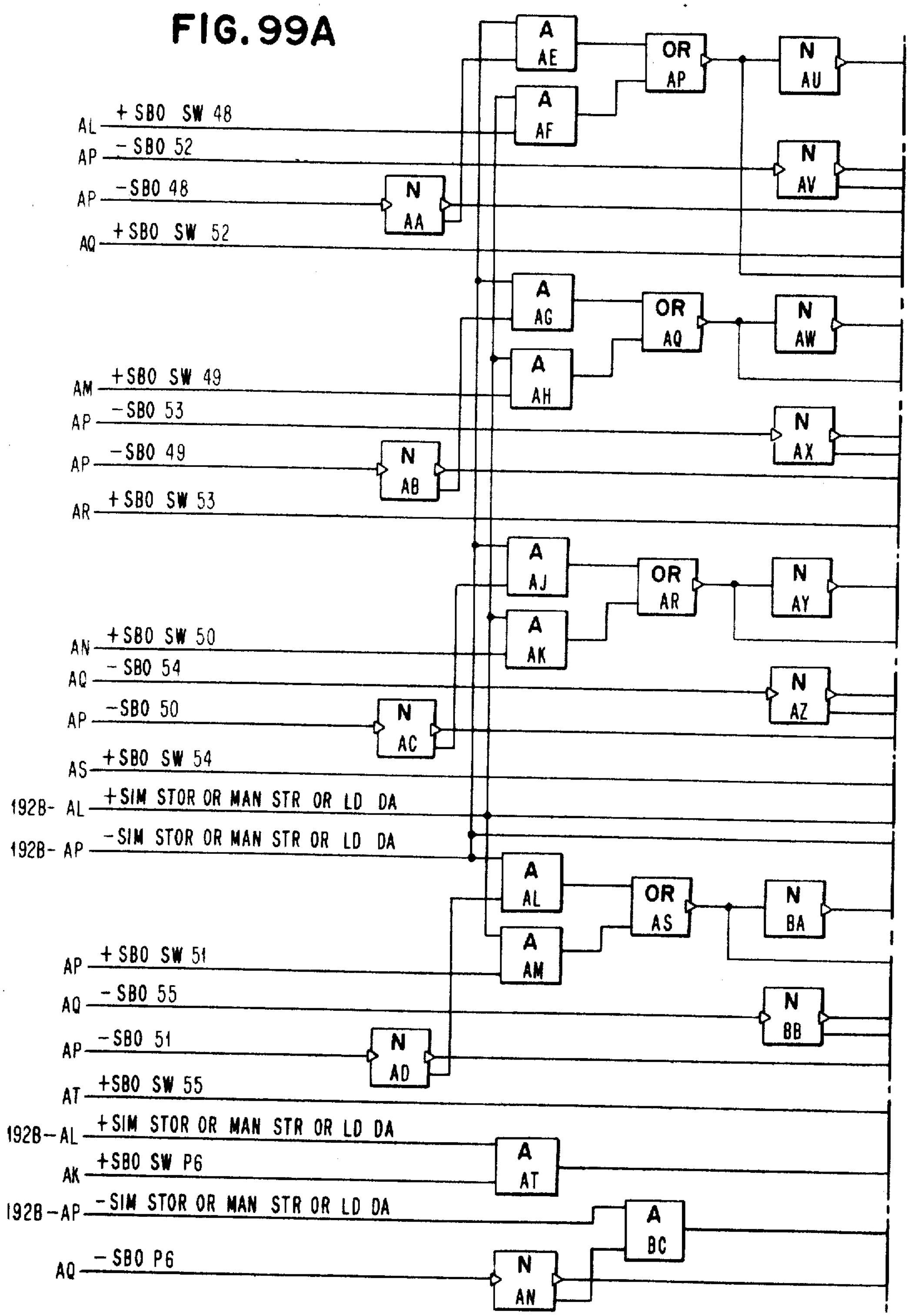
Figure 99B:
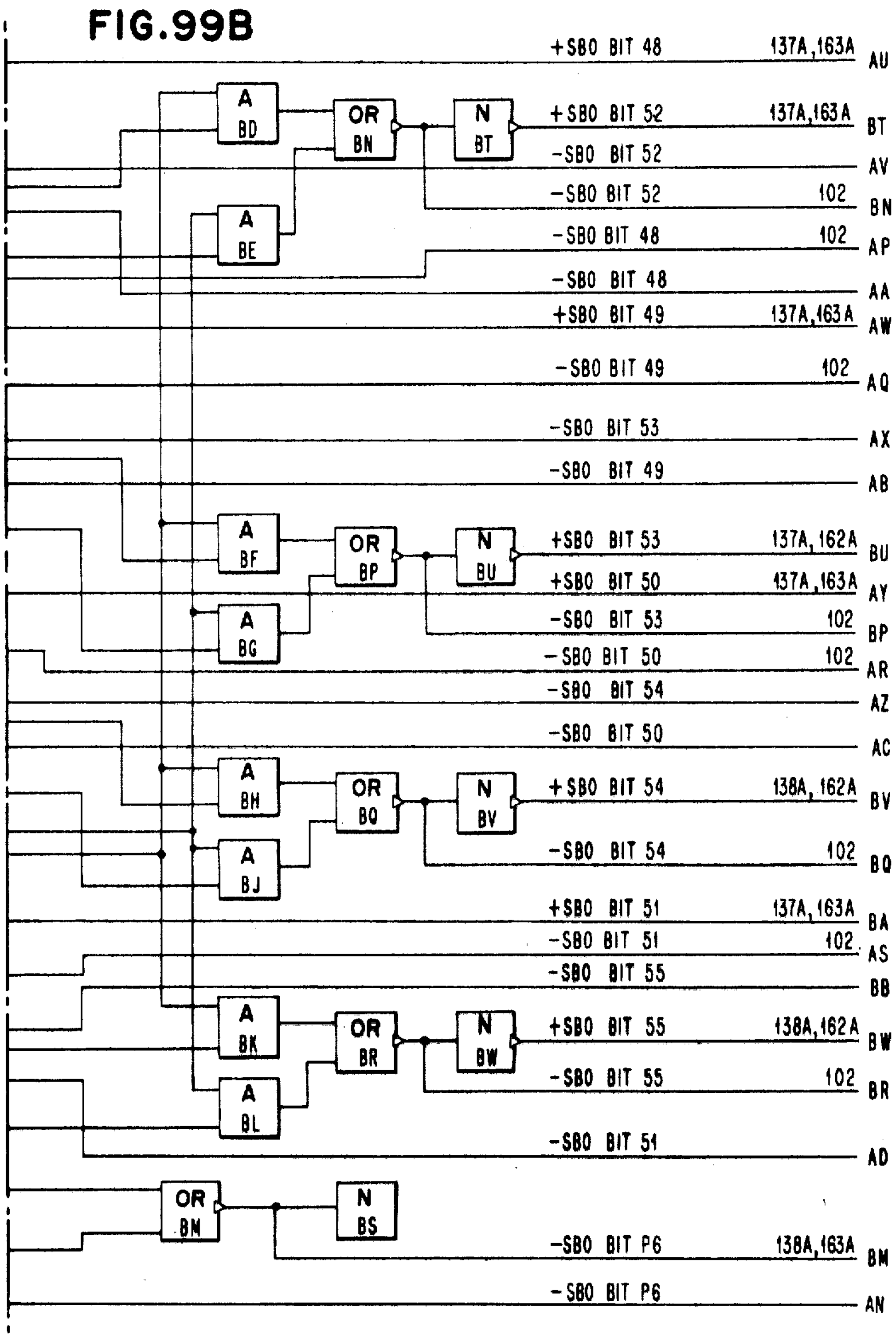
Figure 100:
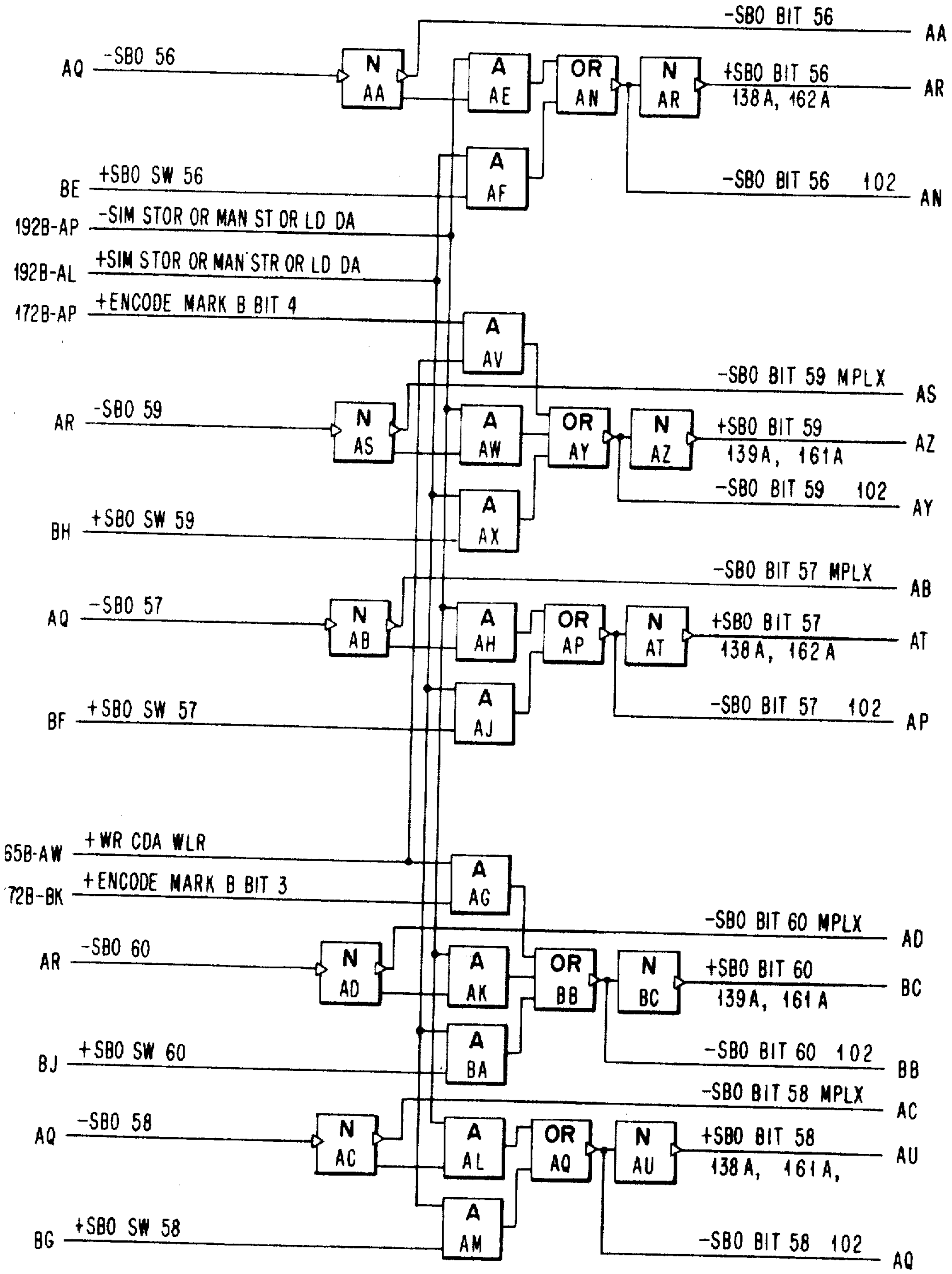
Figure 101:
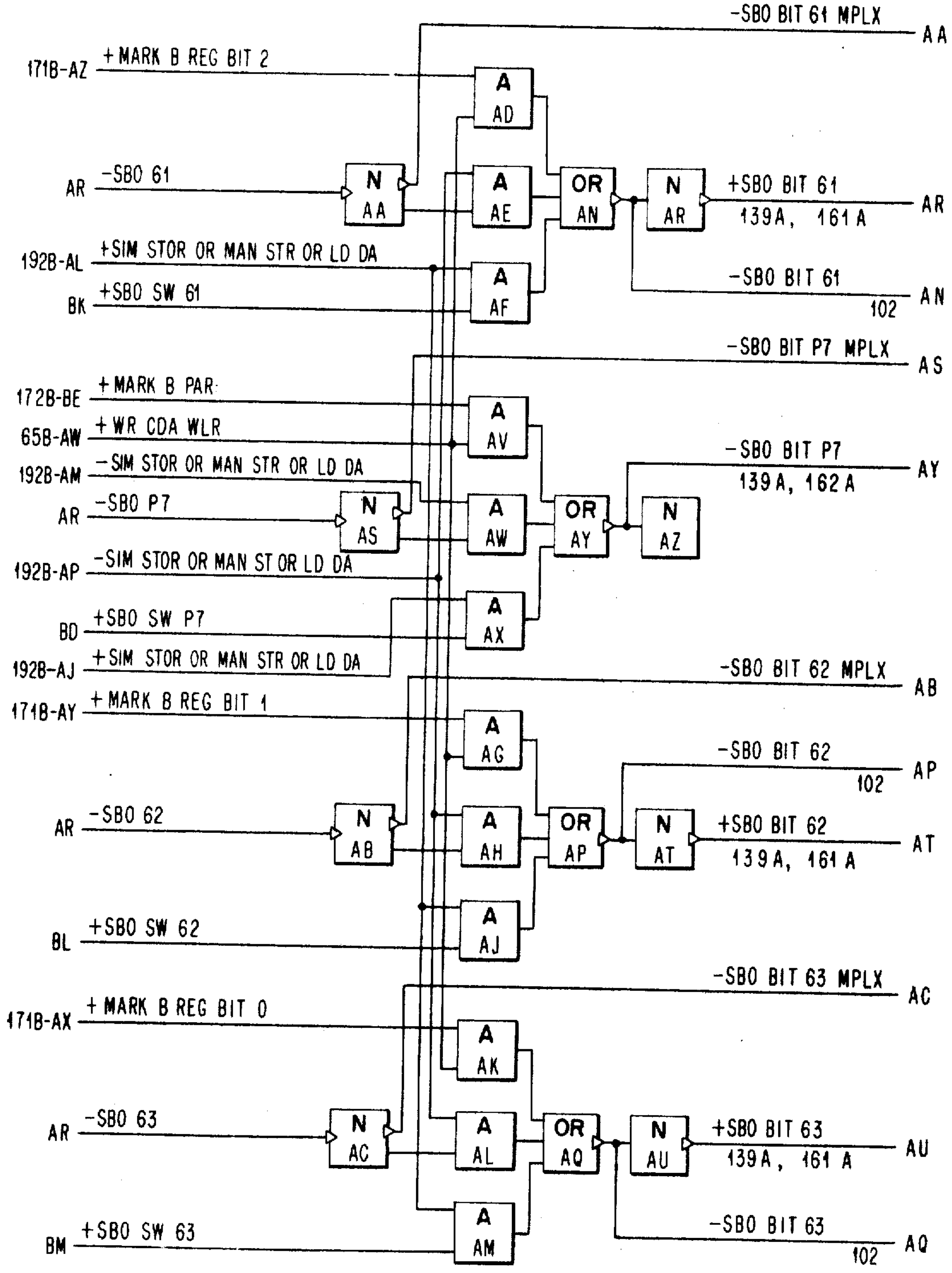
Figure 102:
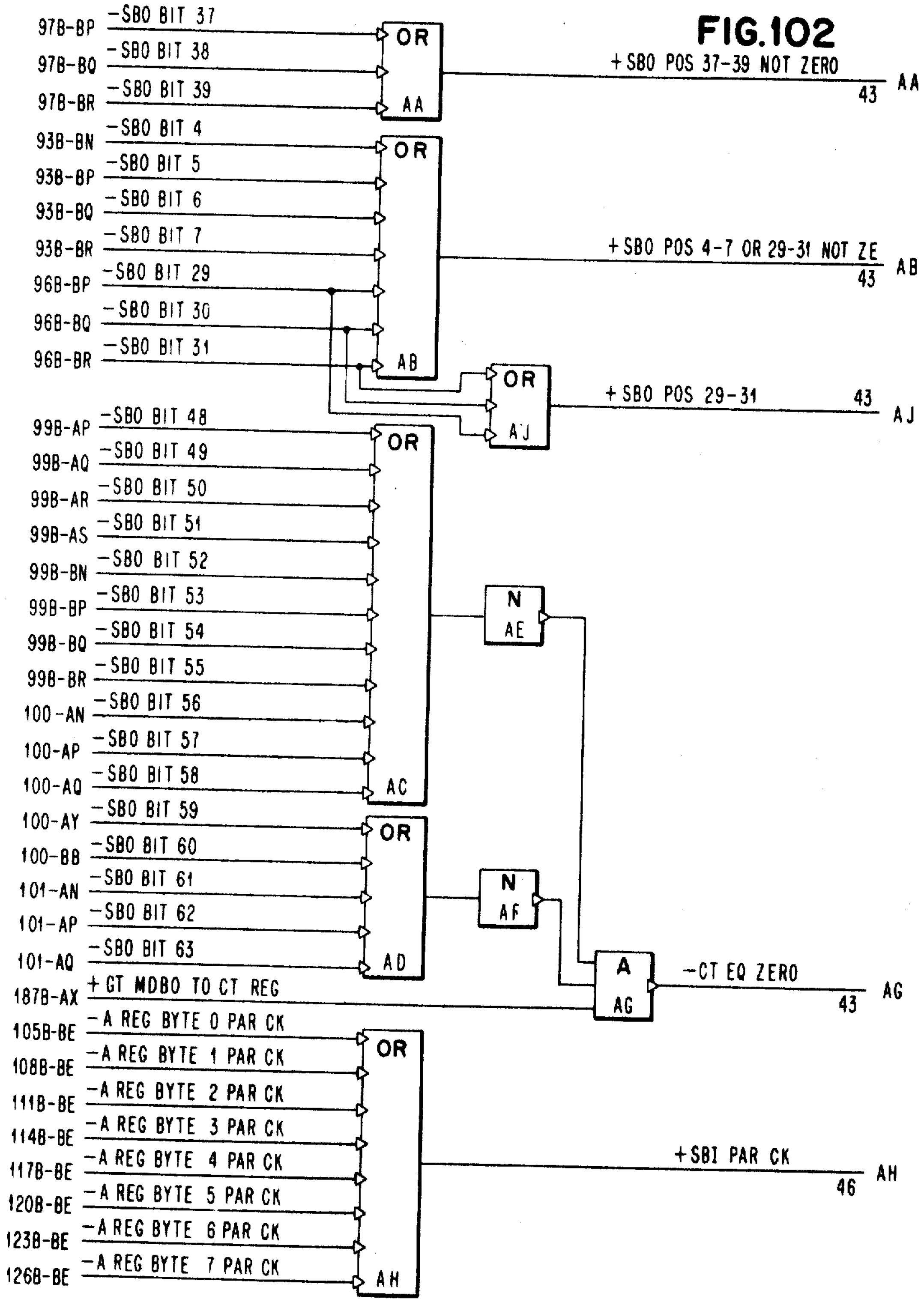
Figure 103A:
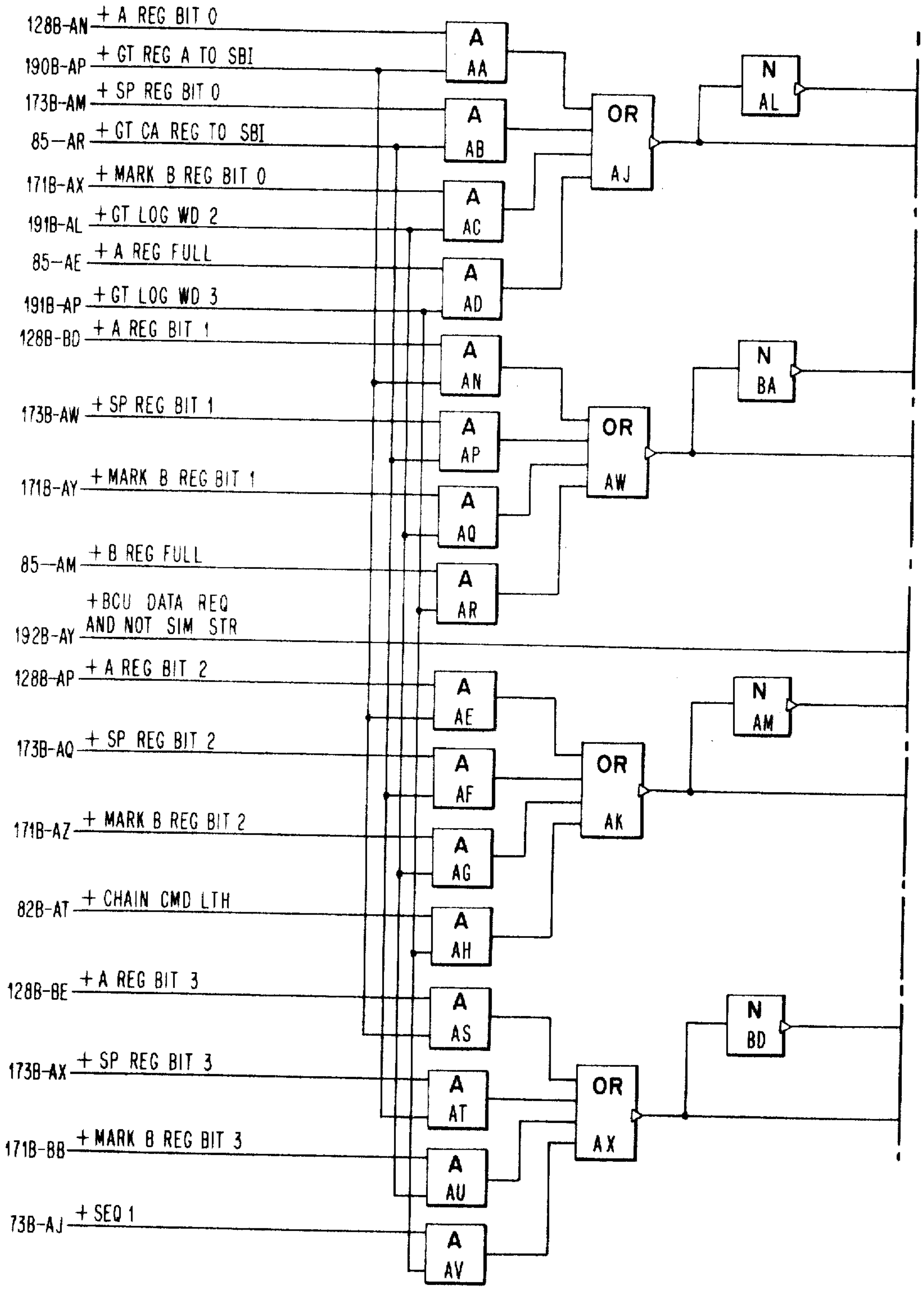
Figure 103B:
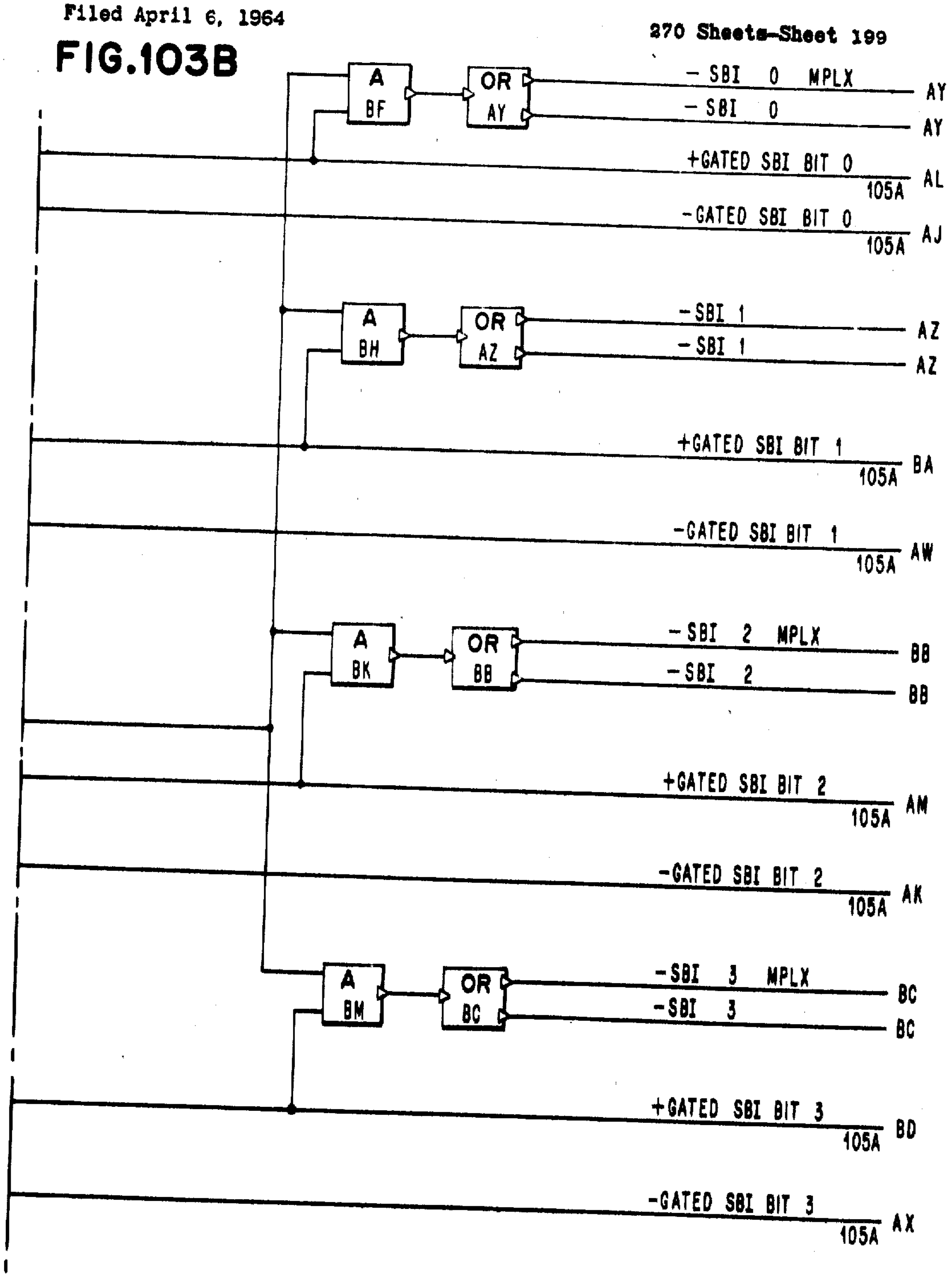
Figure 104A:
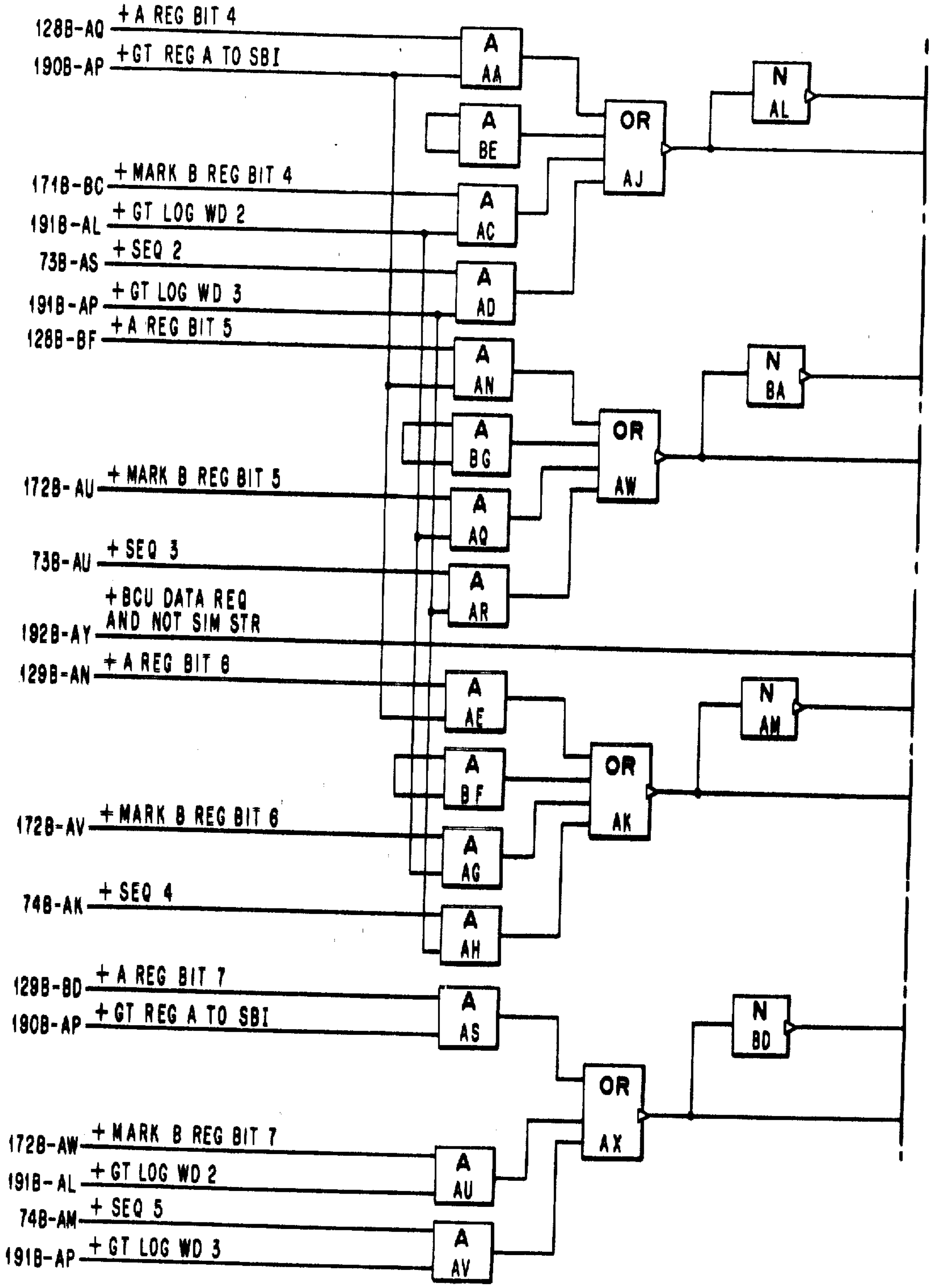
Figure 104B:
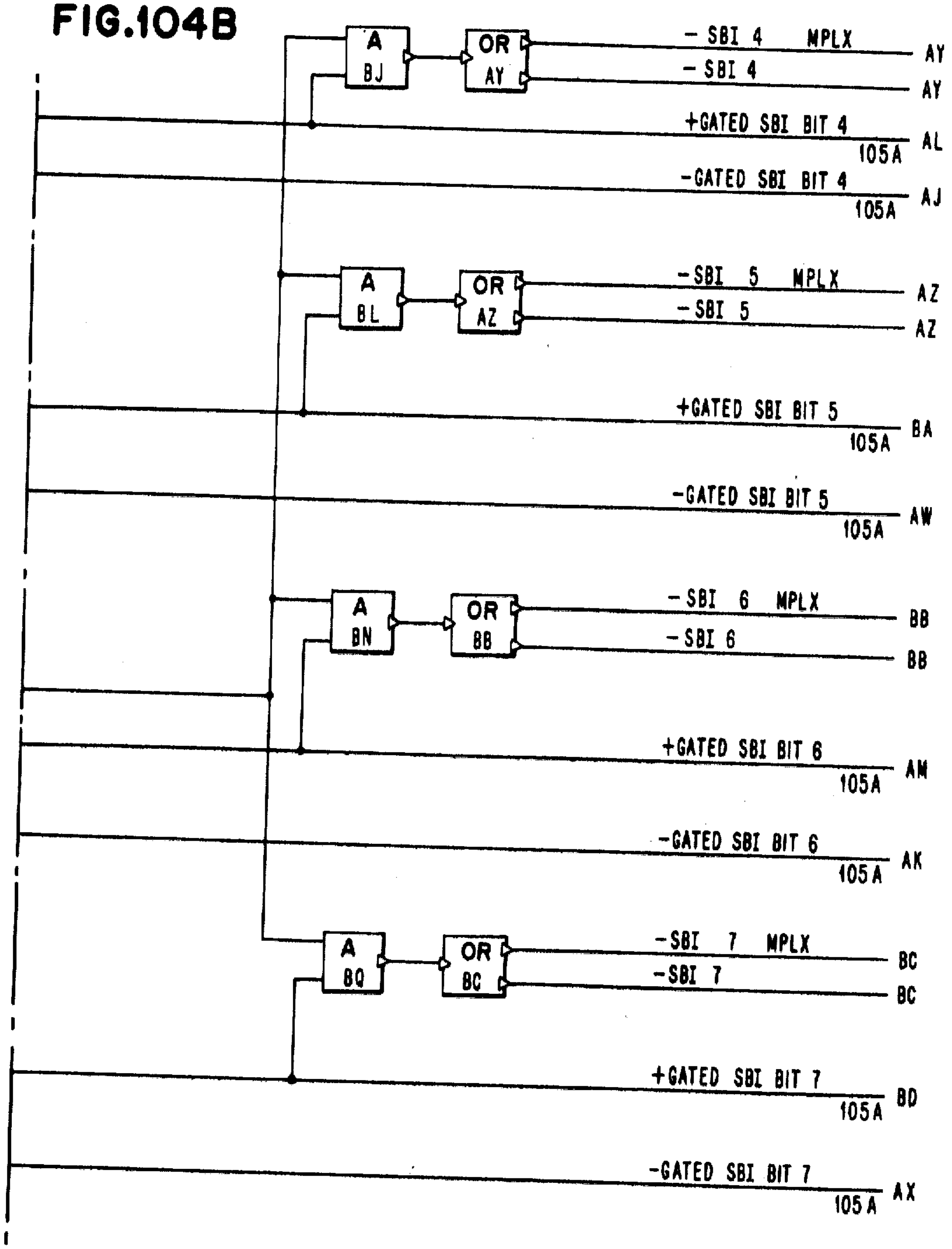
Figure 105A:
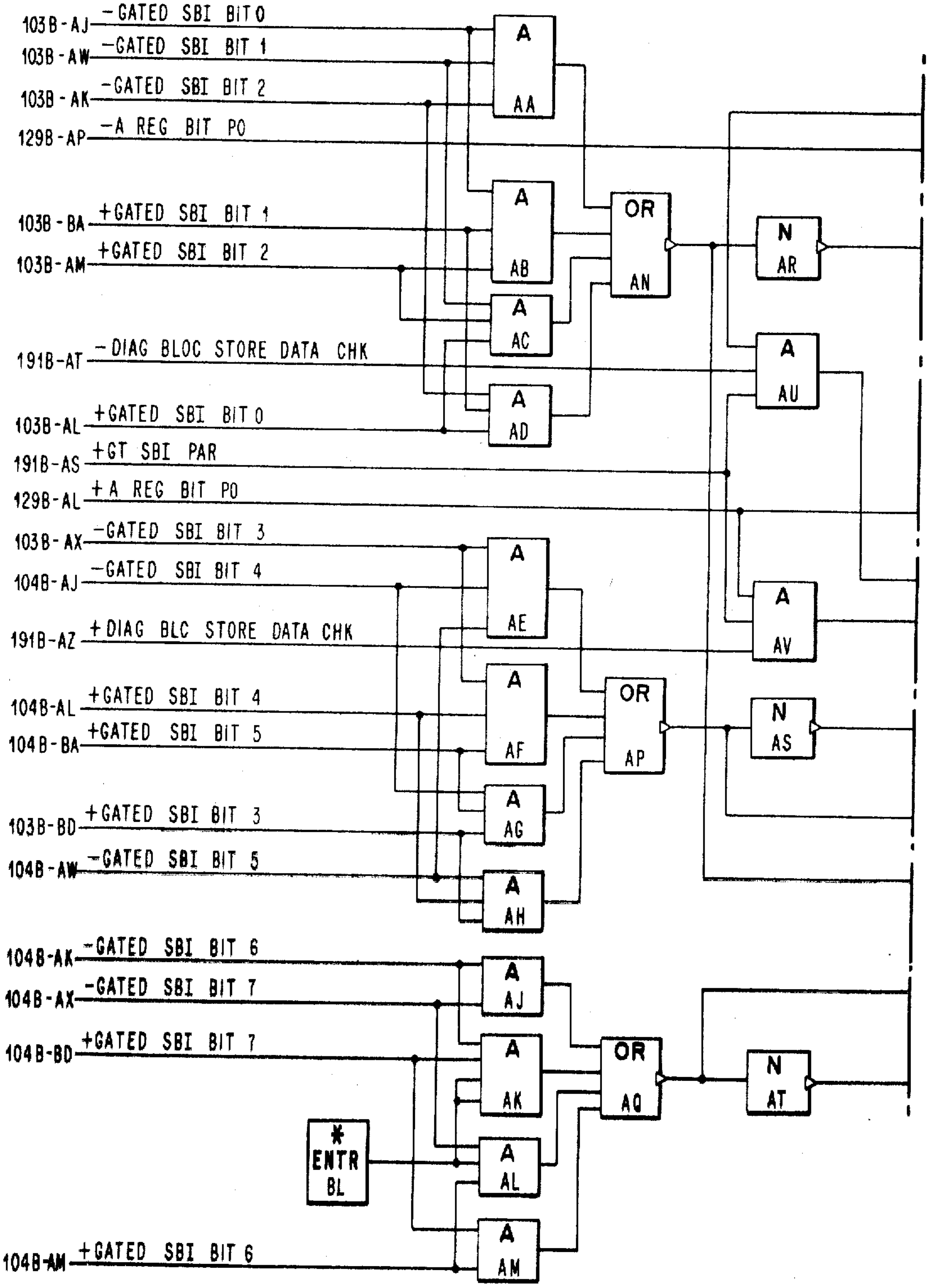
Figure 105B:
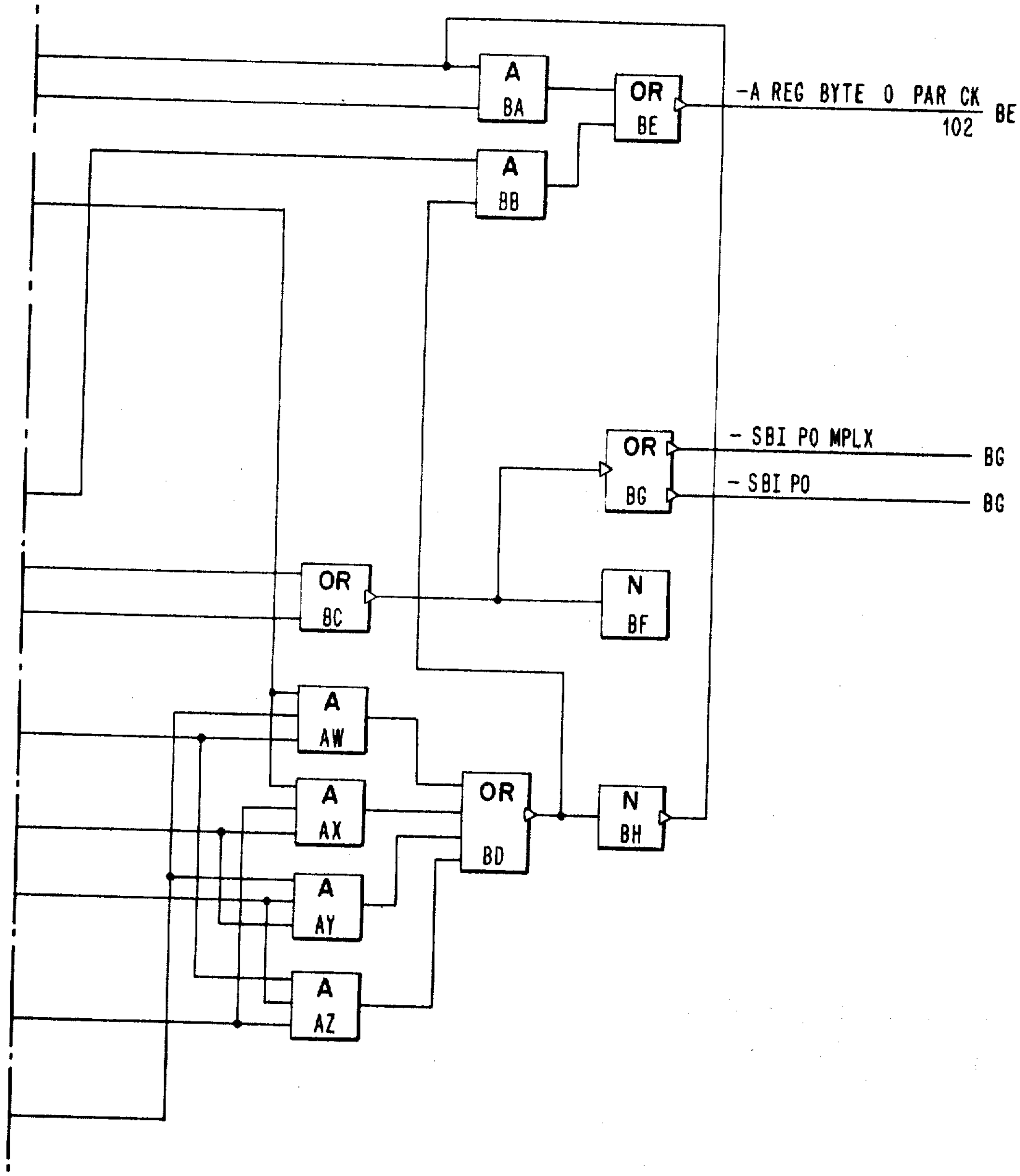
Figure 106A:
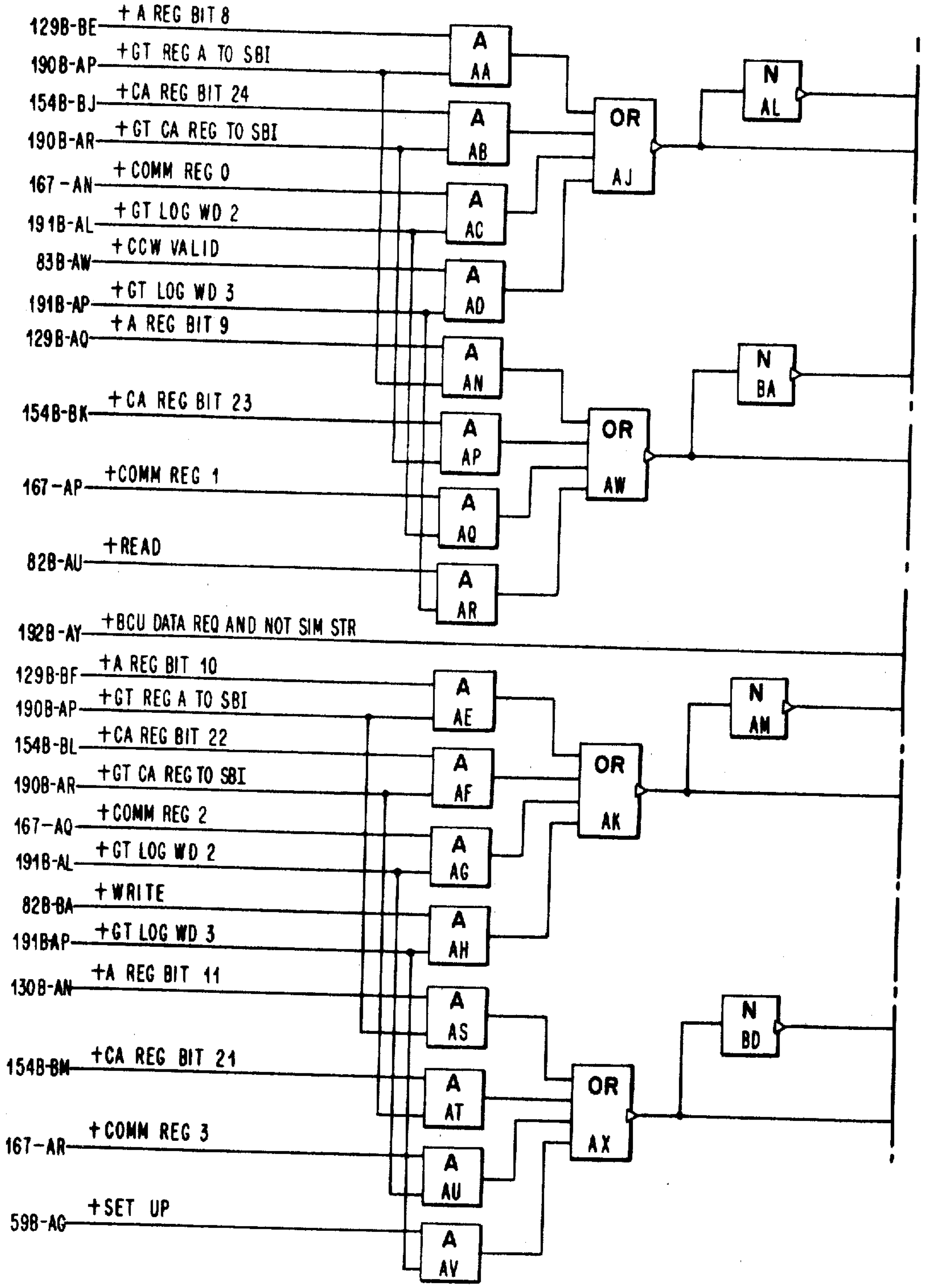
Figure 106B:
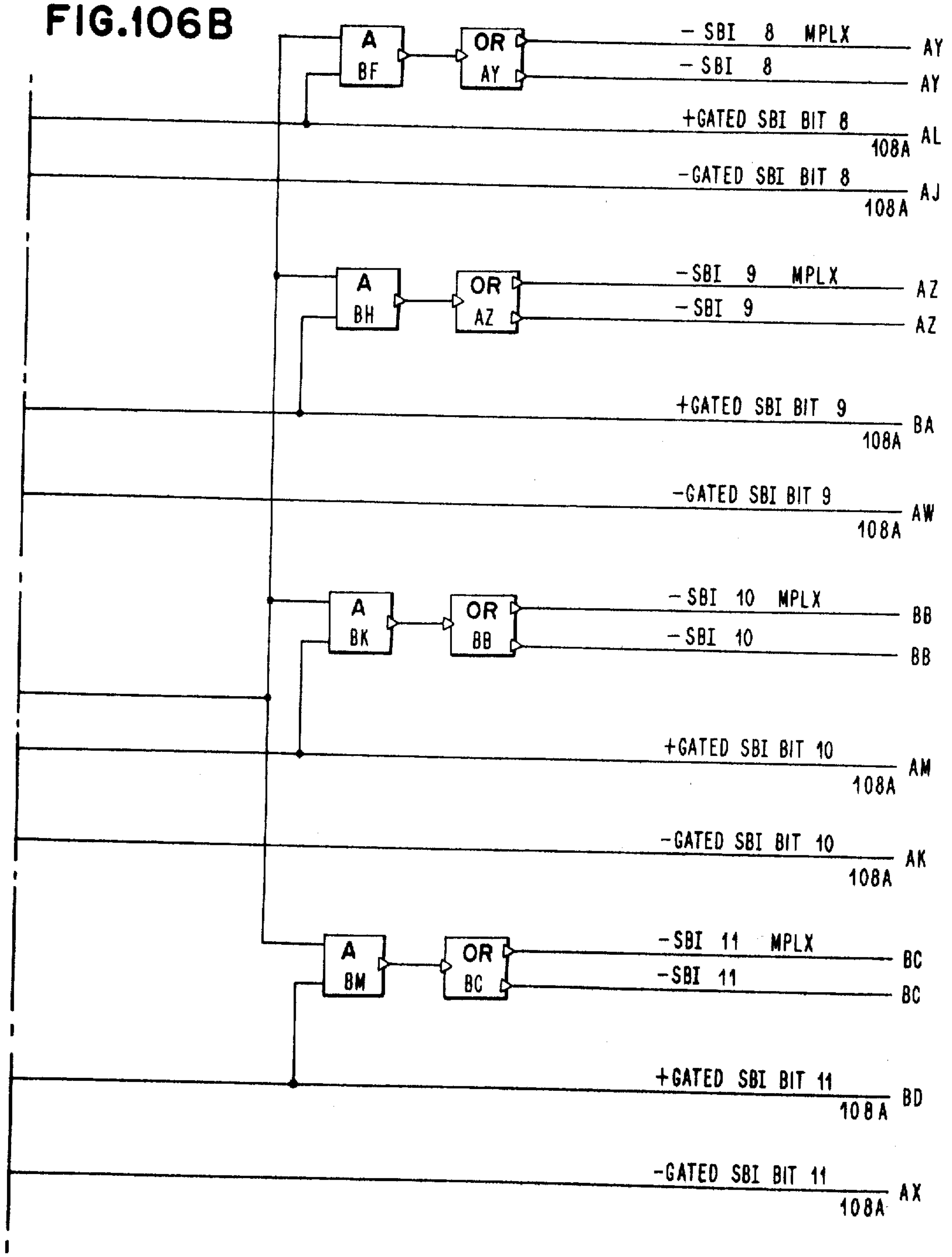
Figure 107A:
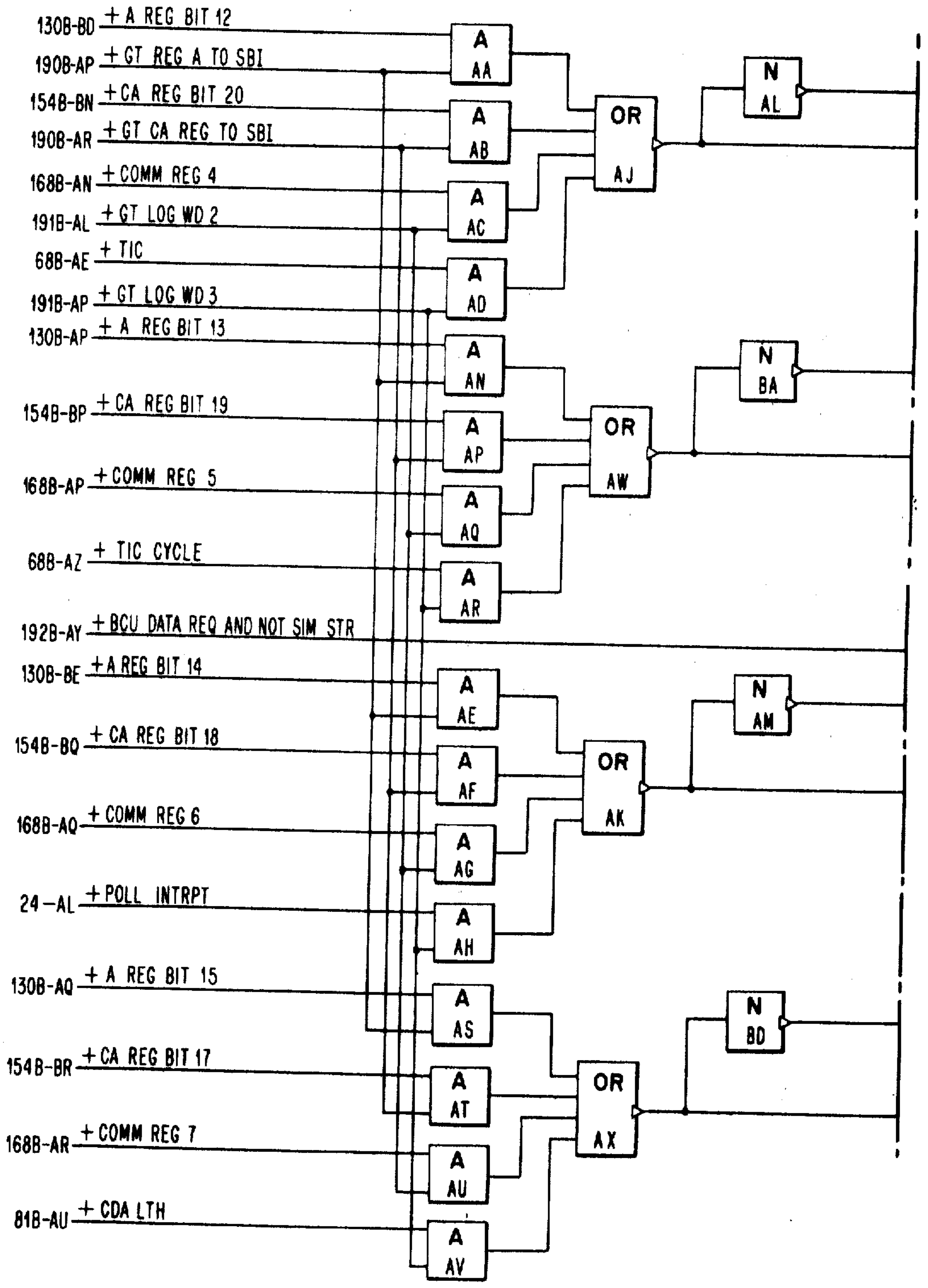
Figure 107B:
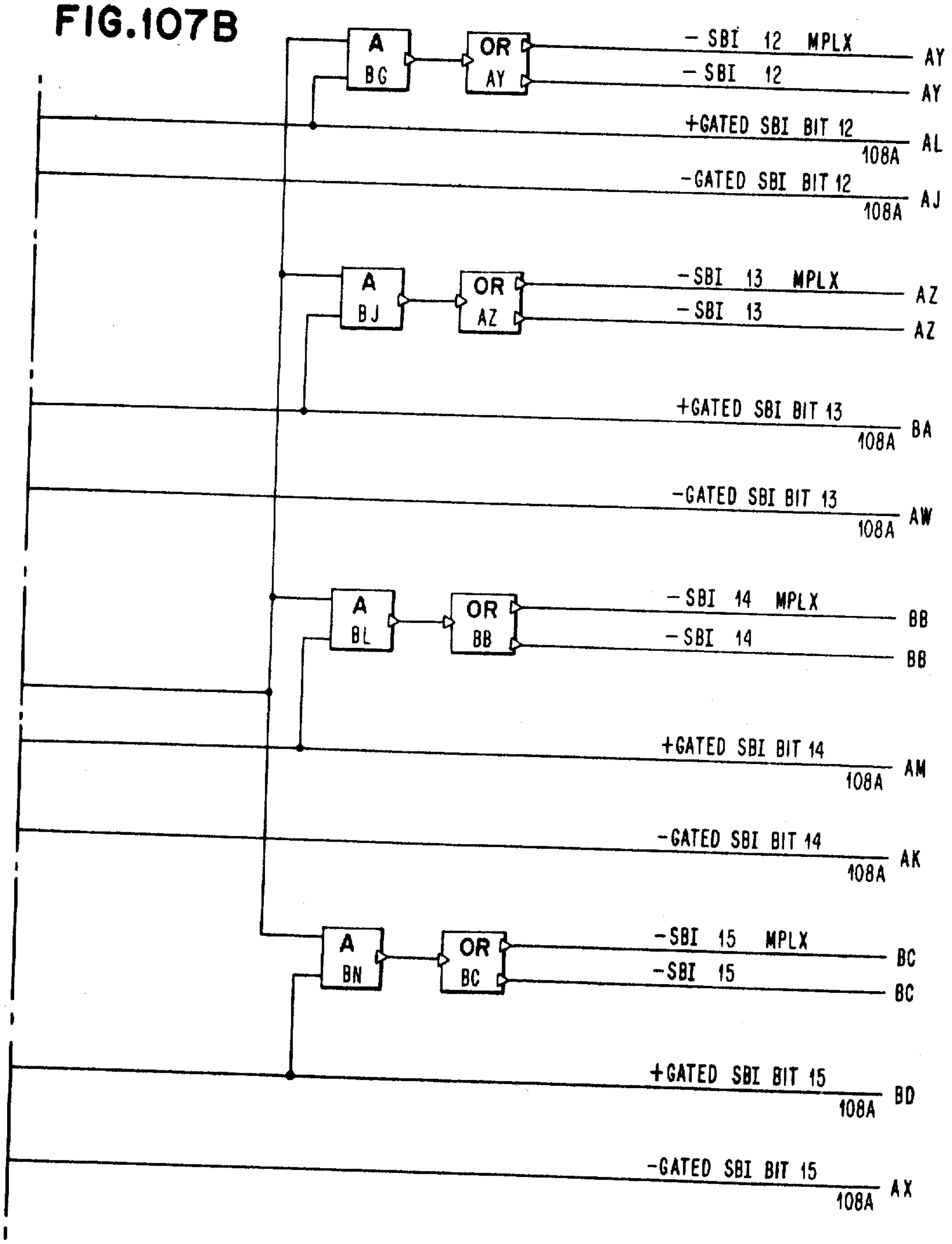
Figure 108A:
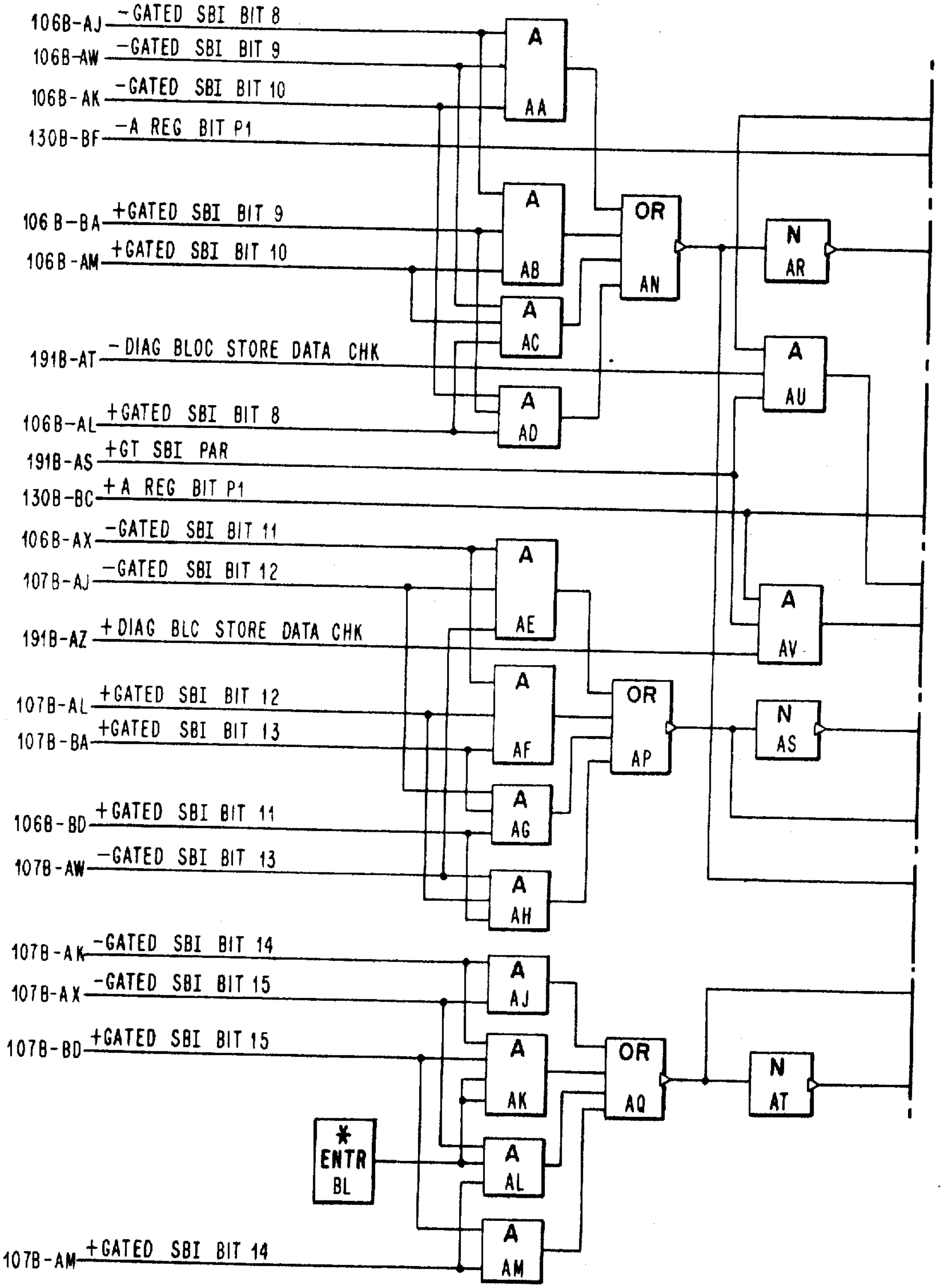
Figure 108B:
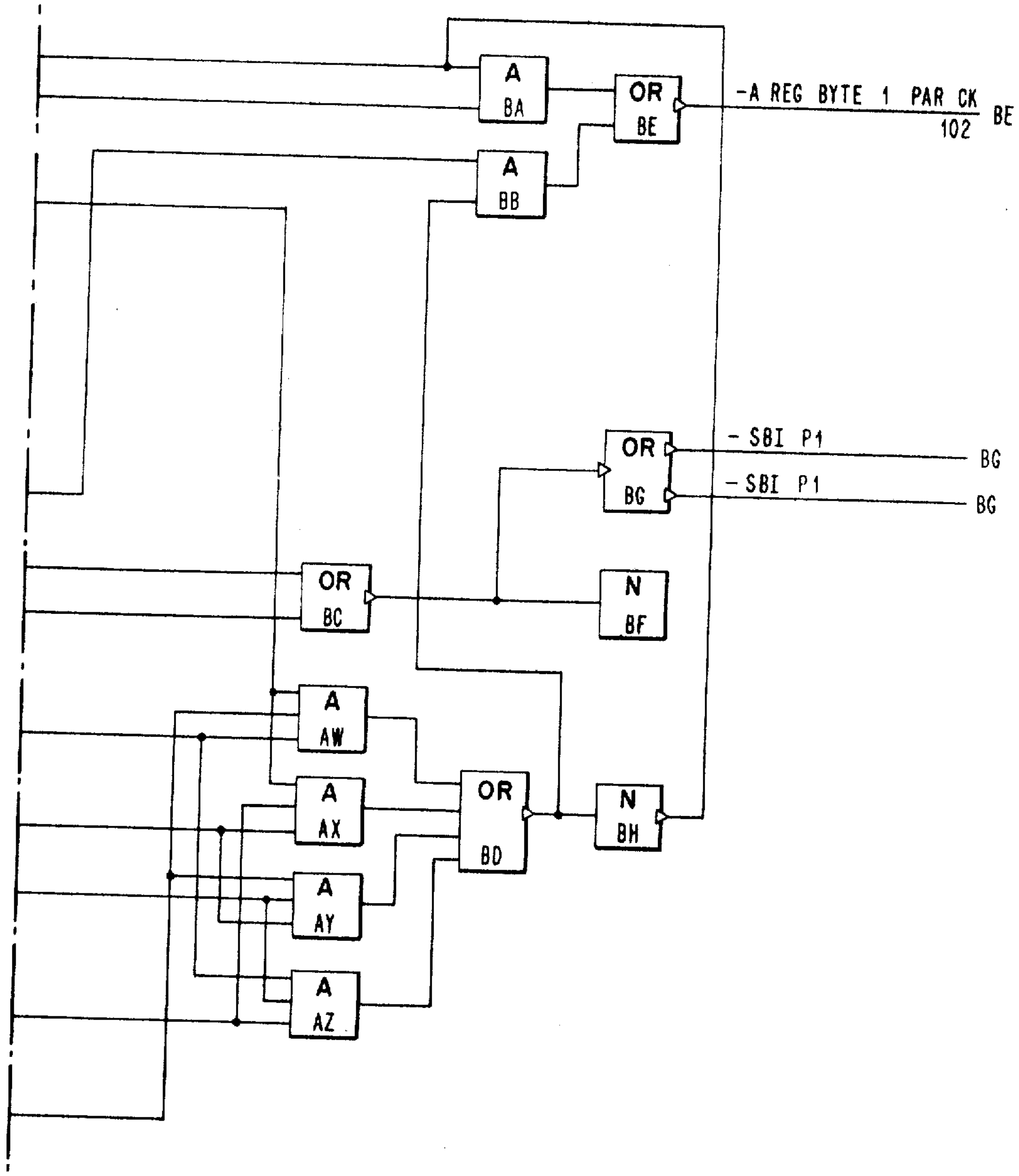
Figure 109A:
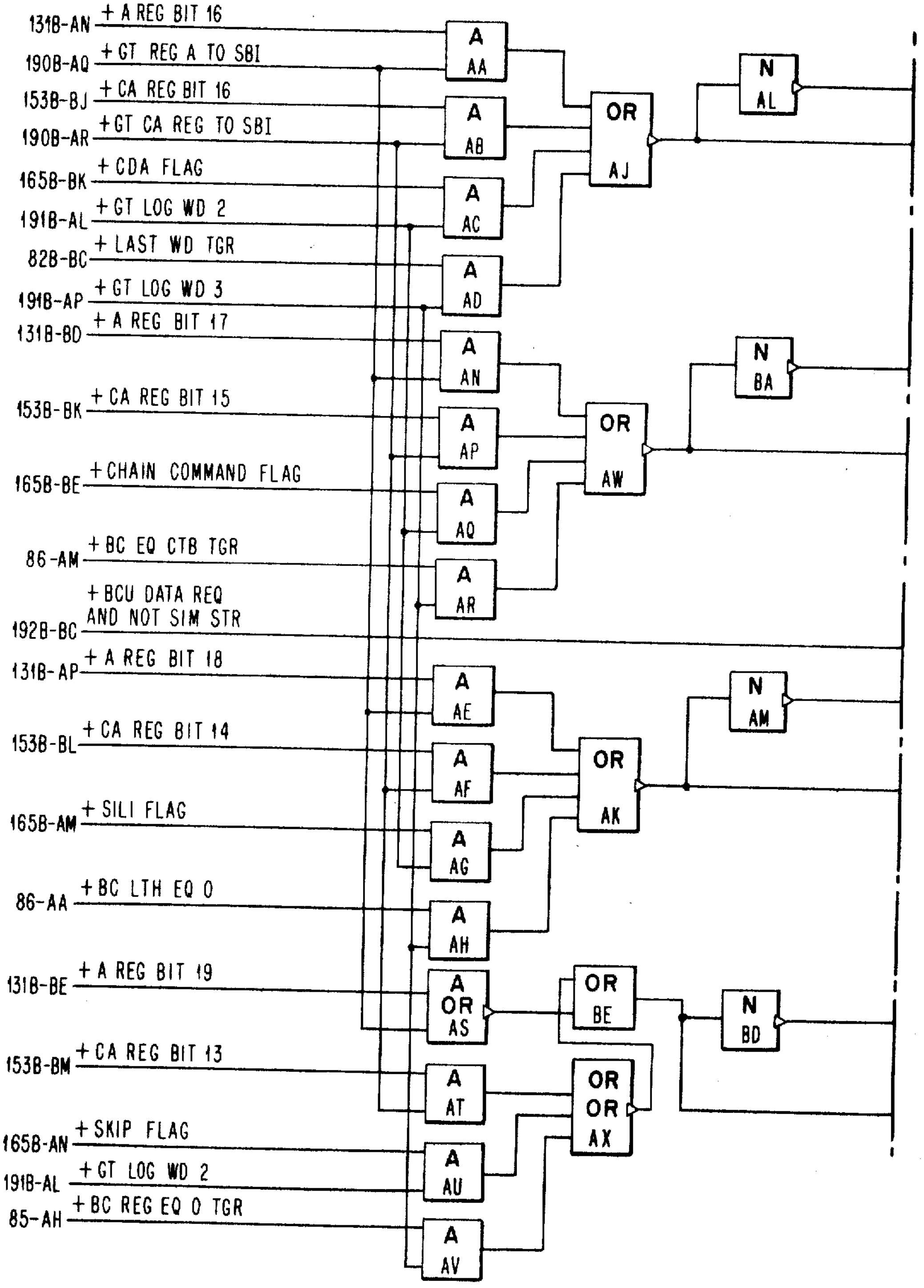
Figure 109B:
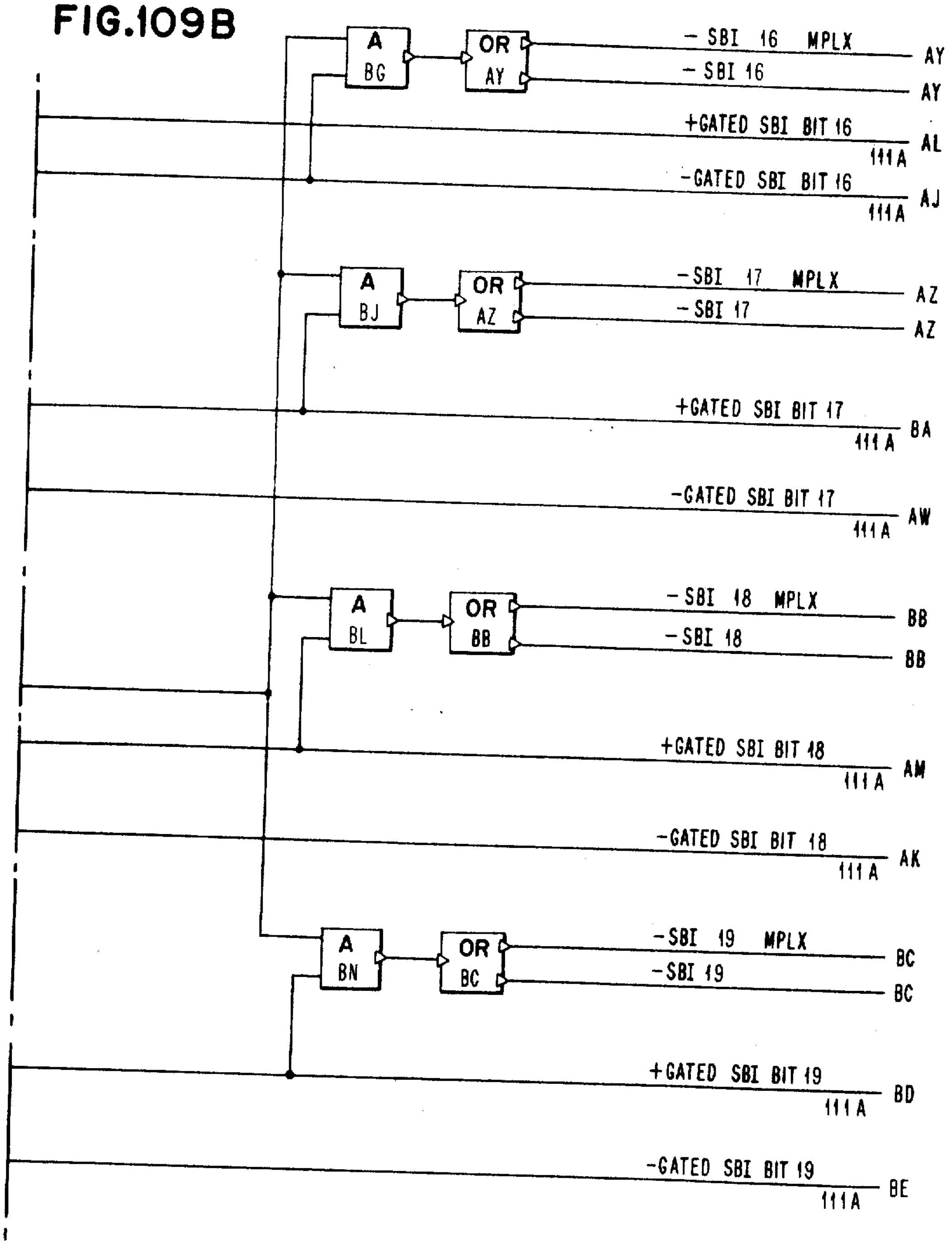
Figure 110A:
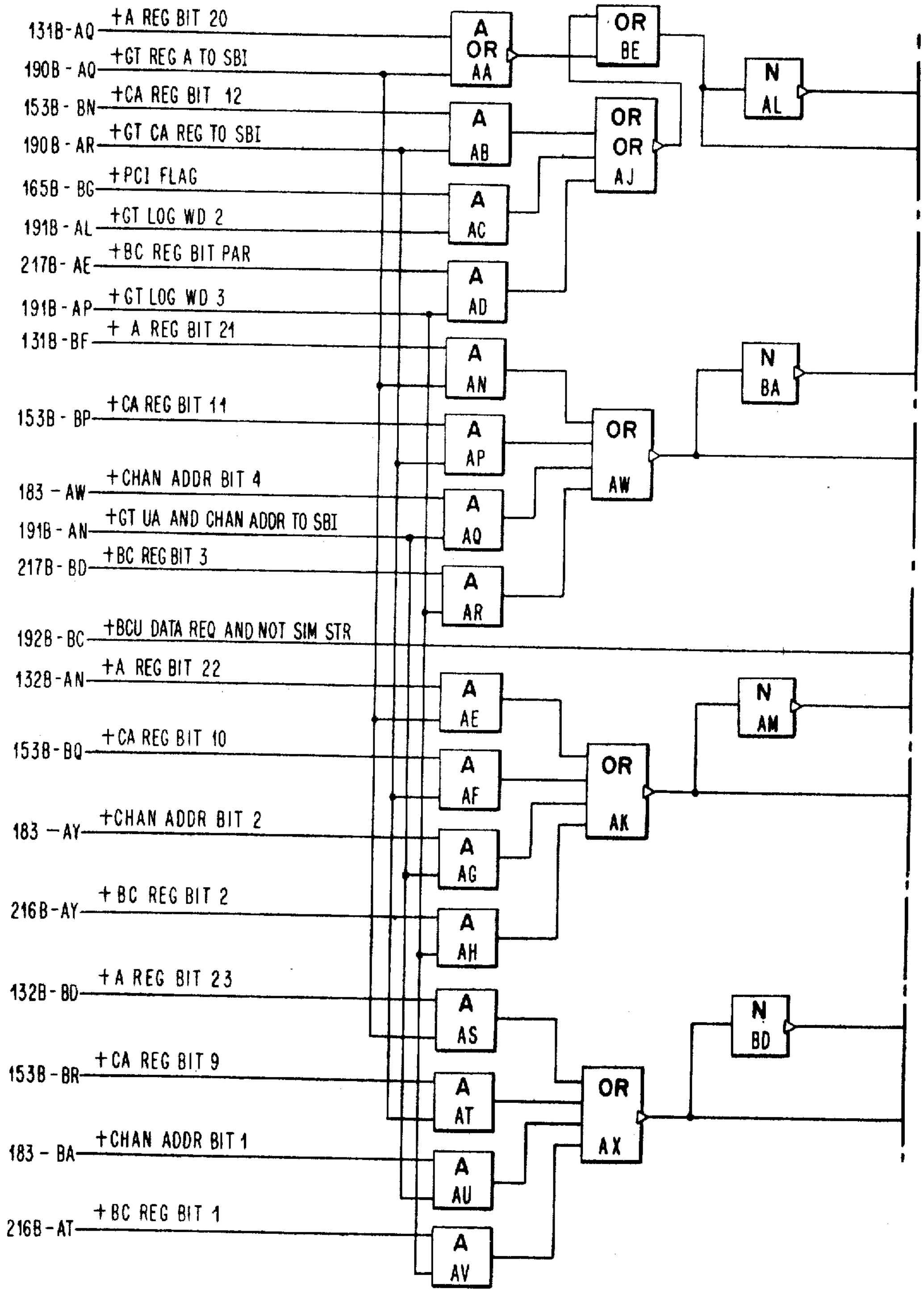
Figure 110B:
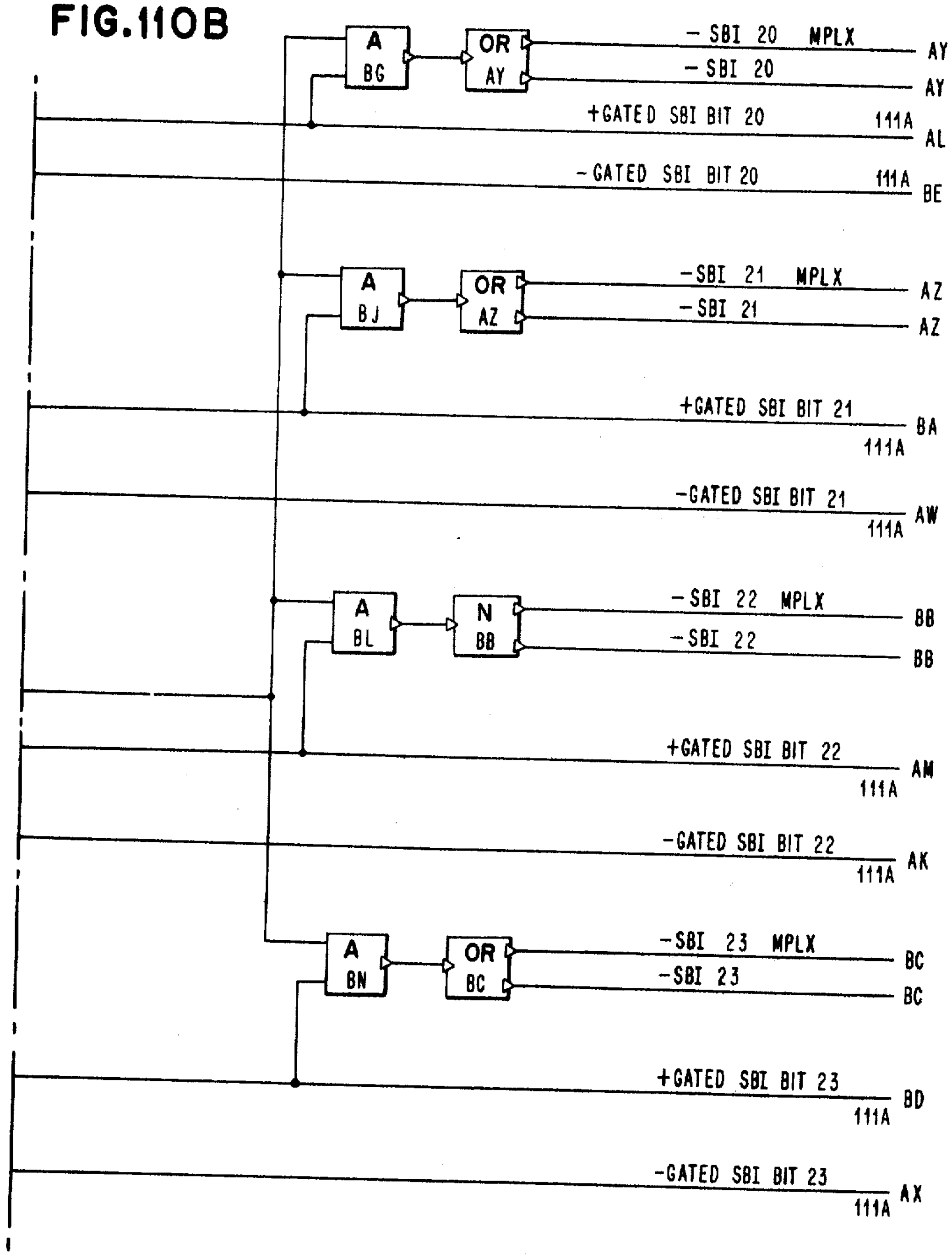
Figure 111A:
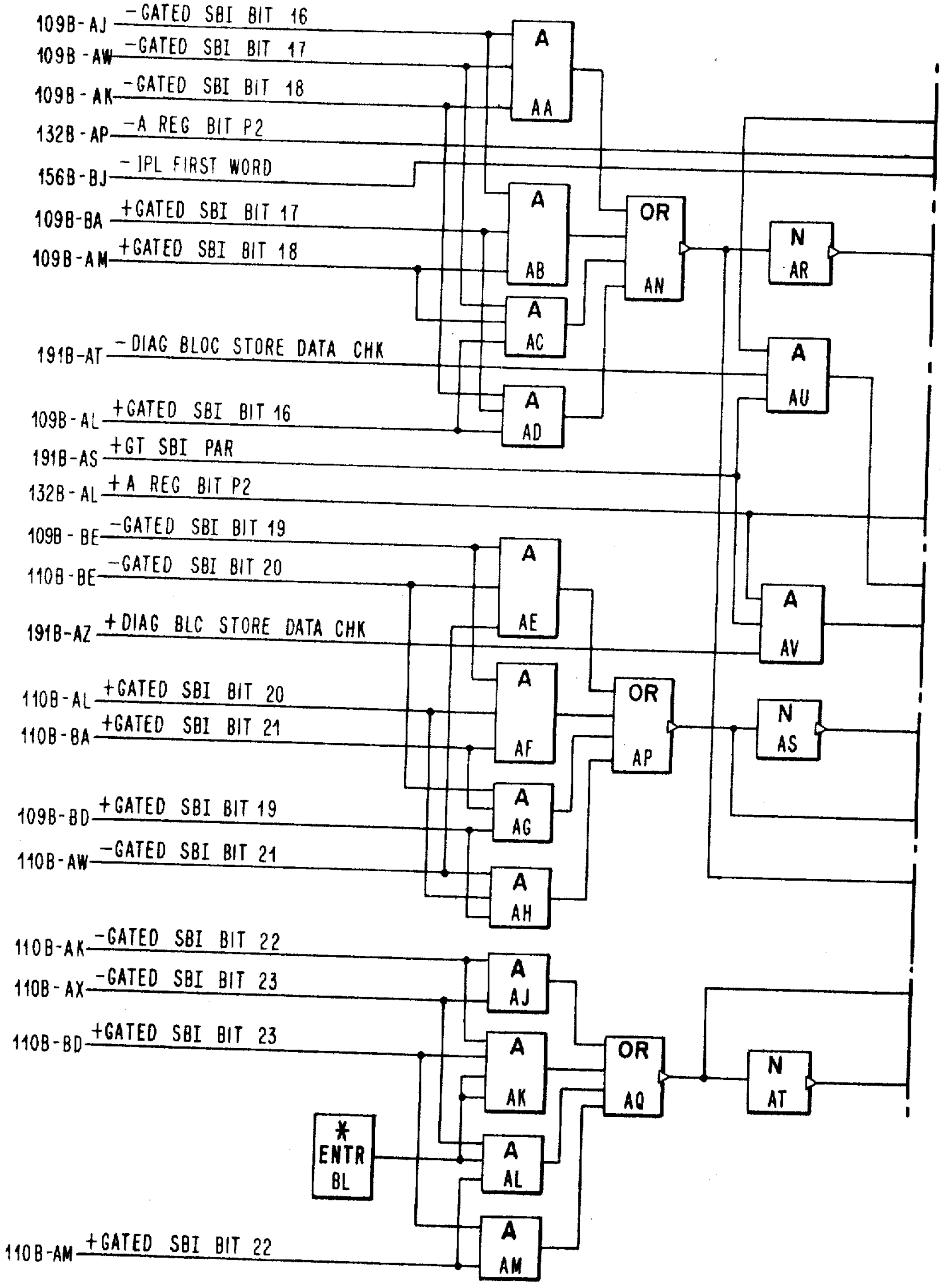
Figure 111B:
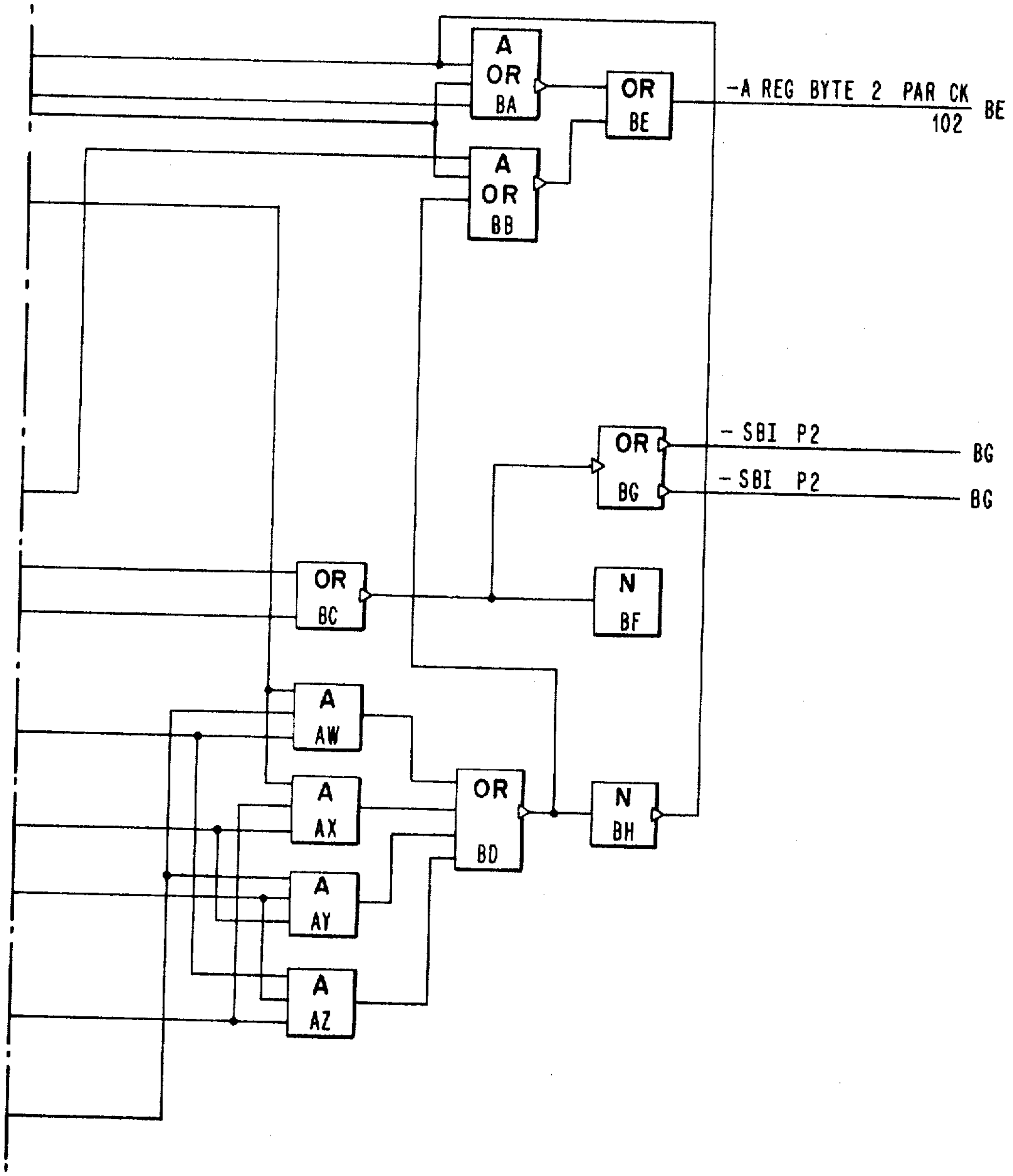
Figure 112A:
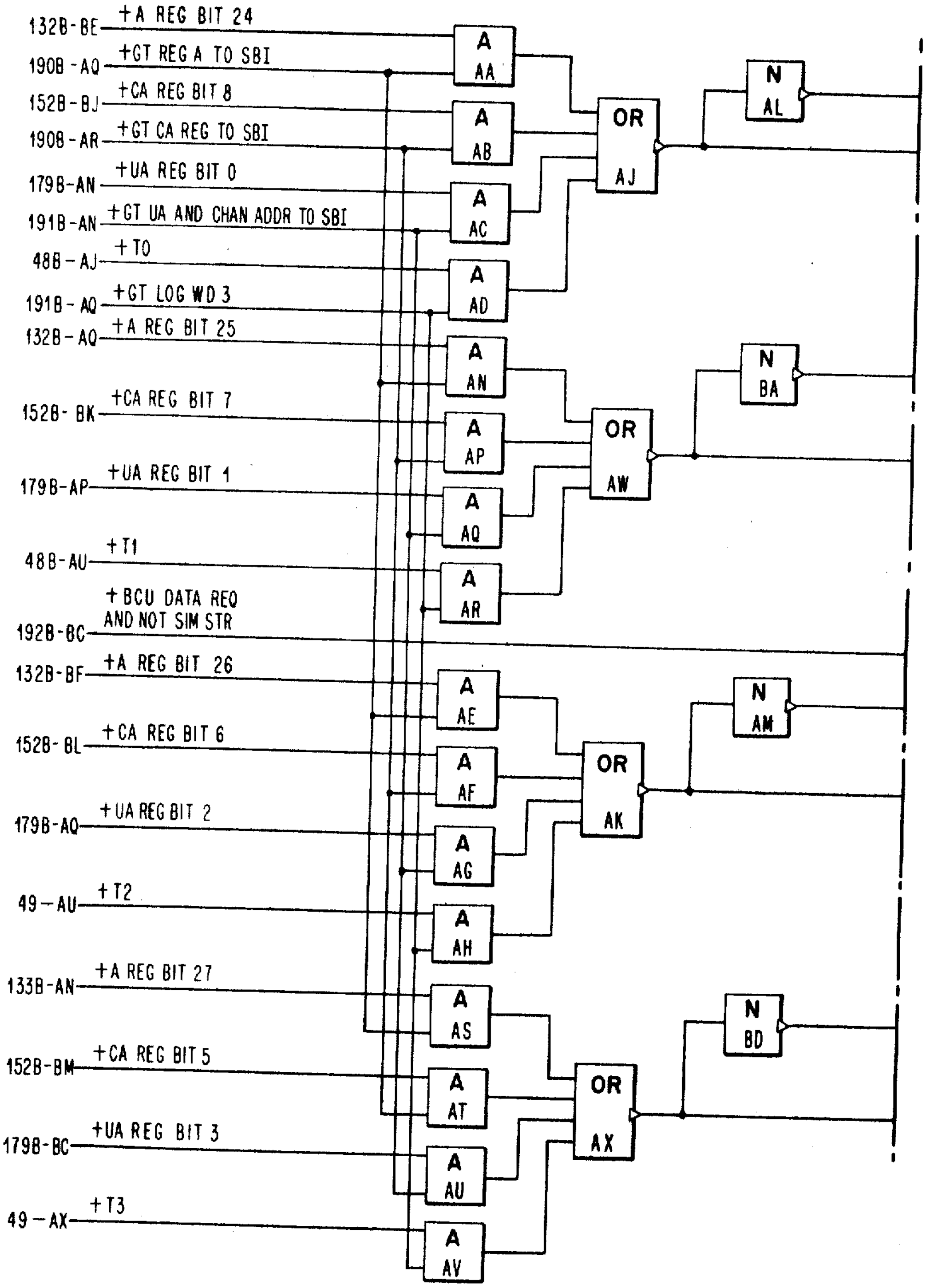
Figure 112B:
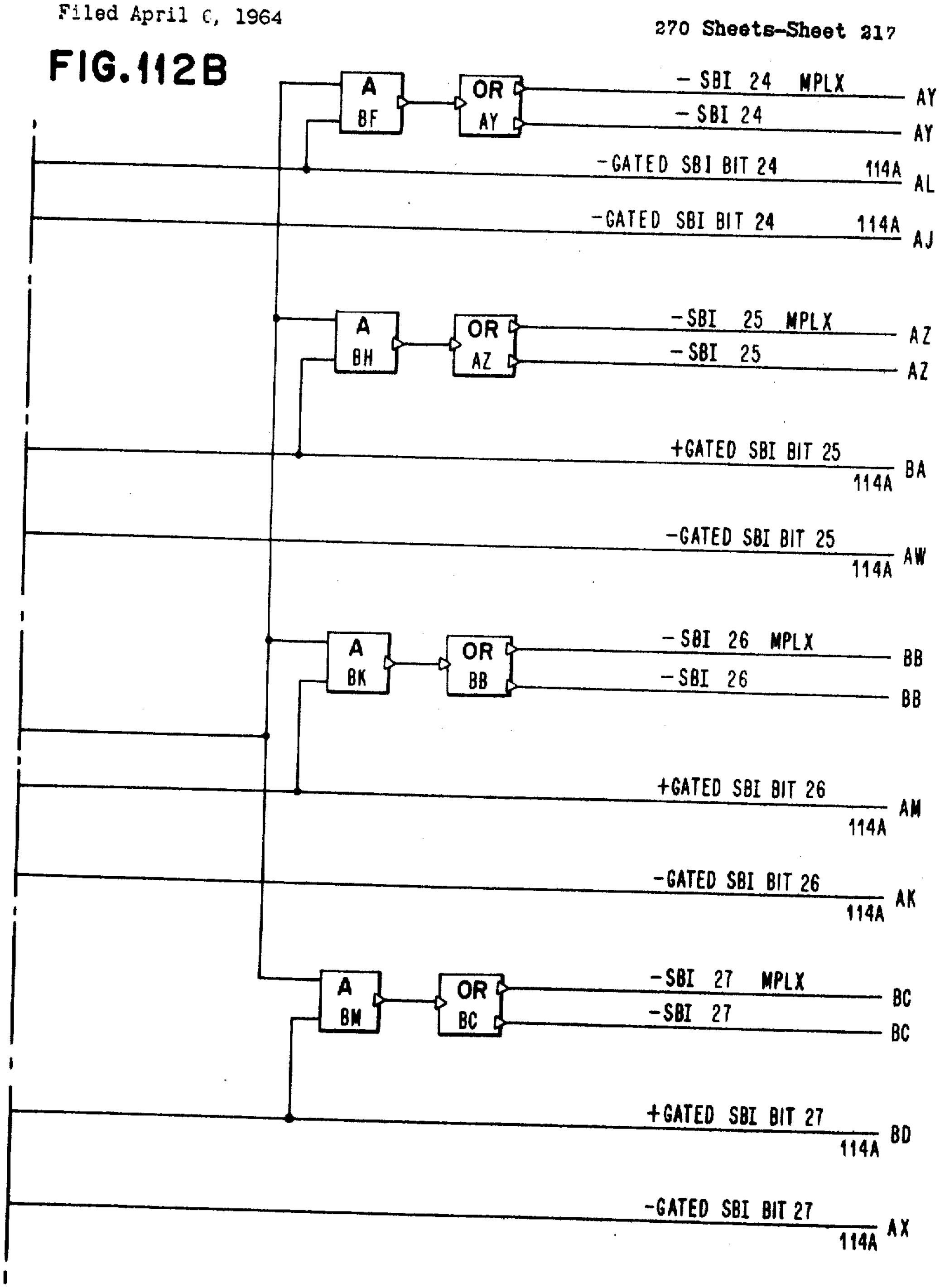
Figure 113A:
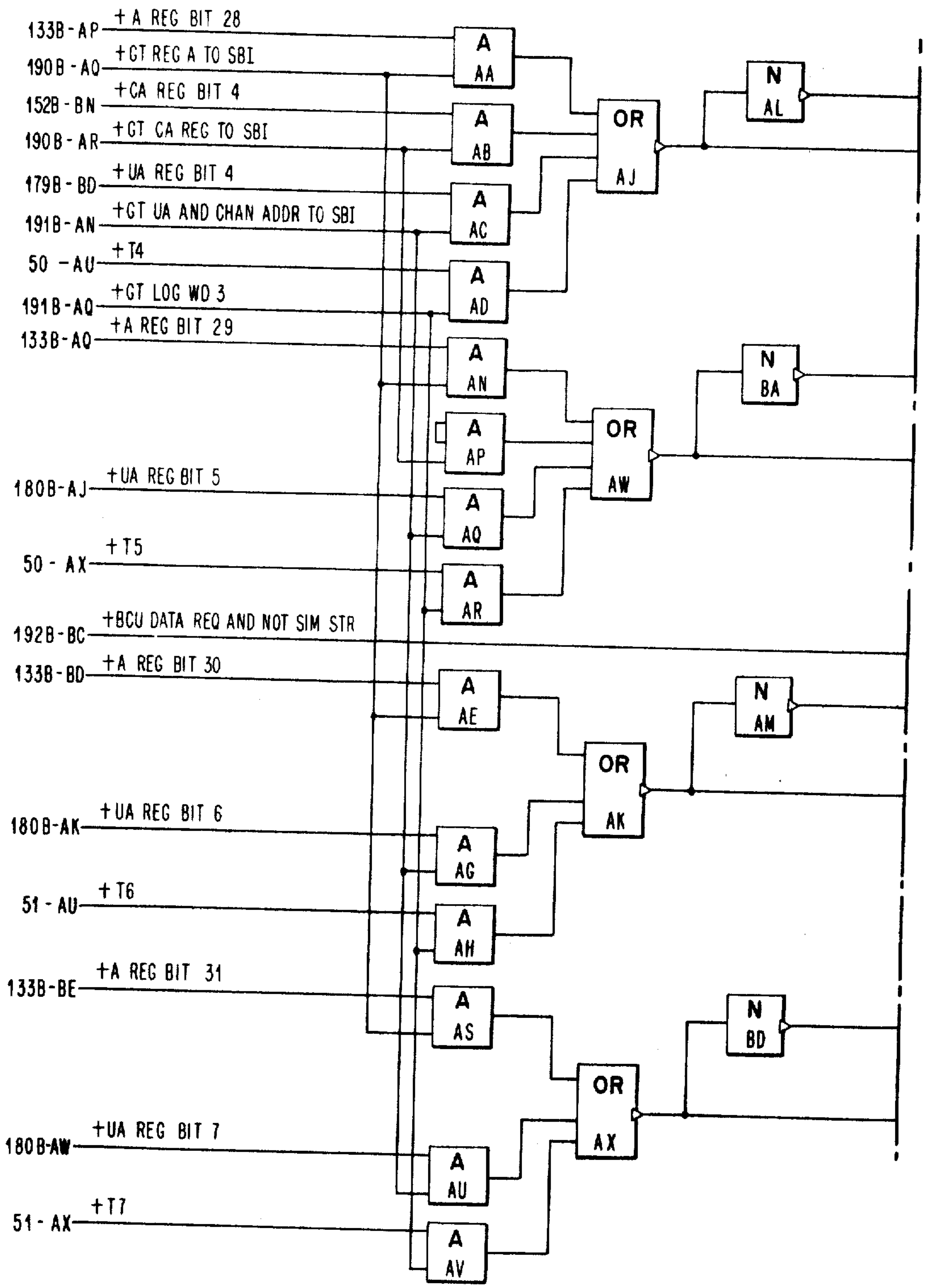
Figure 113B:
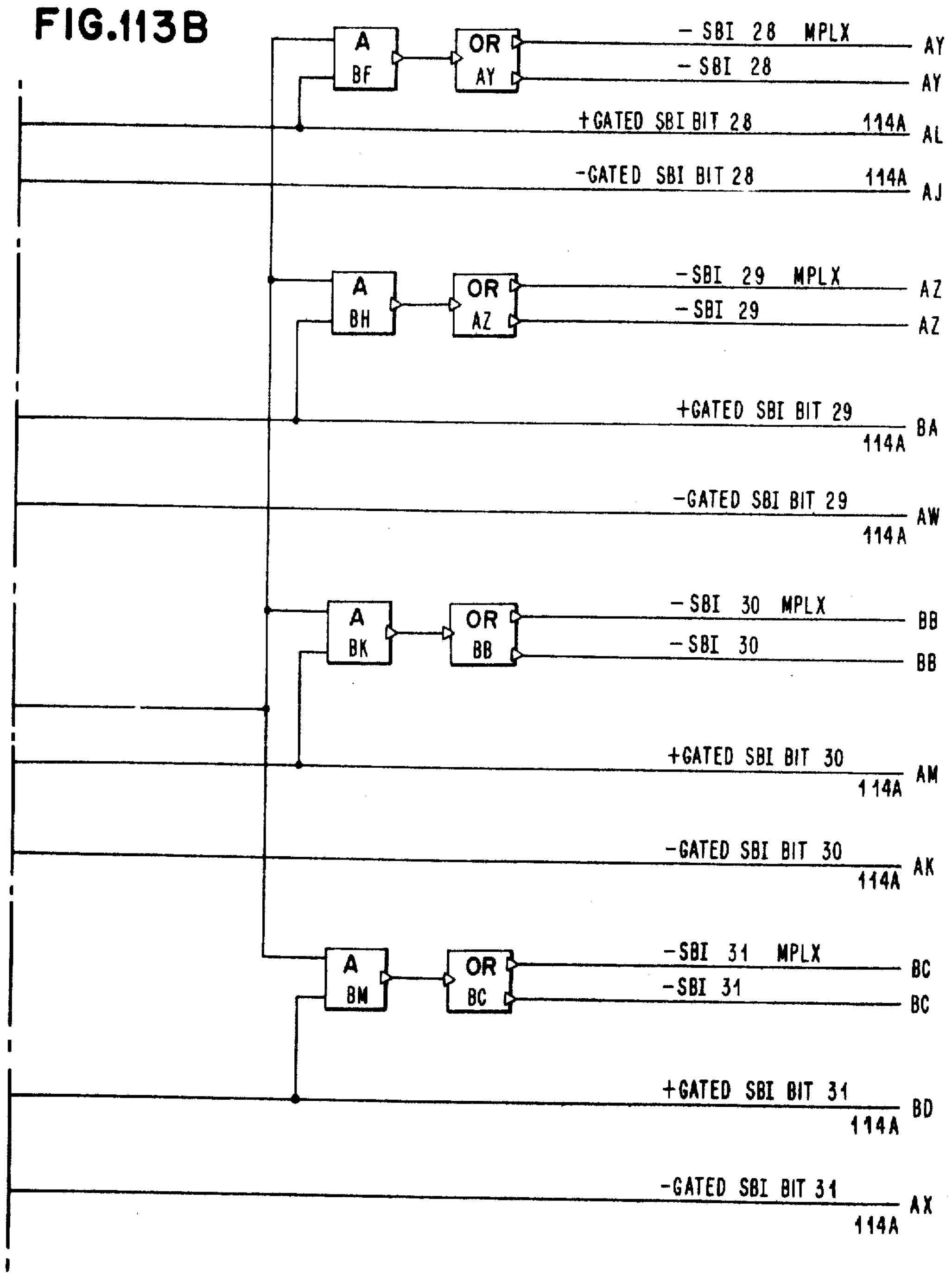
Figure 114A:
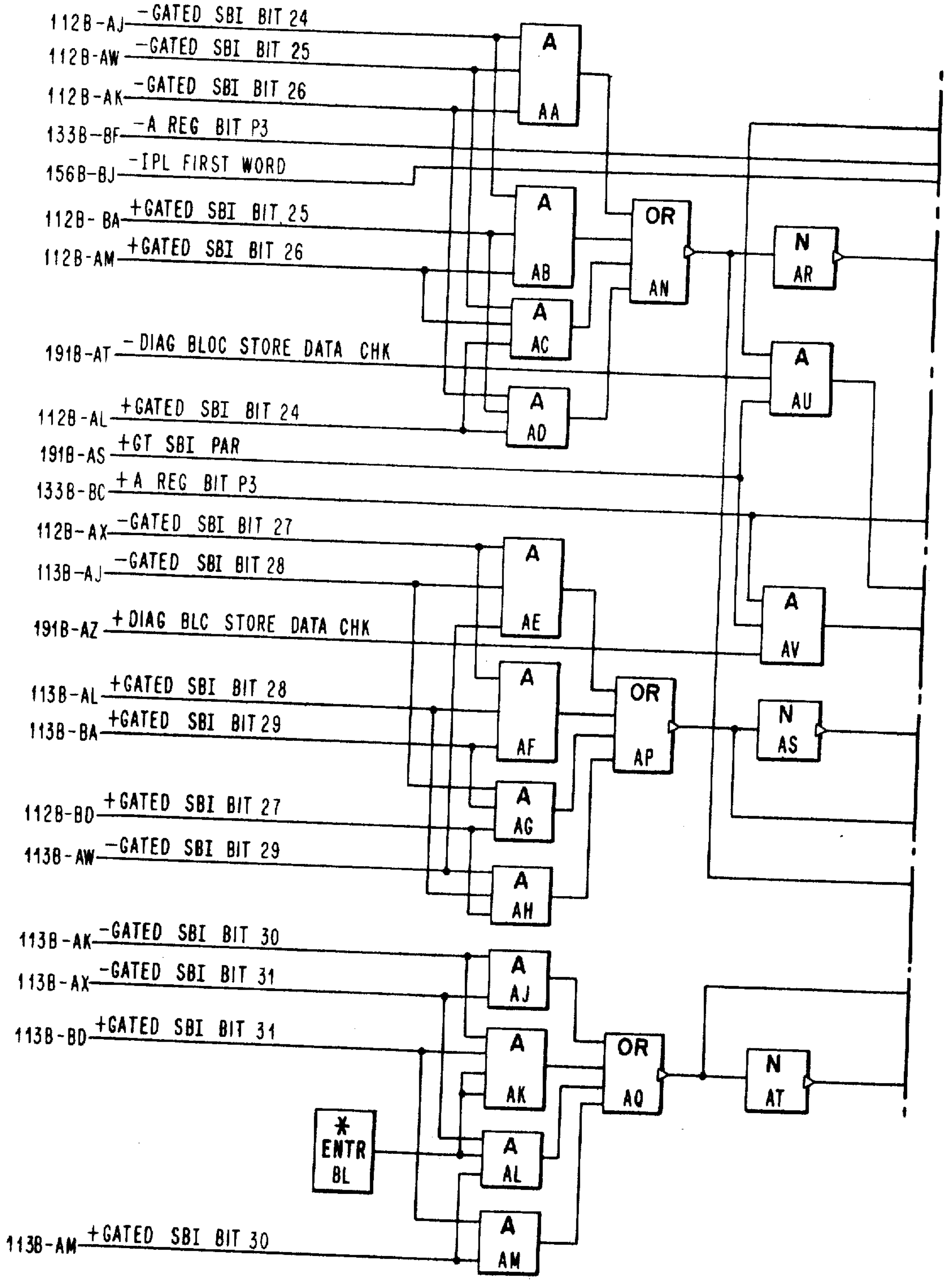
Figure 114B:
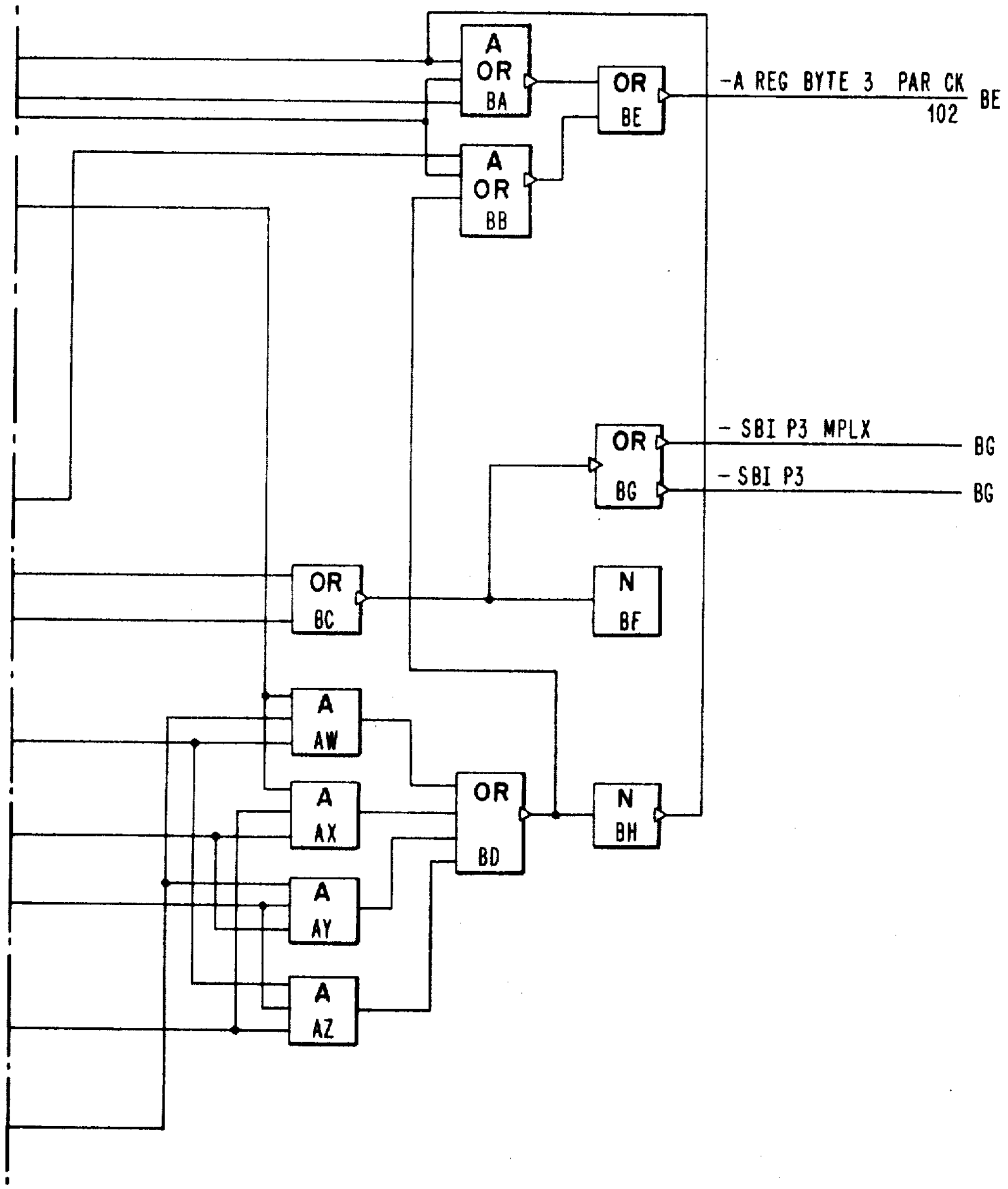
Figure 115A:
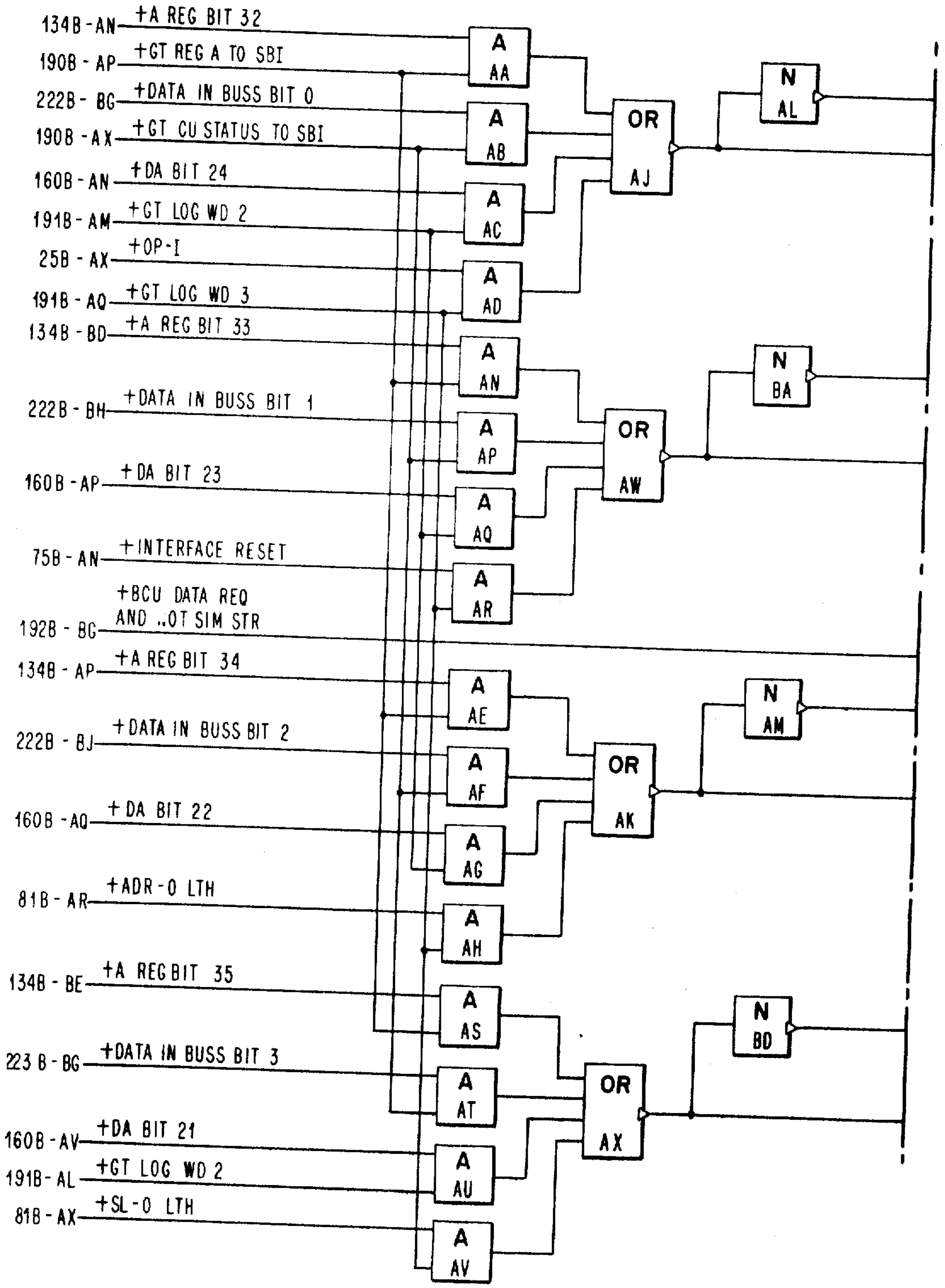
Figure 115B:
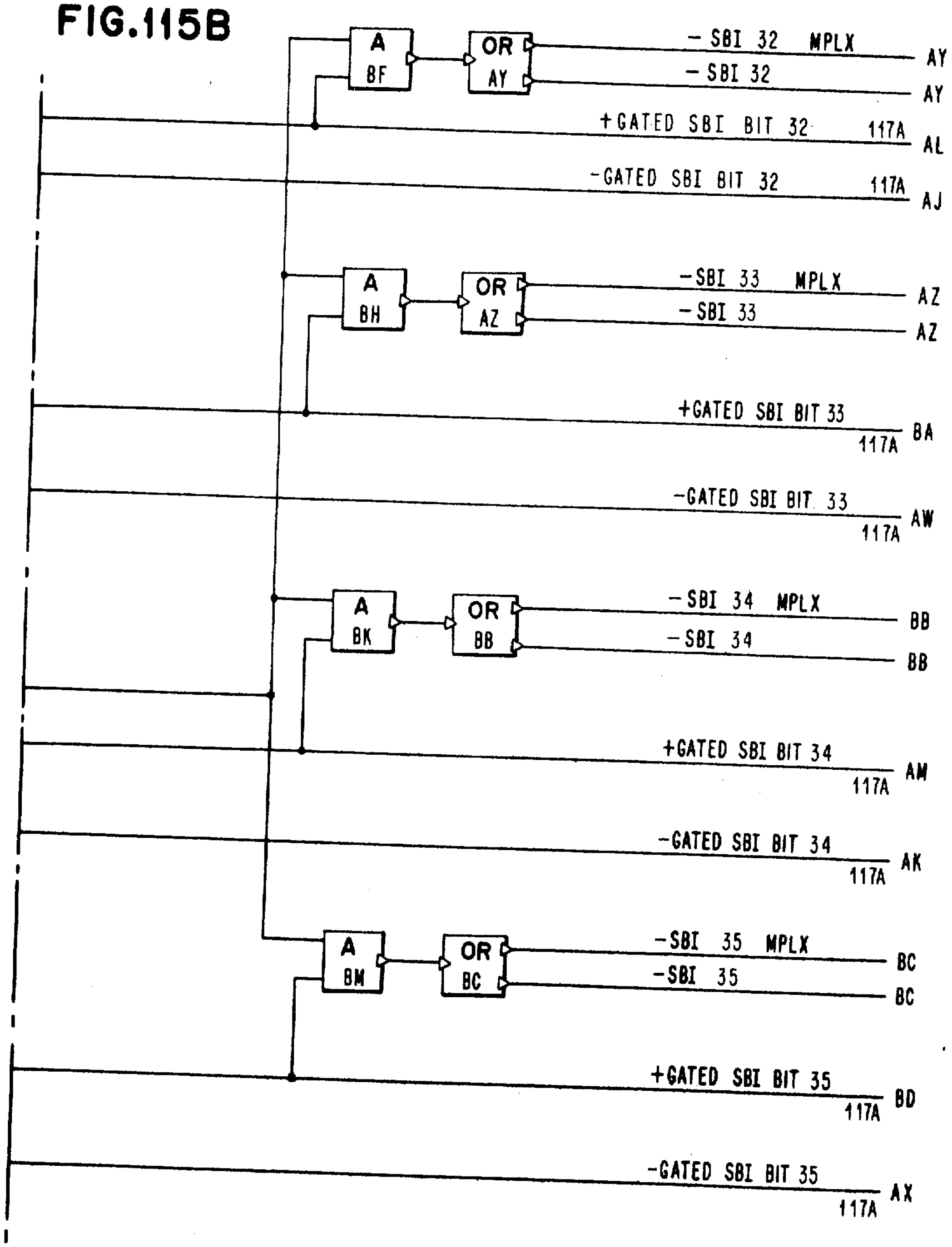
Figure 116A:
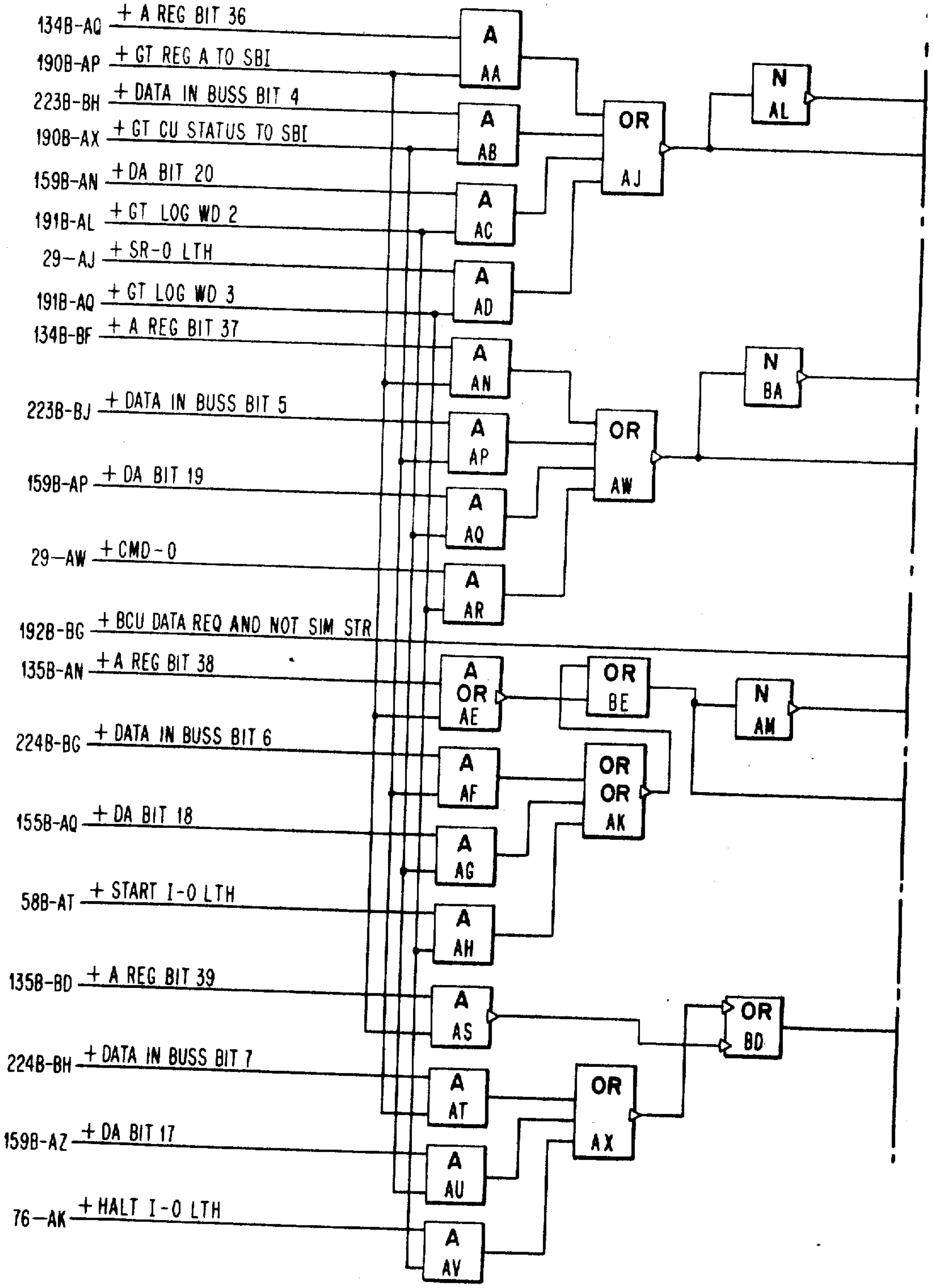
Figure 116B:
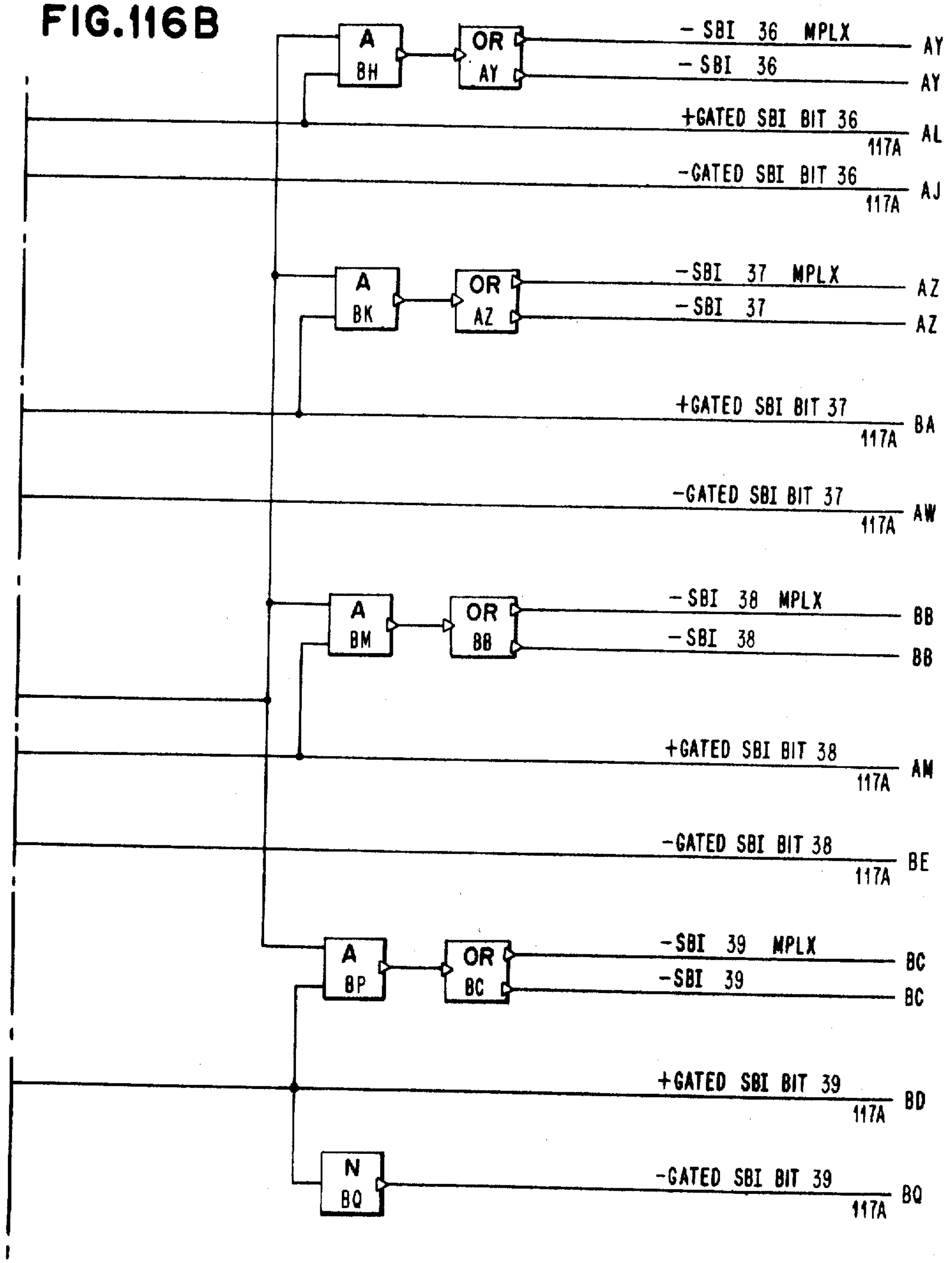
Figure 117A:
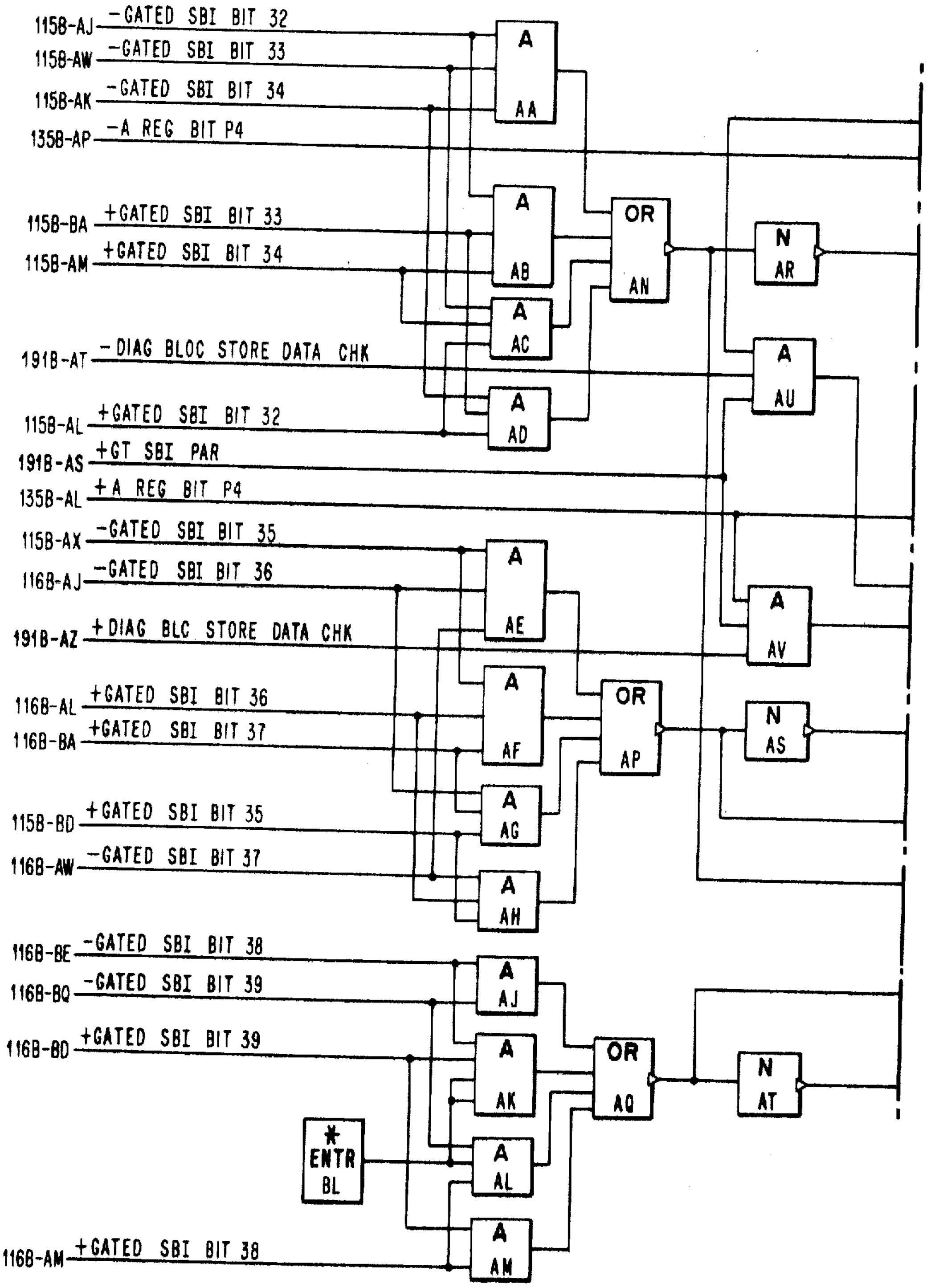
Figure 117B:
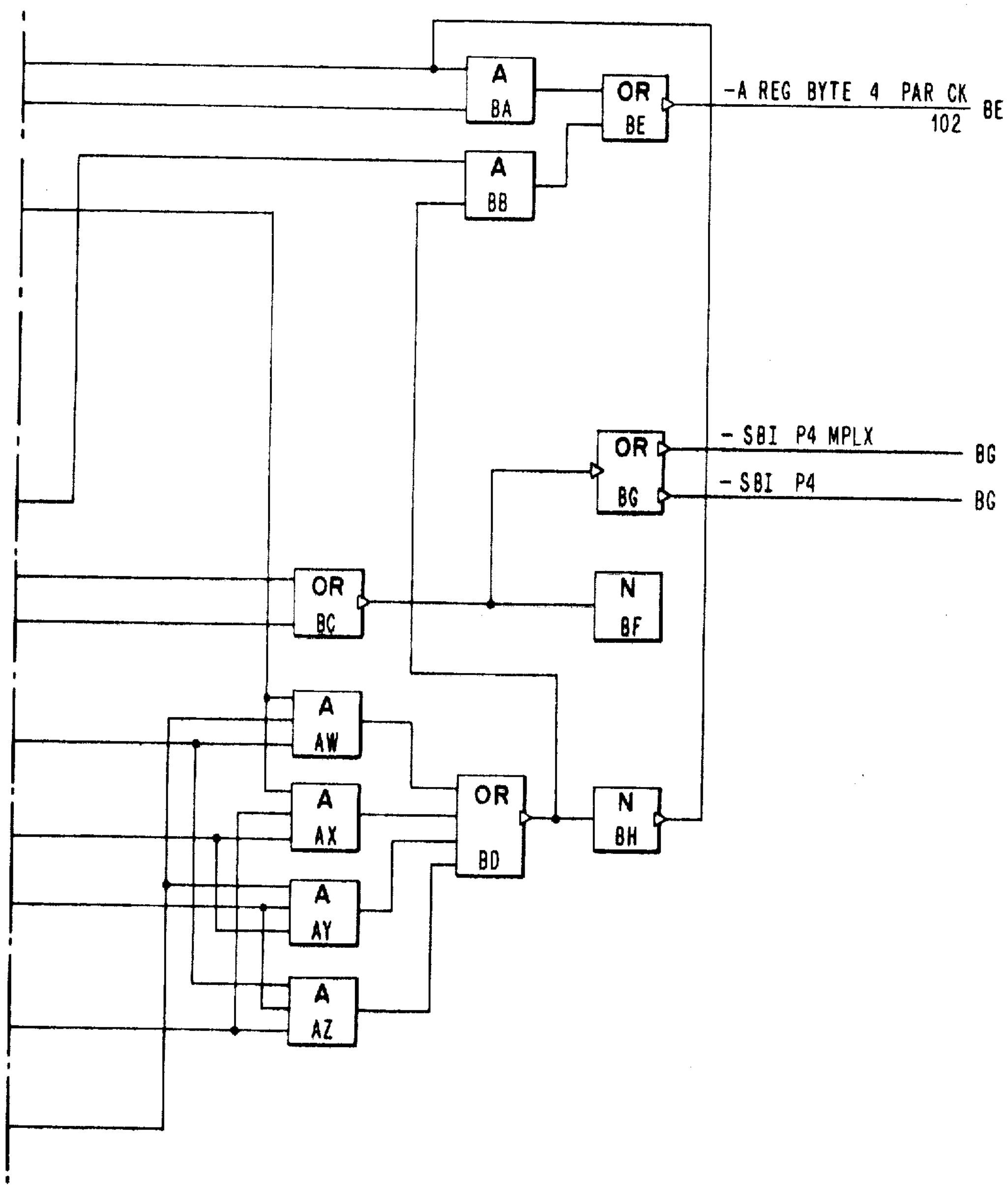
Figure 118A:
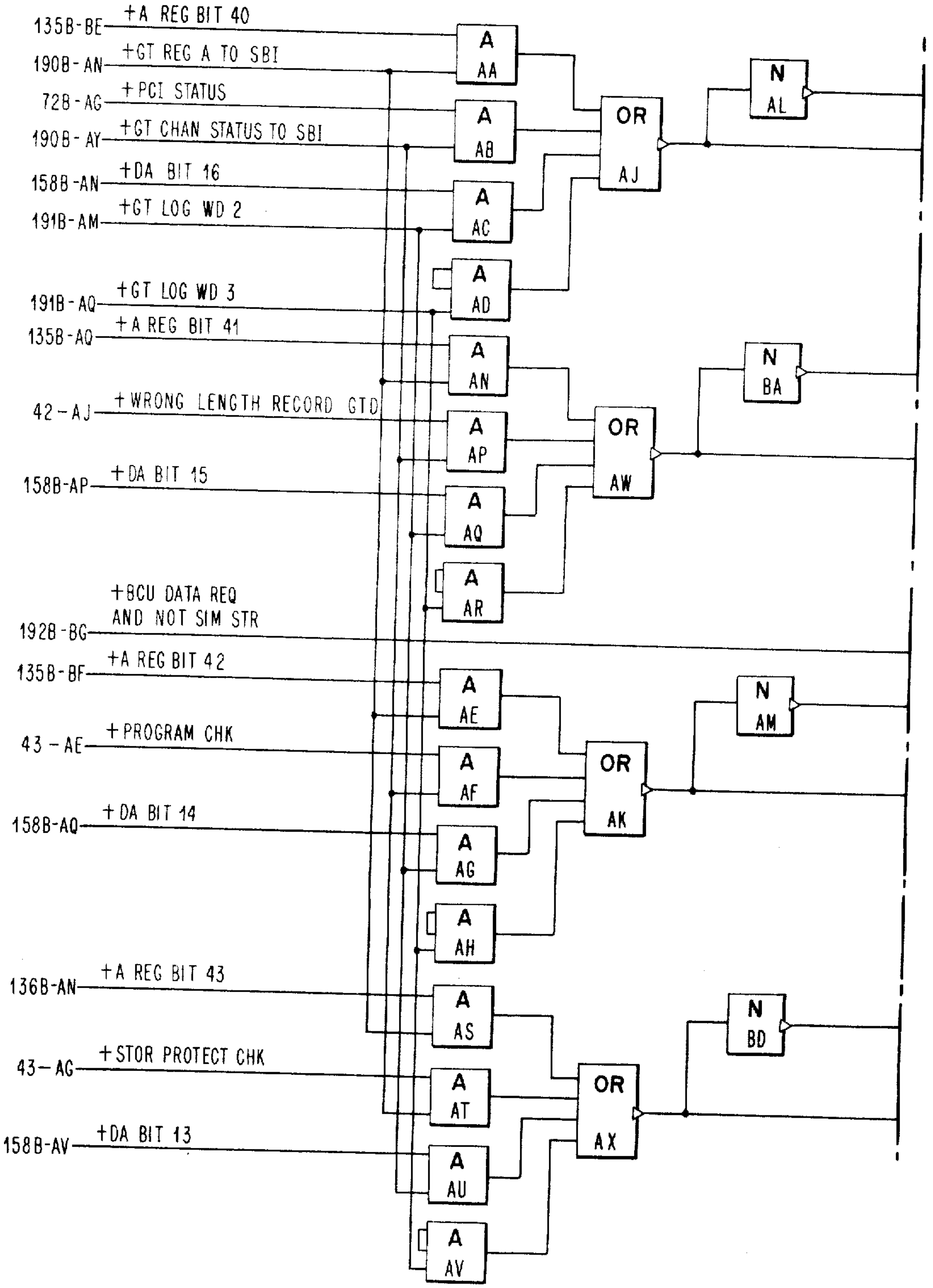
Figure 118B:
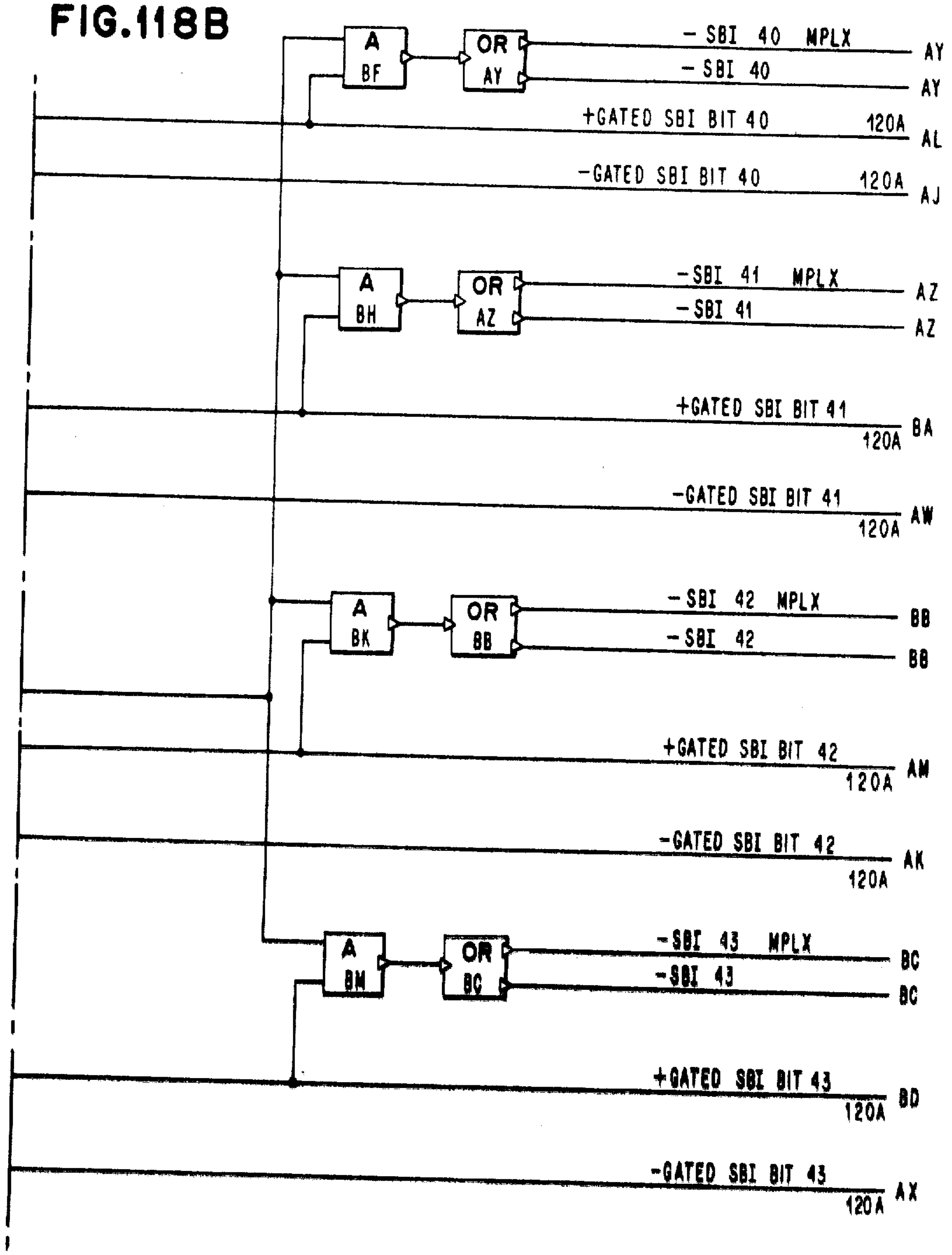
Figure 119A:
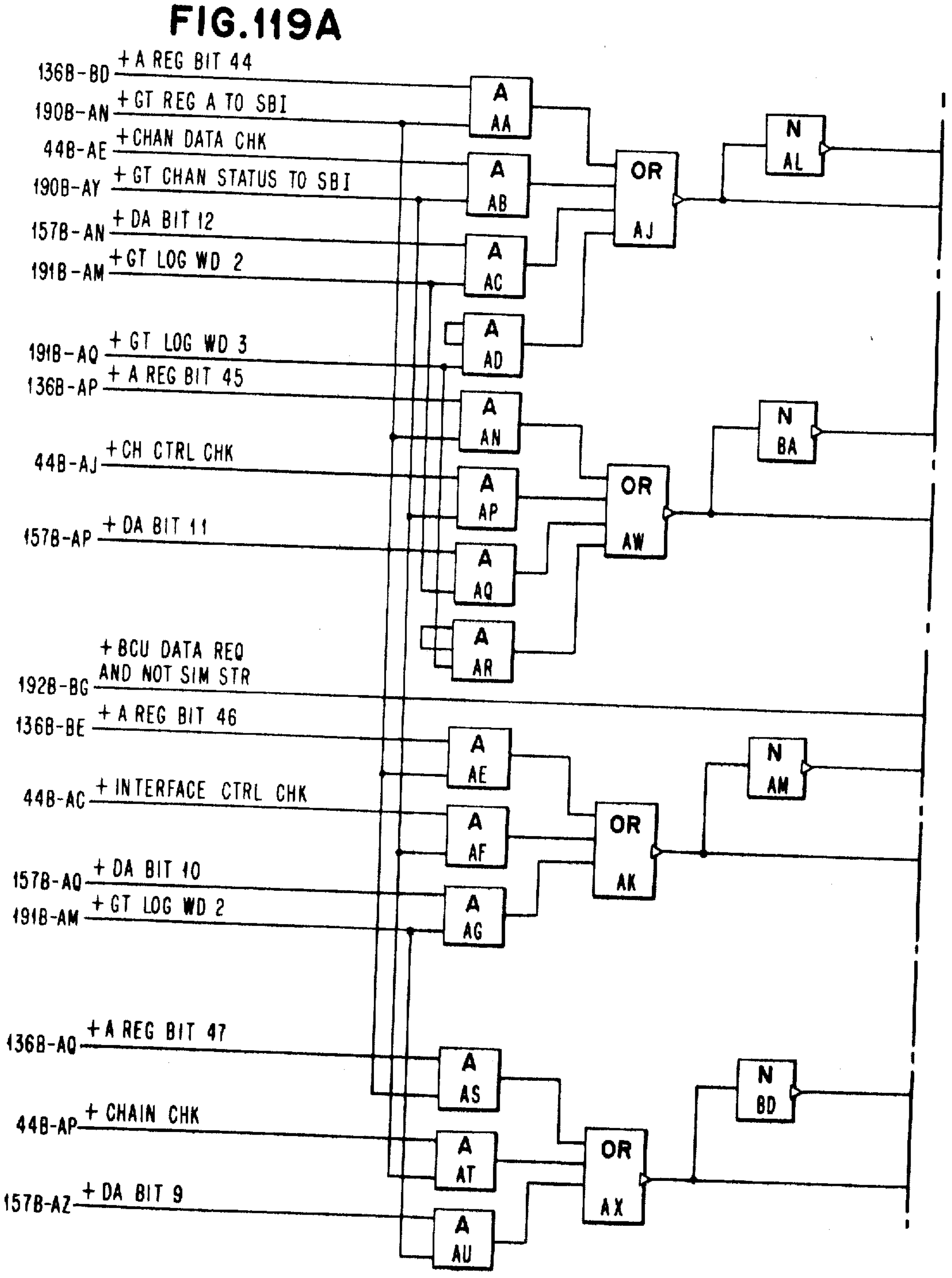
Figure 119B:
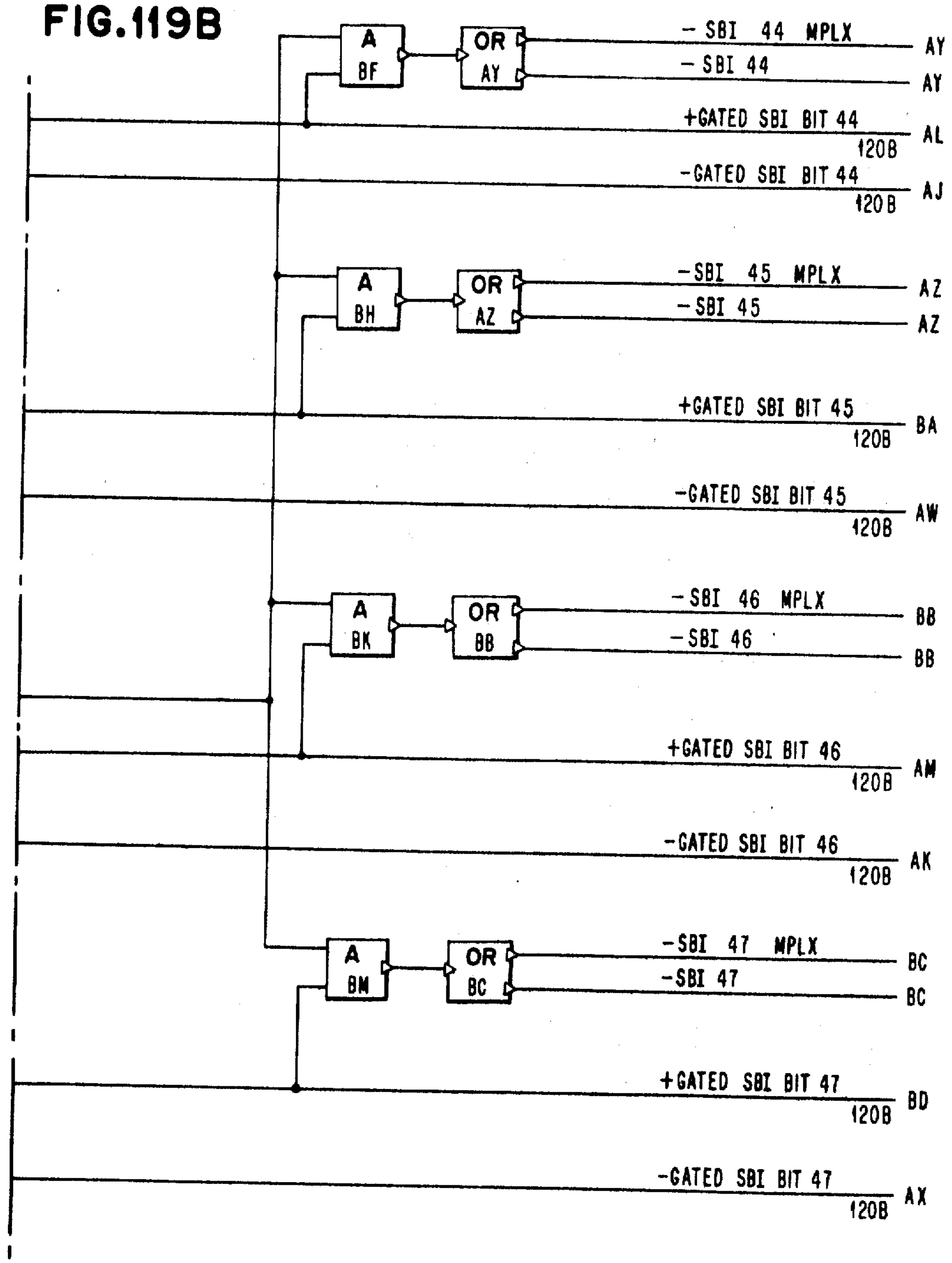
Figure 120A:
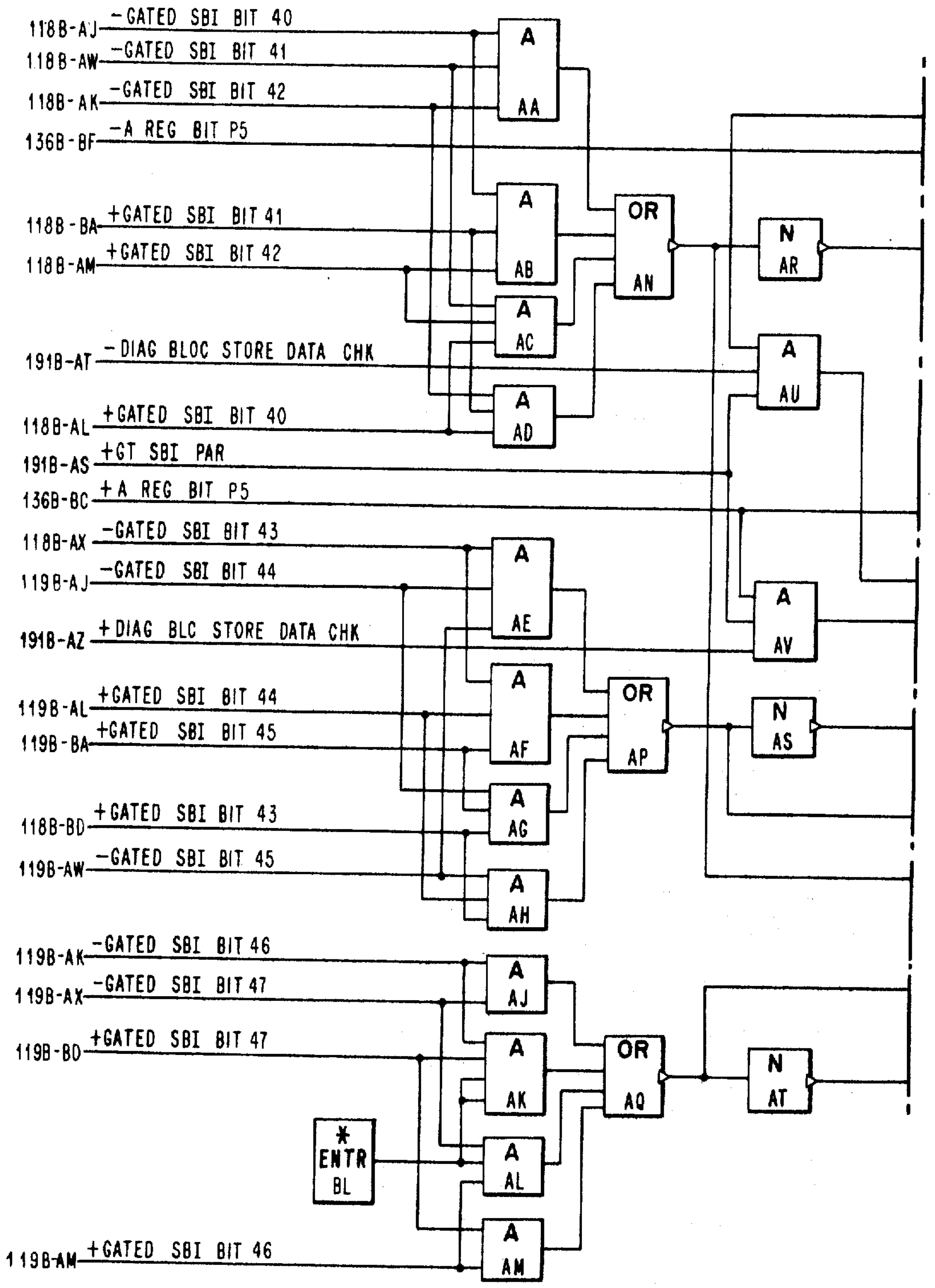
Figure 120B:
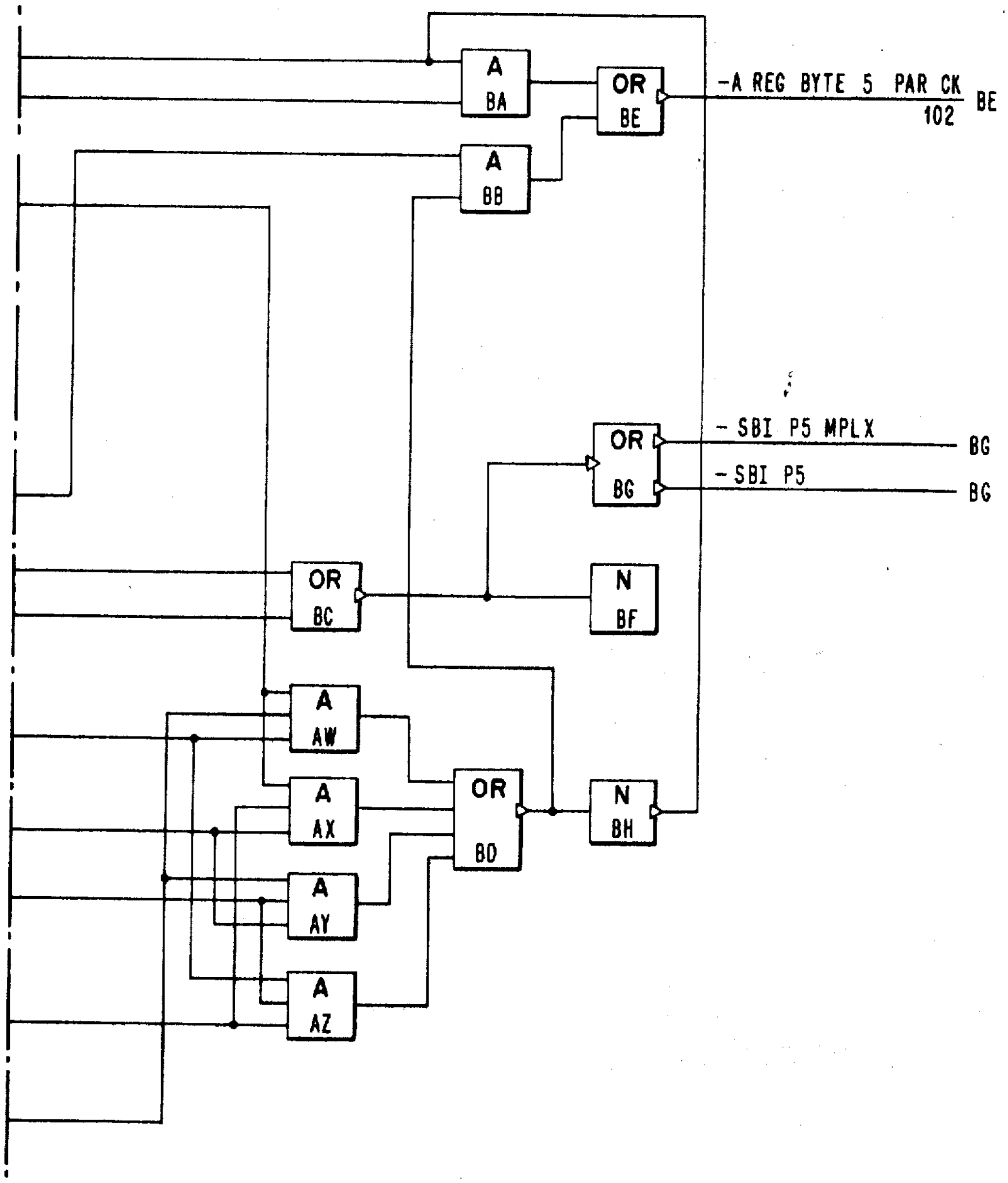
Figure 121A:
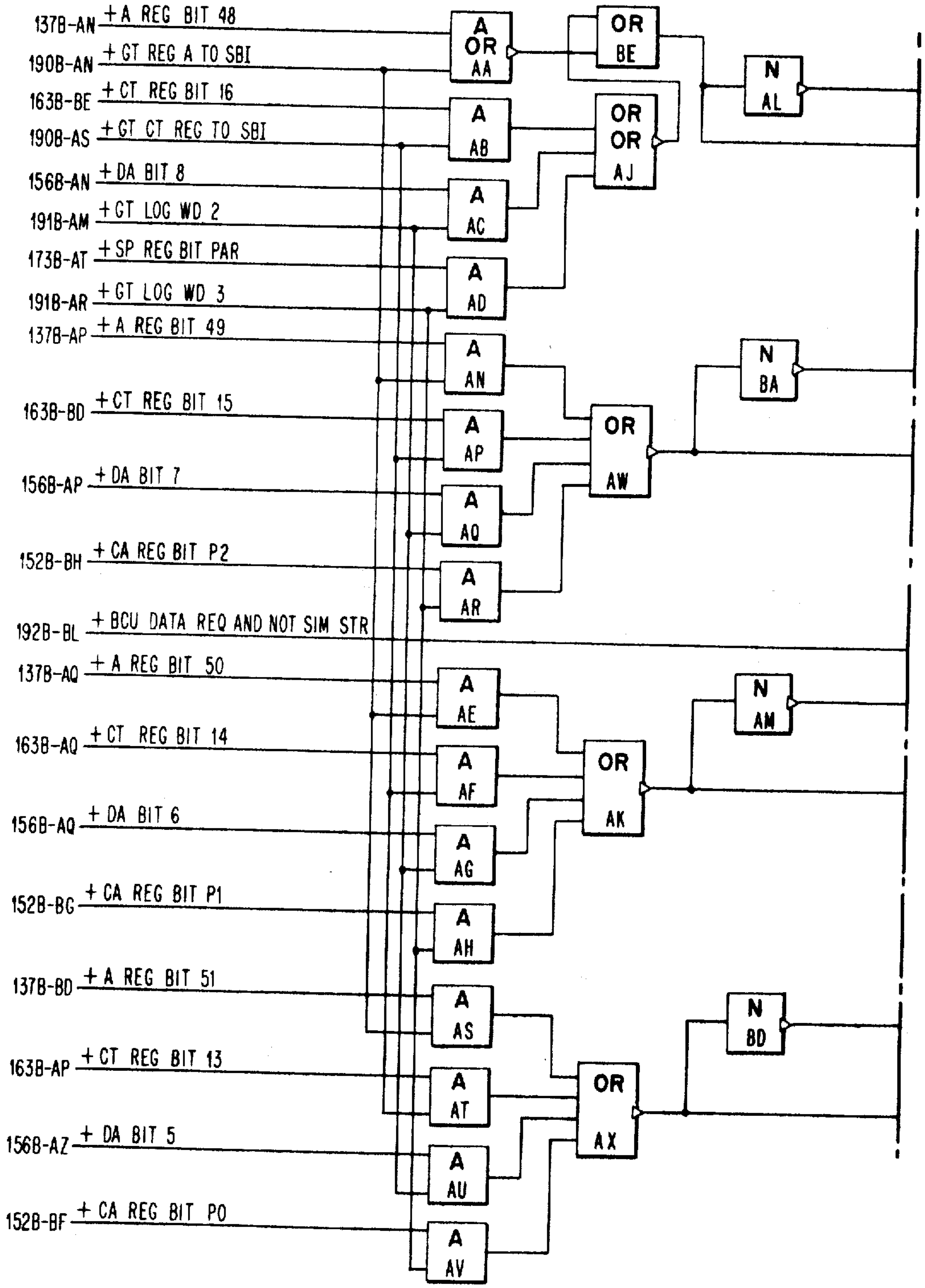
Figure 121B:
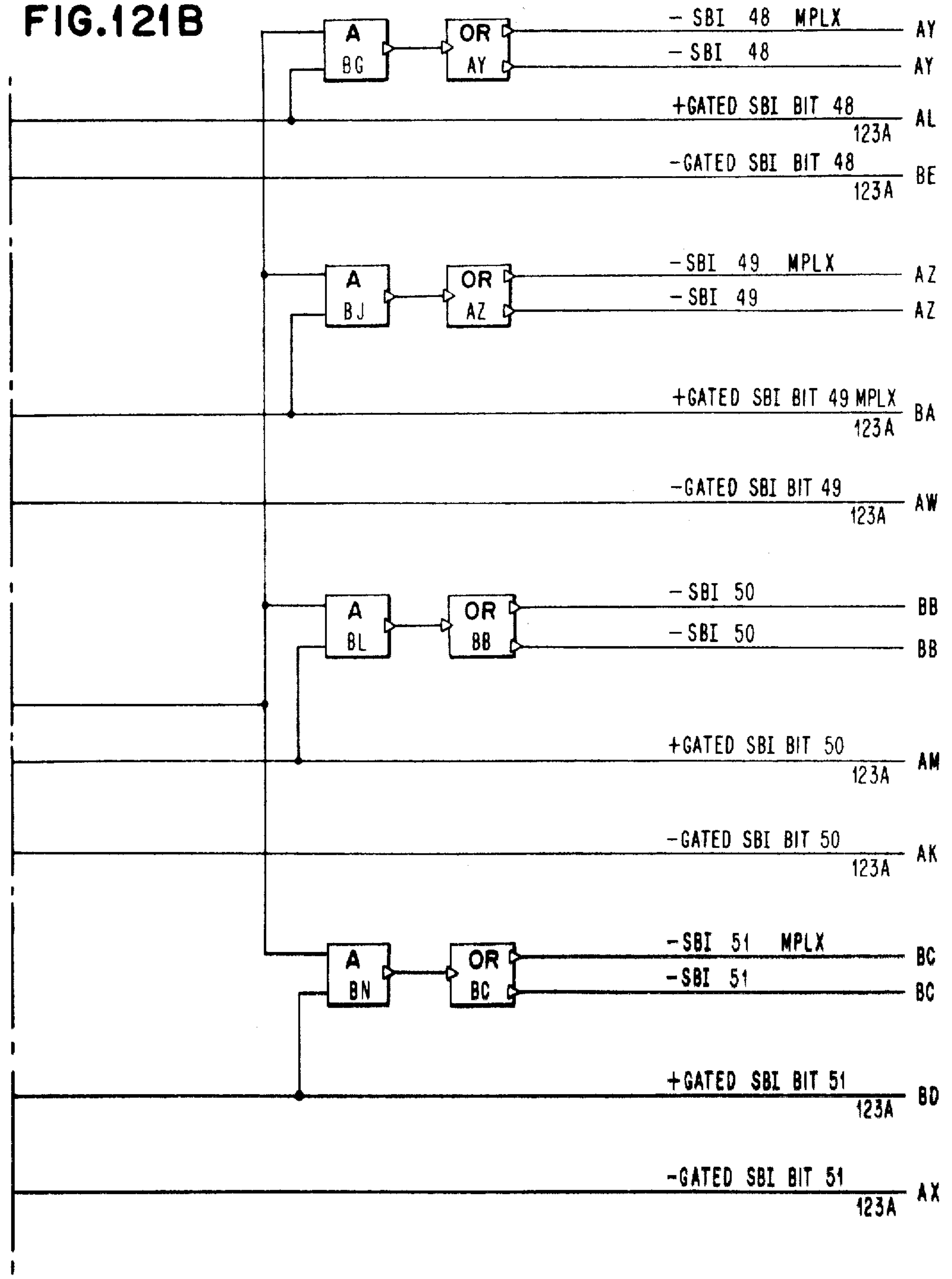
Figure 122A:
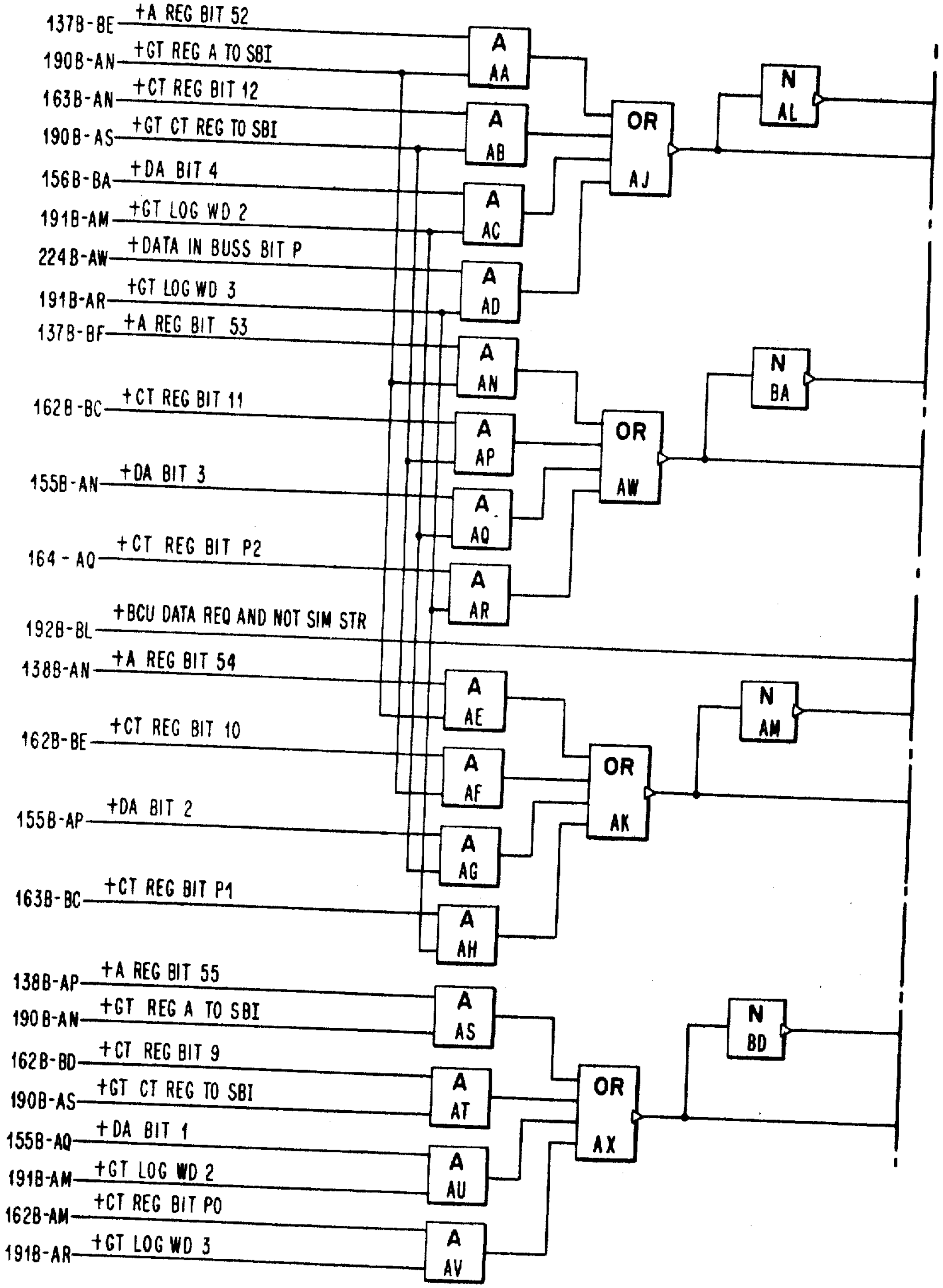
Figure 122B:
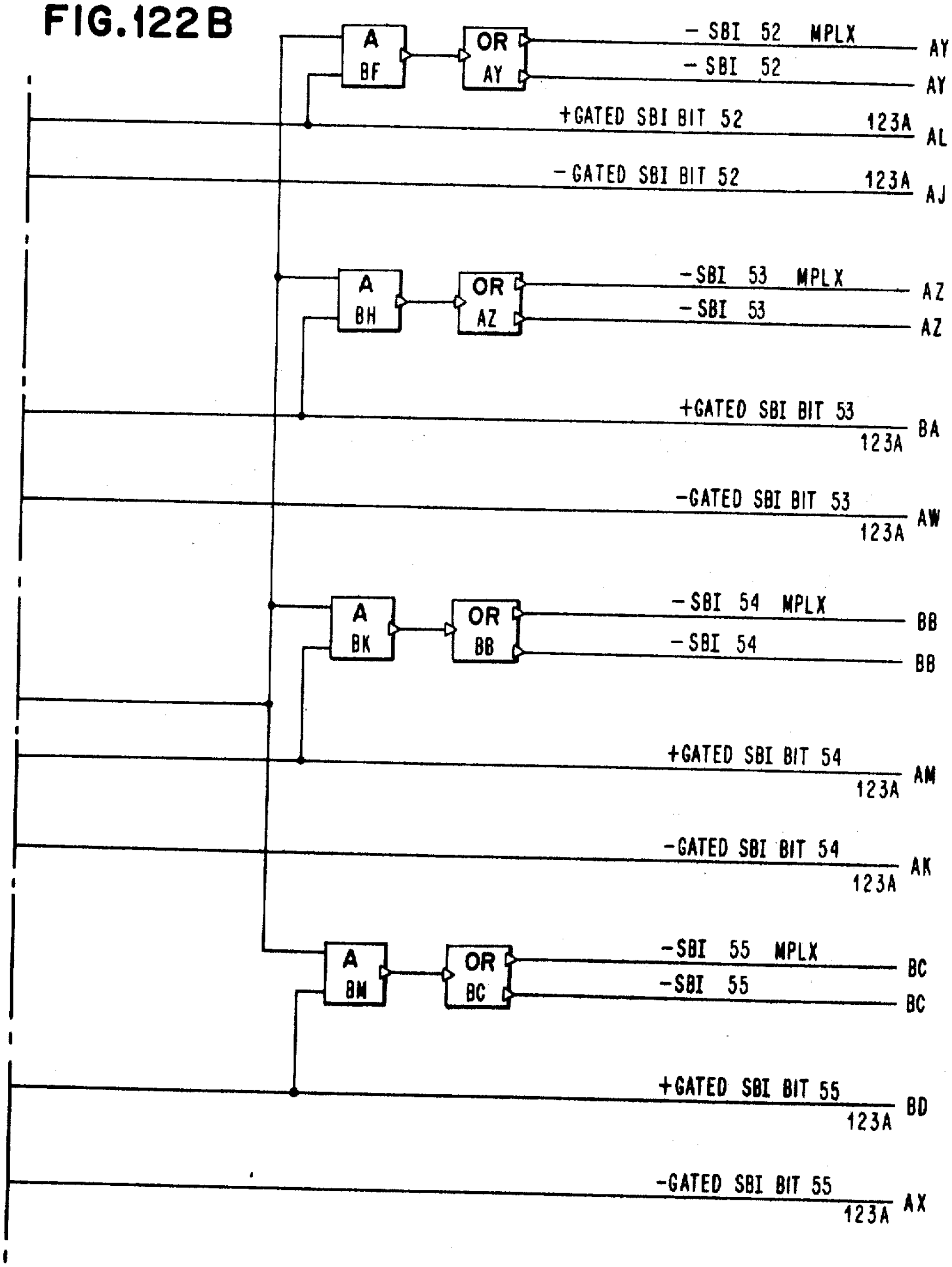
Figure 123A:
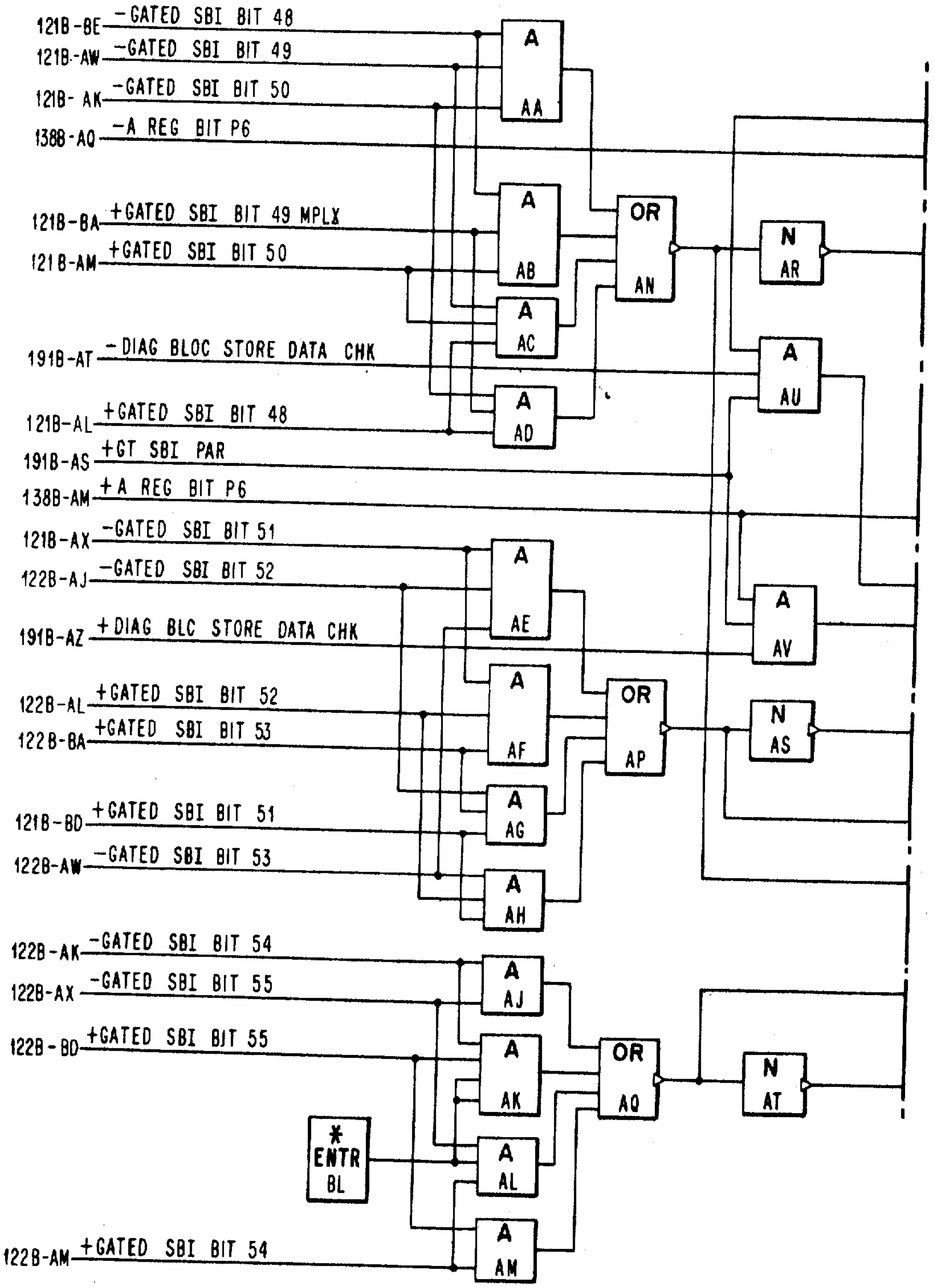
Figure 123B:
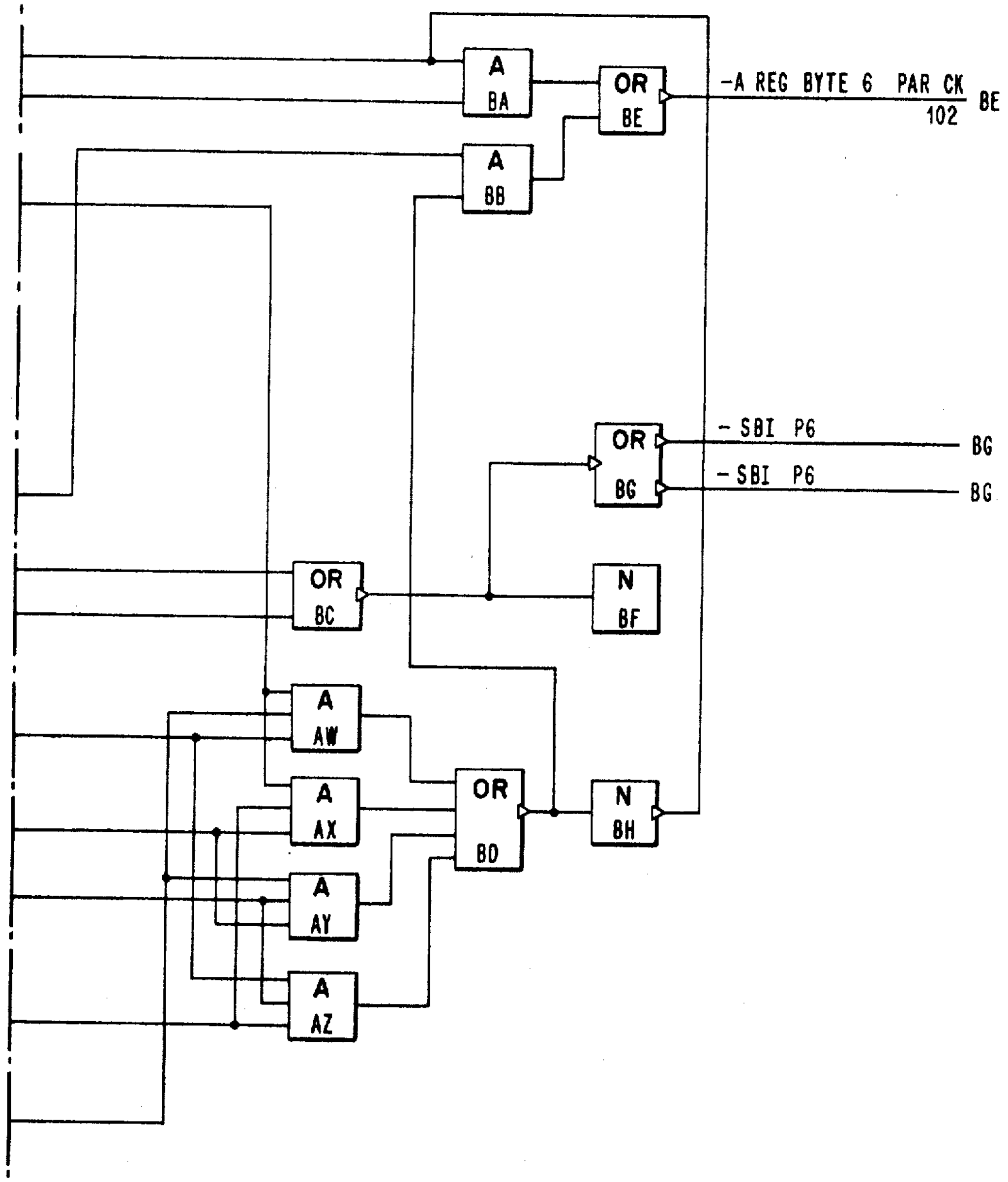
Figure 124A:
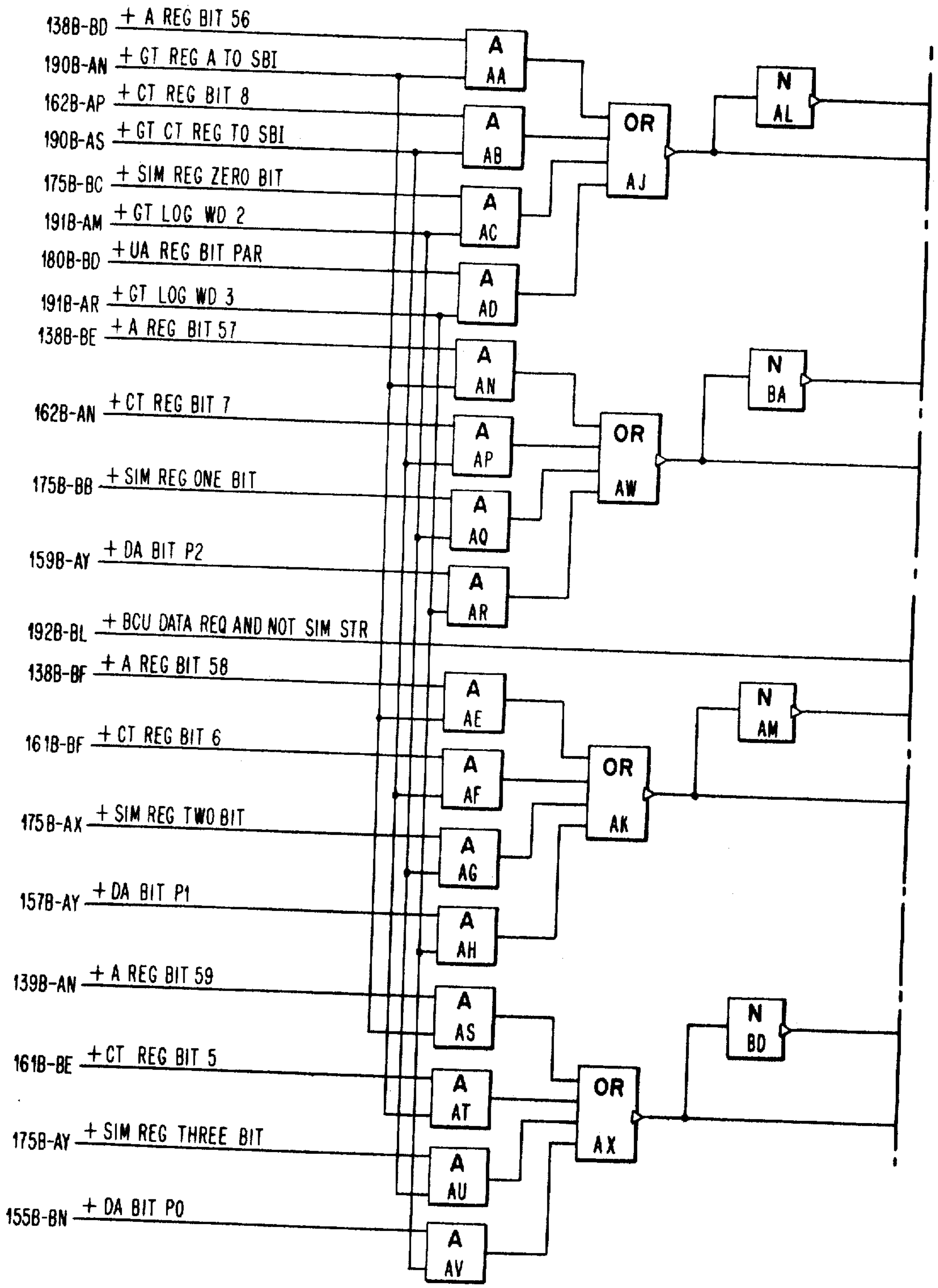
Figure 124B:
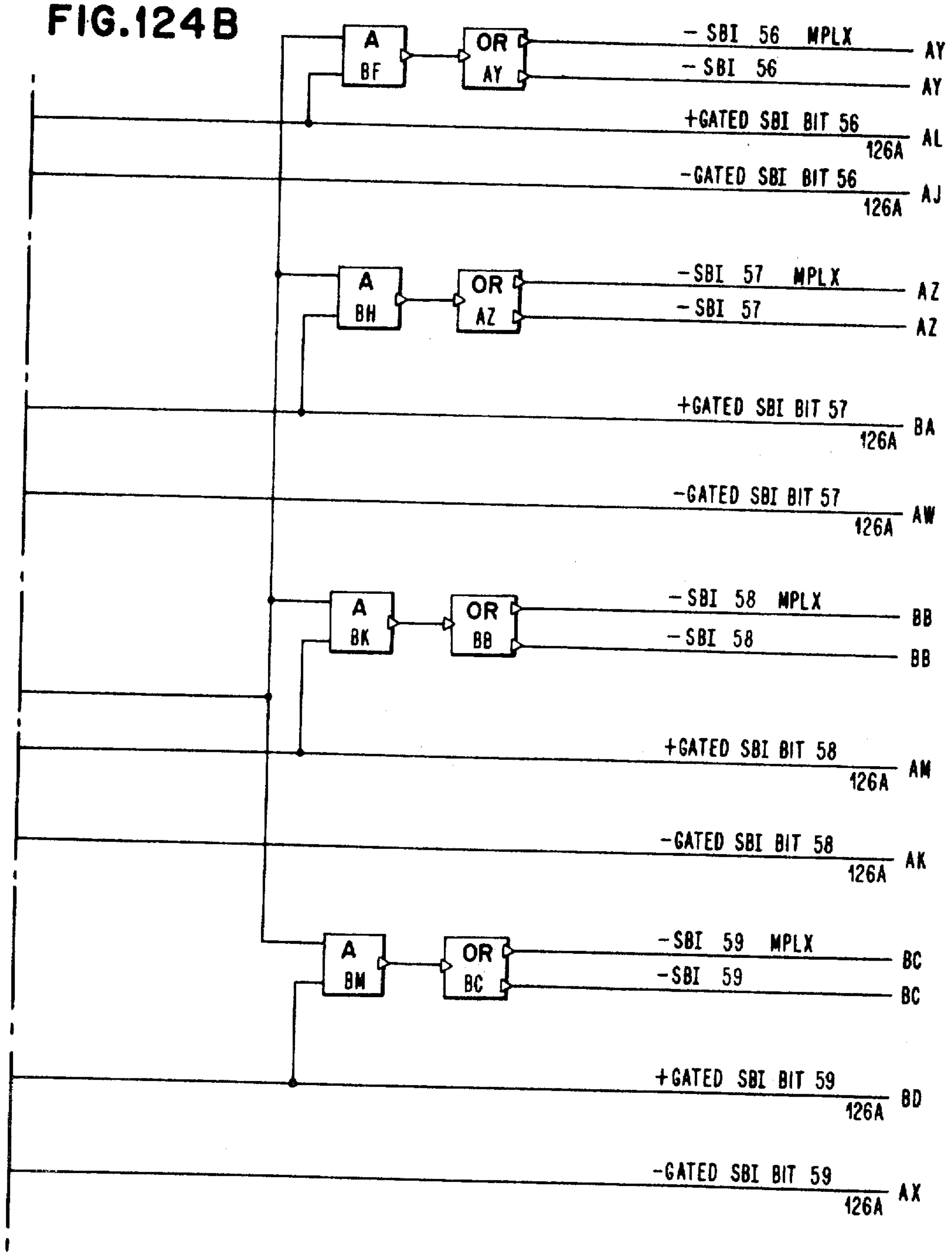
Figure 125A:
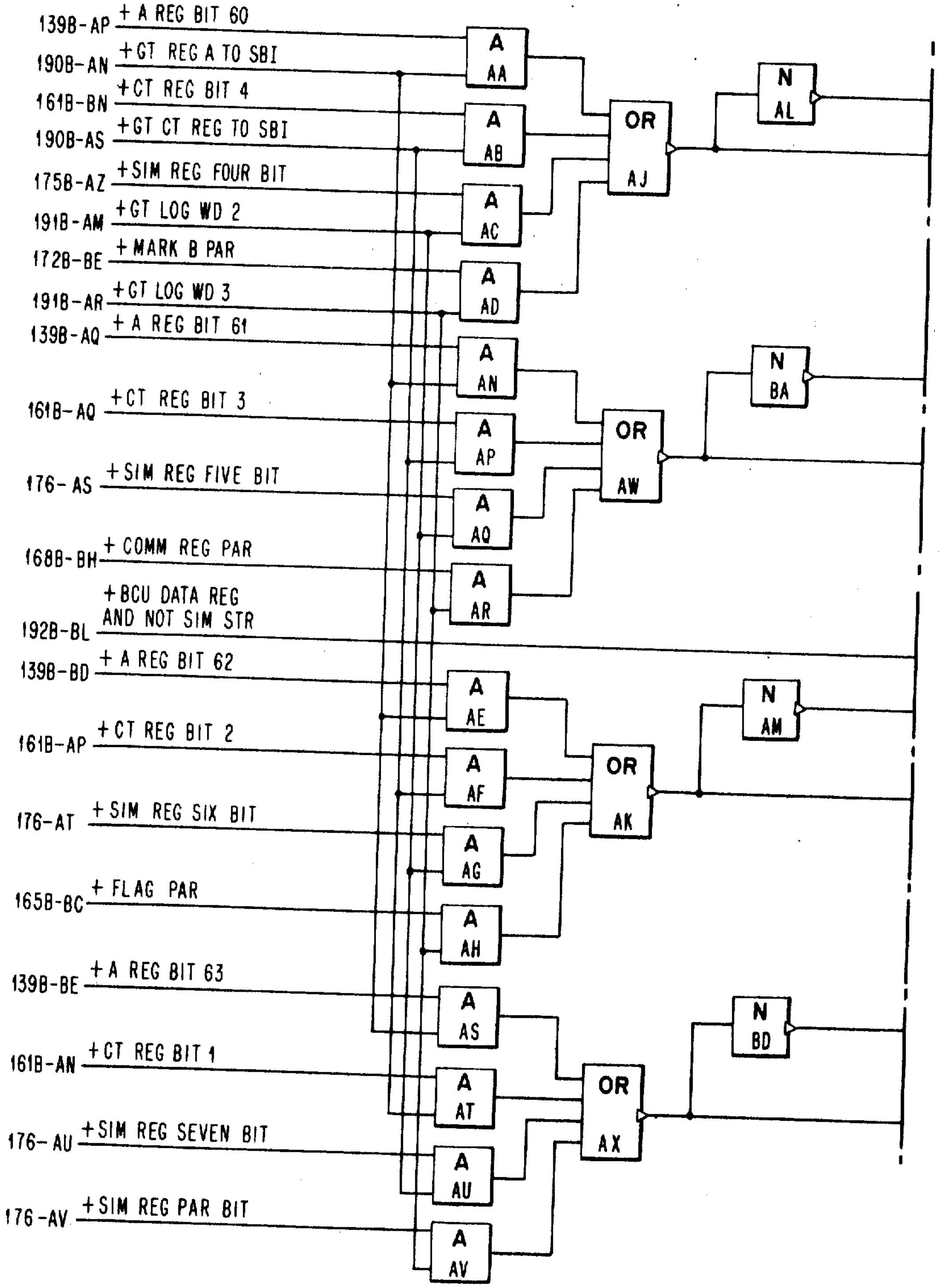
Figure 125B:
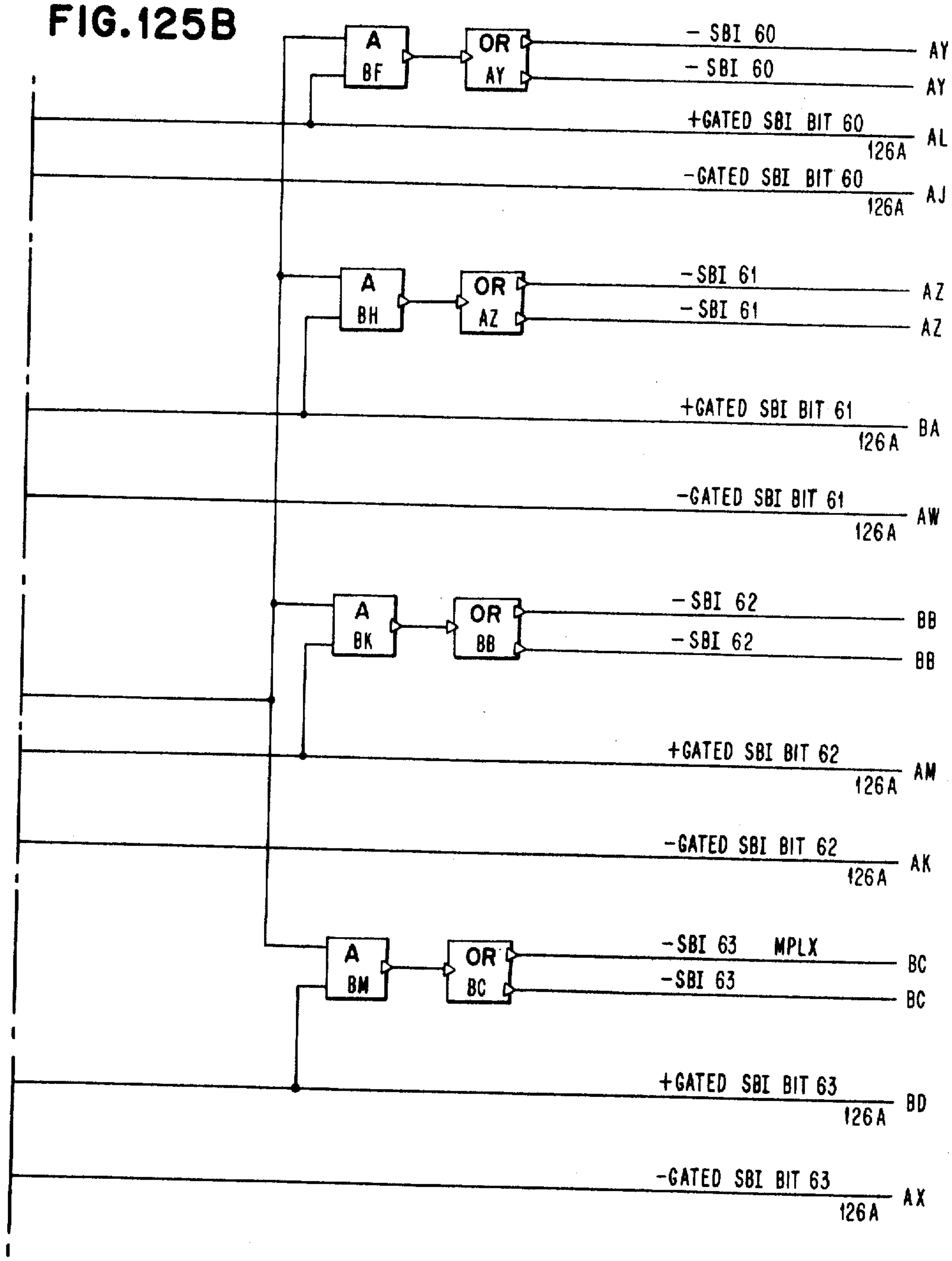
Figure 126A:
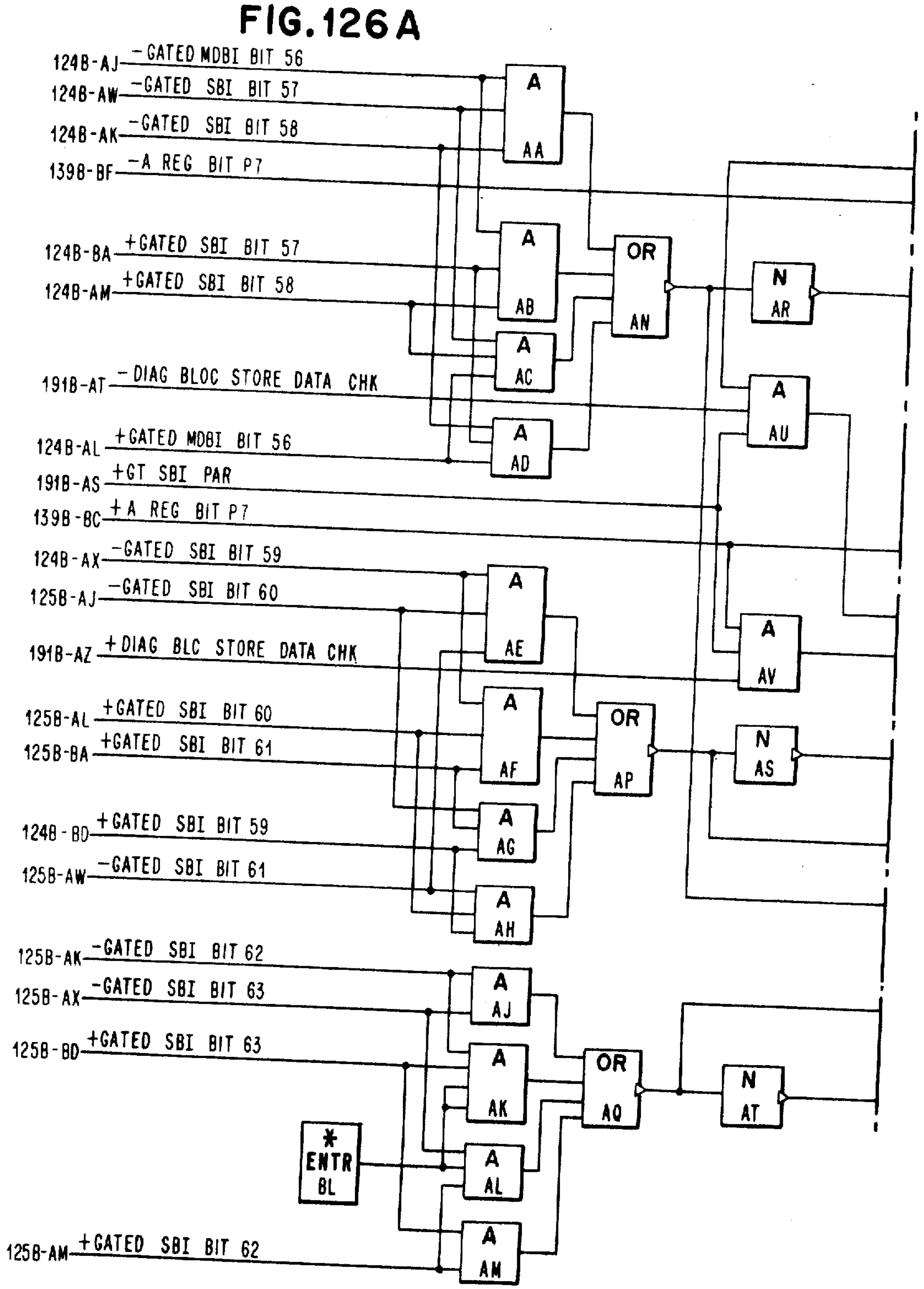
Figure 126B:
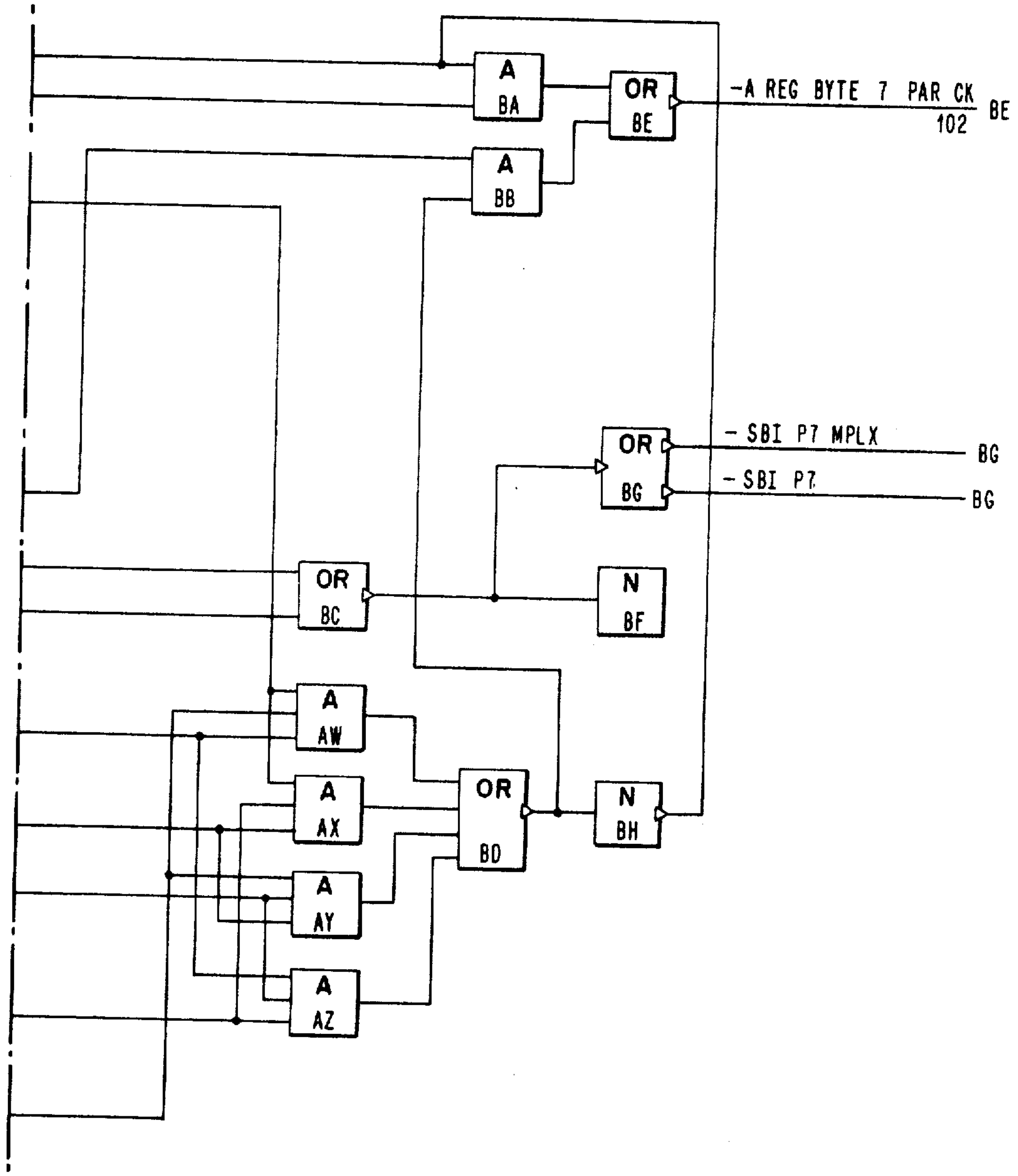
Figure 127A:
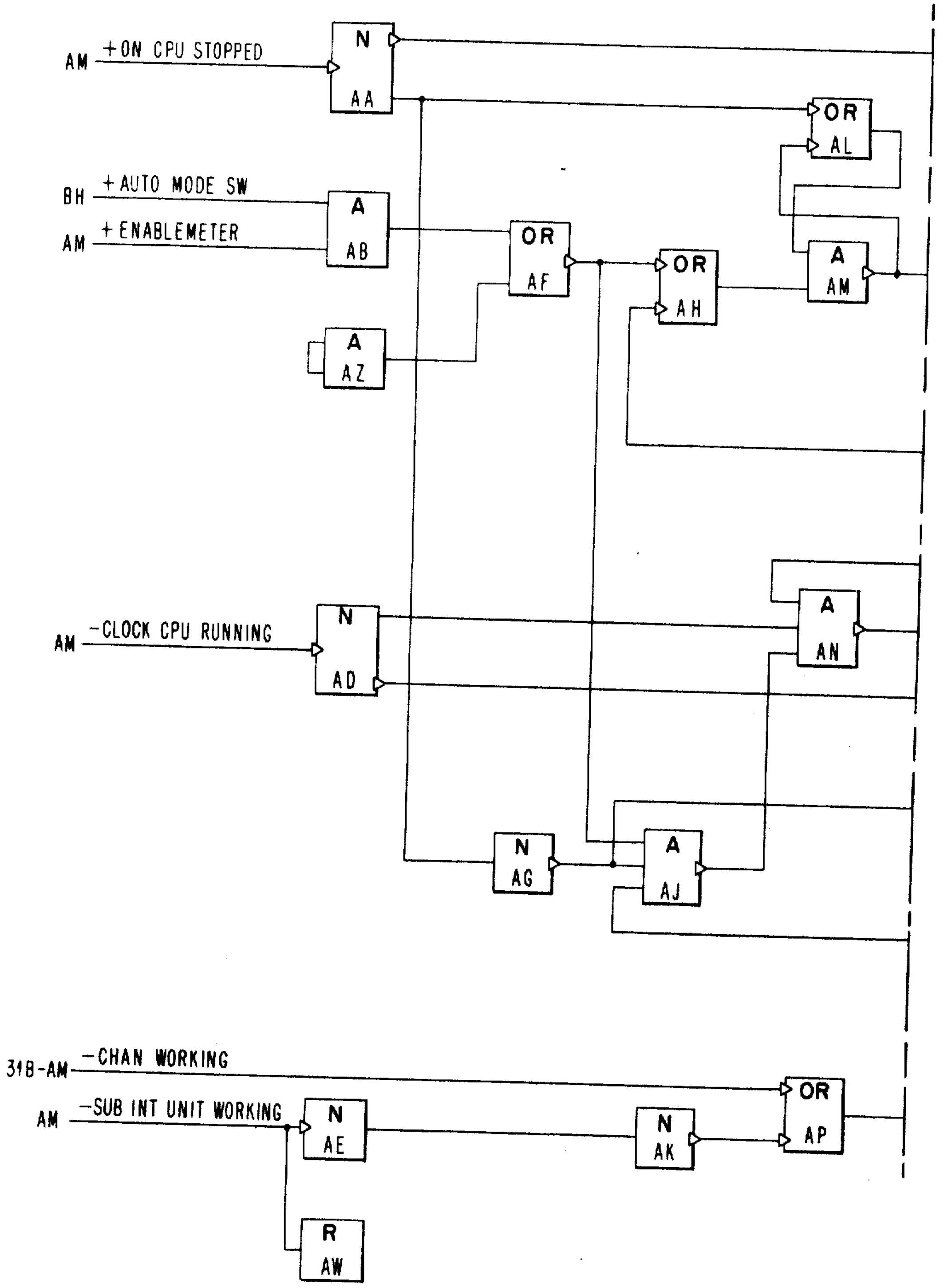
Figure 127B:
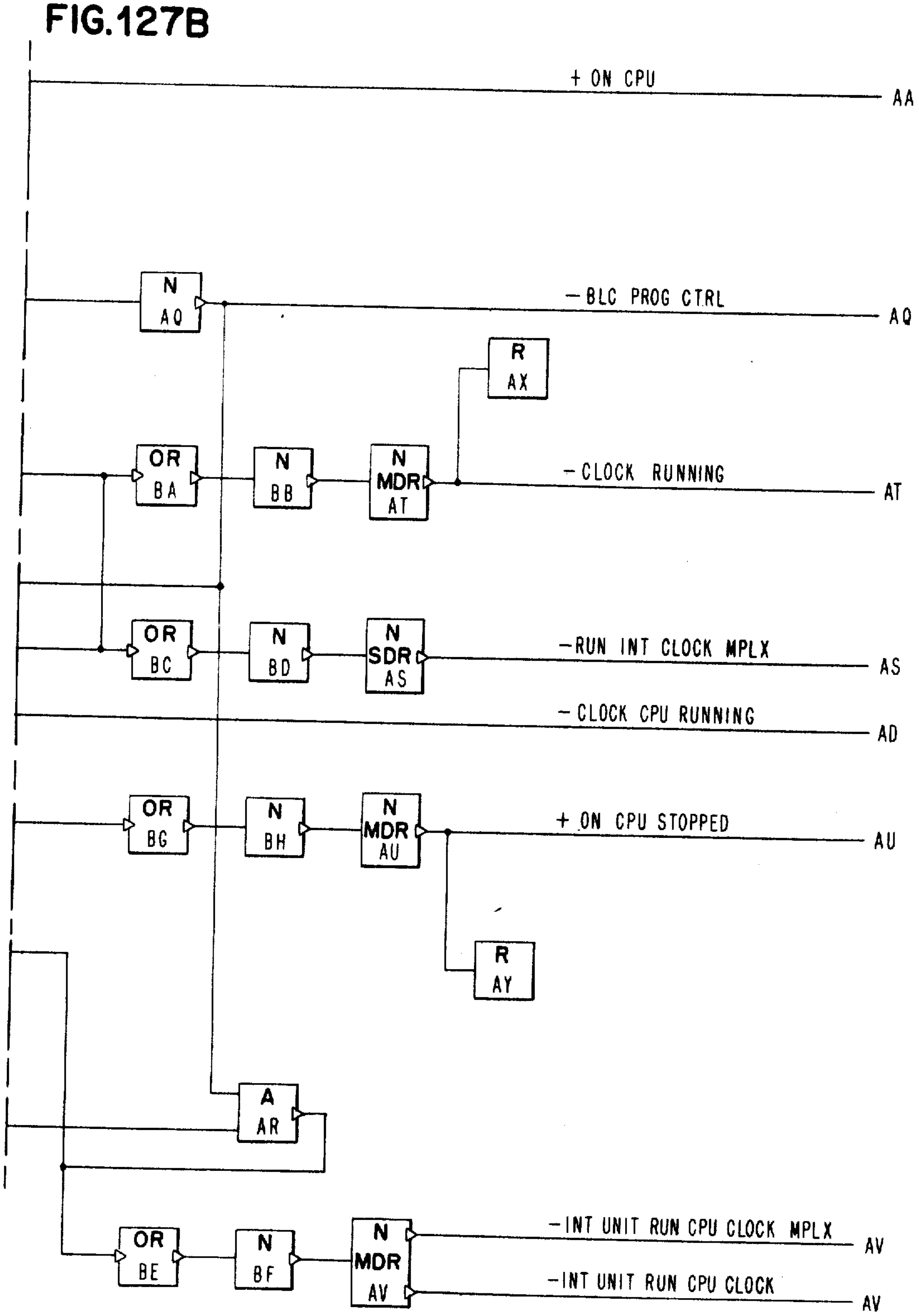
Figure 128A:
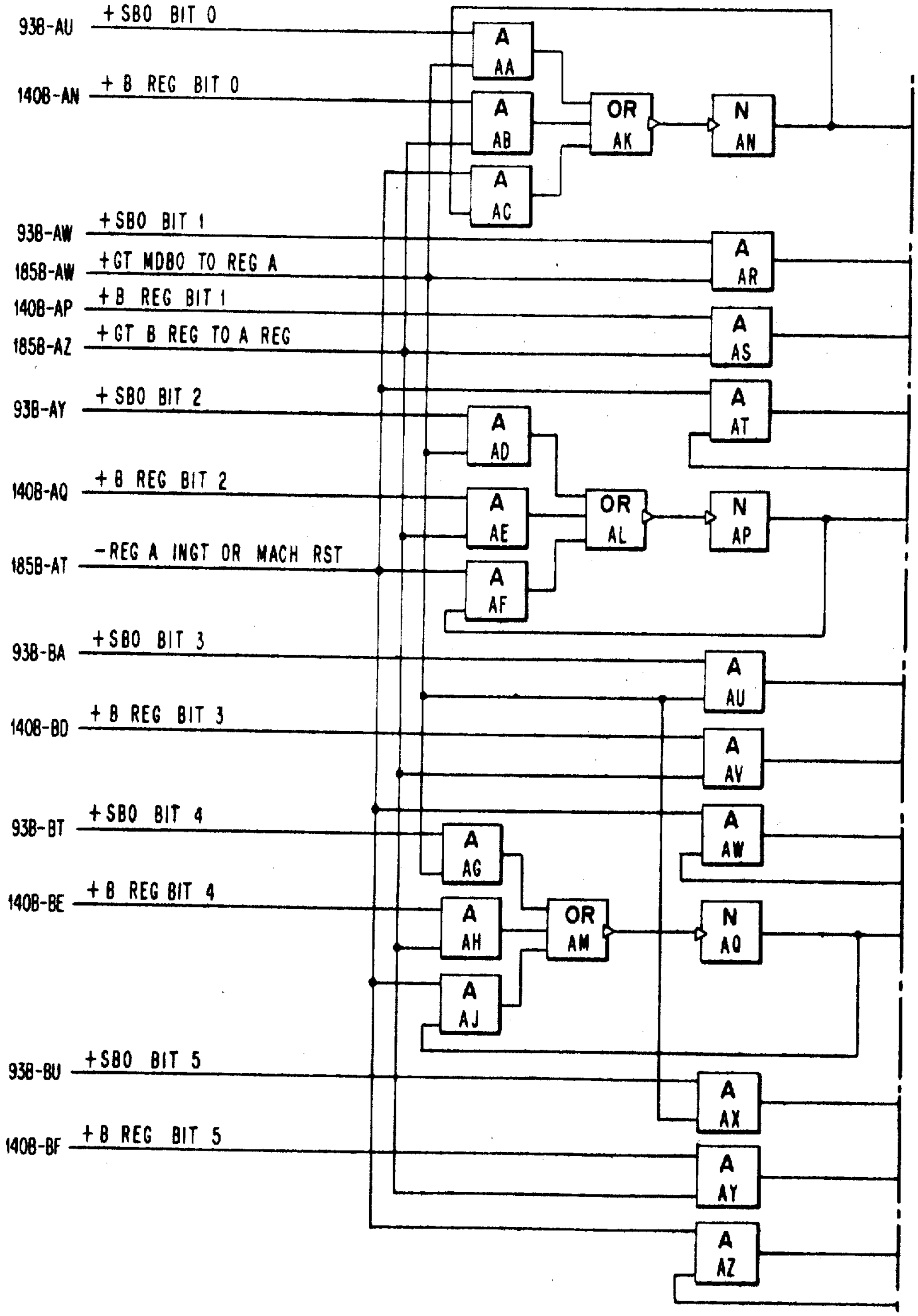
Figure 128B:
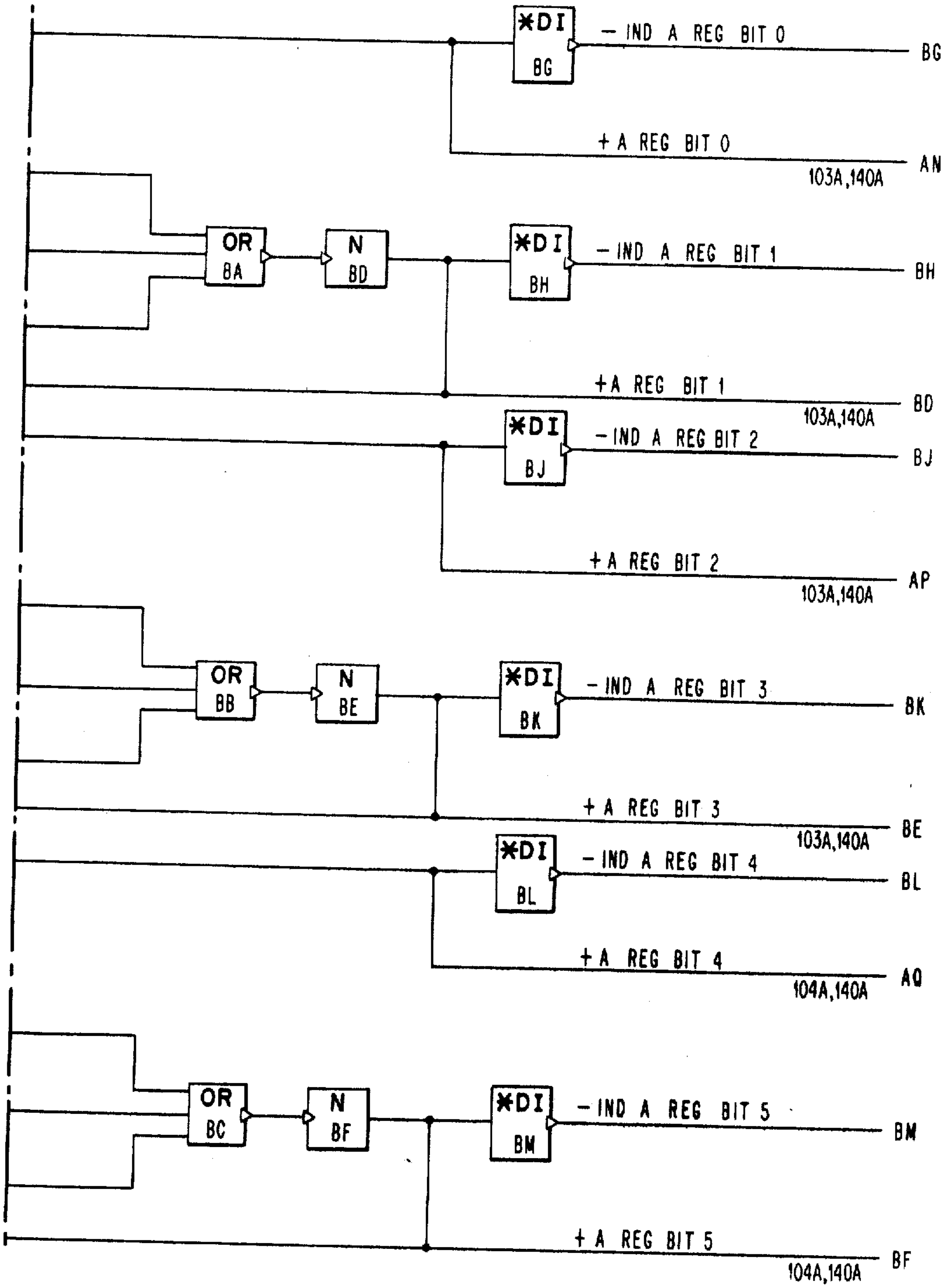
Figure 129A:
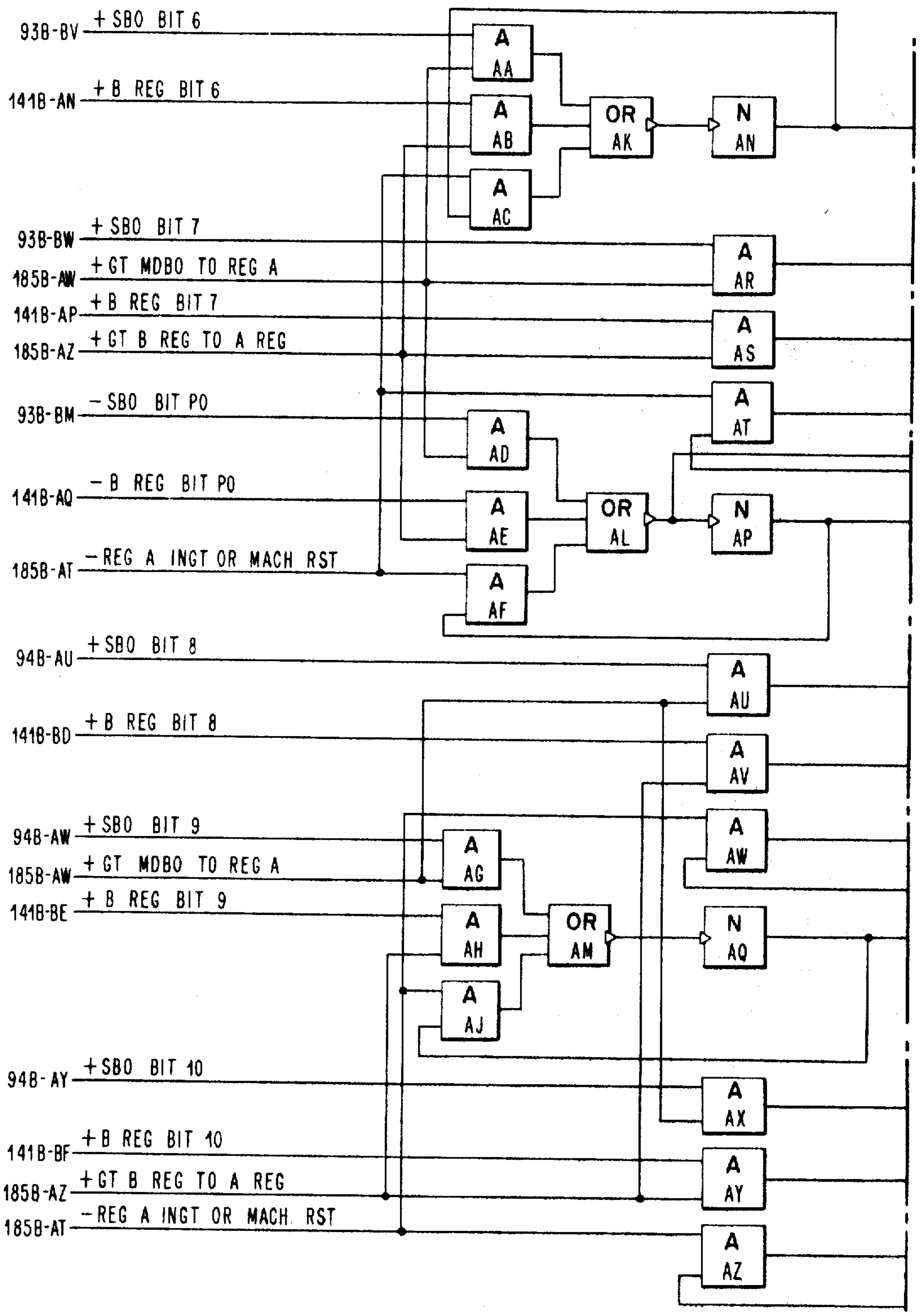
Figure 129B:
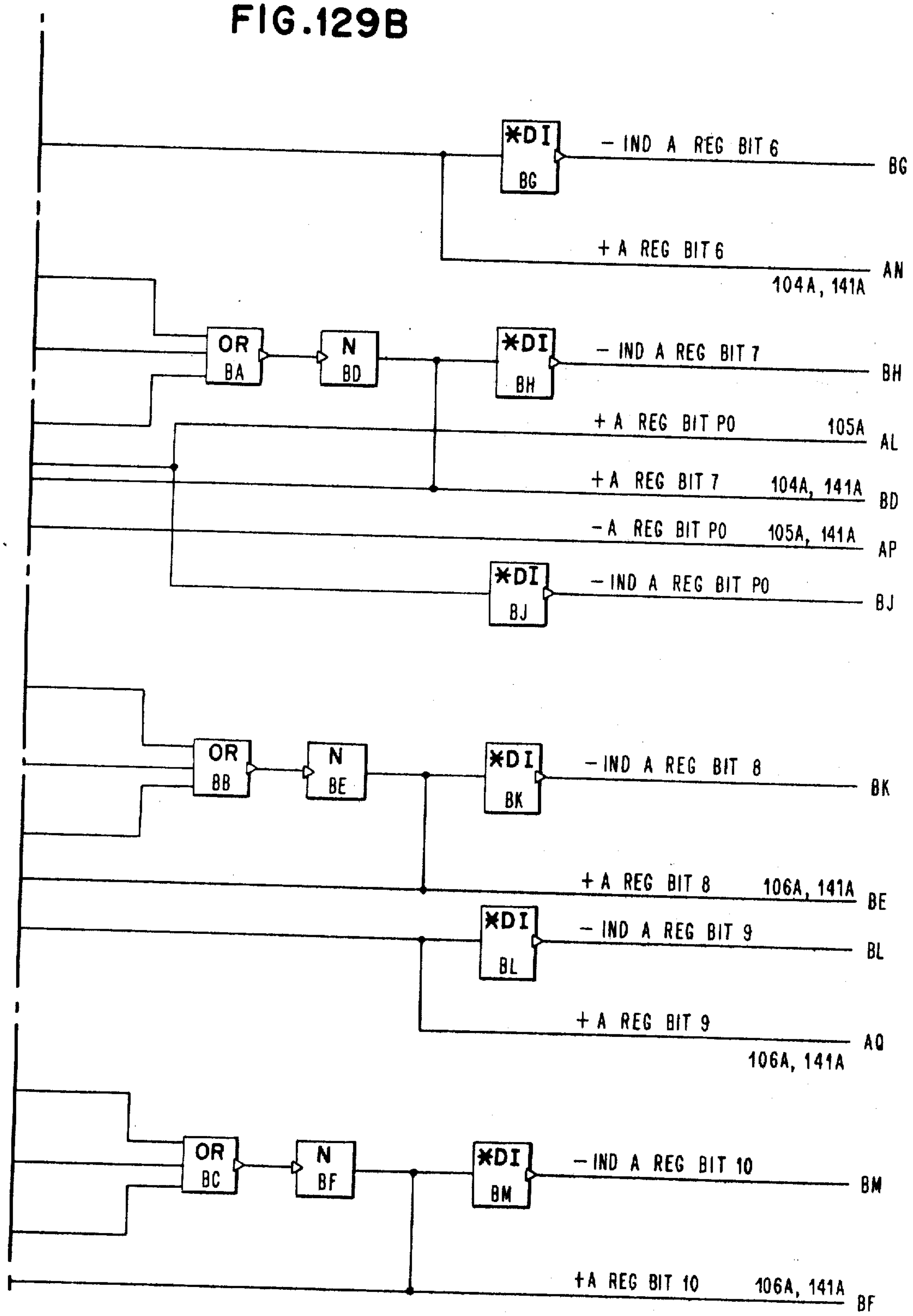
Figure 130A:
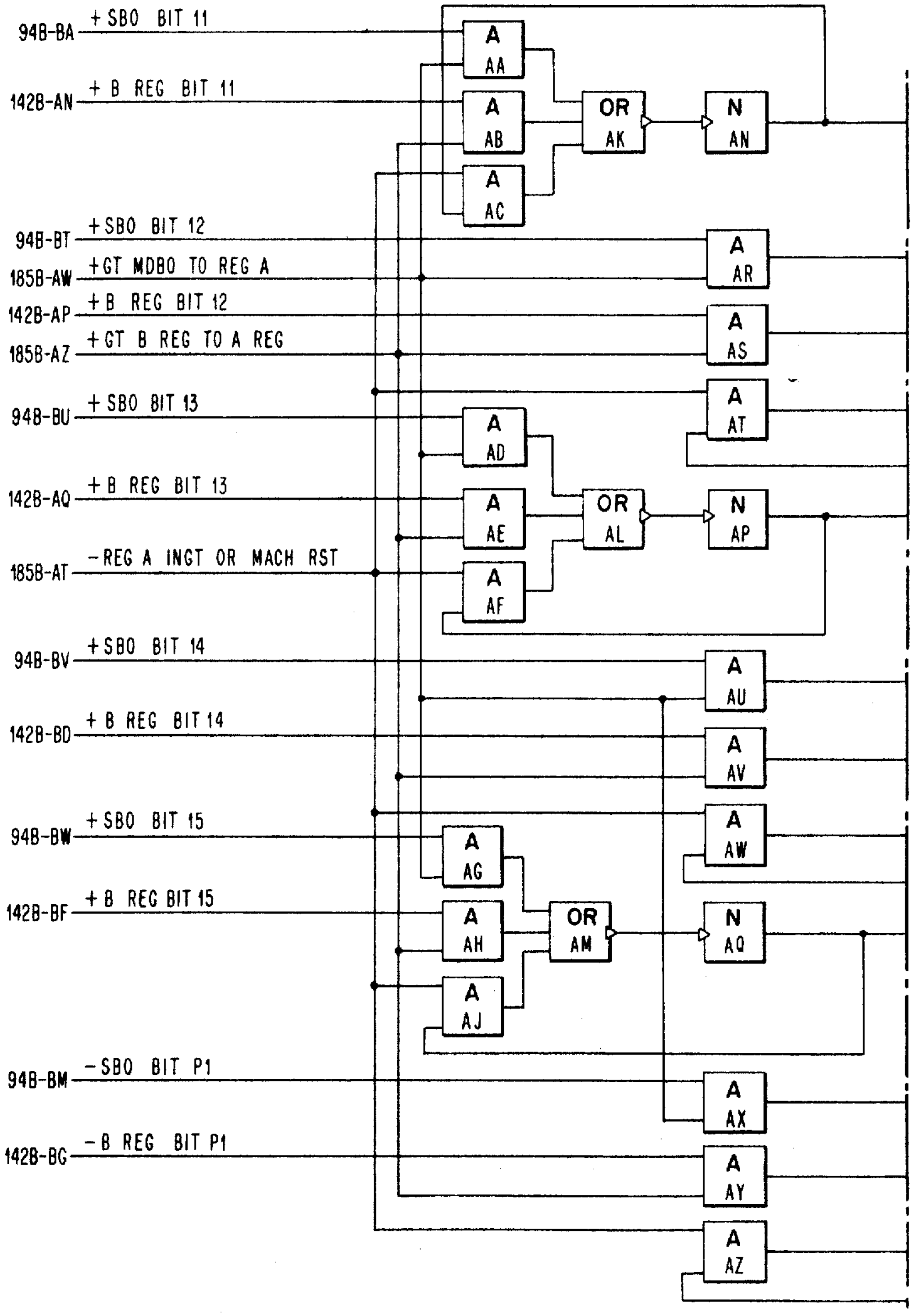
Figure 130B:
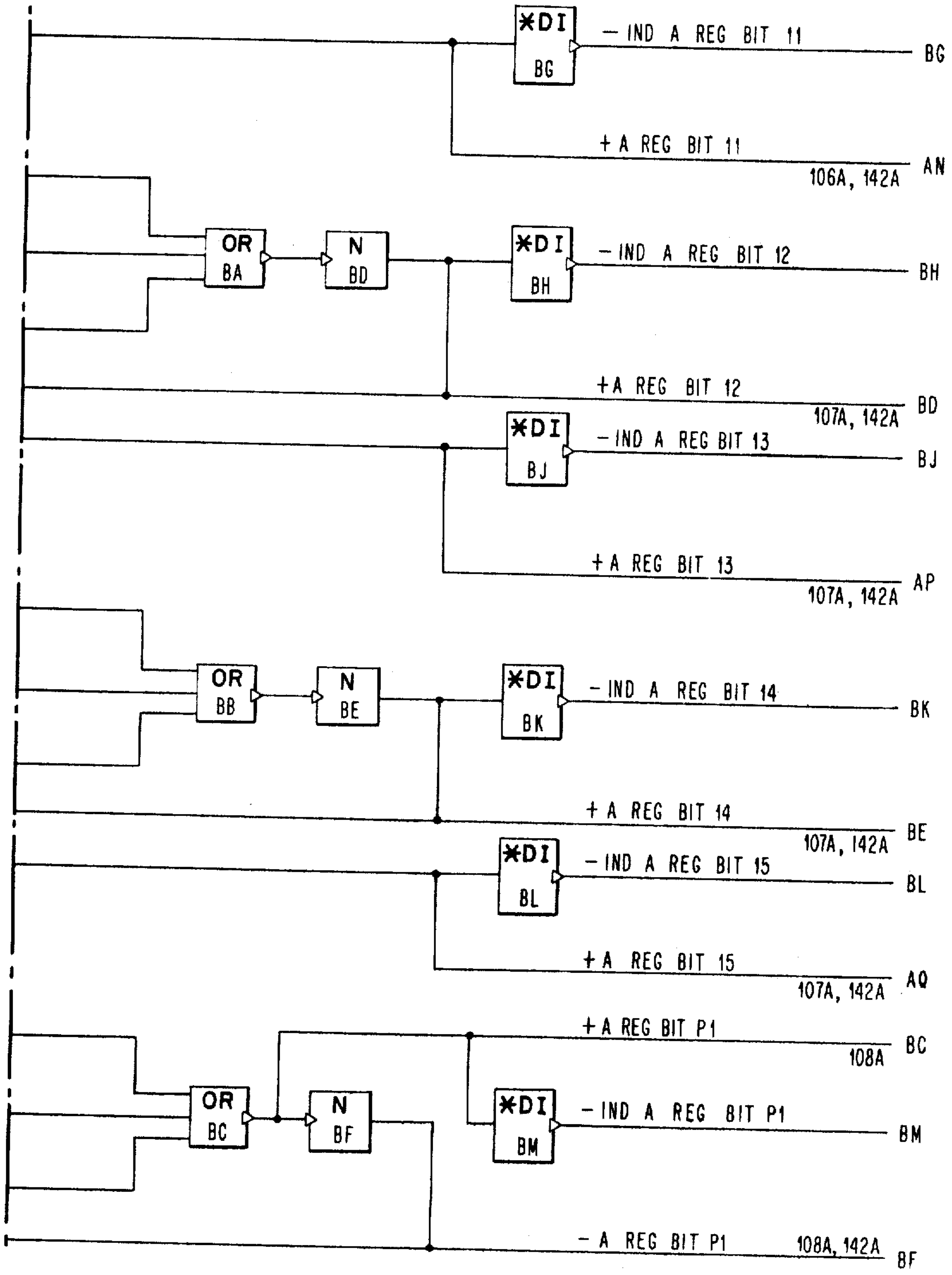
Figure 131A:
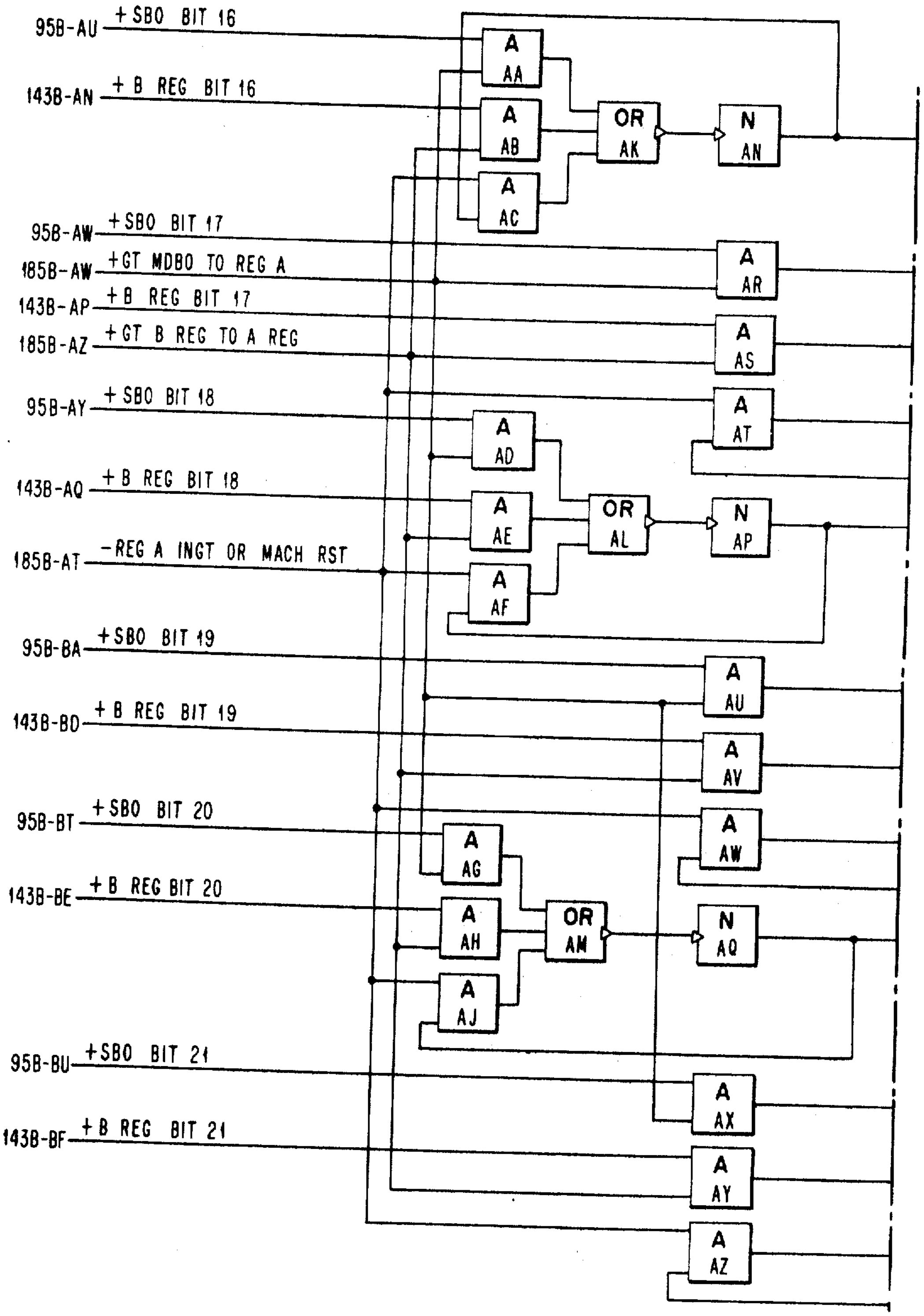
Figure 131B:
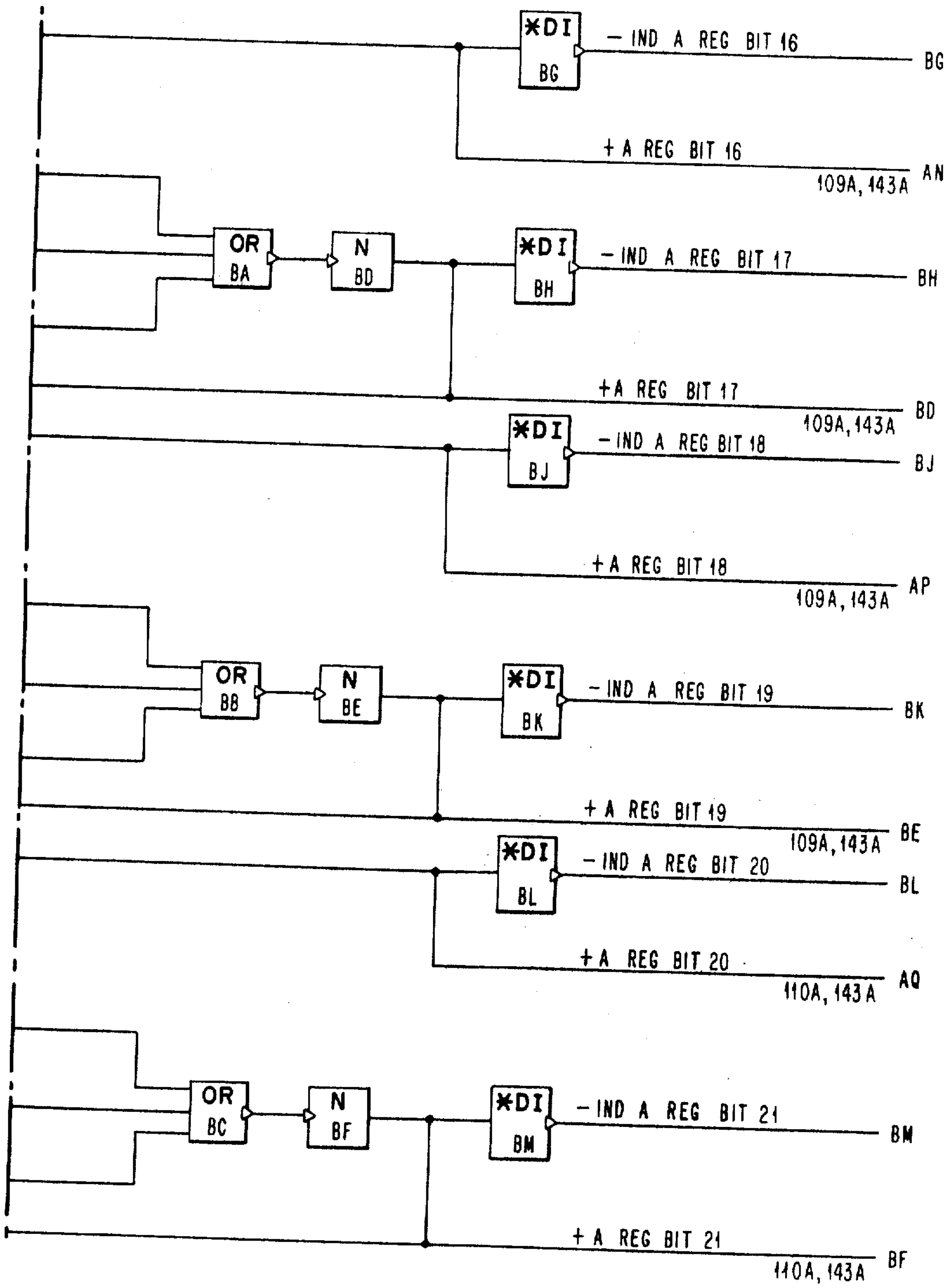
Figure 132A:
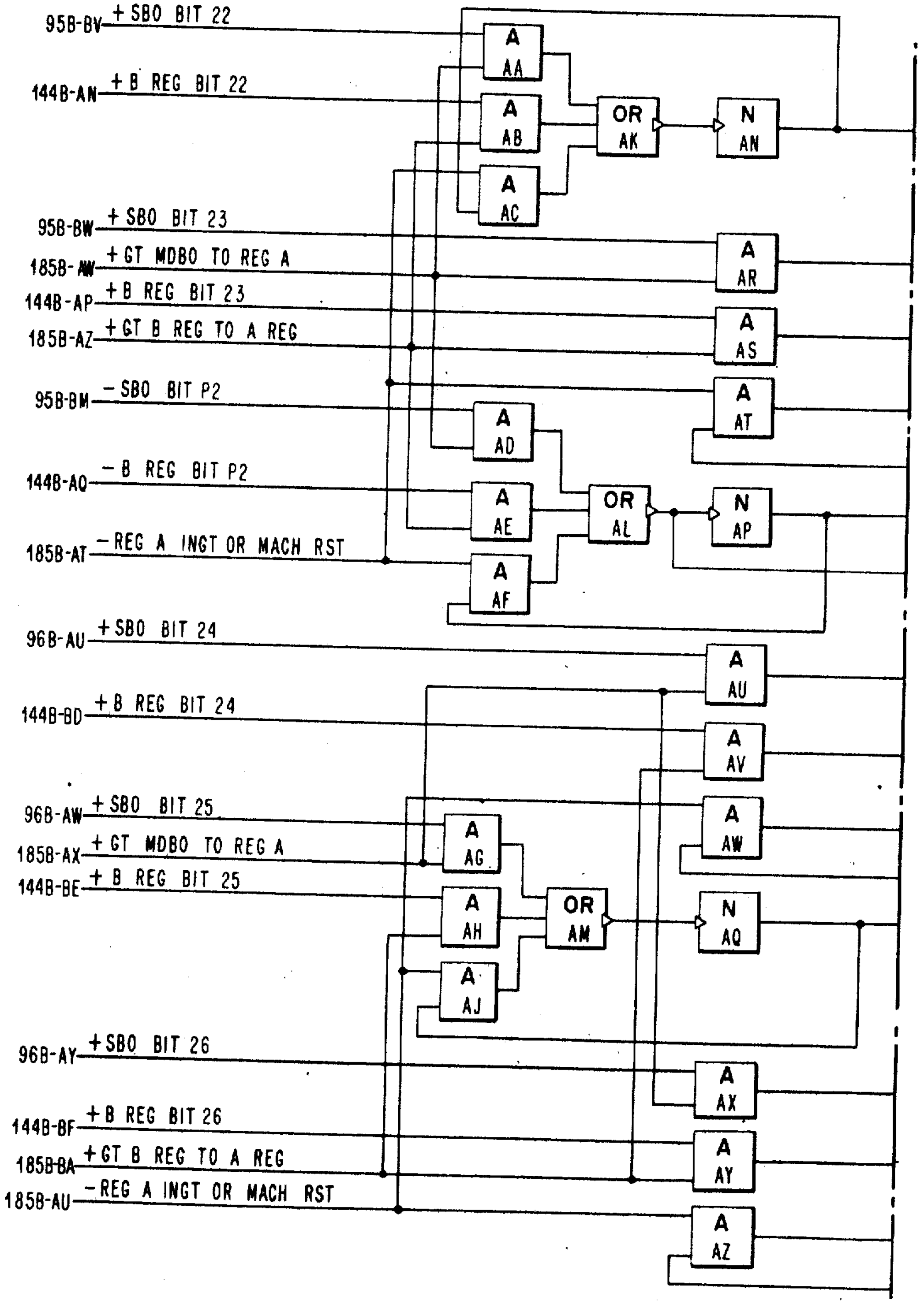
Figure 132B:
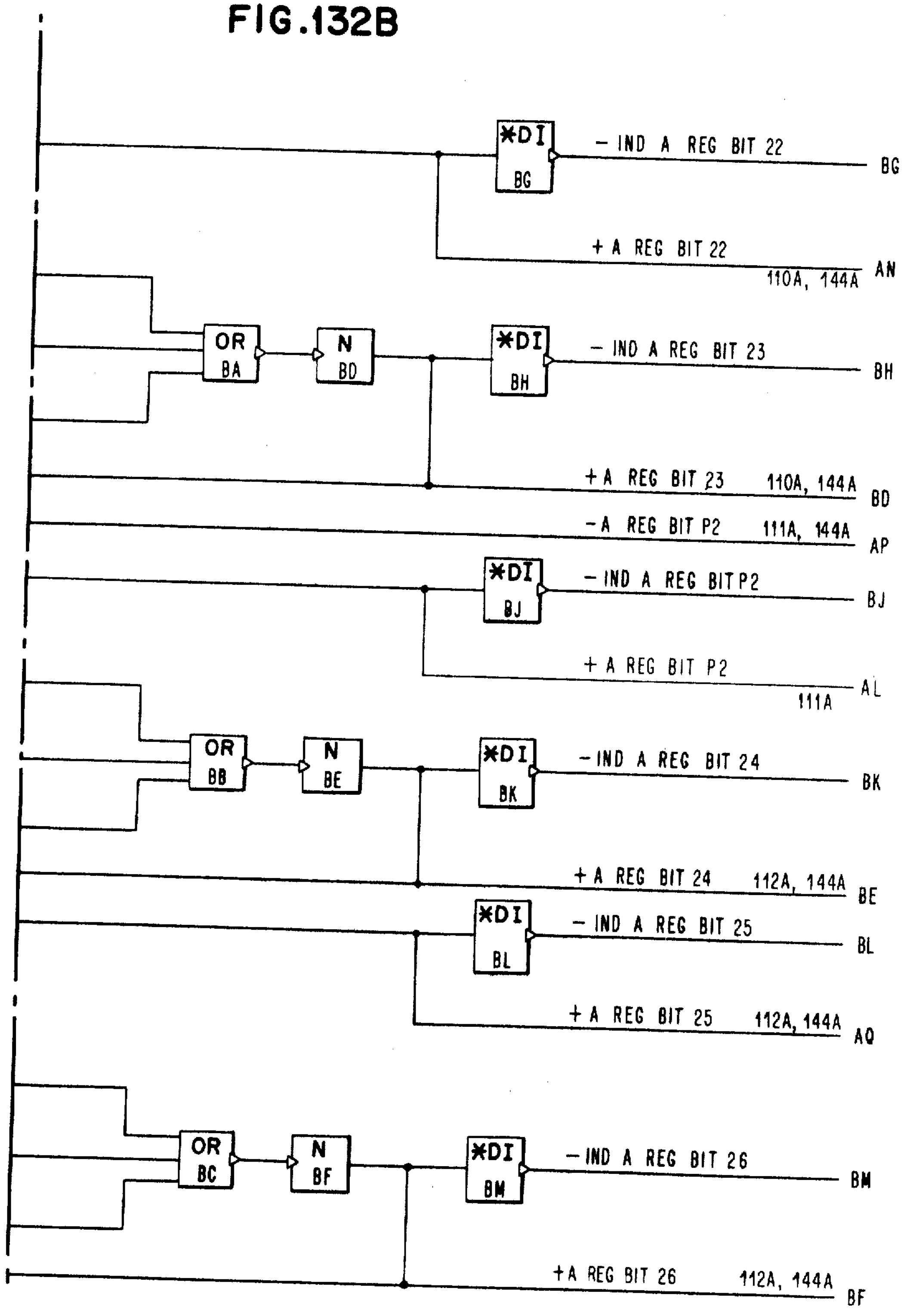
Figure 133A:
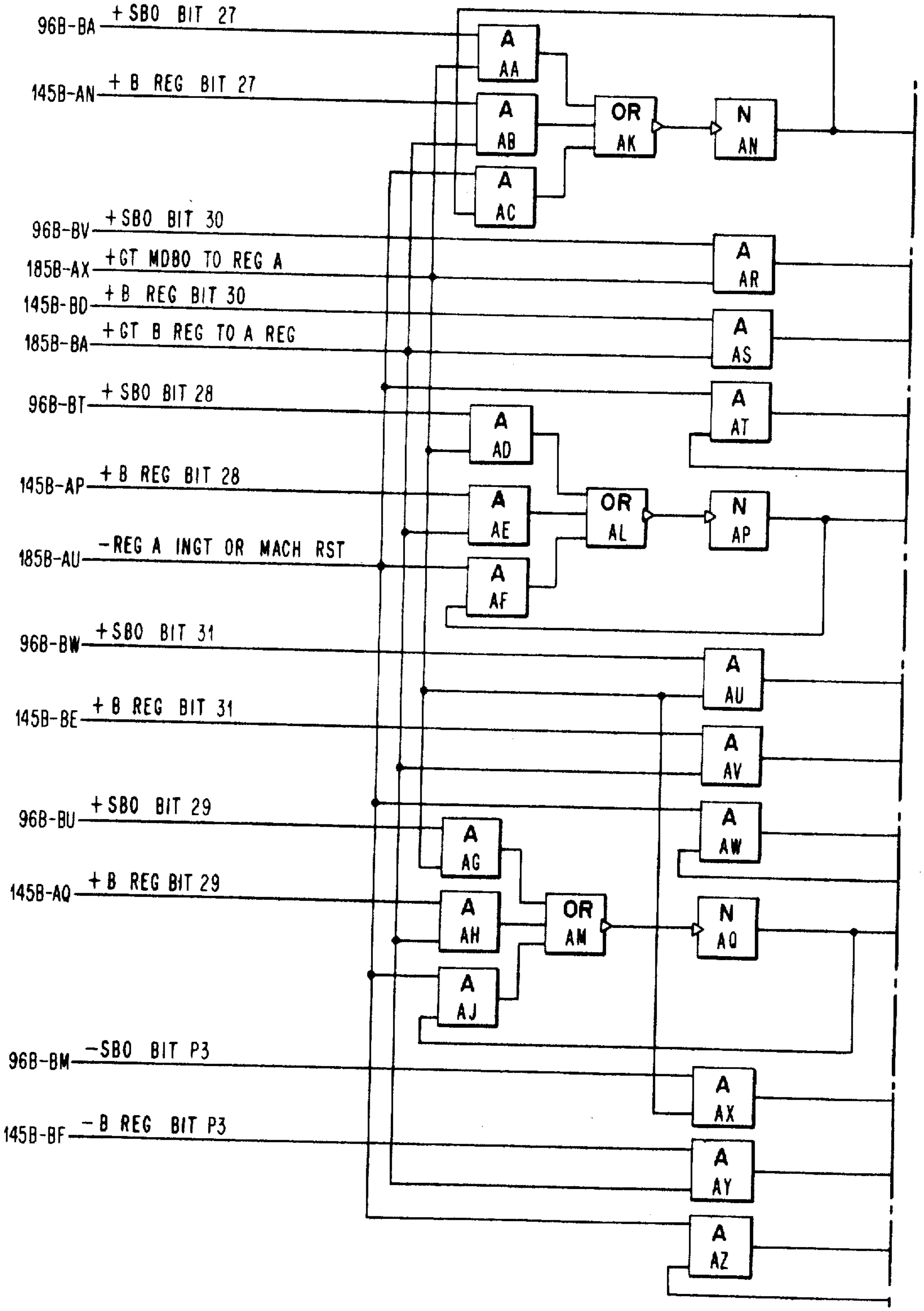
Figure 133B:
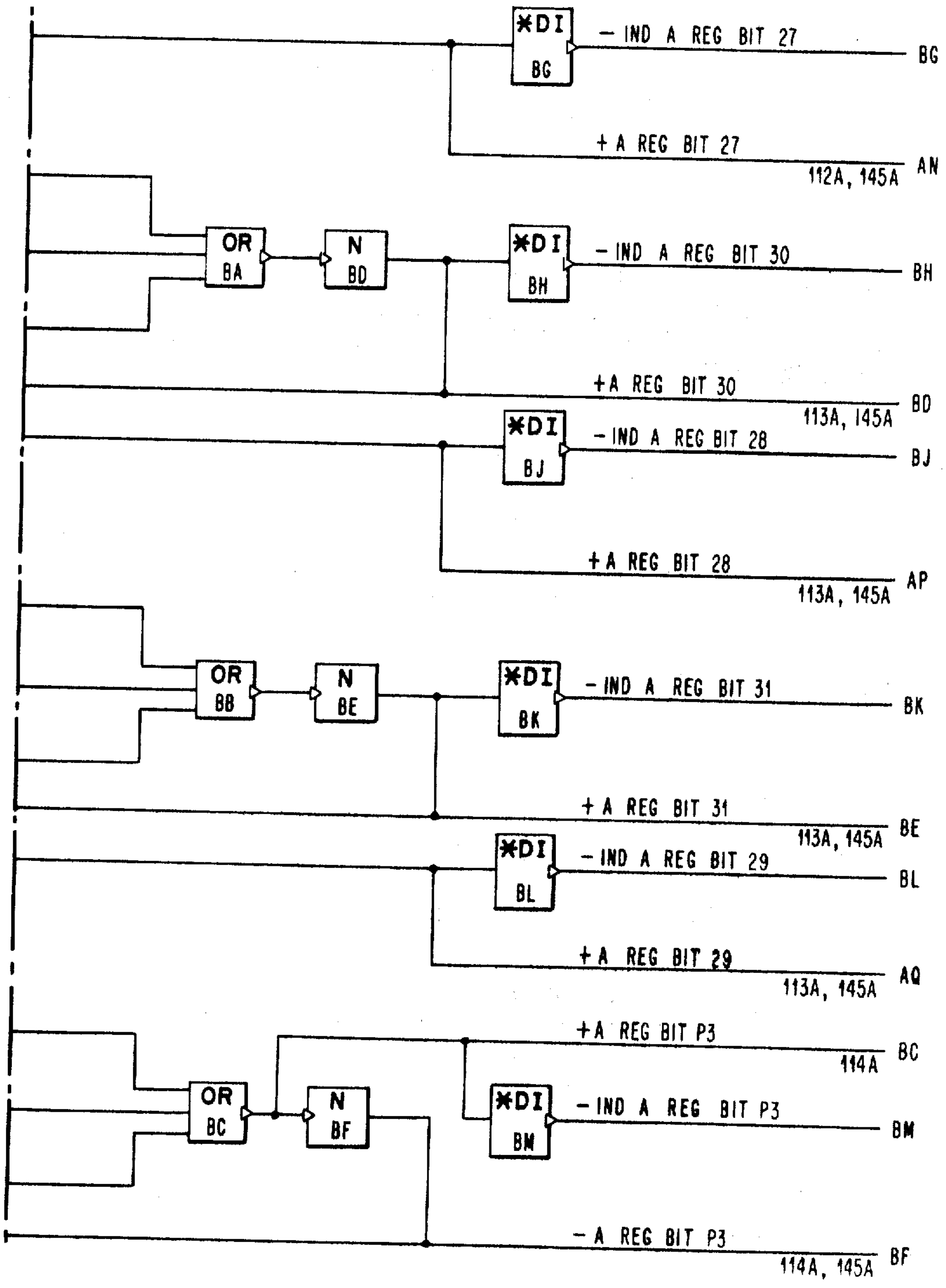
Figure 134A:
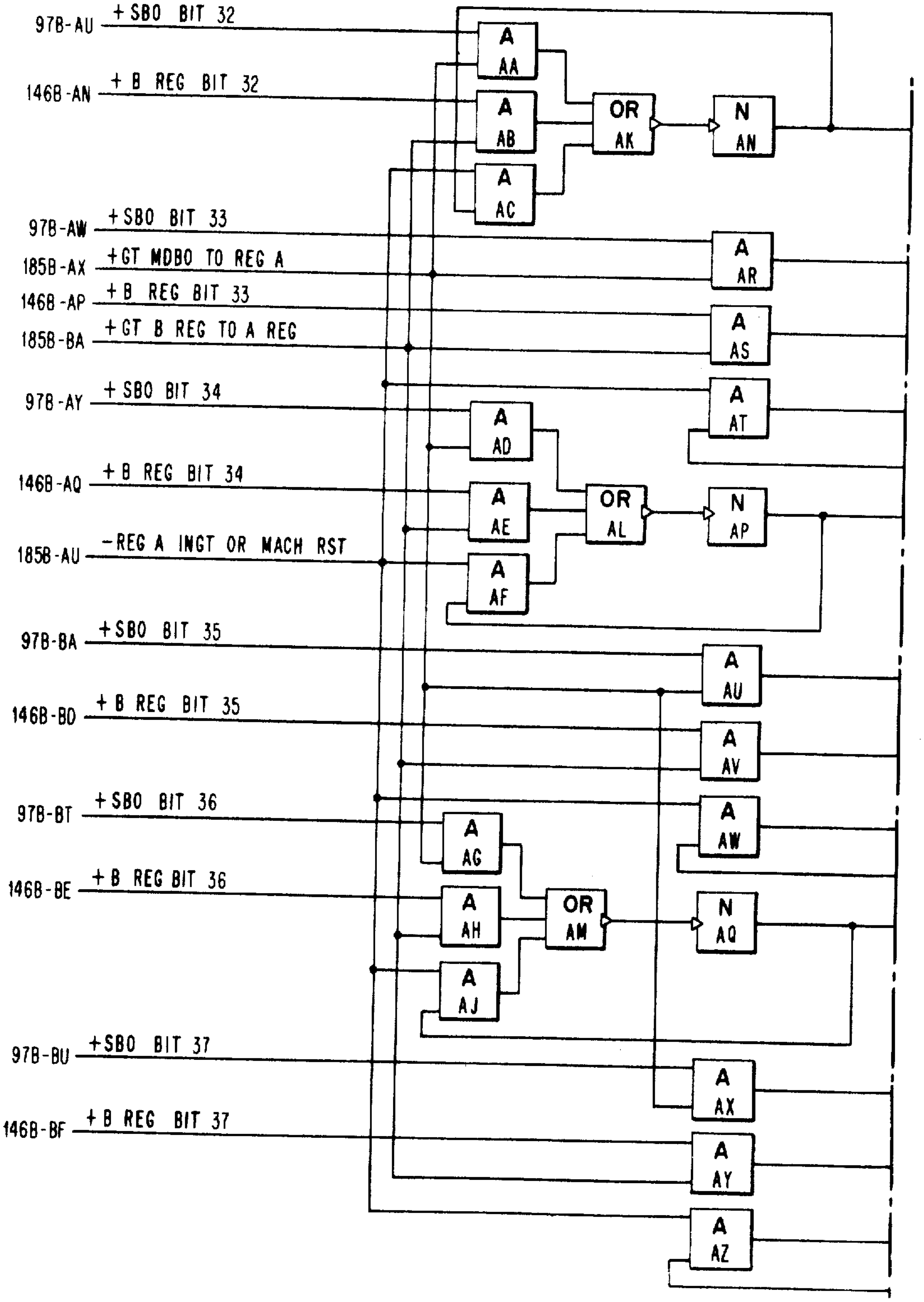
Figure 134B:
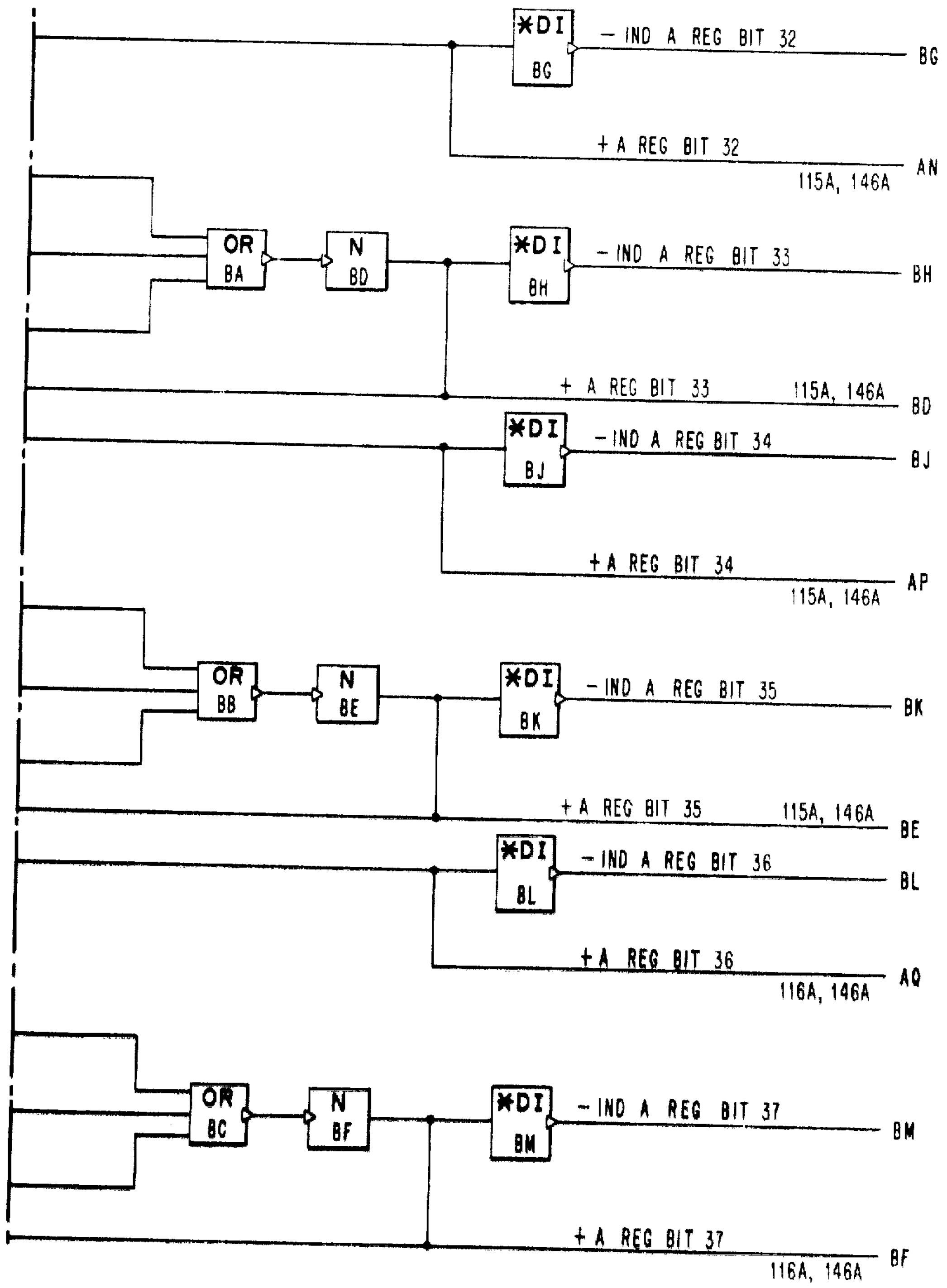
Figure 135A:
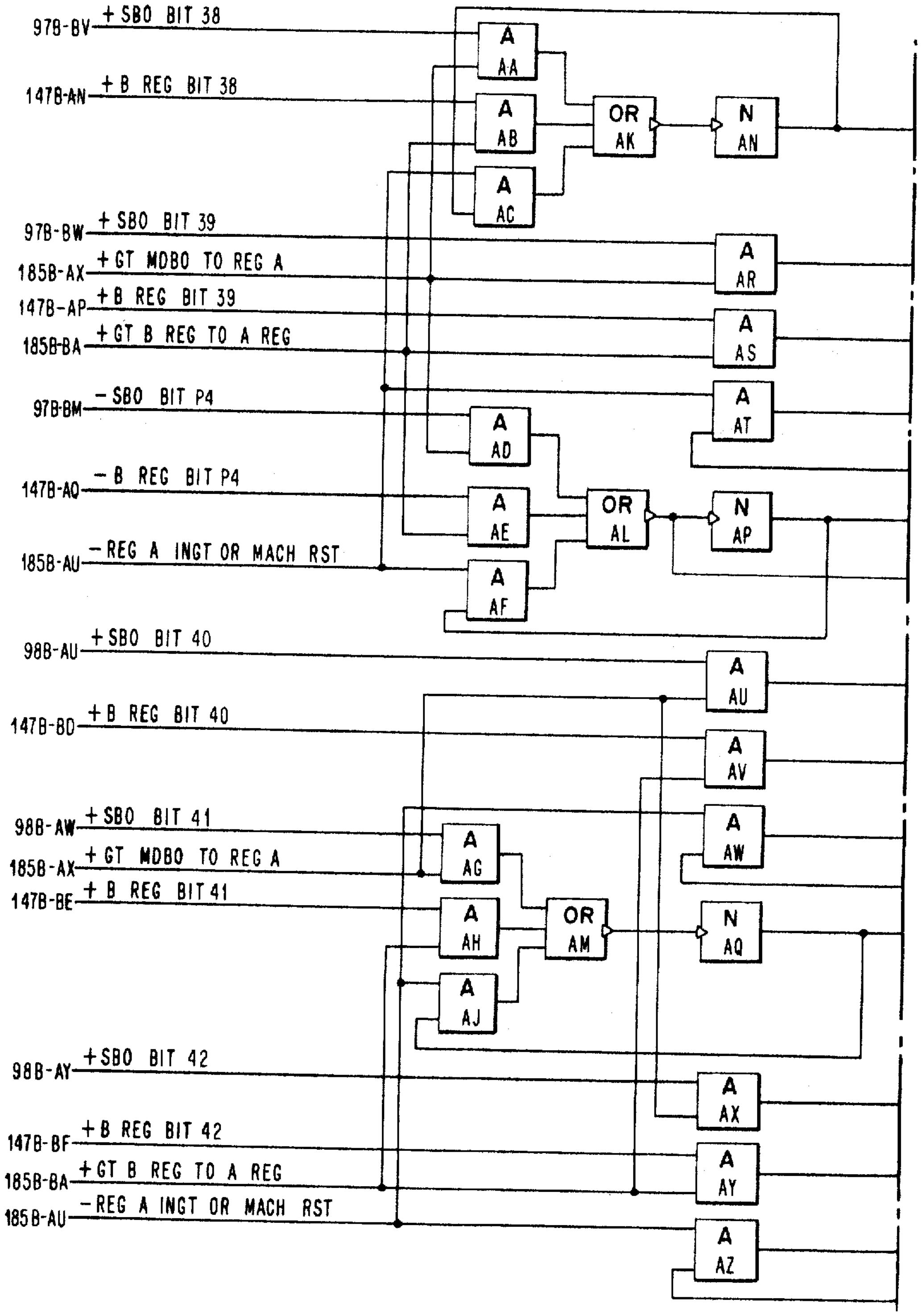
Figure 135B:
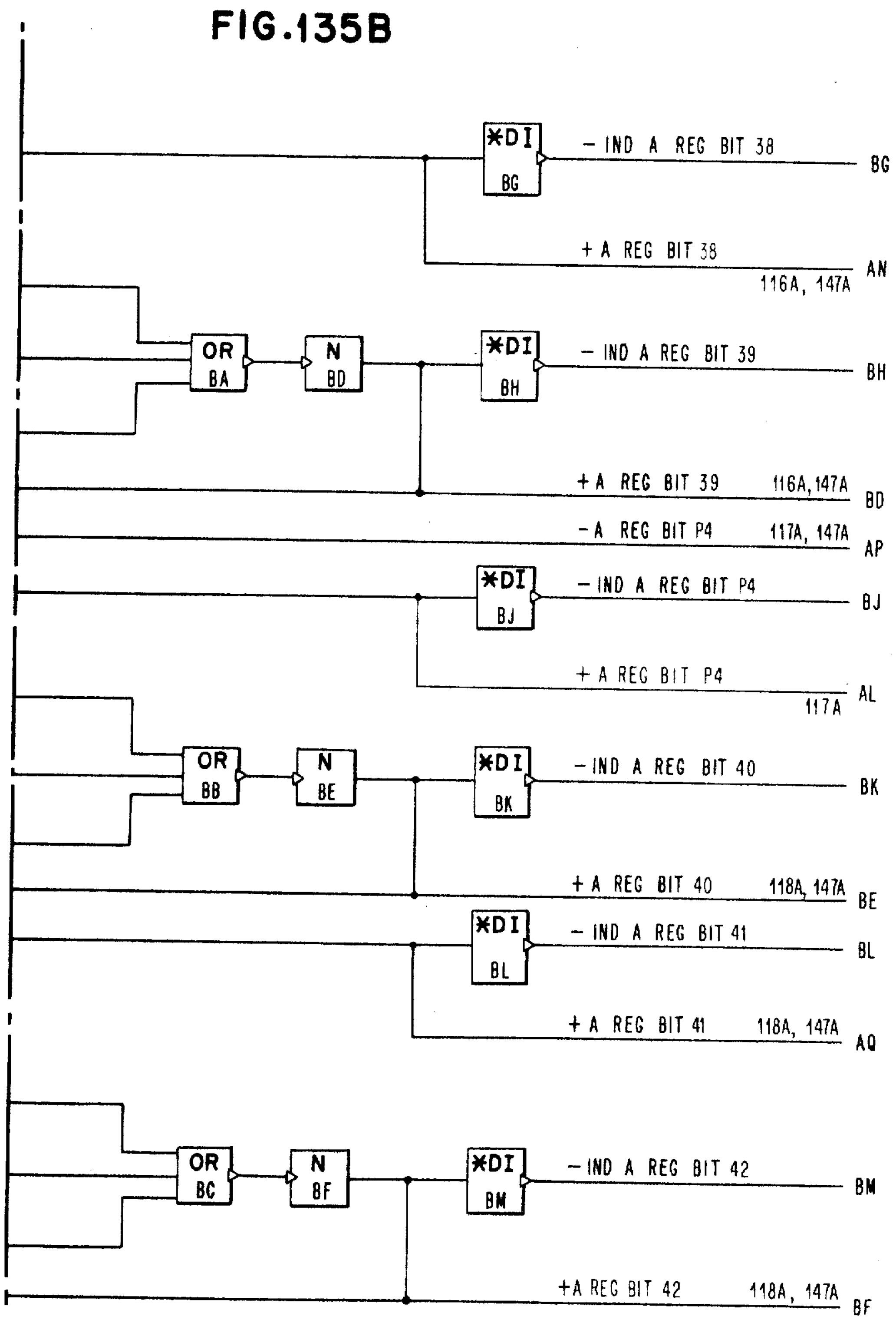
Figure 136A:
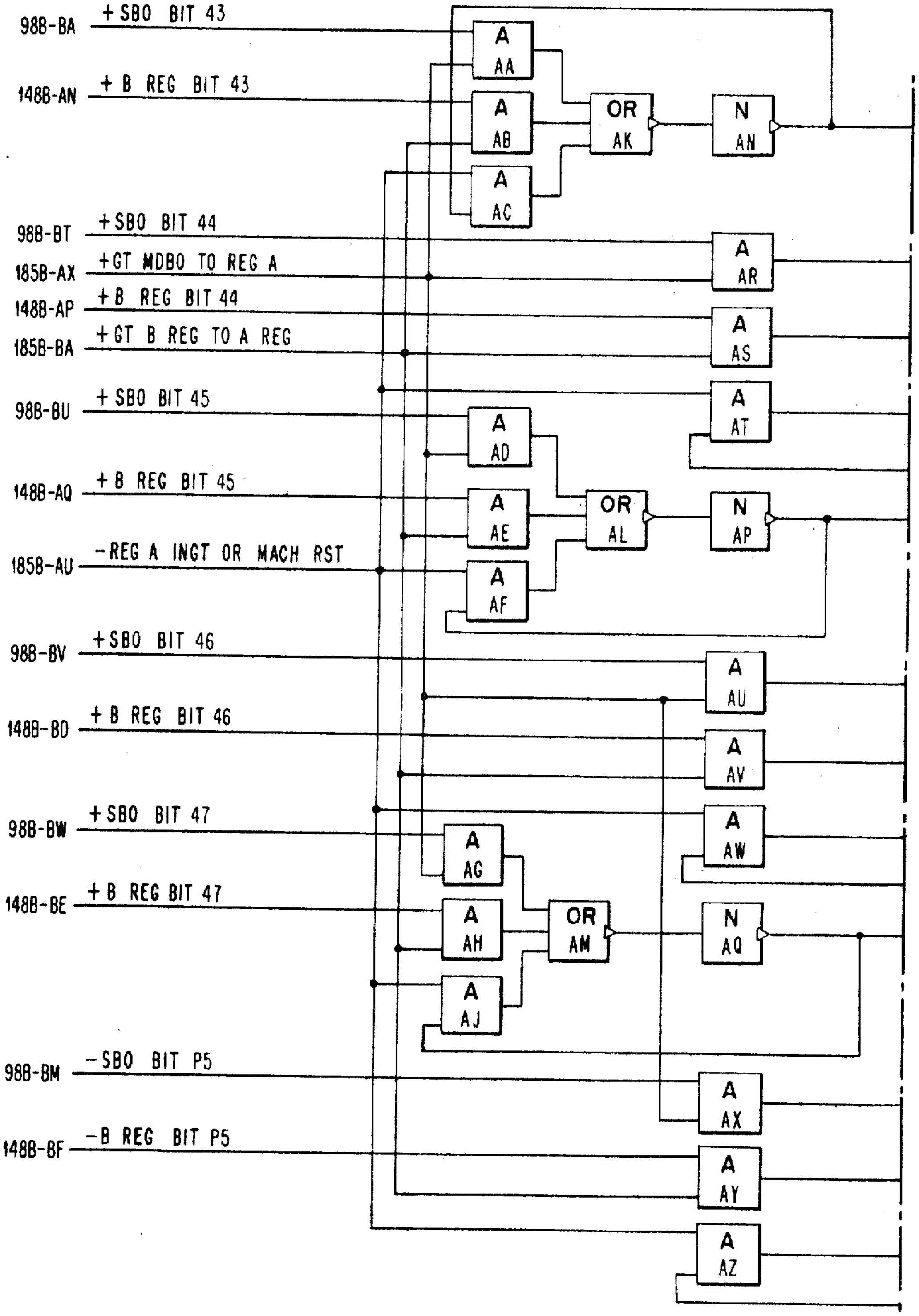
Figure 136B:
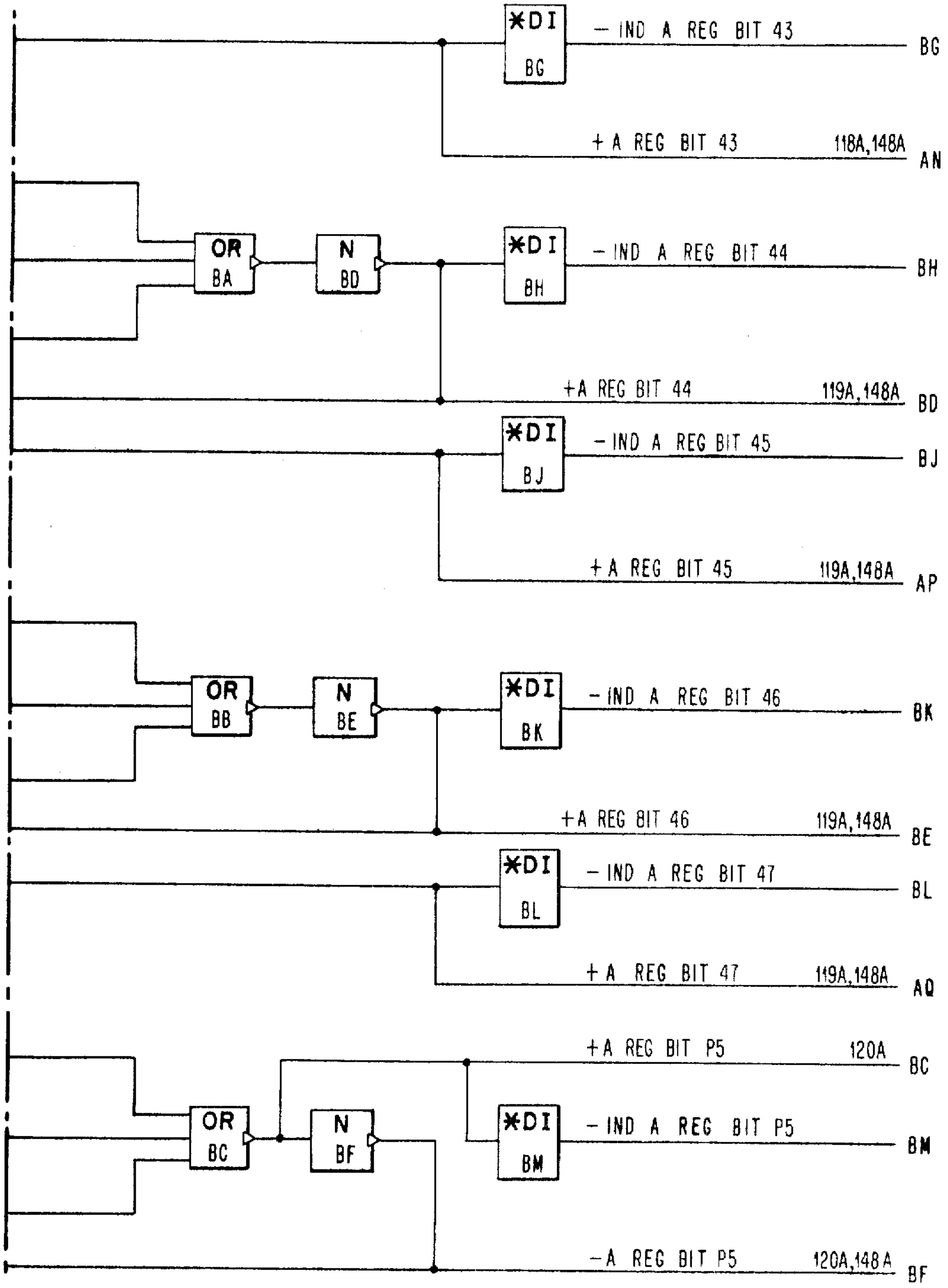
Figure 137A:
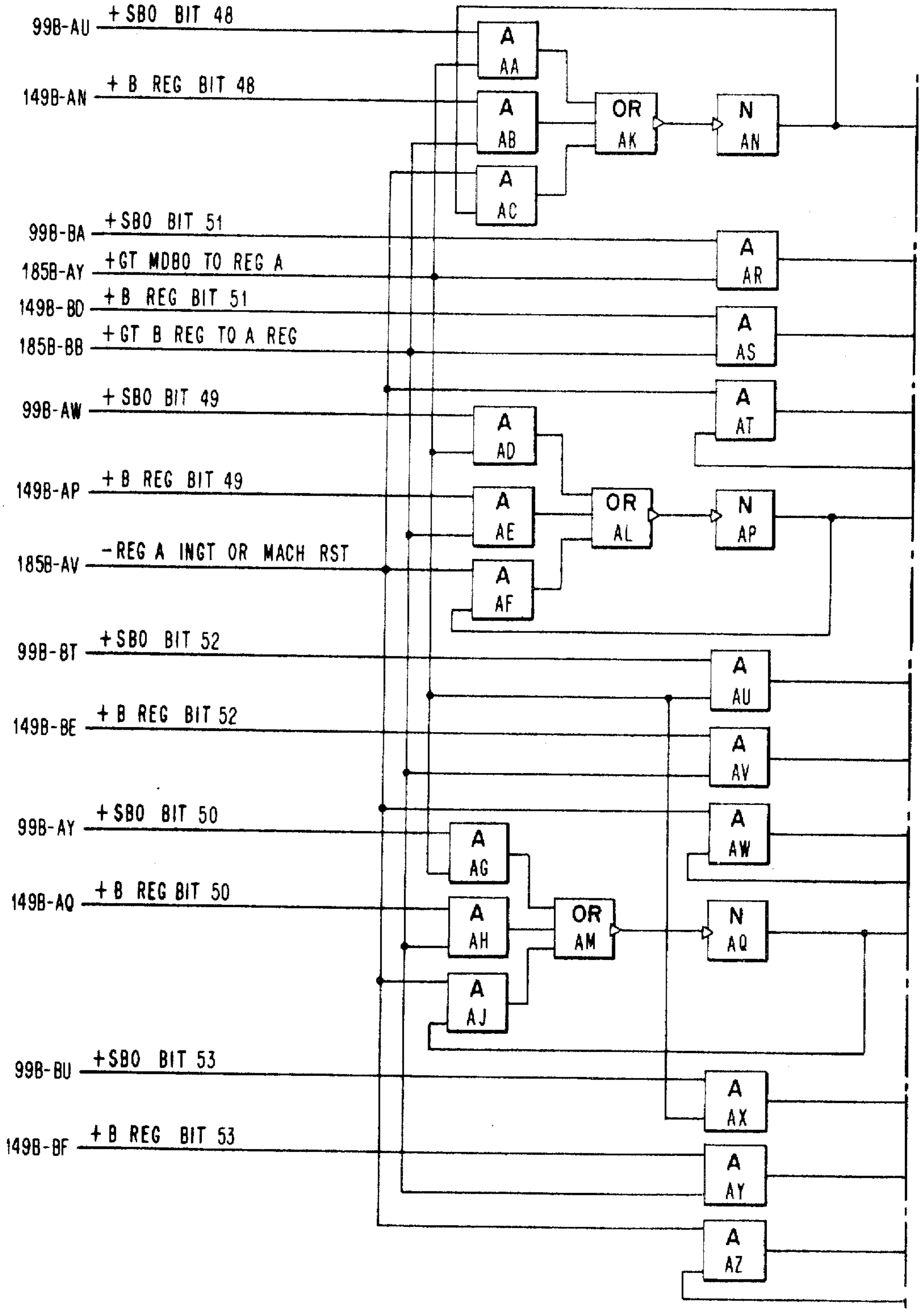
Figure 137B:
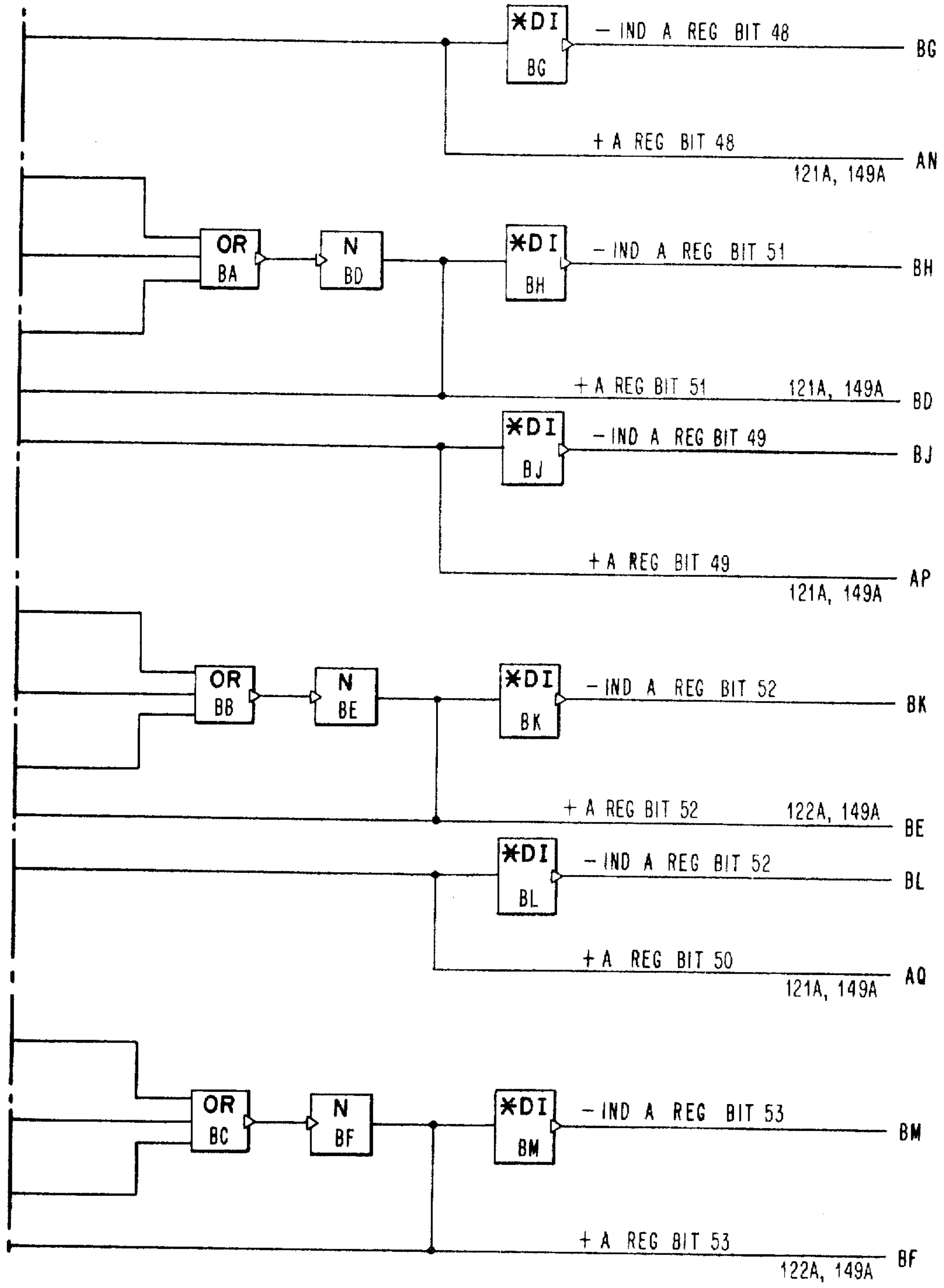
Figure 138A:
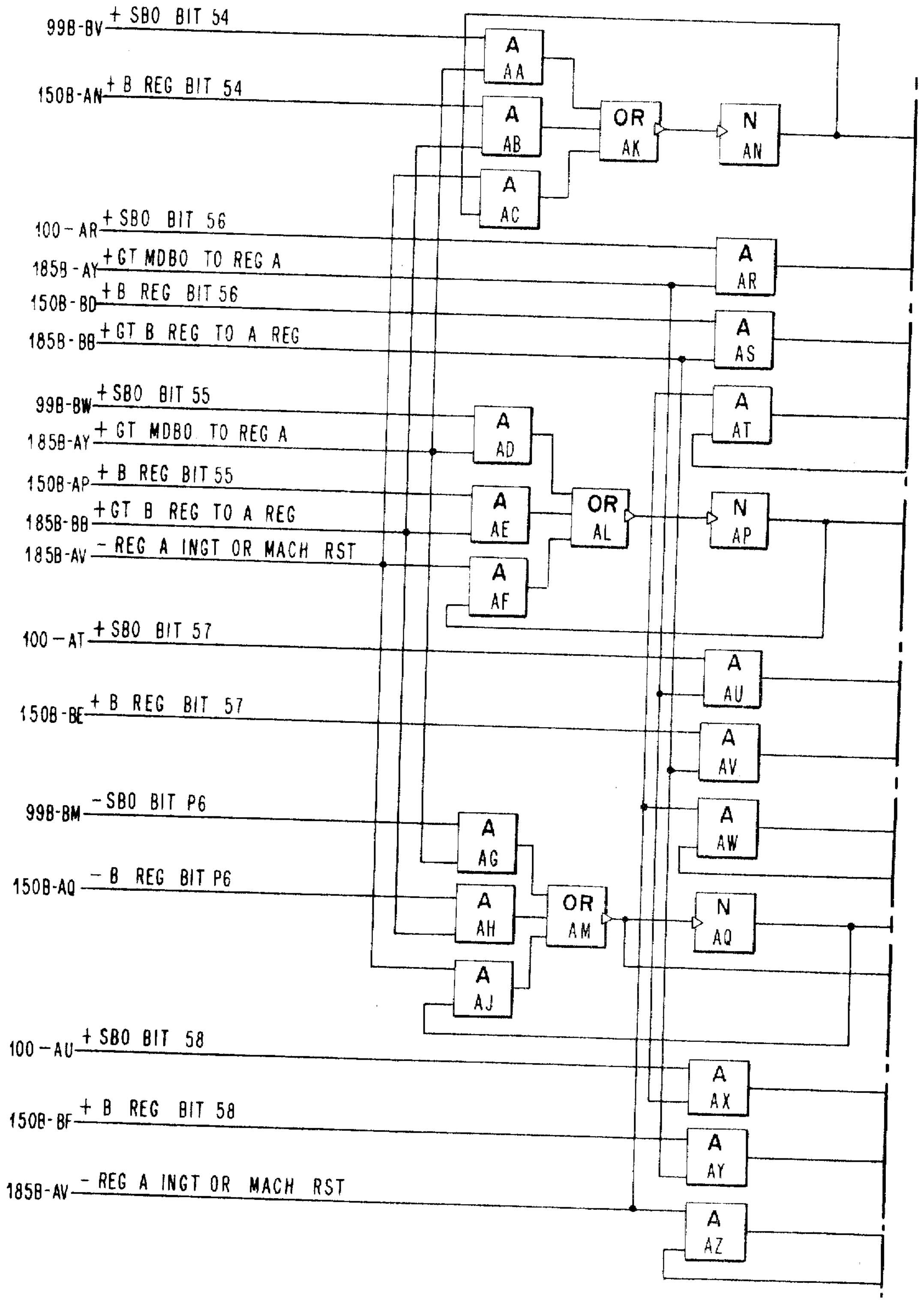
Figure 138B:
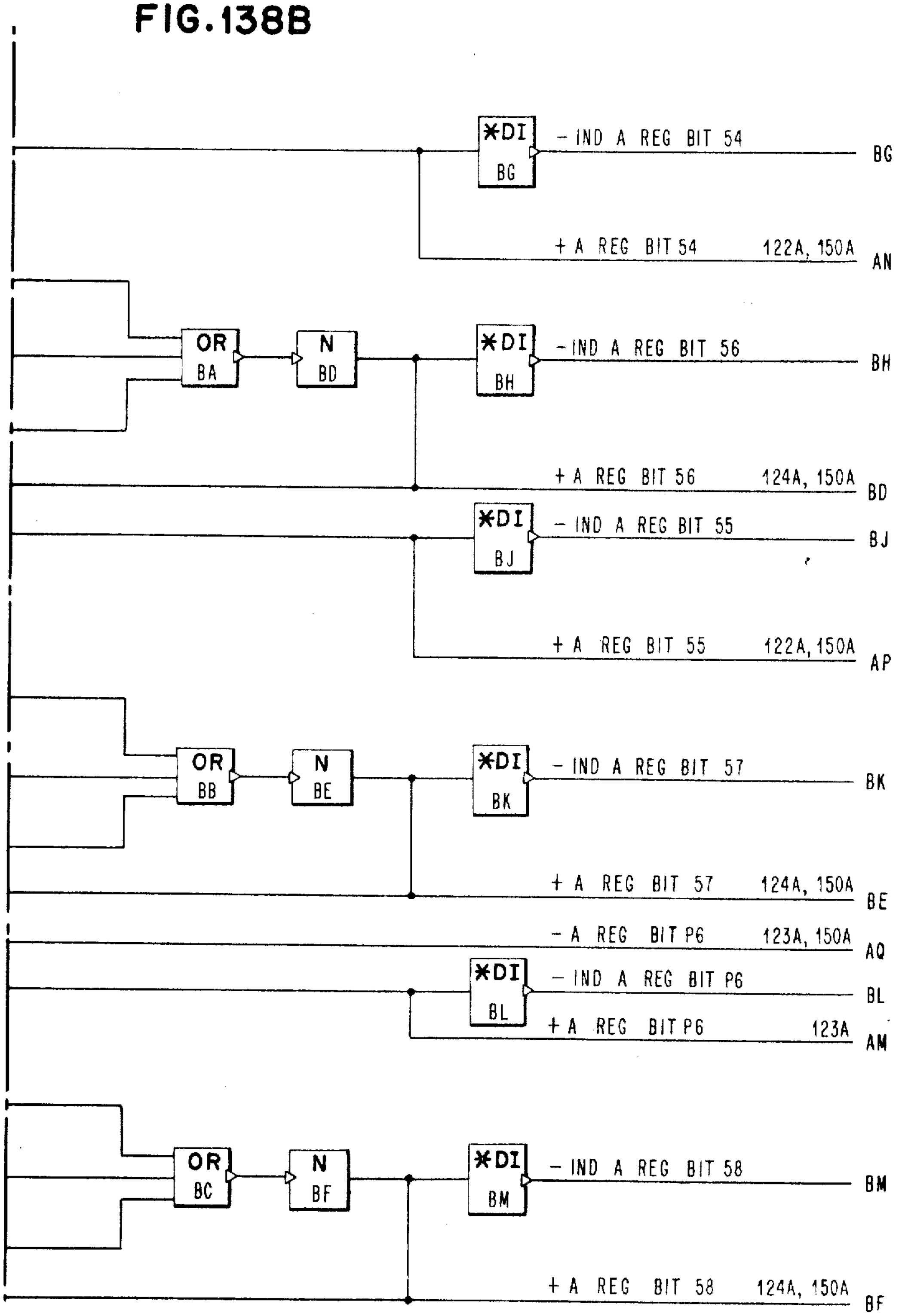
Figure 139A:
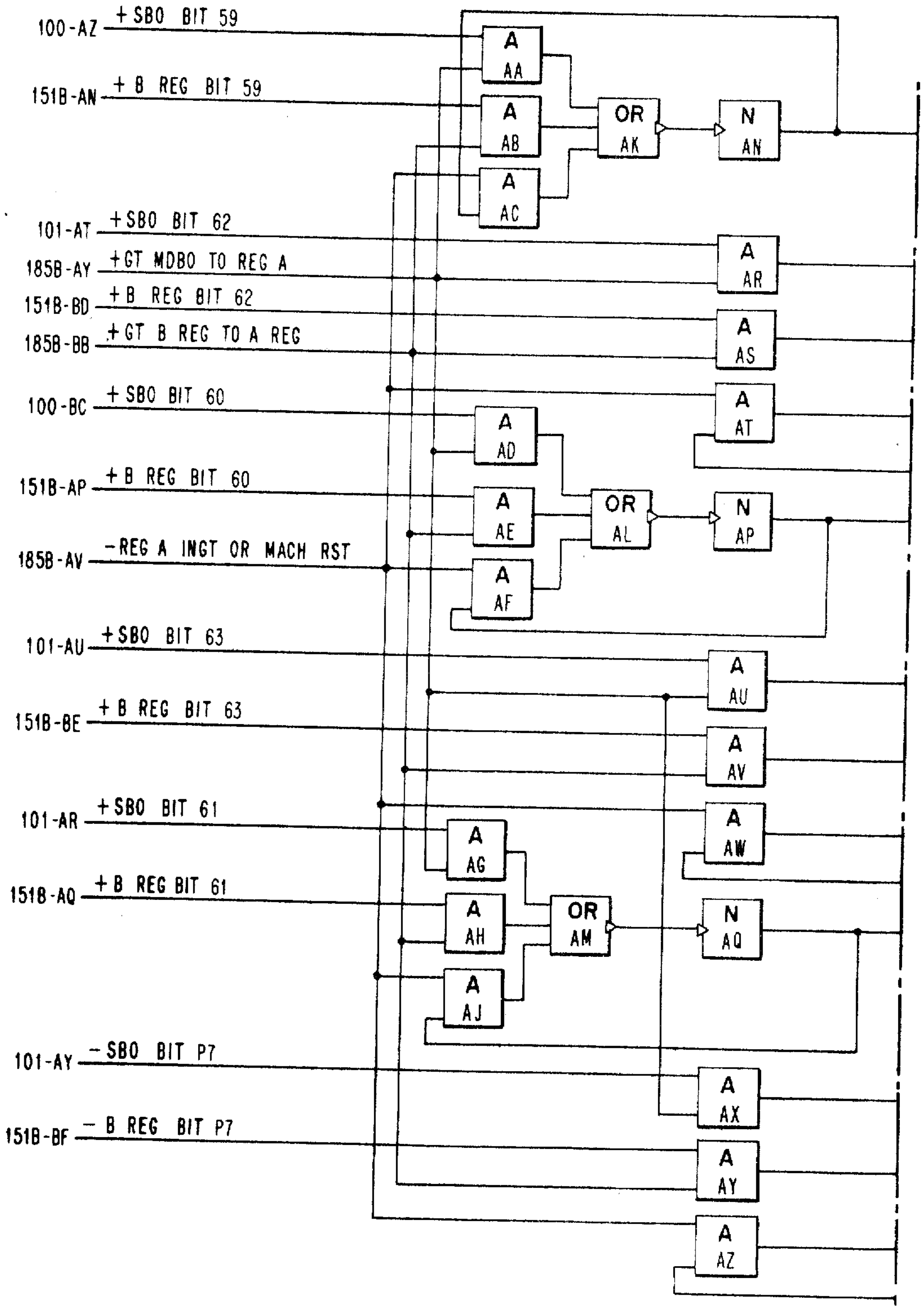

152A and B where the address 72 is forced into the *command address register*. The second output of block AA goes to the AND circuit block AN and AP and is powered in the inverter block AQ. The output of block AQ is *—start I/O reset*. This line goes to FIGS. 173A and B where it resets the *memory protect registers*. *—start I/O reset* also goes to FIGS. 75A and B where it goes through the OR circuit block AE and the inverter block AH. The output of the inverter is powered through block AL and AQ and also through blocks BB and BC. The output of blocks AQ and BC is *—machine or set up reset*. These lines act as a general reset to any triggers or latches left on from a previous operation. On FIGS. 189A and B, *BCU response powered* enters AND block AG. The other input of AND block AG comes from FIGS. 189A and B block AB. The input to block AB, which comes from FIG. 87 AF, activates the line necessary for the channel to put the command address onto the *storage address bus*. This is accomplished on FIGS. 90A and B, 91A and B and 92A and B. This is a multiplex bus and all drivers are indicated on these pages. *BCU response* will remain activated for approximately 1 microsecond.

Approximately 100 nanoseconds after *BCU response* rises, the BCU will activate the *BCU data request* line, which is received in block AD FIGS. 27A and B. The output of block AD is powered through blocks CB, CC, and CD, the output of which becomes *+BCU data request*. The *BCU data request* line is held up by the BCU for approximately 100 nanoseconds after the fall of the *BCU response* line.

When the *BCU response* pulse falls the channel expects to see an *accept* pulse from the BCU which is received by the channel on FIGS. 28A and B in block AU.

One output from this receiver is called *fast accept* and goes to FIGS. 89A and B where it is ANDed with *+BCU data request*, block AA. The negative output of this block resets the storage request trigger blocks AH and AJ.

Returning to FIGS. 28A and B the other output of receiver block AU is ANDed with *+BCU data request* in block AW. The output of this circuit turns on the accept latch consisting of blocks AX and AY. One output from this latch, *+accept latch* (from the AX block), goes to FIGS. 88A and B where it acts as a latch line for the *Remember BCU response* trigger. The other output of this latch block AY, FIGS. 28A and B, is inverted in block BD and goes to FIGS. 59A and B, as *+accept latch*, where it is ANDed with *Start I/O and not TIC* in block AT to turn on the set up latch consisting of blocks AC and AD. *Plus set up* is powered by blocks AE and AG. *Minus set up* is powered by blocks AR, AF and AH and goes to FIGS. 58A and B where it resets the fetch CAW trigger blocks AS and AE.

It is at this point in time when the channel begins to operate asynchronously between the I/O interface and storage. The powered *+output* of the set up latch will initiate the I/O selection routine. Also, an *advance pulse* sent by the *BCU* approximately 1 microsecond after *BCU response* falls will automatically initiate another storage request. This storage request will be for the CCW located in address 512 of storage. The channel must fetch the CCW from storage before it is able to send a command to the I/O device.

It is assumed that the system operates with an IBM M4 storage device. On FIGS. 27A and B the *M4 advance pulse* comes into the channel receiver block AC. The output of the receiver goes to the AND circuit AP then into the OR circuit BA. The output of this OR circuit goes to FIGS. 88A and B as *+BCU advance pulse*. On FIGS. 88A and B *+BCU advance pulse* is ANDed with *accept latch* and *remember BCU response*, block AK, and then inverted in block AS. The output of the inverter is *+raw advance pulse*. On FIGS. 88A and B *raw advance pulse* is used to generate *advance pulse*, and then, *advance pulse* is used to generate *late advance pulse*. *Advance pulse* follows *raw advance pulse* by 150 nanoseconds and the *late advance pulse* follows the *advance pulse* by 100 nanoseconds. Note that these pulses are delayed and formed by two single shots and associated circuits.

Figure 88A:
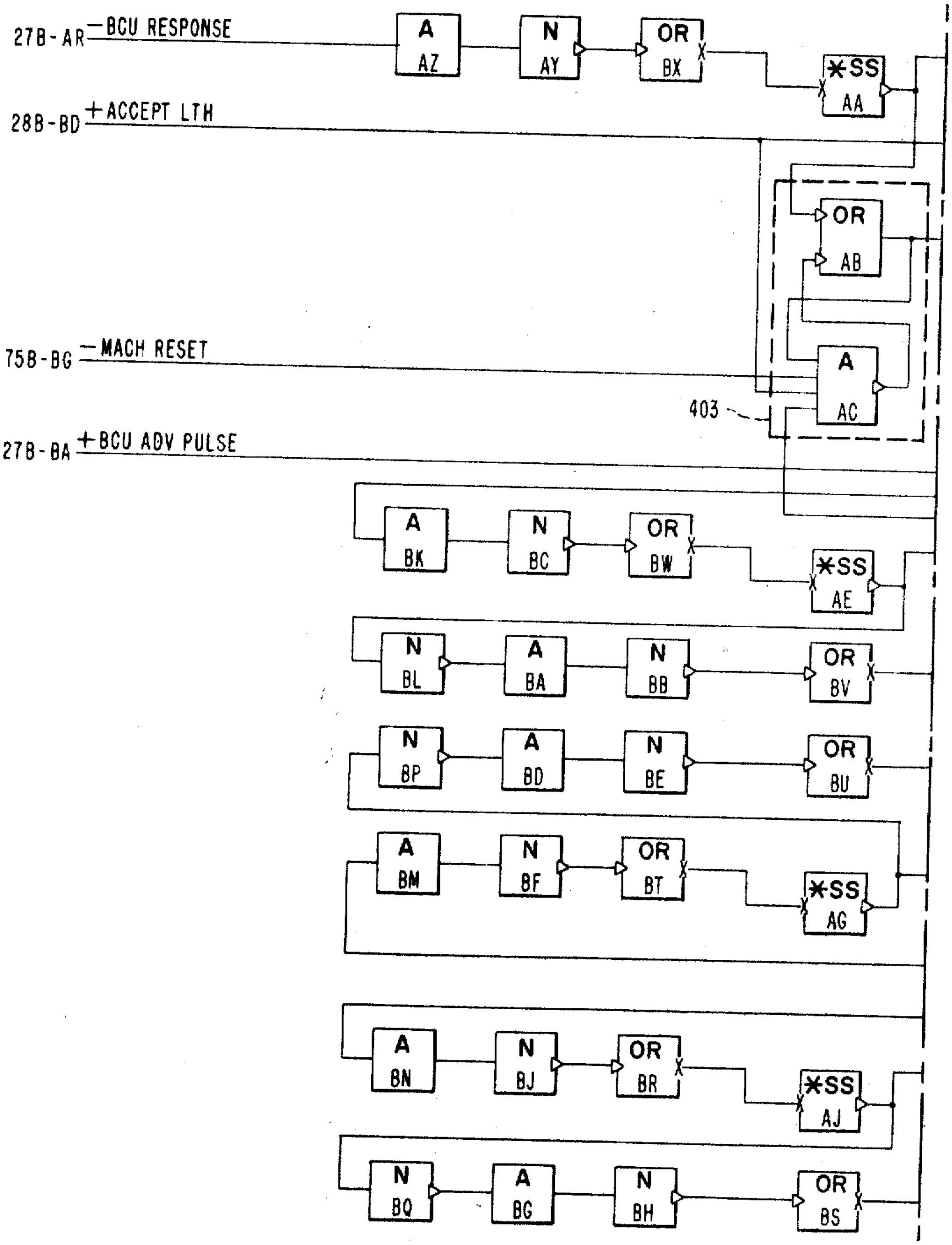
Figure 88B:
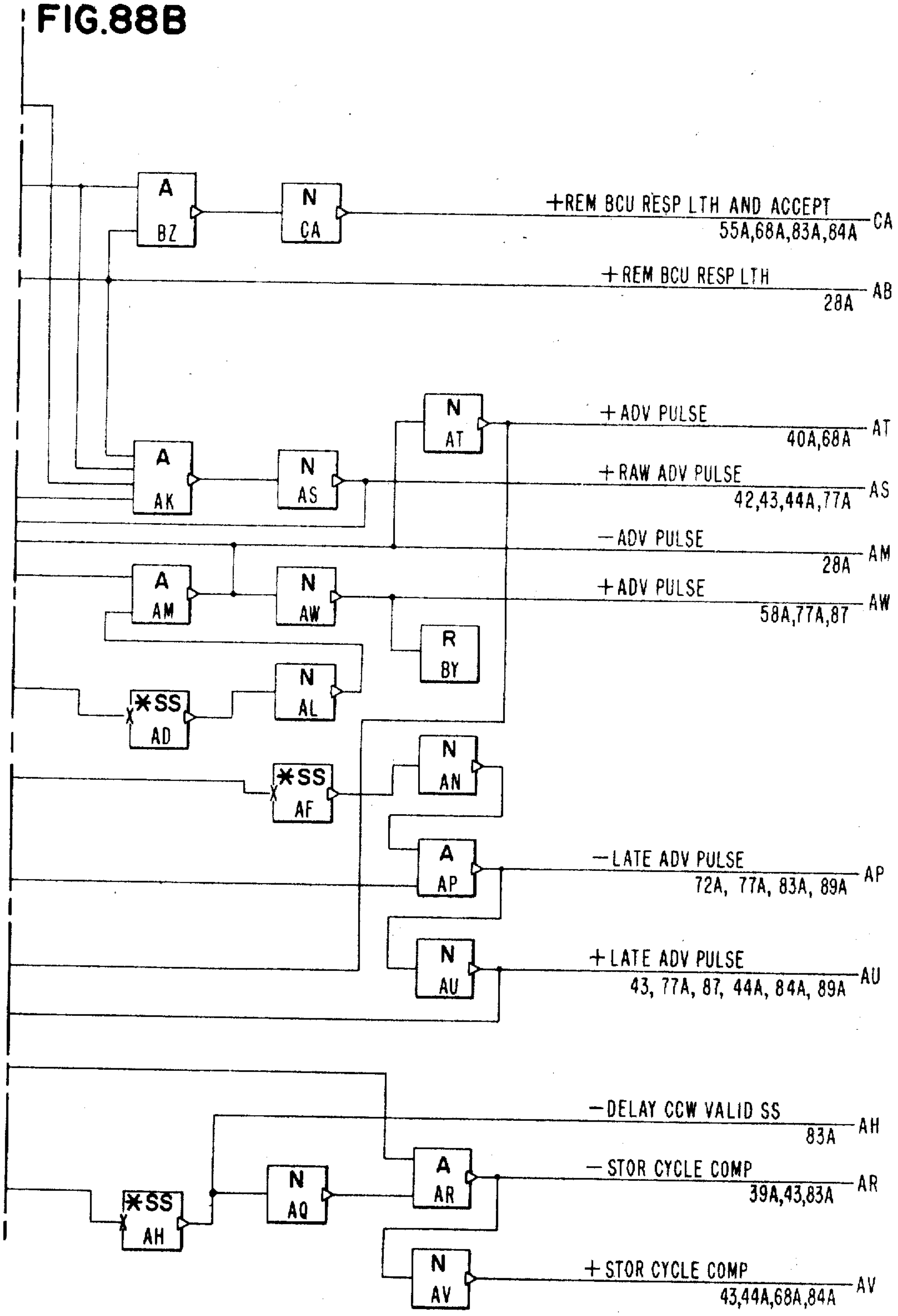

To avoid duplication, we will follow the generation of the *advance pulse* through the logic on FIGS. 88A and B without going into the detailed generation of *late advance pulse* and *storage cycle complete* because they are formed on the same figure in the same manner as *advance pulse*.

On FIGS. 88A and B *plus raw advance pulse* leaves block AS and goes into the AND circuit made up of blocks BK and BC. The output of block BC fires the single shot made up of blocks BW and AE. Single shot block AE has two outputs. One output goes to AND circuit block AM where it acts as a degating line. The second output goes to the inverter block BL, through the AND circuit composed of blocks BA and BB, and fires the single shot composed of blocks BV and AD. The output of single shot block AD is inverted through block AL and goes to the AND circuit block AM, where it is ANDed with the output of the previous single shot block AE. The output of a single shot block is a negative level. Therefore if block AE is of shorter duration than block AD, there will be a given period of time when both inputs to AND circuit AM are positive. One of the outputs of the block AM goes to the inverter block AT. The output of this block goes down to a second single shot configuration for the formation of the *late advance pulse*. When the *+late advance* pulse is available at the output of block AU it will go to a third single shot configuration for the generation of *storage cycle complete* pulses. This third single shot configuration has one additional output, block AH. The output of this block is called *—delay CCW valid single shot*. The outputs of FIGS. 88A and B will be noted as they are used in the following sequences.

Figure 43:
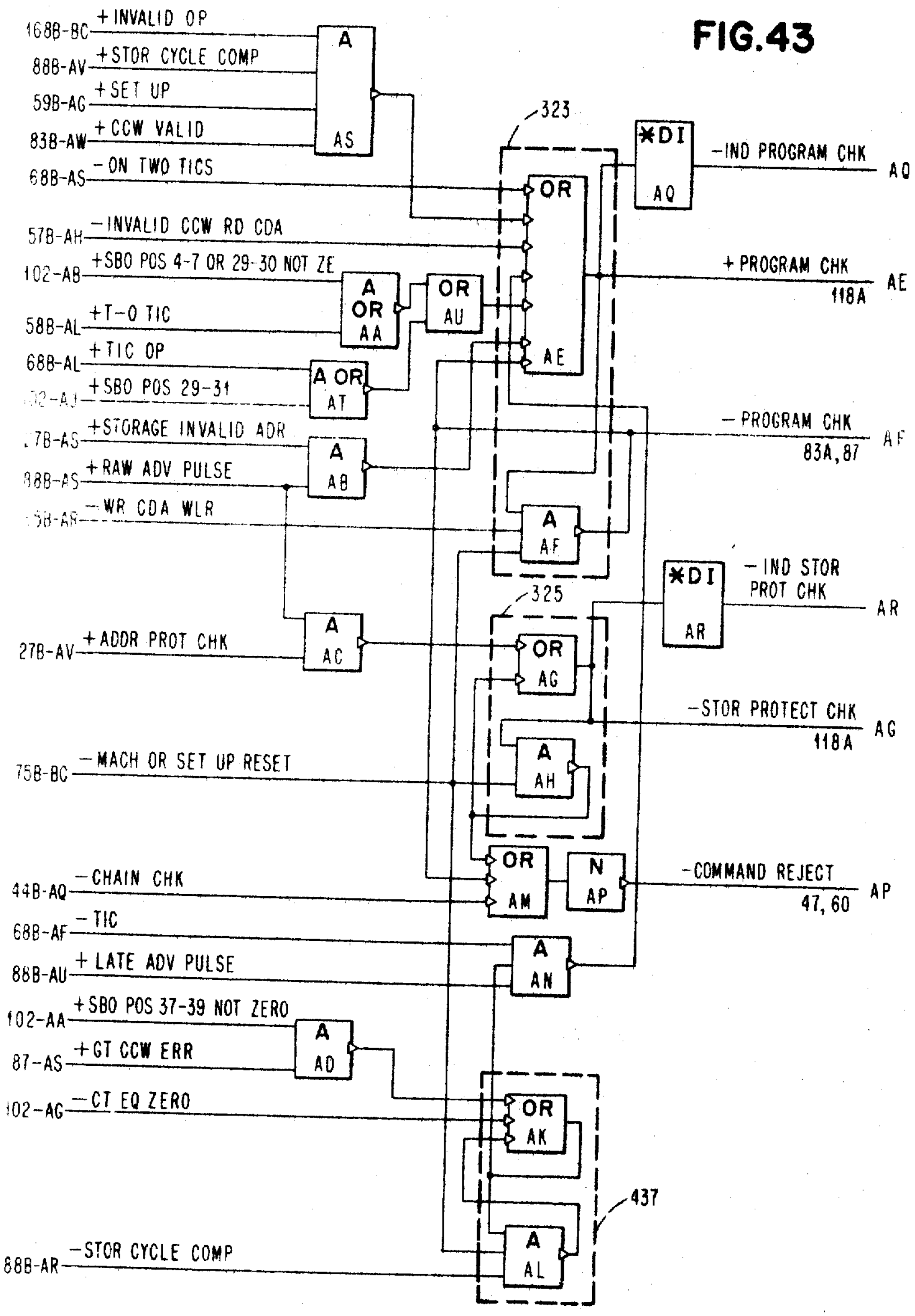
Figure 44A:
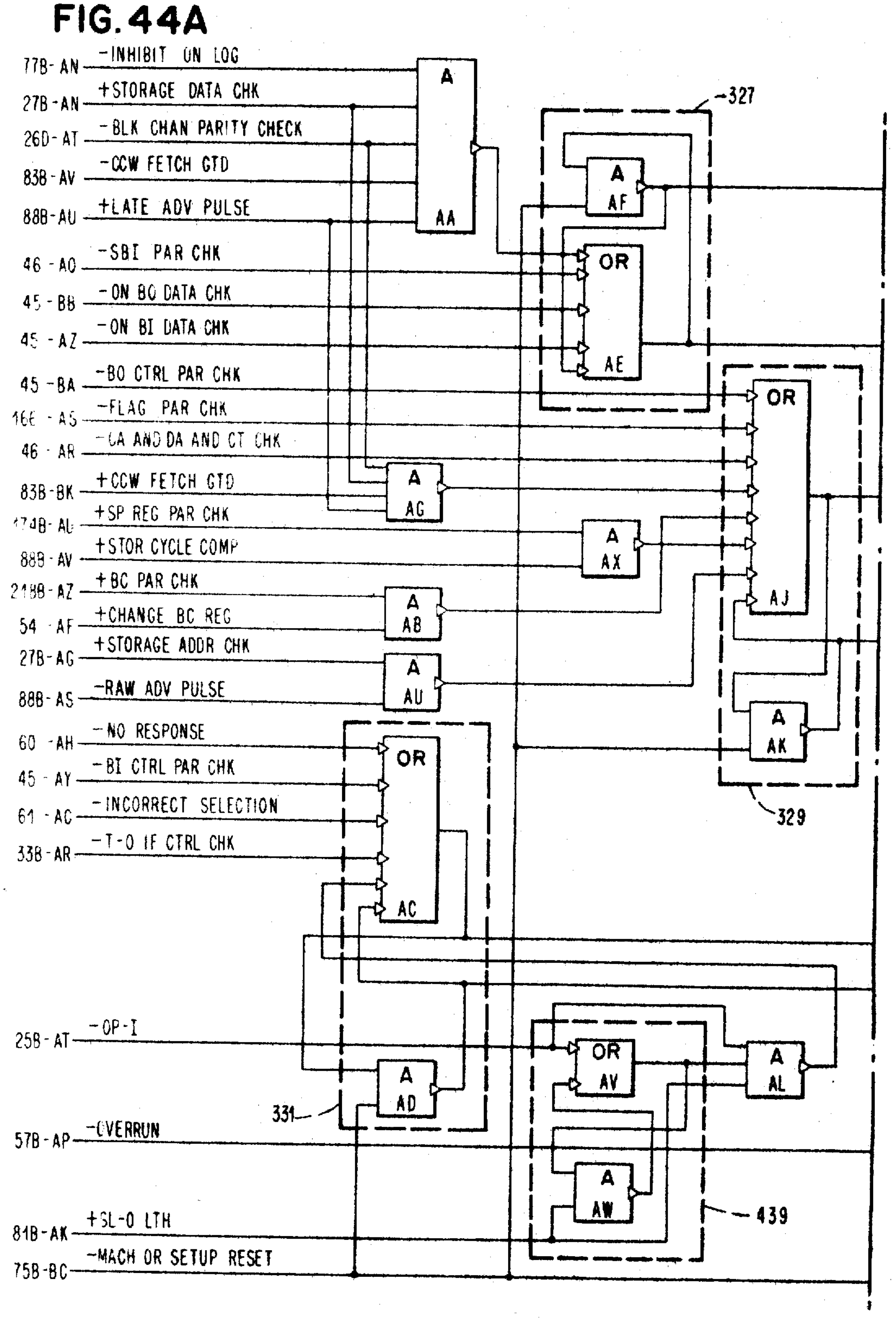
Figure 44B:
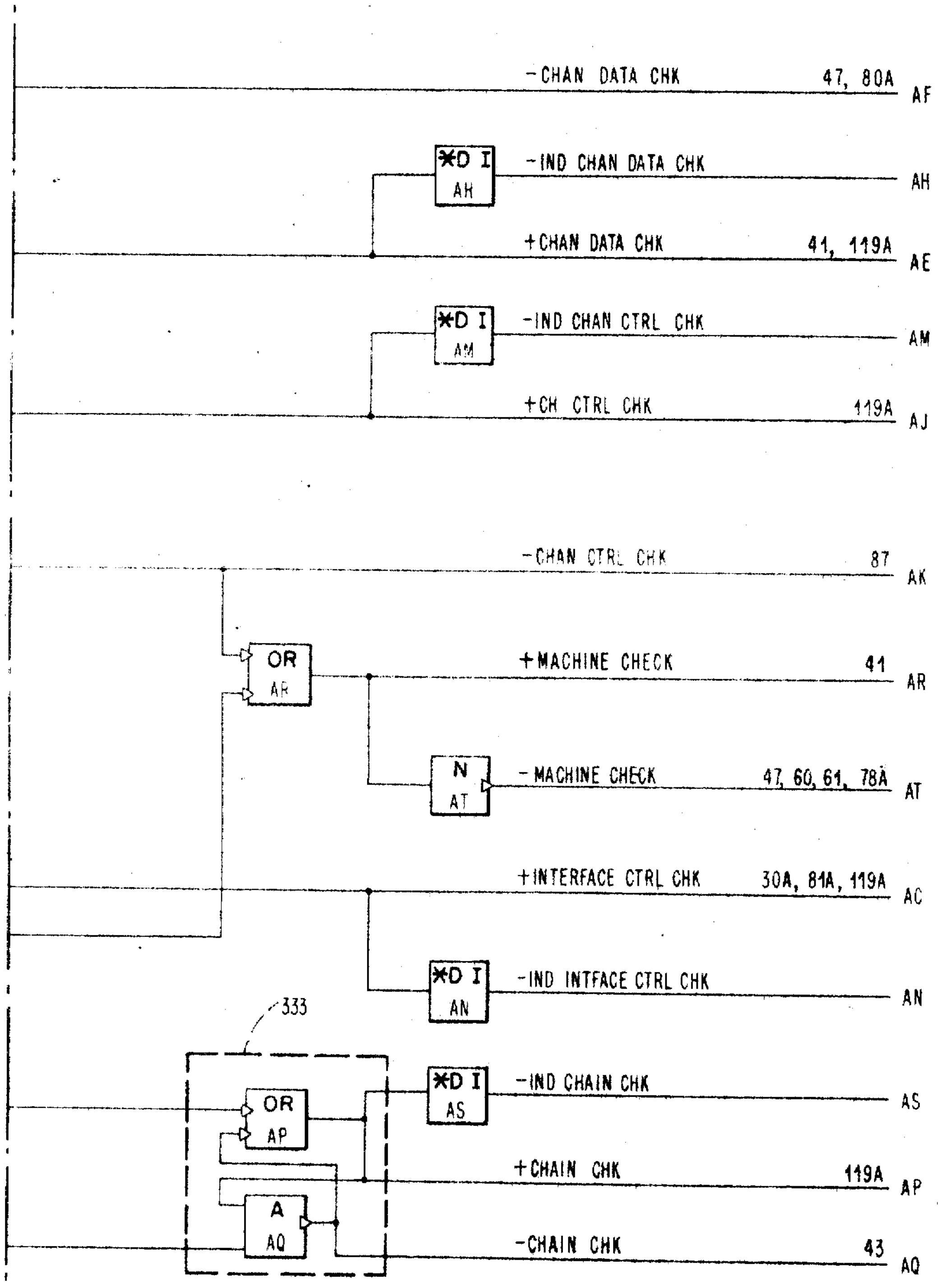

From FIGS. 88A and B *+raw advance pulse* goes to FIG. 43 where it gates the *storage invalid address* or *address protect check* from the BCU, and also to FIGS. 44A and B where it gates the *storage address check* from the BCU. These storage tag lines will only be active if an error has been made.

Figure 87:
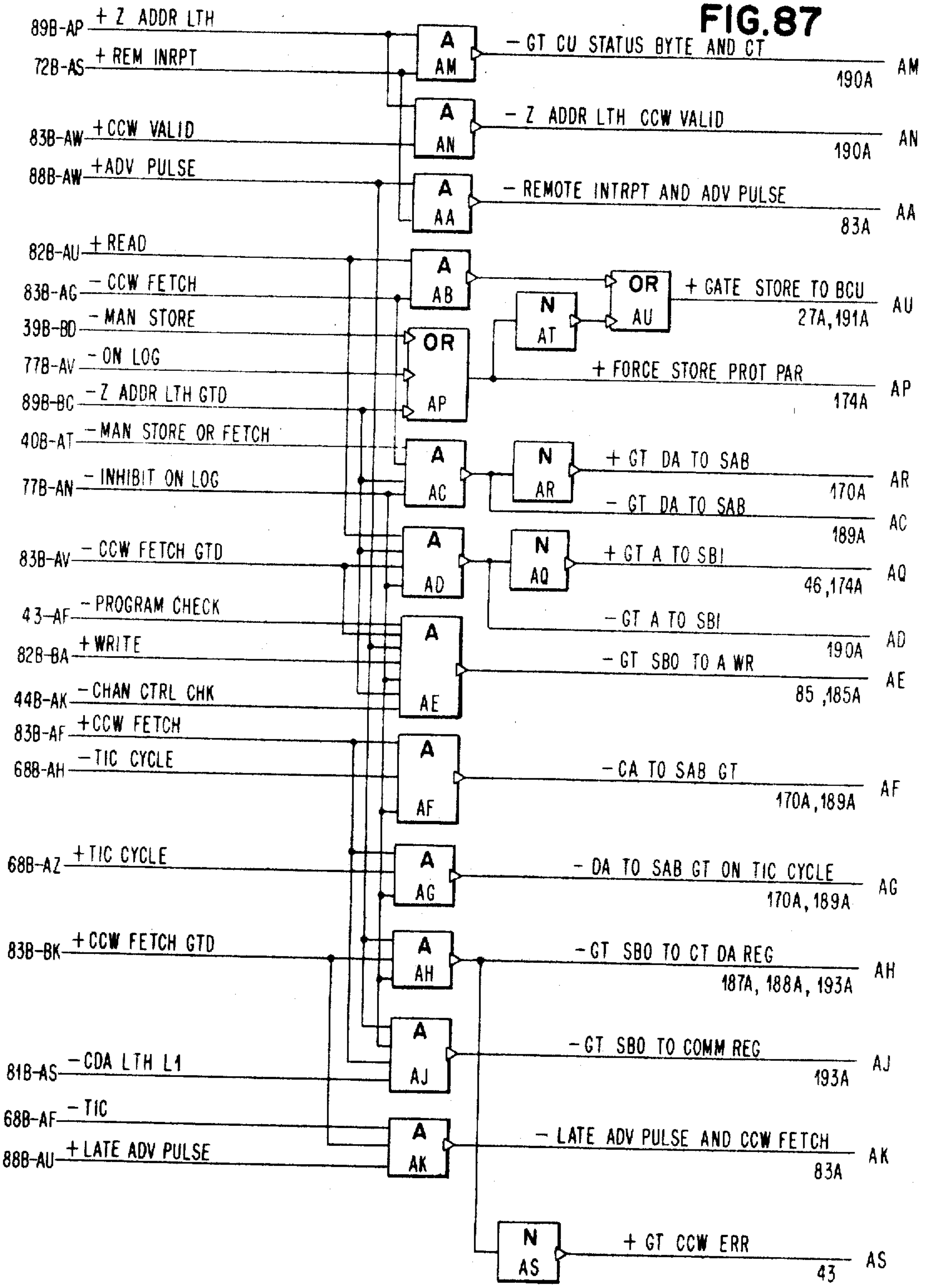

On FIG. 87 *+advance pulse* is ANDed with *CCW fetch gated* in block AH whose output goes to FIGS. 188A and B where it is ORed with *—load DA pulse* in block AA, is inverted in block AC, and sets the latch, blocks AM and AN, whose positive output is inverted in block AR and powered in block AX. It is the output of block AX which gates the *storage data bus out* to the *data address register*, which is located on FIGS. 155A through 160B.

Figure 68A:
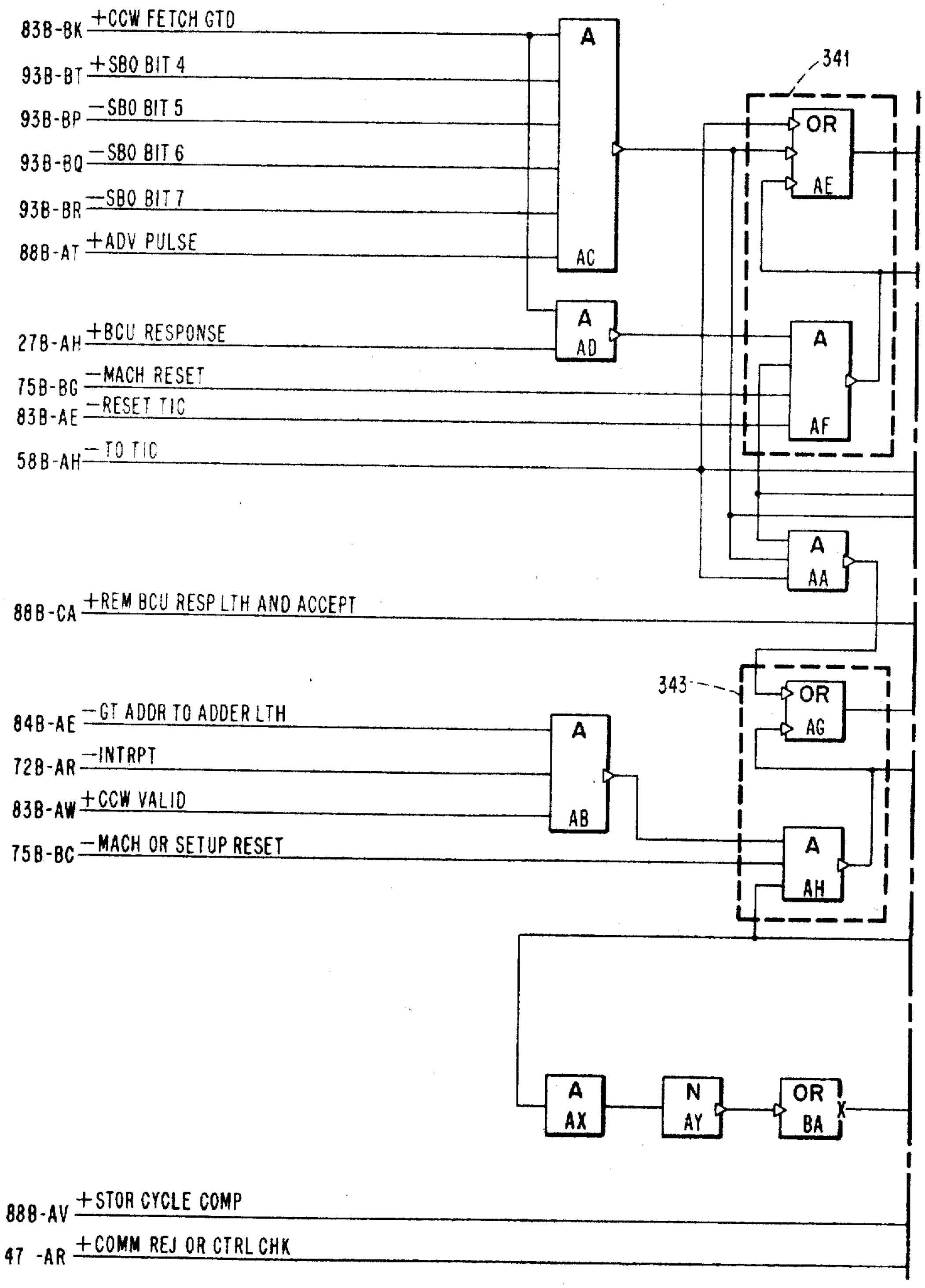
Figure 68B:
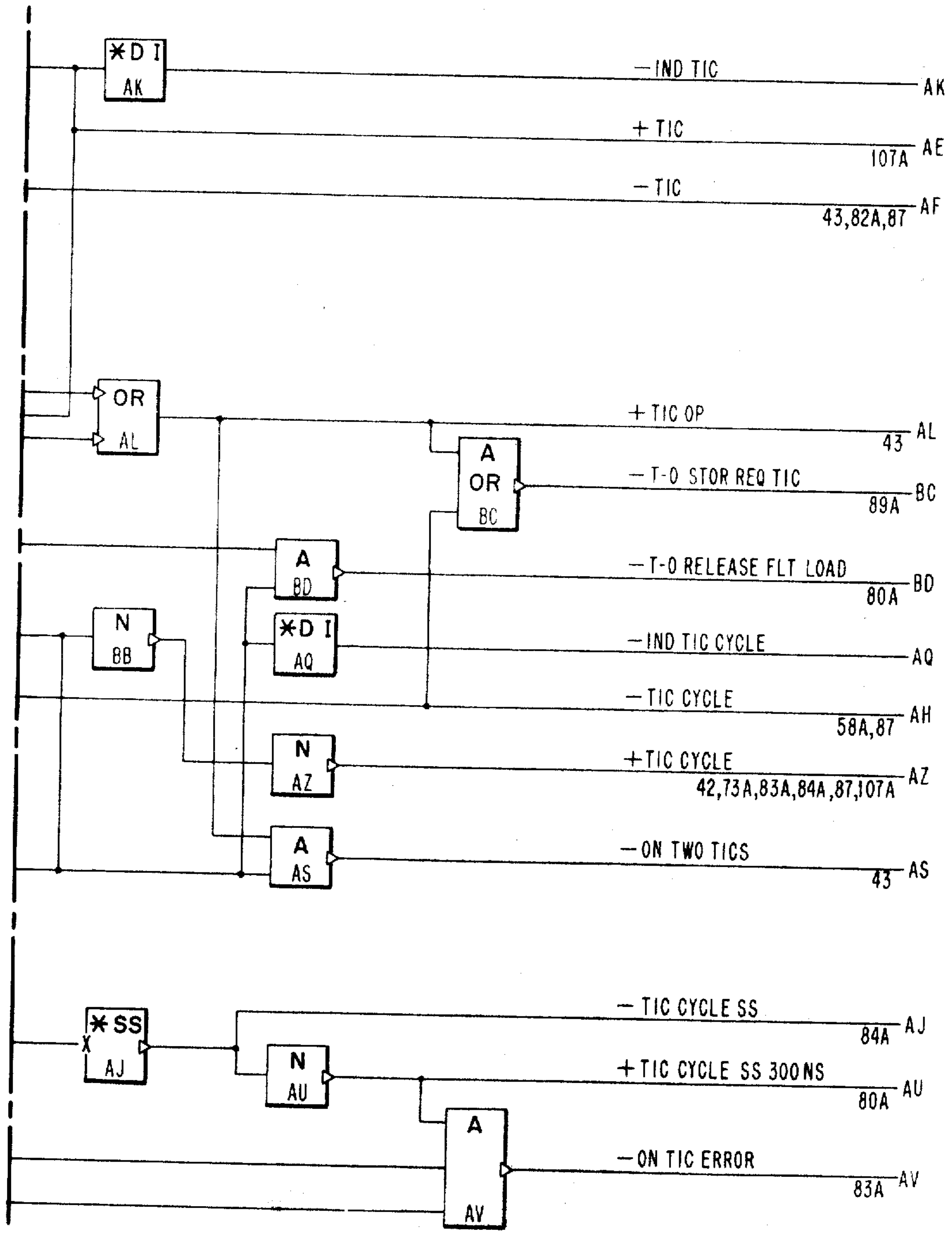

On FIGS. 58A and B *+advance pulse* is ANDed in block AH. One output from block AH goes to FIGS. 68A and B where it turns on the TIC trigger consisting of blocks AE and AF. A second output is inverted on FIGS. 58A and B, block AL, and goes to FIG. 43, where it gates the zero checking of *storage bus out* positions 4 through 7 and 29 through 31; and to FIGS. 173A and B where it is used to gate the *storage bus out* positions 0 through 3 into the *storage protect registers*. *Minus advance pulse* leaves FIGS. 88A and B and goes to FIGS. 28A and B, where it resets the accept latch blocks AX and AY. The resetting of this latch will cause the resetting of the *remember BCU response* blocks AB and AC FIGS. 88A and B.

12.05 FETCHING OF CCW

On FIG. 87 *—TIC* goes to AND circuit AK to inhibit the turning on of *CCW valid* by the *+late advance pulse*. The *Turn on TIC* line from FIGS. 58A and B goes to FIGS 68A and B where it is ORed in block AL, then ANDed in block BC, and goes to FIGS. 89A and B to turn on the *storage request trigger* to initiate another storage sequence as explained previously. With the fall of *advance pulse*, the output of the TIC trigger turns on the TIC cycle trigger consisting of blocks AG and AH. The output of block AG is inverted in block BB and powered in block AZ. The output of block AZ is +TIC cycle. At this time, +*late advance pulse* from FIGS. 88A and B goes to FIGS. 89A and B where it is ANDed with −*retain stor not CCW fetch* in block AB, the output of which resets the storage cycle trigger, blocks AR and AJ.

When CCW *fetch* trigger was turned on, the output of the command address register was gated into the adder. The TIC operation replaces the output of the command address register with the output of the data address register. On FIGS. 84A and B +*TIC cycle* goes to AND block AT the output of which blocks the gating of the command address register to the adder at block AJ. +*TIC cycle* also goes to block AL, the output of which goes to FIGS. 189A and B to gate the data address to the adder. The line enters an OR circuit on FIGS. 189A and B block AC whose output is powered by blocks AH and AQ. The output of block AQ accomplishes the gating of the data address to the adder. This is done on FIGS. 198A through 212. The line, −*GT DA+1 TO ADD TIC* from block AL on FIGS. 84A and B also goes to FIGS. 198A and B to accomplish the incrementing of the adder. The line, −*GT DA+1 TO ADD TIC,* enters an OR circuit, BF, on FIGS. 198A and B. The output of block BF is inverted by block BG, ORed in block AW, and ANDed in block BB, the output of which is the *increment* line, which will cause a full 8 bytes to be added to the contents of the adder. On FIG. 87 +*TIC cycle* is ANDed with +*CCW fetch* in block AG, and goes to FIGS. 198A and B to gate the data address onto the storage address bus. This is accomplished by entering an OR circuit block AA whose output enters an AND circuit, block AF. Block AF will be activated when BC *response powered* is received. When this condition is met, the output of block AF is inverted in block AN, and the output of block AN accomplishes the gating of the data address register to the storage address bus.

*Remember BCU response* and +*accept latch* are ANDed on FIGS. 88A and B in block BZ, the output of which is inverted in block CA. This line goes to block AB on FIGS. 84A and B. The output of block AB sets the *latch adder to command address trigger* consisting of blocks AG and AH. The output of block AH goes to FIGS. 189A and B where it enters the OR circuit block AE and is powered by blocks AL, AU and AM, AV. The outputs of blocks AU and AV latch the adder. This is accomplished on FIGS. 198A through 212.

The *advance pulse* from FIGS. 88A and B for the CCW fetch enters FIG. 87 and goes to block AH. The output of block AH is inverted in block AS and goes to FIG. 43 where it is used as a gate to check for zeros in bus positions 37–39. A second output from FIG. 87 block, AH, is used to gate *storage data bus out* into the respective registers. The gating into the count register is done on FIGS. 187A and B. *Minus GT SDBO to CT & DA Reg* from block AH on FIG. 87 enters FIGS. 187A and B in OR circuit block AA, is inverted in block AF, is ORed in block AL, and is powered by blocks AS and AX. It is the output of block AX on FIGS. 187A and B that gates the *storage data bus out* to the count register. The count register is located on FIGS. 161A through 163B. On FIGS. 188A and B, −*GT SDBO to CT & DA Reg* from FIG. 87 enters OR circuit AA, is inverted in block AC, ORed in block AM, and is powered by blocks AR and AX. It is the output of AX on FIGS. 188A and B which accomplishes the gating of the *storage data bus out* to the data address register which is located on FIGS. 155A through 160B. The line from block AM on FIG. 87, −*GT SDBO to CT & DA Reg,* also goes to FIGS. 193A and B where it enters OR circuit block AA, and blocks AG, AL, and AR. It is the output of block AR which gates the SDBO to the flag register, which is located on FIGS. 165A and B. *Plus advance pulse* also goes to block AJ on FIG. 87. The output of this block goes to FIGS. 193 and B, where it enters an OR circuit block AS, AND circuit block AX, and is powered by blocks AZ and BB. It is the output of block BB that gates the *storage bus out* to the *command register.* The register is located on FIGS. 167 and 168A and B.

The *late advance pulse* from FIGS. 88A and B for the CCW enters FIG. 87 and is ANDed with +CCW *fetch gated* in block AK. The output of this block goes to FIGS. 83A and B where it turns on the CCW valid trigger, consisting of blocks AH and AJ. The +*CCW valid* is formed by taking the output of block AH, inverting it through the OR blocks BL and AR, and powering it in block AW. The negative phase coming off of block AJ is inverted through the OR blocks AS and BM, and is powered in block AX. There are two additional outputs from block AH. One output goes to block AD where it is ANDed with −*late advance pulse.* With the fall of *late advance pulse* block AD will reset CCW *fetch.* The other output from block AH goes to AND circuit block AP. This circuit will be inactive during the period of time the −*delay CCW valid single shot* is fired. When the single shot cycle is completed, the output of block AD will be inverted in block AT and becomes +*CCW valid and no errors.* On FIGS. 84A and B, +*CCW valid* enters AND circuit block AA. The output of this block resets the gate command address to adder trigger, blocks AD and AE.

Figure 46:
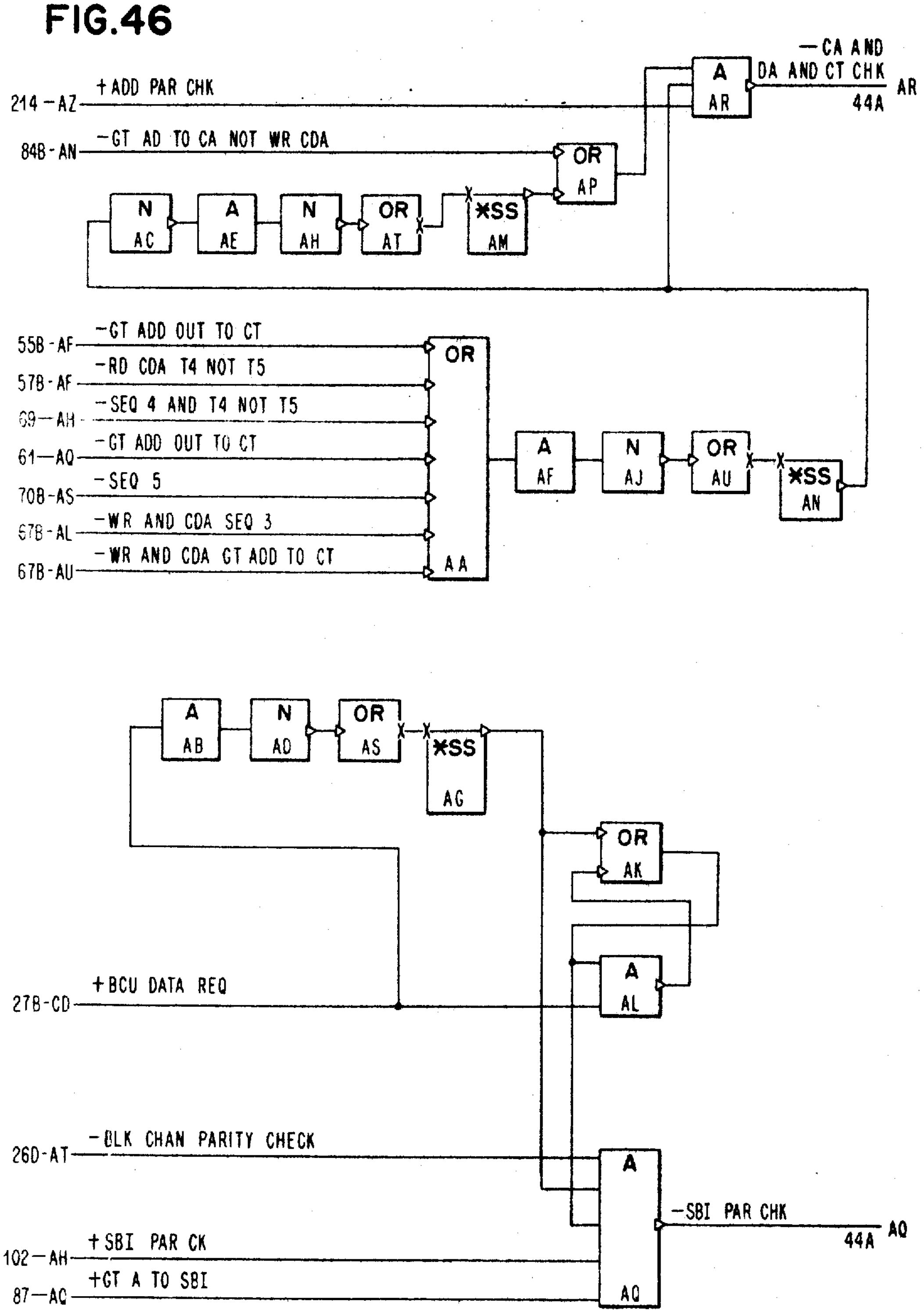
Figure 84A:
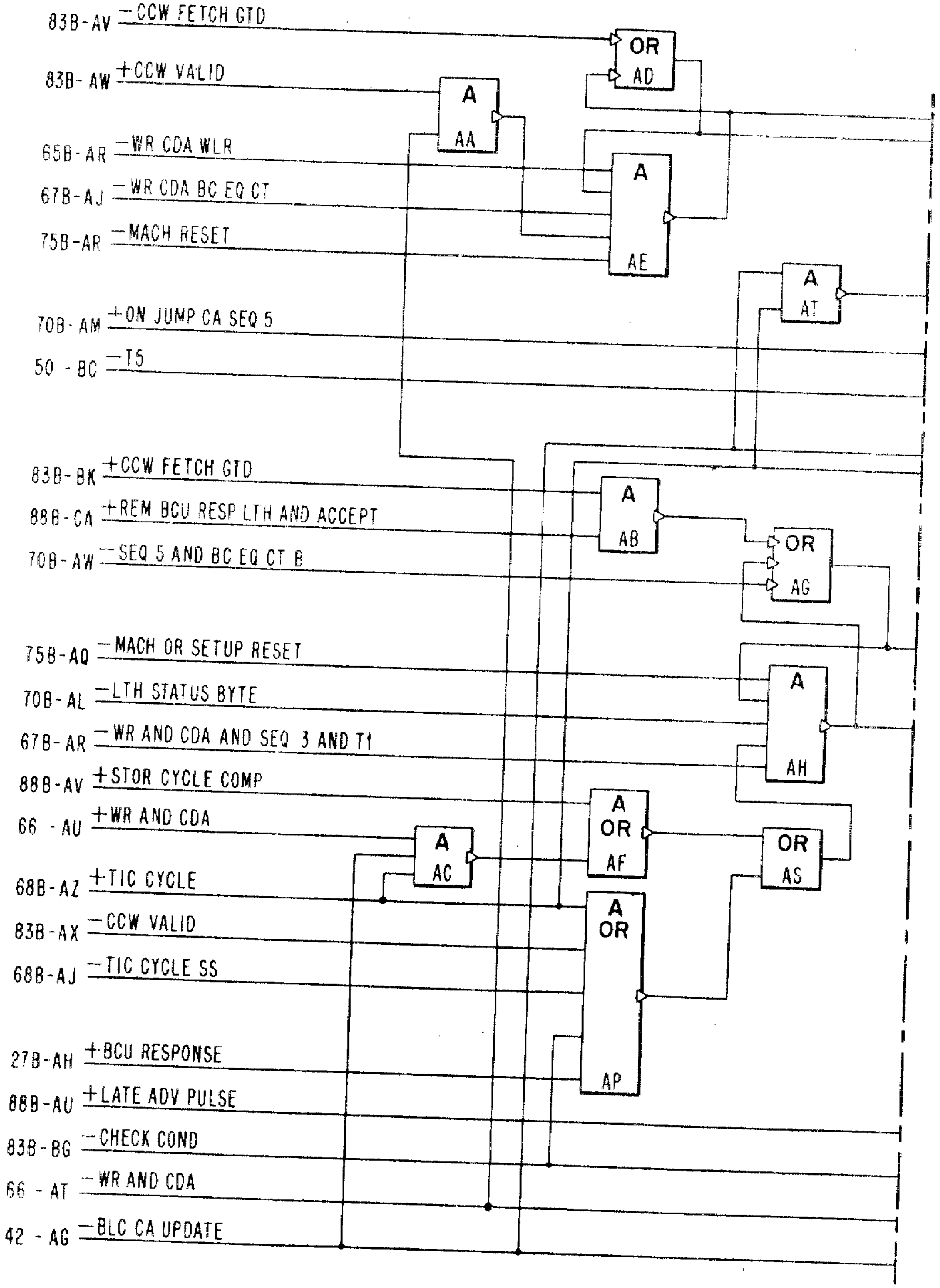
Figure 84B:
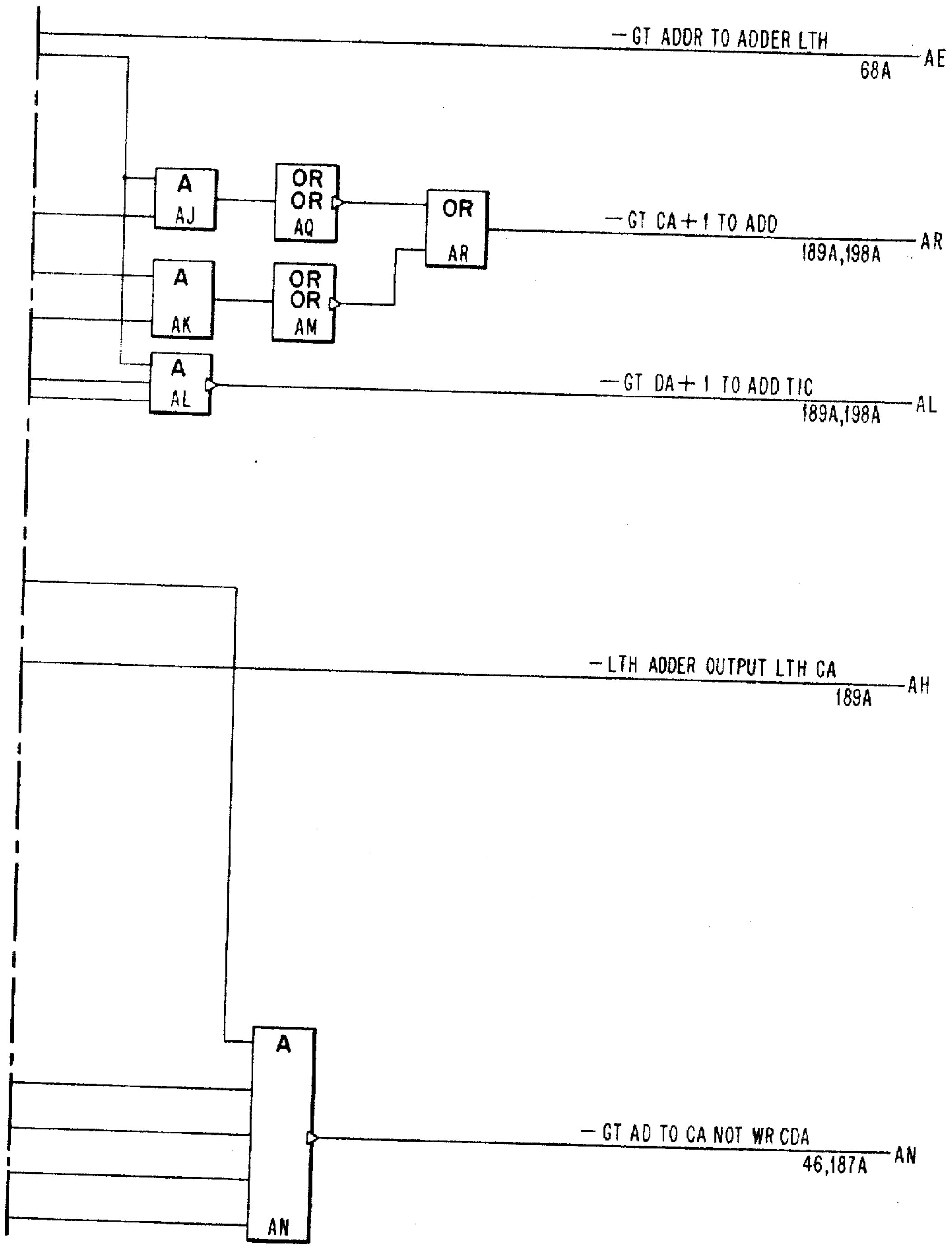

*Plus late advance pulse* from FIGS. 88A and B enters FIGS. 84A and B at block AN. The output of which is −*GT AD to CA not WR CDA.* One output from this block goes to FIG. 46 to sample for an adder error. A second output goes to FIGS. 187A and B, and enters an OR circuit block AD, is inverted in block AJ, sets a latch consisting of blocks AN and AP, and is powered by blocks AV and BA. The output of block BA gates the adder to the command address register. This register is located on FIGS. 152A through 154B. On FIGS. 84A and B +*storage cycle complete* enters block AF. The output of this block is used to reset the *latch command address* to adder trigger.

Figure 25A:
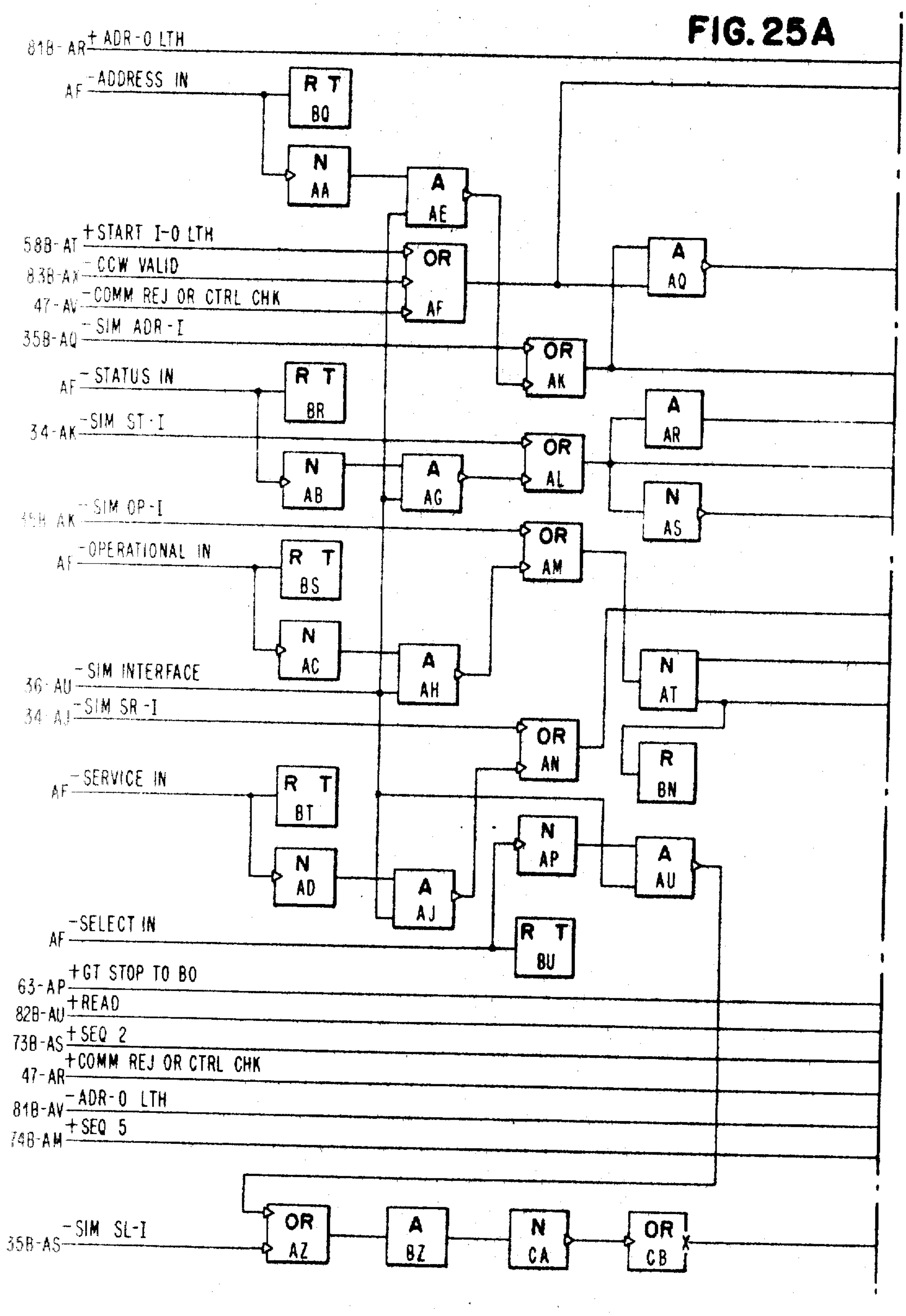
Figure 25B:
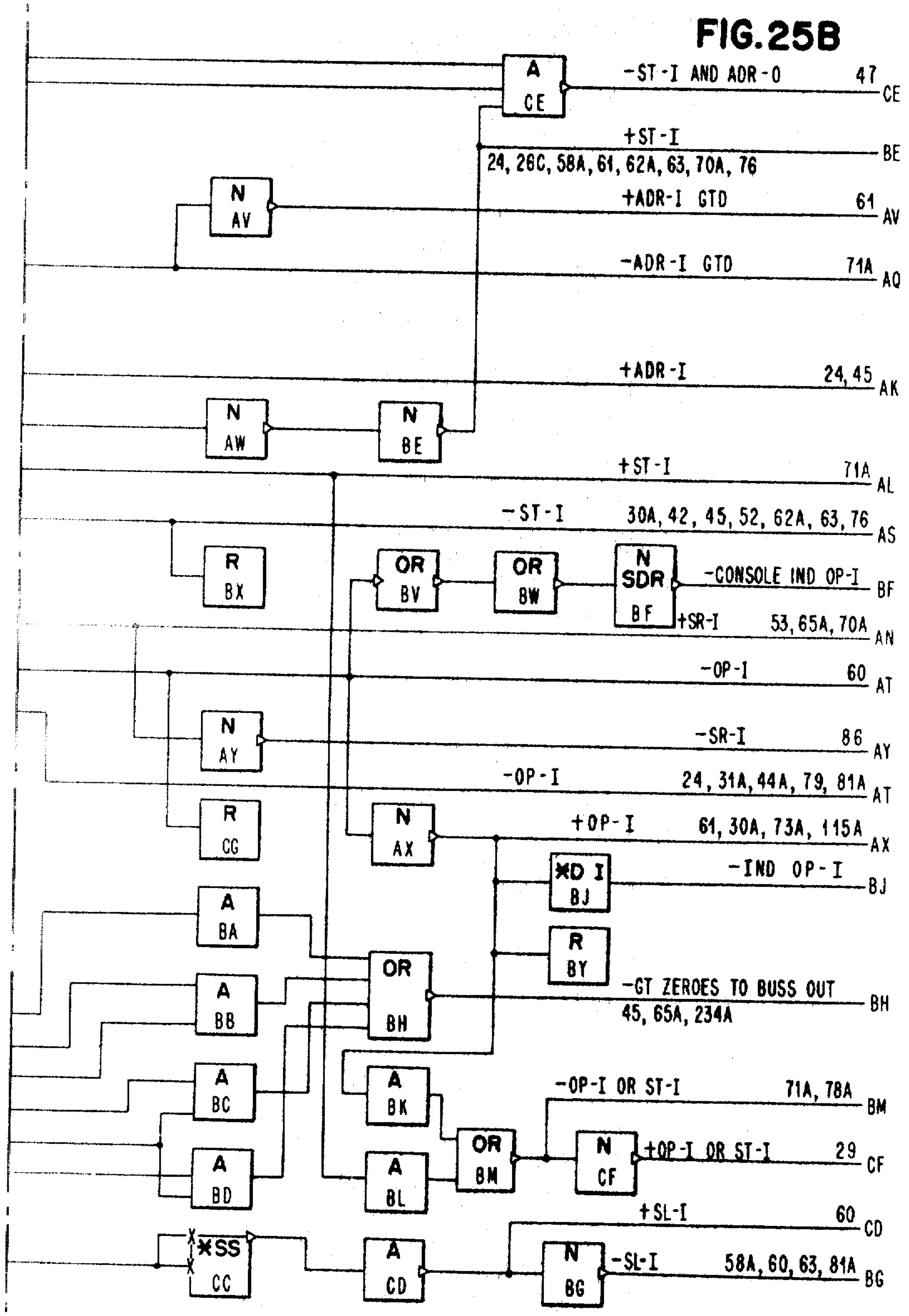

Referring to FIG. 25, the status of the channel is as follows: the command address register contains the address 520; the data address register contains the address 1024; the counter register has a byte count of 40; the command register has a code meaning read; and the flag register has no contents. We will now return to the I/O interface operation whose functions are performed in parallel has been proceeding simultaneously with the storage operation.

Plus *set up* from FIGS. 59A and B is used to gate the unit address into the data out bus. +set up gates the unit address register into the data out bus latches FIGS. 226A through 234B. The data out bus devices are on the same figures.

12.06 I/O SELECTION

Figure 45:
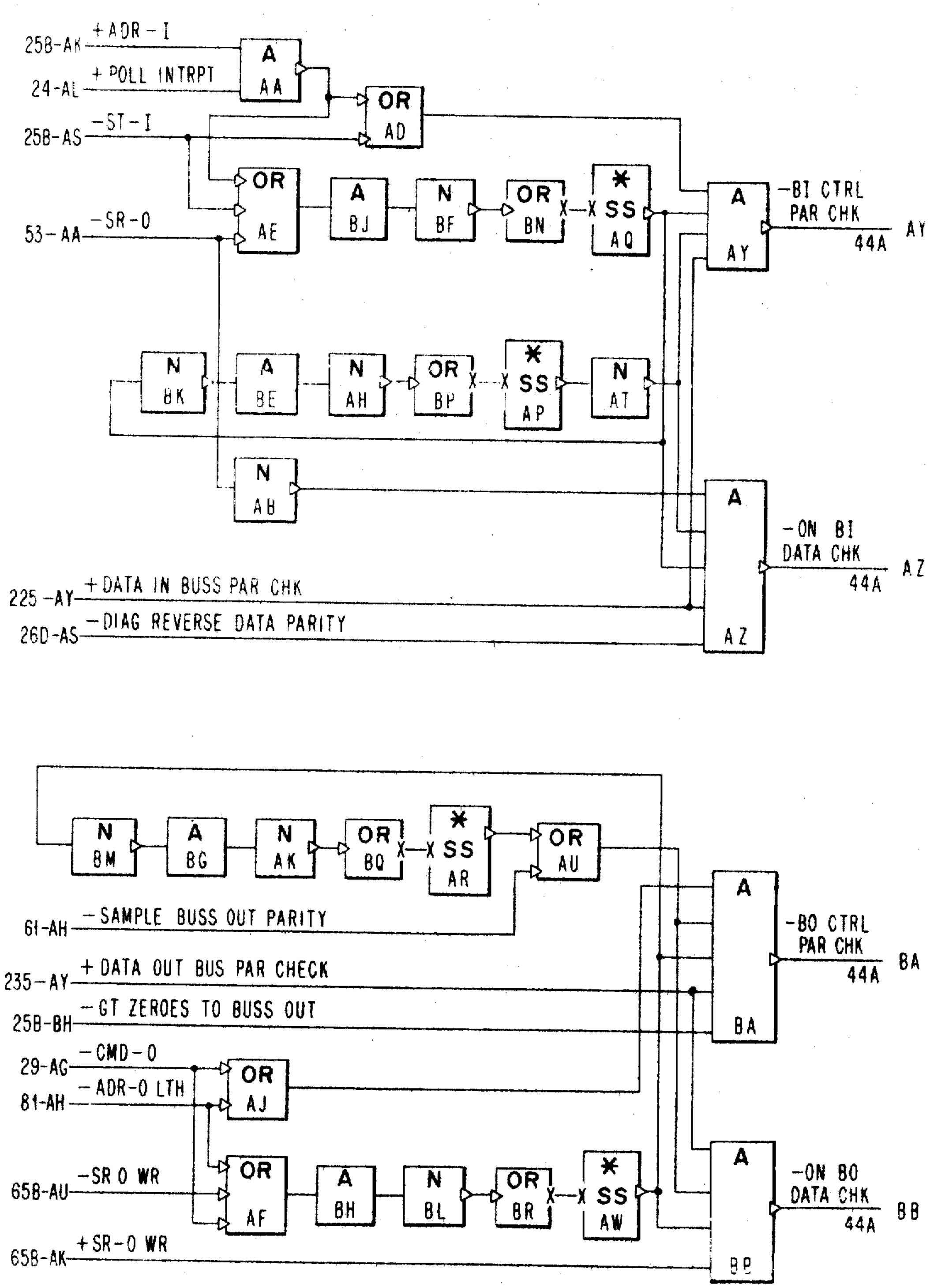
Figure 52:
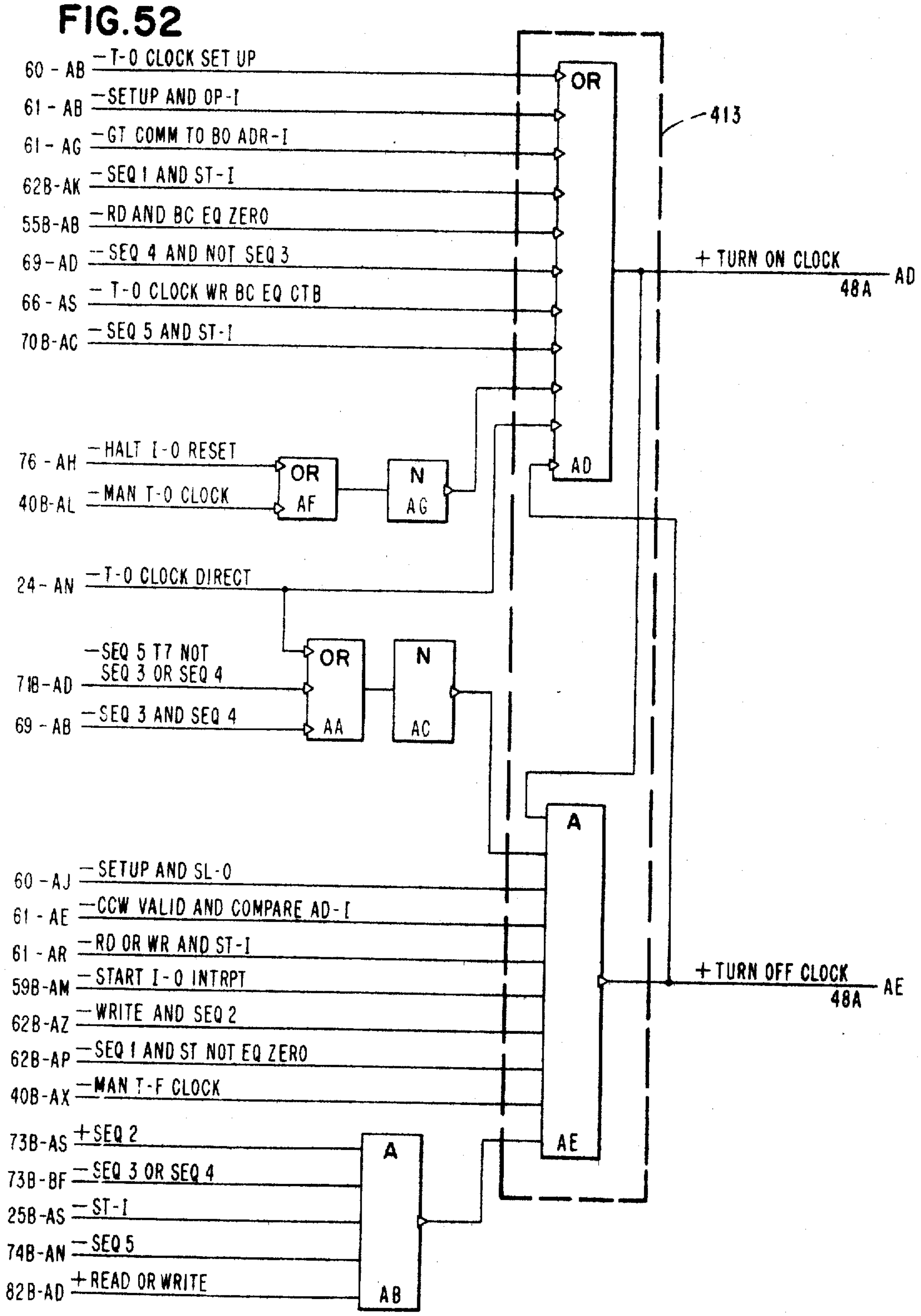
Figure 60:
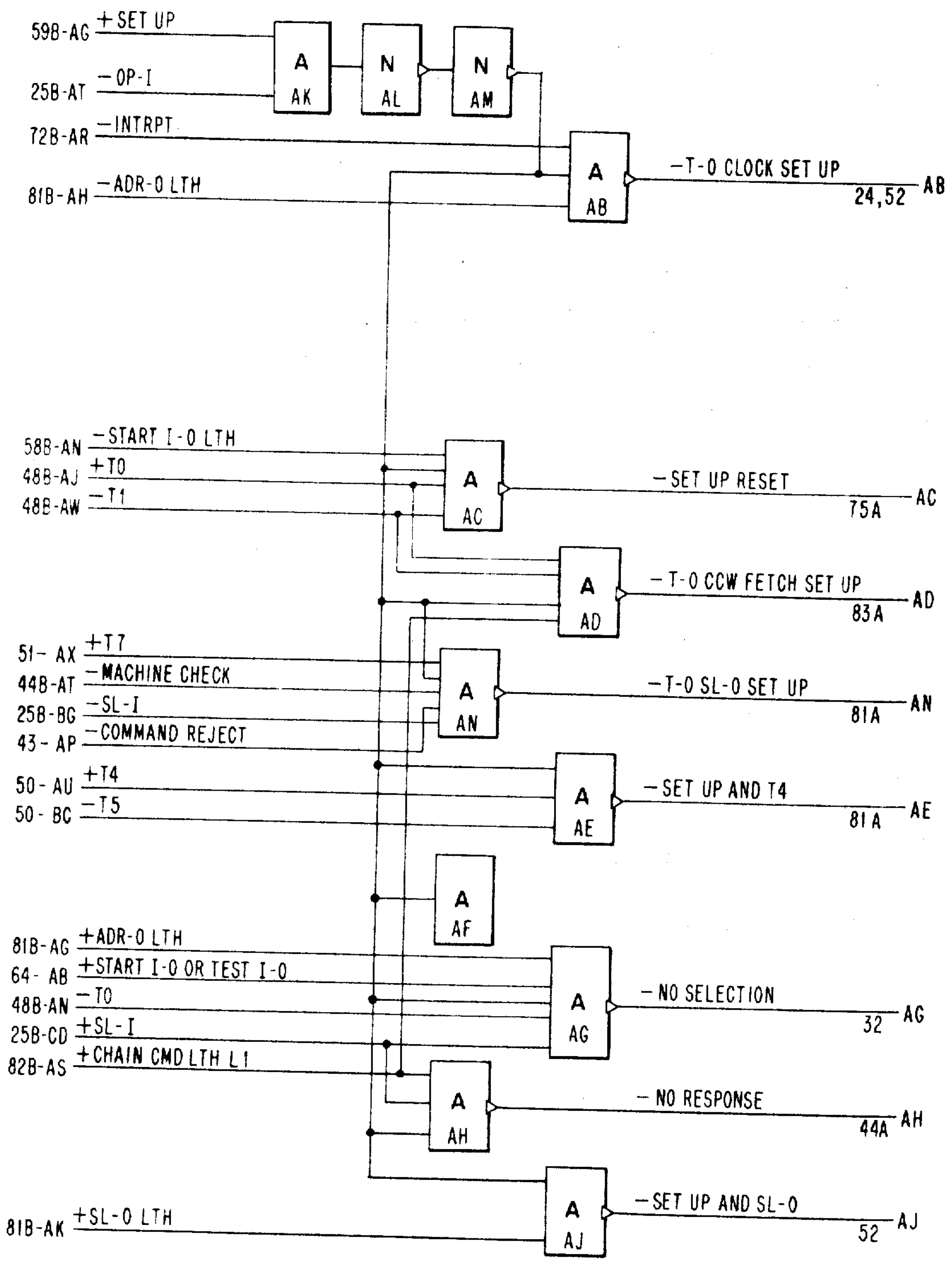

On FIG. 60 plus *setup* is ANDed with not op-in block AK inverted through blocks AL and AM. The output of block AM is then used as a gate to turn on the clock and for initial sequences across the I/O interface. Block AM activates block AB and the output from block AB goes to FIG. 52 to turn on the clock. Refer to FIG. 15 for a description of the clock operation. At clock time T4, not T5, the output from block AE will be negative and goes to FIGS. 81A and B as −*setup and T4* where it turns on the *address out trigger,* blocks AG and AH. The output of block AH goes to FIG. 45 where it checks the parity of the unit address on the data bus out. The output of block AG inverted in block AV goes to FIGS. 30A and B block BC. It is inverted through block BD and goes to the simplex driver block AK, the output of which is *Interface Address Out.* At clock time T7 on FIG. 60 the output of block AN goes negative. This output goes to FIGS. 81A and B where in turns on the *select out* trigger consisting of blocks AB and AC. Block AC feeds the inverter AK. The output of block AK goes to FIGS. 30A and B as +*select out latch,* where it is ANDed with −*simulate interface* in block AD. Block AD has two outputs. Ones goes to the OR circuit, blocks BG and BH, and then to the simplex driver block AM. The output of this driver, block AM, is *interface select out.* The second output from block AD goes to the OR circuit block BJ and BK then to the simplex driver block AY. The output of this driver is *interface holdout.* On FIG. 60 with the rise of *+select out latch* from FIGS. 81A and B block AK and setup being on, the AND circuit AJ is energized and a *turnoff clock* pulse is generated. This pulse, *—setup and select out,* goes to FIG. 52 to the control circuitry to turn off the clock, ref. FIG. 15.

Figure 61:
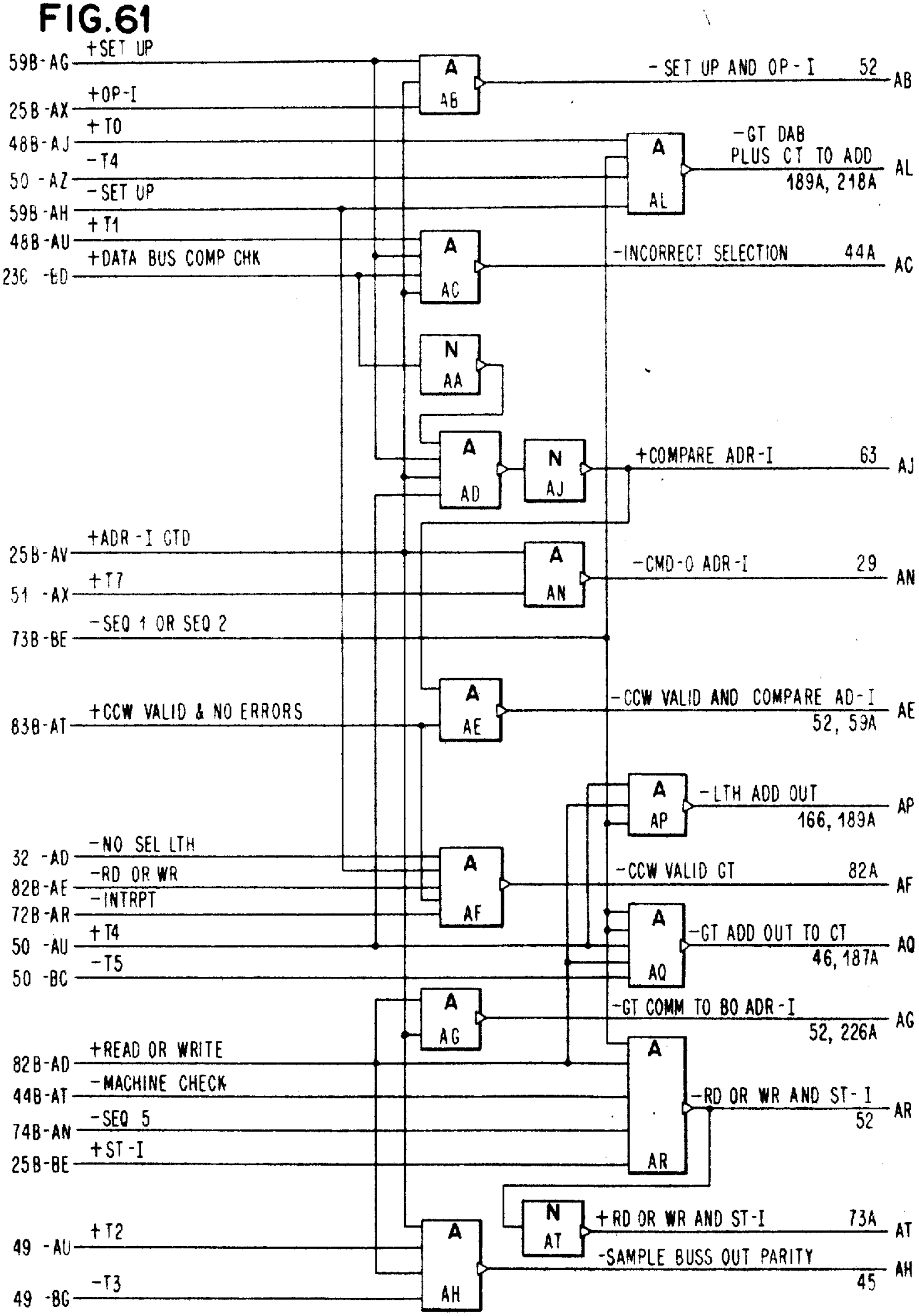

In response to the channels sending *select out* and *address out* the I/O device will respond with *operational in.* All channel interface receivers are on FIGS. 25A and B. *Operational in* enters FIGS. 25A and B at block AC. It is ANDed with *—SIM interface* at block AH and powered through blocks AM and AT. One output from block AT leaves this figure as *—op-in.* A second output is inverted to block AX and leaves this figure as *+op-in. Minus op-in* goes to FIGS. 81A and B where it resets the address out triggers, blocks AG and AH. In response to the fall of address out, the I/O device raises its *address in* tag line. This line is received on FIGS. 25A and B at block AA. Block AA is ANDed with *—SIM interface* on block AE. The output of block AE passes through OR circuit AK and goes to AND circuit block AQ. To get through block AQ, it is necessary for the trigger, *CCW valid,* to be on. When the input conditions are met, the output of AQ will go minus. This is inverted in block AV and goes to FIG. 61 as *+address in gated.* On FIG. 61 *+address in gated* is ANDed with *setup* and *op-in* in block AB. The negative output from this block goes to FIG. 52 to turn on the clock, reference to FIG. 15. The reason for turning the clock on at this time is to do an address compare of the *Unit Address Register bits* against the *data bus in* bits. This is done on FIG. 246. Any mismatch of the bits on the bus as compared to the register bits will activate the output of block BD on FIG. 236. Assuming that the addresses match, then at T4 time on FIG. 61, the output of block AD will be activated. This output will be inverted in block AJ and then ANDed with the *CCW valid and no error line* in block AE. The output of block AE goes to FIG. 52 where it will turn off the clock. Ref. FIG. 15. The output of block AE will also go to FIGS. 59A and B where it will reset the *setup* trigger, blocks AC and AD. With the fall of the setup latch, block AF on FIG. 61 is activated. The output of this block goes to FIGS. 82A and B where it turns on the *gate command* latch, blocks AD and AE. The output from block AD leaves this figure as *plus read or write* and goes to FIG. 61 where it is ANDed with *address in gated* in block AG. One output from block AG goes to FIG. 52 to turn on the clock. Ref. FIG. 15. A second output goes to FIGS. 226A and B where it is powered and gates the command register to the *data bus out.* The *data bus out* is located on FIGS. 226A through 234B.

On FIG. 61 at clock time T0, not T4, block AL is activated. The output of this block goes to FIGS. 189A and B and FIGS. 218A and B. The function of this line, *—GT DAB+CT to ADD,* is to gate the count register and the byte portion of the data address register to the adder. The byte portion of the *data address register* also sets the starting position of the byte counter. The actual gating is done on FIGS. 189A and B where the line from block AL, FIG. 61, enters an OR circuit block AD, is inverted by block AK, and is again inverted and powered by block AS. It is the output of block AS which gates the count register to the adder. The line from block AL of FIG. 61 also enters block AT on FIGS. 189A and B. It is the output of block AT which gates the byte portion of the data address register to the adder. This is accomplished by the line *+GT DAB to AD* on FIGS 197A and B. On FIGS. 197A and B, the line *+GT DAB to AD* gates bits 1, 2, and 3 from the data address register into the adder and also to the byte counter which is located on FIGS. 216A through 217B, ref. FIG. 13A.

Figure 29:
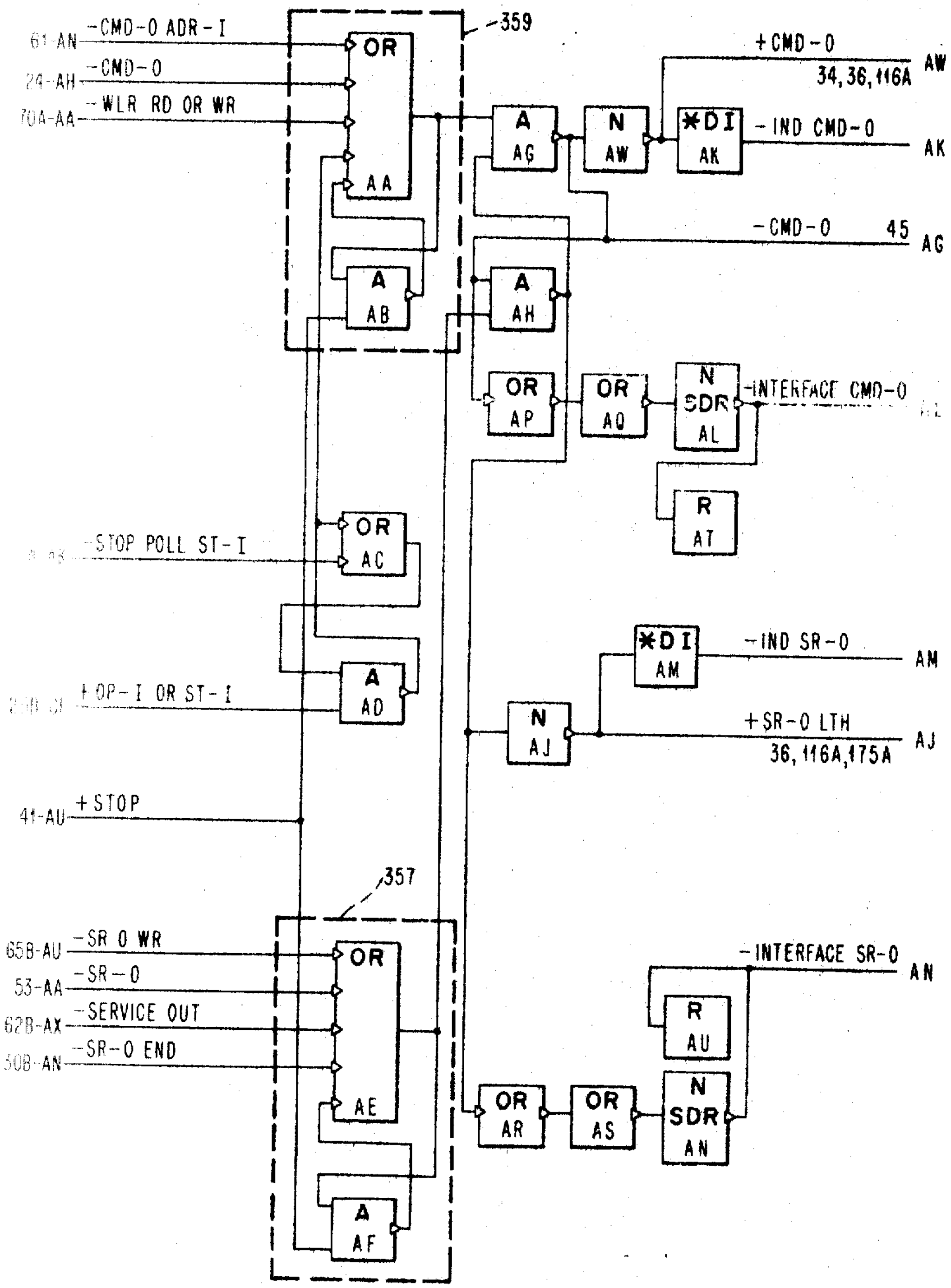

At clock time T2, not T3, on FIG. 61, block AH is activated. The output of this block goes to FIG. 45 to sample for an error condition on the *data bus out.* At T4 time on FIG. 61 block AP is activated. The output of block AP goes to FIGS. 166 and 189A and B. On FIG. 166 this line, *—latch adder out,* enters an OR circuit block AJ whose output is used as a sample pulse for the parity checking of the flag register. On FIGS. 189A and B, *—latch adder out,* enters an OR circuit block AE whose output is inverted by blocks AL and AM and the output of both of these blocks is powered to latch the adder. On FIG. 61 at T4, not T5 clock time, the output of block AQ will be negative. One output from block AQ goes to FIG. 46 where it samples for an adder check. The second output from block AQ goes to FIGS. 187A and B where it enters OR circuit block AB, is inverted by block AG, enters OR circuit AQ, and is powered by blocks AT and AY. The output of block AY on FIGS. 187A and B is used to gate the adder to the *count register.* The *count register* is located on FIGS. 161A through 164. On FIG. 61 at T7 time, AND circuit block AN is activated. The output of this block, *—command out address in,* goes to FIG. 29 to the command out OR circuit, block AA. The output of block AA is inverted in block AG, goes through OR circuit AP and AQ, then through the simplex driver block AL. The output of block AL becomes *—interface command out.*

12.07 DEVICE STATUS

In response to the channels *command out,* the I/O device brings up its *status in* tag line and places its status on the *data bus in.* In the normal case there will be no status bits in the status byte sent by the device. The *status in* tag line comes into FIGS. 25A and B in block AB, which is the receiver block. The output of block AB is ANDed with *—simulate interface* in block AG whose output goes through an OR circuit block AL. One output from block AL is inverted through OR circuit block AR and AW and powered in block BE. The output of block BE leaves FIGS. 25A and B as *+status in.* A second output from block AL is powered through block AS and leaves FIGS. 25A and B as *—status in,* and goes to FIG. 45 where it is used to form a pulse to check the parity on the status in byte on the *data bus in.* On FIG. 61 *+status in* is ANDed with *read or write* in AND block AR. One output from block AR goes to FIG. 52 where it turns off the clock (ref. FIG. 15). The second output of block AR is inverted by block AT and leaves this figure as *+read or write and status in* and goes to FIGS. 73A and B where it is ANDed with not T3 in Block AA. The output of Block AA turns on the sequence one trigger, blocks AB and AC. The output of block AB is inverted and powered through block AH and leaves this page as *—sequence one.* The output of block AC is inverted and powered in block AJ and leaves this figure as *+sequence one. Plus sequence one* enters FIGS. 62A and B and is ANDed with *status in* by block AA, inverted by block BF, and inverted again by block AH. One of the outputs of block AH is ANDed with *not sequence two* in block AK. The output of block AK which is *—sequence one and status in* goes to FIG. 52 where it turns on the clock. Ref. FIG. 15.

Figure 31A:
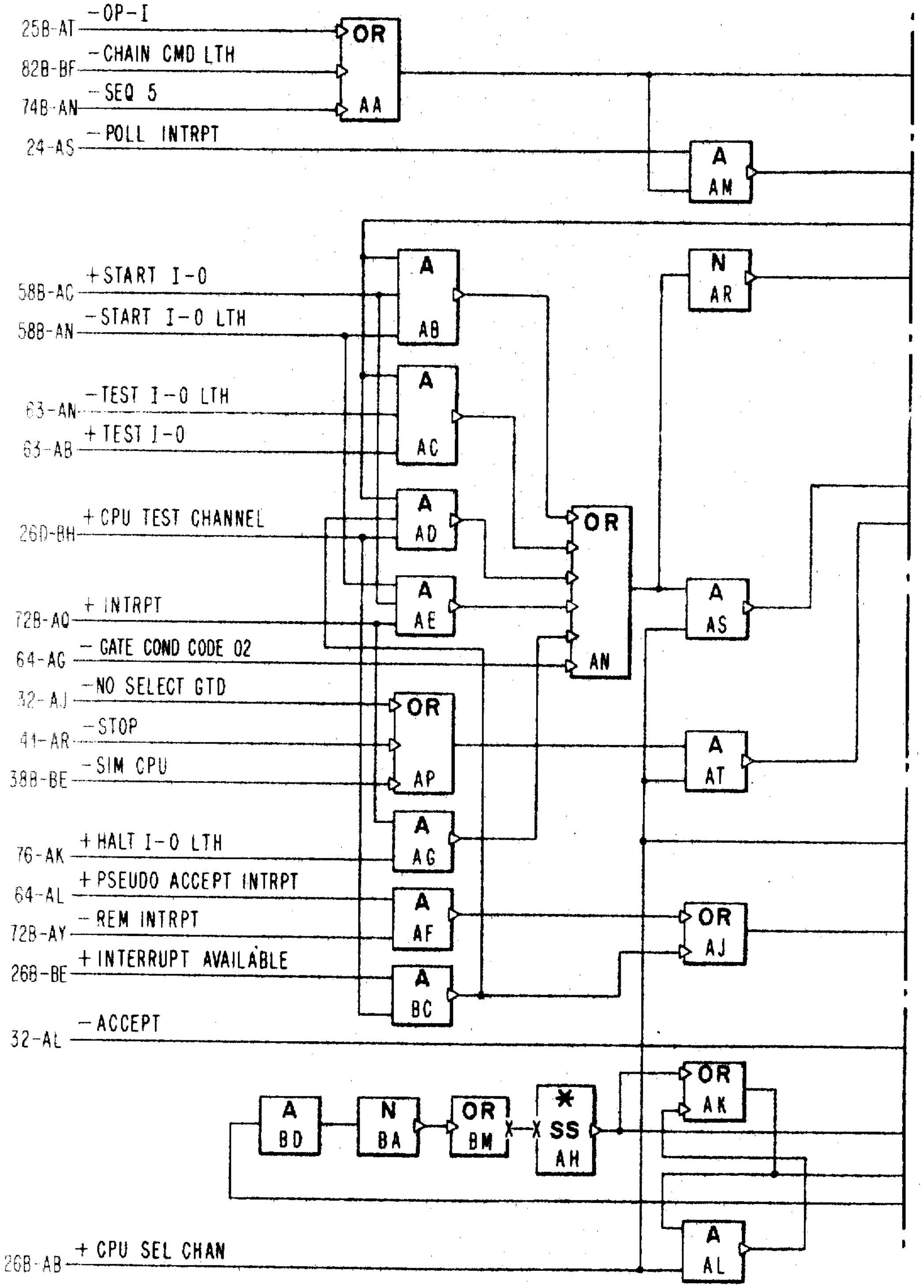
Figure 31B:
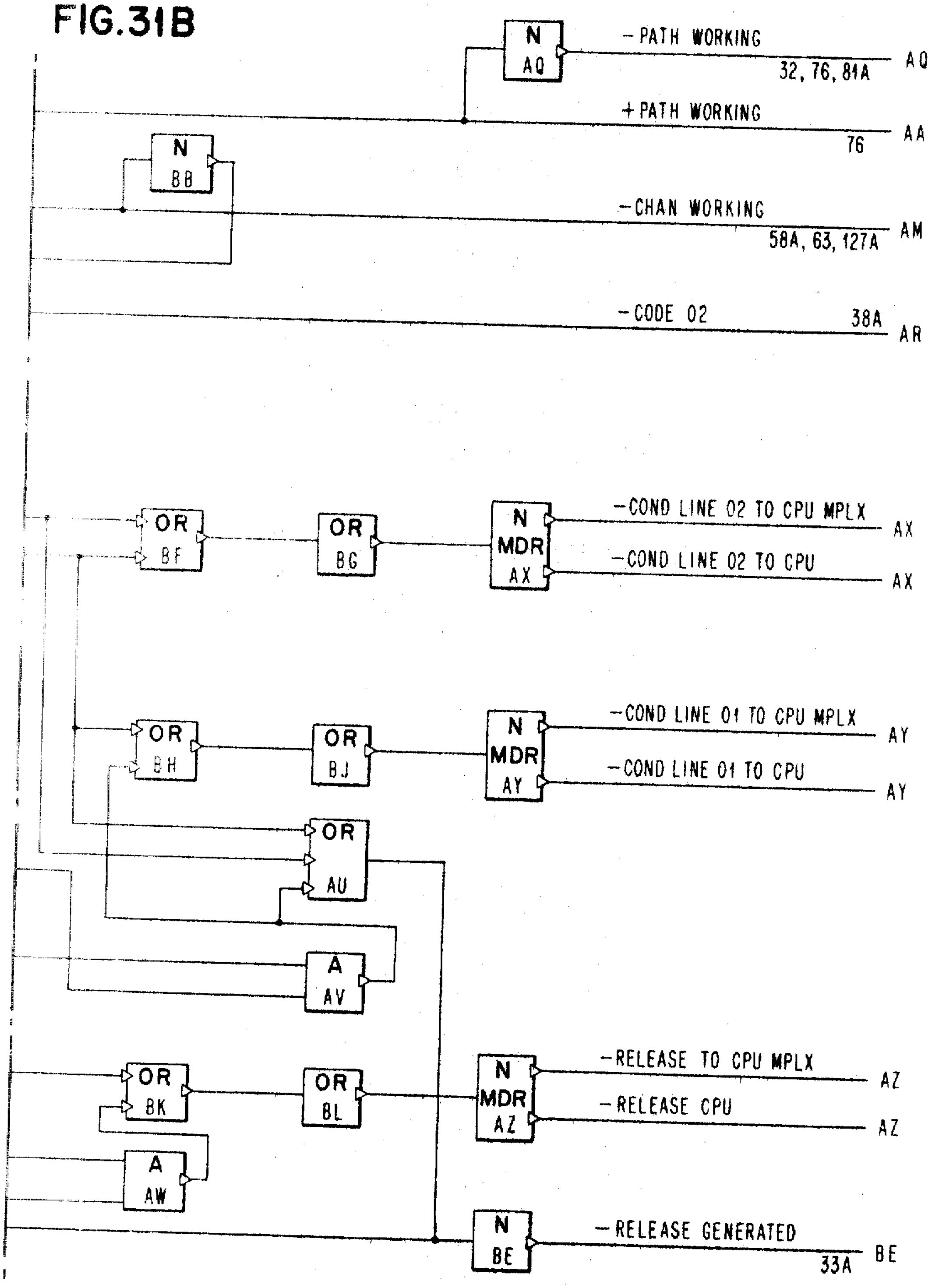
Figure 32:
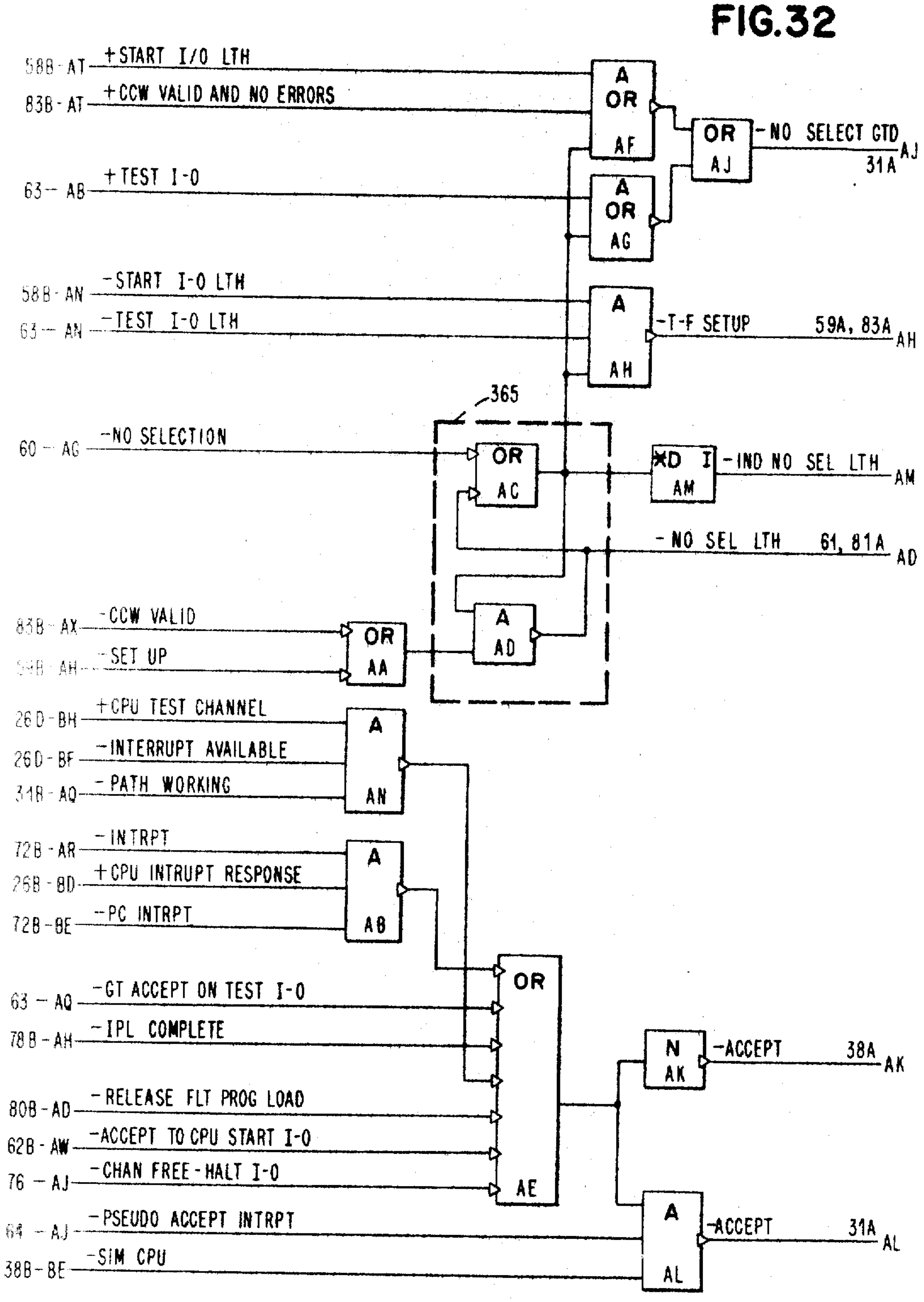
Figure 47:
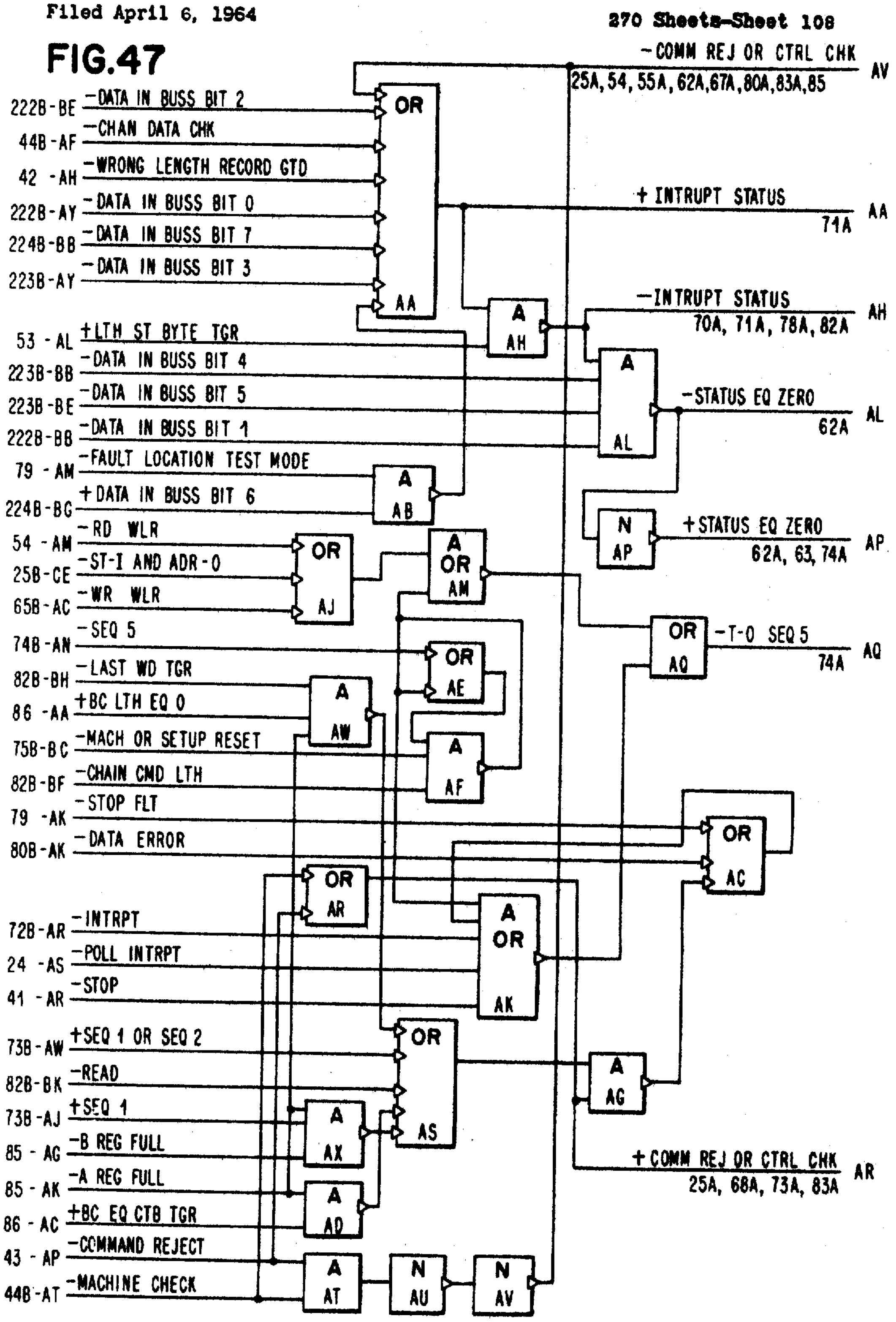
Figure 48A:
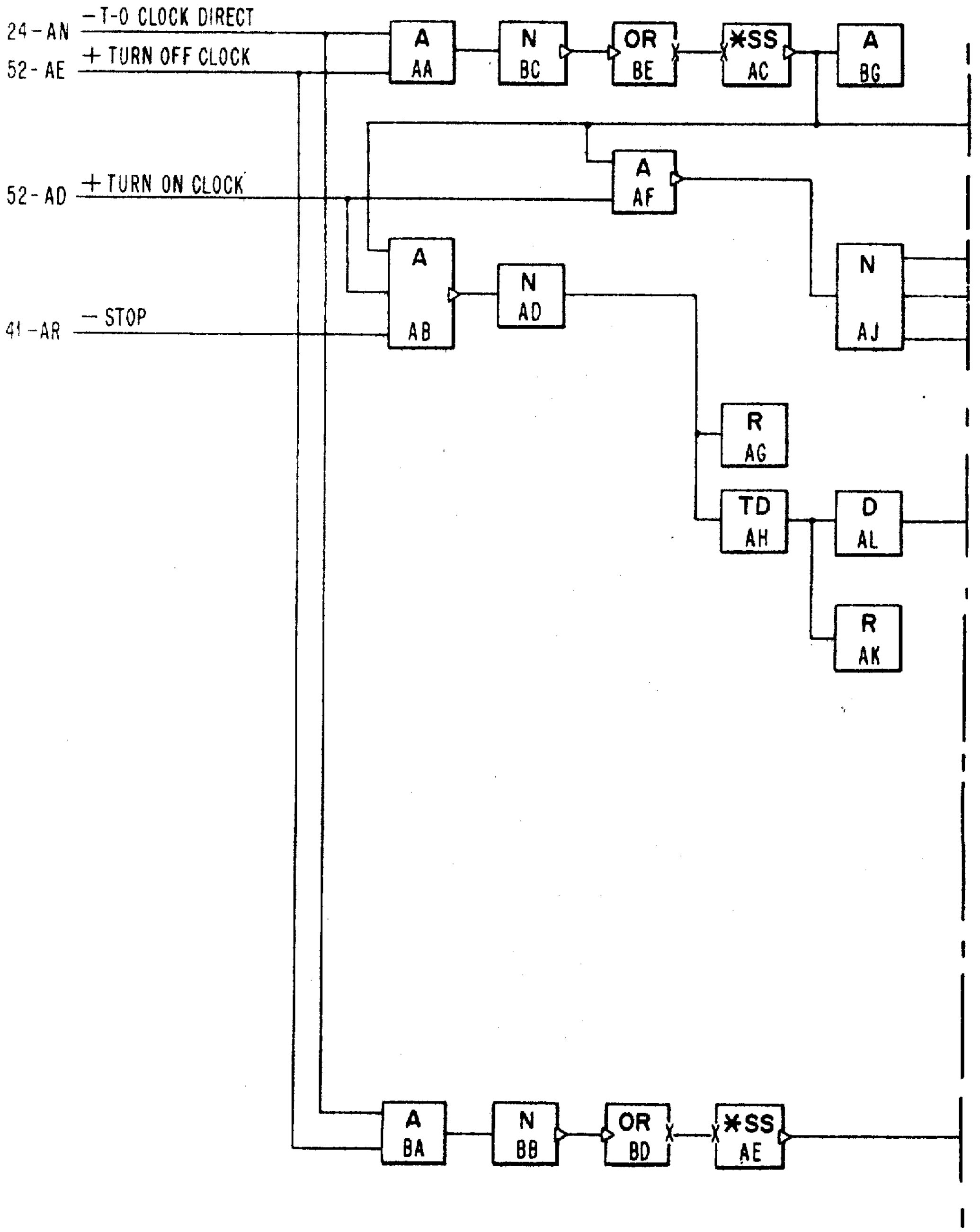
Figure 48B:
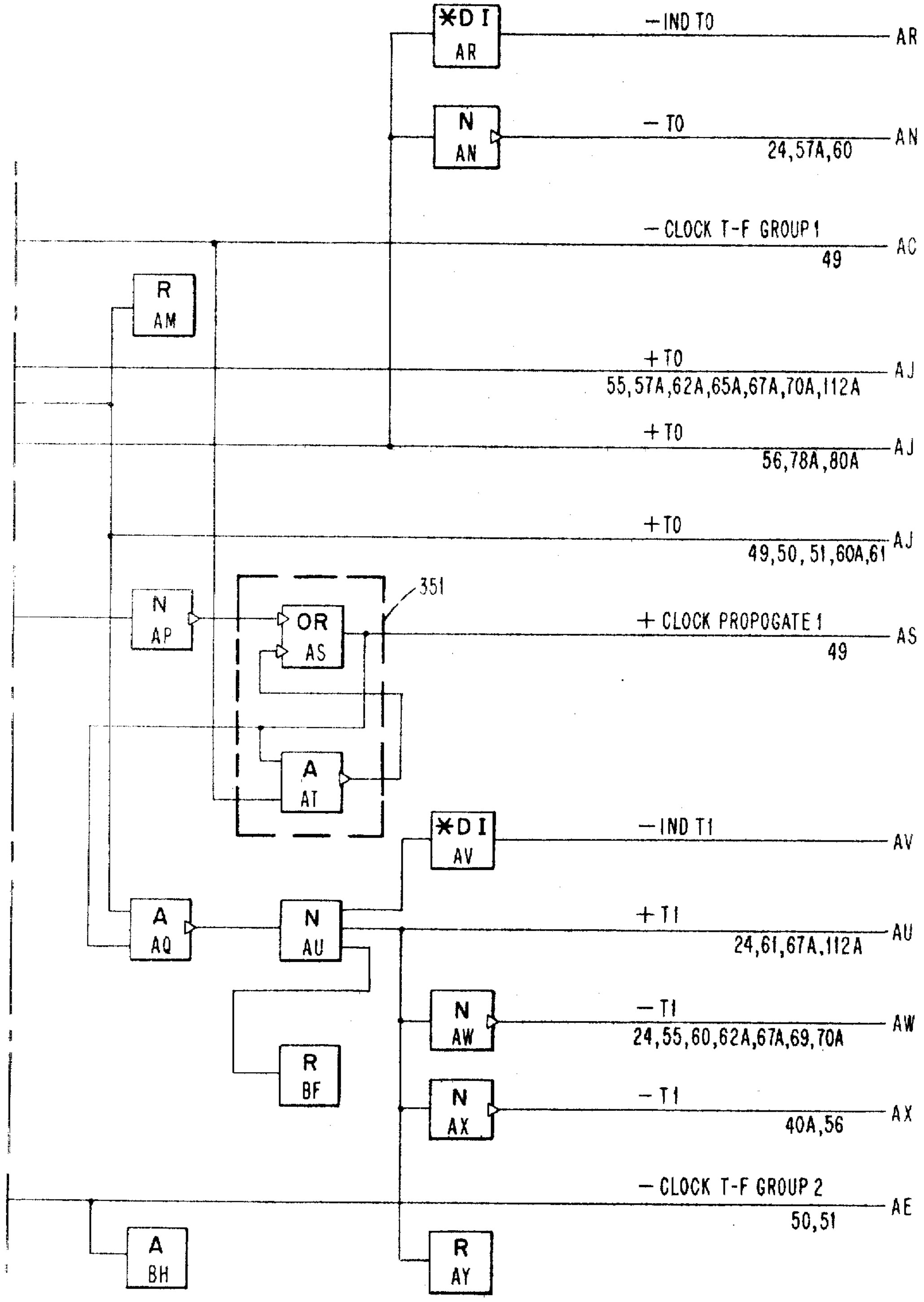
Figure 49:
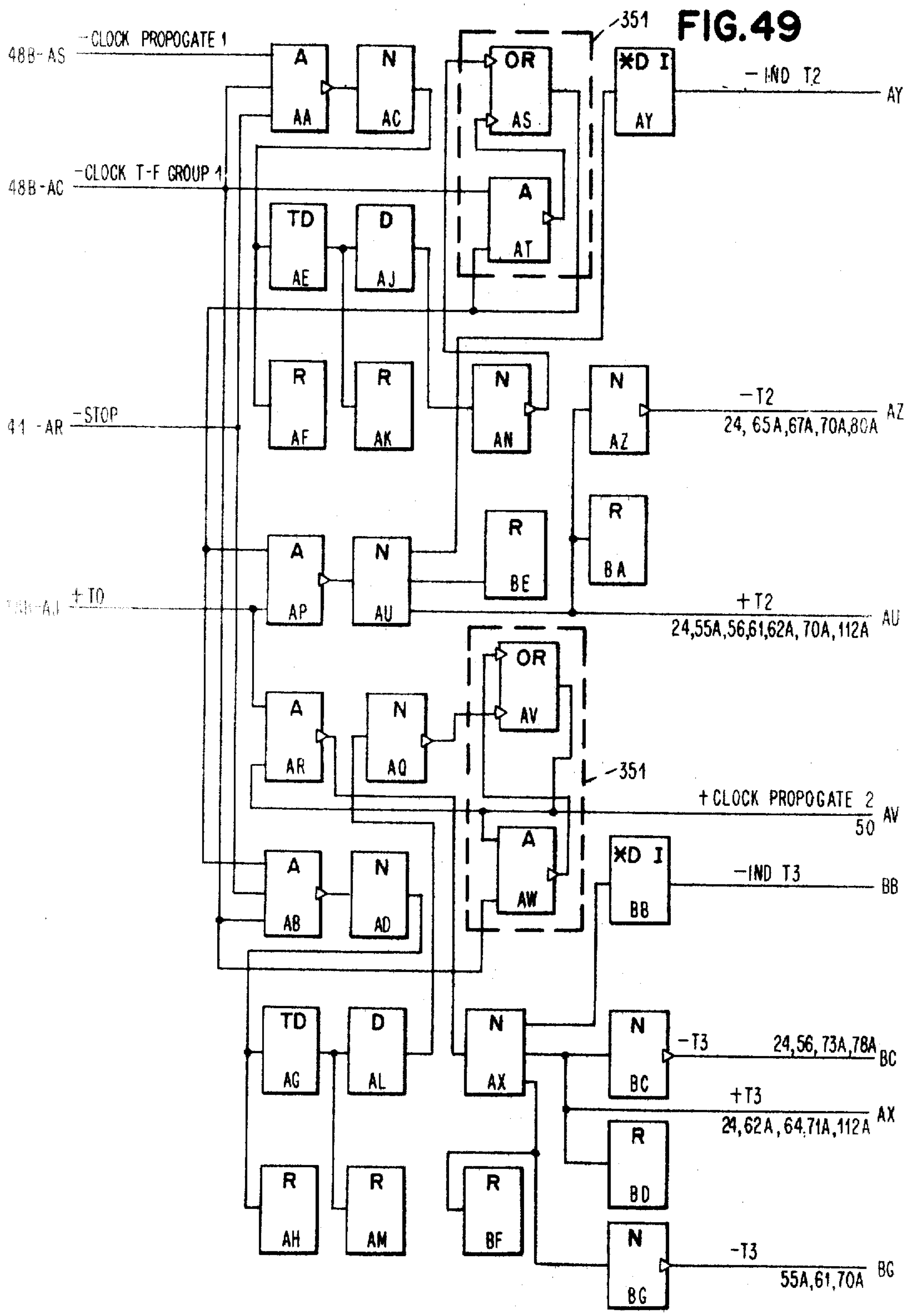
Figure 50:
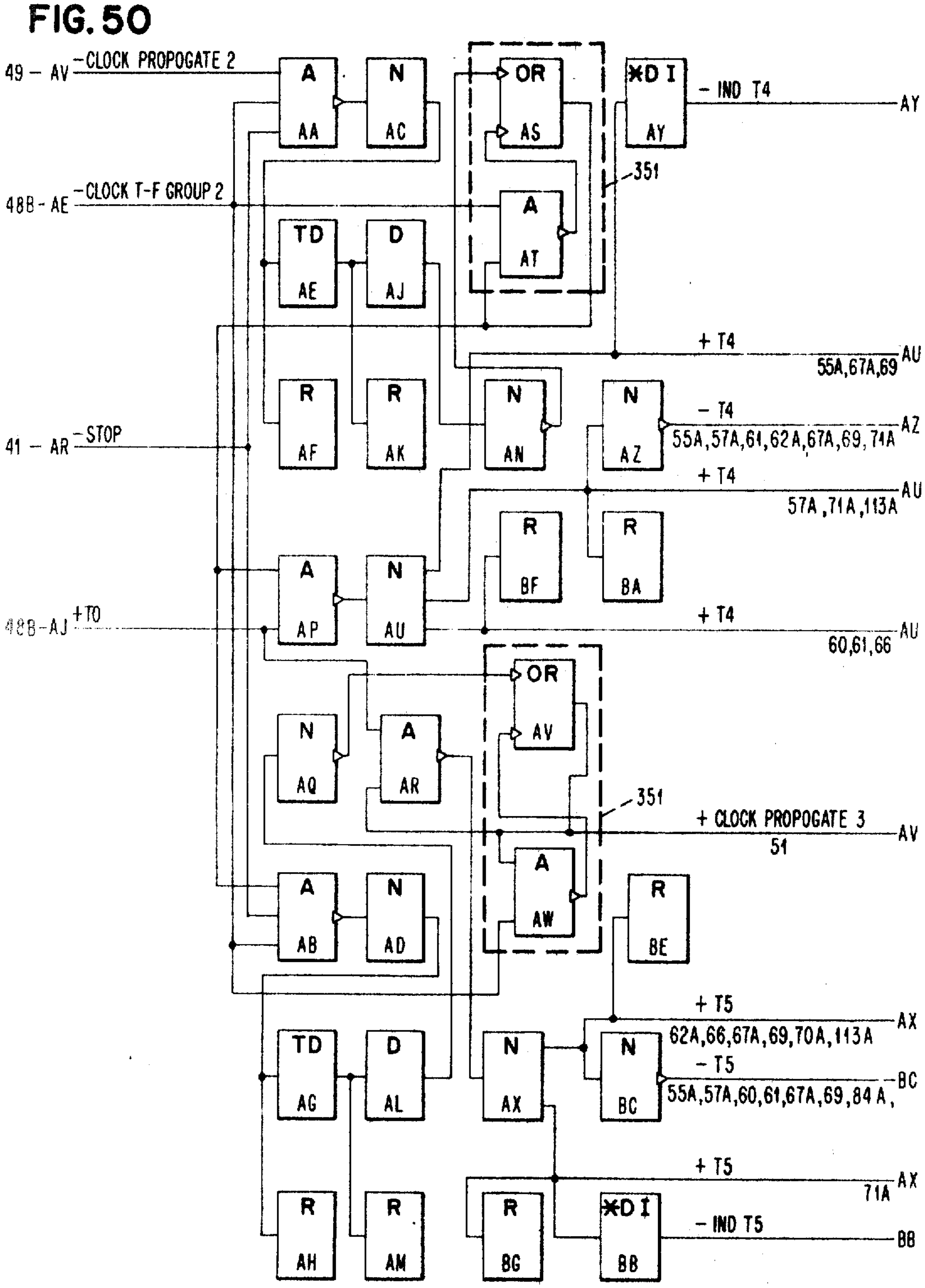
Figure 51:
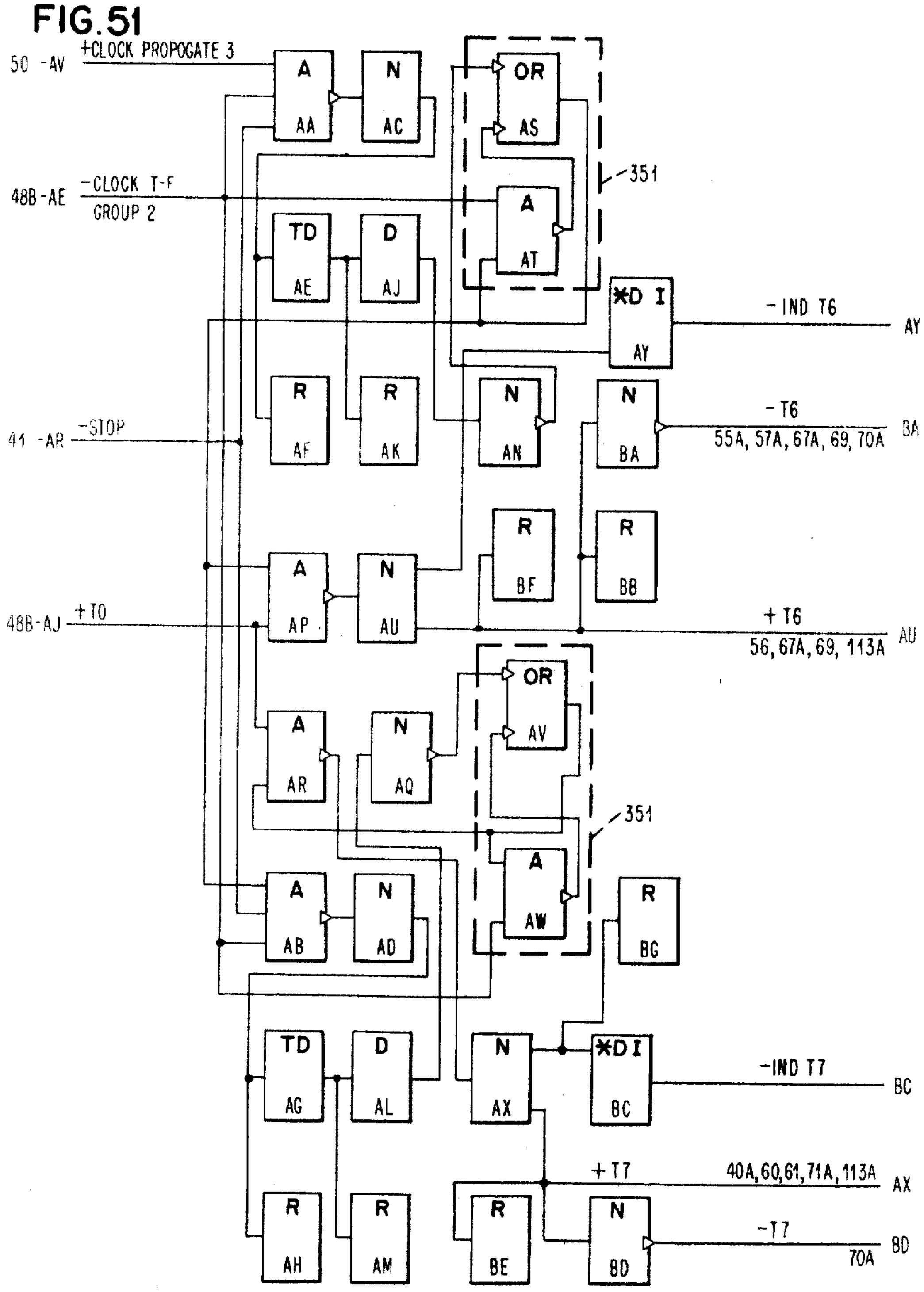
Figure 62A:
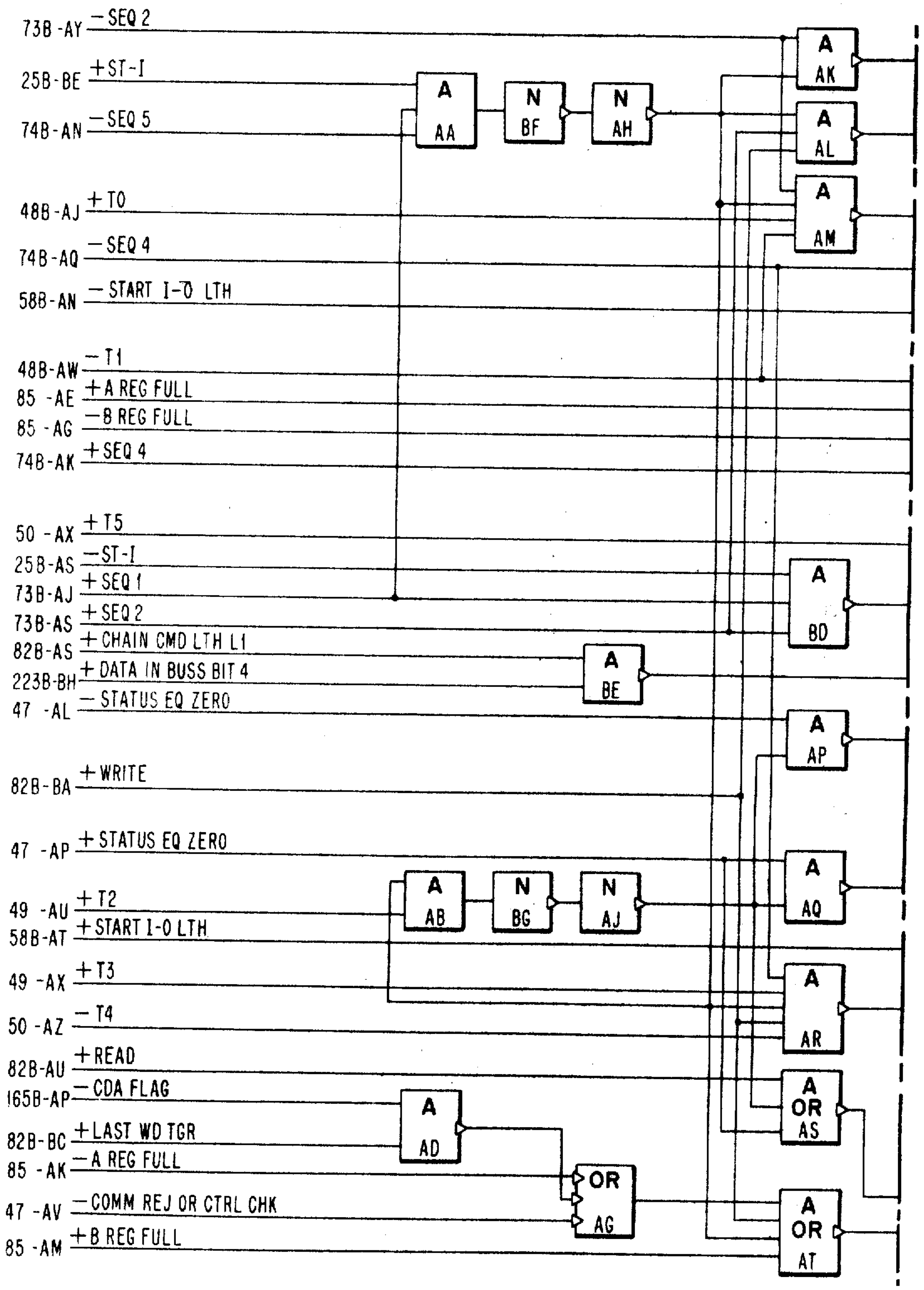
Figure 62B:
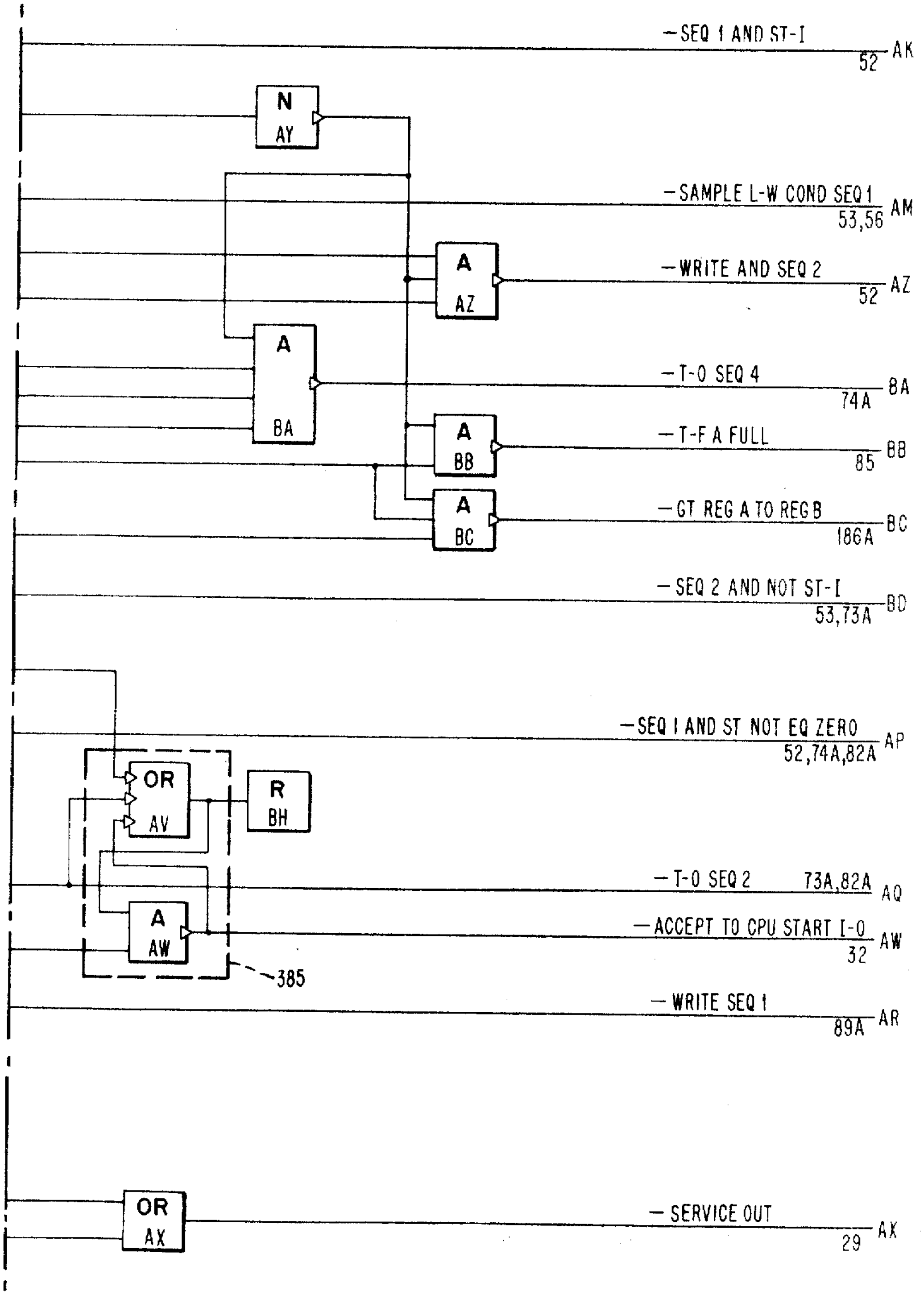
Figure 63:
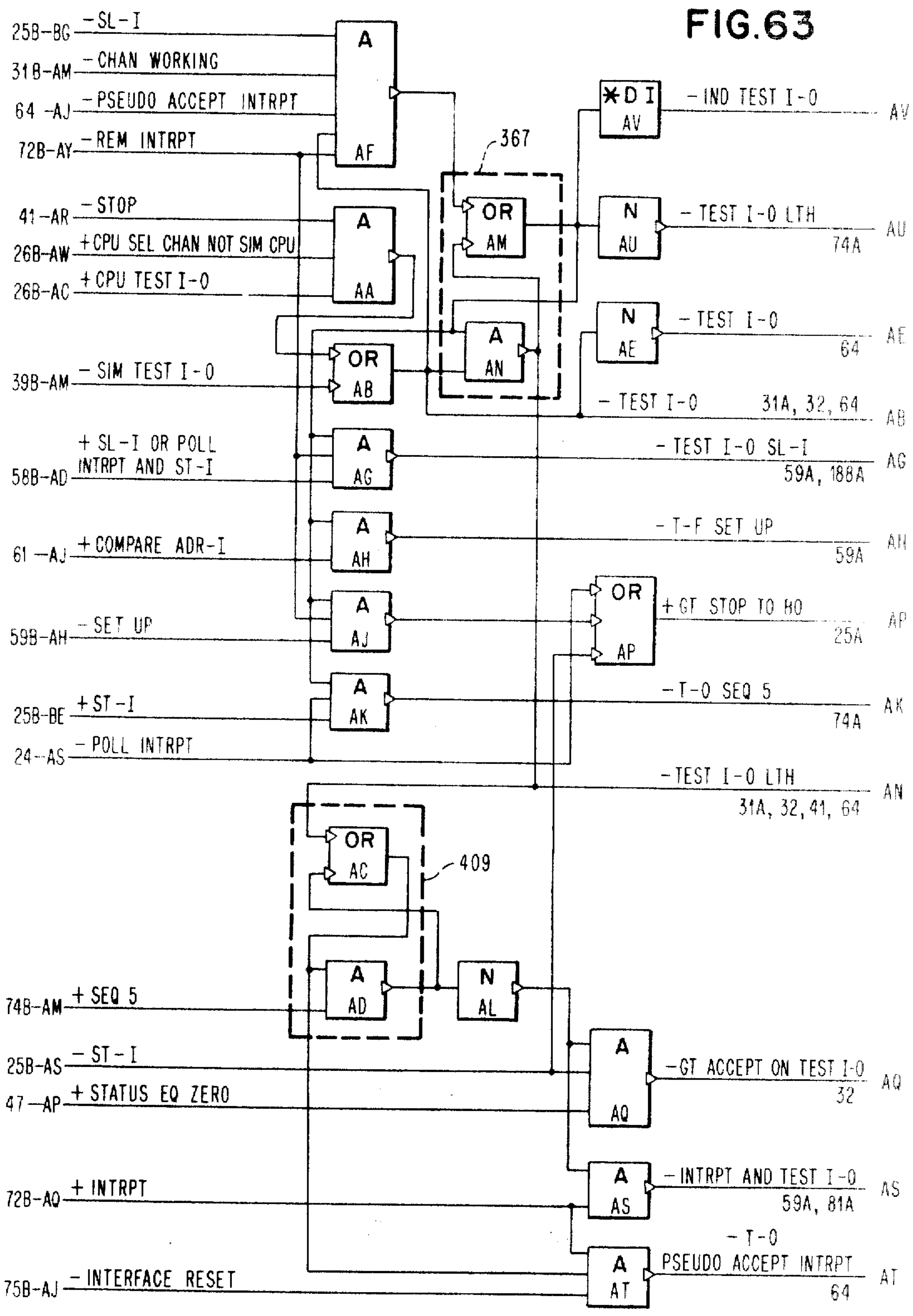
Figure 64:
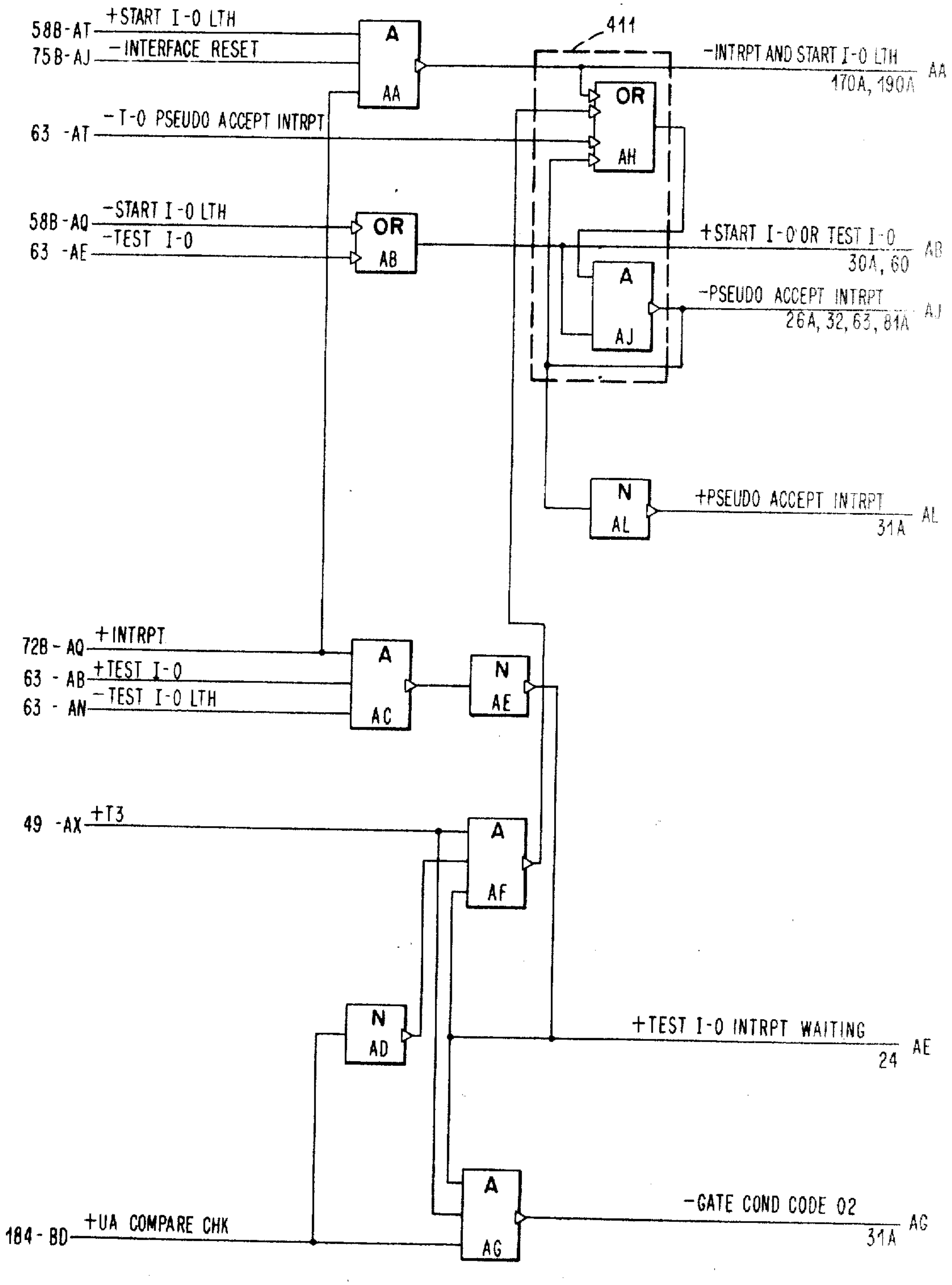
Figure 65A:
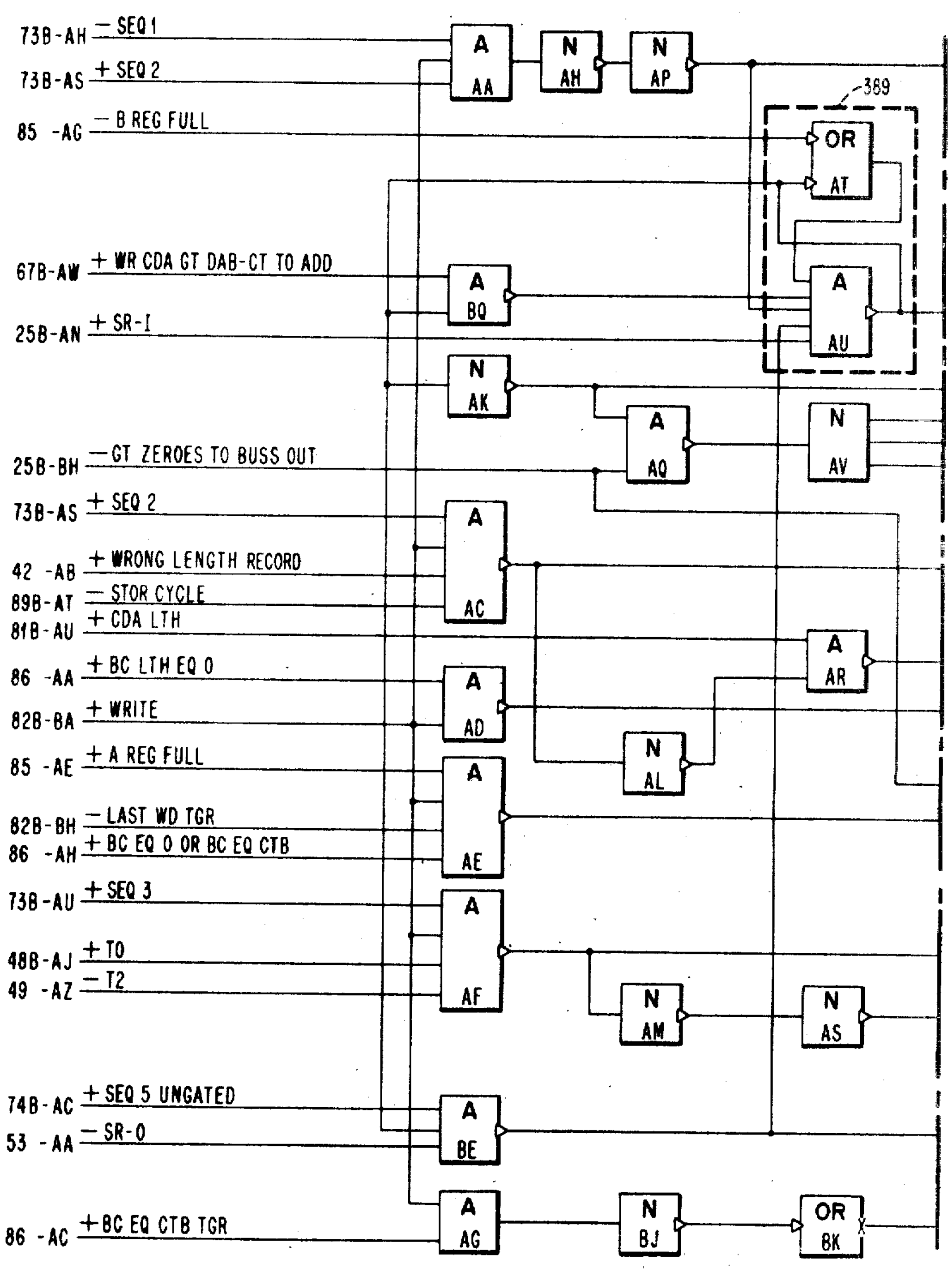
Figure 65B:
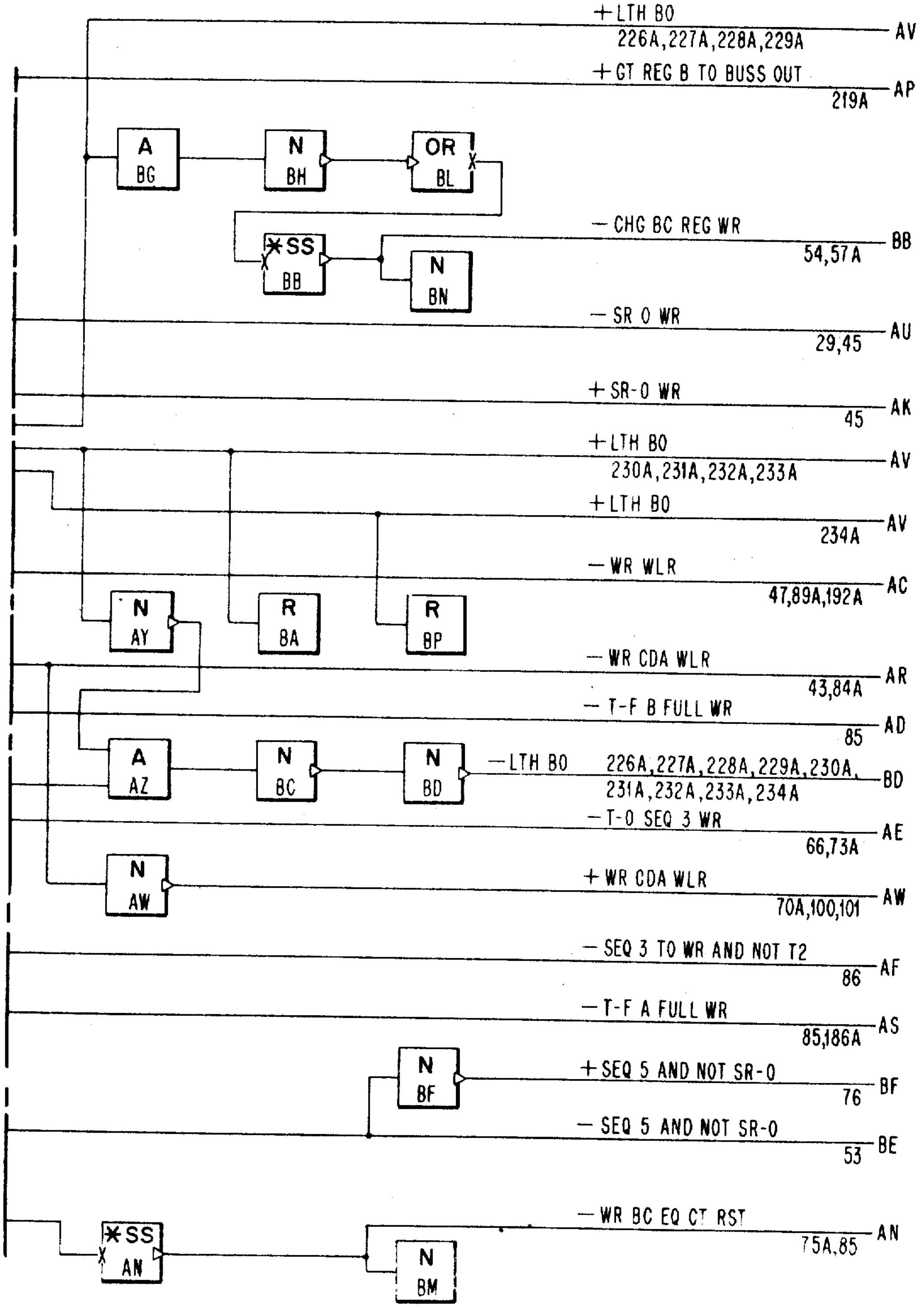
Figure 66:
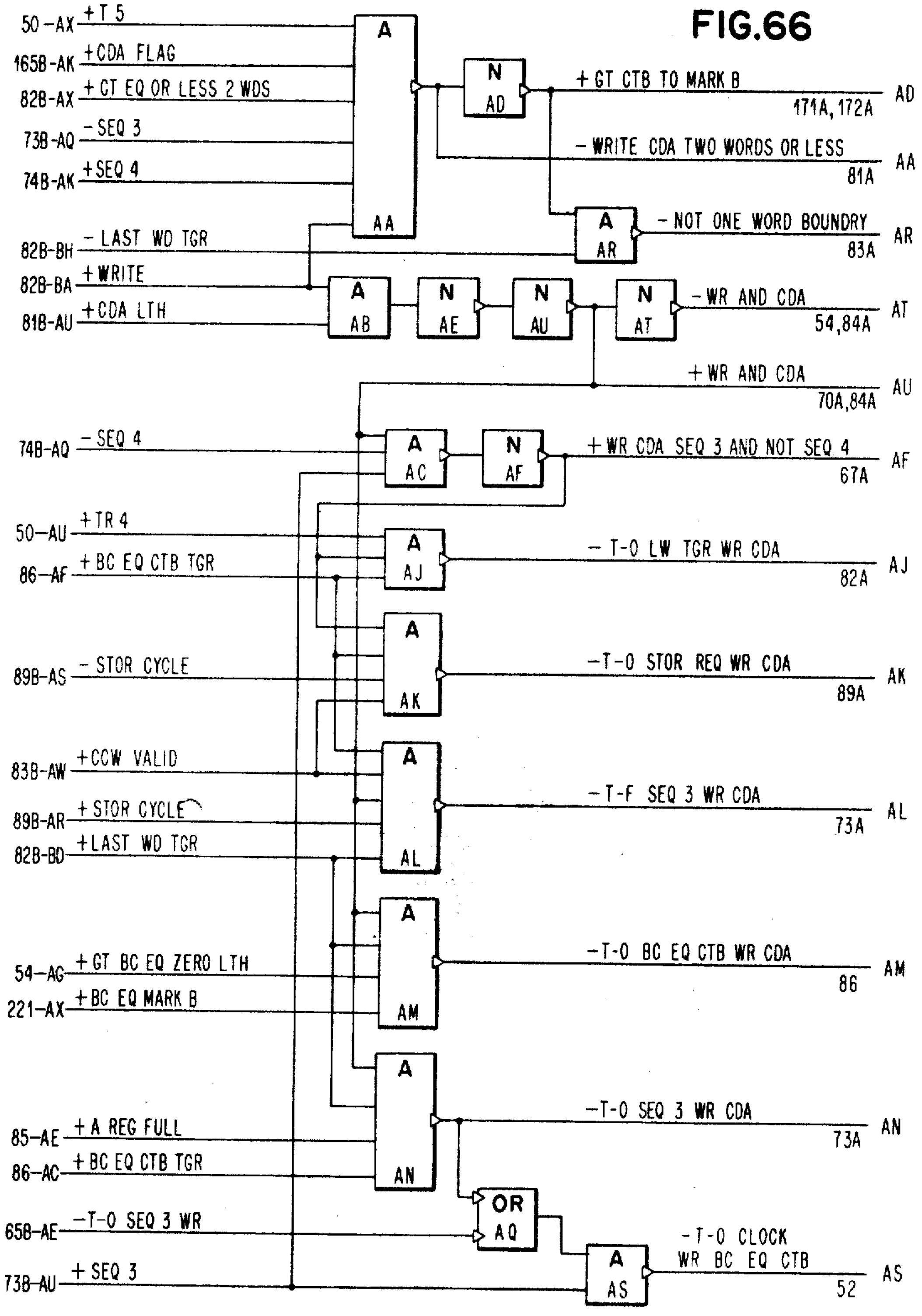
Figure 67A:
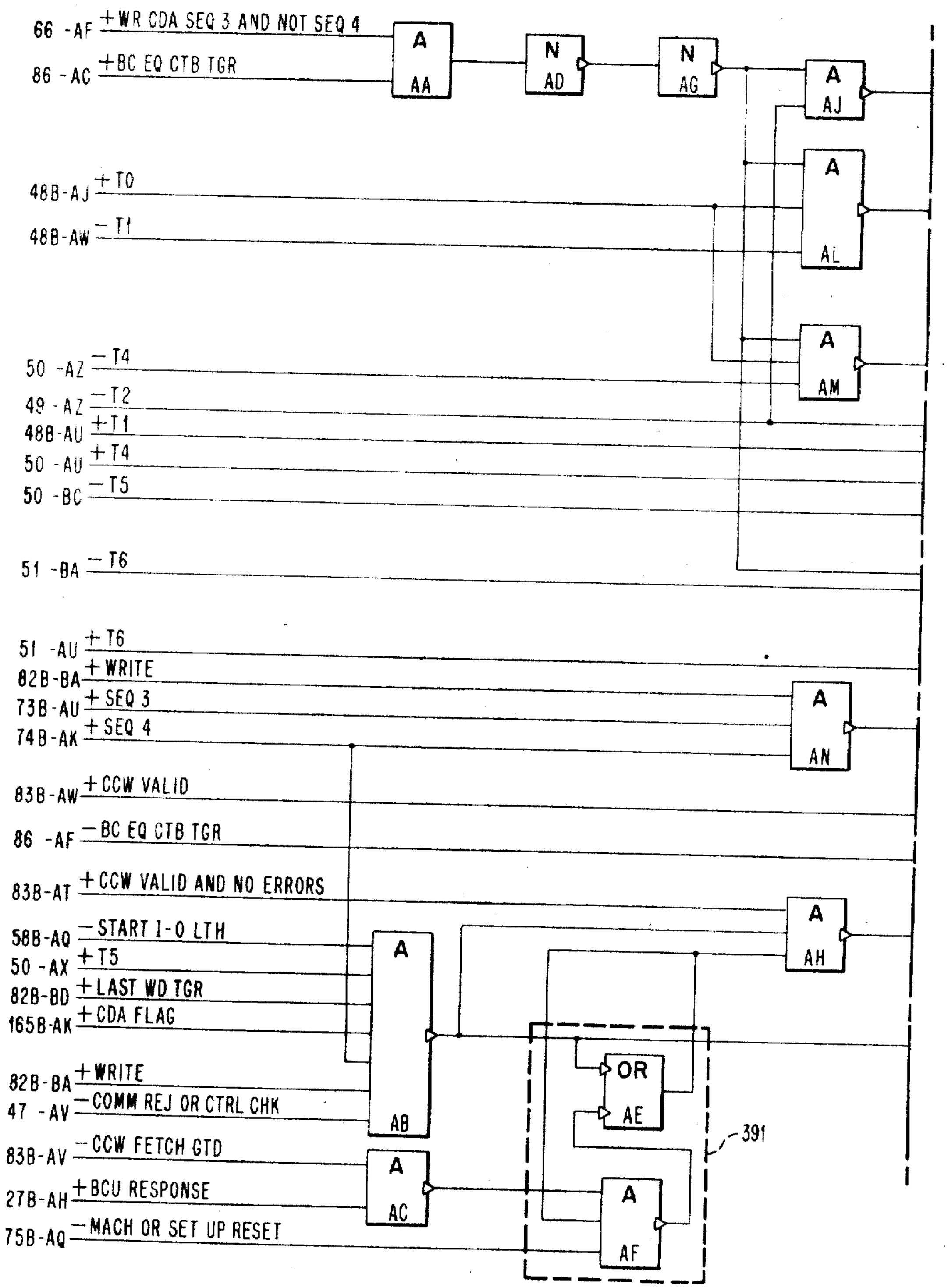
Figure 67B:
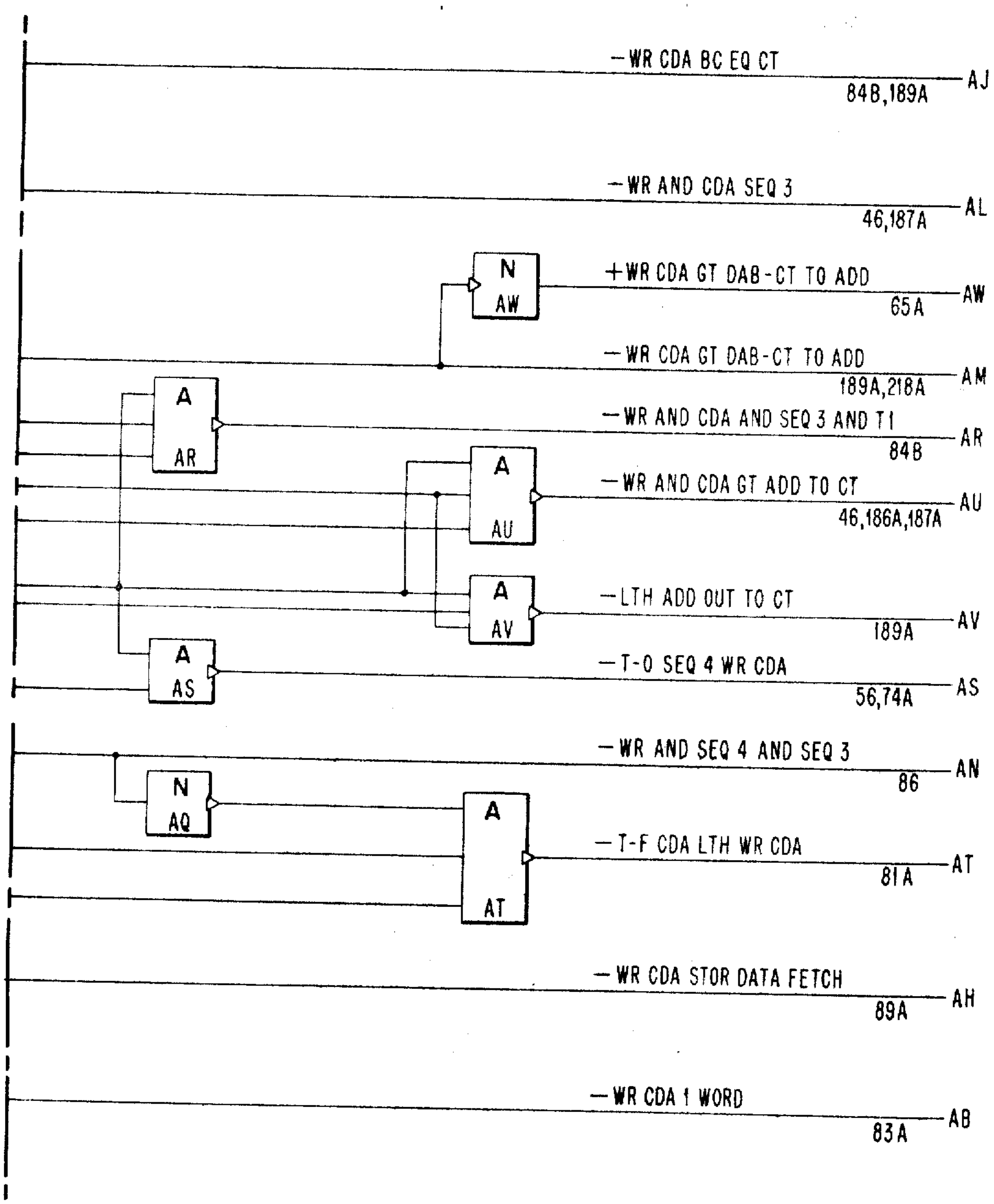

The output of block AH on FIGS. 62A and B also enters AND circuit AB where it is ANDed with clock pulse T2, inverted by block BG, again inverted by block AJ, and enters AND circuit AQ where it is ANDed with the *+status equals zero* line from FIG. 47 block AP. It is the output of AND circuit block AQ which enters OR circuit block AV, and AND circuit block AW, the output of which leaves FIGS. 62A and B as *—accept to CPU start I/O.* On FIG. 32 the line *accept to CPU start I/O* enters the OR circuit block AE whose output enters AND circuit block AL and leaves FIG. 32 as the —*accept* line. *Minus accept* goes to FIGS. 31A and B where it enters OR circuit block BK and is inverted by blocks BL and AZ. The output of block AZ on FIGS. 31A and B is the multiplex line, *release to CPU.* Upon seeing this line, the CPU will drop the *select channel* and the *start I/O* lines. The channel is now ready to operate with the interface and carry on the transmission of data. (The status of the channel at this time can be noted from line 5 of FIG. 25.)

Figure 73A:
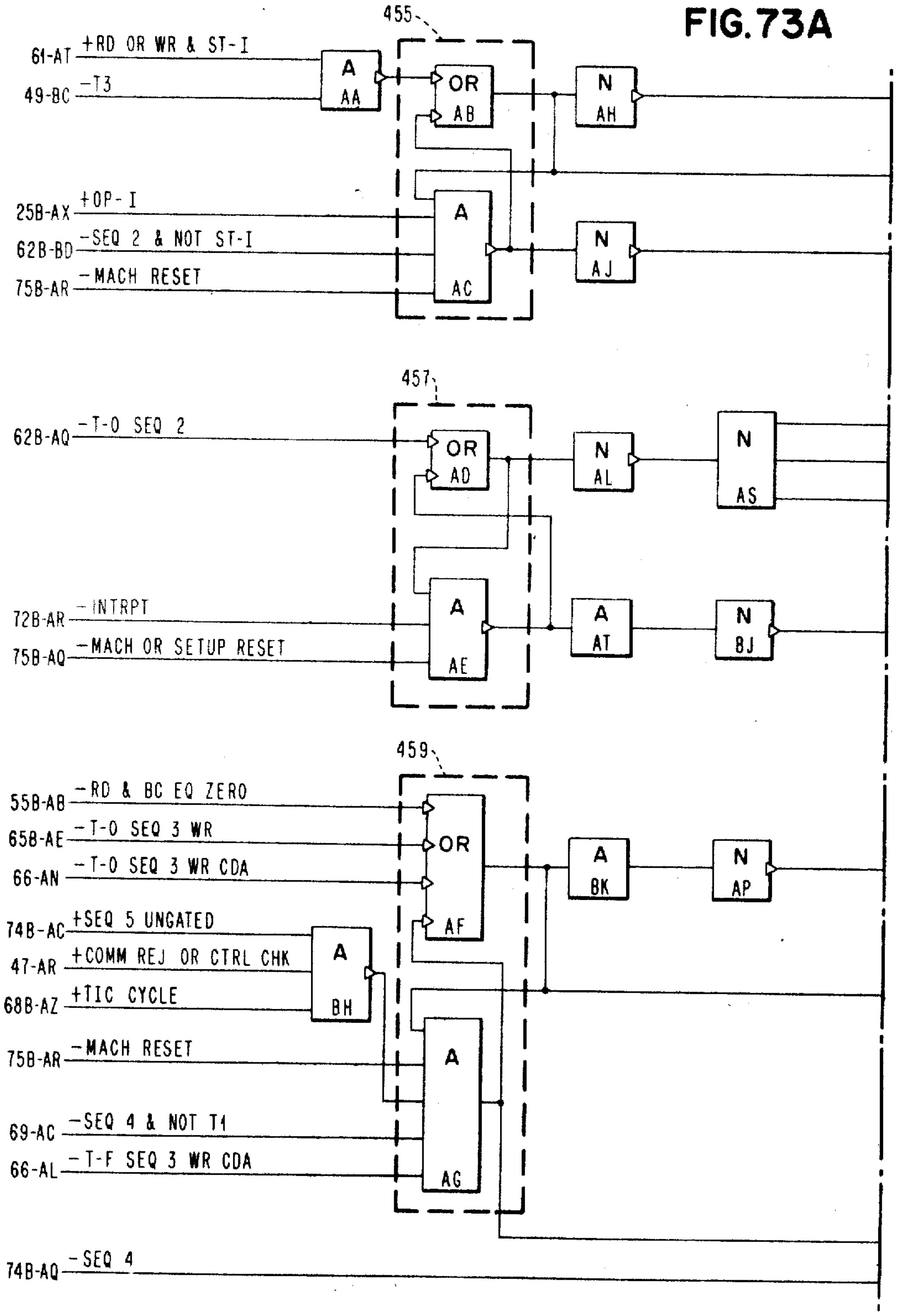
Figure 73B:
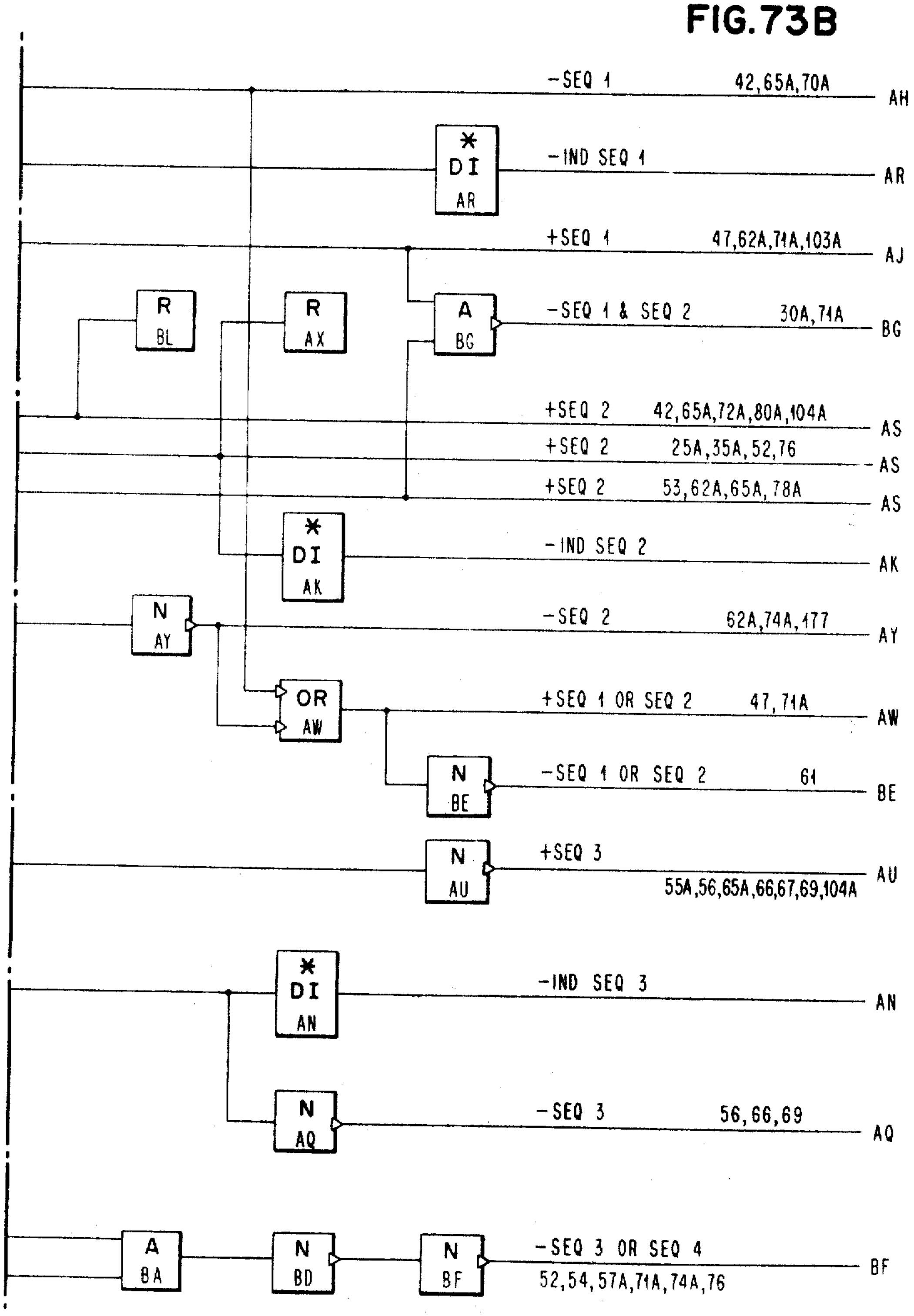

On FIGS. 62A and B, the output of block AQ leaves the page as —*turn on sequence 2.* This line goes to FIGS. 73A and B where it turns on *sequence 2* blocks AD and AE. The plus phase of *sequence 2* is powered by blocks AL and AS. The minus phase of *sequence 2* is powered by blocks AT, BJ and AY. Since the channel is doing a read operation, block AS on FIGS. 62A and B is activated. It is the output of block AS which sends the first *service out* across the interface. The line —*service out* leaves FIGS. 62A and B and goes to FIG. 29. On FIG. 29, the line —*service out* goes through OR circuit block AE, AND circuit block AH, OR circuit block AR, and the driver, blocks AS and AN. It is the output of block AN which sends —*interface service out* to the control unit. Upon receiving this line, the control unit will drop *status in* to the channel and will proceed with the transmission of data.

12.08 TRANSMISSION OF DATA

The channel will wait for a *service in,* latch the information on the data *bus in* gate it into the B register and answer with *service out.* The number of times that this operation is repeated is determined by the contents of the *count register* which in this case is 40 bytes. Each *service in* request will be handled in the same fashion. The *service in* enters block AD on FIGS. 25A and B, is inverted in AND circuit block AJ and OR circuit block AN, and leaves FIGS. 25A and B as +*service in. Plus service in* goes to FIG. 53 where it enters AND circuit block AA whose output leaves the page as —*service out.* On FIG. 29, —*service out* coming from FIG. 53, goes through OR circuit block AE, AND circuit block AH, OR circuit block AR, and the multiplex driver blocks AS and AN. This *service in service out* signal sequence occurs independently of any other operation the channel may perform such as the latching of the bus in, the gating of the bus in to the B register, the stepping of the byte counter, and the sequence three, and sequence four operations (update count and update data address). The +*service in* line from FIGS. 25A and B block AN enters FIG. 53, AND circuit block AA. The output of block AA goes through blocks AE, AX, and AY, and fives the single shot, blocks AZ, and AB. The output of block AB is inverted by block AF, enters AND circuit block AK and is inverted by block AQ. The output of block AQ on FIG. 53 leaves FIG. 53 as +*gate bus in to B register.* This line goes to FIGS. 54, and 220A and B. On FIG. 54 the line +*gate bus in to B register* enters inverter block AB whose output enters an OR circuit block AG. The output of block AG leaves FIG. 54 as +*gate byte count equals zero latch.* It is the byte count equals zero latch which will activate the circuitry for sequence 3 at the appropriate time. The output of block AB on FIG. 54 also enters block AQ, block AP, and the 100 nanosecond single shot blocks AS and AA. The output of block AA goes to OR circuit block AE whose output +*change byte count register,* goes to FIGS. 216A and B and 217A and B where it will step the byte counter ahead by one. On FIG. 53 the line +*gate bus in to B* register also goes to FIGS. 220A and B where it accomplishes the actual gating of the bus in to the B register. The byte counter determines what position of the B register the bus in is gated into. Also, on FIG. 53, the single shot block AB enters OR circuit block AT, whose output goes to blocks AW, AD, and AH. It is the output of block AH, +*latch the bus in,* that goes to FIGS. 222A through 224B, and accomplishes the actual latching of the bus in.

12.09 STORING OF DATA AND UPDATING OF COUNT

Figure 55A:
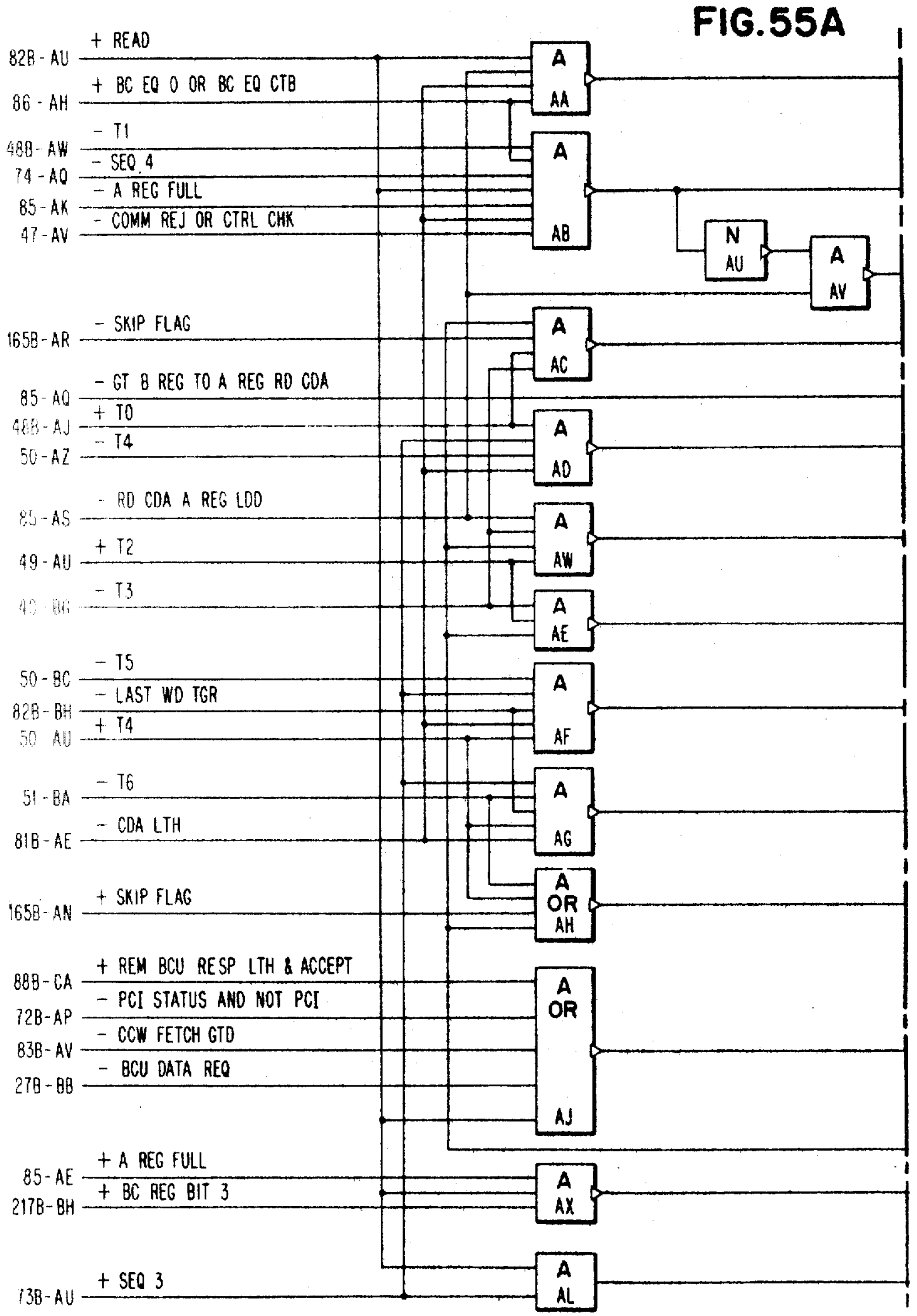
Figure 55B:
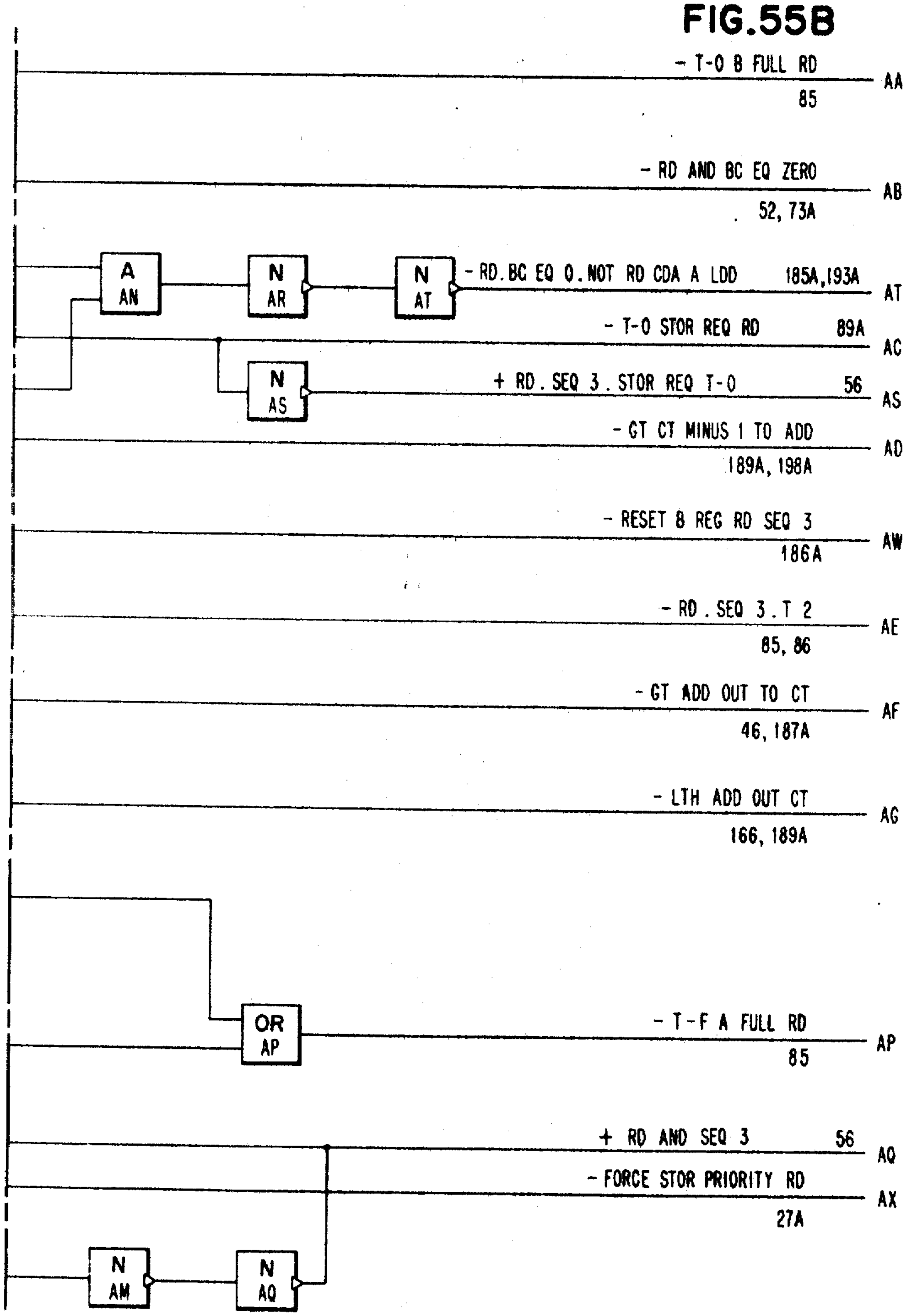

As indicated previously the *service in, service out* signal sequence is carried on independently of the address updating operations. This updating is initiated by Block AG of FIG. 54. The output of Block AG, +*gate byte count equals zero latch* which goes to FIGS. 218A and B, is used as a gate on FIGS. 218*A* and B in Block AP. Block AP is a decoder and when its output goes negative initiates the updating sequences. The output of Block AP —*byte count latch equals zero* leaves FIGS. 218A and B and goes to FIG. 86. On FIG. 86 the line —*byte count latch equals zero* enters OR circuit AA and AND circuit AB which is the byte count latch equals zero trigger. The output of Block AB enters OR circuit Block AH on FIG. 86 and this line, called +*byte count equals zero or byte count equal count,* goes to FIGS. 55A and B. On FIGS. 55A and B the line +*byte count equals zero or byte count equals count* enters AND circuit Block AA whose output —*turn on B full read* goes to FIG. 85 where it turns on the B full latch composed of Block AF and AG. Also on FIGS. 55A and B +*byte count equals zero or byte count equal count* enters Block AB whose output —*read and byte count equals zero* goes to FIG. 52 where it turns on the clock and also goes to FIGS. 73A and B where it turns on sequence three.

The channel will decrement the count, store the data word into the appropriate location in storage, and increment the data address. The storage operation and the decrementing of the count are carried on independently of each other. The storage operation is initiated by Block AC on FIGS. 55A and B. It is the output of Block AC called —*turn on storage request read* which goes to FIGS. 89A and B and initiates the storage request for the storing of the data word. This data word is now in the A register. It was gated from the B register to the A register by Block AT on FIGS. 55A and B. The decrementing of the count is also done on FIGS. 55A and B. At clock time T0 and not T4 the output of Block AD is activated. This output called —*gate count—one to adder* accomplishes two functions: the first function is to gate the contents of the count register to the adder; secondly, it raises a line which will cause the added to decrement its contents. At T4 and not T6 the output of Block AG is activated. This output called —*latch adder out to count* goes to FIGS. 166 and 189A and B, where it latches the adder so that its output is stable. At clock times T4 and not T5 the output of Block AF FIGS. 55A and B is activated. This output called —*gate added out to count* goes to FIGS. 187A and B where it accomplishes the gating of the adder to the count register. The —*gate added out to count* also goes to FIG. 46 where it checks the parity generated by the adder against the parity predicted by the adder. On FIGS. 55A and B the output of Block AW, —*reset B register read sequence three,* resets the B register on FIGS. 186A and B. Also on FIGS. 55A and B the output of Block AE, —*read sequence three T2,* resets the byte count equals zero trigger, which is located on FIG. 86.

As indicated previously, the storage operation is carried on independently of the decrementing of the count. At some point in time the channel *storage request* will be honored. The channel will receive from the BCU the lines *BCU response* and *BCU data request.* The *BCU data request* is a line from the BCU to the channel which when activated will cause the channel if it is doing a store operation to put data on the storage data bus in. With the fall of *BC response* the channel expects to see an *accept* pulse which will generate +*remember BCU response latch and accept* and —*BCU data request.* These lines will condition AND circuit Block AJ on FIGS. 55A and B. The output of this block is Dot ORed in Block AP and is called *—turn off A full read.* This is accomplished on FIG. 85 where the A full trigger, Blocks AA and AB, is turned off. This trigger had been turned on at T2 time of sequence three by the output of Block AE on FIGS. 55A and B. As long as this trigger is on, the channel will not attempt to update the data address in sequence four. As noted before this trigger gets turned off at the appropriate time during the storage cycle. When it is turned off the BCU has accepted the channel's data and will store it. Therefore the channel is free to increment the data address so it can be used during the next storage operation which will be initiated when the B register is again full.

Figure 69:
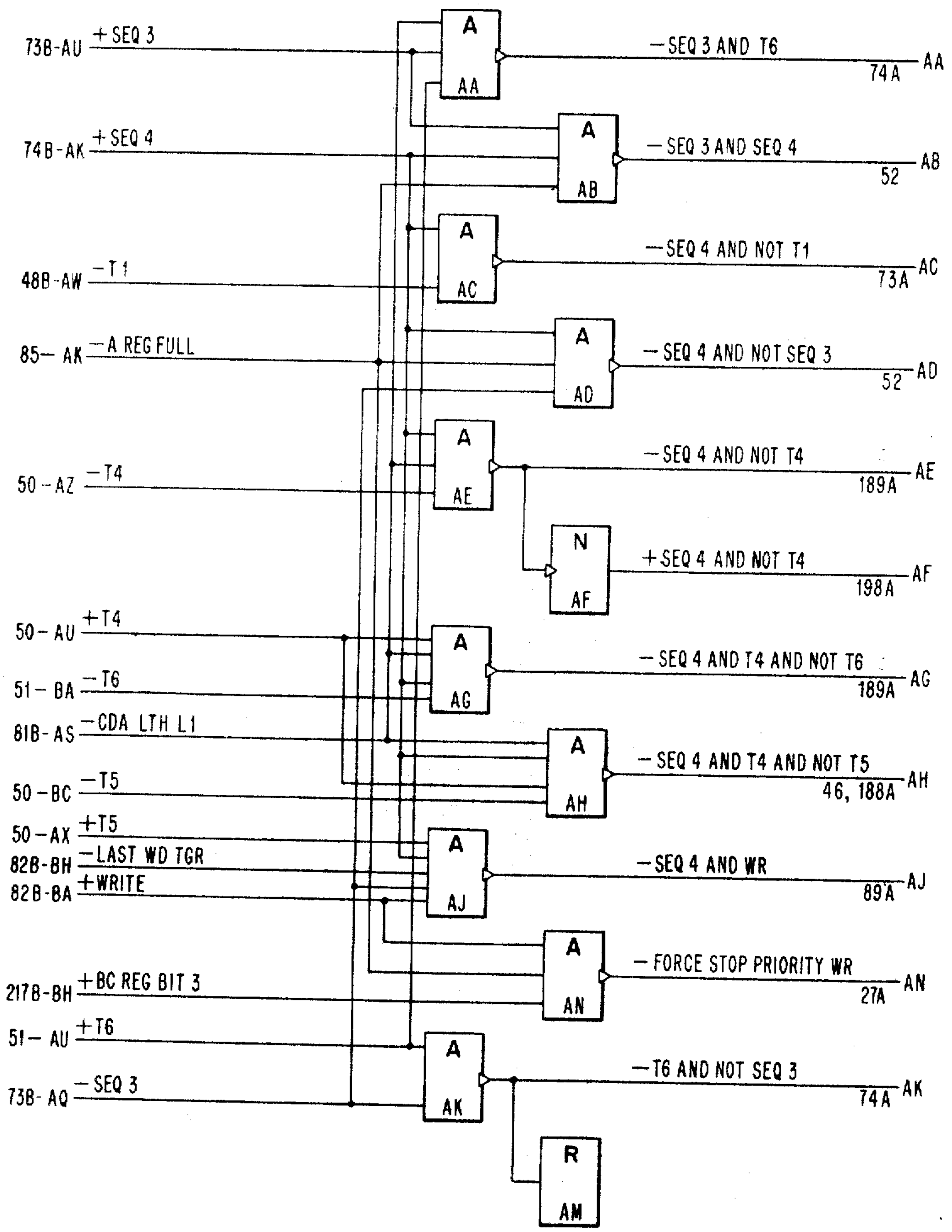
Figure 85:
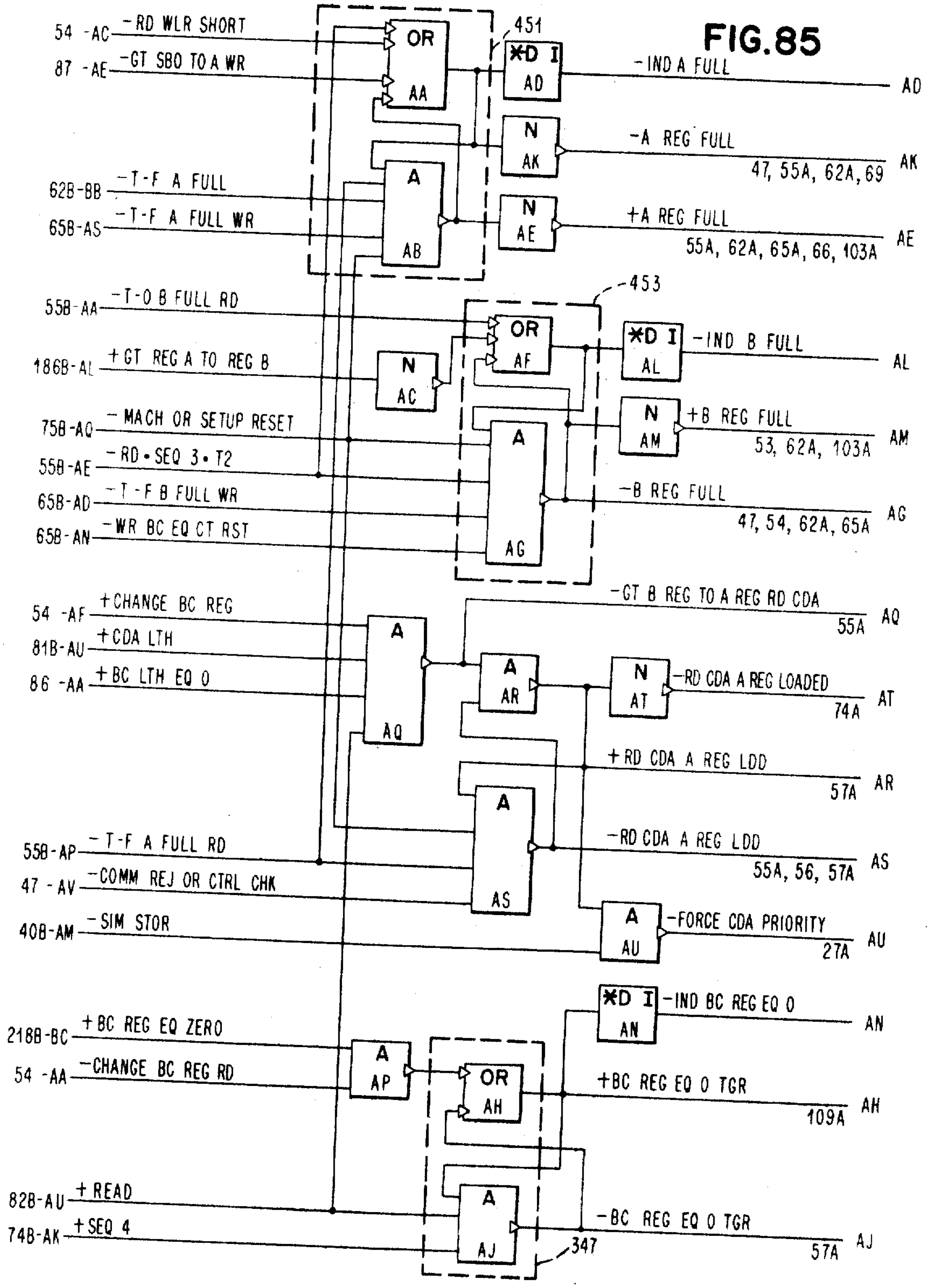

When the A full trigger is turned off the output of OR circuit, Block AA, on FIG. 85 goes negative is inverted in Block AK, causing the line called *—A reg full* to go positive. The *—A reg full* leaves FIG. 85 and goes to FIG. 69.

12.10 UPDATING OF DATA ADDRESS

Figure 74A:
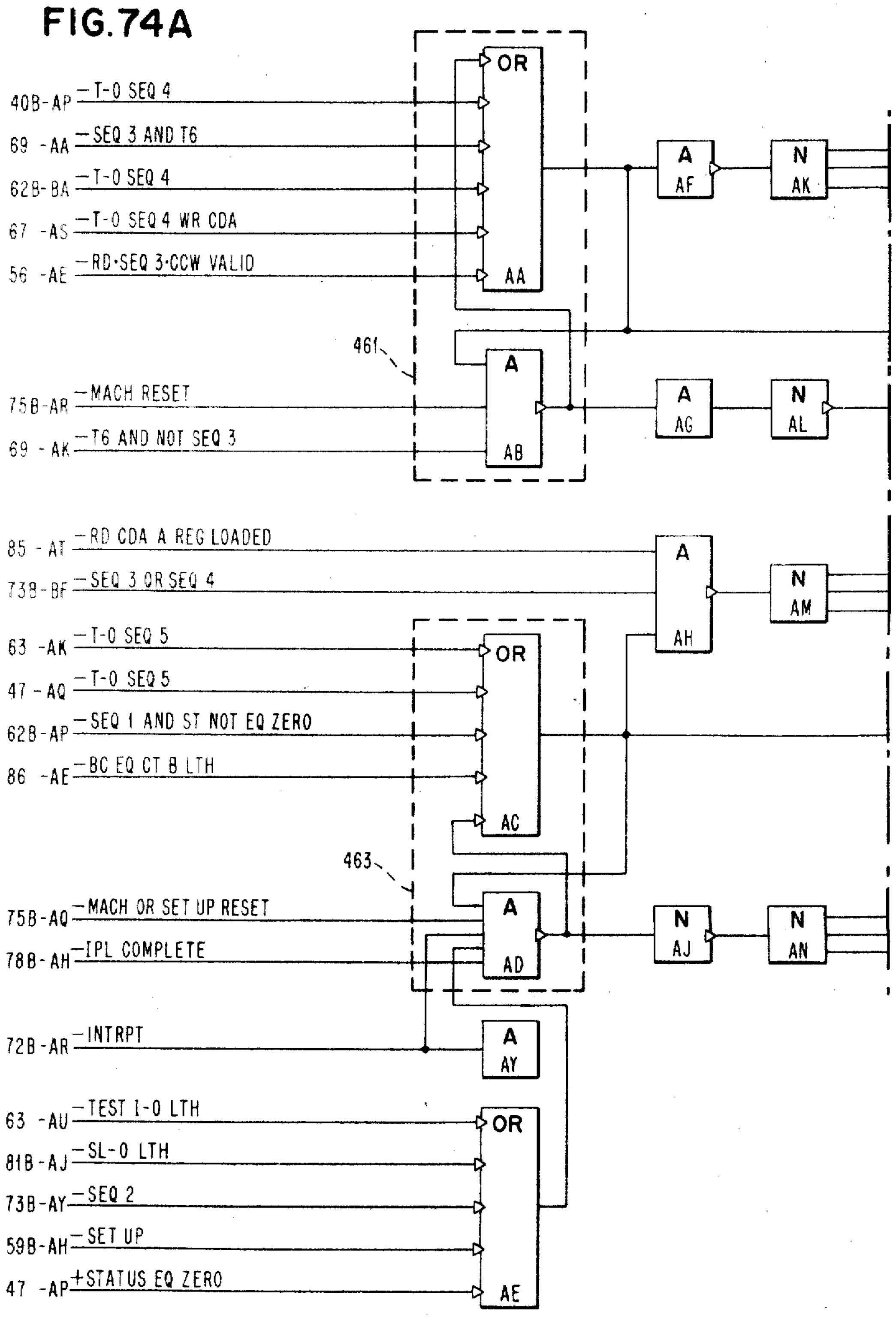
Figure 74B:
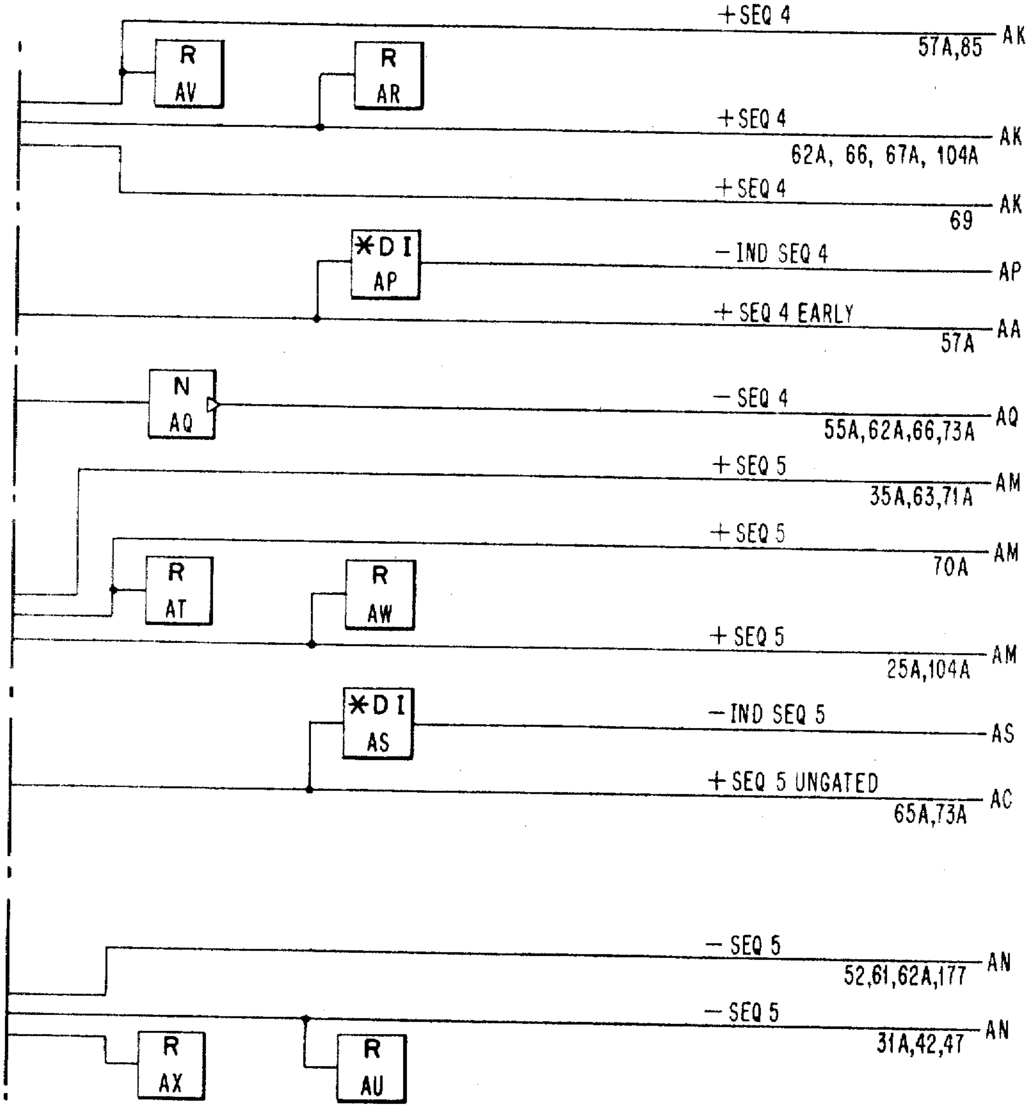

At clock time T6 block AA is activated. Its output, called *—sequence 3 and T6* turns on the sequence 4 trigger on FIGS. 74A and B. When sequence 4 comes, on the line, *+sequence 4* from FIGS. 74A and B Block AK, enters AND circuit AB on FIG. 69. The line *—A reg full* which is now +, activates block AB. The output of this circuit called *—sequence 3 and sequence 4* turns off the *c* clock on FIG. 52. When the clock goes off *—T1* will go + and this will condition block AC on FIG. 69. The output of block AC called *—sequence 4 and not T1* will leave FIG. 69 and go to FIGS. 73A and B where it will turn off sequence 3. When sequence 3 gets turned off it will condition block AD on FIG. 69. The output of block AD *—sequence 4 and not sequence 3* goes to FIG. 52 and turns on the clock.

The channel at this time has sequence 3 off, sequence 4, the sequence in which the data address will be incremented, is on and the clock has just begun to run. The output of AE on FIG. 69, *—sequence 4 and not T4,* will gate the contents of the data address register to the adder and will also raise the increment line which will cause the adder to increment its contents by 8 bytes. At T4 and not T6 block AG of FIG. 69 will be activated. This output called *—sequence 4 and T4 and not T6* will latch the adder. At T4 and not T5 block AH, FIG. 69 will be activated. This output is called *sequence 4 and T4 and not T5,* leaves FIG. 69 and goes to FIGS. 188A and B where it is powdered and will gate the adder contents into the data address register. This line also goes to FIG. 46 where it will check the predicted parity of the adder against the generated parity. On FIG. 69 block AK will be activated at T6 time. The output of this block called *—T6 and not sequence 3* will turn off sequence 4.

To see where the operation stands at this point, refer to FIG. 25, line 5. When byte count equals zero is detected indicating that the channel has filled the B register, it triggers the circuits which takes the channel from the status indicated in line 5 to the status indicated in line 6. The count is decremented and a data request for the storing of a data word in storage is initiated. When the channel receives acknowledgement of the storing of the data, it then increments its data address. Simultaneously with these updating sequences the channel continues to handle information across the interface. The byte counter continues to step and to control the gating of the data bytes into appropriate positions of the B register; and when the B register becomes refilled, it trigers the circuits which will again decrement the count, initiate a storage request, and, when the storage request is completed, activate circuitry for the incrementing of the data address; that is the channel will progress from line 7 to line 8 to line 9. At the completion of the operations which bring the channel status to agree with line 9, the channel will again wait until the interface is at the appropriate state in order to go from line 9 to line 10. This will be repeated until line 13 is reached. At this time the channel will compare the contents of the byte counter against the contents of the byte portion of the count register.

Figure 56:
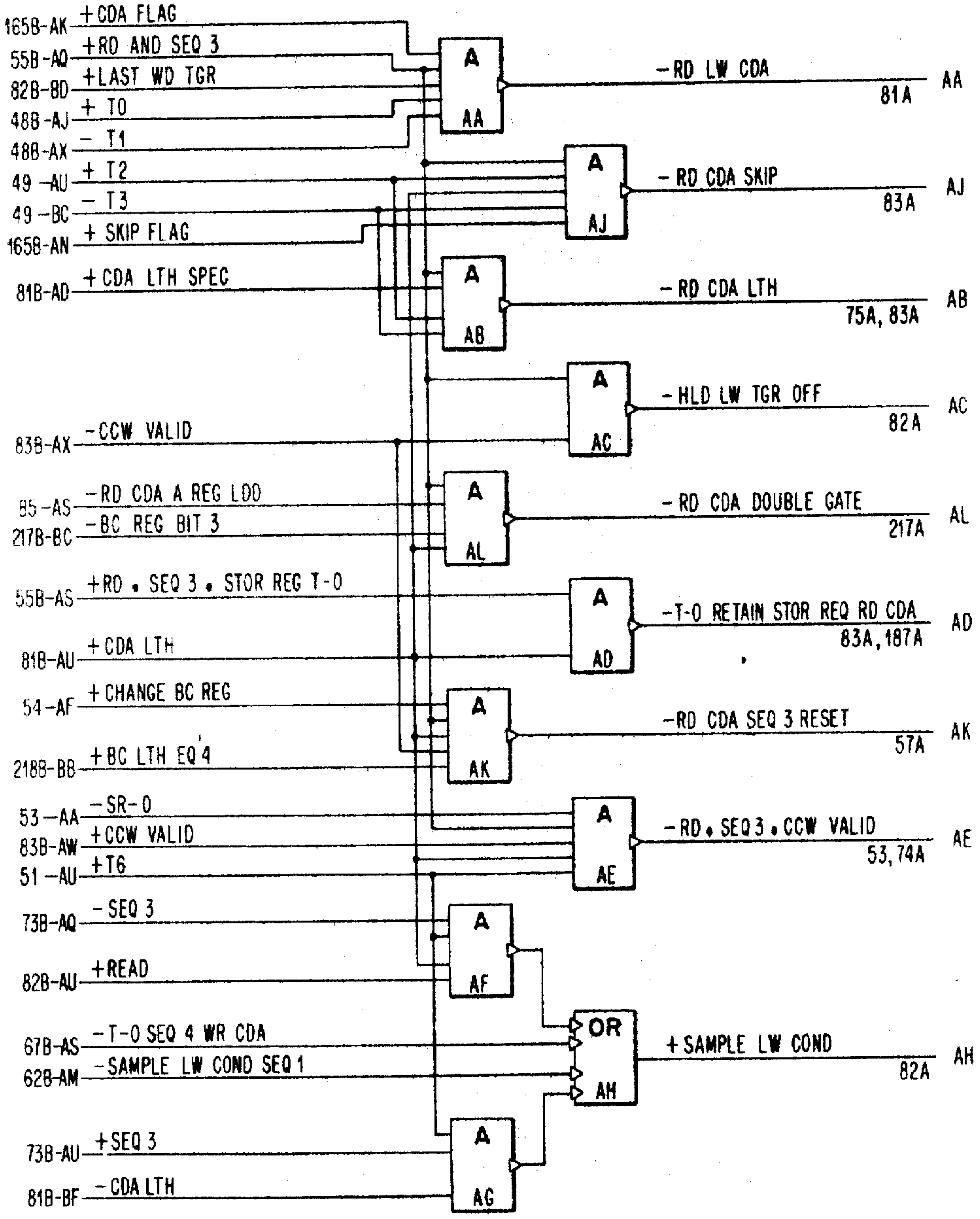
Figure 57A:
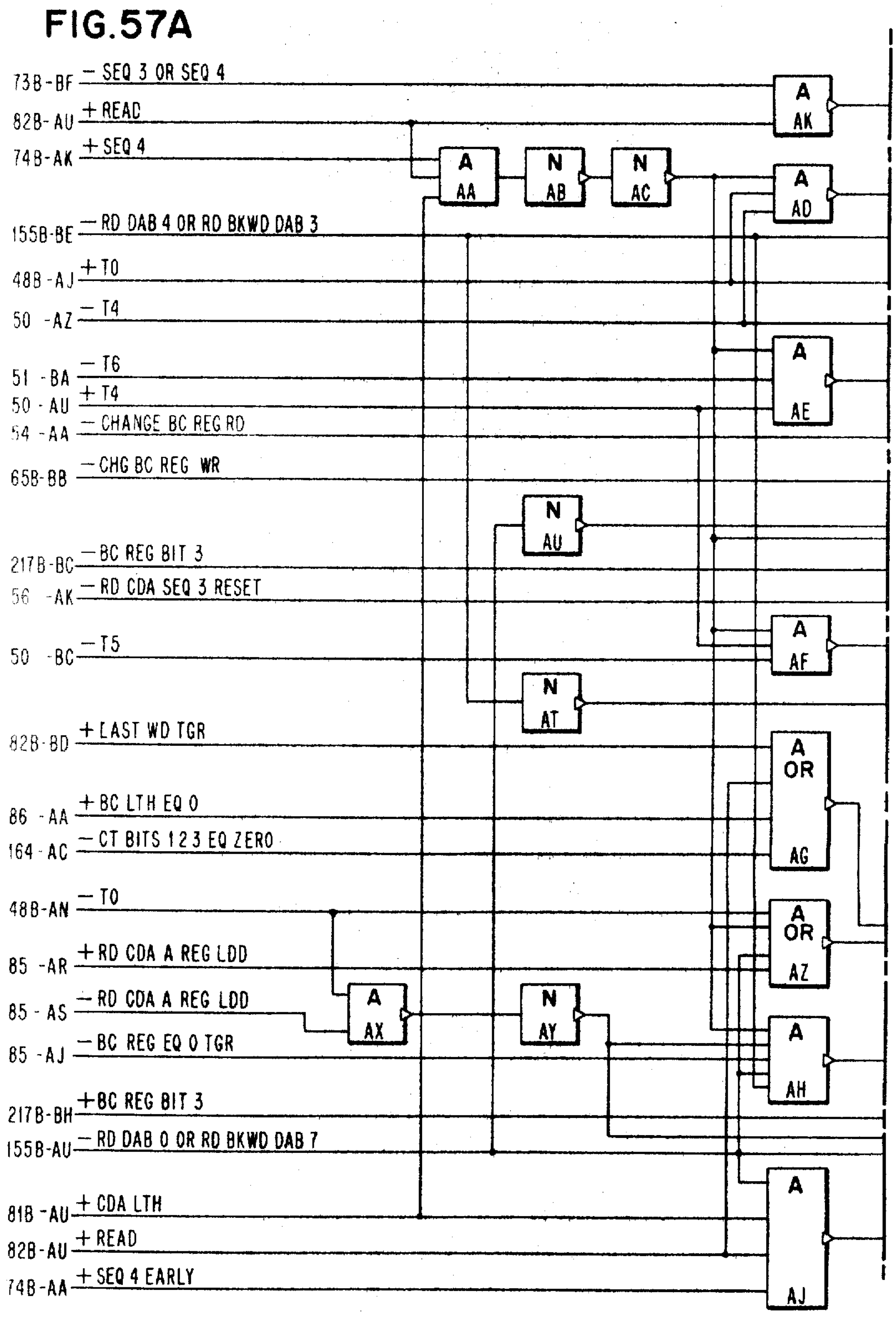
Figure 57B:
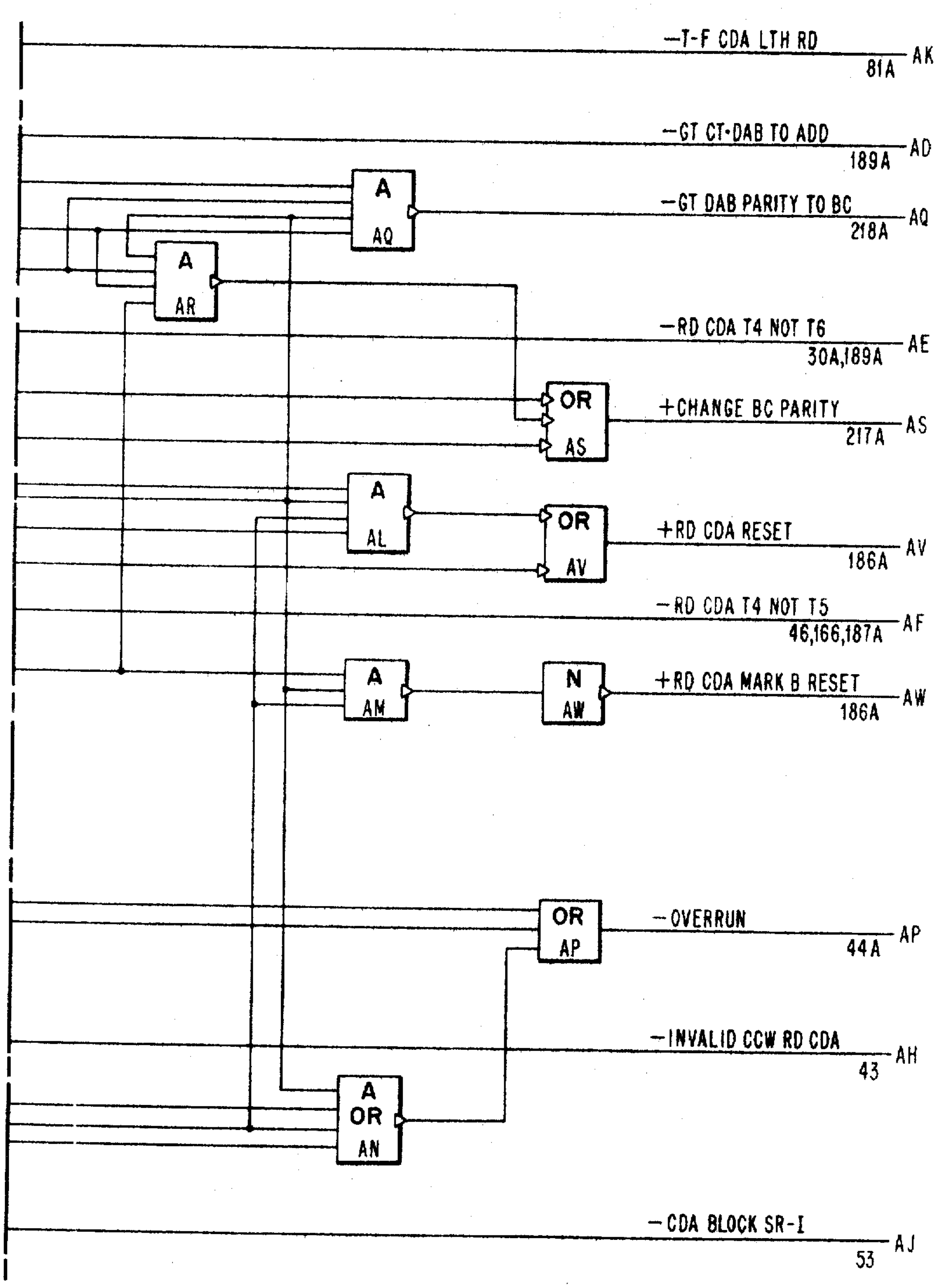

Note that all high order bits of the count register beyond position 4 are now zero. When the byte counter is equal to the contents of the byte portion of the count register, the channel status moves from line 13 to line 14. This is done in the following manner: referring to line 12 of FIGS. 23A and B, during sequence 3 which updates the count from two double words to one double word, block AG is activated at T6 time, on FIG. 56. The output from block AG enters OR circuit block AH which will sample for the last word condition on FIGS. 82A and B. On FIGS. 82A and B the line *+sample last word condition* enters AND circuit block AG the other leg of which at this time will be +. The output of block AG turns on the last word trigger which is made up of blocks AQ and AR. The output of block AR is inverted by block BD and leaves FIGS. 82A and B as *+last word trigger,* and goes to FIG. 54 where it enters AND circuit block AH. The other legs of block AH are *—write CDA, +gate byte count equals zero latch,* and *+byte count equals count* from FIG. 221. On FIG. 221 *+byte count equals count* comes from an inverter block AW, which is fed by block AU, a decoder activated when the byte counter is equal to the low order count bits. The handling of service in has already been discussed and from that discussion note that block AG on FIG. 54 will be activated by a *service-in.* In this case, in addition to leaving FIG. 54 and going to FIGS. 218A and B, the output of block AG will also activate AND circuit AH on FIG. 54.

Figure 86:
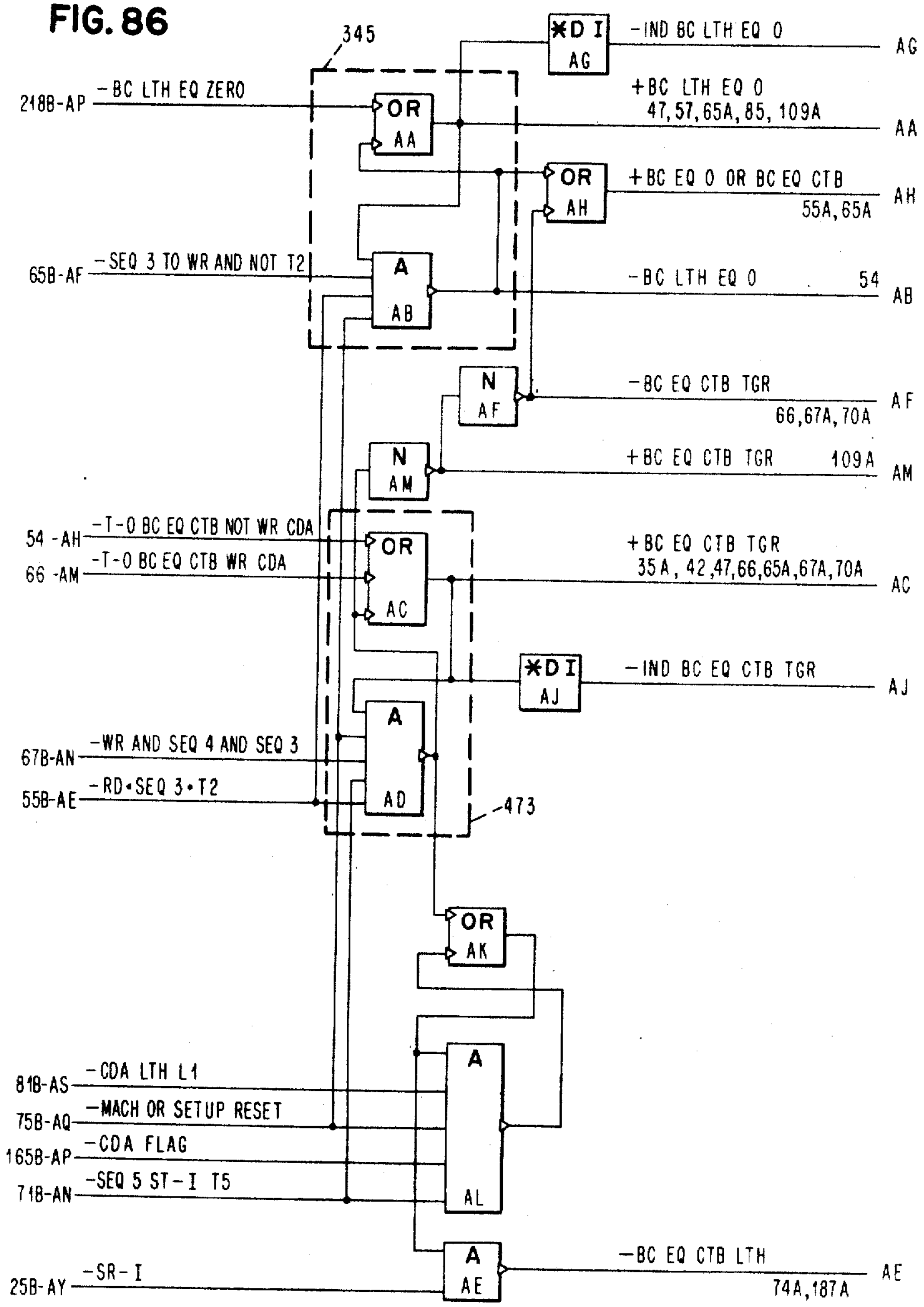

The output of block AH on FIG. 54 *—turn on byte count equal count not write CDA,* leaves this figure and goes to FIG. 86 where it turns on the byte count equal count trigger composed of blocks AC and AD. This output block AD turns on the byte count equal count latch composed of blocks AK and AL. The output of block AK activates block AE, the output of which is called *—byte count equal count latch.* This line leaves FIG. 86 and goes to FIGS. 74A and B where it turns on sequence 5.

12.11 ENDING SEQUENCE

At some later time the control unit sends to the channel the *status in line.* This line enters the terminator on FIGS. 25A and B block AB, ANDed in block AG with *—simulate interface,* goes through OR circuit block AL, and is powered by blocks AR, AW, and BE. The output of block BE, *+status in,* leaves FIGS. 25A and B and goes to FIGS. 70A and B where it enters AND block AC whose output leaves FIGS. 70A and B as *—sequence 5 and status in.* This line goes to FIG. 52 where it turns on the clock.

Figure 70A:
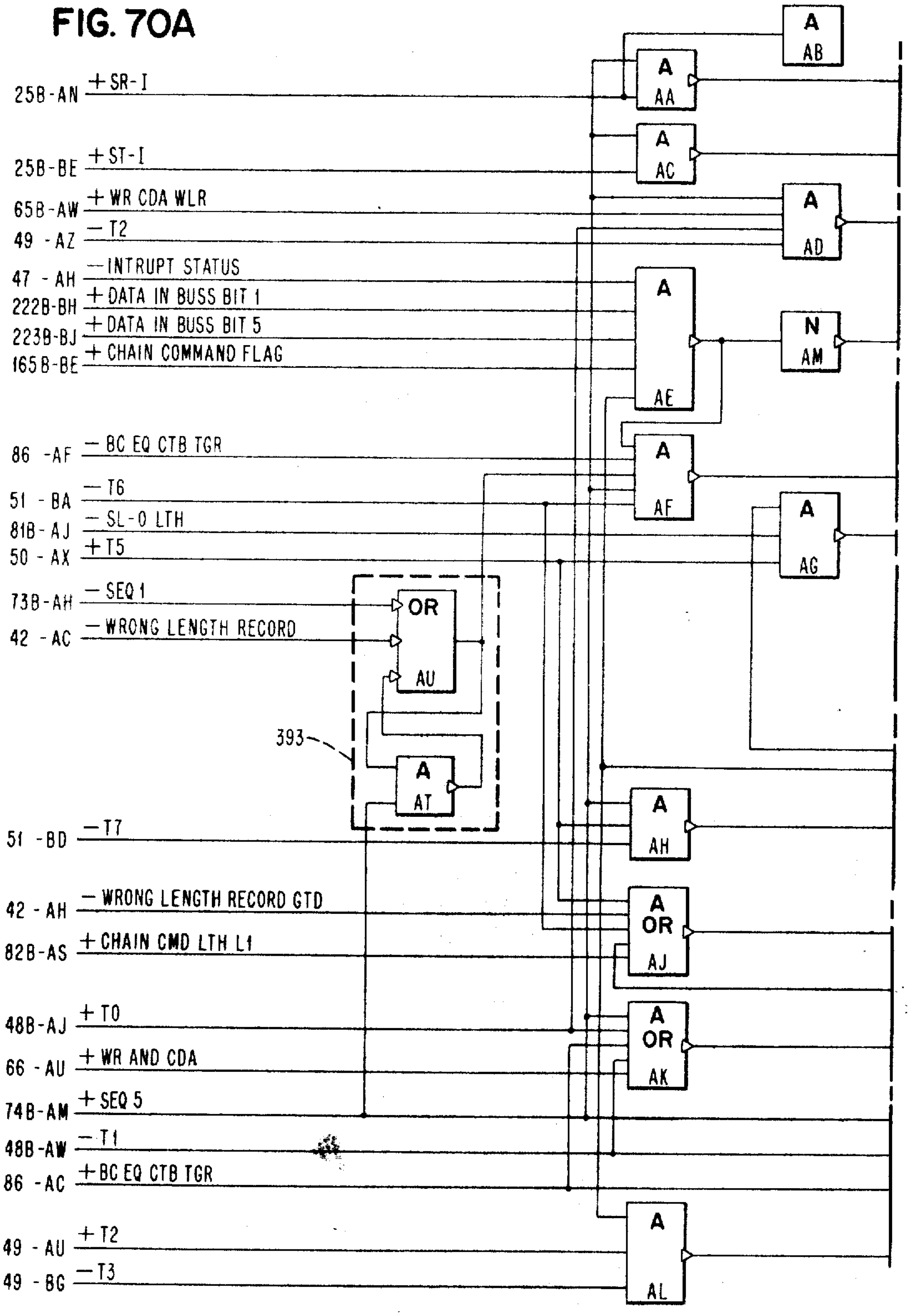
Figure 70B:
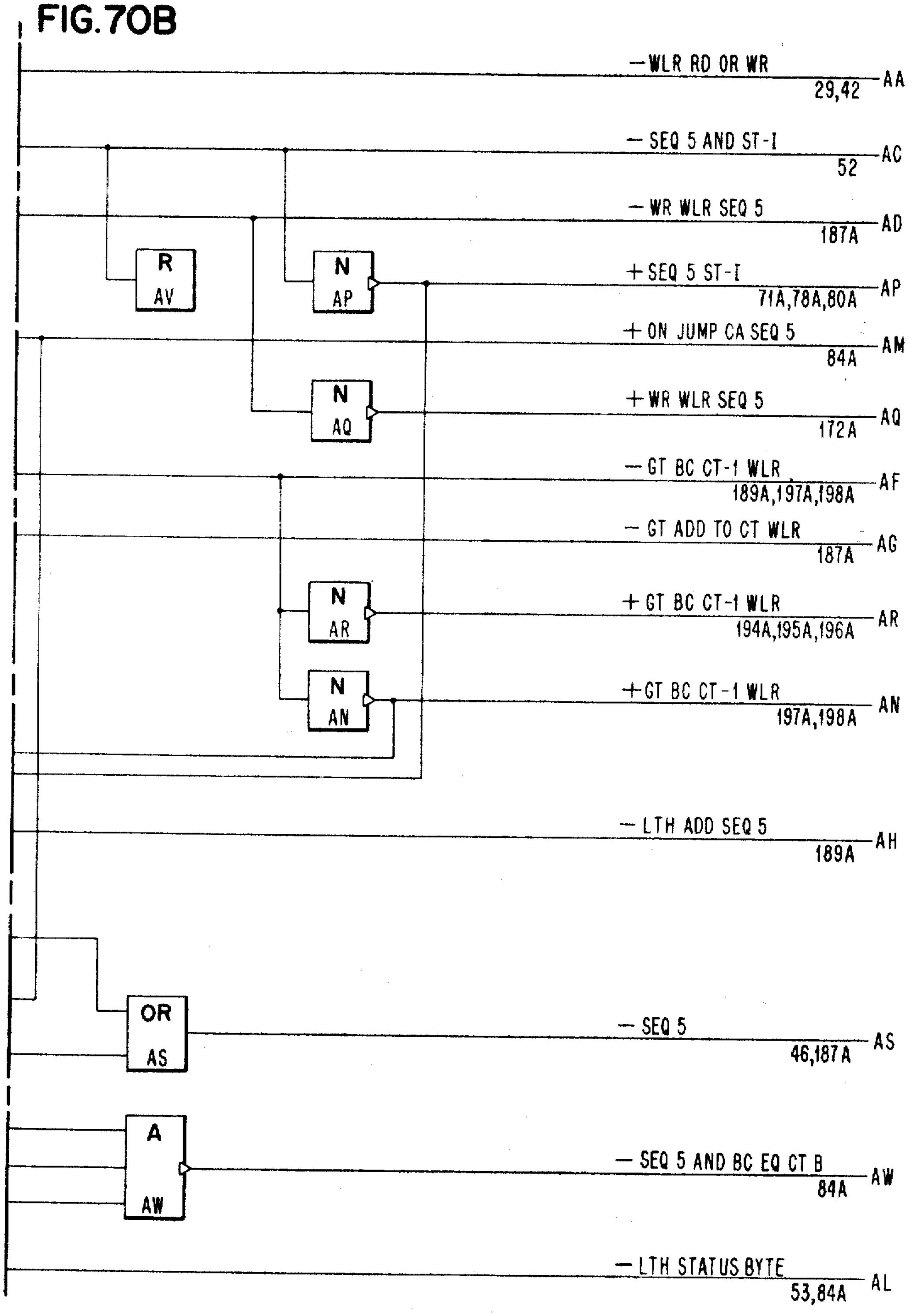

At clock time T2 not T3, the AND circuit block AL on FIGS. 70A and B is activated. The output of block AL, *—latch status byte,* goes to FIG. 53 where it sets the latch, status byte trigger, composed of blocks AL and AM on FIG. 53. The output of AND circuit AM enters OR circuit AT on FIG. 53 whose output goes through blocks AW, AD, and AH. The output of block AH leaves FIG. 53 as *+latch bus in* which goes to FIGS. 222A through 224B, to latch the status byte sent from the control unit into the bus in latches. On FIGS. 71A and B, clock pulses *T3* and *not T4* enter AND circuit block AA whose output sets a latch composed of blocks AH and AJ. The output of block AJ leaves FIGS. 71A and B as *—status in end* and goes to FIGS. 30A and B where it sets the service out end trigger composed of blocks AE and AF. The output of block AE is inverted by block AN and leaves FIGS. 30A and B as the *—service out end* line. This line goes to FIG. 29. On FIG. 29 *—service out end* enters an OR circuit block AE whose output enters AND circuit block AH. The output of block AH goes to multiplex driver which sends *service out* across the interface.

Figure 71A:
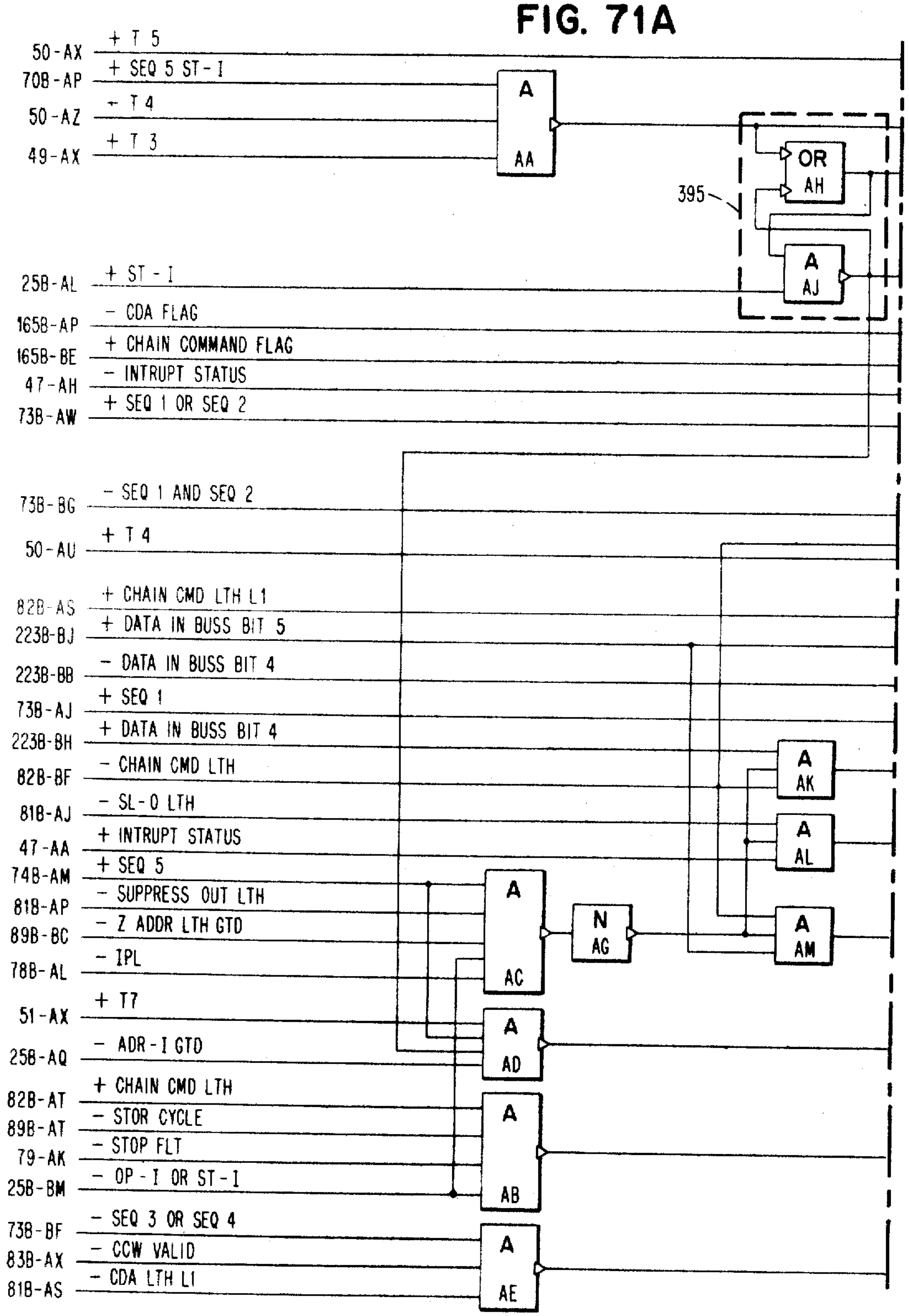
Figure 71B:
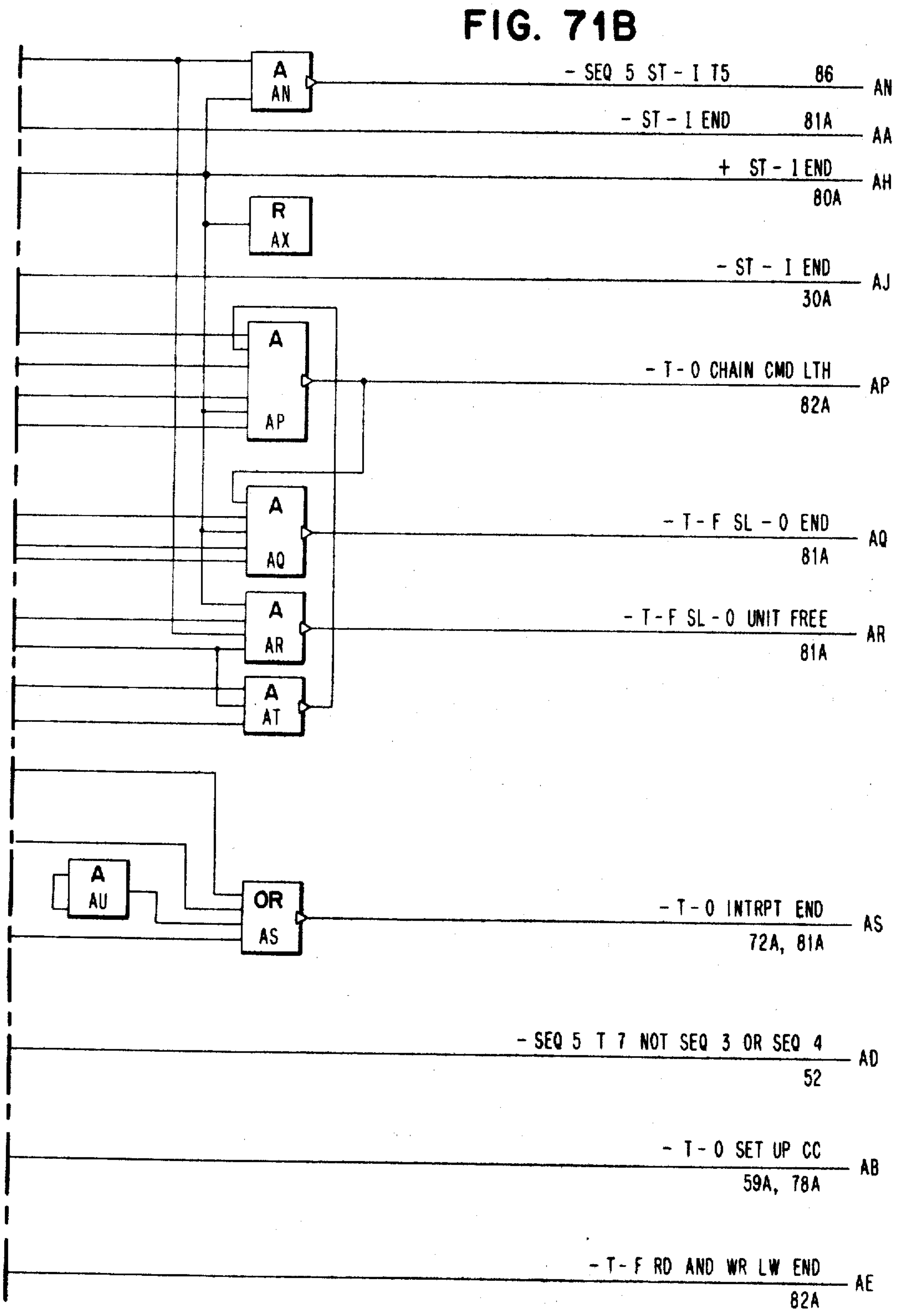

Also on FIGS. 71A and B block AH conditions block AQ so that at T4 time the output of AQ will be activated.

Figure 81A:
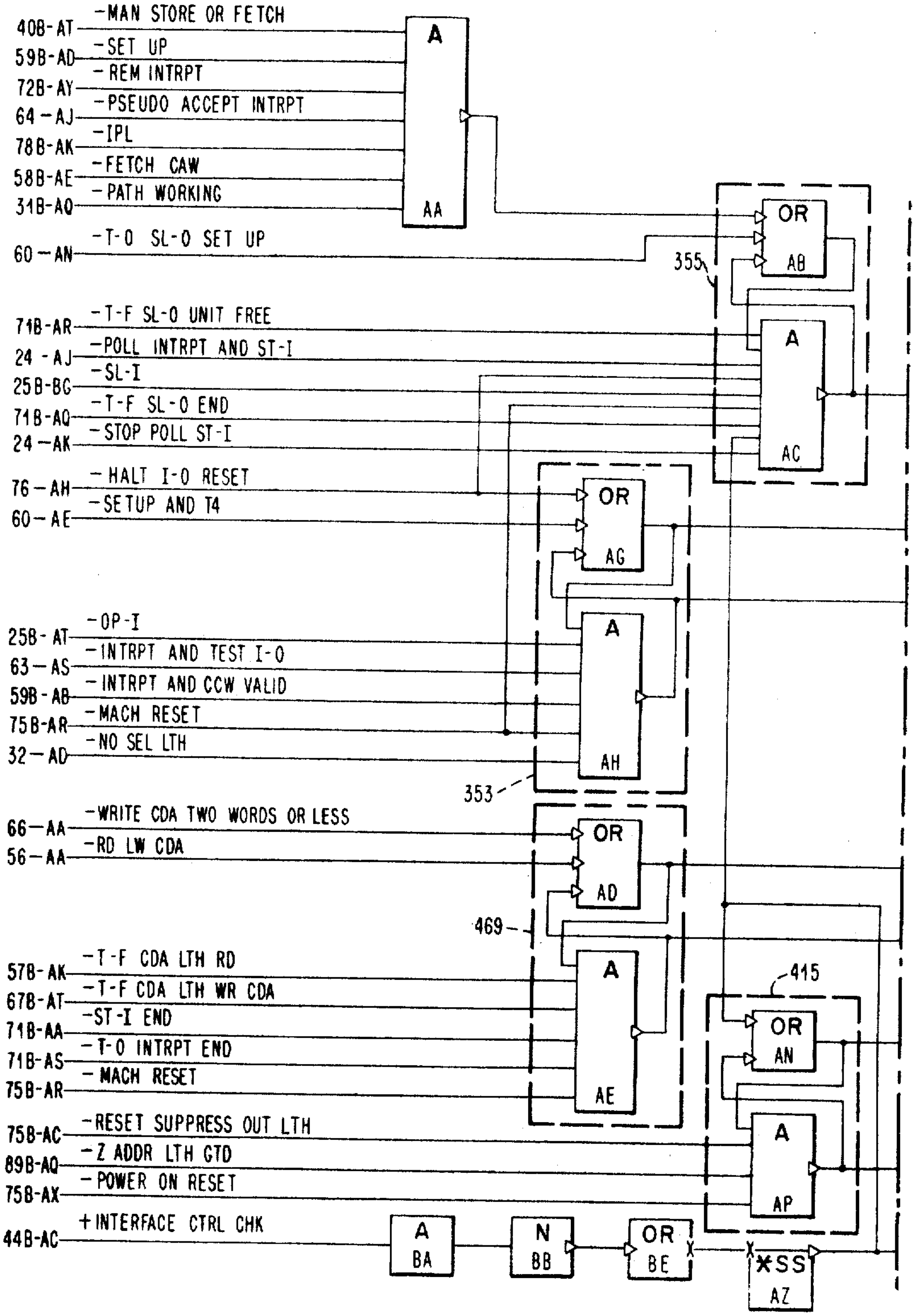
Figure 81B:
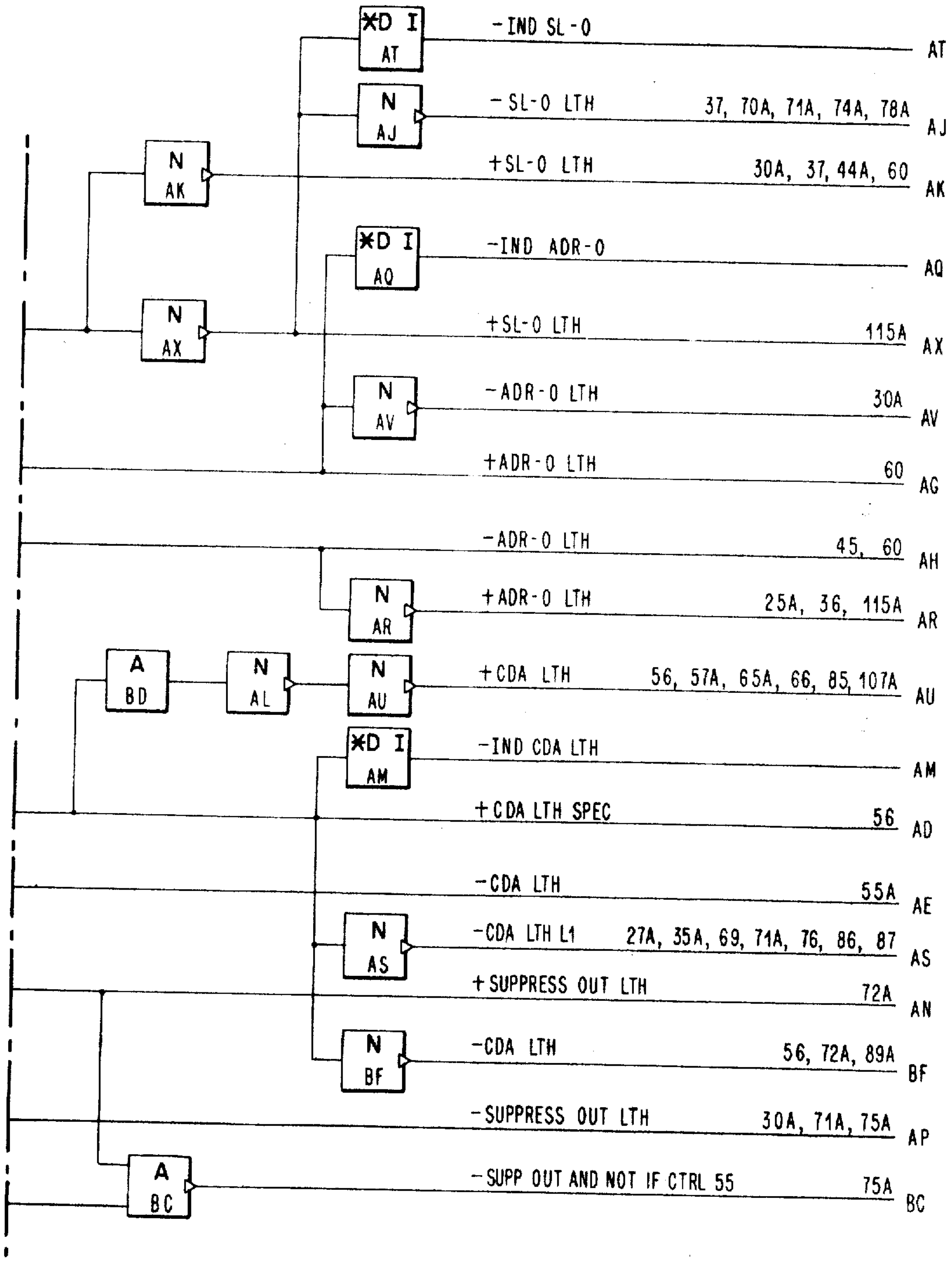
Figure 82A:
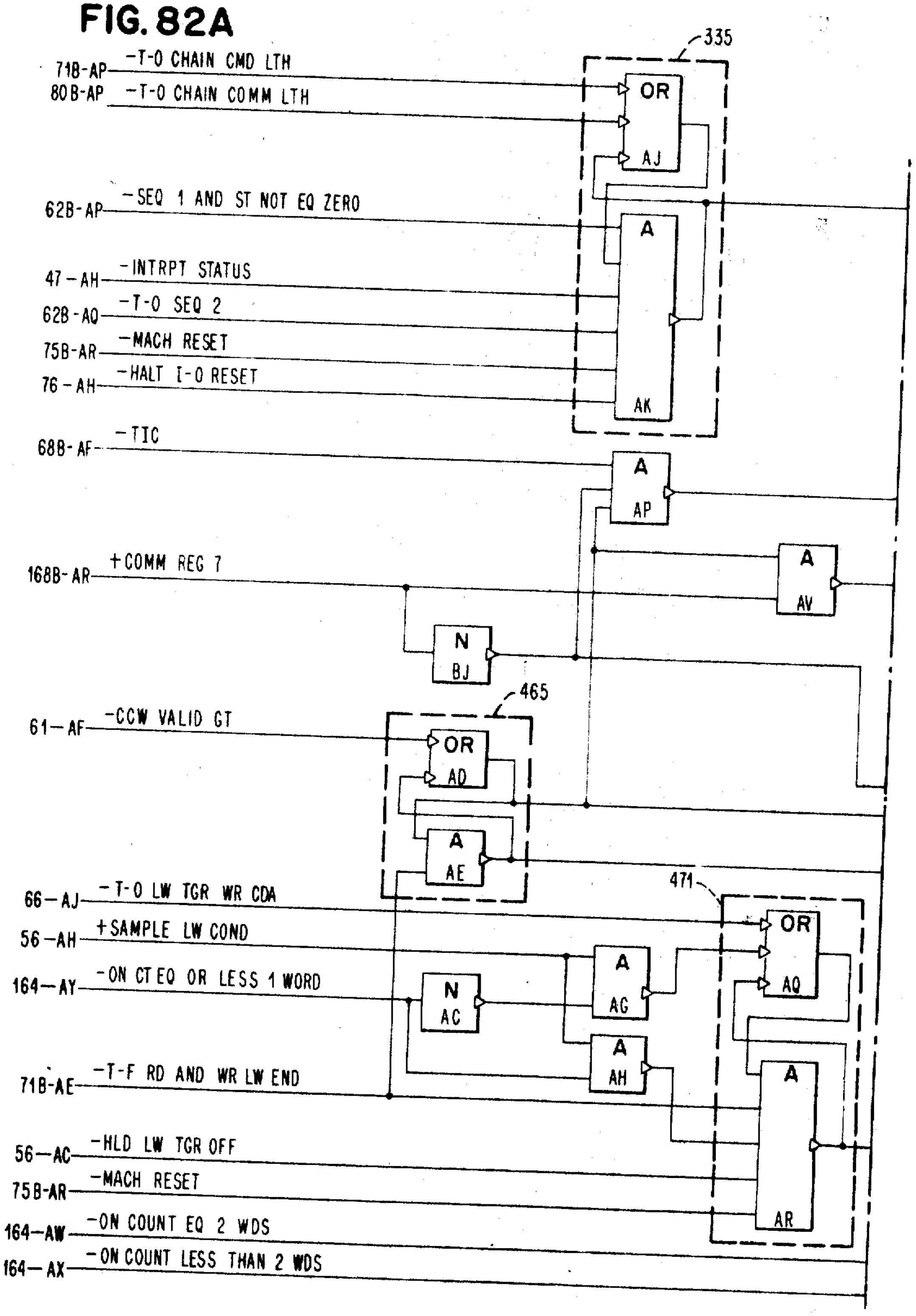
Figure 82B:
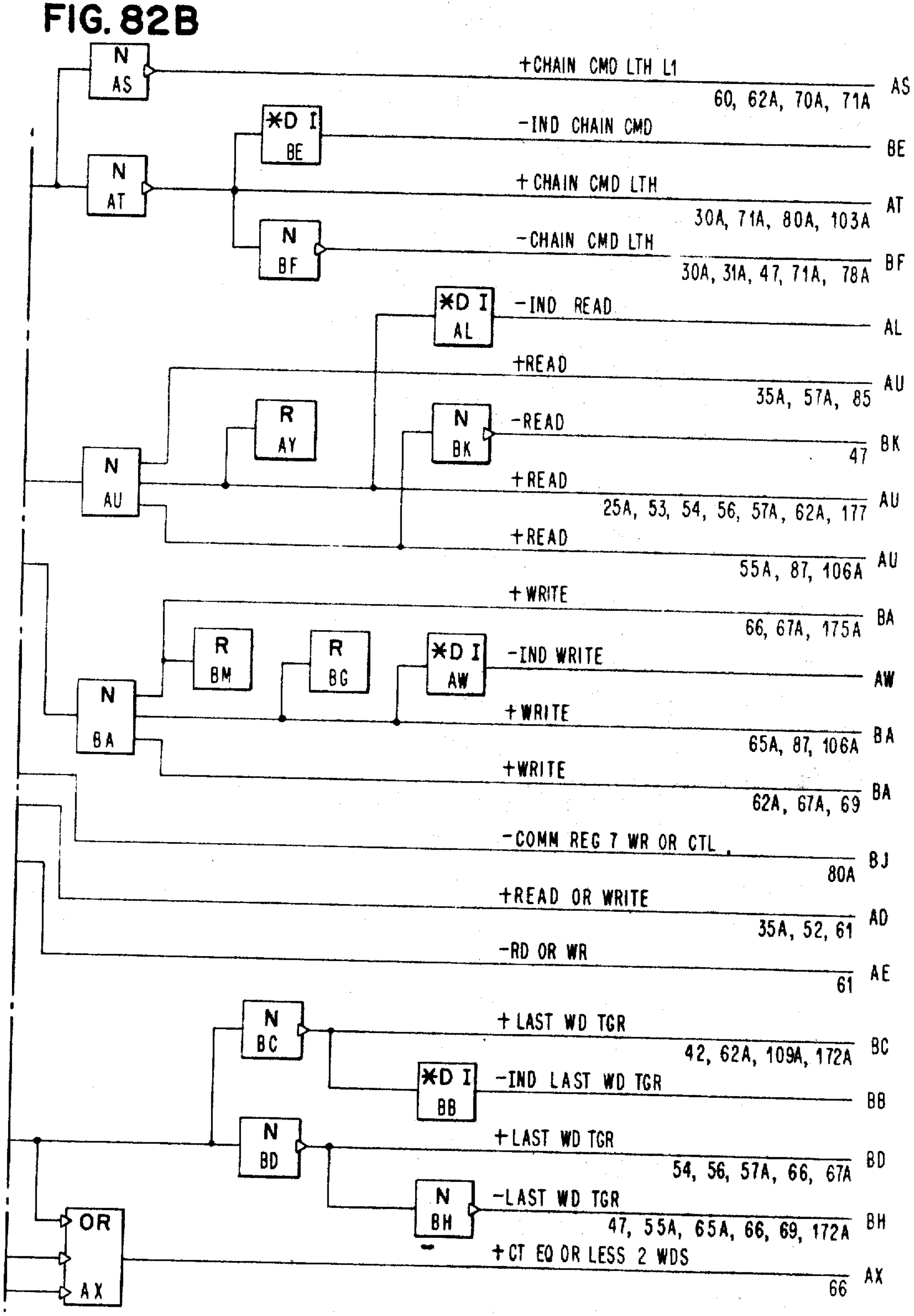

The output of this block, *—turn off select out end,* leaves FIGS. 71A and B and goes to FIGS. 81A and B where it turns off the select out latch. This signal sequence is used by the channel to disconnect from the control unit.

Figure 72A:
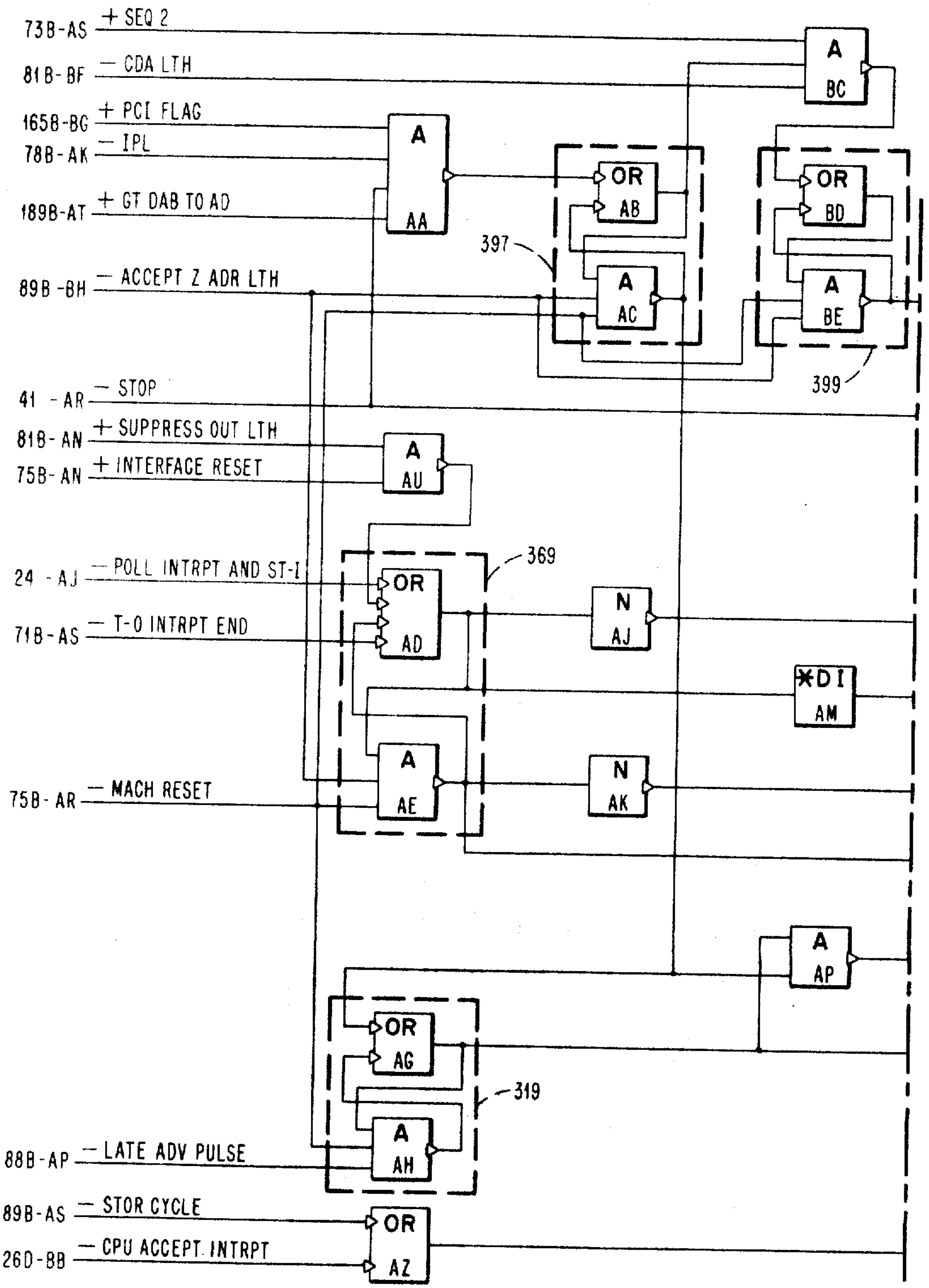
Figure 72B:
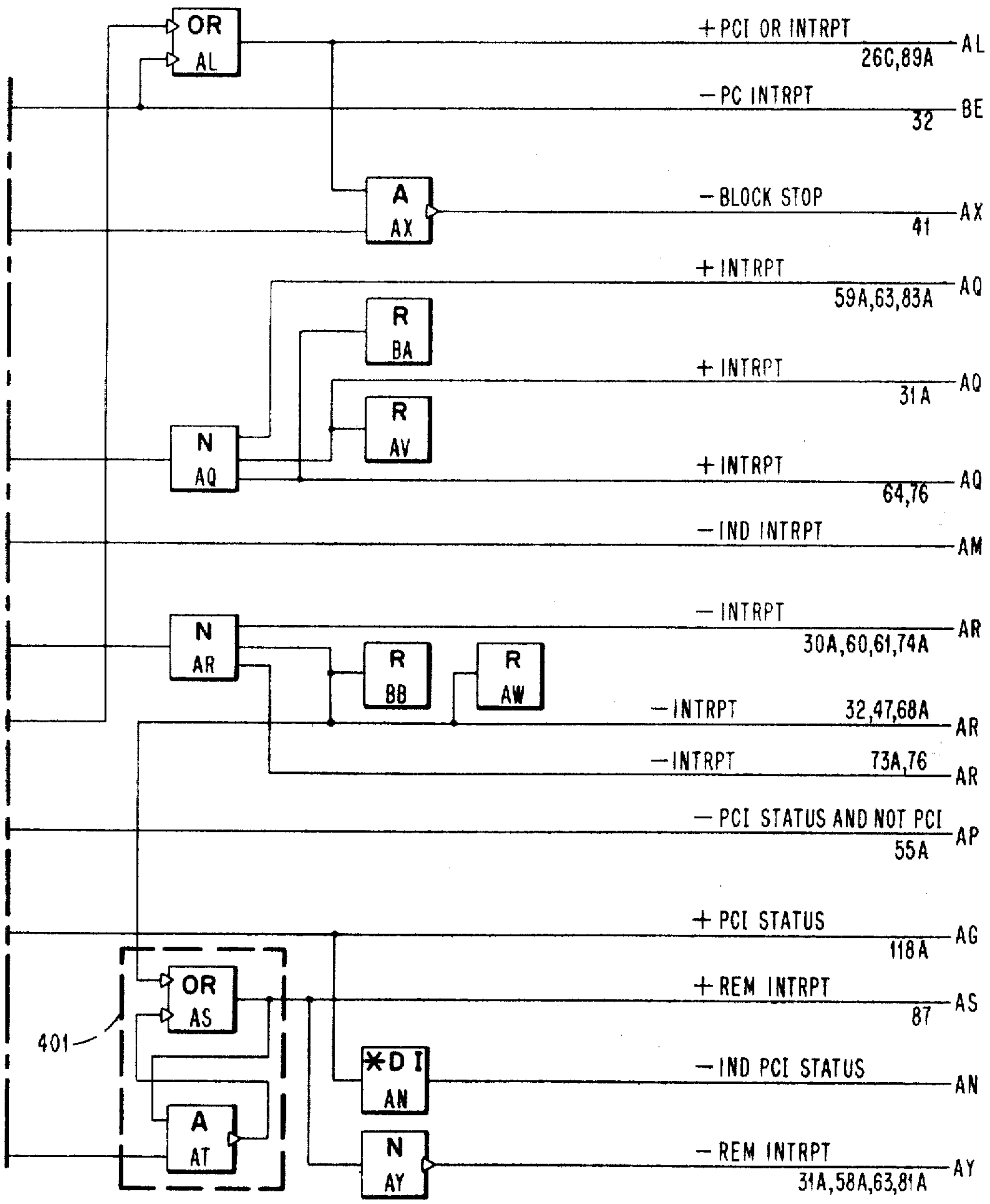

When the control unit sees *service out* activated and *select out* turned off, it will acknowledge these conditions by dropping both *status in* and *operation in.* When both of these lines are inactive, the AND circuit block AB on FIGS. 71A and B will be energized. Its output combines with either a *unit free* or an *end* bit and will activate OR circuit block AS, the output of which leaves FIGS. 71A and B as *—turn on interrupt end.* The turn on of the interrupt trigger is done on FIGS. 72A and B. The interrupt trigger is composed of blocks AE and AD.

12.12 STORY OF CSW

At this time the channel will interrupt the CPU and upon receiving an *interrupt response line, the* channel will initiate a storage request and store its own status and the control unit status in address 64 of the CPU storage. Referencing FIGS. 23A and B, this status word is indicated in line 16 and is composed of the tags, the command address, the status of the device, the channel status, and the count, which in this case is zero. After the BCU has acknowledged the store of the CSW, the channel sends the *release* line to the CPU so that the CPU may disconnect and proceed with the examination of the CSW under program control.

While the invention has been particularly shown and described with reference to the preferred embodiment thereof, it will be understood by those skilled in the art that foregoing and other changes in form and details may be made therein without departing from the spirit and scope of the invention.

What is claimed is:

1. In channel apparatus operable to connect external input/output devices with pre-defined blocks of memory locations, a circuit for defining said blocks, including:

a plurality of registers, each having an input for entering block definition information, and an output for making said information available;

an adder, having two operand inputs and a sum output;

a command word source of block definition information, connected to said register inputs;

utilization means, connected to said register outputs, for gaining access to defined memory location blocks;

an increment quantity source;

first connecting means, operable to connect each register output to one adder operand input and the increment quantity source to the other adder operand input;

second connecting means, operable to connect each register input to the adder sum output; and, control means, connected to said first and second connecting means, for making said connecting means operable to update the block definition information, in one register at a time, as a function of an increment quantity.

2. The circuit of claim 1 further including:

sequence control means, connected to said adder, for detecting the completion of updating of a register; and, overlapping means, connected to said adder and to said sequence control means, for permitting the initiation of channel apparatus operation prior to detection of completion of updating.

3. The circuit of claim 1 wherein a number of parity signals are associated with the block definition information, entered into each register, further including:

parity checking circuits, connected to said adder, for indicating at an output the accuracy of the information, received from each register, relative to the associated parity signal.

4. Channel apparatus having means for indicating the limits of a block of locations in an addressable memory, each location having a plurality of byte portions, including:

a first register, connected to said memory, for storing manifestations of the first available location in the block and the first available byte portion within said location;

a second register, connected to said memory, for storing a manifestation of the number of available byte portions in the block;

a counter, connected to said memory, for storing a manifestation of the byte portion of a location currently being utilized;

control means, connected to said first and second registers, including means for initially combining said manifestation of the first available byte portion and said manifestation of the number of available byte portions, stored in said first and second registers, and means for storing the resultant combined manifestation in said second register in place of said manifestation of the number of available byte portions, said control means including further means for thereafter modifying said resultant manifestation stored in said second register to reflect the utilization of locations in said block; and comparing means, connected to said second register and to said counter, for detecting an equivalence between the contents of said second register and the contents of said counter to thereby indicate the end of a block.

5. Apparatus for indicating the end of an assigned area in a memory, including:

communication means, connected to said memory for communicating to and from memory data words comprising a plurality of portions, one data word at a time;

registers, connected to said memory, for defining a current data word address, the number of data word portions in the assigned memory area and the address of the first data word portion;

counting means, connected to said communication means, for counting and indicating the number of word portions communicated;

combining means, connected to said registers and counting means for initially combining the address of the first data word portion with the number of word portions in the assigned area and for subsequently updating said registers as a function of said counting means; and recognition means, connected to said counting means and to said registers for recognizing the end limit of a memory area.

6. In channel apparatus for communicating data words between input/output devices and a memory under control of channel command words initially stored in memory selected by instructions also initially stored in memory, circuits for indicating to a central processing unit the acceptance or rejection of a channel command word selection instruction including:

first accessing means, connected to the memory, for sequentially accessing first and second instructions from said memory, said first instruction directed to said channel apparatus;

second accessing means, connected to the memory for accessing a channel command word specifying a channel function, from said memory in response to said first instruction;

indicating means responsive to said second accessing means for indicating that the channel apparatus has energized said second accessing means; and code means at said central processing unit accessible by said first accessing means, connecting said indicating means to said central processing unit for storing at the central processing unit the operational state of the channel indicated by said indicating means.

7. The apparatus of claim 5, wherein said counting means includes:

a plurality of latches for indicating a number one higher than the number of word portions counted; and means for sensing said latches simultaneously with the communication and counting of a word portion.

8. In a data processing system providing data transfer to and from a storage by variable length fields which may start and end on any byte location within a word boundary, the combination comprising:

an address register adapted to store an address which includes a manifestation of a word location in said storage and a manifestation of a byte position within said word;

a count register;

a byte counter;

means for initializing said byte counter to contain a manifestation of the byte position within a word boundary of the first byte to be transferred;

means for initializing said count register to register the total number of bytes to be transferred plus the byte position within a word boundary of said first byte;

means for incrementing said byte counter for each byte transferred;

means for decrementing said count registed by an amount equal to the number of bytes in a word for each word transferred;

and means for comparing the contents of said count register and said byte counter to thereby recognize the end limit of a memory area.

9. In a data processing system including a central processing unit (CPU) adapted to perform main and channel instruction and an input/output channel adapted to perform channel instruction s specifying a function to be performed by the channel, the combination comprising:

registering means in said CPU;

means to set condition code bit positions in said registering means; and releasing means responsive to the execution of a channel instruction at said channel for releasing the CPU to proceed with the next main instruction;

said condition code indicating status as to the ability of said channel to perform the function specified by said channel instruction;

whereby an instruction subsequent to said channel instruction may utilize said code for decision making.

10. In a data processing system including a central processing unit (CPU) and an input/output channel, the combination comprising:

control means in said CPU for selecting a channel and for issuing an instruction to said channel;

means in said channel for releasing said channel from said CPU;

indicating means in said CPU for indicating the immediate status of said instruction in said channel;

means in said channel responsive to said instruction for causing a coded indication of acceptance or rejection to be set into said indicating means; and means for energizing said releasing means;

whereby said indicating means may be tested by a second instruction in said CPU to determine whether or not said first instruction has been accepted by said channel.

11. In a data processing system including a central processing unit (CPU), a storage, and an input/output channel the combination comprising:

means for starting an operation of said channel in response to an instruction communicated to said channel from said CPU;

a release line energizable by said channel for terminating communication between said CPU and said channel;

condition lines connected between said CPU and said channel for indicating a condition of said channel;

control means in said channel for placing a condition code on said condition lines in response to said instruction;

means responsive to said control means for energizing said release line; and means in said channel for making available to said storage, input/output status information, prior to the energization of said release line.

References Cited

UNITED STATES PATENTS

| | | | |
|---|---|---|---|
| 3,029,414 | 4/1962 | Schrimpf | 340—172.5 |
| 3,061,192 | 10/1962 | Terzian | 235—157 |
| 3,200,380 | 8/1965 | MacDonald | 340—172.5 |
| 3,222,649 | 12/1965 | King | 340—172.5 |
| 3,369,221 | 2/1968 | Lethim | 340—172.5 |

PAUL J. HENON, Primary Examiner

RONALD F. CHAPURAN, Assistant Examiner